United States Patent [19]
Juodikis et al.

[11] Patent Number: 4,528,635
[45] Date of Patent: Jul. 9, 1985

[54] AUTOMATIC DISTILLATION APPARATUS

[75] Inventors: Peter Juodikis, Chicago; Steven J. Martinich, Wheaton, both of Ill.

[73] Assignee: GCA Corporation, Bedford, Mass.

[21] Appl. No.: 386,044

[22] Filed: Jun. 7, 1982

[51] Int. Cl.³ .............................................. B01D 3/42
[52] U.S. Cl. ................................... 364/501; 73/61.3; 374/27
[58] Field of Search ........................ 364/501; 374/27; 73/61.3; 202/160; 203/2

[56] References Cited

U.S. PATENT DOCUMENTS

| | | | |
|---|---|---|---|
| 3,239,432 | 3/1966 | Rhodes et al. | 374/27 X |
| 3,364,731 | 1/1968 | Hook | 73/61.3 |
| 3,732,723 | 5/1973 | Goolsby et al. | 374/27 X |
| 4,250,739 | 2/1981 | Audeh et al. | 364/501 X |
| 4,348,259 | 9/1982 | Jensen | 364/501 X |
| 4,417,311 | 11/1983 | Ryan | 364/501 |

FOREIGN PATENT DOCUMENTS 1468548  7/1974  United Kingdom .

OTHER PUBLICATIONS

Brochure entitled "Standard Method of Distillation of Petroleum Products", ASTM D 86-78, 19 pages, Oct. 1978.
Product brochure entitled "Precision", including cover showing ADA II and pp. 11-15 relating thereto, GCA/Precision Scientific Group, 1978.
Instruction Manual entitled "Automatic Distillation Apparatus II", Item No. TS-7007-AN-1, pp. 1-65 and Appendices A-X.
ADA II Drawings Nos. W534673 & 534674, (4 sheets); X534886; X534888; X534890; 535947, (2 sheets); D537243; 538611; and 539057.

Primary Examiner—Edward J. Wise
Attorney, Agent, or Firm—Henry D. Pahl, Jr.

[57] ABSTRACT

A microprocessor controlled distillation analyzer for petroleum products performs, computes, displays and records distillation data. An interactive/keyboard display and printer system reports and records test conditions and prompts user inputs to define test parameters. Before the initial boiling point, the heater is automatically controlled in two time intervals. Following the initial boiling point, the heater is controlled to keep the monitored distillation rate within a predetermined range. Upon attaining an automatically calculated volume of distillate, the final heat is incremented to a programmed level. In one mode, the end point is automatically detected by monitoring vapor temperature for a decline, followed by the cessation of meniscus movement to terminate the test. After measuring the residue, the analyzer automatically recomputes temperatures at a series of percentage volumes of evaporated sample. An IR beam meniscus detector is driven by a stepping motor screw-drive mechanism actuated via the microcomputer to find the initial meniscus position and track the rising meniscus. The vapor temperature sensor emergent stem error is compensated for by a platinum resistive element with opposite nonlinearity. Thermometer-like temperature lag is created by software.

23 Claims, 24 Drawing Figures

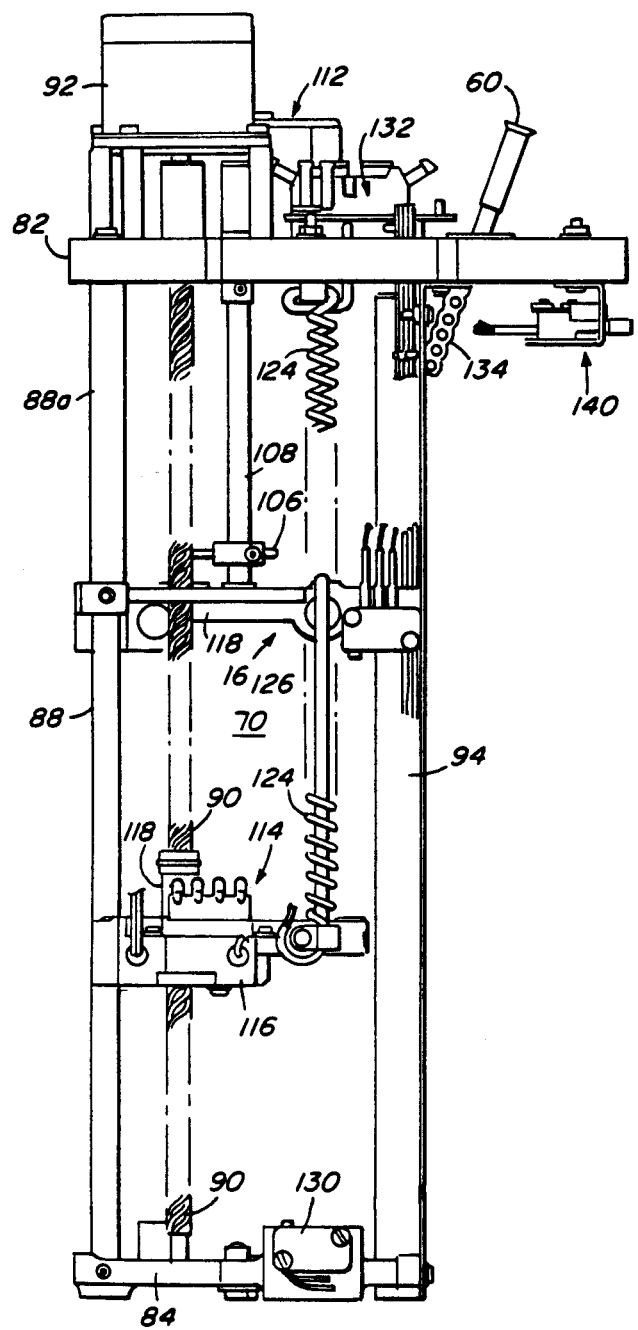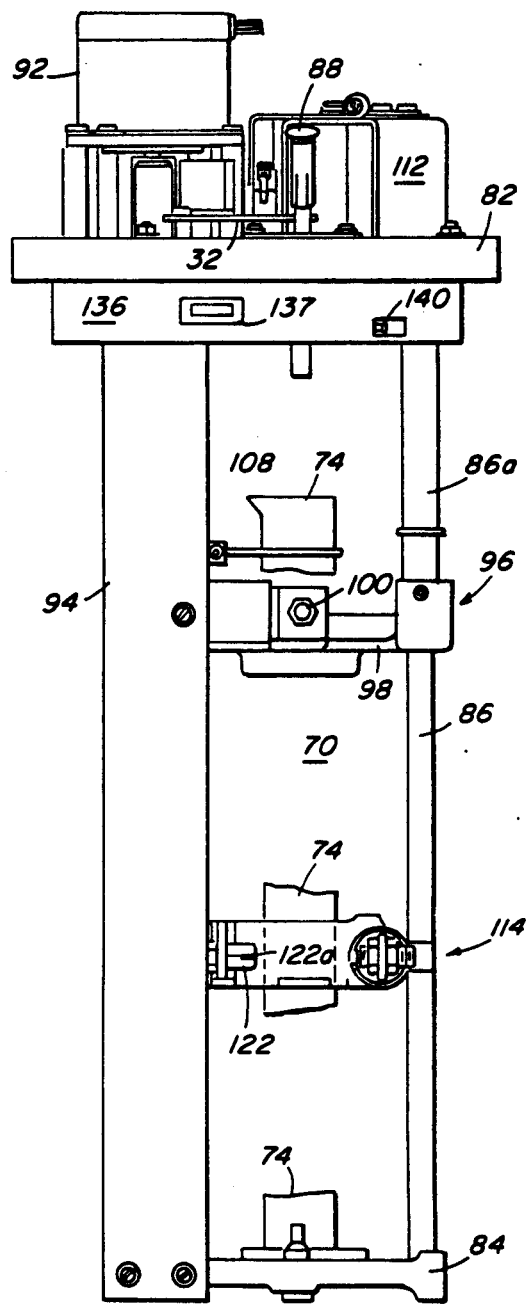
FIG. 4
FIG. 3

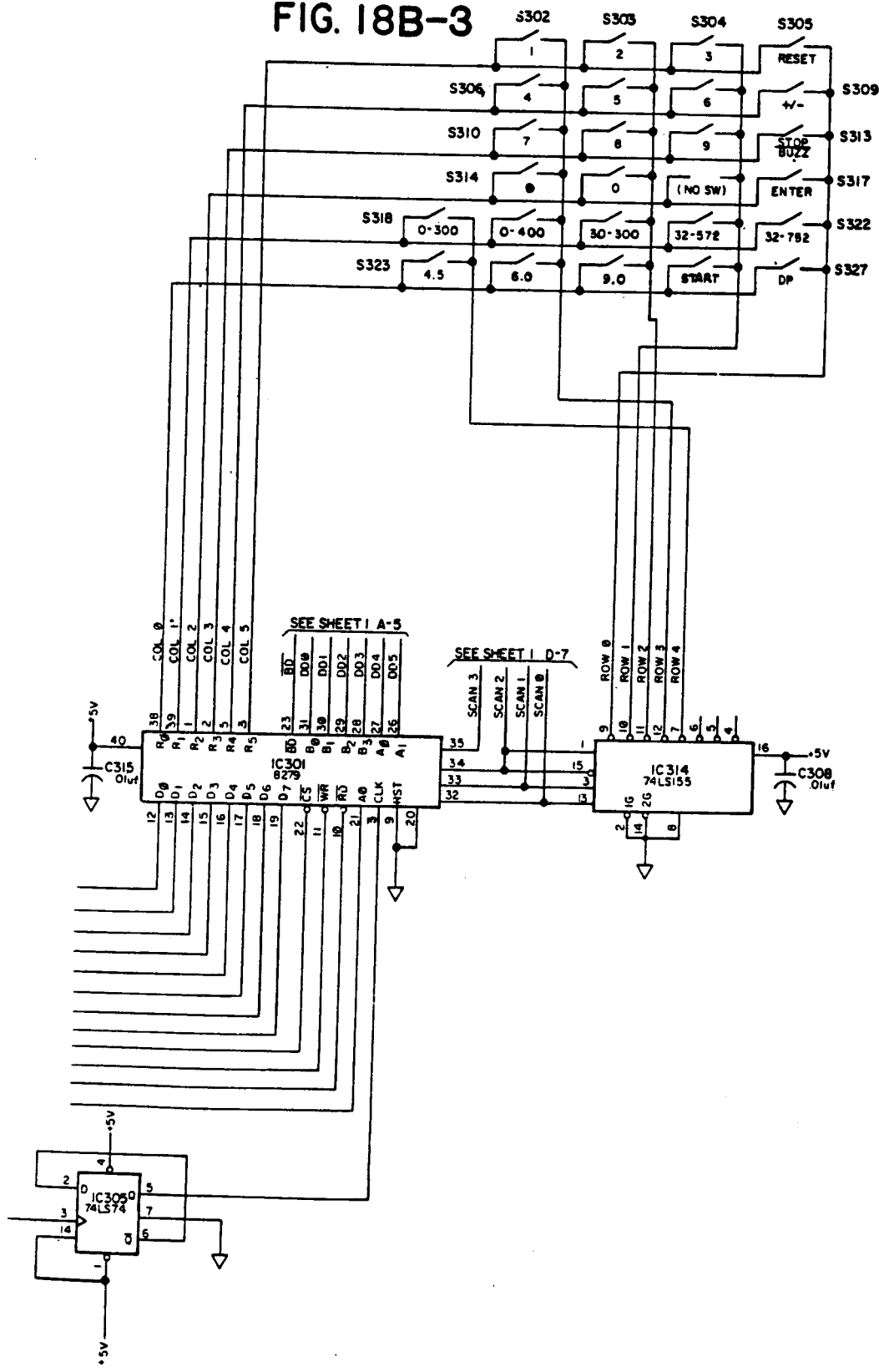

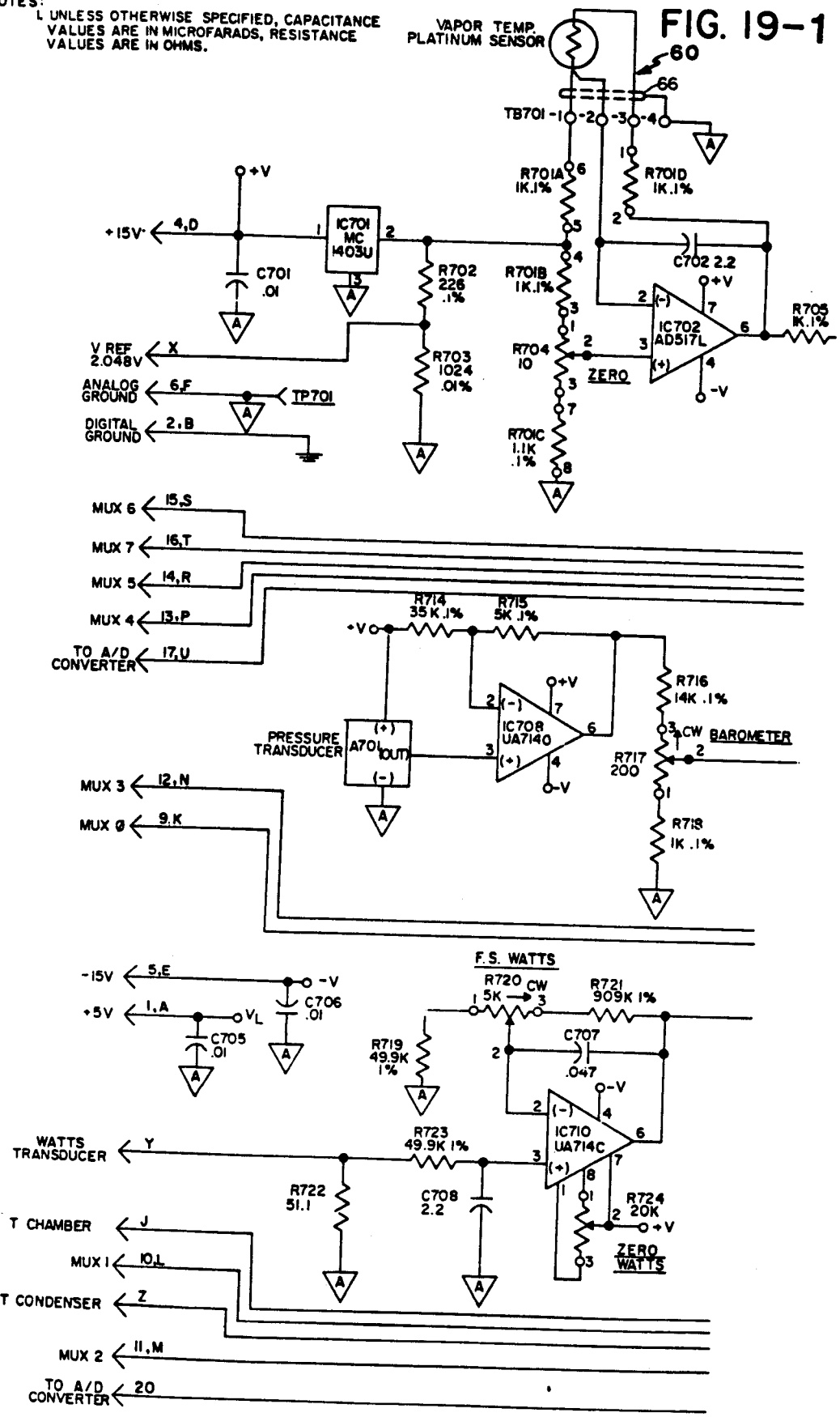

FIG. 21
Winter Gasoline
Regular Grade
ASTM D86, Group 1

```
OPERATOR:_____
MAR 23 1982 10:28
TESTING    CONDITIONS

UNIT ID NUMBER      03
TEMP RANGE     32-572F
DIST RATE   4.5ML/MIN
SAMPLE         0000201
INITIAL HEAT      130W
5 MINUTE HEAT     220W
INCR FINAL HT     150W
EXPECTED LOSS     2.0%
END AT END POINT
CHAMBER   TEMP=17.40
CONDENSER TEMP=00.70
BAROMETER   = 746mmHg
TEMPERATURES ARE
CORRECTED TO 760mmHg
IBP LIMITS 5M TO 10M

DISTILLATION RESULTS
IBP  083.3F   6.3 MIN
 5ML 094.2F    58 SEC
10ML 103.1F   4.5ML/M
20ML 120.2F   4.6ML/M
30ML 145.7F   4.3ML/M
40ML 172.0F   4.4ML/M
50ML 202.8F   4.1ML/M
60ML 239.9F   4.2ML/M
70ML 280.5F   4.3ML/M
80ML 315.8F   4.3ML/M
90ML 356.5F   4.1ML/M
92.0ML 370.7F     FH
95.0ML 403.8F   767W
96.5ML 431.9F END PT
3.4MIN FROM FH TO EP
 97.0ML       RECOVERY
  0.9ML        RESIDUE
 97.9ML   TOT RECOVERY
 02.1ML           LOSS

TEMPERATURES VS
EVAPORATED SAMPLE
IBP          082.7F
 05ML        088.3F
 10ML        099.6F
 20ML        116.4F
 30ML        140.9F
 40ML        165.9F
 50ML        195.8F
 60ML        231.4F
 70ML        272.3F
 80ML        307.7F
 90ML        345.2F
 95ML        385.7F
 96.5ML      431.9F EP
  2.1ML       CORR LOSS
 97.9ML   CORR TOT REC
```

— Operator Signature
— Automatic update month, day, year, time
— Automatic unit identification preselected 0 to 31
— Operator selects: D86, D850, D1078 °F or °C
— Operator selects: 4, 5, 6, 9 ml/min.
— Operator test input: response to message request
— Operator selects: end point, dry point, % recovery, temperature
— Automatic update: receiving chamber, condenser, barometer
— Automatic: ASTM D86 test methods, groups 1,2,3,4
— Automatic: Initial Boiling Point (IBP) temperature, time from start
5 ml: temperature, time from IBP
10 ml to 92 ml volume, temperature rate
Final Heat (FH) watts
End Point (EP) volume, temperature
— Operator test input: response to message request
— Automatic total recovery, loss
— Automatic: ASTM D86 test groups 1, 2, 3, volume, temperature
— Automatic: correction to standard barometric pressure, ASTM D86 test groups 1, 2 3,

AUTOMATIC DISTILLATION APPARATUS

BACKGROUND OF THE INVENTION

The invention relates generally to distillation rate analysis and more particularly to automatic distillation analyzers for liquid hydrocarbons.

Over the years petroleum engineers have developed standards for commercial grade petroleum products. These standards are used by refineries in quality control to adjust process variables so that the resulting product more closely meets the prescribed standards. Wholesale purchasers of petroleum products such as gasoline and No. 2 fuel oil require the fuels they buy to meet these standards and manufacturers who design and build equipment which burns or otherwise uses these fuels and solvents rely on these standards.

Distillation profiles yield one of the major distinguishing features of motor gasolines, aviation gasolines, aviation turbine fuels, special boiling point spirits, naphthas, benzene, toluene, diesel fuel, white spirits, kerosenes, gas oils, distillate fuel oils, and similar petroleum products. For example, when gasoline is heated even slightly, the collected vapor can be condensed in an ice bath. Unlike water, for example, gasoline contains a diversified population of hydrocarbon molecules with different boiling points. Thus, in order to boil away or distill an entire sample of gasoline, the heat must be continually adjusted upwards and if one were to sense the vapor temperature above the boiling gasoline, it would reveal a characteristic increasing profile with respect to the evaporated percentage of the sample.

The test method for this type of distillation analysis has been prescribed by the American Society for Testing Materials (ASTM). Test designation D86, for example, prescribes a technique of performing laboratory distillation tests on gasoline. According to this test procedure, for example, a standard 125 millileter (ml) distillation flask with a 100 ml charge of gasoline are held to a beginning temperature between 55° and 65° F. The condenser bath must be 32° to 34° F. and the graduated cylinder or "graduate" for receiving the distillate must be between 55° and 65° throughout the test. The time from the first application of heat to the initial boiling point, i.e., first drop of distillate, must be between 5 and 10 minutes. The time from the initial boiling point to 5% (5 ml) recovered must be between 60 and 75 seconds. The uniform average rate of condensation from 5% recovered to 5 ml of the residue left in the flask must be 4 to 5 ml per minute (ml/min) and the time from the 5 ml residue to the end point must be in the range of 3 to 5 minutes. Vapor temperatures are read and recorded at the initial boiling point 5% recovered, 10% recovered and every 10 ml to 90% recovered, then 95% and at the end point (max. temp.). The percent recovered and residue are measured and recorded and percent loss is computed. The percent recovered is corrected to the prescribed percent evaporated by subtracting the loss percentage from the percent recovered. The thermometer reading at the prescribed evaporated percentages must then be determined and corrected for barometric pressure to represent the comparable reading at 760 millimeters (mm) pressure.

Because of the precise distillation rates required, this delicate procedure requires highly skilled laboratory technicians. Instrumentation has been developed which automatically adjusts the distillation flask heater in an attempt to stay within the prescribed distillation rate range. A travelling optical meniscus detector has been used before in this kind of apparatus to follow the liquid level in the receiving graduate. XY plotting strip chart recorders have been used to automatically record vapor pressure as the meniscus detector rises. These charts in and of themselves, however, do not yield the prescribed data without the barometric residue, and loss computations. Consequently, the temperature data must be read from the chart and recorded elsewhere for the prescribed evaporated percentages. This cumbersome recording process also applies to the time intervals for initial boiling point, 5% recovered and time from 5 ml residue to end point.

Even the automated D86 test for gasoline takes well over a half hour for each 100 ml sample not including whatever time is required for recomputation and recording of the variable parameters. Many of these instruments are installed at refineries where a variety of petroleum products are continuously produced. Thus, the plant engineers eagerly await the test results which may indicate that a process variable must be adjusted. In the meantime, unsaleable product may be produced. Accordingly, test errors or test results which must be scrapped because of erroneous procedure or recording techniques are very serious. Since the distillation rate test and recording requirements are complex, operator errors in the past have been frequent. Operators, being human, misrecord the sample identification number, neglect t precool the temperature sensor, forget to monitor or record the time from the initial boiling point to the 5% recovered mark, allow the condenser bath temperature to deviate from the norm during the test or fail to properly correct for loss in barometric pressure, etc.

To compound these difficulties, in prior instrumentation means for making the temperature sensor readings duplicate those of a laboratory thermometer standard have been lacking in accuracy. Moreover, the meniscus detector mechanism has heretofore been less precise than desired.

SUMMARY OF THE INVENTION

Accordingly, the general object of the invention is to simplify the task of automatic distillation analysis by programming the test parameters and automatically recording data in a manner that minimizes the need for operator interaction thus increasing the uniformity and accuracy of the test procedure.

These and other objects of the invention are achieved in a microprocessor controlled distillation analyzer for petroleum products which performs, computes, displays and records distillation rate data with automated precision. An interactive/keyboard display reports and records beginning test conditions and prompts user inputs to define desired parameters in accordance with laboratory standards. The control system implements three phases of distillation flask heater control. Heating before the initial boiling point is automatically controlled to specified wattage in two steps. Following the initial boiling point, the heater is controlled to keep the monitored distillation rate within a predetermined range. Following accumulation of a precalculated volume, the final heat is incremented to a programmed level. In one mode, the end point is automatically detected by software controlled monitoring the vapor temperature for a decline. Following measurement of the residue, the analyzer automatically recomputes vapor temperatures at a predetermined series of percentage volumes of evaporated sample. The microprocessor sounds an alarm to signal the approach of the end of the test requiring manual measurement of the flask residue or notification of the dry point. An infrared LED and photodiode actuated meniscus detector is driven by a stepping motor screw-drive mechanism actuated in fast, slow, up and down modes via the microcomputer to find and lock on the initial meniscus position and track the rising meniscus in the leading mode.

Vapor temperature is automatically corrected. The temperature lag characteristic of the laboratory thermometer standard is created by software. Internal diagnostic and timing mechanisms in software automatically abort the test under certain circumstances. Several normal test determination options are also available. Before the test begins, the operator can select test termination at a prescribed temperature, percent recovered, end point or dry point. However, the system is designed to preselect end point mode unless otherwise advised. Since the same station may perform repeated tests on the same product, a desirable feature of the system is that the entered test parameters during normal operation remain fixed until changed so that repeated tests can be made without "reprogramming" the instrument.

BRIEF DESCRIPTION OF THE DRAWING

FIG. 4 is a side view in elevation of the assembly of FIG. 3.

FIG. 21 is a pictorial representation of a typical printout.

This application also includes and incorporates by reference Appendices I and II filed with the original application. Appendix I is an annotated assembler listing of software instructions resident in the programmable read only memory of the CPU system of FIG. 14 in hexadecimal ("HEX") digits (i.e., base 16) as well as in assembly language of the instruction repertoire for the Intel MCS85 microcomputer system (8085 CPU). Appendix II is a ROM table in HEX code.

DESCRIPTION OF THE PREFERRED EMBODIMENTS

Figure 1:
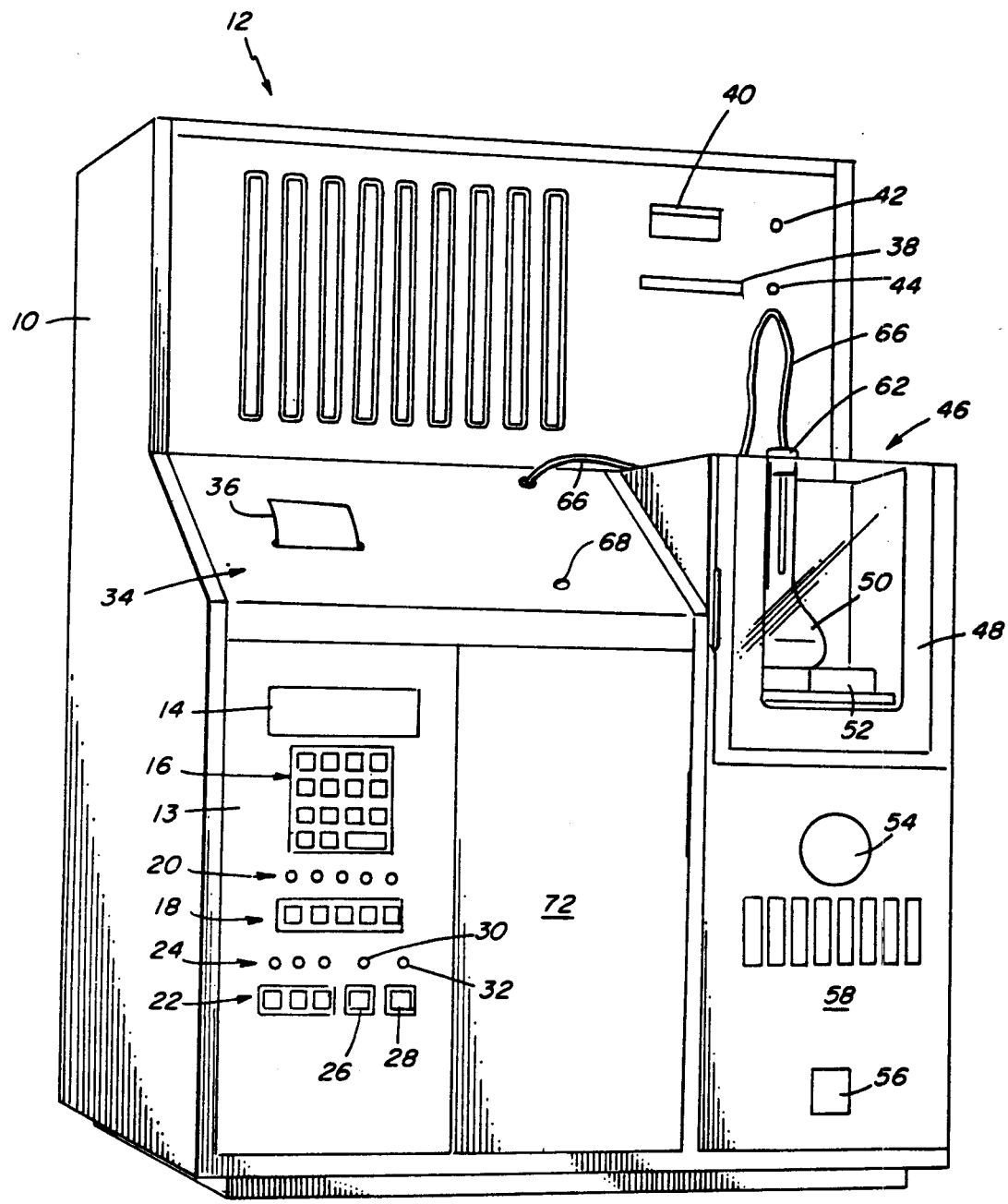
FIG. 1 is a pictorial front perspective view in elevation showing the exterior features of a preferred embodiment of the automatic distillation apparatus according to the invention.
Figure 2:
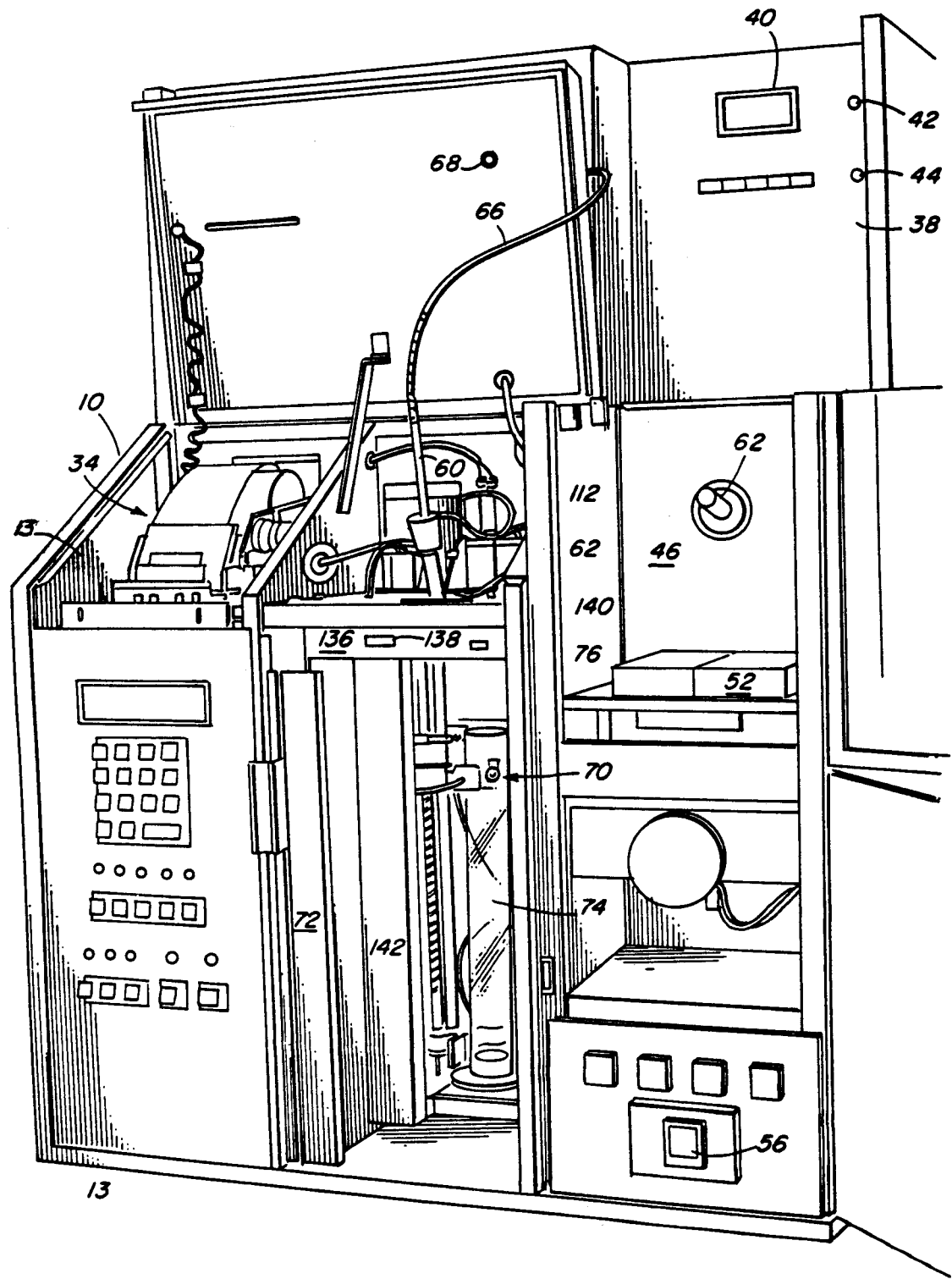
FIG. 2 is a similar view of the apparatus of FIG. 1 with the doors and access panels open.
Figure 5:
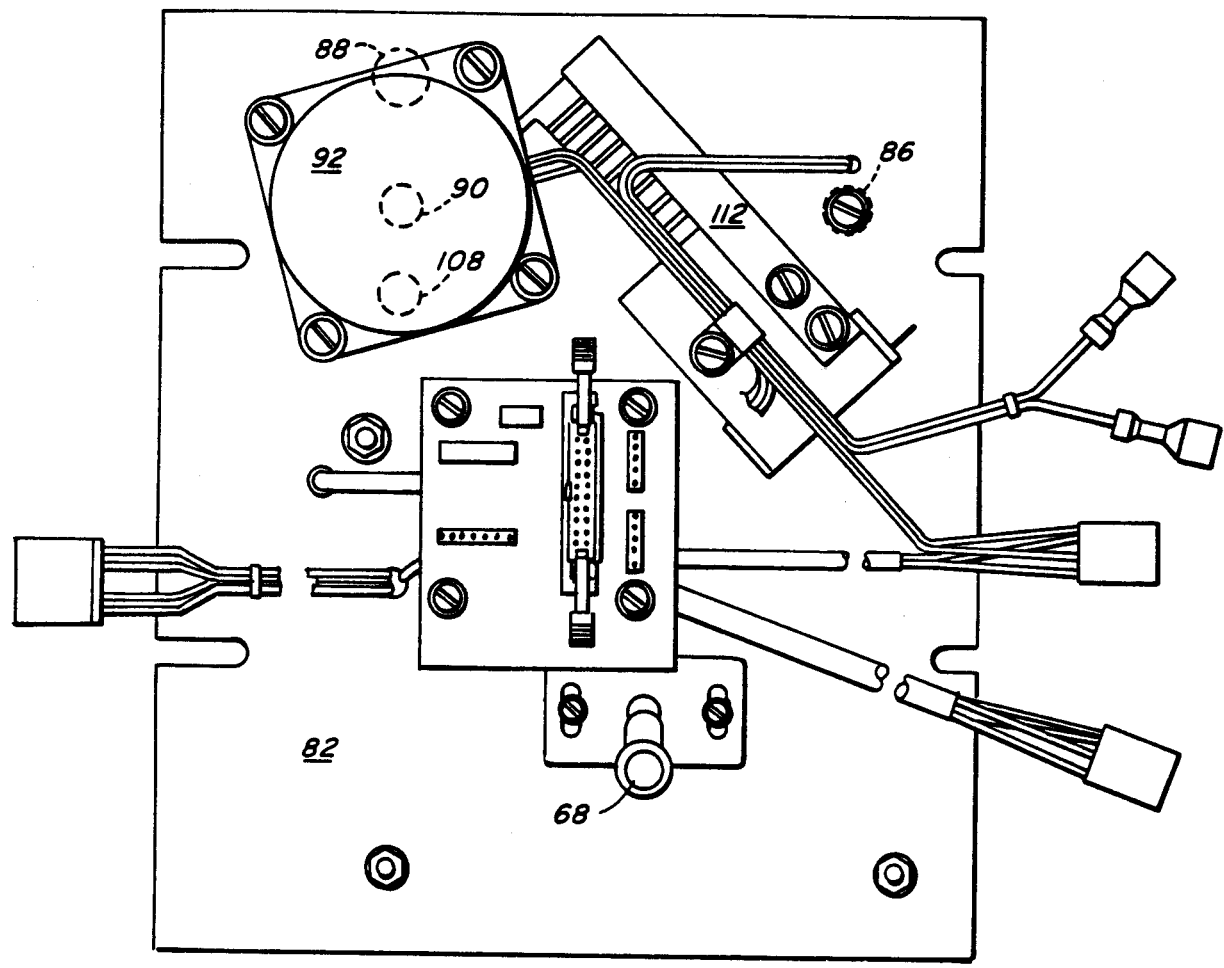
FIG. 5 is a top view of the assembly of FIG. 3 showing the stepper motor and graduate tilt solenoid.

The system described below was designed and constructed according to the invention to perform distillation tests according to the prescribed test methods in ASTM standards D86 Groups I-IV, for gasoline, diesel fuel, fuel oil and kerosene, for example, test D850 for benzene, for example, and D1078 for toluene, and equivalent European standards. The self-contained line-operated unit of FIGS. 1 and 2 is designed to be laboratory bench mounted at a suitable site at a petroleum refinery, for example. A typical refinery might have several of these units installed at different locations on the premises. A single free standing cabinet 10 houses all of the electronic and mechanical components of the distillation analyzer. A detailed description of the condenser bath and refrigeration package is omitted as these elements are conventional except as otherwise indicated below. The uppermost portion of the cabinet 10 houses a specially designed optional refrigeration package 12 (not shown) to accurately maintain the sub-ambient condenser and distillate chamber temperatures without additional space requirements. However, coolant available from an external source can be substituted. The front panel of the unit is equipped with a keyboard/display panel 13 having a 16 character alphanumeric LED display 14 associated with a parameter programming key pad 16. Below the key pad 16 are a series of five buttons 18 and respective LED indicator lights 20 designating the type of ASTM test procedure chosen by the operator. One of the indicators 20 above the respective test button remains lighted during the test. At the bottom of the keyboard/display panel 13, a series of three distillation rate buttons 22 and associated indicator lights 24 are provided for nominal distillation rates of 4,5,6 and 9 ml/min. Adjacent to the rate buttons are a start button 26 and a dry point button 28. Directly above the start and dry point buttons are a pair of indicator lights 30 and 32 labelled "meniscus" and "recovery". Directly above the keyboard/display panel 13 is a solid state self-contained printer module 34 (TELPAR, INC MODEL PL-20E) capable of printing lines up to 20 alphanumeric characters on printing tape 36. A single roll of printer tape has a typical capacity of up to 300 tests.

At the upper right hand portion of the front of the cabinet 10 are a series of five "set point" switches 38 with mechanical indicators for establishing the nominal range for the liquid in the condenser bath. Above the set point switches 38 is a numerical LED display 40 indicating the actual temperature of the condenser bath. LED indicators 42 and 44 indicate temperature control of the condenser and receiving chamber.

A sealed distillation flask compartment 46 with a tempered glass door 48 houses the standard side arm distillation flask 50. Flask 50 is supported by a distillation board 52 mounted on an elevation jack to adjust the height of the flask by means of knob 54, which, along with ON/OFF power switch 56, protrudes through the AC circuitry access door 58 below the distillation compartment, which is equipped with air jets for rapid cooldown. An elongated resistive temperature detector (RTD) 60 extends through a stopper 62 in the top opening in the neck of the flask 50. The RTD stem 64 extending above the stopper 62 is connected to the RTD electrical lead 66. In FIG. 1, the flask 50 and RTD 60 are shown as they would appear during a test. Before the test procedure begins, the RTD 60 is removed from the flask 50 and the end of the RTD 60 is inserted, with the lead and stopper attached to it, into RTD cooling port 68 which has an exterior opening above and extending into the distillate receiving chamber 70, as shown in FIG. 2. When in operation, chamber 70 is sealed by retractable door 72 which slides into a pocket between the chamber 70 and the panel 13 for access. A removable graduated cylinder or graduate 74 is placed inside the receiving chamber 70 with its opened upper end beneath the exiting lower end 76 of the conventional polished U-tube (not shown) which leads from the side arm of the standard flask 50 through the condenser bath (not shown) into the receiving chamber 70. The liquid distillate condensed from the petroleum product vapors drips from the end 76 to the U-tube into the graduate 74, as diagrammed in FIG. 8.

The receiving chamber mechanism shown pictorially in FIG. 2 and in detail isometric views in FIGS. 3–6D monitors the accumulation of distillate in the graduate 74 during a distillation test.

Figures 1, 17:
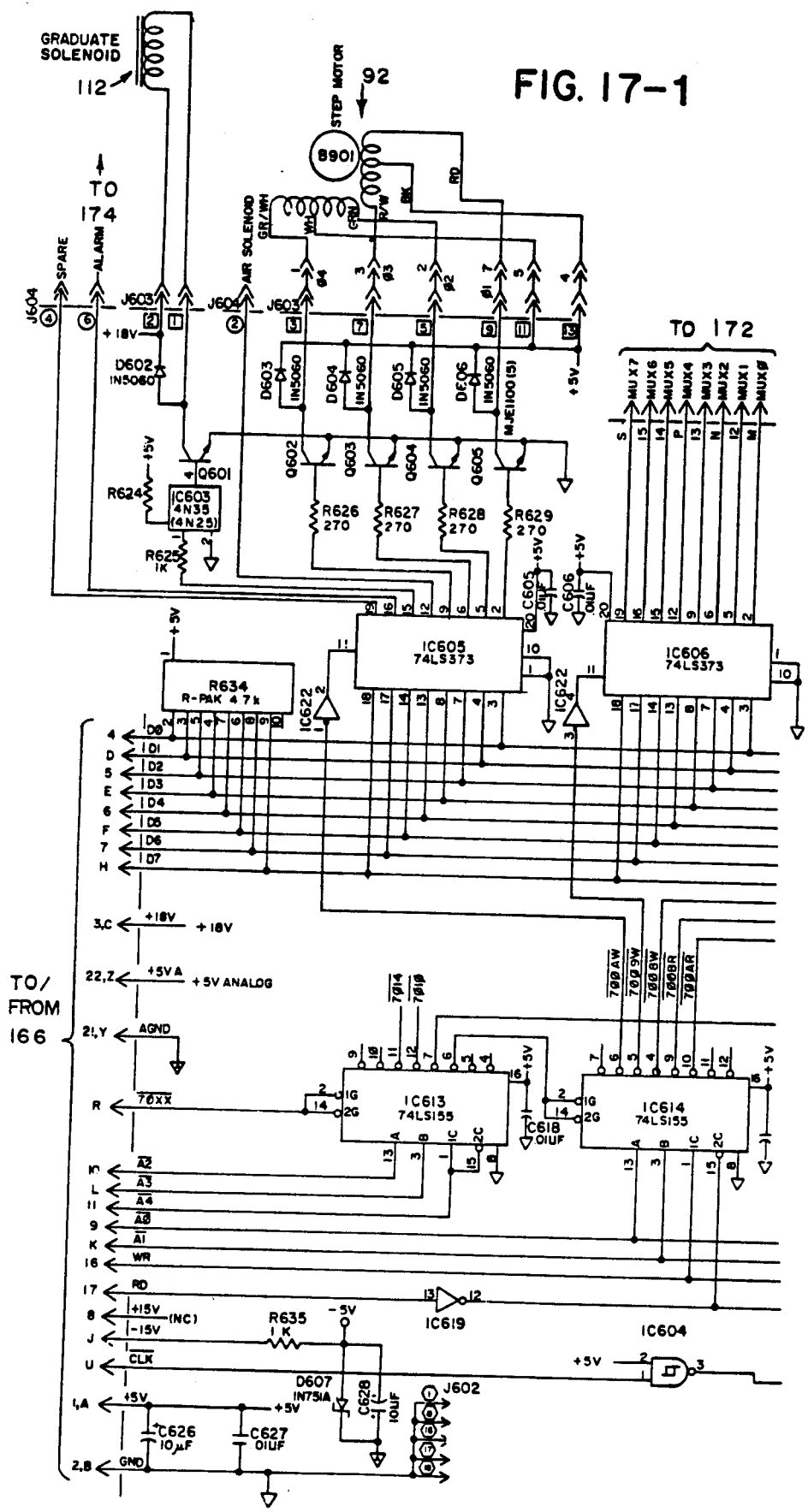
FIG. 17 is a schematic diagram of a digital I/O circuit of FIG. 10.
Figures 2, 17:
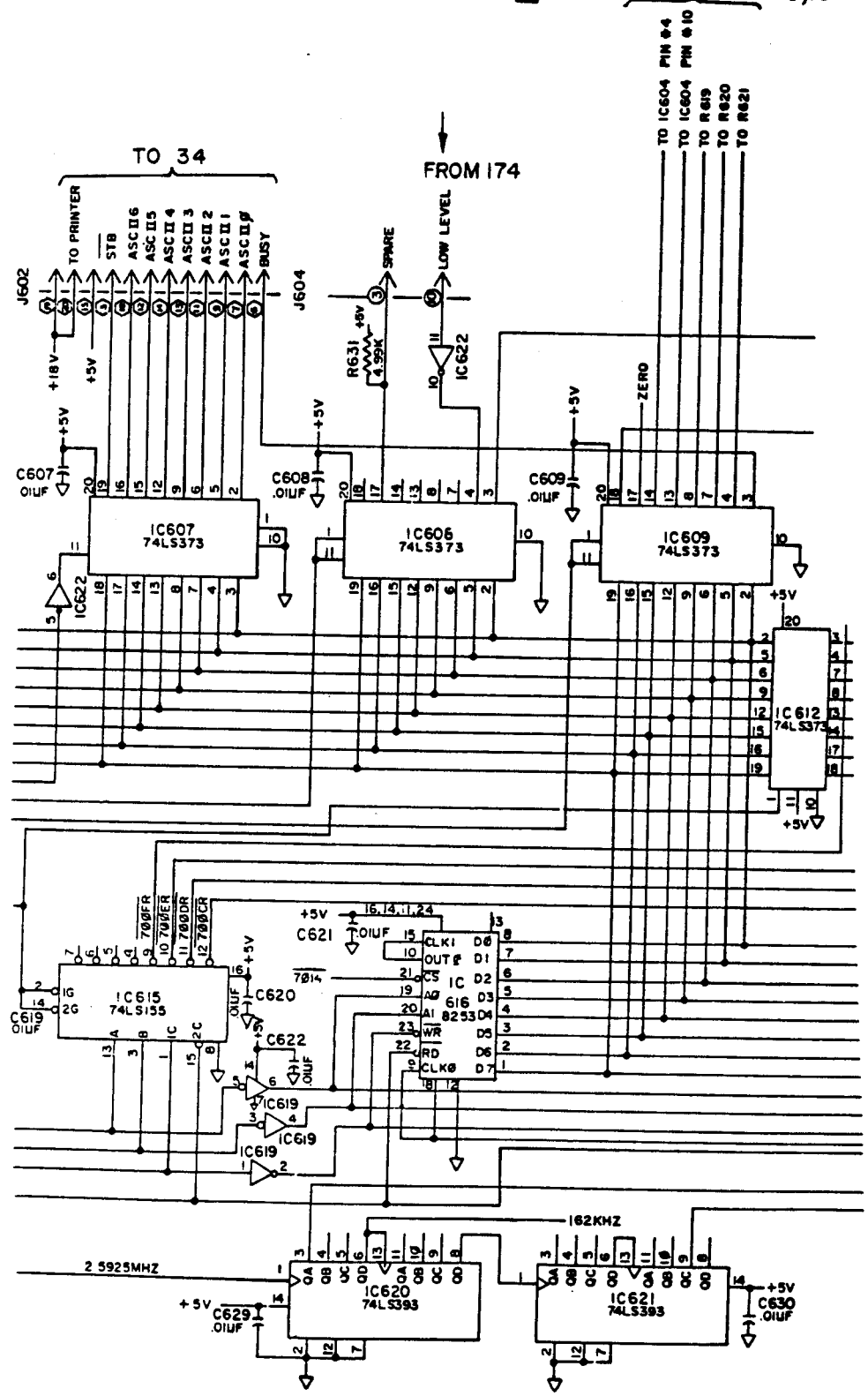
Figures 3, 17:
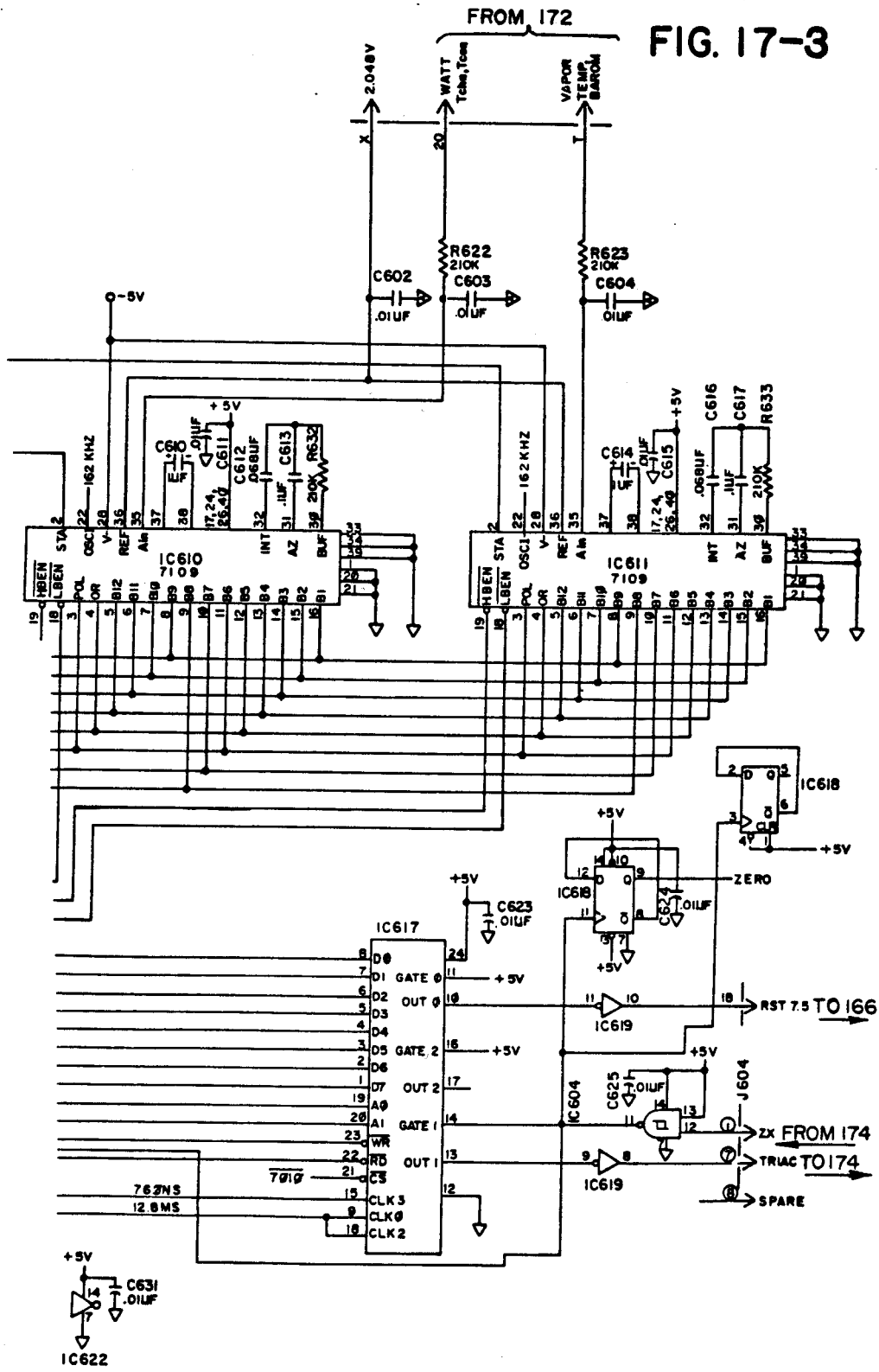
FIG. 3 is a detail front view in elevation of the receiving chamber mechanism assembly of the apparatus of FIG. 2.

The receiving chamber mechanism assembly 80 shown in FIGS. 3 and 4 includes flat rectangular parallel plates 82 and 84, respectively affixed to opposite ends of parallel right and left guide rods 86 and 88 as viewed from the front of the unit. The graduate 74 stands on a central pedestal on the bottom plate 84. A drive screw 90 extends parallel to the guide rods 86 and 88 in the receiving chamber 70. The lower end of the drive screw 90 is journalled in the lower plate 84. The upper end of screw 90 is coupled to stepper motor 92 mounted on top of the upper plate 82. A parallel angle bracket 94 at the front left of the receiving chamber 70 is affixed at its upper and lower ends to the upper and lower plates 82 and 84 and extends parallel to the guide rods 86 and 88.

Figure 6A:
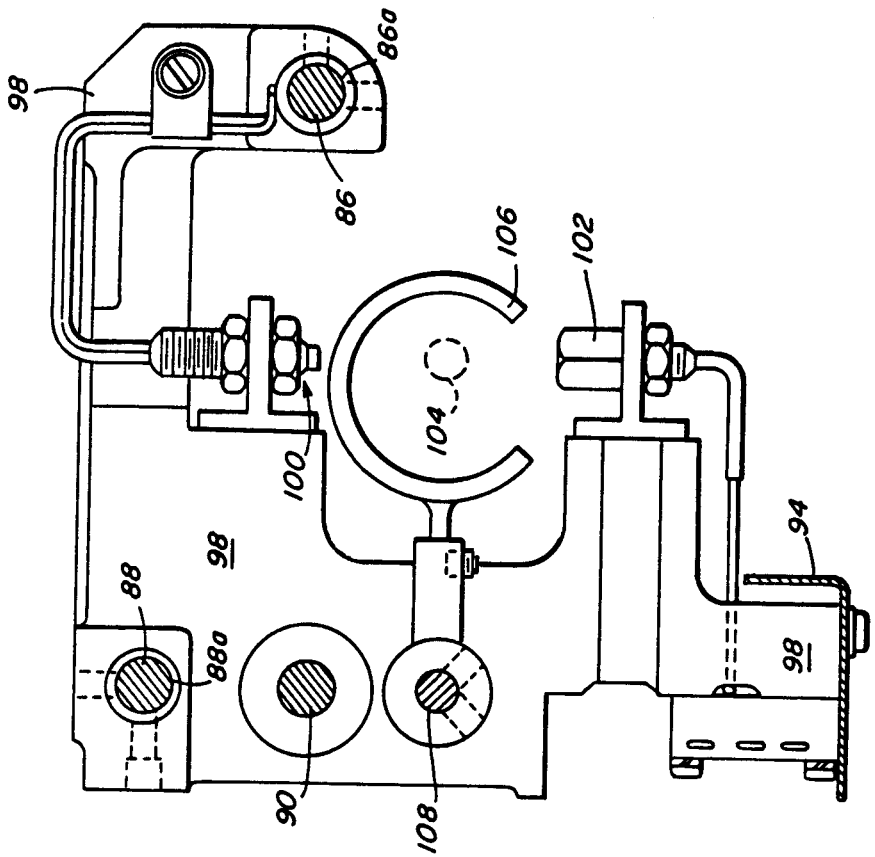
FIGS. 6A, 6B, 6C and 6D are detail views of portions of the apparatus of FIGS. 3 and 5 taken along lines A—A, B—B C—C and D—D, respectively.

A drop detector 96 shown in more detail in FIG. 6A includes a generally U-shaped frame 98 affixed by means of set screws to the guide rods 86 and 88 as well as to the angle bracket 94. As shown in FIGS. 3 and 4 elongated bushings 86a and 88a received over the upper ends of the guide rods are used as an aide in defining the height of the drop detector 96. Frame 98 carries an infrared light source 100 and a phototransistor 102 spaced from and horizontally aligned with the infrared light source 100 such that the center line between the light source and phototransistor passes approximately through the center of the graduate. The infrared beam is momentarily interrupted by the first drop of distillate 104.

The graduate tilt collar 106 arranged to be horizontally disposed around the graduate 74 with sufficient clearance for installing the graduate, is affixed to the lower end of drive shaft 108 journalled through the upper plate 82. The upper end of drive shaft 108 extends above the top plate 82 and is connected through the link 110 to a graduate tilt solenoid 112 mounted on top of the upper plate 82. Actuation of the solenoid 112 results in pivoting of the drive shaft 100 about its axis by several degrees to tilt the graduate 74 after detection of the first drop so that subsequent drops of distillate run down the inside of the graduate instead of splashing on the meniscus.

Figure 6B:
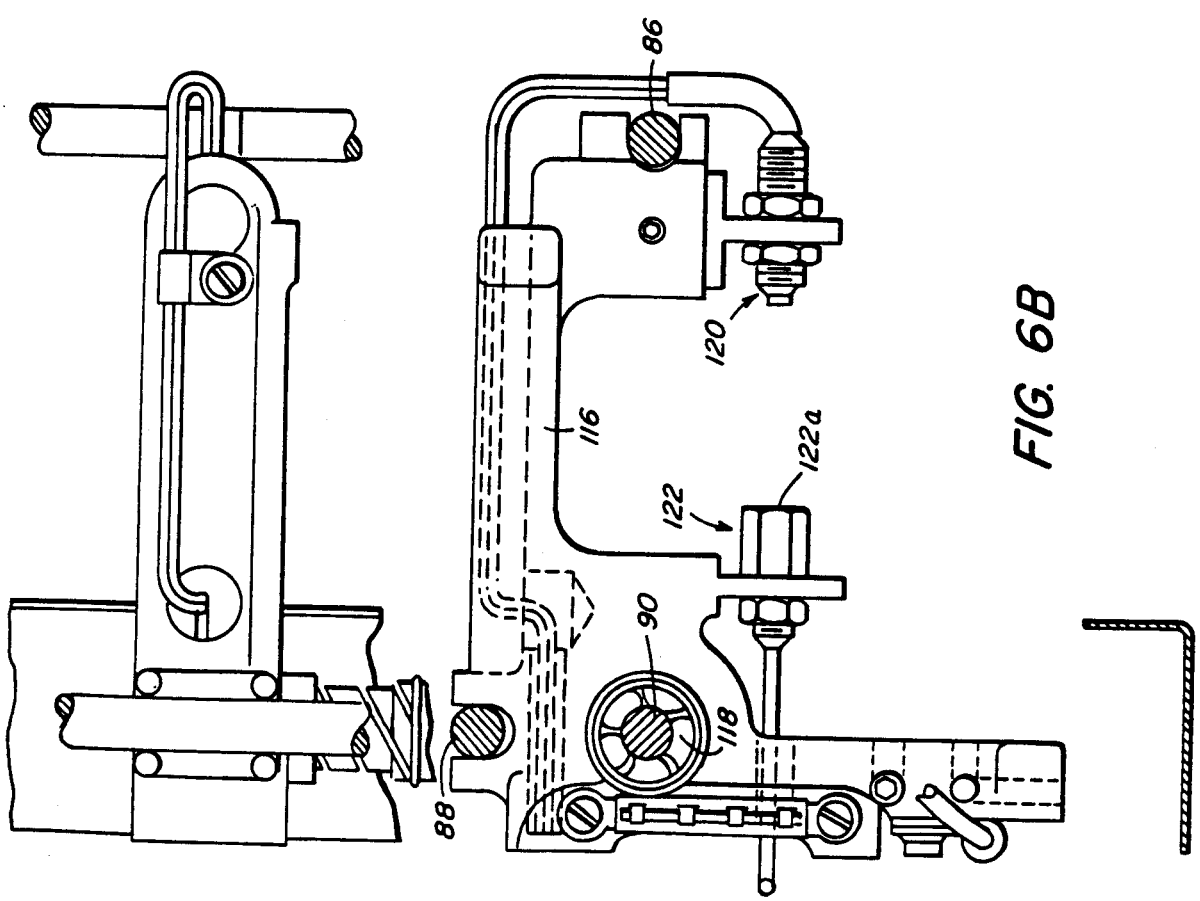
Figure 6C:
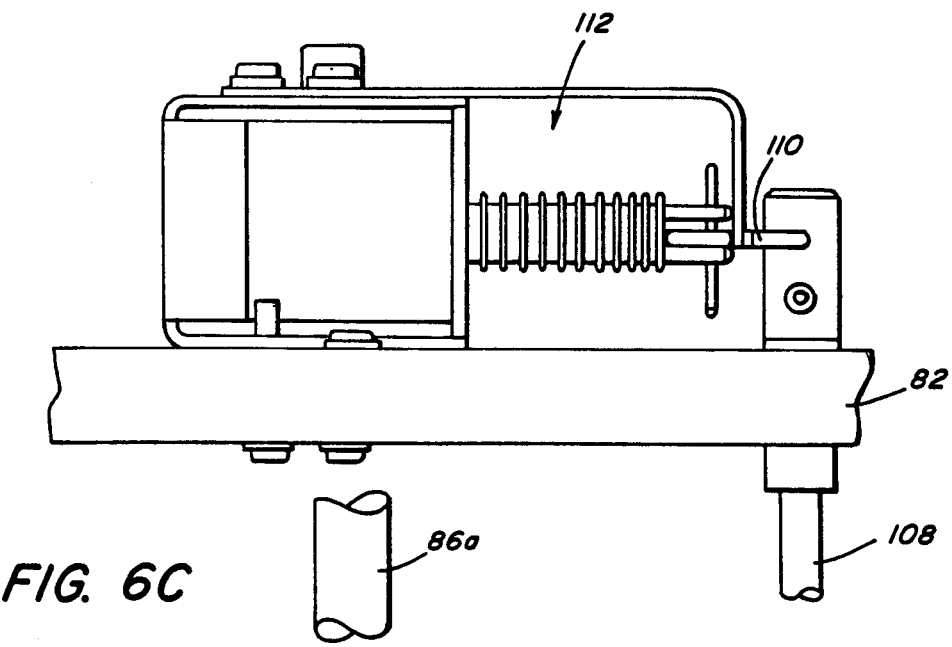
Figure 6F:
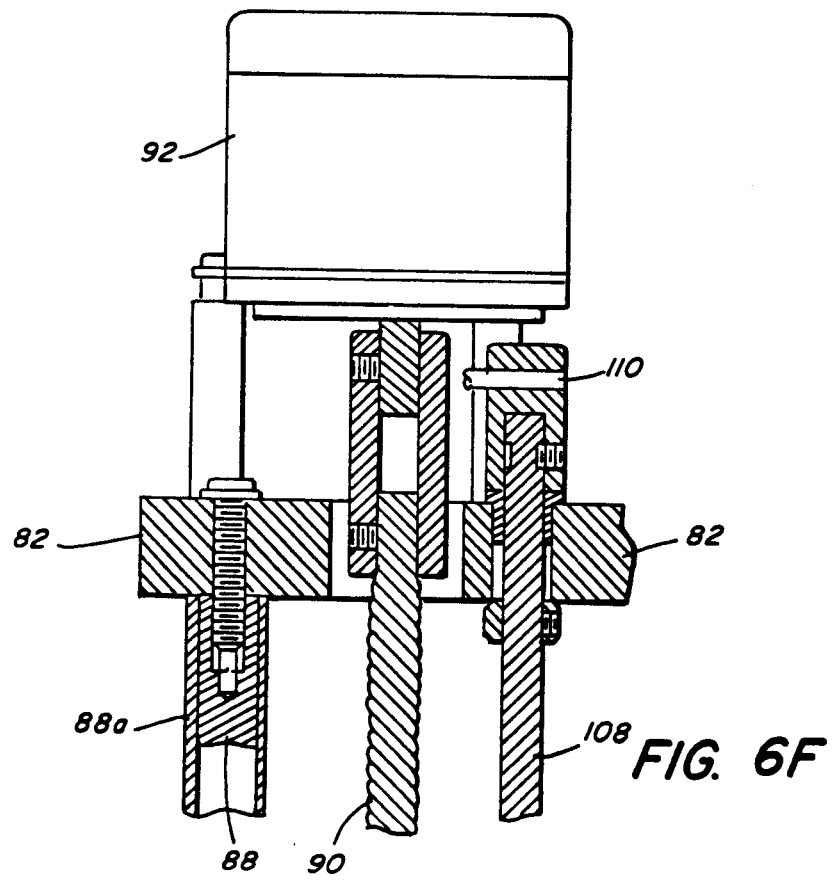

The meniscus detector 114 shown in more detail in FIG. 6B includes a generally U-shaped carriage 116 slidably mounted on the guide rods 86 and 88 for vertical translation. Screw 90 is drivingly engaged by sleeve gear 118 journalled in the carriage 116. The carriage carries an IR light source 120 and a phototransistor assembly 122 horizontally aligned and spaced from the IR light source 120. The phototransistor itself is aligned behind a horizontal slit 122A formed transversely across the center line of the light beam. The center line of the meniscus detector light beam is at right angles with respect to the center line of the drop detector. A coiled cable 124 carrying the leads from the light source 120 and phototransistor 122 is carried on spindle 126 parallel to the drive screw 90 affixed to the carriage 116. The meniscus detector 114 is designed to travel between the bottom plate 84 and the drop detector 96. The excursion limits are defined by upper limit switch 128 connected to the angle bracket 94 at the location of the drop detector and lower limit switch 130 mounted on the bottom plate 84.

The top plate 82 also supports an electrical connector assembly 132 to which the cable 124 is connected. The apertured RTD cooling well 134 is angled through the upper plate 82 into the interior of the receiving chamber 70. The RTD sensor 60 is inserted into the well 134 via cooling port 68 such that the distal end of the RTD sensor is housed in the apertured lower end of the cooling well 134 as shown in FIGS. 3 and 4. A U-shaped bracket 136 is bolted below the front edge of the top plate 82 and carries a magnetic door closer 138 and a door limit switch 140 which signals when the door is open.

Figure 7:
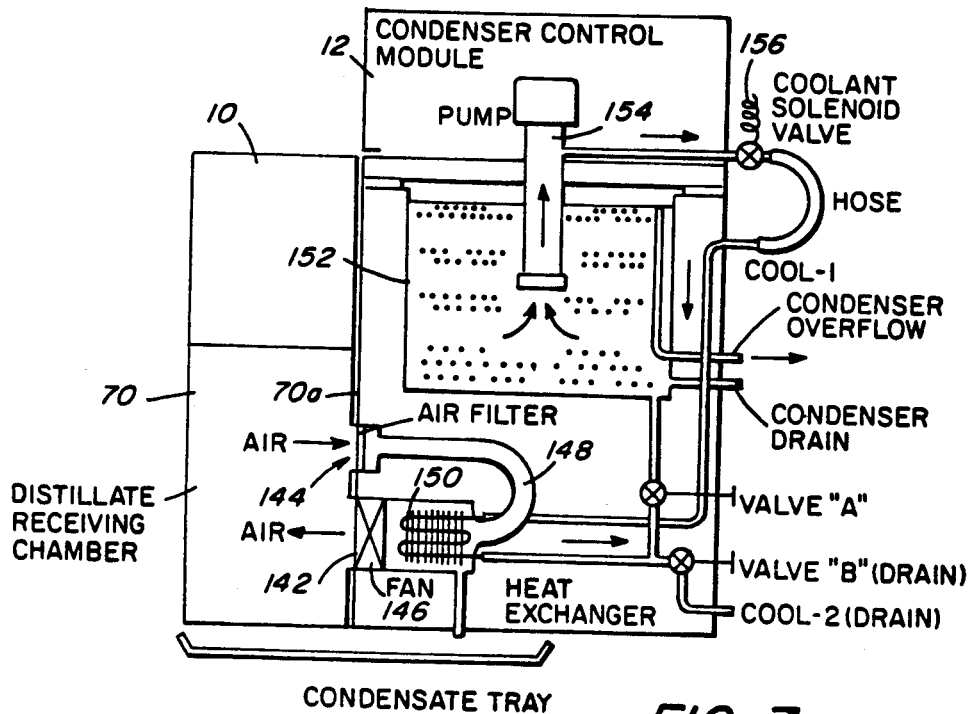
FIG. 7 is a schematic flow diagram of the condenser liquid illustrating the condenser bath and the cooling system for the distillate receiving chamber.
Figure 9:
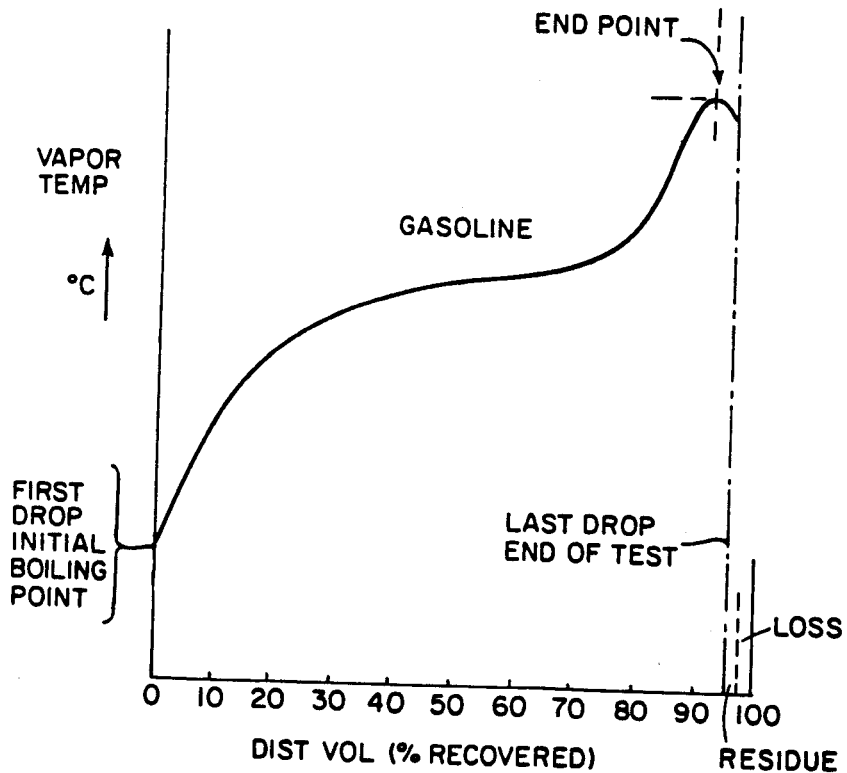
FIG. 9 is a graph illustrating an idealized representative curve of gasoline vapor temperature versus distillate volume as a percentage of the original sample volume.

As shown in FIGS. 2 and 7, the back wall 70A of the receiving chamber 70 has a lower circular air supply vent 142 and an upper circular air exhaust vent 144. Fan 146 located in the air supply vent 142 draws air through the exhaust vent 144 via duct 148 through a heat exchanger 150 supplied with coolant from the condenser bath 152. A recirculating liquid pump 154 circulates a condenser bath liquid, typically water with antifreeze added to it, via a thermostatically controlled coolant solenoid valve 156. The door switch 140 (FIGS. 2 and 4) is connected to energize fan 146 when the receiving chamber door is closed as in FIG. 1. The desired temperature is maintained by controlling the flow of coolant through the heat exchanger with the solenoid valve 156.

Figure 8:
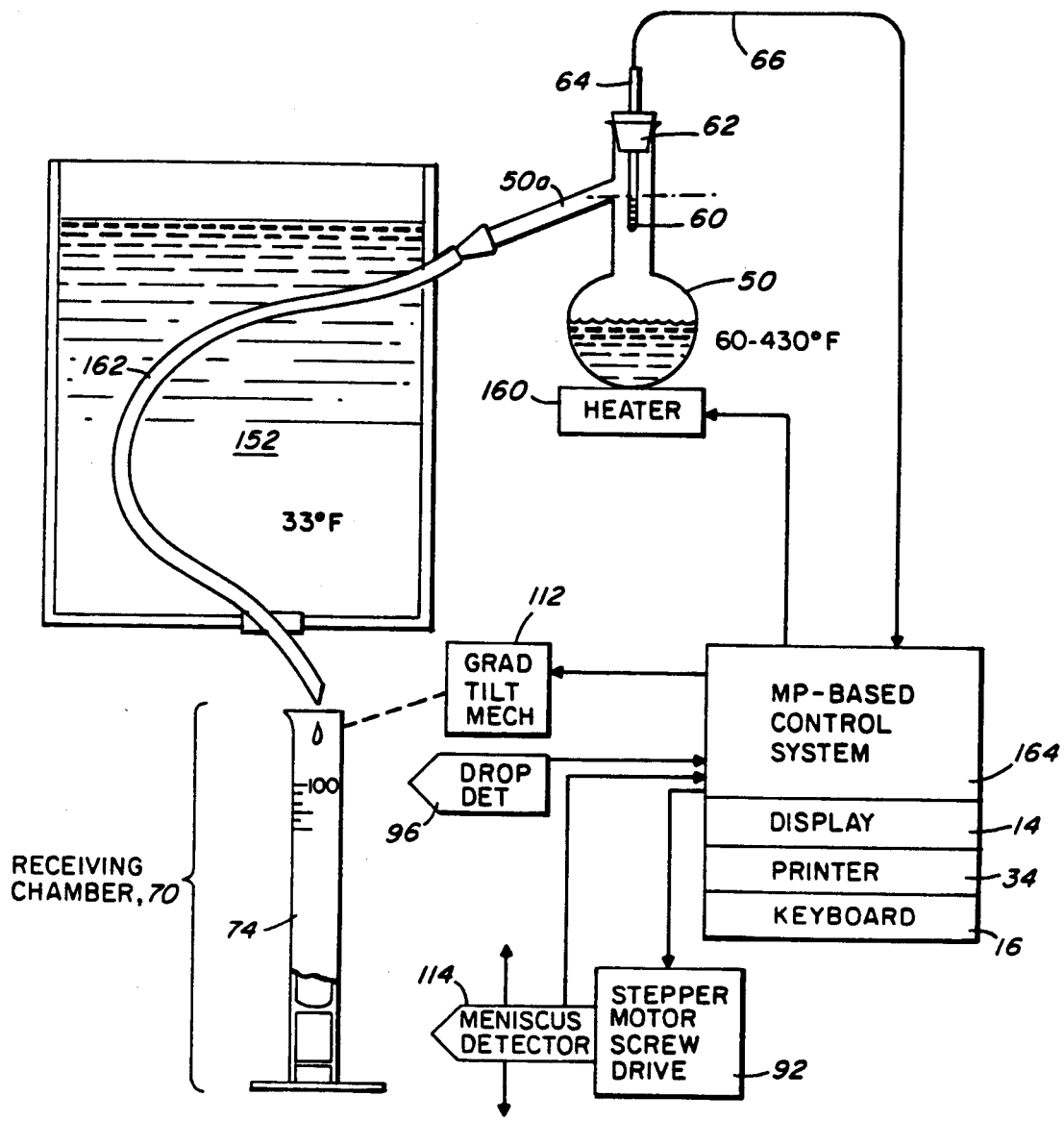
FIG. 8 is a system functional block diagram.

FIG. 8 provides a functional overview of the operation of the automatic distillation analyzer according to the invention. The removable distillation flask 50 is heated by means of 1000 watts low mass plug-in electrical heating element 160 located beneath the distillation board 52 of FIG. 1. The side arm 50a extends through a snugly fitting stopper into conventional polished U-tube 162 which passes downward through the condenser bath 152. The bath is thermostatically controlled to within a degree of 33° F. by means of refrigeration and heating coils (not shown).

Figure 10:
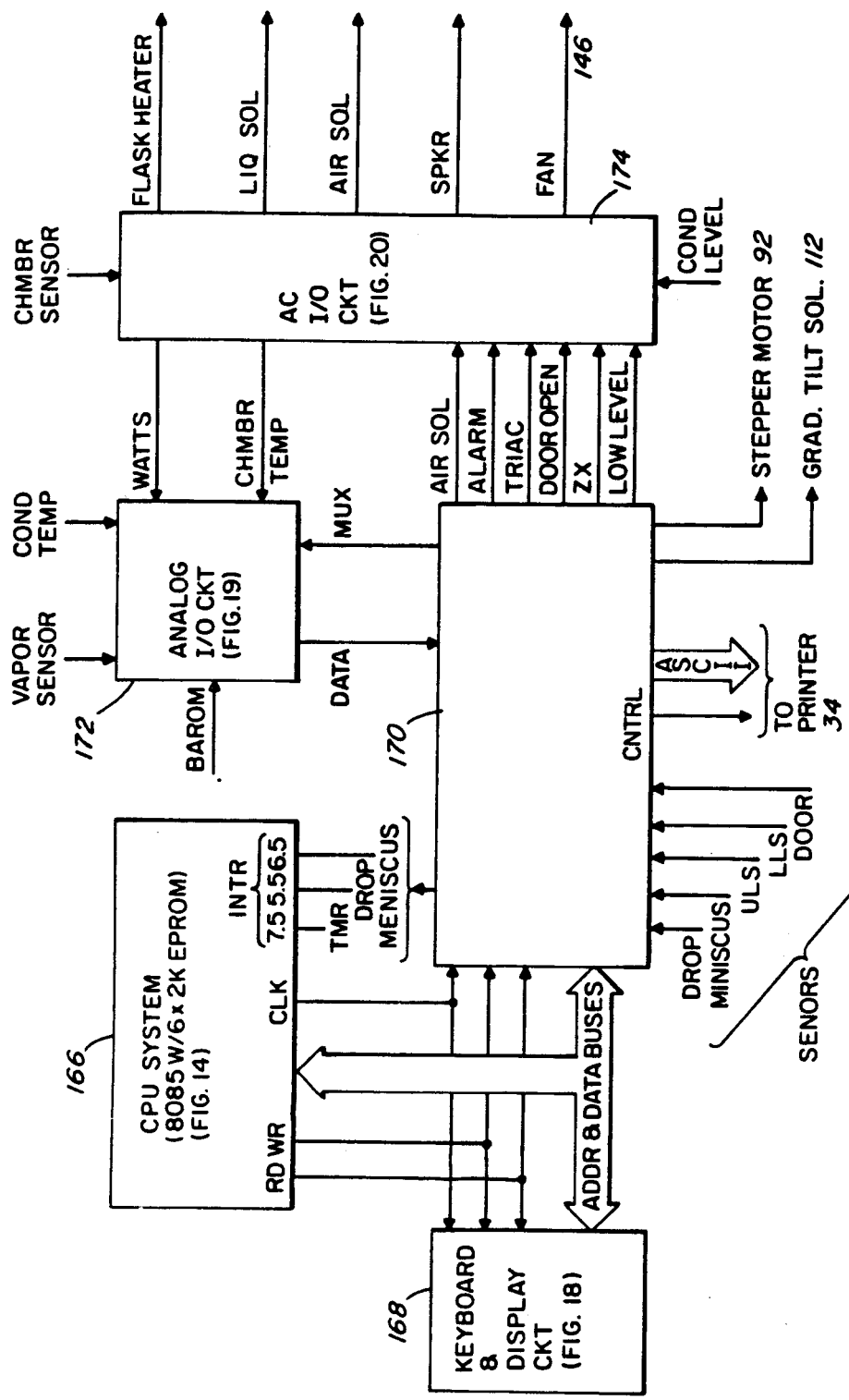
FIG. 10 is a block diagram of the electronics for the microprocessor based control system of FIG. 8.
Figure 11:
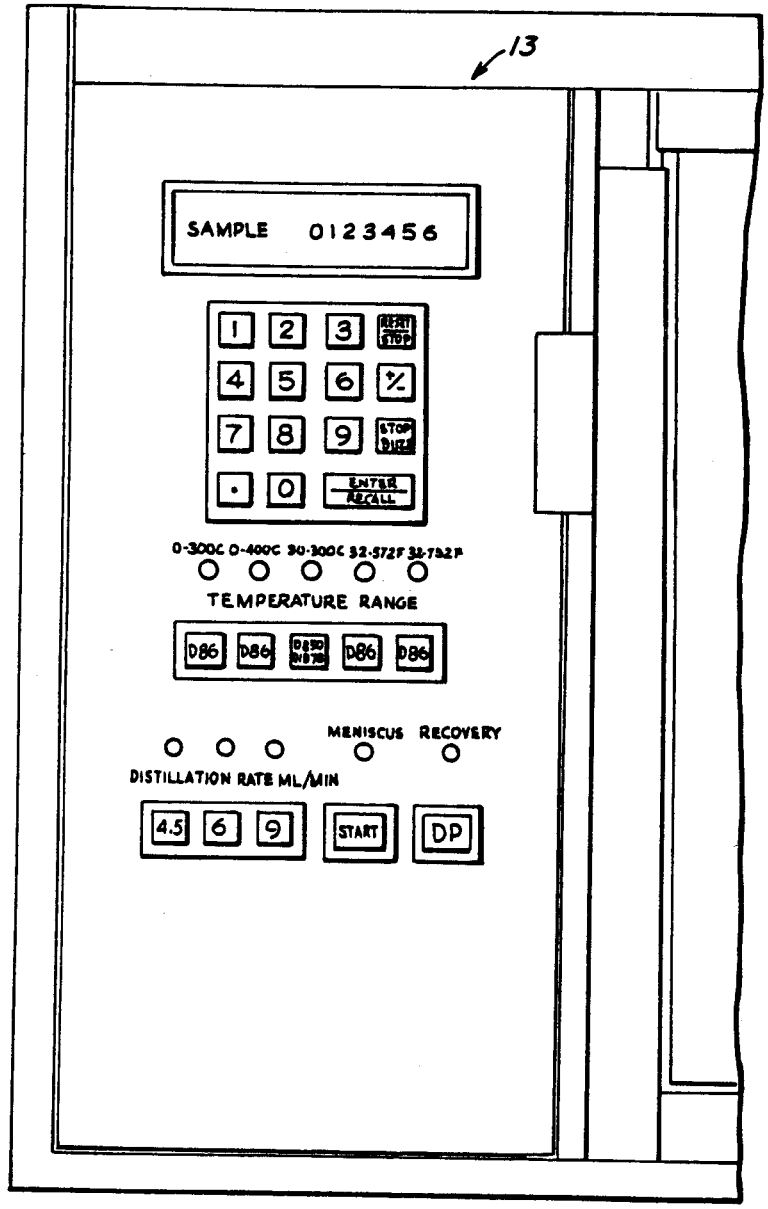
FIG. 11 is a front view of the keyboard/display panel of the apparatus of FIG. 1.

A microprocessor based control system 164 with associated display, printer and keyboard electronics receives inputs from the various sensors including the RTD sensor 60, drop detector 96 and meniscus detector 114. The control system enters and displays parameters and test data and actuates the various mechanical and temperature control devices such as the graduate tilt solenoid 112 and stepper motor 92. The organization of the electronics for the control system 164 is shown in FIG. 10. Software instructions are carried out by a central processing unit (CPU) system 166 based on the Intel 8085 single chip microprocessor and 12 kilobyte electronically programmable read only memories (EPROM). The functional blocks of FIG. 10 are organized to correspond one-for-one with printed circuit boards (PCB's) of the same description in the Figures indicated in the boxes of FIG. 10. By means of a multiplexed data bus and address bus system, the CPU board 166 controls and receives inputs from a keyboard and display PCB 168 and a digital I/O PCB 170 which serves to interface the computer with an analog I/O PCB 172 and an AC I/O PCB 174. As indicated in FIG. 10, the prioritized interrupt request system characteristic of the 8085 microprocessor is employed as the input mechanism for the meniscus and drop detectors as well as for an independent timer contained in the digital I/O circuit. The I/O circuit itself receives digital signals from the drop and meniscus detectors as well as the upper and lower limit switches and the door switch. The I/O circuit also provides outputs in ASCII code to solid state tape printer 34. Digital control signals from the digital I/O circuit 170 based on instructions from the CPU 166 control the stepper motor 92 and tilt solenoid 112. Heating power is controlled from the digital I/O PCB 170 via the AC I/O PCB 174 along with the audible alarm and fan 146. The analog I/O PCB 172 is used primarily to multiplex analog variables to a single analog to digital converter in the digital I/O PCB 170.

Figure 12:
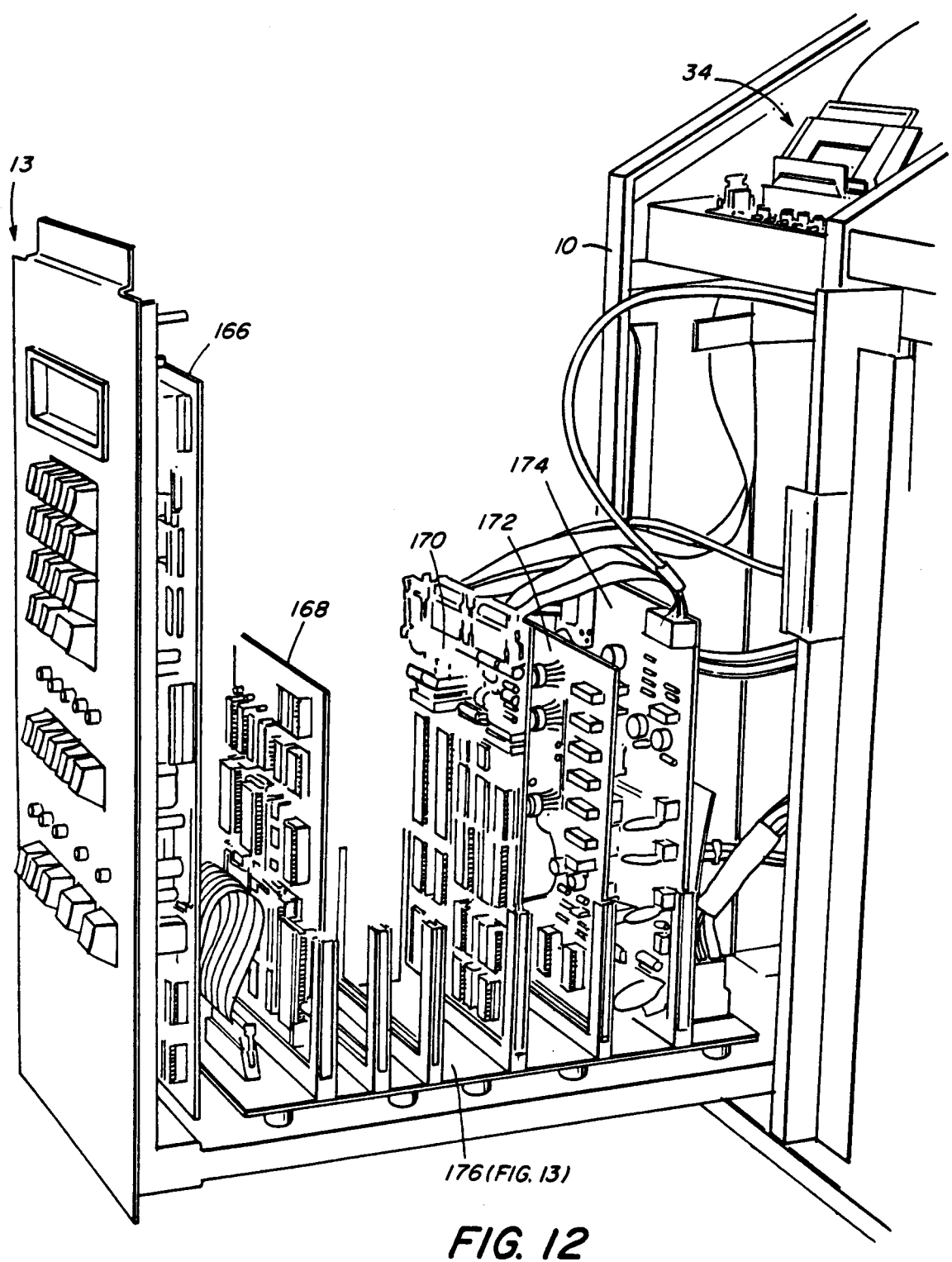
FIG. 12 is a perspective view of the electronics drawer with plural edge connected printed circuit boards carrying the electronics of FIG. 10.

As shown in FIG. 12, the PCB's 168, 170, 172 and 174 are conveniently mounted on a so called mother board 176 or backplane connector mounted in a slide-out drawer, the front of which comprises the keyboard/display panel 13. The keyboard/display PCB 166 is connected to the back of the display panel 13.

Figures 1, 13:
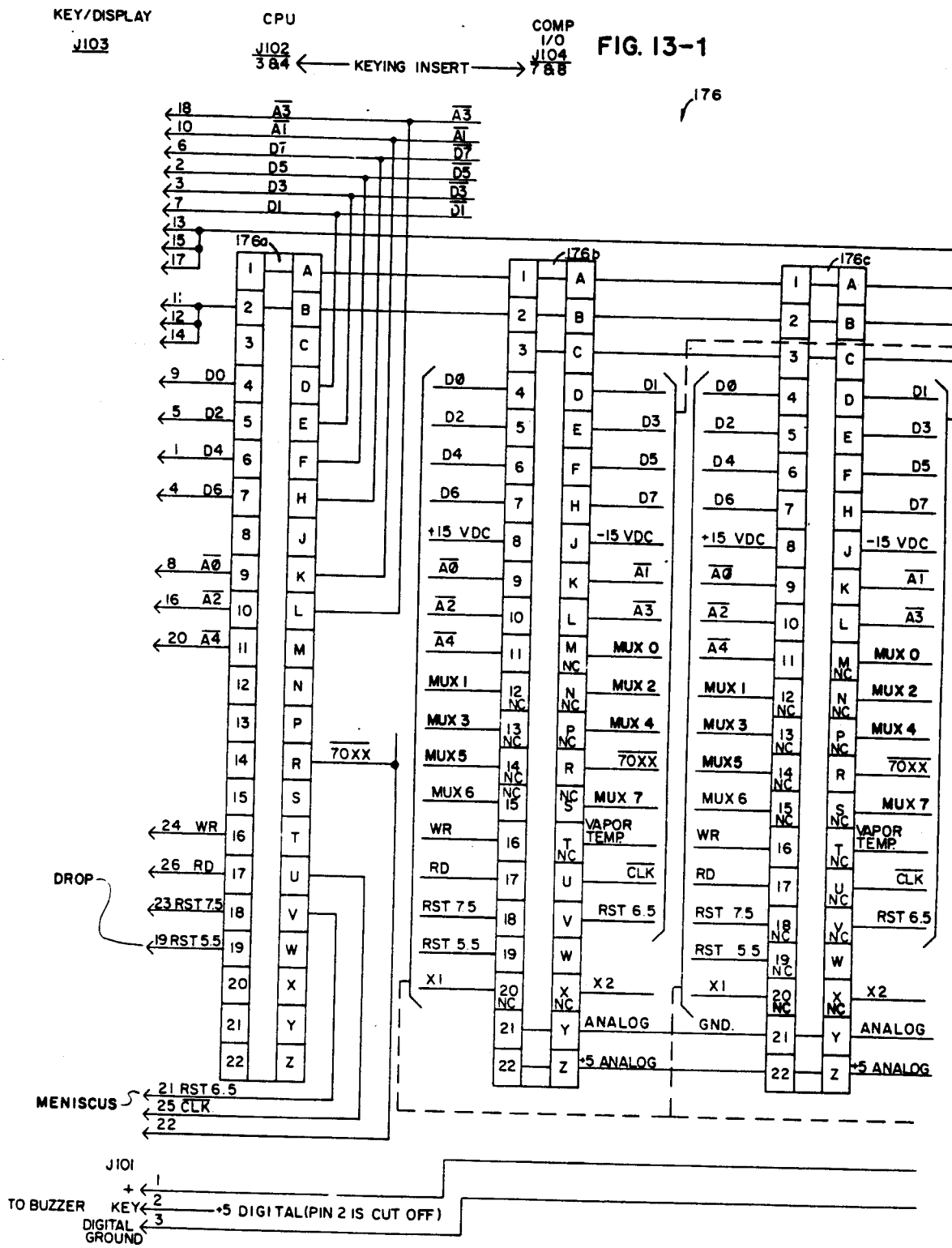
FIG. 13 is a schematic diagram of the mother printed circuit board (backplane connector) of FIG. 12.
Figures 2, 13:
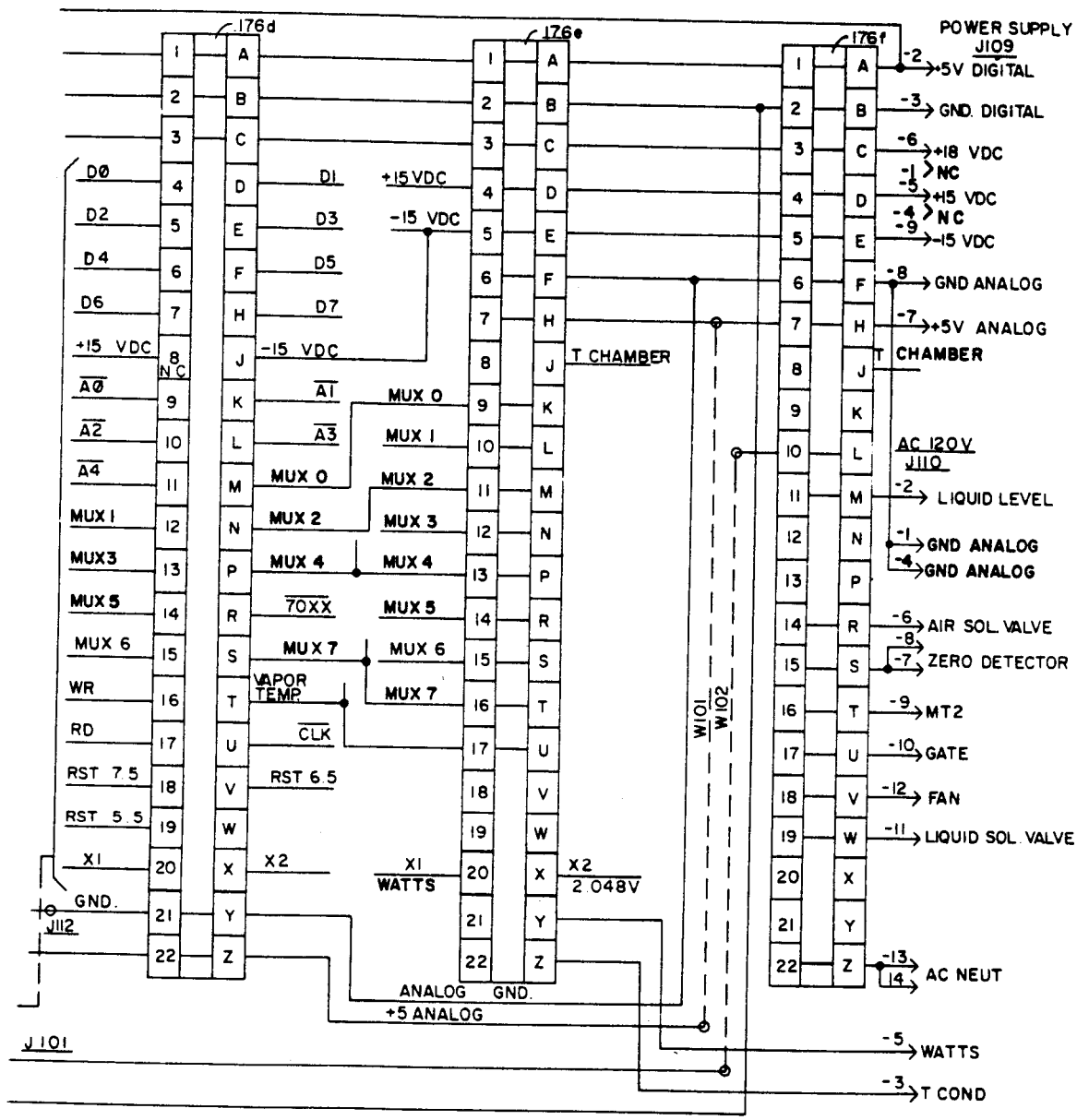

The edge connector terminal assignments of the mother board 176 are disclosed in FIG. 13. Edge connector 176a mates with the edge connector on the CPU PCB 168. The edge connector 176b is designed to mate with an optional computer interface board (not shown) known to the trade as an RS 232 IO in order to transmit data directly to the user's computer system. Edge connector 176c is designed to receive an optional XY plotter or recorder (not shown) for providing a stripchart graph of vapor temperature versus recovered volume. The digital I/O PCB 170 is received in edge connector 176d and the analog and AC control I/O boards 172 and 174 are received in edge connectors 176e and f of the mother board 176, respectively.

Figures 1, 14:
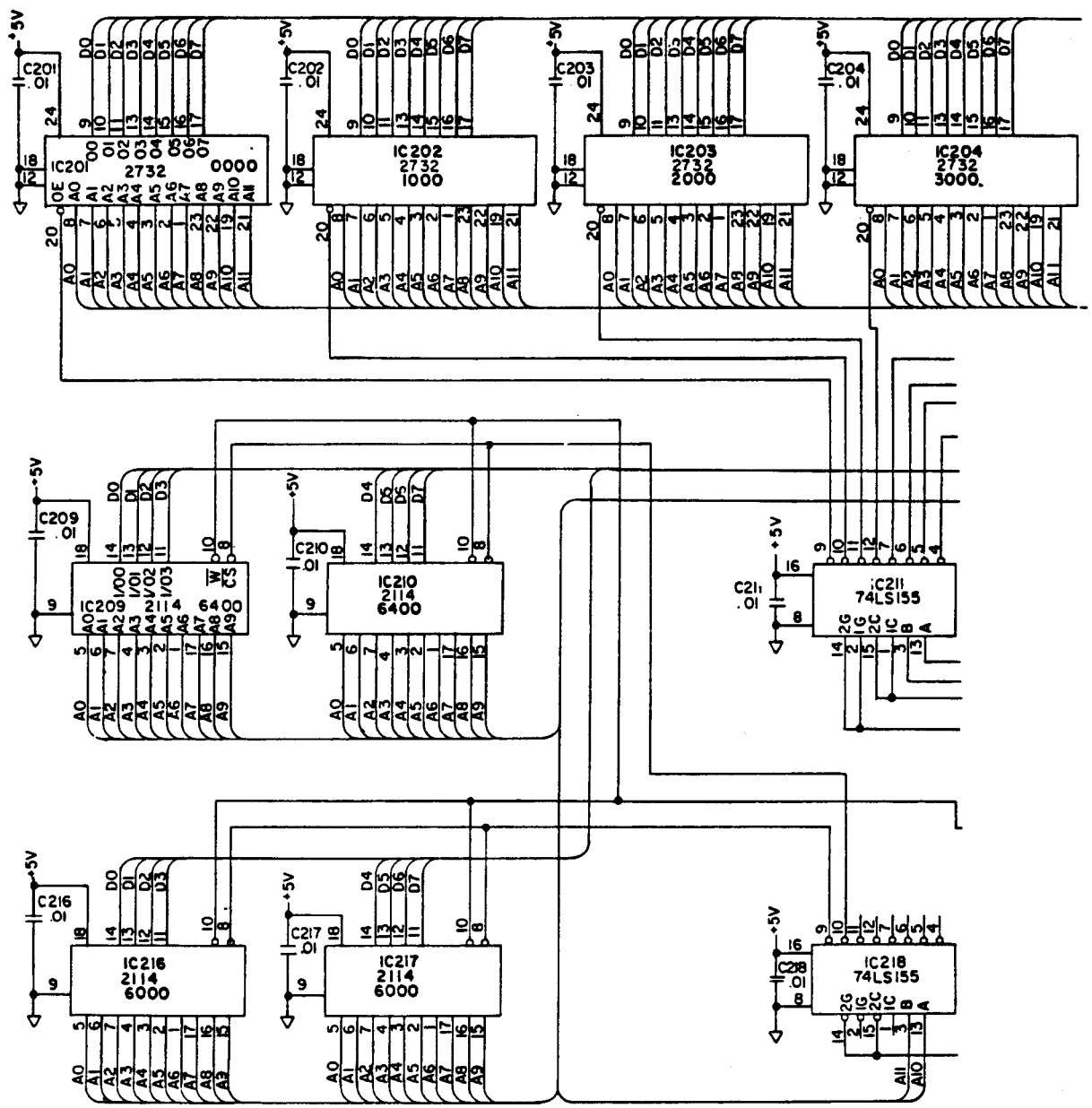
FIG. 14 is a schematic diagram of the CPU system of FIG. 10.
Figures 2, 14:
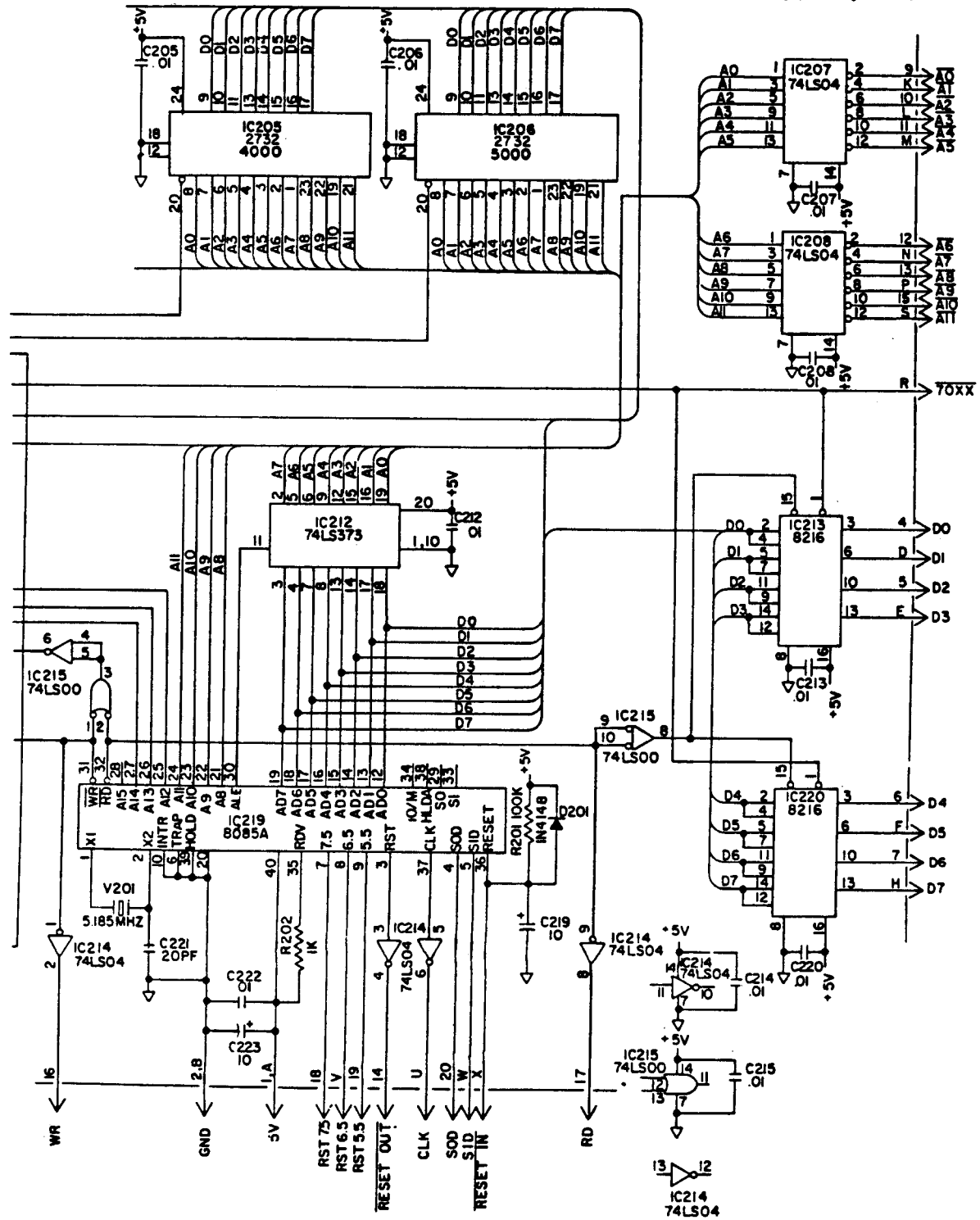
Figure 15:
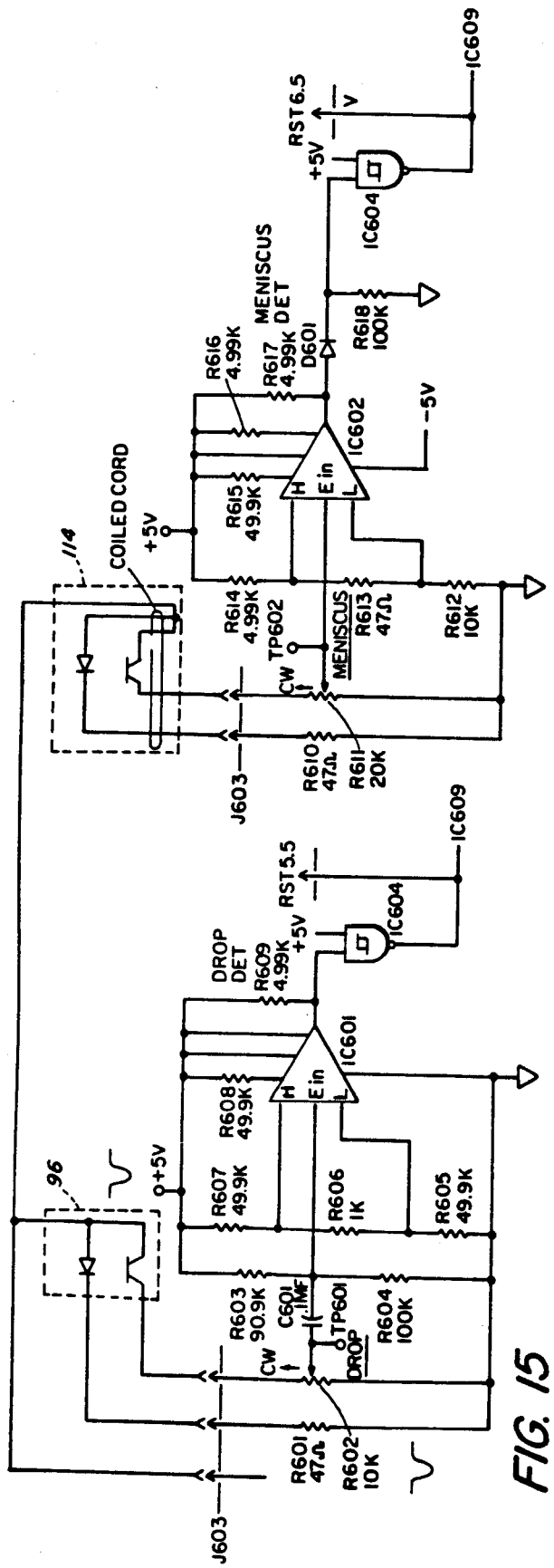
FIG. 15 is an electrical schematic diagram of the drop and meniscus detectors.

As shown in FIG. 14, the CPU circuit 166 includes a single chip 8 bit N channel microprocessor, namely, Intel 8085A using a multiplexed data bus system. The CPU 8085A is driven by a 5.185 MHz crystal clock. The INTR trap and hold inputs are grounded as shown. Random access memory IC209, 210, 216 and 217 is selected by way of the dual decoder IC218. The address is split between the 8 bit address bus and the 8 bit data bus. The read only memory comprises six 2K EPROMs IC201-IC206. The model numbers given directly below the IC numbers represent a standard commercially available part number for this type of circuit. Instructions are obtained from the PROMs via IC212, an 8 bit latch and IC211. IC's 209, 210, 216 and 217 are I/O decoders selected by dual decoder IC218. The address bus requires 12 bfts (A0-A11) to accommodate 12K of ROM. The twelve address lines are inverted in hex inverters IC207 and 208 and passed to the digital I/O board along with the data bus which is split by means of quad latches IC213 and IC220. The drop and meniscus detector circuits of FIG. 15 are physically located on the digital I/O board 170. The drop detector produces a square pulse output to interrupt request RST5.5 of the CPU whenever the first drop breaks the light beam sufficiently to trip the Schmitt trigger IC601. Similarly, the meniscus detector circuit of FIG. 15 as shown is designed to emit a pulse to the interrupt request RST6.5 of the CPu whenever the meniscus interrupts with the light beam.

Figure 16:
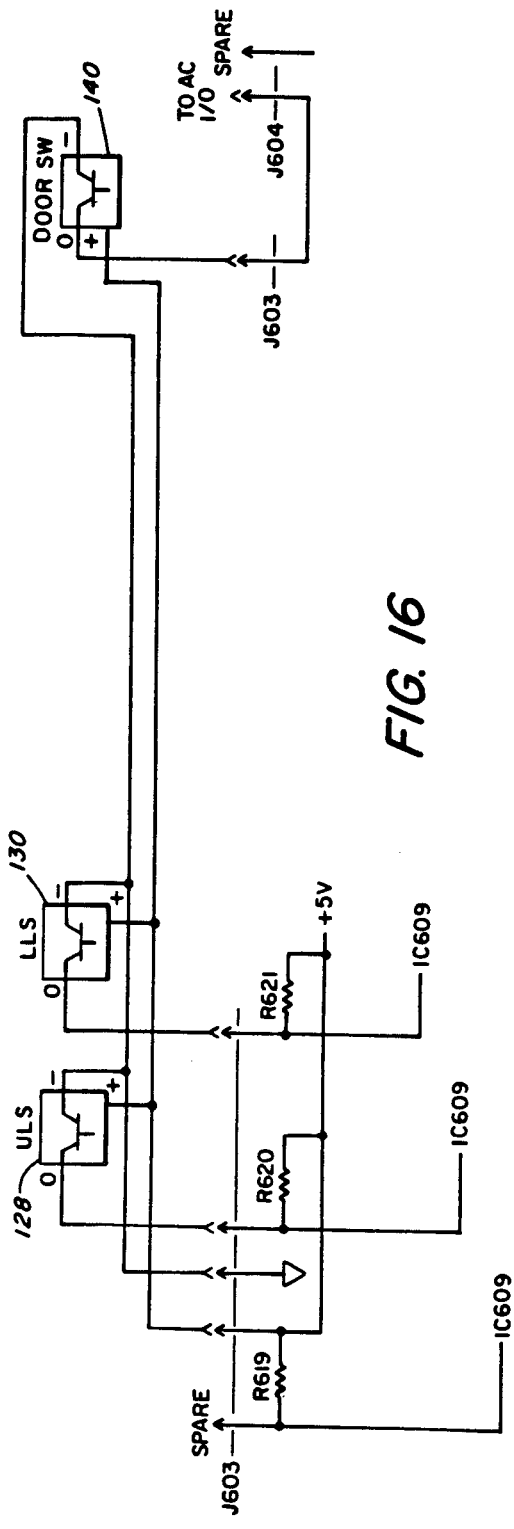
FIG. 16 is an electrical schematic diagram of the upper and lower meniscus detector limit switches and receivfng chamber door switch circuits.

The limit switch circuit of FIG. 16 is also located on the digital I/O board. With the sole exception of the door switch 140, the detectors and switches in FIGS. 15 and 16 also produce output signals to IC609 of FIG. 17, one of six 8 bit latches IC605, 609 and IC612. The remainder of the digital I/O PCB 170, as shown in FIG. 17 comprises additional interface equipment. The 8 bit latches are addressed or enabled by means of three dual decoders IC613, 614 and 615. The latches in turn perform various input or output functions. For example, IC605 signals the alarm, energizes the graduate tilt solenoid 112 and actuates the step motor 92 in either direction. Latch IC606 produces the multiplexer control signals necessary for the analog I/O circuit. IC607 generates the control and code signals for operating the printer 34. The other latches 608, 609, and 612 are input devices. In particular, IC608, only 1 bit of which is used, signals the low condenser level. IC609 provides the condition of the limit switches and drop in meniscus detector inputs. Finally, latch IC613 places the parallel digital outputs of either analog to digital A/D converter IC610 or IC611 on the data bus. A/D converter IC610 converts watts, chamber temperature and condenser temperature analog readings to digital values. IC611 converts the RTD vapor sensor reading and the barometer reading to digital values. 162 kHz clock signals are provided by binary counter IC620 which is connected to receive the 2.5925 MHz clock signal from the CPU board. Programmable interval timers IC616 and IC617 are arranged to place time out signals on the data bus on command. IC616 is closed at 60 Hz or 50 Hz by means of a zero crossing signal from NAND gate IC604 while IC617 is clocked at two special rates as shown in FIG. 17 which are derived by dividing the system clock signal and counters 620 and 621. A specific timer signal generated by the output zero of interval timer IC617 creates the interrupt request RST7.5 for the CPU. The interval timer is also gated by the zero crossing signal via input gate ONE and the corresponding output number ONE produces the TRIAC control signal for the heater 160 (FIG. 8).

Figures 1, 18A:
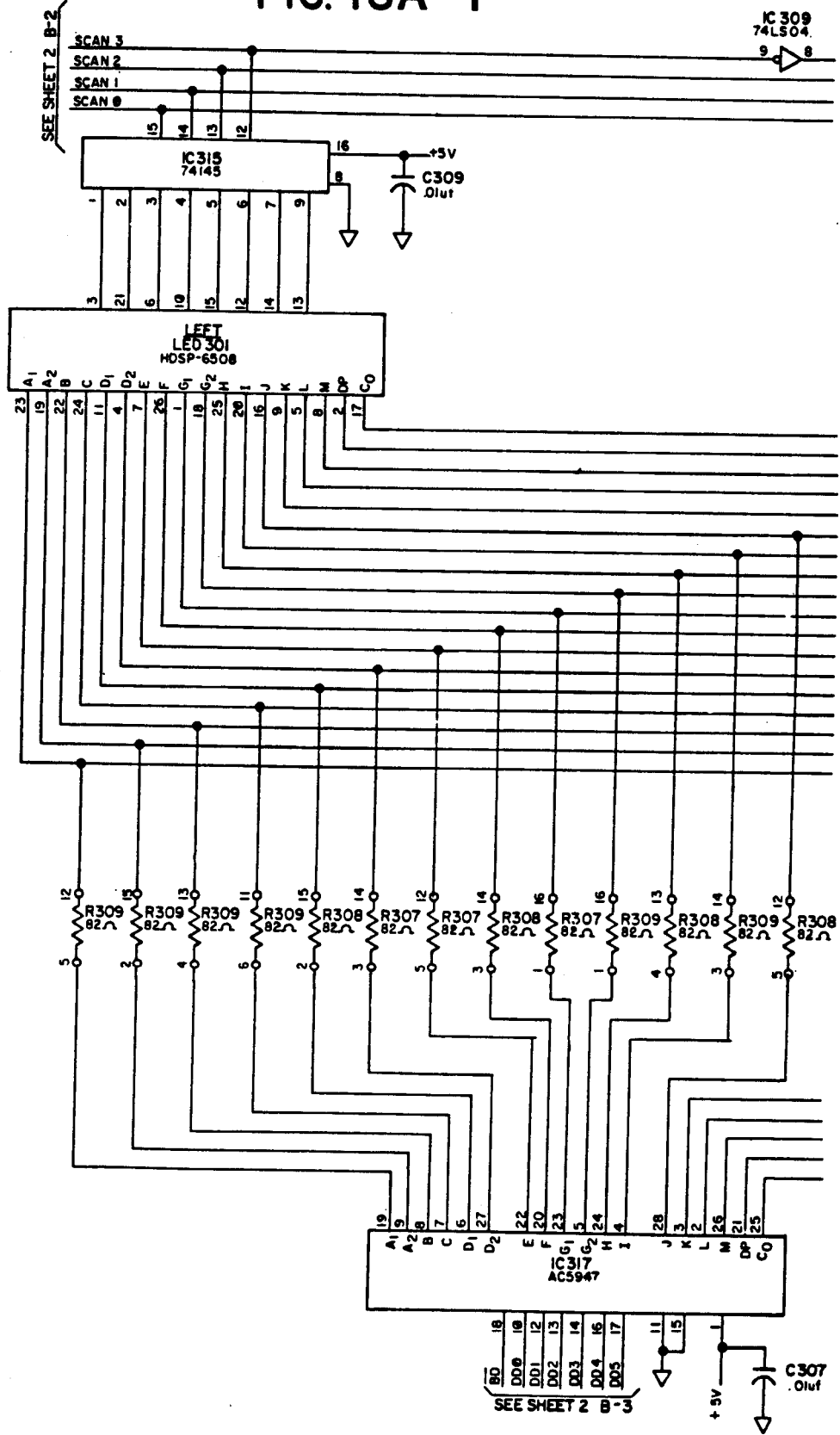
FIG. 18A is a schematic diagram of the LED display driver and LED character display of the keyboard/display circuit of FIG. 10.
Figures 2, 18A:
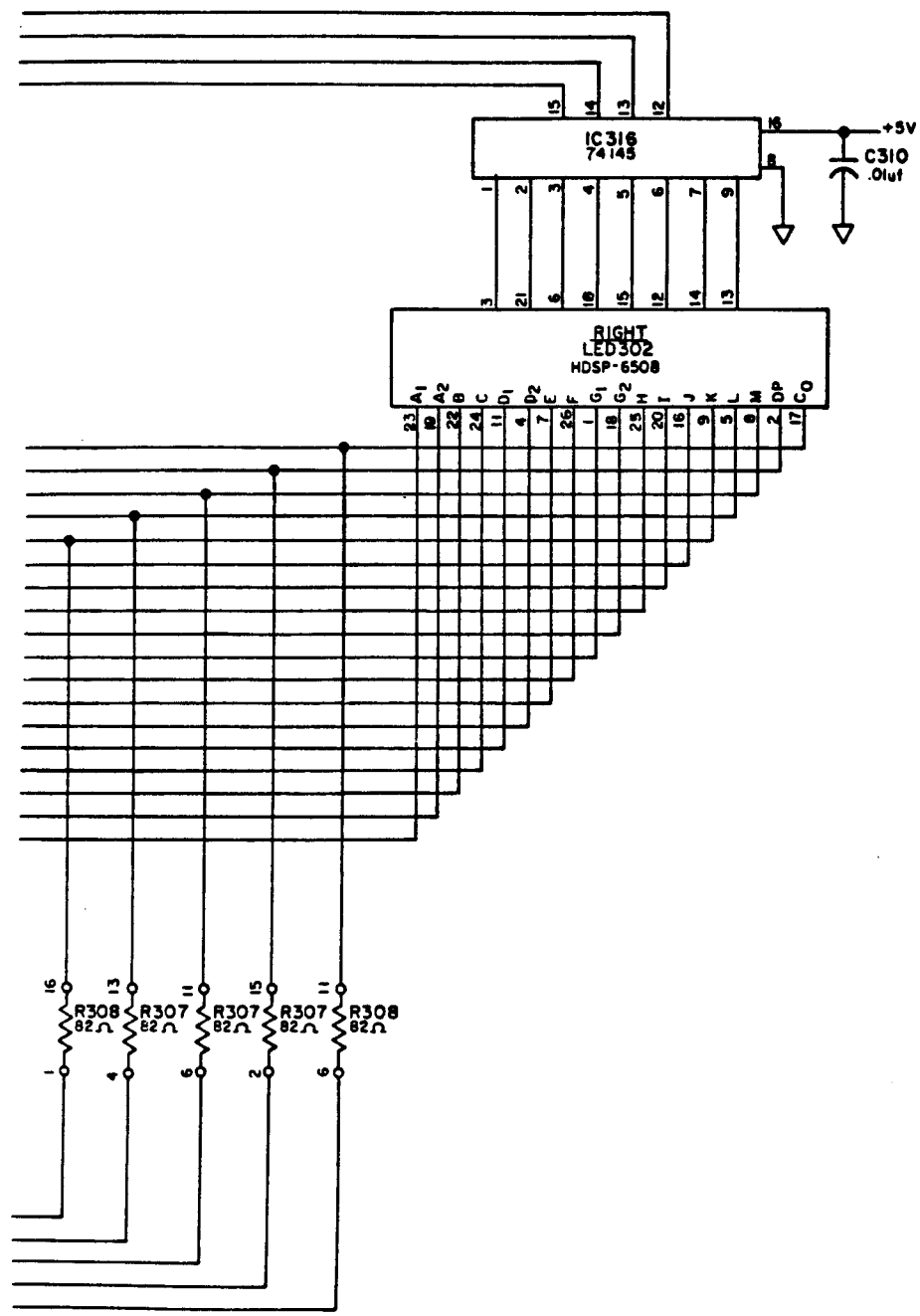
Figures 1, 18B:
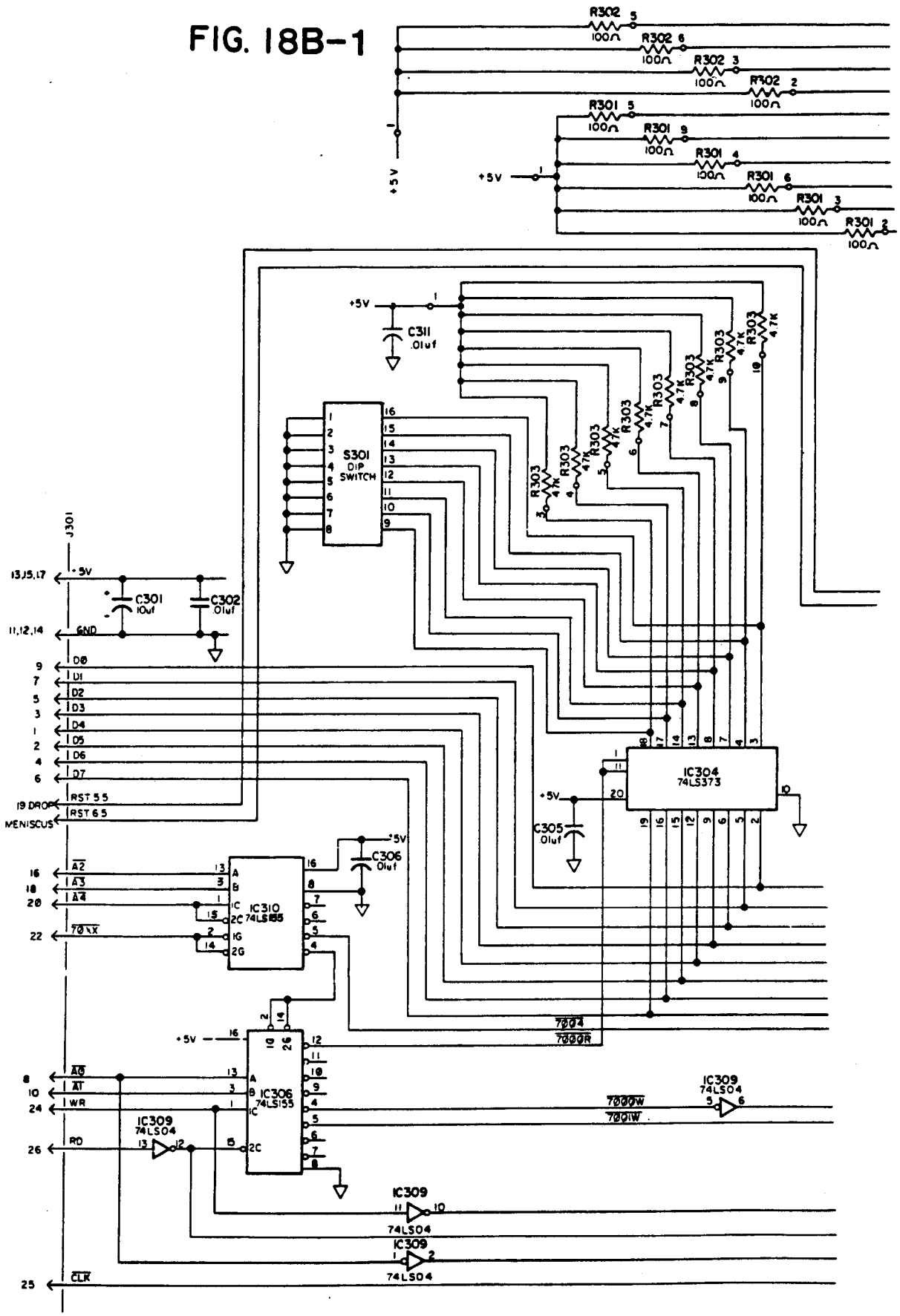
FIG. 18B is a schematic diagram of the keyboard and LED indicator lights of the keyboard/display circuit of FIGS. 10 and 11.
Figures 2, 18B:
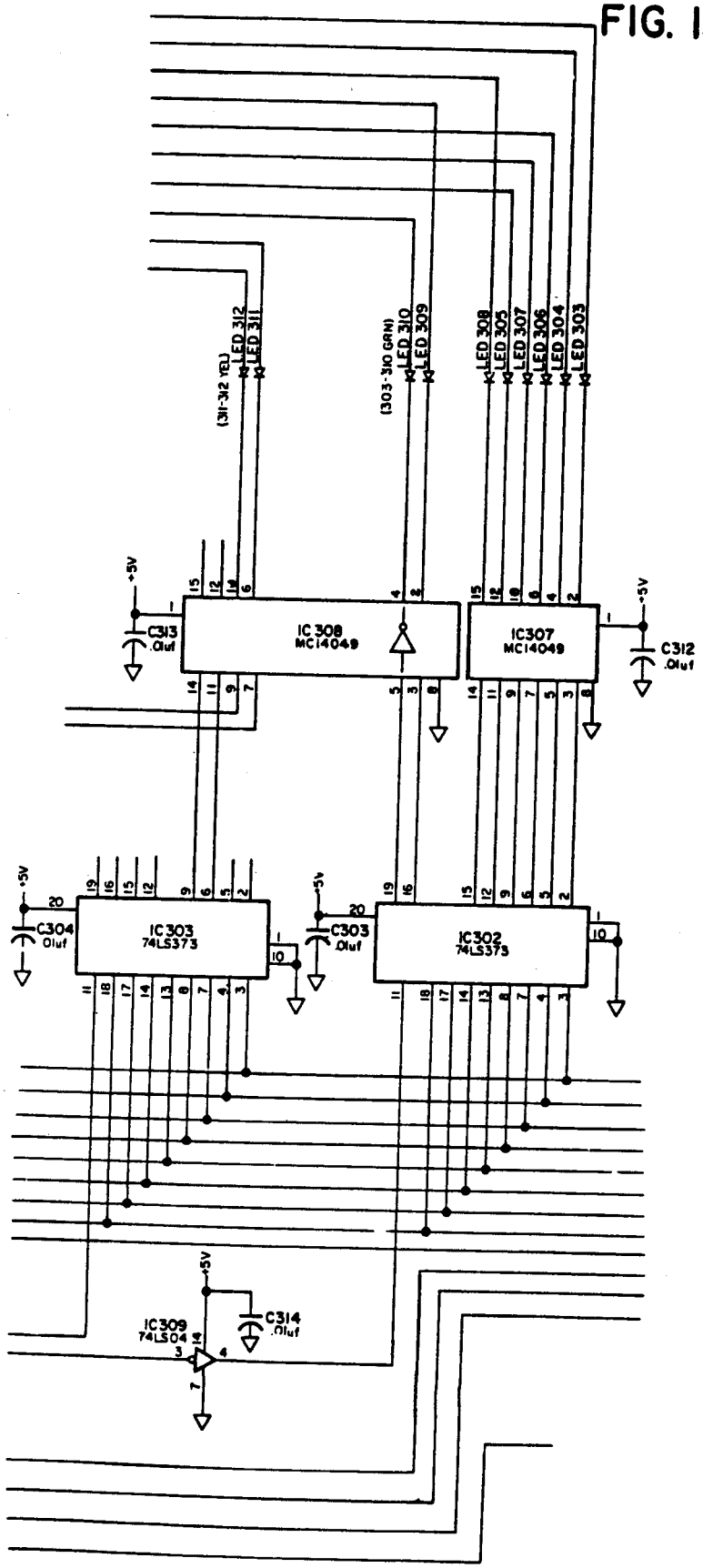

The keyboard and display circuit 168 is shown in FIGS. 18A and 18B. Eight digit LED displays LED 301 and 302 are driven by display driver IC317 and scan decoders IC315 and 316 in the conventional manner as shown. The remainder of the keyboard/display circuitry is shown in FIG. 18B. The keyboard on the display panel 13 is comprised of reed switches S302, 315 and 317–327. The identification and condition of these switches is provided by means of display interface IC301 and decoder/demultiplexer IC314. As shown in FIG. 18B, the outputs of the keyboarded data is placed on the data bus. Another set of 8 bit latches IC302, 303 and 304 interfaces a dip switch S301 to identify the automatic distillation analyzer unit number on the back of the display panel 13, and a series of LED indicator lights driven by hex buffers IC307 and 308. Additional decoders IC310 and 306 use control signals from the CPU to select the various I/O features of the keyboard display apparatus.

Figures 2, 19:
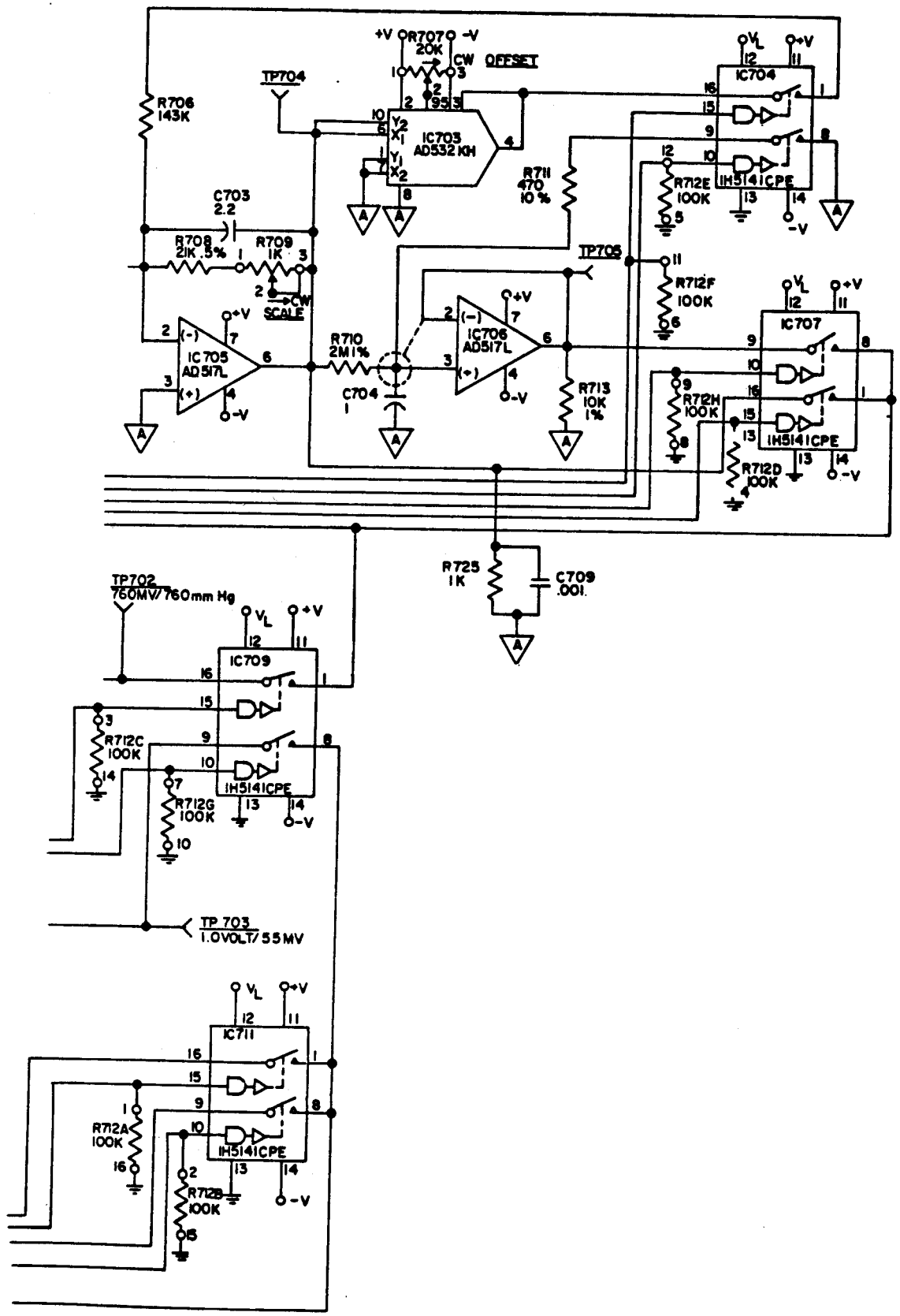
FIG. 19 is a schematic diagram of the analog I/O circuit of FIG. 10.

The analog I/O PCB 172 is shown in FIG. 19. The lead 66 from the RTD vapor sensor 60 is connected to an analog detector circuit which produces one of two outputs to the A/D converter IC611 in FIG. 17 via multiplexor IC707. The other multiplexor IC704, also controlled by the multiplexor outputs from the digital I/O board latch IC606, introduces offset or normal feedback signals in the vapor temperature detector circuit. IC703 is a multiplier, IC702, 705 and 706 are operational amplifiers, and IC701 is a voltage reference.

The analog I/O PCB also carries a pressure transducer which is multiplexed along with the watts transducer filtered output to the respective A/D converter IC610 or IC611. A/D converter IC610 also receives multiplexed inputs representing the temperature of the receiving chamber and the temperature of the condenser from the analog I/O board as shown in FIG. 19. IC's 708 and 710 are operational amplifiers and the multiplexors IC704, 707, 709 and 711 are CMOS analog switches.

Figure 20:
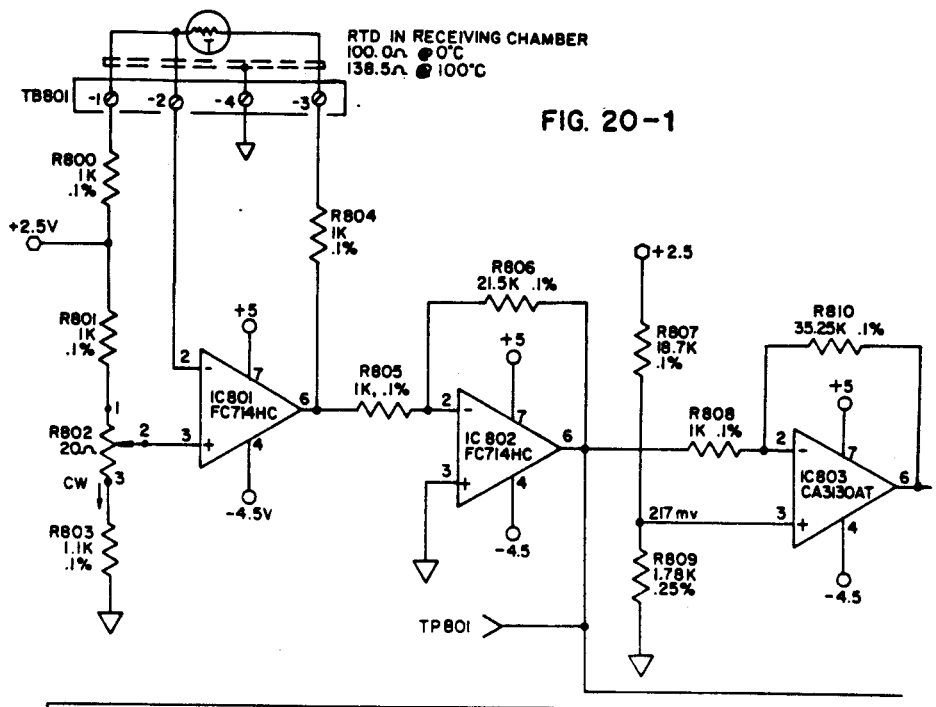
FIG. 20 is a schematic diagram of the AC I/O circuit of FIG. 10.
Figure 1:
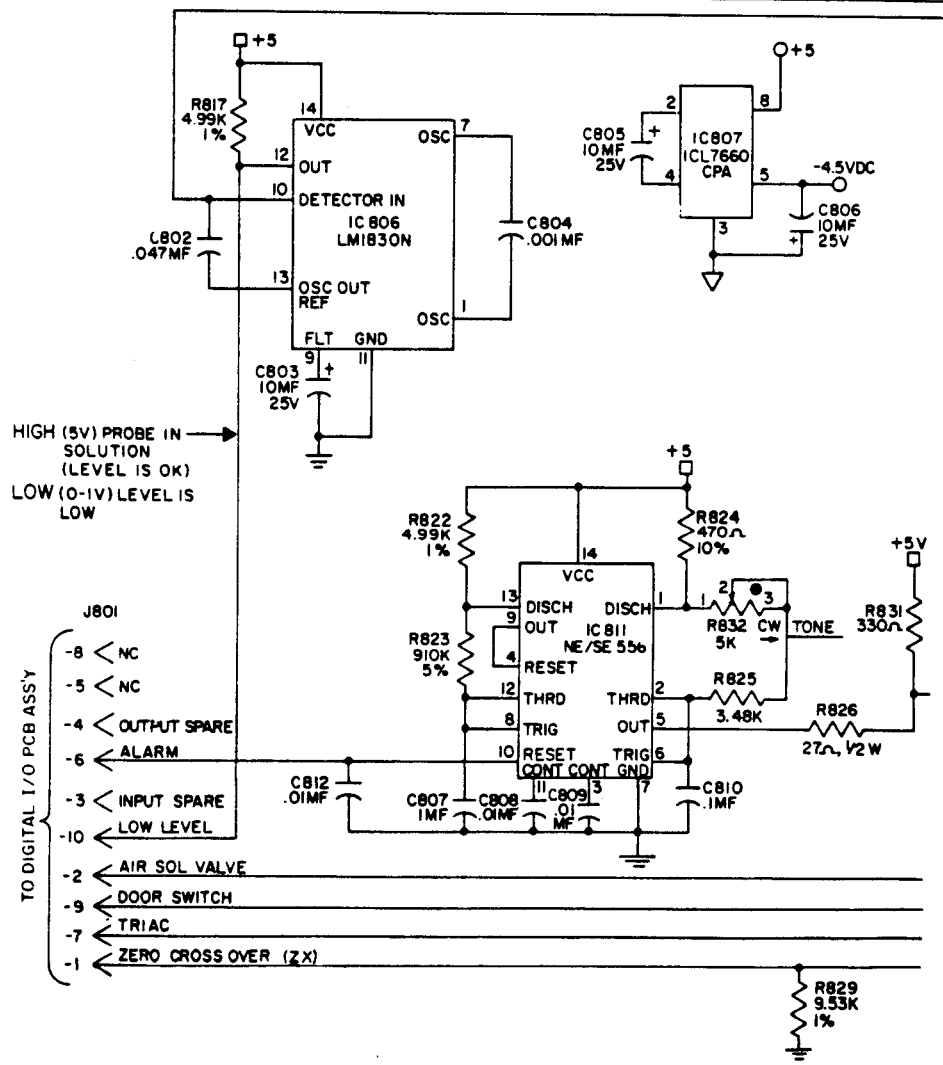
Figures 2, 20:
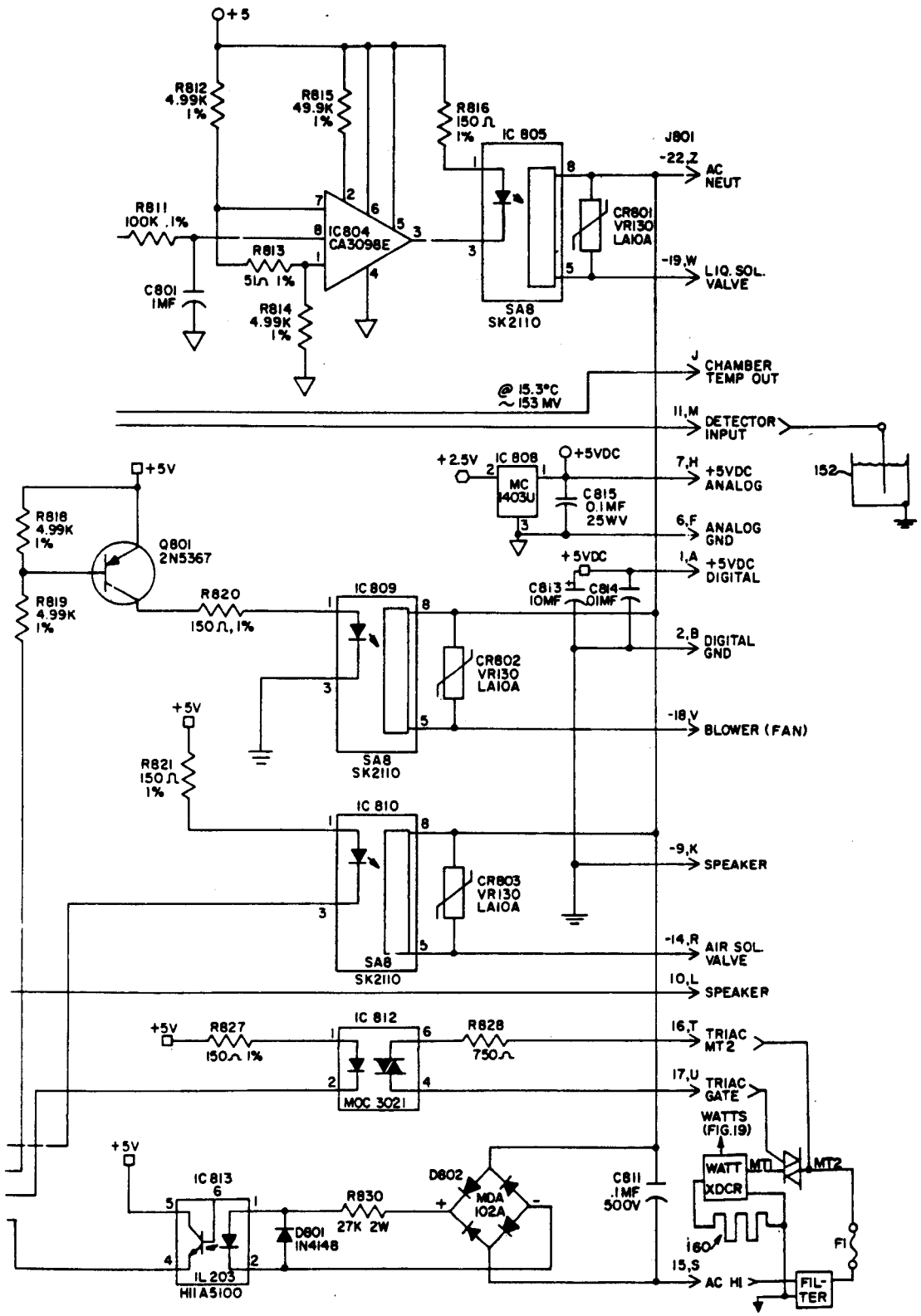

As shown in FIG. 20, the AC I/O board 174 includes a temperature sensor circuit comprising operational amplifiers IC801, 802, 803 and Schmidtt trigger IC804 arranged to energize relay IC805 to turn on the liquid solenoid valve in the event that the temperature in the receiving chamber climbs above the prescribed subambient temperature, typically 60° F. A chamber temperature analog output is also provided to the analog IO circuit 172. The condenser bath level indicator shown schematically in FIG. 20 provides an input to fluid detector IC806 whose output indicating a low level is passed to the digital I/O PCB 170. IC807 is a voltage converter. The door switch input from the digital I/O circuit limit switch causes relay IC809 to be actuated to turn on the blower or fan when the receiving chamber door is closed. The air solenoid signal from the digital I/O board actuates relay IC810 to initiate cooling of the distillation flask by air jets arranged in the chamber 46 of FIG. 1. An alarm input from the digital I/O board activates dual timer IC811 which produces an output tone signal to a speaker for a predetermined interval. The TRIAC control signal from the digital I/O board is passed via TRIAC driver IC812 which produces gating signals for the TRIAC shown in FIG. 20 which drives the heating element 160 via a watt transducer or watt meter which produces the watts input to the analog I/O circuit 172. The high side of the AC line current is rectified and opto-isolated in IC813 and fed to the digital I/O board as the zero crossover signal for use in software timing of the TRIAC control signal and calibration for 50 or 60 Hz. While the flask heater air solenoid and speaker controls originate from software via the CPU system and digital I/O circuit, the liquid solenoid and fan controls are software independent. In particular, the liquid solenoid for lowering the chamber temperature is subject to its own independent thermostatic sensor circuit and while the fan 146 is subject only to opening of the receiving chamber door 72.

SOFTWARE

The remaining operations of the automatic distillation analyzer of FIG. 1 are controlled by software. A complete annotated assembly language listing of the code in the PROMs (IC201–IC206) is contained in Appendix I. This listing was produced on an ISIS-II 8080–8085 macro assembler and is reproduced in a standard format based on the standard instruction repertoire designed for the Intel 8085A Microprocessor. In all there are 53 distinct declarations and routines listed in the directly of so called "F1" on the first page of Appendix I. Each routine is given its mnemonic name such as XTEST or ENDT. These routines are arranged serially according to the object code map on page 2 of Appendix I. Locator symbols such a these are used to indicate either the beginning of a routine or subroutine or other precise code location of interest. In the assembly listing, often instructions are included which refer the CPU to a completely different location in the read only memory. This new location is given a mnemonic which symbolizes the function of the instructions at the new location. Throughout this assembly listing, these transferee locations are referred to as ""PUBLICS". PUBLICS include whole routines as well as subroutines and portions thereof. All of the PUBLICS are designated by their ROM location in the OBJECT LOCATOR table beginning on page 3 of Appendex I. Following the OBJECT LOCATOR table, the actual software, a listing of RAM storge declarations indicating length and type of data employed in the program. Following the RAM declarations, the next routine entitled "MESSAGE ROUTINE" contains the data definitions of the messages used for display in printing. Each routine such as this one is preceded by an abstract of the function of the routine. It should also be noted that each routine in the assembly listing is treated as self-contained. That is, each routine is designated to begin at ROM location zero and the addresses of external routines are always given as "0000". In reality, the address of the external routine, for example, in a jump or call instruction does reside adjacent to the instruction in ROM. However, in assembling the final machine code, the assembler automatically determines the order of the routines. From the user's standpoint it is not important where the external routine is located. However, it can be determined quickly for reference purposes by referring to the OBJECT LOCATOR or SYMBOL table beginning on page 3 of Appendix I. To the right of the source and statement in each of the routines are annotations describing the function of the corresponding instruction.

The software routines in Appendix I can be thought of as falling into five related categories:

1. Keyboard/Display Operation

ENTER DATE
DISPLAY DATE
UPDATE THE DATE
EDITOR
KEYBOARD INPUT
LED DISPLAY AND INSERT AND TRANSMIT (keyboard entries displayed)
MESSAGES
TRANSMIT

2. System Operation

INITIALIZE (sets devices and parameters to known state)
CALIBRATION (determines whether line voltage is 60 or 50 Hz)
START (called by "START" key, entered parmeters printed, heat settings computed)
CONTROL 1 (controls heat during first five minutes)
CONTROL 2 (distillation rate control after IBP)
MOTOR RESET (finds starting meniscus)
MOTOR DRIVER (stepper motor-fast/slow, up/down)
CHECK FOR END OF TEST (ENDT-checks programmed end mode and sets final heat)
END AT TEMPERATURE CONTROL (detects programmed end temperature, decrease in temperature or five minute limit)
END AT PERCENT RECOVERED (detects programmed volume, temperature decrease for five minute limit)
END AT END POINT (detects temperature decrease or five minute limit)
END AT DRY POINT (detects programmed drop time interval, temperature decrease, five minute limit or dry point key)
TEMPERATURE DECREASE AND TIME LIMIT (subroutine-temperature decrease or five minute limit)
END OF TEST (end within five minute limit)
END OF TEST BEFORE FINAL HEAT (for end at programmed temperature or percentage recovery)
DRAINAGE (wait for no meniscus movement)
RECOVERY, RESIDUE AND LOSS (request residue input, computes and prints totals)
EVAPORATED TEMPERATURE CORRECTION (computes and prints temps for evaporated sample in IP and DP modes)
CORRECTED LOSS AND TOTAL RECOVERY (computes and prints barometer-corrected loss and recovery)

3. Interrupt Request Service

RST 5.5 (drop detector-tilt graduate at IBP)
RST 6.5 (meniscus detector-calls motor)
RST 7.5 (counts 1 second timer to enable RST 5.5 at 1 minute and up heat at 5 minute mark)

4. Diagnostic Tests

CHECK SUM (EPROM)
RAM TEST
MOTOR TEST
BAROMETER TEST
TEMPERATURE TEST
X-Y RECORDER TEST
CONDENSER AND CHAMBER TEMPERATURE TEST
CONDENSER LEVEL TEST
WATT METER TEST
RS 232 TEST

5. General Utility

RAM STORAGE DECLARATIONS
BINARY TO BCD CONVERSION
BCD TO BINARY CONVERSION
MULTIPLY
DIVIDE
PRINTER FORMAT
PRINTER DRIVE
RS 232
X-Y RECORDER
READ ANALOG TO DIGITAL CONVERTER
TEMPERATURE LAG GENERATOR

FIG. 21 illustrates typical printout from printer 34 for a completed test on regular grade winter gasoline according to ASTM D86, Group I. In this type of test, the distillation results are first given according to the milliliters of distillate recovered. The temperatures are then recomputed based on the manually measured residue left in the flask and the loss of sample, for example, condensate left on the walls of the flask and U tube. The specific data appearing on the printout is tailored to specific requirements of ASTM D86. For example, this test requires that the IBP be reached within five to ten minutes. Thus, the printout includes a message that the IBP was reached at the uncorrected temperature of 83.3° F. at 6.3 minutes from the time the start key was depressed.

Unit ID number 03 is preselected from 0 to 31 by setting the dip switches behind the display panel 13.

System Operation

To begin a test, the sample flask 50 is placed on the distillation board above the heater 160 with the RTD sensor 60 in place and the receiving graduate 74 in the receiving chamber 70 as shown in FIG. 8. Through the operator panel display 14, the microprocessor based control system 164 prompts each test parameter. As each parameter is entered, it is also verified by the display. When programming is complete, the operator simply pushes the "START" button 26 on the display panel 13 and the printer 34 prints all of the test parameters. The control system 164 can repeat all of these conditions automatfcally for subsequent testing or the operator can selectively change all or any of the entries.

When the first sample drop enters the graduate, the IBP is recorded. As the graduate fills, the distillate volume is continuously monitored by meniscus detector 114. The distillate sensing system can monitor all types of samples even those which are dark or cloudy.

During distillation, the control system 164 automatically scans fifteen functions to alert the operator of problems or improper test parameters. Should such a condition occur, a preprogrammed message will appear either on the operator display 14 or the printout 36. As a result, corrective action can be taken before the next test. The control system 164 also features a series of preprogrammed diagnostic/calibration tests which enable the operator to easily locate problems or calibrate the unit.

The following description is furnished to illustrate the operation of the distillation system, first, from the operator or user's point of view, second, from the machine's point of view.

Procedure

1. Set Condenser Temperature range.
2. Set Calendar/Clock (Initial power up).
3. Determine ASTM required settings.
4. Key: ASTM method/temperature range (If none keyed, automatic selection=D86, 32°–572° F.).
5. Key: Distillation Rate (If none keyed, automatic selection=4/5 ml/min.)
6. Message Sequence on Operator Display: Key input, [ENTER].

Message

SAMPLE 0000000
INITIAL HT 000W
5 MINUTE HT 000W
INC. FIN HT 000W
END AT TEMP NO *
END AT DP NO *
END AT % REC NO *
EXPECT LOSS 0.0%
SAMPLE 0000000

*If none are selected, test will automatically terminate at "End at End Point".
If inputs are made to message "END AT DP," "EXPECT LOSS 0.0%", the message will not appear for D850/1078 tests.
If a Dry Point (DP) is unknown, enter 9.9, and manually key [DP] at the actual D.P. Actual value will be printed.

7. Clean the inside of the distillation tube before each test.
8. Pre-cool the graduate 74 and RTD sensor 60 in the receiving chamber 70 and refrigerate Flask 50 and sample.
9. Fill the graduate with sample. Bottom of meniscus must be at 100 ml. mark.
10. Pour sample in proper size distillation flask 50.
11. Wipe outside of graduate, insert into keyed graduate pedestal (not shown) in chamber 70. Rest small cover plate (not shown) on top of the graduate.
    NOTE: If the dry point is to be recorded, insert the standard drop guide (not shown) into the graduate. A small liquid residue will typically remain in the graduate after the sample is transferred into the distillation flask. This is desirable. Some solvents evaporate and no "starting meniscus" is present in the graduate. If this occurs, add five drops of a non-volatile sample (Kerosene) to the graduate so that a smal meniscus can be initially sensed. The control system 164 will correct for this initial volume.
12. Insert RTD vapor sensor 60 with cork stopper 62 into distillation flask 50 so that top of sensor end is aligned with side arm 50a.
13. Insert distillation flask side arm with cork, into distillation tube 162. Position flask in vertical position, adjust height of heater 160, close glass door 48 (FIG. 1).
14. Press [START]

Sequence of Operations

1. Meniscus detector 114 carriage is reset just above meniscus.
2. Printer 34 prints out: date, time, testing conditions, barometric pressure, condenser temperature, etc.
3. Flask heater 160 sets to the Initial Heat Wattage.
4. After 5 minutes, flask heater 160 sets to the 5 minute Heat Wattage.
5. The first drop is detected by drop detector 96 at the graduate 74. The "Recovery" light 32 (FIG. 1) blinks. The graduate 74 is tilted by tilt solenoid 112 to receive distillate along the wall. (For Dry Point Test, graduate is not tilted).
6. Printer records:
    IBP Temp.
    Total time to IBP
7. Distillation rate-controled heat. meniscus tracking Vol/Temp recorded at 5, 10%, 20% ... 10% increments Distillation rate, ml/min.
8. Final heat set when distillate volume equal to 100 ml less expected loss and less 6 ml. Vol., temp. printed
9. End Point, Dry Point, % recovered, or temperature termination (FIG. 21). If End Point, temp. decline sensed. If dry point, DRY POINT keyed or drop detector interval timed for dry point
10. The heating is terminated, and air jets cool the heater compartment. During this cooling period, distillate "drainage" is monitored. If total recovered volume (meniscus) does not change for (1) minute, end.
11. "RESIDUE" message appears on operator display 14 Operator measures flask residue, keys input, [ENTER],. (Note: Key numbers on each side of decimal point, e.g., 2.0)
12. Printer records:
    Volume/Temp. on evaporated basis for ASTM D86 tests,
    groups 1, 2, 3.
    Loss and total recovery automatically corrected for ambient barometric pressure (FIG. 21).

Keyboard/Display Interaction

Pressing the Line switch 56, located on the lower right front corner of the unit, as viewed in FIG. 1, turns the system on. Test parameters are initialized to zero. Distillation rate of 4.5 ml/min, D86 32–572 F. temperature range, and END POINT test termination are automatically selected.

The first message automatically displayed is GCA ADA III VX.X, which indicates the version number of the control program. This message is displayed for approximately 2 seconds, after which messages requesting date and time input are displayed.

Entering Date and Time

Whenever the unit is first powered on or when diagnostic testing is completed, date and time input are required. This information is automatically updated as long as system power is on. The following messages are displayed and valid input noted:

| MESSAGE | VALID INPUT |
| --- | --- |
| ENTER YEAR 19 | 80 through 99 |
| ENTER MONTH | 1 through 12 |
| ENTER DAY | 1 through 31 |
| ENTER HOUR | 1 through 23 |
| ENTER MINUTE | 0 through 59 |

Operator input via keys [0] through [9] of keyboard 16 is visually displayed as input for each message is requested. Entering of non-valid input is not allowed.

EXAMPLE to enter Jan. 20, 1982, 16:05

| PRESS | DISPLAY | |
|---|---|---|
| | ENTER YEAR | 19 |
| [8] | ENTER YEAR | 19 8 |
| [2] | ENTER YEAR | 1982 |
| [ENTER] | ENTER MONTH | |
| [1] | ENTER MONTH | 1 |
| [ENTER] | ENTER DAY | |
| [2] | ENTER DAY | 2 |
| [0] | ENTER DAY | 20 |
| [ENTER] | ENTER HOUR | |
| [16] | ENTER HOUR | 16 |
| [ENTER] | ENTER MINUTE | |
| [5] | ENTER MINUTE | 5 |
| [ENTER] | SAMPLE | 0000000 |

After the date and time are initially entered, only the test parameter messages are displayed, starting with sample number.

Entering, Changing, Recalling Test Parameters

Distillation test parameters are entered via the keyboard and stored in RAM IC209, 210, 216, 217 (FIG. 14). The parameters once entered need not be re-entered for each sample, run if there are no changes in test conditions and system power is not turned off. Changing test parameters is accomplished using message prompts appearing on the operator display when a test is not in progress. Recalling test parameters previously entered for examination is done by successive key strokes of [RECALL] key on keyboard 16.

The following test parameter messages are displayed and their definitions are as follows:

SAMPLE 0000000: Identify a distillation test sample run with a numberic code. The operator may key in any seven digft numeric number with the exception of "9876543", which is used to activate the resident diagnostic/calibration program.

EXAMPLE to enter sample number 1296534

| PRESS | DISPLAY | |
|---|---|---|
| | SAMPLE | 0000000 |
| [1] | SAMPLE | 0000001 |
| [2] | SAMPLE | 0000012 |
| [9] | SAMPLE | 0000129 |
| [6] | SAMPLE | 0001296 |
| [5] | SAMPLE | 0012965 |
| [3] | SAMPLE | 0129653 |
| [4] | SAMPLE | 1296534 |
| [ENTER] | INITIAL HT | 000W |

INITIAL HEAT 000W: The next test parameter message displayed requests the operator to input the initial heat setting in watts. Valid input range is 000 through 999. This value is used as the heat setting when a distillation test is started. The heat is automatically maintained at this setting until five minutes into the test or the first drop is detected.

EXAMPLE to enter 250 watts

| PRESS | DISPLAY | |
|---|---|---|
| | INITIAL HT | 000W |
| [2] | INITIAL HT | 002W |
| [5] | INITIAL HT | 025W |
| [0] | INITIAL HT | 250W |

| PRESS | DISPLAY | |
|---|---|---|
| [ENTER] | 5 MINUTE HT | 000W |

5 MINUTE HEAT 000W: The next test parameter message displayed requests the operator to input the 5 minute heat in watts. Valid input range is 000 through 999. This value is used as the heat setting desired after five minutes into the test or when the first drop is detected.

EXAMPLE to enter 201 watts

| PRESS | DISPLAY | |
|---|---|---|
| | 5 MINUTE HT | 000W |
| [2] | 5 MINUTE HT | 002W |
| [0] | 5 MINUTE HT | 020W |
| [1] | 5 MINUTE HT | 201W |
| [ENTER] | INC FIN HT | 000W |

NOTE: During the distillation, the heater wattage will vary to maintain the distillation rate which was preselected.

INCREASE FINAL HEAT 000W: The next test parameter message displayed requests the operator to input the increase final heat setting in watts. Valid input range is −999 through 999. This value is used to either increase or decrease the heat setting during the final heat phase.

EXAMPLE to enter 150 watts

| PRESS | DISPLAY | |
|---|---|---|
| | INC FIN HT | 000W |
| [1] | INC FIN HT | 001W |
| [5] | INC FIN HT | 015W |
| [0] | INC FIN HT | 150W |
| [+/−] | INC FIN HT | −150W |
| [+/−1] | INC FIN HT | 150W |
| [ENTER] | EXPECT LOSS | 0.0% |

EXPECT LOSS 0.0%: The next test parameter message displayed requests the operator to input the expected loss setting in percent. Valid input range is 0.0 through 9.9. This value is used in determining the volume at which the final heat phase begins.

EXAMPLE to enter 1.0%

| PRESS | DISPLAY | |
|---|---|---|
| [1] | EXPECT LOSS | 0.0% |
| [.] | EXPECT LOSS | 0.1% |
| [0] | EXPECT LOSS | 1.0% |
| [ENTER] | END AT TEMP | NO |

END AT TEMPERATURE—NO: The next test parameter message displayed informs the operator that the method of ending a test is not at a pre-selected temperature. If ending a test at a specific temperature is desired, the operator need only key in the value. Valid input range is 000 through 999. The temperature units, Centigrade or Fahrenheit, are automatically determined from the temperature range previously selected. If this method of ending is not desired, input only the ⌊ENTER⌉ key.

EXAMPLE

End at temperature desired

| PRESS | DISPLAY | |
|---|---|---|
| | END AT TEMP | NO |
| [2] | END AT TEMP | 002C |
| [9] | END AT TEMP | 029C |
| [5] | END AT TEMP | 295C |
| [ENTER] | SAMPLE | 1296534 |

EXAMPLE

End at temperature not desired

| PRESS | DISPLAY | |
|---|---|---|
| | END AT TEMP | NO |
| [ENTER] | END AT DP | NO |

END AT DRY POINT—NO: The next test parameter message displayed informs the operator that the method of ending a test is not at the dry point. If ending a test at the dry point is desired, the operator need only key in the desired time in seconds between drops.

Valid input range is 0.0 through 9.9. The value is used during the final heat phase where the time between successive drops of liquid at the distillation tube 162 is measured. When the time interval is greater than this test parameter, the test is automatically ended. If this method of ending a test is not desired, input only the [ENTER] key.

EXAMPLE

End at DP desired:

| PRESS | DISPLAY | |
|---|---|---|
| | END AT DP | NO |
| [1] | END AT DP | 0.1S |
| [.] | END AT DP | 0.1S |
| [0] | END AT DP | 0.1S |
| [ENTER] | SAMPLE | 1296534 |

EXAMPLE

End at DP not desired:

| PRESS | DISPLAY | |
|---|---|---|
| | END AT DP | NO |
| [ENTER] | END AT % REC | NO |

END AT % RECOVERED—NO: The next test parameter message displayed informs the operator that the method of ending a test is not at a selected recovery percentage. If ending a test with this method is desired, the operator need only key in the desired recovered volume percentage. Valid input range is 00 through 99. When this entered recovered percentage is reached, the test is automatically ended. If this method of ending a test is not desired, input only the [ENTER] key.

EXAMPLE

% REC desired:

| PRESS | DISPLAY | |
|---|---|---|
| | END AT % REC | NO |
| [9] | END AT % REC | 09% |
| [2] | END AT % REC | 92% |
| [ENTER] | SAMPLE | 1296534 |

EXAMPLE

% REC not desired:

| PRESS | DISPLAY | |
|---|---|---|
| | END AT % REC | NO |
| [ENTER] | SAMPLE | 1296534 |

If the operator enters data on any one of the messages:
END AT TEMP
END AT DP
END AT REC
the message selected is retained in memory and the other two messages are not displayed.

To correct an error in entry or if the wrong message (above) has been selected,
 1. Press [RESET]
 2. Press [ENTER] until the message in error is reached
 3. Press [RESET]
This resets all three of the above messages, starting with:
END AT TEMP—NO If no data entries are made on any of the above three messages, the control system 164 will automatically select:
END AT END POINT Condenser temperatures are chosen according to the specific ASTM distillation test method.
 1. Select the appropriate temperature range by depressing the desired temperature key 38 (FIG. 1).
 2. For subambient operation (35° C. and lower), switch "ON" the Condenser Cooler 12.
 3. When temperature equilibrium is reached, the condenser CONTROL light 42 will cycle on-off.

An internal circulating pump 154 (FIG. 7), and RTD controlled heating circuit (not shown) will maintain the selected bath temperature.

The receiving chamber temperature can be controlled as described above. For ambient chamber temperatures, however, the door must be left open.

ERROR AND DATA MESSAGES

In addition to operating parameter messages, the control system 164 also reports two classes of messages: ERROR MESSAGES and DATA MESSAGES. These messages will appear on the operator display or be printed out for hard copy record.

Error messages are reported in response to conditions which could prevent the unit from starting or completing a distillation test. These errors are classed into two groups: (1) fatal, and (2) non-fatal, errors.

Fatal errors, when detected, prevent using the system until the identified failure is corrected. These errors are detected automatically by the micro-processor system 164 and messages are indicated on the operator display.

Non-fatal errors, when detected, may not prevent using the system for the specific test programs selected. These errors are detected automatically by the microprocessor system and messages are indicated on the operator display.

Listed below are the fatal error messages and conditions under which they will occur.

BAD EPROM 012: Each time the unit is powered on, a check sum is automatically made of the contents of each EPROM located in the CPU circuit board (FIG. 14). If the calculated check sum for each EPROM is not correct, the EPROM is identified by number with a message on the operator display so that it can be replaced.

ZERO CROSSING: Each time the unit is powered on, an automatic determination of the AC line frequency, either 50 Hz or 60 Hz, is made. This is subsequently used for time keeping and heater power control. This message appears on the operator display and indicates a failure on either the Digital I/O circuit board (FIG. 17), the AC control I/O circuit board (FIG. 20), or interconnections between boards. To correct this error, verify the zero crossover signal output of the AC Control I/O board (FIG. 20).

READ PARAMETERS: Each time a distillation test is started, the following parameters are automatically read: barometric pressure, receiver compartment, and condenser chamber temperatures. The "Read Parameters" message appears on the operator display 14 and indicated a failure on the Digital I/O circuit board (FIG. 17).

Listed below are the non-fatal error messages and conditions under which they will occur.

RAM TEST FAILED: The RAM diagnostic program verifies the integrity of the random access memory. This message appears on the operator display when an error is detected. The operator must select this diagnostic program as described in "Diagnostic Testing" since this test is not automatically performed.

END POINT>5.0 MIN: During a test, if the selected ending mode cannot be obtained within 5 minutes from the Final Heat adjustment point, this message is sent to the printer and the test is terminated.

NO MENISCUS MOVEMENT: When a distillation test is started and the first drop is detected, the microprocessor system 164 performs various control functions to assure compliance to ASTM test methods. One of the functions is to control wattage to the flask heater 160. In this way, the programmed distillation rate is maintained. If for some reason, the meniscus detector 114 does not move over a set time window, the distillation rate programmed cannot be maintained. When this condition is detected, this message is sent to the printer and the test is terminated.

GRADUATE NOT PRESENT: If an attempt is made to start a distillation test without a graduate 74 present to collect the distillate, the test is not allowed to proceed. The microprocessor system 164 detects this condition, outputs this message to the printer 34, and the test is terminated.

UPPER LIMIT SWITCH: Limit switch 128 is activated by the meniscus detector 114 travelling along the lead screw 90 beyond the 100% point. If this switch is activated during a distillation test and after the first drop is detected, the microprocessor outputs this message to the printer 34 and the test is terminated.

This condition can occur if:
1. The meniscus tracking system "ran away" due to: dirty graduate (fingerprints, etc.) or improper meniscus sensitivity calibration.
2. Starting sample volume in excess of 100 ml.
3. Sample initially at subambient temperature but recovered at ambient (door open).

TEST TERMINATED: Once a distillation test is started, various conditions detected by the microprocessor can terminate normal completion of the test. The microprocessor outputs this message to the printer for the following conditions when either operator inputs [STOP] key, or a non-fatal error is detected which prevents completion of the particular test selected.

NO DROP IN 25.6 MIN: Once a distillation test is started, time information is automatically maintained to record the initial boiling point. If for any reason the IBP is not detected within 25.6 minutes from the start of the test, the microprocessor outputs this message to the printer and the test is terminated.

This condition can occur if there is insufficient initial heat and/or 5 minutes heater wattage, no sample in the distillation flask, or insufficient drop detection sensitivity.

LOSS IS BELOW 0.0 ML: At the end of the distillation, the operator inputs the RESIDUE volume. if the recorded volume and residue exceeds 100%, the microprocessor will not calculate a negative % loss.

This condition may occur if the initial sample was at a subambient temperature and recovered at ambient (door open), or the initial sample volume was in excess of 100 ml.

VAPOR CKT OPEN or VAPOR CKT SHORTED: Check vapor RTD sensor, cable, cable connections. If no open connections are found, check Analog and Digital I/O printed circuit boards.

CHAMBER CKT OPEN or CHAMBER CKT SHORTED: Check receiving chamber RTD, cable, cable connections. If no open connections are found, check AC I/O printed circuit board (FIG. 20).

Data Messages

Data messages are used in the reporting of test results and also to inform the operator on the status of the system during a distillation test. These messages will appear on the operator display 14, or be printed for a hard copy record. Listed below are the data messages and conditions under which they will occur.

RESET MOTOR: This message automatically appears on the operator display, after the [START] key is input. The reset motor drives the meniscus carriage to the lower limit switch and back up to the top of the meniscus film in the graduate.

——PRINTING——: This message automatically appears on the operator display to indicate that the test parameters set up by the operator are being output to the printer.

TIME TO FIRST DROP, VAPOR TEMP., HEATER WATTAGE—XX.XMYYY.YC(F) ZZZW

This message automatically appears on the operator display after the printout of test parameters is completed. The time from the start of test is displayed as XX.X minutes. The flask vapor temperature is displaced as YYY.Y in °C. or °F. The actual flask heater wattage is displayed as ZZZ watts. This allows the operator to visually observe the distillation test while in progress. This message is displayed until the first drop is detected.

DISTILLATE VOLUME, VAPOR TEMP., HEATER WATTAGE—XX ML YYY.YC(F) ZZZW

This message automatically appears on the operator display after the first drop is detected. The distillate volume is displayed as XX milliliters. The flask vapor temperature is displayed as YYY.Y in °C. or °F. The actual flask heater wattage is displayed as ZZZ watts. This message is displayed until after the selected end mode is detected or the test is terminated.

During the test all three readings are continuously updated by the microprocessor.

TRANSMITTING: This message automatically appears on the operator display to indicate that the transmission of data is taking place via the optional RS232 computer interface.

Diagnostic Testing

The unit contains diagnostic test programs to individually verify, test, or calibrate all operational functions performed during a distillation test.

The diagnostic mode is accessed by entering a SAMPLE NUMBER of 9876543. The following message on the operator display indicates the diagnostic mode of operation:

SELECT TEST 0-9

When the SELECT TEST message is displayed, the operator keys in a number, [0] through [9], [ENTER] to select a functional test.

The [RESET] key terminates the diagnostic mode and control is returned to the normal mode of operation.

RAM TEST: When selected by the [0] key, the RAM is tested by writing various patterns to memory locations, reading these patterns, and verifying the results. When all memory locations are tested and verified, the following message appears on the display: RAM TEST PASSED If any memory location fails, the following message is displayed: RAM TEST FAILED If a RAM failure is indicated, proceed as follows:
1. Turn off line power switch 56.
2. Remove CPU board (FIG. 814).
3. Replace defective RAM, IC209, 210, 216, 217 one at a time to isolate defective RAM.
4. Repeat test.

The [RESET] key terminates this test and control is returned to diagnostic message, SELECT TEST 0-9.

MOTOR TEST (also Alarm, Graduate Tilt, Air Solenoid)

This test is selected by the [1] key. When selected, the operator may choose any of the following functions with a single key stroke:

[1]—turn alarm on
[4]—turn alarm off
[2]—energize graduate tilt solenoid
[5]—de-energize graduate tilt solenoid
[3]—energize air solenoid
[6]—de-energize air solenoid
[8]—jog up, step motor 1 step (repeat [8])
[0]—jog down, step motor 1 step (repeat [0])
[7]—the motor is driven down until the lower limit switch is energized and 0-400 C LED is illuminated.

[START]—The meniscus detector 114 is driven to the lower limit switch 130. Next, it is driven up until the meniscus detector is de-energized. At this point, the motor step software counter is zeroed. Next, the motor is driven up until either the meniscus detector is blocked or the upper limit switch 128 is energized.

[RESET]—This key returns control to the diagnostic message, SELECT TEST 0-9.

All other keys are ignored.

During this test, the status of the lower limit switch 130 is displayed on the D86 0-400 LED. The upper limit switch 128 status is displayed on the D86, 32-572 LED.

BAROMETER TEST: This test is selected by the [2] key. When selected, the transducer measuring barometric pressure is continuously sampled in mm Hg. The message on the operator display is as follows: BAROMETER=XXX Adjustments to the transducer analog circuitry are easily made using this test.

VAPOR TEMPERATURE TEST. This test is selected by the [3] key. The platinum RTD measuring vapor temperature is continuously sampled and the corresponding temperature displayed. Any corrections normally made to temperature for barometric pressure are not performed during this diagnostic test. Any of the five temperature ranges: 0°-300° C., 0°-400° C., 30°-300° C., 32°-572° F., 32°-752° F., may be selected with the display reflecting the corresponding temperature. The 30°-300° C. range indicates the true temperature. All other ranges indicate temperature uncorrected for emergent stem error. The message displayed is as follows: TEMP=XXX.XC(F) VAP RECEIVING CHAMBER TEMPERATURE TEST. This test is selected by the [5] key. The platinum RTD, measuring receiver chamber temperature, is continuously sampled and the corresponding temperature is displayed in °C. The message displayed during this test is: TEMP=XX.XC CHA The [RESET] key returns control back to the diagnostic message, SELECT TEST 0-9. All other keys are ignored.

CONDENSER CHAMBER TEMPERATURE TEST. This test is selected by the [6] key. The platinum RTD, measuring condenser temperature, is continuously sampled and the corresponding temperature is displayed in °C. The message displayed during this test is: TEMP=XX.XC CON CONDENSER LIQUID LEVEL TEST. This test is selected by the [7] key. The transducer measuring the level of the liquid in the condenser is continuously sampled and the corresponding status is displayed. The two possible messages displayed are: COND LEVEL LOW or COND LEVEL OK FLASK HEATER TEST. This test is selected by the [8] key. The operator may enter set point wattage values. Control of the flask heater power to the entered value is performed. The watt transducer measuring the heater power is continuously sampled and the corresponding power is displayed in watts. The message displayed during this test is: SP=XXXW AC=YYYW The keys [0] through [9] and [ENTER] allow the operator to input set point wattage values.

X-Y RECORDER TEST and EIA RS-232-C COMMUNICATION TEST. (Optional) These tests are selected by the [4] and [9] keys (see Appendix I).

ADVANTAGES

The chief advantage of the above described system, compared to prior art distillation analyzers is its operational simplicity. With only a few exceptions, the test procedure is under microprocessor control from the beginning to the end. For example, the only truly manual steps involved in the gasoline test are loading the flask and measuring the residue when requested by the control panel. The built in step-by-step declaration of test parameters and automatic running of the test make the system almost foolproof. Moreover, a hard copy record is created not only of the test data but all of the pertinent conditions as well as the date, time and sample number, all on one document which may be initialed and saved as a permanent record. The computer memory automatically retains test parameters for repeating the same test without entering new data. Moreover, the software automatically preselects the end at endpoint test unless otherwise (or previously) directed. The computer is employed to make nearly infallible temperature corrections for the evaporated sample if required.

Hardware improvements are also present particularly in the receiving chamber drop and meniscus detector mechanisms. The slotted mask for the phototransistor enhances its resolution while the stepper motor drive insures computer accuracy and facilitates control of the distillation rate as well as measurement of the instantaneous distilled volume. The RTD cooling well is a particularly beneficial feature which takes advantage of the automatic temperature control of the receiving chamber and the graduate so that the graduate and RTD vapor sensor begin at the same controlled temperature as required by ASTM standards.

In addition, sensor is forced to simulate a glass thermometer by introducing a time lag in software for the temperature reading.

These advantages result in reducing the error rate, thus increasing the throughput of test samples. The increased test capability avoids costly deviations from product specifications at the refinery and insures the product market of satisfaction of existing ASTM standards. The extreme operational simplicity of the unit according to the invention allows less sophisticated operators to achieve the same degree of accuracy and reliability in each of the relatively complicated test procedures required by ASTM petroleum product standards.

The foregoing description and drawings relate to a preferred embodiment of the invention meant to illustrate rather than restrict the scope of the invention. The system can be adapted, for example, to other equivalent computer configurations.

Alternatively, components of the described test system may be omitted or modified to suit other test requirements. These and many other variations may be made without necessarily departing from the spirit or scope of the invention, as indicated by the appended claims and equivalents thereto:

APPENDIX I

```
DIRECTORY OF  F1:GCA.V41
NAME    EXT   BLKS    LENGTH  ATTR        NAME    EXT   BLKS   LENGTH  ATTR
XTEST   SRC   12      1399                RECRES  SRC   48     5988
MULTPY  SRC   12      1287                DIVIDE  SRC   12     1390
BINBCD  SRC   10      1109                BCDBIN  SRC   12     1281
EPCNTL  SRC   10      1147                RCNTL   SRC   14     1634
DISPLY  SRC   23      2715                LAG     SRC   6      594
EDITOR  SRC   79      9757                ETCNTL  SRC   17     1974
EVAP    SRC   66      8184                RTEST   SRC   19     2239
LTEST   SRC   9       982                 MESSAG  SRC   72     8845
STARTC  SRC   47      5820                RS232C  SRC   18     2148
KEYIN   SRC   16      1889                CKSUM   SRC   27     3209
RDPARM  SRC   28      3380                EOT     SRC   18     2138
CNTL2   SRC   60      7513                MOTOR   SRC   18     2055
DRAIN   SRC   17      1978                RST55   SRC   61     7658
ENDT    SRC   52      6501                START   SRC   96     11355
RMOTOR  SRC   23      2778                TTEST   SRC   22     2675
TMPTM   SRC   28      3404                CLOSS   SRC   46     5728
RAM     SRC   45      5533                RST65   SRC   86     10679
OPCNTL  SRC   22      2667                ENDIT   SRC   15     1671
MTEST   SRC   47      5805                XYTEST  SRC   13     1490
PLOT    SRC   8       893                 CNTL1   SRC   41     5094
DIAG    SRC   16      1852                CALIB   SRC   21     2540
EDATE   SRC   55      6847                RST75   SRC   50     6255
BTEST   SRC   13      1445                DDATE   SRC   13     1424
UDATE   SRC   31      3822                INSERT  SRC   18     2159
INIT    SRC   42      5187                PRINT   SRC   12     1358
PFOR    SRC   51      6311                CTEST   SRC   16     1799
WTEST   SRC   20      2418
                              1633
2946/4004 BLOCKS USED

LINK  :F1:RAM.OBJ, :F1:MESSAG.OBJ, :F1:INIT.OBJ, :F1:CALIB.OBJ, &
      :F1:KEYIN.OBJ, :F1:EDATE.OBJ, :F1:DDATE.OBJ, :F1:UDATE.OBJ, &
      :F1:INSERT.OBJ, :F1:EDITOR.OBJ, :F1:DISPLY.OBJ, :F1:BCDBIN.OBJ, &
      :F1:MULTPY.OBJ, :F1:BINBCD.OBJ, :F1:DIVIDE.OBJ, :F1:START.OBJ, &
      :F1:STARTC.OBJ, :F1:RDPARM.OBJ, :F1:PFOR.OBJ, :F1:PRINT.OBJ, &
      :F1:RST55.OBJ, :F1:RST65.OBJ, :F1:RST75.OBJ, :F1:CNTL1.OBJ, &
      :F1:CNTL2.OBJ, :F1:MOTOR.OBJ, :F1:RMOTOR.OBJ, :F1:ENDT.OBJ, &
```

:F1:ETCNTL.OBJ, :F1:RCNTL.OBJ, :F1:EPCNTL.OBJ, :F1:DPCNTL.OBJ, &
:F1:TMPTM.OBJ, :F1:EOT.OBJ, :F1:ENDIT.OBJ, :F1:DRAIN.OBJ, &
:F1:RECRES.OBJ, :F1:EVAP.OBJ, :F1:CLOSS.OBJ, :F1:PLOT.OBJ, :F1:LAG.OBJ, &
:F1:RS232C.OBJ, :F1:DIAG.OBJ, :F1:PTEST.OBJ, :F1:MTEST.OBJ, &
:F1:BTEST.OBJ, :F1:TTEST.OBJ, :F1:XYTEST.OBJ, :F1:CTEST.OBJ, &
:F1:LTEST.OBJ, :F1:WTEST.OBJ, :F1:XTEST.OBJ, :F1:CKSUM.OBJ &
TO :F1:ADAIII.OBJ MAP
LOCATE :F1:ADAIII.OBJ MAP COLUMNS(2) PRINT(:F1:LOC.MP2) PUBLICS &
CODE(40H) DATA(6000H)

ISIS-II OBJECT LOCATER V2.0 INVOKED BY
-LOCATE :F1:ADAIII.OBJ MAP COLUMNS(2) PRINT(:F1:LOC.MP2) PUBLICS &
**CODE(40H) DATA(6000H)

SYMBOL TABLE OF MODULE ADAIII
READ FROM FILE :F1:ADAIII.OBJ
WRITTEN TO FILE :F1:ADAIII

| VALUE | TYPE | SYMBOL | VALUE | TYPE | SYMBOL |
|---|---|---|---|---|---|
| 0276H | PUB | BLANK  | 064EH | PUB | CLTBL  |
| 00C5H | PUB | DMES1  | 0154H | PUB | DMES10 |
| 0164H | PUB | DMES11 | 0174H | PUB | DMES12 |
| 0184H | PUB | DMES13 | 0194H | PUB | DMES14 |
| 01A2H | PUB | DMES15 | 01AAH | PUB | DMES16 |
| 01B2H | PUB | DMES17 | 01BAH | PUB | DMES18 |
| 01C2H | PUB | DMES19 | 00D4H | PUB | DMES2  |
| 01D2H | PUB | DMES20 | 01E2H | PUB | DMES21 |
| 01F2H | PUB | DMES22 | 0202H | PUB | DMES23 |
| 0212H | PUB | DMES24 | 0222H | PUB | DMES25 |
| 00E4H | PUB | DMES3  | 00F4H | PUB | DMES4  |
| 0104H | PUB | DMES5  | 0114H | PUB | DMES6  |
| 0124H | PUB | DMES7  | 0134H | PUB | DMES8  |
| 0144H | PUB | DMES9  | 0389H | PUB | DR1    |
| 0392H | PUB | DR2    | 039BH | PUB | DR3    |
| 0641H | PUB | EVAPVB | 0634H | PUB | EVAPVT |
| 0040H | PUB | IMES   | 0232H | PUB | MONTAB |
| 0256H | PUB | MONTBL | 004BH | PUB | MTAB   |
| 00ACH | PUB | MTABDC | 034AH | PUB | PMDC   |
| 0262H | PUB | PMES   | 03A4H | PUB | PMES1  |
| 041FH | PUB | PMES10 | 0433H | PUB | PMES11 |
| 043CH | PUB | PMES12 | 0450H | PUB | PMES13 |
| 0464H | PUB | PMES14 | 0478H | PUB | PMES15 |
| 048CH | PUB | PMES16 | 0493H | PUB | PMES17 |
| 04A7H | PUB | PMES18 | 04BBH | PUB | PMES19 |
| 03AFH | PUB | PMES2  | 04CCH | PUB | PMES20 |
| 04E0H | PUB | PMES21 | 04F4H | PUB | PMES22 |
| 0508H | PUB | PMES23 | 051CH | PUB | PMES24 |
| 0530H | PUB | PMES25 | 0544H | PUB | PMES26 |
| 0558H | PUB | PMES27 | 056CH | PUB | PMES28 |
| 0580H | PUB | PMES29 | 03C0H | PUB | PMES3  |
| 0594H | PUB | PMES30 | 05A8H | PUB | PMES31 |
| 05BCH | PUB | PMES32 | 05D0H | PUB | PMES33 |
| 05E4H | PUB | PMES34 | 05F8H | PUB | PMES35 |
| 060CH | PUB | PMES36 | 0620H | PUB | PMES37 |
| 03D4H | PUB | PMES4  | 03DBH | PUB | PMES5  |
| 03EAH | PUB | PMES6  | 03F3H | PUB | PMES7  |
| 03FFH | PUB | PMES8  | 040BH | PUB | PMES9  |
| 0366H | PUB | RAN1   | 036DH | PUB | RAN2   |
| 0374H | PUB | RAN3   | 037BH | PUB | RAN4   |
| 0382H | PUB | RAN5   | 00BCH | PUB | SPARC  |
| 0790H | PUB | DSPLY  | 06C6H | PUB | INIT   |
| 07AEH | PUB | CALIB  | 0830H | PUB | KCHS   |
| 0920H | PUB | KDF    | 0846H | PUB | KDPT   |
| 0836H | PUB | KENTER | 084EH | PUB | KEYIN  |
| 0821H | PUB | KRESET | 0834H | PUB | KSTART |
| 092CH | PUB | KTAB   | 084DH | PUB | R0300  |
| 0845H | PUB | R0400  | 082DH | PUB | R20300 |

| | | | | | |
|---|---|---|---|---|---|
| 0835H | PUB | R32572 | 082DH | PUB | R32752 |
| 084CH | PUB | R45 | 0844H | PUB | R60 |
| 083CH | PUB | R90 | 082FH | PUB | SBUZZ |
| 0946H | PUB | CKYEAR | 0869H | PUB | EDATE |
| 096FH | PUB | PACKD | 09E9H | PUB | DDATE |
| 0A4AH | PUB | UDATE | 0B0DH | PUB | INSERT |
| 0B3DH | PUB | XMIT | 0864H | PUB | EDITOR |
| 0DA5H | PUB | DISPLY | 0DFEH | PUB | BCDBIN |
| 0E40H | PUB | MULTPY | 0E76H | PUB | BINBCD |
| 0EA3H | PUB | DIVIDE | 10A4H | PUB | CALC |
| 0EE8H | PUB | START | 118BH | PUB | STARTC |
| 12EAH | PUB | READA | 1357H | PUB | READB |
| 13A9H | PUB | PFOR | 14F2H | PUB | PSYNC |
| 1515H | PUB | PRINT | 1547H | PUB | RST55 |
| 1688H | PUB | RST55C | 1717H | PUB | DIVD1 |
| 171BH | PUB | DIVD2 | 171FH | PUB | MULC1 |
| 1721H | PUB | MULC2 | 1723H | PUB | RST65 |
| 1AF4H | PUB | RDBUF | 19D5H | PUB | RST75 |
| 1AE3H | PUB | SDBUF | 1B80H | PUB | CNTL1 |
| 1C0AH | PUB | GETW | 1C86H | PUB | PLOOP |
| 1C56H | PUB | PRESET | 1C9CH | PUB | CNTL2 |
| 1D0BH | PUB | CONT | 1CB2H | PUB | GTEMP |
| 1D77H | PUB | UNPAK | 1E52H | PUB | MOTOR |
| 1F1DH | PUB | DRLLS | 1EC3H | PUB | RMOTOR |
| 1F66H | PUB | ENDT | 2106H | PUB | MOVE |
| 20B0H | PUB | VOLCAL | 2155H | PUB | CKENDT |
| 2112H | PUB | ETCNTL | 2149H | PUB | STOPA |
| 2176H | PUB | RCNTL | 21C0H | PUB | EPCNTL |
| 21F3H | PUB | DPCNTL | 229EH | PUB | CKSMIN |
| 22EDH | PUB | SEPVOL | 2279H | PUB | TMPTM |
| 2332H | PUB | EOT | 23A0H | PUB | ENDIT |
| 2442H | PUB | DISPUP | 23F4H | PUB | DRAIN |
| 2465H | PUB | RECRES | 25C8H | PUB | EVAP |
| 27DEH | PUB | CLOSS | 2936H | PUB | PLOT |
| 2988H | PUB | LAG | 298EH | PUB | MLAG |
| 299FH | PUB | RS232C | 29F9H | PUB | DIAG |
| 2A58H | PUB | PTEST | 2ADCH | PUB | MTEST |
| 2C93H | PUB | BTEST | 2CDDH | PUB | TTEST |
| 2D7AH | PUB | XYTEST | 2DE1H | PUB | CHTEST |
| 2E2BH | PUB | CONTST | 2E3BH | PUB | LTEST |
| 2E72H | PUB | WTEST | 2F04H | PUB | XTEST |
| 2F43H | PUB | CKSUM | 2FE0H | PUB | CKSUM0 |
| 609EH | PUB | BAROM | 6160H | PUB | BH5L |
| 6161H | PUB | BH5M | 6048H | PUB | CHARC |
| 615BH | PUB | CHTMF | 605FH | PUB | CORRF |
| 605EH | PUB | COPSW | 6010H | PUB | DAY |
| 604AH | PUB | DBUF | 608AH | PUB | DBUFS |
| 60A1H | PUB | DIAGSW | 6000H | PUB | DIP |
| 609AH | PUB | DIVP | 6002H | PUB | DLYSW |
| 606AH | PUB | DPTIME | 6041H | PUB | EATDP |
| 6045H | PUB | EATREC | 603DH | PUB | EATT |
| 603AH | PUB | ELOSS | 6061H | PUB | EMODE |
| 617BH | PUB | EPT | 6178H | PUB | EPVOL |
| 615AH | PUB | ERRSW | 6064H | PUB | ETEMP |
| 617EH | PUB | EVAPB | 6175H | PUB | EVAPT |
| 6177H | PUB | EVAPV | 6062H | PUB | FHMAP |
| 6028H | PUB | FILLSW | 615EH | PUB | H5L |
| 615FH | PUB | H5M | 6012H | PUB | HOUP |
| 6033H | PUB | IBP | 6017H | PUB | IBUF |
| 6066H | PUB | IFH | 6068H | PUB | IFHC |
| 6036H | PUB | IFHT | 6089H | PUB | IMASK |
| 6030H | PUB | INITHT | 6053H | PUB | IPSL |
| 6054H | PUB | IPSM | 6181H | PUB | LAGTBL |
| 6158H | PUB | LIQLEV | 617DH | PUB | LOSS |
| 6180H | PUB | LOSSB | 6003H | PUB | LTL |
| 6004H | PUB | LTM | 6009H | PUB | MAXL |

| | | | | | |
|---|---|---|---|---|---|
| 600AH | PUB | MAXM | 6049H | PUB | MESNO |
| 6016H | PUB | MINCTR | 6007H | PUB | MINL |
| 6008H | PUB | MINM | 6014H | PUB | MINUTE |
| 600EH | PUB | MONTH | 609CH | PUB | MULP |
| 6001H | PUB | PHASE | 6059H | PUB | PINC |
| 6072H | PUB | PINCT | 6073H | PUB | PRINTB |
| 6159H | PUB | PROM | 616CH | PUB | PTEMP |
| 605CH | PUB | R55SW | 605BH | PUB | R65SW |
| 605AH | PUB | R75SW | 6099H | PUB | RCSW |
| 606CH | PUB | RUNAY | 6098H | PUB | S12C |
| 605DH | PUB | S5MIN | 6029H | PUB | SAMPNO |
| 616EH | PUB | SATEMP | 6057H | PUB | SETPTL |
| 6058H | PUB | SETPTM | 606EH | PUB | SIGNC |
| 6005H | PUB | SLOPEL | 6006H | PUB | SLOPEM |
| 6027H | PUB | SPARC | 6029H | PUB | SPART |
| 6096H | PUB | STEPC | 6093H | PUB | TEMPL |
| 6094H | PUB | TEMPM | 6055H | PUB | TIMEL |
| 6056H | PUB | TIMEM | 606DH | PUB | TMTP |
| 600BH | PUB | TRDR | 60A4H | PUB | TV |
| 60A2H | PUB | TVP | 619BH | PUB | TXDP |
| 619DH | PUB | TXDT | 606FH | PUB | UID |
| 6095H | PUB | VOL | 6087H | PUB | WATTL |
| 6088H | PUB | WATTM | 600CH | PUB | YEAR |

MEMORY MAP OF MODULE ADAIII
READ FROM FILE :F1:ADAIII.OBJ
WRITTEN TO FILE :F1:ADAIII
MODULE START ADDRESS 06C6H

| START | STOP | LENGTH | REL | NAME |
|---|---|---|---|---|
| 0000H | 003FH | 40H | A | ABSOLUTE |
| 0040H | 2FE8H | 2FA9H | B | CODE |
| 2FE9H | 2FF4H | CH | B | STACK |
| 6000H | 6584H | 585H | B | DATA |
| 6585H | F6BFH | 913BH | B | MEMORY |

ASM80 F1:FAN.SRC

ISIS-II 8080/8085 MACRO ASSEMBLER, V2.0          MODULE
RAM STORAGE DECLARATIONS

```
LOC  OBJ         SEQ        SOURCE STATEMENT

1  $         TITLE('RAM STORAGE DECLARATIONS') PAGEWIDTH(105) DEBUG
                  2                    ;WRITTEN 01/28/81
                  3                    ;UPDATED 04/02/82
                  4                    ;THIS ROUTINE CONTAINS ALL THE DATA DECLARATIONS
                  5                    ;USED IN ADAIII
                  6            PUBLIC  LTL,LTM,SLOPEL,SLOPEM,MINL,MINM,MAXL,MAXM,IBUF,SPARC,TRDR
                  7            PUBLIC  FILLSW,SPART,SAMPNO,INITHT,IBP,IFHT,ELOSS,EATT,EATLP,EATREC
                  8            PUBLIC  CHARC,MESNO,DBUF,IPSL,IPSM,TIMEL,TIMEM,SETPTL,SETPTM,PINC
                  9            PUBLIC  R75SW,R65SW,R55SW,S5MIN,CORSW,CORRF,EMODE,FHMARK,ETEMP
                 10            PUBLIC  IFH,IFHC,OPTIME,RUNAY,TMTP,SIGNC,UID,PINCT,PRINTB,WATTL
                 11            PUBLIC  WATTM,IMASK,DBUFS,TEMPL,TEMPM,VOL,STEPC,S12C,RCSW,DIVP
                 12            PUBLIC  TVP,TV,BAROM,CHTMP,H5L,H5M,BH5L,BH5M,DIR,PHASE,DLYSW,PTEMP
                 13            PUBLIC  SATEMP,EVAPT,EVAPV,EPVOL,EPT,LOSS,EVAPB,LOSSB,PROM,ERRSW
                 14            PUBLIC  LAGTBL,YEAR,MONTH,DAY,HOUR,MINUTE,LIQLEV,MINCTR,TXDP,TXDT
                 15            PUBLIC  MULP,DIAGSW
                 16            DSEG
0001             17  DIR       DS      1         ;MOTOR DIRECTION LOCATION
0001             18  PHASE     DS      1         ;MOTOR PHASE SETTING LOCATION
0001             19  DLYSW     DS      1         ;DELAY SWITCH FOR SELECTING MOTOR SPEED
0001             20  LTL       DS      1         ;LINE PERIOD LEAST SIGINIFICANT BYTE
0001             21  LTM       DS      1         ;LINE PERIOD MOST SIGINIFICANT BYTE
```

```
0001            22 SLOPEL  DS      1       ;CONTROL SLOPE LSB'S (COUNTS/WATT)
0001            23 SLOPEM  DS      1       ;CONTROL SLOPE MSB'S (COUNTS/WATT)
0001            24 MINL    DS      1       ;MINIMUM PHASE ANGLE LSB'S (COUNTS)
0001            25 MINM    DS      1       ;MINIMUM PHASE ANGLE MSB'S (COUNTS)
0001            26 MAXL    DS      1       ;MAXIMUM PHASE ANGLE LSB'S (COUNTS)
0001            27 MAXM    DS      1       ;MAXIMUM PHASE ANGLE MSB'S (COUNTS)
0001            28 TRDR    DS      1       ;TEMPERATURE RANGE & DISTILLATION RATE
0002            29 YEAR    DS      2       ;ASCII YEAR
0002            30 MONTH   DS      2       ;ASCII MONTH
0002            31 DAY     DS      2       ;ASCII DAY
0002            32 HOUR    DS      2       ;ASCII HOUR
0002            33 MINUTE  DS      2       ;ASCII MINUTE
0001            34 MINCTR  DS      1       ;REAL TIME CLOCK MINUTE COUNTER
0010            35 IBUF    DS      16      ;INSERT BUFFER USED FOR DISPLAY
0001            36 SPARC   DS      1       ;SYSTEM PARAMETER COUNTER
0001            37 FILLSW  DS      1       ;FILL IBUF VARIABLE WITH ZERO'S SWITCH
001F            38 SPART   DS      31      ;SYSTEM PARAMETER TABLE
0029          D 39 SAMPNO  EQU     SPART   ;SAMPLE NUMBER HAS 7 BYTES
0030          D 40 INITHT  EQU     SPART+7 ;INITIAL HEAT HAS 3 BYTES
0033          D 41 IBP     EQU     SPART+10;HEAT AT INITIAL BOILING POINT HAS 3 BYTES
0036          D 42 IFHT    EQU     SPART+13;INCREASE FINAL HEAT HAS 4 BYTES
003A          D 43 ELOSS   EQU     SPART+17;EXPECTED LOSS HAS 3 BYTES
003D          D 44 EATT    EQU     SPART+20;END AT TEMP HAS 4 BYTES
0041          D 45 EATDP   EQU     SPART+24;END AT DP HAS 4 BYTES
0045          D 46 EATREC  EQU     SPART+28;END AT % RECOVERED HAS 3 BYTES
0001            47 CHARC   DS      1       ;CHARACTER COUNTER
0001            48 MESNO   DS      1       ;MESSAGE NUMBER
0009            49 DBUF    DS      9       ;USED FOR CALCULATIONS IN VARIOUS ROUTINES
0001            50 IPSL    DS      1       ;INITIAL POWER SETTING LSB'S (COUNTS)
0001            51 IPSM    DS      1       ;INITIAL POWER SETTING MSB'S (COUNTS)
0001            52 TIMEL   DS      1       ;TIME COUNTER LSB'S IN 2 SECOND INCREMENTS
0001            53 TIMEM   DS      1       ;TIME COUNTER MSB'S
0001            54 SETPTL  DS      1       ;BINARY SET POINT LSB'S
0001            55 SETPTM  DS      1       ;BINARY SET POINT MSB'S
0001            56 PINC    DS      1       ;PHASE INCREASING CONSTANT
0001            57 R75SW   DS      1       ;INTERRUPT RST7.5 SWITCH
0001            58 R65SW   DS      1       ;INTERRUPT RST6.5 SWITCH
0001            59 R55SW   DS      1       ;INTERRUPT RST5.5 SWITCH
0001            60 S5MIN   DS      1       ;5 MINUTE SWITCH
0001            61 CORSW   DS      1       ;CORRECTION SWITCH USED FOR BAROMETRIC CORRECTIONS
005F 0100       62 CORRF   DW      1       ;TEMPERATURE CORRECTION FACTOR BASED ON PRESSURE
0001            63 EMODE   DS      1       ;END MODE BYTE
                64                         ;0=END AT END POINT
                65                         ;1=END AT TEMPERATURE
                66                         ;2=END AT D.P.
                67                         ;4=END AT % RECOVERED
0002            68 FHMARK  DS      2       ;FINAL HEAT MARK = 94% - EXPECTED LOSS
0002            69 ETEMP   DS      2       ;END TEMPERATURE (BINARY)
0002            70 IFH     DS      2       ;INCREASE FINAL HEAT VALUE (BINARY)
0002            71 IFHC    DS      2       ;INCREASE FINAL HEAT VALUE (COUNTS)
0002            72 DPTIME  DS      2       ;D.P. TIME INTERVAL (TIMER COUNTS)
0001            73 RUNAY   DS      1       ;INCREASING POWER RUN AWAY USED AS A TRAP
0001            74 TMTR    DS      1       ;TIME TRAP BYTE FOR NO MENISCUS MOVEMENT IN CNTL3
0001            75 SIGNC   DS      1       ;SIGN OF THE CORRECTION FACTOR
0003            76 UID     DS      3       ;UNIT I.D. STORAGE LOCATION
0001            77 PINCT   DS      1       ;PHASE ANGLE INCREASING POWER VALUE
0014            78 PRINTB  DS      20      ;PRINTER BUFFER
0001            79 WATTL   DS      1       ;BINARY WATTMETER READING LSB'S
0001            80 WATTM   DS      1       ;BINARY WATTMETER READING MSB'S
0001            81 IMASK   DS      1       ;INTERRUPT MASK
0009            82 DBUFS   DS      9       ;DATA BUFFER SAVE LOCATIONS
0001            83 TEMPL   DS      1       ;BINARY TEMPERATURE LSB'S
0001            84 TEMPM   DS      1       ;BINARY TEMPERATURE MSB'S
0001            85 VOL     DS      1       ;BCD VOLUME IN ML
0002            86 STEPC   DS      2       ;MOTOR STEP COUNTER BINARY 0 TO 1200
```

```
0001            87  S12C    DS      1       ;12 STEP COUNTER 0 TO 12 MOTOR STEPS (12 = 1ML)
0001            88  RCSW    DS      1       ;RATE CALCULATE SWITCH
009A 0200       89  DIVP    DW      2       ;DIVIDEND POINTER USED IN RATE CALCULATIONS
009C 0100       90  MULP    DW      1       ;MULTIPLY POINTER USED IN TIME TO 5ML MARK
0003            91  BAROM   DS      3       ;ASCII BAROMETRIC PRESSURE
0001            92  DIAGSW  DS      1       ;DIAGNOSTIC SWITCH = 1 WHEN IN DIAG ROUTINE
0002            93  TVP     DS      2       ;TEMPERATURE VOLUME TABLE POINTER
00C8            94  TV      DS      200     ;TEMPERATURE VOLUME TABLE
0158        D   95  LIQLEV  EQU     TV+180  ;CONDENSER LIQUID LEVEL AVERAGING BYTE
0159        D   96  PROM    EQU     TV+181  ;EPROM NUMBER UNDER TEST (0 - 5)
015A        D   97  ERRSW   EQU     TV+182  ;ERROR SWITCH( 0 = NO CHECK SUM ERRORS)
015B        D   98  CHTMP   EQU     TV+183  ;ASCII CHAMBER TEMP OR CONDENSER TEMP
015E        D   99  H5L     EQU     TV+186  ;5 MINUTE HEAT LSB'S (COUNTS)
015F        D  100  H5M     EQU     TV+187  ;5 MINUTE HEAT MSB'S (COUNTS)
0160        D  101  BH5L    EQU     TV+188  ;BINARY 5 MINUTE HEAT LSB'S
0161        D  102  BH5M    EQU     TV+189  ;BINARY 5 MINUTE HEAT MSB'S
016C 0100      103  PTEMP   DW      1       ;PREVIOUS TEMPERATURE STORAGE
0007           104  SATEMP  DS      7       ;SAVE ASCII TEMPERATURE LOCATIONS (HIGHEST VALUE)
0175 0100      105  EVAPT   DW      1       ;EVAPORATED BCD TABLE POINTER
0001           106  EVAPV   DS      1       ;EVAPORATED VOLUME TRAP POINT
0003           107  EPVOL   DS      3       ;END POINT ASCII VOLUME
017B 0100      108  EPT     DW      1       ;END POINT TEMPERATURE POINTER
0001           109  LOSS    DS      1       ;BCD PACKED CALCULATED LOSS (X.X%)
017E 0100      110  EVAPB   DW      1       ;EVAPORATED BINARY TABLE POINTER
0001           111  LOSSB   DS      1       ;BINARY LOSS VALUE < 25.5 ML
0002           112  LAGTBL  DS      2       ;MOST RECENT BINARY TEMP
0002           113          DS      2       ;BINARY TEMP  1 RST7.5 SEC AGO
0002           114          DS      2       ;BINARY TEMP  2 RST7.5 SEC AGO
0002           115          DS      2       ;BINARY TEMP  3 RST7.5 SEC AGO
0002           116          DS      2       ;BINARY TEMP  4 RST7.5 SEC AGO
0002           117          DS      2       ;BINARY TEMP  5 RST7.5 SEC AGO
0002           118          DS      2       ;BINARY TEMP  6 RST7.5 SEC AGO
0002           119          DS      2       ;BINARY TEMP  7 RST7.5 SEC AGO
0002           120          DS      2       ;BINARY TEMP  8 RST7.5 SEC AGO
0002           121          DS      2       ;BINARY TEMP  9 RST7.5 SEC AGO
0002           122          DS      2       ;BINARY TEMP 11 RST7.5 SEC AGO
0002           123          DS      2       ;BINARY TEMP 12 RST7.5 SEC AGO
0002           124          DS      2       ;BINARY TEMP 13 RST7.5 SEC AGO
019B 0100      125  TXDP    DW      1       ;TRANSMITTED DATA TABLE POINTER
03E8           126  TXDT    DS      1000    ;TRANSMITTED DATA TABLE
               127          END
```

PUBLIC SYMBOLS

| | | | | | | | | | | |
|---|---|---|---|---|---|---|---|---|---|---|
| BAROM | D 009E | BH5L | D 0160 | BH5M | D 0161 | CHARC | D 0048 | CHTMP | D 015B | CORRF | D 005F |
| CORSW | D 005E | DAY | D 0010 | DBUF | D 004A | DBUFS | D 008A | DIAGSW | D 00A1 | DIR | D 0000 |
| DIVP | D 009A | DLYSW | D 0002 | DPTIME | D 006A | EATDP | D 0041 | EATREC | D 0045 | EATT | D 003D |
| ELOSS | D 003A | EMODE | D 0061 | EPT | D 017B | EPVOL | D 0178 | ERRSW | D 015A | ETEMP | D 0064 |
| EVAPB | D 017E | EVAPT | D 0175 | EVAPV | D 0177 | FHMARK | D 0062 | FILLSW | D 0028 | H5L | D 015E |
| H5M | D 015F | HOUR | D 0012 | IBP | D 0033 | IBUF | D 0017 | IFH | D 0066 | IFHC | D 0068 |
| IFHT | D 0036 | IMASK | D 0089 | INITHT | D 0030 | IPSL | D 0053 | IPSM | D 0054 | LAGTBL | D 0181 |
| LIQLEV | D 0158 | LOSS | D 017D | LOSSB | D 0180 | LTL | D 0003 | LTM | D 0004 | MAXL | D 0009 |
| MAXM | D 000A | MESNO | D 0049 | MINCTR | D 0016 | MINL | D 0007 | MINM | D 0008 | MINUTE | D 0014 |
| MONTH | D 000E | MULP | D 009C | PHASE | D 0001 | PINC | D 0059 | PINCT | D 0072 | PRINTB | D 0073 |
| PROM | D 0159 | PTEMP | D 016C | R55SW | D 005C | R65SW | D 005B | R75SW | D 005A | RCSW | D 0099 |
| RUNAY | D 006C | S12C | D 0098 | S5MIN | D 005D | SAMPNO | D 0029 | SATEMP | D 016E | SETPTL | D 0057 |
| SETPTM | D 0058 | SIGNC | D 006E | SLOPEL | D 0005 | SLOPEM | D 0006 | SPARC | D 0027 | SPART | D 0029 |
| STEPC | D 0096 | TEMPL | D 0093 | TEMPM | D 0094 | TIMEL | D 0055 | TIMEM | D 0056 | TMTP | D 006D |
| TRDR | D 000B | TV | D 00A4 | TVP | D 00A2 | TXDP | D 019B | TXDT | D 019D | UID | D 006F |
| VOL | D 0095 | WATTL | D 0087 | WATTM | D 0088 | YEAR | D 000C | | | | |

EXTERNAL SYMBOLS

USER SYMBOLS

| | | | | | | | | | | |
|---|---|---|---|---|---|---|---|---|---|---|
| BAROM | D 009E | BH5L | D 0160 | BH5M | D 0161 | CHARC | D 0048 | CHTMP | D 015B | CORRF | D 005F |
| CORSW | D 005E | DAY | D 0010 | DBUF | D 004A | DBUFS | D 008A | DIAGSW | D 00A1 | DIR | D 0000 |

| | | | | | | | | | | | | | | |
|---|---|---|---|---|---|---|---|---|---|---|---|---|---|---|
| DIVP | D 009A | DLYSW | D 0002 | DPTIME | D 006A | EATDP | D 0041 | EATREC | D 0045 | EAIT | D 003D |
| ELOSS | D 003A | EMODE | D 0061 | EPT | D 017B | EPVOL | D 0178 | ERRSW | D 015A | ETEMP | D 0064 |
| EVAPB | D 017E | EVAPT | D 0175 | EVAPV | D 0177 | FHMARK | D 0062 | FILLSW | D 0028 | H5L | D 015E |
| H5M | D 015F | HOUR | D 0012 | IBP | D 0033 | IBUF | D 0017 | IFH | D 0066 | IFHC | D 0068 |
| IFHT | D 0036 | IMASK | D 0089 | INITHT | D 0030 | IPSL | D 0053 | IPSM | D 0054 | LAGTBL | D 0181 |
| LIQLEV | D 0158 | LOSS | D 017D | LOSSB | D 0180 | LTL | D 0003 | LTM | D 0004 | MAXL | D 0009 |
| MAXM | D 000A | MESNO | D 0049 | MINCTR | D 0016 | MINL | D 0007 | MINM | D 0008 | MINUTE | D 0014 |
| MONTH | D 000E | MULP | D 009C | PHASE | D 0001 | PINC | D 0059 | PINCT | D 0072 | PRINTB | D 0073 |
| PROM | D 0159 | PTEMP | D 016C | R55SW | D 005C | R65SW | D 005B | R75SW | D 005A | RCSW | D 0099 |
| RUNAV | D 006C | S12C | D 0098 | S5MIN | D 005D | SAMPNO | D 0029 | SATEMP | D 016E | SETPTL | D 0057 |
| SETPTM | D 0058 | SIGNC | D 006E | SLOPEL | D 0005 | SLOPEM | D 0006 | SPARC | D 0027 | SPART | D 0029 |
| STEPC | D 0096 | TEMPL | D 0093 | TEMPM | D 0094 | TIMEL | D 0055 | TIMEM | D 0056 | TMTP | D 006D |
| TRDR | D 000B | TV | D 00A4 | TVP | D 00A2 | TXDP | D 019B | TXDT | D 019D | UID | D 006F |
| VOL | D 0095 | WATTL | D 0087 | WATTM | D 0088 | YEAR | D 000C | | | | |

ASSEMBLY COMPLETE, NO ERRORS

ASM80 .F1.MESSAG.SRC

ISIS-II 8080/8085 MACRO ASSEMBLER, V2.0
MESSAGE ROUTINE

```
LOC  OBJ           SEQ         SOURCE STATEMENT

1  $        TITLE('MESSAGE ROUTINE') PAGEWIDTH(105) DEBUG
                    2                     ;WRITTEN 01/28/81
                    3                     ;UPDATED 05/03/82
                    4                     ;THIS ROUTINE CONTAINS THE DATA DEFINITIONS OF
                    5                     ;THE MESSAGES USED FOR DISPLAY AND PRINTING.
                    6                     ;ALSO, SOME TABLES USED ARE DEFINED HERE.
                    7        PUBLIC   IMES,MTAB,MTABDC,SPARC,MONTAB,MONTBL,BLANK
                    8        PUBLIC   DMES1,DMES2,DMES3,DMES4,DMES5,DMES6,DMES7,DMES8,DMES9,DMES10
                    9        PUBLIC   DMES11,DMES12,DMES13,DMES14,DMES15,DMES16,DMES17,DMES18
                   10        PUBLIC   DMES19,DMES20,DMES21,DMES22,DMES23,DMES24,DMES25
                   11        PUBLIC   RAN1,RAN2,RAN3,RAN4,RAN5,DR1,DR2,DR3,EVAPVT,EVAPVB,CLTBL
                   12        PUBLIC   PMES,PMDC,PMES1,PMES2,PMES3,PMES4,PMES5,PMES6,PMES7,PMES8
                   13        PUBLIC   PMES9,PMES10,PMES11,PMES12,PMES13,PMES14,PMES15,PMES16
                   14        PUBLIC   PMES17,PMES18,PMES19,PMES20,PMES21,PMES22,PMES23,PMES24
                   15        PUBLIC   PMES25,PMES26,PMES27,PMES28,PMES29,PMES30,PMES31,PMES32
                   16        PUBLIC   PMES33,PMES34,PMES35,PMES36,PMES37
                   17        CSEG
0000 20204E4F      18  IMES: DB       '  NO'           ;INITILIZATION MESSAGE USED IN INIT ROUTINE
0004 20204E4F      19        DB       '  NO'
0008 204E4F        20        DB       ' NO'
000B 53414D50      21  MTAB: DB       'SAMPLE   '      ;MESSAGE TABLE USED IN DISPLY ROUTINE
000F 4C452020
0013 20
0014 494E4954      22        DB       'INITIAL HT W'
0018 49414C20
001C 48542020
0020 57
0021 35204D49      23        DB       '5 MINUTE HT W'
0025 4E555445
0029 20485420
002D 57
002E 494E4320      24        DB       'INC FIN HT W'
0032 46494E20
0036 48542057
003A 45585045      25        DB       'EXPECT LOSS %'
003E 43542020
0042 4F535320
0046 25
0047 454E4420      26        DB       'END AT TEMP'
004B 41542054
```

```
004F 454D5020
0053 454E4420   27       DB        'END AT DP   '
0057 41542044
005B 50202020
005F 454E4420   28       DB        'END AT % REC '
0063 41542025
0067 20524543
006B 20
006C 00         29 MTABDC DB       0,9                  ;MESSAGE TABLE DISPLACEMENT & COUNT
006D 09
006E 09         30       DB        9,12                 ;DISPLACEMENT FROM MTAB
006F 0C
0070 16         31       DB        22,12                ;# OF CHARACTERS
0071 0C
0072 23         32       DB        35,11                ;USED IN DISPLY ROUTINE
0073 0B
0074 2F         33       DB        47,12
0075 0C
0076 3C         34       DB        60,12
0077 0C
0078 48         35       DB        72,12
0079 0C
007A 54         36       DB        84,13
007B 0D
007C 00         37 SPARD DB        0,7,10               ;SYSTEM PARAMETER DISPLACEMENT TABLE
007D 07
007E 0A
007F 0D         38       DB        13,17,20,24,28,31    ;USED IN DISPLY ROUTINE
0080 11
0081 14
0082 18
0083 1C
0084 1F
0085 30302E30   39 DMES1 DB        '00.0M000 0 000W'    ;USED IN START ROUTINE
0089 4D303030
008D 2E302030
0091 303057
0094 52455349   40 DMES2 DB        'RESIDUE   0.0ML'    ;USED IN RECRES ROUTINE
0098 44554520
009C 20202030
00A0 2E304D4C
00A4 42414420   41 DMES3 DB        'BAD EPROM   '       ;USED IN CKSUM ROUTINE
00A8 4550524F
00AC 4D202020
00B0 20202020
00B4 47434120   42 DMES4 DB        'GCA ADAIII V0.1'    ;USED IN INIT ROUTINE
00B8 20414441
00BC 49494920
00C0 56302E31
00C4 2D2D2D2D   43 DMES5 DB        '----PRINTING----'   ;USED IN START ROUTINE
00C8 5052494E
00CC 54494E47
00D0 2D2D2D2D
00D4 205A4552   44 DMES6 DB        ' ZERO CROSSING '    ;USED IN INIT ROUTINE
00D8 4F202043
00DC 524F5353
00E0 494E4720
00E4 20205245   45 DMES7 DB        '  RESET MOTOR  '    ;USED IN START ROUTINE
00E8 53455420
00EC 204D4F54
00F0 4F522020
00F4 52454144   46 DMES8 DB        'READ PARAMETERS'    ;USED IN START ROUTINE
00F8 20205041
00FC 5241D45
0100 54455253
0104 53454C45   47 DMES9 DB        'SELECT TEST 0--9'   ;USED IN DIAG ROUTINE
0108 43542054
```

```
010C 45535420
0110 30202D39
0114 52414D20    48 DMES10  DB       'RAM TEST PASSED'    ;USED IN RAMTST ROUTINE
0118 54455354
011C 20504153
0120 53454420
0124 52414D20    49 DMES11  DB       'RAM TEST FAILED '   ;USED IN RAMTST ROUTINE
0128 54455354
012C 20464149
0130 4C454420
0134 2A2A5452    50 DMES12  DB       'TRANSMITTING'   ;USED IN RS232C ROUTINE
0138 414E534D
013C 49545449
0140 4E472A2A
0144 4D4F544F    51 DMES13  DB       'MOTOR TEST     '    ;USED IN MTEST ROUTINE
0148 52205445
014C 53542020
0150 20202020
0154 454E5445    52 DMES14  DB       'ENTER YEAR 19'      ;USED IN EDATE ROUTINE
0158 52205945
015C 41522020
0160 3139
0162 4D4F4E54    53 DMES15  DB       'MONTH   '           ;USED IN EDATE ROUTINE
0166 48202020
016A 44415920    54 DMES16  DB       'DAY     '           ;USED IN EDATE ROUTINE
016E 20202020
0172 484F5552    55 DMES17  DB       'HOUR    '           ;USED IN EDATE ROUTINE
0176 20202020
017A 4D494E55    56 DMES18  DB       'MINUTE  '           ;USED IN EDATE ROUTINE
017E 54452020
0182 54454D50    57 DMES19  DB       'TEMP=XXX.X? VAP'    ;USED IN TTEST ROUTINE
0186 3D585858
018A 2E583F20
018E 20564150
0192 582D5920    58 DMES20  DB       'X-Y TEST       '    ;USED IN XYTEST ROUTINE
0196 54455354
019A 20202020
019E 20202020
01A2 54454D50    59 DMES21  DB       'TEMP= XX.XC CHA'    ;USED IN CTEST ROUTINE
01A6 3D205858
01AA 2E584320
01AE 20434841
01B2 54454D50    60 DMES22  DB       'TEMP= XX.XC CON'    ;USED IN CTEST ROUTINE
01B6 3D205858
01BA 2E584320
01BE 20434F4E
01C2 434F4E44    61 DMES23  DB       'COND LEVEL     '    ;USED IN LTEST ROUTINE
01C6 204C4556
01CA 454C2020
01CE 20202020
01D2 53503D30    62 DMES24  DB       'SP=000W AC= 000W'   ;USED IN WTEST ROUTINE
01D6 30305720
01DA 41433D20
01DE 30303057
01E2 52532D32    63 DMES25  DB       'RS-232-C TEST  '    ;USED IN XTEST ROUTINE
01E6 33322D43
01EA 20544553
01EE 54202020
01F2 4A414E     64 MONTAB  DB       'JAN'                ;USED IN DDATE ROUTINE
01F5 464542     65         DB       'FEB'
01F8 4D4152     66         DB       'MAR'
01FB 415052     67         DB       'APR'
01FE 4D4159     68         DB       'MAY'
0201 4A554E     69         DB       'JUN'
0204 4A554C     70         DB       'JUL'
0207 415547     71         DB       'AUG'
```

```
020A 534550         72       DB     'SEP'
020D 4F4354         73       DB     'OCT'
0210 4E4F56         74       DB     'NOV'
0213 444543         75       DB     'DEC'
                    76
0216 1F             77 MONTBL DB    31       ;JAN = 31 DAYS        # OF DAYS IN EACH MONTH
0217 1C             78       DB     28       ;FEB = 28 DAYS, OR 29 DAYS IN LEAP YEARS
0218 1F             79       DB     31       ;MAR = 31 DAYS        USED IN EDATE ROUTINE
0219 1E             80       DB     30       ;APR = 30 DAYS
021A 1F             81       DB     31       ;MAY = 31 DAYS
021B 1E             82       DB     30       ;JUN = 30 DAYS
021C 1F             83       DB     31       ;JUL = 31 DAYS
021D 1F             84       DB     31       ;AUG = 31 DAYS
021E 1E             85       DB     30       ;SEP = 30 DAYS
021F 1F             86       DB     31       ;OCT = 31 DAYS
0220 1E             87       DB     30       ;NOV = 30 DAYS
0221 1F             88       DB     31       ;DEC = 31 DAYS
                    89
0222 54455354       90 PMES  DB     'TESTING  CONDITIONS'          ;USED IN PFOR ROUTINE
0226 494E4720
022A 2020434F
022E 4E444954
0232 494F4E53
0236 20202020       91 BLANK DB     '                    '
023A 20202020
023E 20202020
0242 20202020
0246 20202020
024A 554E4954       92       DB     'UNIT ID NUMBER '
024E 20494420
0252 4E554D42
0256 45522020
025A 20
025B 54454D50       93       DB     'TEMP RANGE     '
025F 2052414E
0263 47452020
0267 20
0268 44495354       94       DB     'DIST RATE      '
026C 20524154
0270 452020
0273 53414D50       95       DB     'SAMPLE         '
0277 4C452020
027B 20202020
027F 20
0280 494E4954       96       DB     'INITIAL HEAT   W'
0284 49414C20
0288 48454154
028C 20202020
0290 57
0291 25204D49       97       DB     '5 MINUTE HEAT  W'
0295 4E555445
0299 20484541
029D 54202020
02A1 57
02A2 494E4352       98       DB     'INCR FINAL HT  W'
02A6 2046494E
02AA 414C2048
02AE 54202057
02B2 45585045       99       DB     'EXPECTED LOSS  %'
02B6 43544544
02BA 204C4F53
02BE 53202020
02C2 25
02C3 454E4420      100       DB     'END AT TEMP    '
02C7 41542054
02CB 454D5020
```

```
02CF 20202020
02D3 454E4420   101         DB      'END AT DRY PT   S'
02D7 41542044
02DB 52592050
02DF 54202020
02E3 53

02E4 454E4420   102         DB      'END AT % REC    %'
02E8 41542025
02EC 20524543
02F0 20202020
02F4 2025

02F6 454E4420   103         DB      'END AT END POINT  '
02FA 41542045
02FE 4E442050
0302 4F494E54
0306 20202020

030A 00         104 PMDC    DB      0,20                    ;PRINTER MESSAGE DISPLACEMENT & COUNT
030B 14
030C 14         105         DB      20,20                   ;USED IN PFOR ROUTINE
030D 14
030E 28         106         DB      40,17
030F 11
0310 39         107         DB      57,13
0311 0D
0312 46         108         DB      70,11
0313 0B
0314 51         109         DB      81,13
0315 0D
0316 5E         110         DB      94,16
0317 10
0318 6F         111         DB      111,16
0319 10
031A 80         112         DB      128,15
031B 0F
031C 90         113         DB      144,16
031D 10
031E A1         114         DB      161,16
031F 10
0320 B1         115         DB      177,16
0321 10
0322 C2         116         DB      194,17
0323 11
0324 D4         117         DB      212,20
0325 14
0326 20302D33   118 RAN1    DB      ' 0-300C'               ;USED IN PFOR ROUTINE
032A 303043
032D 20302D34   119 RAN2    DB      ' 0-400C'               ;USED IN PFOR ROUTINE
0331 303043
0334 33322D35   120 RAN3    DB      '32-572F'               ;USED IN PFOR ROUTINE
0338 373246
033B 33322D37   121 RAN4    DB      '32-752F'               ;USED IN PFOR ROUTINE
033F 353246
0342 33302D33   122 RAN5    DB      '30-300C'               ;USED IN PFOR ROUTINE
0346 303043
0349 392E304D   123 DR1     DB      '9.0ML/MIN'             ;USED IN PFOR ROUTINE
034D 4C2F4D49
0351 4E
0352 362E304D   124 DR2     DB      '6.0ML/MIN'             ;USED IN PFOR ROUTINE
0356 4C2F4D49
035A 4E
035B 342E354D   125 DR3     DB      '4.5ML/MIN'             ;USED IN PFOR ROUTINE
035F 4C2F4D49
0363 4E
0364 49425020   126 PMES1   DB      'IBP    MIN'            ;USED IN RSTS5 ROUTINE
0368 20202E20
036C 4D494E
```

```
036F 4D494E20   127 PMES2   DB   ' MIN FROM FH TO EP '   ;USED IN EOT ROUTINE
0373 46524F4D
0377 20464820
037B 544F2045
037F 50
0380 454E4420   128 PMES3   DB   'END POINT > 5.0 MIN'   ;USED IN TMPTM ROUTINE
0384 504F494E
0388 54203E20
038C 352E3020
0390 4D494E20
0394 20454E44   129 PMES4   DB   ' END PT'               ;USED IN TMPTM ROUTINE
0398 205054
039B 4D4C2020   130 PMES5   DB   'ML    RECOVERY'        ;USED IN RECRES ROUTINE
039F 20202052
03A3 45434F56
03A7 455259
03AA 20205245   131 PMES6   DB   '  RESIDUE'             ;USED IN RECRES ROUTINE
03AE 53494455
03B2 45
03B3 544F5420   132 PMES7   DB   'TOT RECOVERY'          ;USED IN RECRES ROUTINE
03B7 5245434F
03BB 56455259
03BF 20202020   133 PMES8   DB   '        LOSS'          ;USED IN RECRES ROUTINE
03C3 20202020
03C7 4C4F5353
03CB 4241524F   134 PMES9   DB   'BAROMETER = 000MMHG'   ;USED IN START & BARTST ROUTINES
03CF 4D455445
03D3 5220203D
03D7 20303030
03DB 6D6D4867
03DF 4348414D   135 PMES10  DB   'CHAMBER  TEMP=00.0C'   ;USED IN START ROUTINE
03E3 42455220
03E7 20205445
03EB 4D503D30
03EF 302E3043
03F2 434F4E44   136 PMES11  DB   'CONDENSER'             ;USED IN START ROUTINE
03F7 454E5345
03FB 52
03FC 54454D50   137 PMES12  DB   'TEMPERATURES ARE  '    ;USED IN START ROUTINE
0400 45524154
0404 55524553
0408 20415245
040C 20202020
0410 54454D50   138 PMES13  DB   'TEMPERATURES ARE NOT'  ;USED IN START ROUTINE
0414 45524154
0418 55524553
041C 20415245
0420 204E4F54
0424 434F5252   139 PMES14  DB   'CORRECTED TO 760MMHG'  ;USED IN START ROUTINE
0428 45435445
042C 4420544F
0430 20373630
0434 6D6D4867
0438 4E4F204D   140 PMES15  DB   'NO MENISCUS MOVEMENT'  ;USED IN RST75 ROUTINE
043C 454E4953
0440 43555320
0444 4D4F5645
0448 4D454E54
044C 20445259   141 PMES16  DB   ' DRY PT'               ;USED IN RST75 ROUTINE
0450 205054
0453 54454D50   142 PMES17  DB   'TEMPERATURES VS  '     ;USED IN EVAP ROUTINE
0457 45524154
045B 55524553
045F 20565320
0463 20202020
0467 45564150   143 PMES18  DB   'EVAPORATED SAMPLE '    ;USED IN EVAP ROUTINE
```

```
046B 4F524154
046F 45442053
0473 414D504C
0477 45202020
047B 49425020   144 PMES19  DB      'IBP              '  ;USED IN EVAP  ROUTINE
047F 20202020
0483 20202020
0487 20202020
048B 20
048C 47524144   145 PMES20  DB      'GRADUATE NOT PRESENT' ;USED IN START ROUTINE
0490 55415445
0494 204E4F54
0498 20505245
049C 53454E54
04A0 20555050   146 PMES21: DB      ' UPPER LIMIT SWITCH ' ;USED IN RST65 ROUTINE
04A4 4552204C
04A8 494D4954
04AC 20535749
04B0 54434820
04B4 39352E30   147 PMES22  DB      '95.0ML           '    ;USED IN RST65 ROUTINE
04B8 4D4C2020
04BC 20202020
04C0 20202020
04C4 20202020
04C8 44524F50   148 PMES23  DB      'DROP TIME WAS X.XSEC' ;USED IN RST55 ROUTINE
04CC 2054494D
04D0 45205741
04D4 5320582E
04D8 58534543
04DC 58582E58   149 PMES24  DB      'XX.XML  CORR TOT REC' ;USED IN CLOSS ROUTINE
04E0 4D4C2020
04E4 434F5252
04E8 20544F54
04EC 20524543
04F0 49425020   150 PMES25  DB      'IBP LIMITS 5M TO 10M' ;USED IN START ROUTINE
04F4 4C494D49
04F8 54532035
04FC 4D20544F
0500 2031304D
0504 54455354   151 PMES26  DB      'TEST   TERMINATED'    ;USED IN CNTL1 & RST65 & RECRES
0508 20202020
050C 20205445
0510 524D494E
0514 41544544
0518 4E4F2044   152 PMES27  DB      ' NO DROP IN 25.6 MIN' ;USED IN CNTL1 ROUTINE
051C 524F5020
0520 494E2032
0524 352E3620
0528 4D494E20
052C 454E4420   153 PMES28  DB      'END OF TEST AT------' ;USED IN ENDIT ROUTINE
0530 4F462054
0534 45535420
0538 41542D2D
053C 2D2D2D2D
0540 20204C4F   154 PMES29  DB      '  LOSS IS  0.0 ML'    ;USED IN RECRES ROUTINE
0544 53532049
0548 53202020
054C 302E3020
0550 4D4C2020
0554 302E304D   155 PMES30  DB      '0.0ML    CORR LOSS'   ;USED IN CLOSS ROUTINE
0558 4C202020
055C 20202043
0560 4F525220
0564 4C4F5353
0568 434F4E44   156 PMES31  DB      'CONDENSER LEVEL LOW'  ;USED IN START ROUTINE
056C 454E5345
```

```
0570 52204C45
0574 56454C20
0578 4C4F5720
057C 4F504552     157 PMES32: DB      'OPERATOR  LOW LEVEL:_____'  ;USED IN PFOR ROUTINE
0580 41544F52
0584 3A5F5F5F
0588 5F5F5F5F
058C 5F5F5F5F
0590 44495354     158 PMES33  DB      'DISTILLATION RESULTS'  ;USED IN START ROUTINE
0594 494C4C41
0598 54494F4E
059C 20524553
05A0 554C5453
05A4 5641504F     159 PMES34  DB      'VAPOR   CKT    OPEN'  ;USED IN CNTL2 ROUTINE
05A8 52202020
05AC 434B5420
05B0 20202020
05B4 4F50454E
05B8 5641504F     160 PMES35  DB      'VAPOR   CKT  SHORTED'  ;USED IN CNTL2 ROUTINE
05BC 52202020
05C0 434B5420
05C4 2053484F
05C8 52544544
05CC 43484114     161 PMES36  DB      'CHAMBER CKT    OPEN'  ;USED IN START ROUTINE
05D0 42455220
05D4 434B5420
05D8 20202020
05DC 4F50454E
05E0 4348414D     162 PMES37: DB      'CHAMBER CKT  SHORTED'  ;USED IN START ROUTINE
05E4 42455220
05E8 434B5420
05EC 2053484F
05F0 52544544
05F4 00           163 EVAPVT  DB      0,5,10H,20H,30H,40H,50H  ;EVAPORATED BCD VOLUME TABLE
05F5 05
05F6 10
05F7 20
05F8 30
05F9 40
05FA 50
05FB 60           164      DB    60H,70H,80H,90H,95H,9AH  ;USED IN EVAP ROUTINE
05FC 70
05FD 80
05FE 90
05FF 95
0600 9A
0601 00           165 EVAPVB  DB      0,5,10,20,30,40,50      ;EVAPORATED BINARY VOLUME TABLE
0602 05
0603 0A
0604 14
0605 1E
0606 28
0607 32
0608 3C           166      DB    60,70,80,90,95,101
0609 46
060A 50
060B 5A
060C 5F
060D 65
             167                              ;CORRECTED LOSS TABLE USED IN CLOSS ROUTINE
060E 8F       168 CLTBL  DB      143       ;750 MM DELTA A VALUE
060F 7A21     169        DW      8570      ;750 MM A VALUE
0611 47       170        DB      71        ;750 MM DELTA B VALUE
0612 BC1B     171        DW      7100      ;750 MM B VALUE
0614 6B       172        DB      107       ;740 MM DELTA A VALUE
0615 4C1D     173        DW      7500      ;740 MM A VALUE
0617 36       174        DB      54        ;740 MM DELTA B VALUE
```

| | | | | | |
|---|---|---|---|---|---|
| 0618 D430 | 175 | DW | 12500 | ;740 MM B VALUE | |
| 061A 53 | 176 | DB | 83 | ;730 MM DELTA A VALUE | |
| 061B 0E1A | 177 | DW | 6670 | ;730 MM A VALUE | |
| 061D 29 | 178 | DB | 41 | ;730 MM DELTA B VALUE | |
| 061E D840 | 179 | DW | 16600 | ;730 MM B VALUE | |
| 0620 43 | 180 | DB | 67 | ;720 MM DELTA A VALUE | |
| 0621 7017 | 181 | DW | 6000 | ;720 MM A VALUE | |
| 0623 22 | 182 | DB | 34 | ;720 MM DELTA B VALUE | |
| 0624 204E | 183 | DW | 20000 | ;720 MM B VALUE | |
| 0626 37 | 184 | DB | 55 | ;710 MM DELTA A VALUE | |
| 0627 4A15 | 185 | DW | 5450 | ;710 MM A VALUE | |
| 0629 1B | 186 | DB | 27 | ;710 MM DELTA B VALUE | |
| 062A AC58 | 187 | DW | 22700 | ;710 MM B VALUE | |
| 062C 2D | 188 | DB | 45 | ;700 MM DELTA A VALUE | |
| 062D 8813 | 189 | DW | 5000 | ;700 MM A VALUE | |
| 062F 17 | 190 | DB | 23 | ;700 MM DELTA B VALUE | |
| 0630 A861 | 191 | DW | 25000 | ;700 MM B VALUE | |
| 0632 27 | 192 | DB | 39 | ;690 MM DELTA A VALUE | |
| 0633 0212 | 193 | DW | 4610 | ;690 MM A VALUE | |
| 0635 13 | 194 | DB | 19 | ;690 MM DELTA B VALUE | |
| 0636 1469 | 195 | DW | 26900 | ;690 MM B VALUE | |
| 0638 21 | 196 | DB | 33 | ;680 MM DELTA A VALUE | |
| 0639 B810 | 197 | DW | 4280 | ;680 MM A VALUE | |
| 063B 11 | 198 | DB | 17 | ;680 MM DELTA B VALUE | |
| 063C B86F | 199 | DW | 28600 | ;680 MM B VALUE | |
| 063E 1C | 200 | DB | 28 | ;670 MM DELTA A VALUE | |
| 063F A00F | 201 | DW | 4000 | ;670 MM A VALUE | |
| 0641 0E | 202 | DB | 14 | ;670 MM DELTA B VALUE | |
| 0642 3075 | 203 | DW | 30000 | ;670 MM B VALUE | |
| 0644 19 | 204 | DB | 25 | ;660 MM DELTA A VALUE | |
| 0645 A60E | 205 | DW | 3750 | ;660 MM A VALUE | |
| 0647 0C | 206 | DB | 12 | ;660 MM DELTA B VALUE | |
| 0648 E079 | 207 | DW | 31200 | ;660 MM B VALUE | |
| 064A 16 | 208 | DB | 22 | ;650 MM DELTA A VALUE | |
| 064B CA0D | 209 | DW | 3530 | ;650 MM A VALUE | |
| 064D 0B | 210 | DB | 11 | ;650 MM DELTA B VALUE | |
| 064E 2C7E | 211 | DW | 32300 | ;650 MM B VALUE | |
| 0650 14 | 212 | DB | 20 | ;640 MM DELTA A VALUE | |
| 0651 020D | 213 | DW | 3330 | ;640 MM A VALUE | |
| 0653 0A | 214 | DB | 10 | ;640 MM DELTA B VALUE | |
| 0654 1482 | 215 | DW | 33300 | ;640 MM B VALUE | |
| 0656 11 | 216 | DB | 17 | ;630 MM DELTA A VALUE | |
| 0657 580C | 217 | DW | 3160 | ;630 MM A VALUE | |
| 0659 09 | 218 | DB | 9 | ;630 MM DELTA B VALUE | |
| 065A 9885 | 219 | DW | 34200 | ;630 MM B VALUE | |
| 065C 10 | 220 | DB | 16 | ;620 MM DELTA A VALUE | |
| 065D B80B | 221 | DW | 3000 | ;620 MM A VALUE | |
| 065F 08 | 222 | DB | 8 | ;620 MM DELTA B VALUE | |
| 0660 B888 | 223 | DW | 35000 | ;620 MM B VALUE | |
| 0662 0E | 224 | DB | 14 | ;610 MM DELTA A VALUE | |
| 0663 2C0B | 225 | DW | 2860 | ;610 MM A VALUE | |
| 0665 07 | 226 | DB | 7 | ;610 MM DELTA B VALUE | |
| 0666 748B | 227 | DW | 35700 | ;610 MM B VALUE | |
| 0668 0D | 228 | DB | 13 | ;600 MM DELTA A VALUE | |
| 0669 AA0A | 229 | DW | 2730 | ;600 MM A VALUE | |
| 066B 06 | 230 | DB | 6 | ;600 MM DELTA B VALUE | |
| 066C CC8D | 231 | DW | 36300 | ;600 MM B VALUE | |
| 066E 0C | 232 | DB | 12 | ;590 MM DELTA A VALUE | |
| 066F 320A | 233 | DW | 2610 | ;590 MM A VALUE | |
| 0671 06 | 234 | DB | 6 | ;590 MM DELTA B VALUE | |
| 0672 2490 | 235 | DW | 36900 | ;590 MM B VALUE | |
| 0674 0B | 236 | DB | 11 | ;580 MM DELTA A VALUE | |
| 0675 C409 | 237 | DW | 2500 | ;580 MM A VALUE | |
| 0677 06 | 238 | DB | 6 | ;580 MM DELTA B VALUE | |
| 0678 7C92 | 239 | DW | 37500 | ;580 MM B VALUE | |
| 067A 0A | 240 | DB | 10 | ;570 MM DELTA A VALUE | |

```
067B 6009       241         DW      2400       ;570 MM A VALUE
067D 05         242         DB      5          ;570 MM DELTA B VALUE
067E 7094       243         DW      38000      ;570 MM B VALUE
0680 09         244         DB      9          ;560 MM DELTA A VALUE
0681 0609       245         DW      2310       ;560 MM A VALUE
0683 04         246         DB      4          ;560 MM DELTA B VALUE
0684 0096       247         DW      38400      ;560 MM B VALUE
                248         END
```

PUBLIC SYMBOLS

| | | | | | | |
|---|---|---|---|---|---|---|
| BLANK  C 0236 | CLTBL  C 060E | DMES1  C 0085 | DMES10 C 0114 | DMES11 C 0124 | DMES12 C 0134 | |
| DMES13 C 0144 | DMES14 C 0154 | DMES15 C 0162 | DMES16 C 016A | DMES17 C 0172 | DMES18 C 017A | |
| DMES19 C 0182 | DMES2  C 0094 | DMES20 C 0192 | DMES21 C 01A2 | DMES22 C 01B2 | DMES23 C 01C2 | |
| DMES24 C 01D2 | DMES25 C 01E2 | DMES3  C 00A4 | DMES4  C 00B4 | DMES5  C 00C4 | DMES6  C 00D4 | |
| DMES7  C 00E4 | DMES8  C 00F4 | DMES9  C 0104 | DR1    C 0349 | DR2    C 0352 | DR3    C 035B | |
| EVAPVB C 0601 | EVAPVT C 05F4 | IMES   C 0000 | MONTAB C 01F2 | MONTBL C 0216 | MTAB   C 000B | |
| MTABDC C 006C | PMDC   C 030A | PMES   C 0222 | PMES1  C 0364 | PMES10 C 03DF | PMES11 C 03F3 | |
| PMES12 C 03FC | PMES13 C 0410 | PMES14 C 0424 | PMES15 C 0438 | PMES16 C 044C | PMES17 C 0453 | |
| PMES18 C 0467 | PMES19 C 047B | PMES2  C 036F | PMES20 C 048C | PMES21 C 04A0 | PMES22 C 04B4 | |
| PMES23 C 04C8 | PMES24 C 04DC | PMES25 C 04F0 | PMES26 C 0504 | PMES27 C 0518 | PMES28 C 052C | |
| PMES29 C 0540 | PMES3  C 0380 | PMES30 C 0554 | PMES31 C 0568 | PMES32 C 057C | PMES33 C 0590 | |
| PMES34 C 05A4 | PMES35 C 05B8 | PMES36 C 05CC | PMES37 C 05E0 | PMES4  C 0394 | PMES5  C 039B | |
| PMES6  C 03AA | PMES7  C 03B3 | PMES8  C 03BF | PMES9  C 03CB | RAN1   C 0326 | RAN2   C 032D | |
| RAN3   C 0334 | RAN4   C 033B | RAN5   C 0342 | SPARD  C 007C | | | |

EXTERNAL SYMBOLS

USER SYMBOLS

| | | | | | | |
|---|---|---|---|---|---|---|
| BLANK  C 0236 | CLTBL  C 060E | DMES1  C 0085 | DMES10 C 0114 | DMES11 C 0124 | DMES12 C 0134 | |
| DMES13 C 0144 | DMES14 C 0154 | DMES15 C 0162 | DMES16 C 016A | DMES17 C 0172 | DMES18 C 017A | |
| DMES19 C 0182 | DMES2  C 0094 | DMES20 C 0192 | DMES21 C 01A2 | DMES22 C 01B2 | DMES23 C 01C2 | |
| DMES24 C 01D2 | DMES25 C 01E2 | DMES3  C 00A4 | DMES4  C 00B4 | DMES5  C 00C4 | DMES6  C 00D4 | |
| DMES7  C 00E4 | DMES8  C 00F4 | DMES9  C 0104 | DR1    C 0349 | DR2    C 0352 | DR3    C 035B | |
| EVAPVB C 0601 | EVAPVT C 05F4 | IMES   C 0000 | MONTAB C 01F2 | MONTBL C 0216 | MTAB   C 000B | |
| MTABDC C 006C | PMDC   C 030A | PMES   C 0222 | PMES1  C 0364 | PMES10 C 03DF | PMES11 C 03F3 | |
| PMES12 C 03FC | PMES13 C 0410 | PMES14 C 0424 | PMES15 C 0438 | PMES16 C 044C | PMES17 C 0453 | |
| PMES18 C 0467 | PMES19 C 047B | PMES2  C 036F | PMES20 C 048C | PMES21 C 04A0 | PMES22 C 04B4 | |
| PMES23 C 04C8 | PMES24 C 04DC | PMES25 C 04F0 | PMES26 C 0504 | PMES27 C 0518 | PMES28 C 052C | |
| PMES29 C 0540 | PMES3  C 0380 | PMES30 C 0554 | PMES31 C 0568 | PMES32 C 057C | PMES33 C 0590 | |
| PMES34 C 05A4 | PMES35 C 05B8 | PMES36 C 05CC | PMES37 C 05E0 | PMES4  C 0394 | PMES5  C 039B | |
| PMES6  C 03AA | PMES7  C 03B3 | PMES8  C 03BF | PMES9  C 03CB | RAN1   C 0326 | RAN2   C 032D | |
| RAN3   C 0334 | RAN4   C 033B | RAN5   C 0342 | SPARD  C 007C | | | |

ASSEMBLY COMPLETE, NO ERRORS

ASM80 F1 INIT SRC

ISIS-II 8080/8085 MACRO ASSEMBLER, V2.0          INIT
INITILIZE ROUTINE

```
LOC  OBJ         SEQ        SOURCE STATEMENT

1 $        TITLE('INITILIZE ROUTINE') PAGEWIDTH(105) MOD85 DEBUG
                  2                     ;WRITTEN 09/25/79
                  3                     ;UPDATED 05/03/82
                  4                     ;THIS ROUTINE INITIALIZES DEVICES TO A KNOWN STATE
                  5                     ;AFTER POWER ON. DEFAULT SYSTEM & DATE PARAMETERS
                  6                     ;ARE SET UP AS FOLLOWS
                  7                     ;SAMPLE NUMBER = '0000000'
                  8                     ;INITIAL HEAT = '000'
                  9                     ;HEAT AT INITIAL BOILING POINT = '000'
                 10                     ;INCREASE FINAL HEAT = ' 000'
                 11                     ;EXPECTED LOSS = '0 0'
                 12                     ;END AT TEMP = '  NO'
```

```
                13                      ;END AT DP =    NO'
                14                      ;END AT % RECOVERED =   NO'
                15                      ;RESIDUE = '000'
                16                      ;YEAR =         MONTH =         DAY =
                17                      ;HOUR =         MINUTE =
                18           NAME    INIT
                19           PUBLIC  INIT,DSPLY
                20           EXTRN   CALIB,SPART,EDATE,IFHT,EATT,TRDR,DIR,PHASE,IMES
                21           EXTRN   DBUF,BINBCD,UID,RST55,RST65,RST75,ELOSS,CKSUM,UNPAK
                22           EXTRN   DMES4,DMES6,IBUF,XMIT,YEAR,MINCTR,TXDT,DIAGSW
7004            23  KD       EQU     7004H   ;ADDRESS OF KEYBOARD/DISPLAY
0000            24           ORG     00H
0000 C30000  C  25           JMP     INIT    ;SET UP START UP LOCATION
0003 0000       26  DW       0,0,0,0,0,0,0,0 ;THIS IS FILL IN SO THE CHECK SUM WILL
0005 0000
0007 0000
0009 0000
000B 0000
000D 0000
000F 0000
0011 0000
0013 0000       27  DW       0,0,0,0,0,0,0,0 ;COME OUT RIGHT WITHOUT ANY SPECIAL
0015 0000
0017 0000
0019 0000
001B 0000
001D 0000
001F 0000
0021 0000
0023 0000       28  DW       0,0,0,0         ;SET UP
0025 0000
0027 0000
0029 0000
002B 00         29  DB       0
002C            30           ORG     2CH
002C C30000  E  31           JMP     RST55   ;SET UP INTERRUPT RST5 5 LOCATION
002F 0000       32  DW       0,0
0031 0000
0033 00         33  DB       0
0034            34           ORG     34H
0034 C30000  E  35           JMP     RST65   ;SET UP INTERRUPT RST6 5 LOCATION
0037 00         36  DB       0
0038            37           ORG     38H
0038 C30000  C  38           JMP     INIT    ;RST 7 TRAP
003B 01         39  DB       1
003C            40           ORG     3CH
003C C30000  E  41           JMP     RST75   ;SET UP INTERRUPT RST7 5 LOCATION
003F 00         42  DB       0
                43           CSEG
0000 31FF67     44  INIT     LXI     SP,67FFH ;INITIALIZE THE STACK POINTER
0003 AF         45           XRA     A
0004 320000  E  46           STA     DIR     ;SET MOTOR DIRECTION TO UP
0007 320B70     47           STA     700BH   ;FORCE THE X-Y RECORDER PEN UP
000A 320000  E  48           STA     DIAGSW  ;SET DIAGNOSTIC SWITCH = 0
000D 3D         49           DCR     A
000E 320000  E  50           STA     MINCTR  ;FORCE THE MINUTE COUNTER TO FFH
0011 3E80       51           MVI     A,80H
0013 320870     52           STA     7008H   ;SET THE PRINT STROBE = 1
0016 3E13       53           MVI     A,13H   ;SET AIR SOLENOID OFF & PHASE SEQUENCE
0018 320000  E  54           STA     PHASE   ;SAVE IT
001B E6F0       55           ANI     0F0H    ;DON'T ENERGIZE THE MOTOR YET
001D 320A70     56           STA     700AH   ;OUTPUT IT
0020 3E24       57           MVI     A,24H   ;SET THE DEFAULT TEMP RANGE & DIST RATE
0022 320000  E  58           STA     TRDR    ;32-572F    &   4.5 ML/MIN
0025 320170     59           STA     7001H   ;OUTPUT IT
0028 210370     60           LXI     H,7003H ;POINT TO THE 8251 RS232C COMMAND PORT
```

```
002B AF              61        XRA    A
002C 77              62        MOV    M,A       ;WANT TO ISSUE 3 ZERO'S TO CLEAR ANY FALSE CASE
002D 77              63        MOV    M,A
002E 77              64        MOV    M,A
002F 3650            65        MVI    M,50H     ;ISSUE AN INTERNAL & ERROR RESET
0031 36FB            66        MVI    M,0FBH    ;MODE = 1 STOP, EVEN PARITY, 7 DATA BITS, 64 X
0033 3602            67        MVI    M,2       ;ISSUE A DATA TERMINAL READY (DTR)
0035 210000   E      68        LXI    H,TXDT    ;POINT TO THE TOP OF THE TRANSMIT DATA TABLE
0038 3602            69        MVI    M,2       ;PUT A STX IN THE FIRST POSITION
003A 23              70        INX    H
003B 3603            71        MVI    M,3       ;PUT AN END OF TEXT (ETX) IN NEXT
003D 211370          72        LXI    H,7013H   ;POINT TO THE TIMER CONTROL PORT
0040 3672            73        MVI    M,72H     ;SET COUNTER 1 TO MODE 1
0042 2B              74        DCX    H         ;POINT TO COUNTER 1 DATA PORT
0043 2B              75        DCX    H
0044 3600            76        MVI    M,0       ;FORCE THE PHASE CONTROL TO A BIG NUMBER
0046 3640            77        MVI    M,40H     ;THIS WILL TURN OFF THE HEATER POWER
0048 210570          78        LXI    H,KD+1    ;POINT TO THE KEYBOARD/DISPLAY COMMAND PORT
004B 3608            79        MVI    M,8       ;SET THE DISPLAY TO 16 CHARACTERS, LEFT ENTRY
                     80                          ;KEYBOARD TO ENCODED SCAN, 2 KEY LOCKOUT
004D 362D            81        MVI    M,2DH     ;SET THE CLOCK PRESCALER TO 13
004F 36E0            82        MVI    M,0E0H    ;SET THE ERROR MODE CONTROL BYTE
0051 36A0            83        MVI    M,0A0H    ;SET THE INHIBIT BLANKING CONTROL BYTE
0053 36C2            84        MVI    M,0C2H    ;CLEAR THE FIFO STATUS
0055 CD0000   E      85        CALL   CKSUM     ;GO DO THE CHECK SUM ROUTINE
0058 210000   E      86        LXI    H,DMES4   ;POINT TO THE SOFTWARE VERSION MESSAGE
005B CDD700   C      87        CALL   DSPLY     ;DISPLAY THIS MESSAGE
005E 210000          88        LXI    H,0       ;WANT TO WAIT SO OPERATOR CAN SEE IT
0061 221870          89        SHLD   7018H     ;BUT FIRST, SET RECORDER X-AXIS TO ZERO
0064 221A70          90        SHLD   701AH     ;AND SET RECORDER Y AXIS TO ZERO
0067 110100          91 WLOOP: LXI    D,1       ;EXECUTE THIS LOOP TO USE UP SOME TIME
006A E5              92        PUSH   H         ;THIS INSTRUCTION USES 12 MACHINE CYCLES
006B E1              93        POP    H         ;ANOTHER 10 CYCLES
006C 19              94        DAD    D         ;ANOTHER 10 CYCLES
006D D26700   C      95        JNC    WLOOP     ;ANOTHER 10 CYCLES
0070 210000   E      96        LXI    H,SPART   ;POINT TO THE SYSTEM PARAMETER TABLE
0073 3E1F            97        MVI    A,31      ;LOAD THE SYSTEM PARAMETER COUNTER
0075 3630            98 LOOP1: MVI    M,'0'     ;LOAD THE ENTIRE TABLE WITH '0'
0077 23              99        INX    H         ;POINT TO THE NEXT LOCATION
0078 3D             100        DCR    A         ;BUMP THE COUNTER
0079 C27500   C     101        JNZ    LOOP1
007C 210000   E     102        LXI    H,IFHT    ;POINT TO INCREASE FINAL HEAT
007F 3620          103        MVI    M,' '     ;PUT A BLANK IN
0081 3E2E          104        MVI    A,'.'     ;PUT AN ASCII '.' IN
0083 320100   E    105        STA    ELOSS+1
0086 210000   E    106        LXI    H,EATT    ;POINT TO END AT TEMP
0089 110000   E    107        LXI    D,IMES    ;POINT TO THE INITIALIZE MESSAGE TABLE
008C 060B         108        MVI    B,11      ;LOAD THE CHARACTER COUNTER
008E 1A           109 LOOP2: LDAX   D         ;GET A CHARACTER
008F 77           110        MOV    M,A       ;PUT IT IN THE TABLE
0090 23           111        INX    H
0091 13           112        INX    D
0092 05           113        DCR    B         ;BUMP THE CHARACTER COUNTER
0093 C28E00   C   114        JNZ    LOOP2     ;IF NOT ZERO, GET ANOTHER CHARACTER
0096 210000   E   115        LXI    H,DMES6   ;GET THE WAITING FOR ZERO CROSSING MESSAGE
0099 CDD700   C   116        CALL   DSPLY     ;DISPLAY THE MESSAGE
009C CD0000   E   117        CALL   CALIB     ;CALIBRATE THE LINE FREQUENCY
009F 210800   E   118        LXI    H,DBUF+8  ;POINT TO THE DATA BUFFER
00A2 3A0070       119        LDA    7000H     ;GET THE UNIT I.D. SWITCH SETTING
00A5 E61F         120        ANI    1FH       ;ALLOW ONLY 0 - 31 UNITS
00A7 77           121        MOV    M,A       ;PUT IT IN THE DATA BUFFER
00A8 AF           122        XRA    A
00A9 2B           123        DCX    H         ;SET UP THE DATA BUFFER FOR BINBCD
00AA 77           124        MOV    M,A
00AB 2B           125        DCX    H
00AC 77           126        MOV    M,A
```

```
00AD 2B              127           DCX     H
00AE 77              128           MOV     M,A
00AF CD0000   E      129           CALL    BINBCD  ;CONVERT THE I.D. TO BCD
00B2 210400   E      130           LXI     H,DBUF+4;POINT TO THE BCD TWO DIGITS
00B5 010000   E      131           LXI     B,UID   ;POINT TO THE UNIT I.D. LOCATION
00B8 3E20            132           MVI     A,' '   ;PUT A BLANK IN FIRST (THIS IS A FIX UP)
00BA 02              133           STAX    B       ;STORE IT
00BB 03              134           INX     B       ;POINT TO THE NEXT UID STORAGE LOCATION
00BC 7E              135           MOV     A,M     ;GET THE I.D. BCD LSB'S
00BD CD0000   E      136           CALL    UNPAK   ;GO UNPACK THEM
00C0 02              137           STAX    B       ;STORE IT
00C1 03              138           INX     B       ;POINT TO THE NEXT UID STORAGE LOCATION
00C2 7E              139           MOV     A,M     ;GET THE I.D. LSD'S AGAIN
00C3 E60F            140           ANI     0FH     ;MASK IN THE LSD
00C5 C630            141           ADI     30H     ;CONVERT IT TO ASCII
00C7 02              142           STAX    B       ;STORE IT
00C8 210000   E      143           LXI     H,YEAR  ;WANT TO BLANK OUT THE DATE PARAMETERS
00CB 060A            144           MVI     B,10    ;THERE ARE 10 DATE PARAMETERS
00CD 3620            145  BLANKL:  MVI     M,' '   ;PUT ASCII BLANKS IN
00CF 23              146           INX     H
00D0 05              147           DCR     B
00D1 C2CD00   C      148           JNZ     BLANKL
00D4 C30000   E      149           JMP     EDATE   ;WHEN DONE, GO TO THE ENTER DATE ROUTINE
00D7 110000   E      150  DSPLY:   LXI     D,IBUF  ;DISPLAY THE MESSAGE POINTED TO BY H,L
00DA 0610            151           MVI     B,16    ;LOAD THE LOOP COUNTER
00DC 7E              152  LOOP:    MOV     A,M     ;GET A CHARACTER
00DD 12              153           STAX    D
00DE 23              154           INX     H
00DF 13              155           INX     D
00E0 05              156           DCR     B
00E1 C2DC00   C      157           JNZ     LOOP
00E4 CD0000   E      158           CALL    XMIT    ;OUTPUT THE MESSAGE
00E7 C9              159           RET
0000          C      160           END     INIT
```

PUBLIC SYMBOLS
DSPLY  C 00D7    INIT   C 0000

EXTERNAL SYMBOLS
BINBCD E 0000    CALIB  E 0000    CKSUM  E 0000    DBUF   E 0000    DIAGSW E 0000    DIR    E 0000
DMES4  E 0000    DMES6  E 0000    EATT   E 0000    EDATE  E 0000    ELOSS  E 0000    IBUF   E 0000
IFHT   E 0000    IMES   E 0000    MINCTR E 0000    PHASE  E 0000    RST55  E 0000    RST65  E 0000
RST75  E 0000    SPART  E 0000    TRDR   E 0000    TXDT   E 0000    UID    E 0000    UNPAK  E 0000
XMIT   E 0000    YEAR   E 0000

USER SYMBOLS
BINBCD E 0000    BLANKL C 00CD    CALIB  E 0000    CKSUM  E 0000    DBUF   E 0000    DIAGSW E 0000
DIR    E 0000    DMES4  E 0000    DMES6  E 0000    DSPLY  C 00D7    EATT   E 0000    EDATE  E 0000
ELOSS  E 0000    IBUF   E 0000    IFHT   E 0000    IMES   E 0000    INIT   C 0000    KD     A 7004
LOOP   C 00DC    LOOP1  C 0075    LOOP2  C 008E    MINCTR E 0000    PHASE  E 0000    RST55  E 0000
RST65  E 0000    RST75  E 0000    SPART  E 0000    TRDR   E 0000    TXDT   E 0000    UID    E 0000
UNPAK  E 0000    WLOOP  C 0067    XMIT   E 0000    YEAR   E 0000

ASSEMBLY COMPLETE, NO ERRORS

ASM80 F1:CALIB.SRC

ISIS-II 8080/8085 MACRO ASSEMBLER, V2.0
LINE FREQUENCY CALIBRATION ROUTINE

LOC  OBJ          SEQ         SOURCE STATEMENT

1  $       TITLE('LINE FREQUENCY CALIBRATION ROUTINE') PAGEWIDTH(105) DEBUG
                       2                  ;WRITTEN 10/05/79
                       3                  ;UPDATED 05/04/82
                       4                  ;THIS ROUTINE DETERMINES IF THE LINE FREQUENCY IS

```
                                              ;EITHER 50 HZ OR 60 HZ BY SAMPLING THE ZERO CROSSING
                    5                         ;SIGNAL AND INCREMENTING A REGISTER  FROM THIS
                    6                         ;THE THEORETICAL NUMBER OF 1.29625 MHZ CLOCKS IS
                    7                         ;FORCED INTO THE LINE PERIOD COUNT BYTES
                    8                         ;FOR DIAGNOSTIC PURPOSES, THE OPERATOR MAY FORCE
                    9                         ;A 60HZ DETECTION VIA THE RESET KEY
                   10
                   11          PUBLIC  CALIB
                   12          EXTRN   LTL,LTM,SLOPEL,SLOPEM,MINL,MINM,MAXL,MAXM,KEYIN
                   13          EXTRN   DIVP,MULP,DIVD1,DIVD2,MULC1,MULC2
                   14          CSEG
0000 CD0000    E   15  CALIB   CALL    KEYIN       ;ALLOW THE OPERATOR TO FORCE A 60HZ DETECTION
0003 17            16          RAL                 ;THIS ALLOWS PASSING THE ZERO CROSSING TRAP
0004 DA0D00    C   17          JC      CONT        ;IF NO KEYBOARD INPUT, CONTINUE CALIB
0007 1F            18          RAR                 ;GET THE ENTRY
0008 FE14          19          CPI     20          ;CHECK FOR THE RESET KEY
000A CA3400    C   20          JZ      F60HZ       ;IF = RESET, FORCE THE 60HZ DETECTION
000D 210A70        21  CONT    LXI     H,700AH     ;POINT TO THE ZERO CROSSING PORT
0010 AF            22          XRA     A
0011 47            23          MOV     B,A         ;ZERO THE LOOP COUNTER
0012 7E            24  LOOP1   MOV     A,M         ;GET THE ZERO CROSSING BYTE
0013 E640          25          ANI     40H         ;MASK IN THE ZERO CROSSING BIT
0015 CA1200    C   26          JZ      LOOP1       ;IF ZERO, WAIT TILL IT IS ONE
0018 7E            27  LOOP2   MOV     A,M         ;GET THE ZERO CROSSING BYTE AGAIN
0019 E640          28          ANI     40H         ;MASK IN THE ZERO CROSSING BIT
001B C21800    C   29          JNZ     LOOP2       ;IF ONE, WAIT TILL IT IS ZERO
001E 7E            30  LOOP3   MOV     A,M         ;GET THE ZERO CROSSING BYTE
001F E640          31          ANI     40H         ;MASK IN THE ZERO CROSSING BIT
0021 C22E00    C   32          JNZ     DONE        ;WHEN ONE, CHECK THE NUMBER OF COUNTS
0024 04            33          INR     B           ;BUMP THE LOOP COUNTER
0025 0E0C          34          MVI     C,12        ;DO A 100 US WAIT LOOP
0027 0D            35  WAIT    DCR     C
0028 C22700    C   36          JNZ     WAIT
002B C31E00    C   37          JMP     LOOP3       ;GO BACK AND CHECK AGAIN
002E 3E75          38  DONE    MVI     A,75H       ;LOAD THE BYTE TO COMPARE
0030 B8            39          CMP     B
0031 DA5900    C   40          JC      F50HZ       ;IF A < B , FORCE 50 HZ NUMBER
0034 21322A        41  F60HZ   LXI     H,10802     ;ELSE, FORCE 10,802 COUNTS
0037 220000    E   42          SHLD    LTL
003A 219402        43          LXI     H,660       ;FORCE THE SLOPE TO 660 COUNTS/100 WATTS
003D 220000    E   44          SHLD    SLOPEL
0040 21BC02        45          LXI     H,700       ;FORCE THE MINIMUM PHASE ANGLE TO 700 COUNTS
0043 220000    E   46          SHLD    MINL
0046 21002A        47          LXI     H,10752     ;FORCE THE MAXIMUM PHASE ANGLE TO 10,752 COUNTS
0049 220000    E   48          SHLD    MAXL
004C 210000    E   49          LXI     H,DIVD1     ;GET THE POINTER TO THE 60HZ DIVIDEND FOR RATE
004F 220000    E   50          SHLD    DIVP        ;SET THIS POINTER USED IN RST65
0052 210000    E   51          LXI     H,MULC1     ;GET THE POINTER TO THE 60HZ MULTIPLIER FOR TIME
0055 220000    E   52          SHLD    MULP        ;SET THIS POINTER USED IN RST65
0058 C9            53          RET
0059 21A232        54  F50HZ   LXI     H,12962     ;FORCE 12,962 COUNTS
005C 220000    E   55          SHLD    LTL
005F 211803        56          LXI     H,792       ;FORCE THE SLOPE TO 792 COUNTS/100 WATTS
0062 220000    E   57          SHLD    SLOPEL
0065 21BC02        58          LXI     H,700       ;FORCE THE MINIMUM PHASE ANGLE TO 700 COUNTS
0068 220000    E   59          SHLD    MINL
006B 217032        60          LXI     H,12912     ;FORCE THE MAXIMUM PHASE ANGLE TO 12,912 COUNTS
006E 220000    E   61          SHLD    MAXL
0071 210000    E   62          LXI     H,DIVD2     ;GET THE POINTER TO THE 50HZ DIVIDEND FOR RATE
0074 220000    E   63          SHLD    DIVP        ;SET THIS POINTER USED IN RST65
0077 210000    E   64          LXI     H,MULC2     ;GET THE POINTER TO THE 50HZ MULTIPLIER FOR TIME
007A 220000    E   65          SHLD    MULP        ;SET THIS POINTER USED IN RST65
007D C9            66          RET
0000          C    67          END     CALIB

PUBLIC SYMBOLS
CALIB  C 0000
```

EXTERNAL SYMBOLS
DIVD1  E 0000    DIVD2  E 0000    DIVP   E 0000    KEYIN  E 0000    LTL    E 0000    LTM    E 0000
MAXL   E 0000    MAXM   E 0000    MINL   E 0000    MINM   E 0000    MULC1  E 0000    MULC2  E 0000
MULP   E 0000    SLOPEL E 0000    SLOPEM E 0000

USER SYMBOLS
CALIB  C 0000    CONT   C 000D    DIVD1  E 0000    DIVD2  E 0000    DIVP   E 0000    DONE   C 002E
F50HZ  C 0059    F60HZ  C 0034    KEYIN  E 0000    LOOP1  C 0012    LOOP2  C 0018    LOOP3  C 001E
LTL    E 0000    LTM    E 0000    MAXL   E 0000    MAXM   E 0000    MINL   E 0000    MINM   E 0000
MULC1  E 0000    MULC2  E 0000    MULP   E 0000    SLOPEL E 0000    SLOPEM E 0000    WAIT   C 0027

ASSEMBLY COMPLETE, NO ERRORS

ASM80  F1:KEYIN.SRC

ISIS-II 8080/8085 MACRO ASSEMBLER, V2.0
KEYBOARD INPUT ROUTINE

```
LOC   OBJ           SEQ         SOURCE STATEMENT

1  $       TITLE('KEYBOARD INPUT ROUTINE') PAGEWIDTH(105) DEBUG
                     2                  ;WRITTEN 09/19/79
                     3                  ;UPDATED 03/30/82
                     4                  ;THIS ROUTINE EXAMINES THE KEYBOARD FIFO FOR ENTRIES.
                     5                  ;ENTRIES ARE RETURNED IN THE A REG. IF NO ENTRY IS
                     6                  ;FOUND, BIT 8 OF THE A REG IS SET. IF AN ENTRY IS
                     7                  ;FOUND, THE ROW & COLUMN ENCODED ENTRY IS CONVERTED
                     8                  ;TO DEFINED FUNCTIONS VIA THE KTAB EQUATE TABLE.
                     9          PUBLIC  KEYIN,KTAB,KRESET,KDP,KDPT,KSTART,KENTER,KCHS,P0300,P0400
                    10          PUBLIC  R32572,R32752,R30300,R90,R60,R45,SBUZZ
7004                11  KD      EQU     7004H    ;ADDRESS OF KEYBOARD/DISPLAY
                    12          CSEG
0000 17             13  KTAB    DB      23,13,22,24,19,20,80H,80H
0001 0D
0002 16
0003 18
0004 13
0005 14
0006 80
0007 80
0008 15             14          DB      21,12,22,9,6,3,80H,80H
0009 0C
000A 16
000B 09
000C 06
000D 03
000E 80
000F 80
0010 11             15          DB      17,14,0,8,5,2,80H,80H
0011 0E
0012 00
0013 08
0014 05
0015 02
0016 80
0017 80
0018 10             16          DB      16,11,18,7,4,1,80H,80H
0019 0B
001A 12
001B 07
001C 04
001D 01
001E 80
```

```
001F 80
0020 0F              17         DB      15,10
0021 0A
0005         C       18 KRESET  EQU     KTAB+5     ;RESET
0021         C       19 R0300   EQU     KTAB+33    ;TEMP RANGE 0-300 C
0019         C       20 R0400   EQU     KTAB+25    ;TEMP RANGE 0-400 C
0009         C       21 R32572  EQU     KTAB+9     ;TEMP RANGE 32-572 F
0003         C       22 SBUZZ   EQU     KTAB+3     ;STOP BUZZ
0001         C       23 R32752  EQU     KTAB+1     ;TEMP RANGE 32-752 F
0000         C       24 KDP     EQU     KTAB       ;DRY/DECOMPOSITION POINT
001A         C       25 KDPT    EQU     KTAB+26    ;DECIMAL POINT
0011         C       26 R30300  EQU     KTAB+17    ;TEMP RANGE 30-300 C
0008         C       27 KSTART  EQU     KTAB+8     ;START
000A         C       28 KENTER  EQU     KTAB+10    ;ENTER
0004         C       29 KCHS    EQU     KTAB+4     ;CHANGE SIGN
0010         C       30 R90     EQU     KTAB+16    ;DISTILLATION RATE 9.0 ML/MIN
0018         C       31 R60     EQU     KTAB+24    ;DISTILLATION RATE 6.0 ML/MIN
0020         C       32 R45     EQU     KTAB+32    ;DISTILLATION RATE 4.5 ML/MIN
0022 210570          33 KEYIN   LXI     H,KD+1     ;POINT TO THE KEYBOARD COMMAND PORT
0025 7E              34         MOV     A,M        ;GET THE STATUS BYTE
0026 E60F            35         ANI     0FH        ;GET THE NUMBER OF CHARACTERS IN THE FIFO
0028 C22E00  C       36         JNZ     GOTONE     ;IF A CHARACTER IS FOUND, PROCESS IT
002B 3E80            37         MVI     A,80H      ;IF NOT, SET BIT 8 = 1
002D C9              38         RET                ;RETURN WITH SEMIFORE SET
002E 3650            39 GOTONE  MVI     M,50H      ;GET READ FIFO CONTROL WORD
0030 2B              40         DCX     H          ;POINT TO THE KEYBOARD DATA BUFFER
0031 7E              41         MOV     A,M        ;INPUT A CHARACTER
0032 E63F            42         ANI     3FH        ;KEYBOARD IS A 5 X 6 MATRIX TYPE
0034 1600            43         MVI     D,0        ;ZERO THE D REG
0036 5F              44         MOV     E,A        ;GET A CHARACTER
0037 210000  C       45         LXI     H,KTAB     ;GET BASE ADDRESS OF KEYBOARD LOOKUP TABLE
003A 19              46         DAD     D          ;FORM POINTER TO KEY EQUIVALENT
003B 7E              47         MOV     A,M        ;GET THE KEY EQUIVALENT
003C C9              48         RET                ;RETURN THE KEY IN THE A REG TO CALLING PROGRAM
0022         C       49         END     KEYIN
```

PUBLIC SYMBOLS
| KCHS C 0004 | KDP C 0000 | KDPT C 001A | KENTER C 000A | KEYIN C 0022 | KRESET C 0005 |
|---|---|---|---|---|---|
| KSTART C 0008 | KTAB C 0000 | R0300 C 0021 | R0400 C 0019 | R30300 C 0011 | R32572 C 0009 |
| R32752 C 0001 | R45 C 0020 | R60 C 0018 | R90 C 0010 | SBUZZ C 0003 | |

EXTERNAL SYMBOLS

USER SYMBOLS
| GOTONE C 002E | KCHS C 0004 | KD A 7004 | KDP C 0000 | KDPT C 001A | KENTER C 000A |
|---|---|---|---|---|---|
| KEYIN C 0022 | KRESET C 0005 | KSTART C 0008 | KTAB C 0000 | R0300 C 0021 | R0400 C 0019 |
| R30300 C 0011 | R32572 C 0009 | R32752 C 0001 | R45 C 0020 | R60 C 0018 | R90 C 0010 |
| SBUZZ C 0003 | | | | | |

ASSEMBLY COMPLETE, NO ERRORS

ASAHI FLOATE INC

ISIS-II 8080/8085 MACRO ASSEMBLER V2.0
ENTER DATE ROUTINE

LOC OBJ         SEQ       SOURCE STATEMENT

1 $        TITLE 'ENTER DATE ROUTINE' PAGEWIDTH(100) DEBUG
              2          ;WRITTEN 01-15-81
              3          ;UPDATED 11-17-81
              4          ;THIS ROUTINE ALLOWS THE OPERATOR TO ENTER THE
              5          ;DATE & TIME ONCE WHEN THE SYSTEM IS POWERED ON

```
                        6                       ;ENTRIES FOR YEAR, MONTH, DAY, HOUR, & MINUTE
                        7                       ;ARE EXPECTED
                        8               PUBLIC  EDATE,PACK10,PYEAR
                        9               EXTRN   DMES14,DMES15,DMES16,DMES17,DMES18,YEAR,MONTH,DAY,HOUR
                       10               EXTRN   MINUTE,IBUF,MIT,KEYIN,EDITOR,LTC,MONTEL
                       11               EXTRN   DSPLY,DBUF,ECDBIN
                       12               CSEG
0000 110000  E         13  EDATE   LXI     H,DMES14    ;POINT TO THE YEAR MESSAGE
0003 0E0E              14          MVI     C,14        ;WANT TO LOAD UP 14 CHARACTERS
0005 CD0000  E         15          CALL    DSPLY       ;GO DISPLAY THE YEAR MESSAGE
0008 2A0000  E         16          LHLD    YEAR        ;GET THE YEAR
000B 220E00  E         17          SHLD    IBUF+14     ;PUT THE YEAR IN THE INSERT BUFFER
000E CD0000  E         18          CALL    MIT         ;DISPLAY THE YEAR
0011 0EFF             19          MVI     C,-1        ;THIS IS THE ENTRY COUNTER
0013 0C               20  NEXT1   INR     C           ;BUMP THE ENTRY COUNTER
0014 CD0000  E         21  INKEY   CALL    KEYIN       ;GO SAMPLE THE KEYBOARD
0017 17               22          RAL                 ;CHECK FOR ANY CHARACTERS, LOOK AT BIT 7
0018 DA1400  C         23          JC      INKEY       ;IF NONE, WAIT FOR ONE
001B 1F               24          RAR                 ;GET THE CHARACTER
001C FE0A             25          CPI     10          ;CHECK FOR DIGITS 0 - 9
001E DA2E00  C         26          JC      INSERT      ;IF 0 - 9 GO PROCESS THE DIGIT
0021 FE16             27          CPI     22          ;CHECK FOR THE ENTER KEY
0023 CA0000  C         28          JZ      PENTER      ;GO PROCESS AN ENTER KEY
0026 FE14             29          CPI     20          ;CHECK FOR THE RESET KEY
0028 CA0000  C         30          JZ      EDATE       ;IF RESET KEY, START OVER
002B C31400  C         31          JMP     INKEY       ;IGNORE ALL OTHER KEYS
002E C630             32  INSERT  ADI     30H         ;MAKE THE DIGIT ASCII
0030 210F00  E         33          LXI     H,IBUF+15   ;WANT TO PUT THE DIGIT IN THE BUFFER
0033 4E               34          MOV     B,M         ;GET THE DIGIT & MOVE IT OVER ONE PLACE
0034 77               35          MOV     M,A         ;PUT THIS DIGIT IN THE BUFFER
0035 2B               36          DCX     H
0036 70               37          MOV     M,B         ;MOVE THIS DIGIT OVER
0037 CD0000  E         38          CALL    MIT         ;GO ECHO THE BUFFER
003A C31400  C         39          JMP     INKEY       ;GO WAIT FOR ANOTHER CHARACTER
003D 2A0E00  E         40  PENTER  LHLD    IBUF+14     ;GET THE ENTRY
0040 EB               41          XCHG                ;PUT IT IN THE D-E PAIR
0041 CD0E01  C         42          CALL    PACK10      ;WANT TO CONVERT THE ASCII ENTRY TO BINARY
0044 79               43          MOV     A,C         ;THE RESULT IS IN D-E. GET THE ENTRY COUNTER
0045 FE00             44          CPI     0           ;ARE WE DOING YEAR ENTRY?
0047 CA7900  C         45          JZ      PYEAR       ;IF YES, GO PROCESS THE YEAR
004A FE01             46          CPI     1           ;ARE WE DOING MONTH ENTRY?
004C CA0000  C         47          JZ      PMONTH      ;IF YES, GO PROCESS THE MONTH
004F FE02             48          CPI     2           ;ARE WE DOING DAY ENTRY?
0051 CA0000  C         49          JZ      PDAY        ;IF YES, GO PROCESS THE DAY
0054 FE03             50          CPI     3           ;ARE WE DOING HOUR ENTRY?
0056 CA0000  C         51          JZ      PHOUR       ;IF YES, GO PROCESS THE HOUR
0059 7B               52  PMIN    MOV     A,E         ;ELSE, MUST BE MINUTE ENTRY, GET THE ENTRY
005A FE3C             53          CPI     60          ;CHECK FOR ENTRIES > 59
005C D21400  C         54          JNC     INKEY       ;DO NOT ALLOW > 59 MINUTES
005F 2A0E00  E         55          LHLD    IBUF+14     ;IF ALL OK, SAVE THE MINUTE ENTRY
0062 3E20             56          MVI     A,' '       ;CHECK FOR AN ASCII BLANK
0064 BD               57          CMP     L
0065 C27000  C         58          JNZ     PMINC       ;IF NOT A BLANK, THE ENTRY IS OK
0068 2E30             59          MVI     L,'0'       ;ELSE, FORCE AN ASCII 0
006A BC               60          CMP     H
006B C27000  C         61          JNZ     PMINC
006E 2630             62          MVI     H,'0'       ;ELSE, FORCE AN ASCII 0
0070 220000  E         63  PMINC   SHLD    MINUTE
0073 CD5701  C         64          CALL    LDCLK       ;GO LOAD THE CLOCK
0076 C30000  E         65          JMP     EDITOR      ;WHEN DONE, GO TO THE EDITOR
0079 7B               66  PYEAR   MOV     A,E         ;GET THE ENTRY
007A FE50             67          CPI     80          ;CHECK FOR ENTRIES > 80
007C DA1400  C         68          JC      INKEY       ;DO NOT ALLOW YEARS < 80
007F 2A0E00  E         69          LHLD    IBUF+14     ;GET THE ENTRY
0082 220000  E         70          SHLD    YEAR        ;SAVE THE YEAR ENTRY
0085 2A0000  E         71          LHLD    MONTH       ;GET THE MONTH ENTRY
```

```
0083  EB              73              XCHG            ;PUT THE MONTH IN THE D,E REG
008A  210000    E     73              LXI    H,[MES15;POINT TO THE MONTH MESSAGE
008D  C3CE01    C     74              JMP    NEXT     ;GO DISPLAY THE MONTH MESSAGE
008F  7B              75 PMONTH  MOV    A,E             ;GET THE ENTRY
0090  FE00            76              CPI    0        ;CHECK FOR ZERO ENTRY
0092  CA1400    C     77              JZ     INKEY    ;DO NOT ALLOW 00 OR 00 MONTH
0095  FE00            78              CPI    13       ;CHECK FOR MONTH > 12
0097  D21400    C     79              JNC    INKEY    ;IF MONTH > 12, DO NOT ALLOW THE ENTRY
009A  2A0E00    E     80              LHLD   IBUF+14  ;FINALLY, ALL IS OK
009D  220000    E     81              SHLD   MONTH    ;SAVE THIS MONTH ENTRY
00A0  2A0000    E     82              LHLD   DAY      ;GET THE DAY ENTRY
00A3  EB              83              XCHG            ;PUT IT IN THE D,E REG
00A4  210000    E     84              LXI    H,[MES16;POINT TO THE DAY MESSAGE
00A7  C3CE01    C     85              JMP    NEXT     ;GO DISPLAY THE DAY MESSAGE
00AA  7B              86 PDAY    MOV    A,E             ;GET THE ENTRY
00AB  FE00            87              CPI    0        ;CHECK FOR ZERO ENTRY
00AD  CA1400    C     88              JZ     INKEY    ;IF = 00, GO OF 00, DO NOT ALLOW THE ENTRY
00B0  FE20            89              CPI    32       ;CHECK FOR DAY > 31
00B2  D21400    C     90              JNC    INKEY    ;DO NOT ALLOW DAY > 31
00B5  D5              91 PDAYC   PUSH   D         ;SAVE THE DAY ENTRY
00B6  2A0000    E     92              LHLD   MONTH    ;GET THE MONTH ENTRY
00B9  EB              93              XCHG
00BA  CD0601    C     94              CALL   PACKD    ;GO PACK THE MONTH IN THE C REG
00BD  210000    E     95              LXI    H,MONTBL ;POINT TO THE MONTH TABLE
00C0  19              96              DAD    D         ;FORM THE TAB IN THE TABLE
00C1  2E              97              DCX    H
00C2  7E              98              MOV    A,M       ;GET THE MONTH LIMIT IN DAYS
00C3  D1              99              POP    D         ;GET THE PACKED DAY ENTRY
00C4  FE1C           100              CPI    28       ;CHECK FOR THE MONTH OF FEBRUARY
00C6  CC0000    C    101              CZ     CKYEAR   ;IF = FEBRUARY, CHECK FOR LEAP YEAR
00C9  BB             102              CMP    E        ;COMPARE THE ENTRY TO THE LIMIT
00CA  DA1400    C    103              JC     INKEY    ;DO NOT ALLOW ENTRIES > THE LIMIT
00CD  2A0E00    E    104              LHLD   IBUF+11  ;GET THE ENTRY
00D0  220000    E    105              SHLD   DAY      ;SAVE THE DAY ENTRY
00D3  2A0000    E    106              LHLD   HOUR     ;GET THE HOUR ENTRY
00D6  EB             107              XCHG             ;PUT IT IN THE D,E REG
00D7  210000    E    108              LXI    H,[MES17;POINT TO THE HOUR MESSAGE
00DA  C3CE01    C    109              JMP    NEXT     ;GO DISPLAY THE HOURS MESSAGE
00DD  47             110 CKYEAR  MOV    B,A      ;SAVE THE MONTH LIMIT OF 28 DAYS
00DE  2A0000    E    111              LHLD   YEAR     ;GET THE YEAR ENTRY
00E1  7D             112              MOV    A,L      ;LOOK AT THE DECADE DIGIT
00E2  1F             113              RAR             ;CHECK FOR EVEN OR ODD DECADES
00E3  7C             114              MOV    A,H      ;GET READY TO LOOK AT THE UNITS YEAR ENTRY
00E4  DAF900    C    115              JC     ODDDEC   ;JUMP IF ODD DECADE
00E7  FE00           116              CPI    '0'      ;CHECK FOR EVEN DECADE LEAP YEARS
00E9  CAF600    C    117              JZ     BDLIM    ;IF = 1980, BUMP DAY LIMIT
00EC  FE04           118              CPI    '4'
00EE  CAF600    C    119              JZ     BDLIM    ;IF = 1984, BUMP DAY LIMIT
00F1  FE08           120              CPI    '8'
00F3  C2F700    C    121              JNZ    ULIM     ;IF NOT = 1988, JUST RESTORE THE DAY LIMIT OF 28
00F6  04             122 BDLIM   INR    B        ;MAKE THE DAY LIMIT FOR LEAP YEARS = 29
00F7  78             123 ULIM    MOV    A,B
00F8  C9             124              RET
00F9  FE02           125 ODDDEC  CPI    '2'      ;CHECK FOR ODD DECADE LEAP YEARS
00FB  CAF600    C    126              JZ     BDLIM    ;IF = 1992, BUMP DAY LIMIT
00FE  FE06           127              CPI    '6'
0100  CAF600    C    128              JZ     BDLIM    ;IF = 1996, BUMP DAY LIMIT
0103  C3F700    C    129              JMP    ULIM     ;ELSE, RESTORE THE DAY LIMIT OF 28
0106  C5             130 PACKD   PUSH   B        ;SAVE THE B,C REG
0107  210200    E    131              LXI    H,DBUF+2 ;POINT TO THE DATA BUFFER
010A  7A             132              MOV    A,D      ;WANT TO PACK THE DIGITS IN D,E
010B  E60F           133              ANI    0FH      ;AND CONVERT TO BINARY
010D  57             134              MOV    D,A
010E  7B             135              MOV    A,E      ;GET THE MSB CELL DIGIT
010F  17             136              RAL
0110  17             137              RAL
```

```
0111 17           128         RAL
0112 17           129         RAL
0113 E6F0         140         ANI     0F0H
0115 82           141         ADD     D
0116 77           142         MOV     M,A         ;PUT THE PACKED ENTRY IN THE DATA BUFFER
0117 AF           143         XRA     A
0118 2B           144         DCX     H
0119 77           145         MOV     M,A
011A 2B           146         DCX     H
011B 77           147         MOV     M,A
011C CD0000  E    148         CALL    BCDBIN      ;CONVERT THE ENTRY TO BINARY
011F 59           149         MOV     E,C         ;RESULT RETURNED IN B,C
0120 50           150         MOV     D,B         ;PUT THE RESULT IN D,E
0121 C1           151         POP     B           ;RESTORE B,C
0122 C9           152         RET
0123 7B           153 FHOUR   MOV     A,E         ;GET THE ENTRY
0124 FE00         154         CPI     0           ;CHECK FOR ZERO ENTRY
0126 CA1400  C    155         JZ      INKEY       ;IF = BB, 80, OR 00, DO NOT ALLOW THE ENTRY
0129 FE18         156         CPI     24          ;TRAP ON HOUR > 23
012B D21400  C    157         JNC     INKEY       ;DO NOT ALLOW HOUR > 23
012E 2A0F00  E    158         LHLD    IBUF+14     ;FINALLY, ALL IS WELL
0131 220000  E    159         SHLD    HOUR        ;SAVE THE HOUR ENTRY
0134 2A0000  E    160         LHLD    MINUTE      ;GET THE MINUTE ENTRY
0137 EB           161         XCHG                ;PUT IT IN THE D,E REG
0138 210000  E    162         LXI     H,MMESI     ;POINT TO THE MINUTE MESSAGE
013B C3DE01  C    163         JMP     NEXT        ;GO DISPLAY THE MINUTE MESSAGE
013E D5           164 NEXT    PUSH    D           ;SAVE THE NEXT ENTRY TO BE DISPLAYED
013F 110600  E    165         LXI     D,IBUF+6    ;POINT TO THE INSERT BUFFER + 6
0142 0608         166         MVI     B,8         ;WANT TO LOAD 8 CHARACTERS
0144 7E           167 DLOOP   MOV     A,M         ;GET A CHARACTER
0145 12           168         STAX    D           ;PUT IT IN THE INSERT BUFFER
0146 23           169         INX     H
0147 13           170         INX     D
0148 05           171         DCR     B
0149 C24401  C    172         JNZ     DLOOP
014C E1           173         POP     H           ;GET THE ENTRY TO BE DISPLAYED
014D EB           174         XCHG                ;PUT IT IN THE INSERT BUFFER
014E 73           175         MOV     M,E
014F 23           176         INX     H
0150 72           177         MOV     M,D
0151 CD0000  E    178         CALL    XMIT        ;GO TRANSMIT THIS MESSAGE
0154 C31700  C    179         JMP     NEXT1       ;GO WAIT FOR KEY INPUT
0157 211770       180 LDCLK   LXI     H,7017H     ;POINT TO THE REAL TIME CLOCK CONTROL PORT
015A 3630         181         MVI     M,30H       ;FORCE COUNTER 0 OUTPUT LOW
015C 3654         182         MVI     M,54H       ;SET COUNTER 1 TO FFH
015E 2B           183         DCX     H           ;USE MODE 2 WHICH RELOADS THE COUNT
015F 2B           184         DCX     H           ;POINT TO COUNTER 1 DATA PORT
0160 36FF         185         MVI     M,0FFH      ;FORCE COUNTER 1 TO COUNT 255 MINUTES
0162 23           186         INX     H           ;POINT TO THE REAL TIME CONTROL PORT
0163 23           187         INX     H           ;POINT TO THE CONTROL PORT AGAIN
0164 3614         188         MVI     M,14H       ;FORCE COUNTER 0 HIGH
0166 3630         189         MVI     M,30H       ;NOW FORCE COUNTER 0 LOW, THIS IS SO COUNTER 1 LOADS
0168 3614         190         MVI     M,14H       ;SET COUNTER 0 FOR 1 MINUTE OUTPUT @ 120HZ INPUT
016A 211479       191         LXI     H,7014H     ;POINT TO COUNTER 0 DATA PORT, USE MODE 2
016D 3A0000  E    192         LDA     LTL         ;CHECK IF 60HZ OR 50HZ BY LOOKING HERE
0170 17           193         RAL
0171 DA7A01  C    194         JC      ITS50       ;IF CY = 1, IT'S 50 HZ
0174 112010       195         LXI     D,7200      ;FORCE THE 60HZ FACTOR
0177 73           196 LDCLKC  MOV     M,E         ;GET THE DIVIDE FACTOR FOR 1 MINUTE OUTPUT
0178 72           197         MOV     M,D         ;LOAD THIS COUNT DOWN NUMBER INTO COUNTER 0
0179 C9           198         RET                 ;RETURN WHEN LOAD IS DONE
017A 117017       199 ITS50   LXI     D,6000
017D C37701       200         JMP     LDCLKC      ;THIS FORCES THE 50HZ FACTOR
0000              201         END     EDATE
```

PUBLIC SYMBOLS
CYEAR C 0000    EDATE C 0000    PACFD C 0106

EXTERNAL SYMBOLS
BCDBIN E 0000    DAY    E 0000    DBUF   E 0000    DMES14 E 0000    DMES15 E 0000    DMES16 E 0000
DMES17 E 0000    DMES18 E 0000    DSPLY  E 0000    EDITOR E 0000    HOUR   E 0000    IBUF   E 0000
KEYIN  E 0000    LTL    E 0000    MINUTE E 0000    MONTBL E 0000    MONTH  E 0000    TMIT   E 0000
YEAR   E 0000

USER SYMBOLS
BCDBIN E 0000    BCLIM C 00F6    CYEAR C 0000    DAY   E 0000    DBUF   E 0000    DLOOP C 0144
DMES14 E 0000    DMES15 E 0000    DMES16 E 0000    DMES17 E 0000    DMES18 E 0000    DSPLY  E 0000
EDATE  C 0000    EDITOR E 0000    HOUR  E 0000    IBUF  E 0000    INKEY C 0013    INSER C 0016
...
MONTH  E 0000    NEXT1 C 0012    NEXT2 C 0012    ...    PBCD  C 00F6    PCDAY C 008A
PDAY   C 008A    PDAYC C 0085    PENTER C 00CD    PHOUR C 012D    PMIN  C 00CF    PMINF C 00CF
PMONTH C 00AF    PYEAR C 0079    ULIM  C 00FE    TMIT  E 0000    YEAR  E 0000

ASSEMBLY COMPLETE, NO ERRORS

ISIS-II 8080/8085 MACRO ASSEMBLER, V2.0
DISPLAY DATE ROUTINE

LOC  OBJ          SEQ         SOURCE STATEMENT

1    $      TITLE('DISPLAY DATE ROUTINE'),PAGEWIDTH(105),DEBUG
                  2           ;WRITTEN 03-19-81
                  3           ;UPDATED 03-22-81
                  4           ;THIS ROUTINE WILL LOAD UP THE PRINT BUFFER WITH
                  5           ;THE DATE & TIME DATA AND PRINT IT OUT. THIS ROUTINE
                  6           ;IS CALLED FROM THE PROF ROUTINE
                  7           PUBLIC  DDATE
                  8           EXTRN   YEAR,MONTH,DAY,HOUR,MINUTE,PACFD,MONTBL,PRINTB,PRINT
                  9           CSEG
0000 2A0000    E  10   DDATE  CALL    MONTH    ;WANT TO PRINT OUT FOR EACH TEST THE DATE & TIME
0003 EB           11          XCHG
0004 CD0000    E  12          CALL    PACFD    ;GO PACK THE MONTH IN THE D REG
0007 210000    E  13          LXI     H,MONTBL ;POINT TO THE ASCII MONTH TABLE
000A 19           14          DAD     D
000B 19           15          DAD     D        ;FORM THE TAB IN THIS TABLE
000C 19           16          DAD     D        ;TAB = MONTH - 1 * 3
000D 19           17          DAD     D
000E 110000    E  18          LXI     D,PRINTB ;POINT TO THE PRINT BUFFER
0011 7E           19          MOV     A,M
0012 12           20          STAX    D
0013 23           21          INX     H
0014 13           22          INX     D
0015 7E           23          MOV     A,M
0016 12           24          STAX    D
0017 23           25          INX     H
0018 13           26          INX     D
0019 7E           27          MOV     A,M
001A 12           28          STAX    D
001B 13           29          INX     D
001C EB           30          XCHG
001D 2620         31          MVI     H,' '
001F 23           32          INX     H
0020 EB           33          XCHG
0021 2A0000    E  34          LHLD    DAY      ;GET THE ASCII DAY
0024 E5           35          PUSH    H
0025 C1           36          POP     B        ;PUT IT IN THE B REG
0026 EB           37          XCHG
0027 71           38          MOV     M,C      ;PUT THE DAY IN THE PRINT BUFFER
0028 23           39          INX     H
0029 70           40          MOV     M,B
002A 23           41          INX     H

```
002B 3620        42           MVI     M,' '
002D 23          43           INX     H
002E 3601        44           MVI     M,1       ;PUT THE ASCII 19 PART OF THE YEAR IN
0030 23          45           INX     H
0031 3609        46           MVI     M,9
0033 23          47           INX     H
0034 EB          48           XCHG
0035 2A0000 E    49           LHLD    YEAR      ;GET THE ASCII YEAR
0038 EB          50           XCHG
0039 7E          51           MOV     A,M
003A 23          52           INX     H
003B 73          53           MOV     M,D       ;PUT THE YEAR IN THE PRINT BUFFER
003C 23          54           INX     H
003D 3620        55           MVI     M,' '
003F 23          56           INX     H
0040 EB          57           XCHG
0041 2A0000 E    58           LHLD    HOUR      ;GET THE ASCII HOUR
0044 EB          59           XCHG
0045 72          60           MOV     M,D
0046 23          61           INX     H
0047 72          62           MOV     M,E
0048 23          63           INX     H
0049 363A        64           MVI     M,':'
004B 23          65           INX     H
004C EB          66           XCHG
004D 2A0000 E    67           LHLD    MINUTE    ;GET THE ASCII MINUTE
0050 EB          68           XCHG
0051 72          69           MOV     M,E
0052 23          70           INX     H
0053 72          71           MOV     M,D
0054 23          72           INX     H
0055 3620        73           MVI     M,' '
0057 23          74           INX     H
0058 3620        75           MVI     M,' '
005A 23          76           INX     H
005B 3620        77           MVI     M,' '
005D 000000 E    78           CALL    PRINT     ;GO PRINT THE BUFFER
0060 C9          79           RET
0000        C    80           END     ODATE

PUBLIC SYMBOLS
ODATE  C 0000

EXTERNAL SYMBOLS
DAY    E 0000   HOUR   E 0000   MINUTE E 0000   PRINTAC E 0000   MONTH  E 0000   ...   E 0000
PRINT  E 0000   PRINTS E 0000   YEAR   E 0000

USER SYMBOLS
DAY    E 0000   ODATE  C 0000   HOUR   E 0000   MINUTE E 0000   PRINTAC E 0000   ...   E 0000
PRINT  E 0000   PRINTS E 0000   YEAR   E 0000

ASSEMBLY COMPLETE, NO ERRORS

ISIS-II 8080/8085 MACRO ASSEMBLER, V2.0
UPDATE THE DATE ROUTINE

LOC  OBJ          SEQ         SOURCE STATEMENT

1  $        TITLE('UPDATE THE DATE ROUTINE')  PAGEWIDTH(105) PAGELENGTH(55)
                  2           ;WRITTEN 09-19-81
                  3           ;UPDATED 11-17-81
                  4           ;THIS ROUTINE UPDATES THE DATE PARAMETERS. THE
                  5           ;CLOCK TIMER IS READ AND ELAPSED TIME DATA USED
                  6           ;TO UPDATE YEAR, MONTH, DAY, HOURS & MINUTES
                  7           ;THIS ROUTINE IS CALLED FROM FROM VARIOUS ROUTINES
                  8           ;BUT BEFORE ONE MINUTE HAS ELAPSED
                  9           PUBLIC  UDATE
```

|  |  |  |  |  |  |
|---|---|---|---|---|---|
|  |  | 10 | EXTRN | YEAR,MONTH,DAY,HOUR,MINUTE,DBUF,BINBCD,UNPAK,PACKD |
|  |  | 11 | EXTRN | MONTBL,CKYEAR,MINCTR |
|  |  | 12 | CSEG |  |  |
| 0000 211770 |  | 13 UPDATE | LXI | H,7017H | ;WANT TO CHECK FOR ONE MINUTE ELAPSED |
| 0003 0640 |  | 14 | MVI | B,40H | ;LATCH THE MINUTE COUNTER |
| 0005 2B |  | 15 | DCX | H | ;POINT TO THE MINUTE DATA PORT |
| 0006 2B |  | 16 | DCX | H |  |
| 0007 46 |  | 17 | MOV | B,M | ;GET THE CLOCK SWITCH |
| 0008 3A0000 | E | 18 | LDA | MINCTR | ;GET THE LAST COUNT |
| 000B B8 |  | 19 | CMP | B | ;< 1 MINUTE ELAPSED, NO TIME UPDATE NEEDED |
| 000C C8 |  | 20 | RZ |  | ;IF =, RETURN |
| 000D 78 |  | 21 | MOV | A,B |  |
| 000E 320000 | E | 22 | STA | MINCTR | ;UPDATE THE MINUTE COUNTER |
| 0011 2A0000 | E | 23 | LHLD | MINUTE | ;GET THE MINUTE DATA TO UPDATE |
| 0014 EB |  | 24 | XCHG |  |  |
| 0015 CD0000 | E | 25 | CALL | PACKD | ;GO PACK IT IN THE D,E REG |
| 0018 7B |  | 26 | MOV | A,E | ;GET THE MINUTES 0 TO 59 |
| 0019 3C |  | 27 | INR | A | ;ADD ONE ELAPSED MINUTE |
| 001A FE3C |  | 28 | CPI | 60 | ;CHECK FOR ANY HOUR OVERFLOW |
| 001C 0600 |  | 29 | MVI | B,0 | ;FORCE THE HOUR OVERFLOW TO 0 |
| 001E DA2400 | C | 30 | JC | MINOK | ;IF < 60, MINUTES ARE OK |
| 0021 04 |  | 31 | INR | B | ;SET THE OVERFLOW HOUR TO 1 |
| 0022 D63C |  | 32 | SUI | 60 | ;SUBTRACT OFF 1 HOUR |
| 0024 CD9600 | C | 33 MINOK | CALL | CONV | ;GO CONVERT THE UPDATED MINUTES IN A REG TO BCD |
| 0027 220000 | E | 34 | SHLD | MINUTE | ;UPDATE THE MINUTE DATA, ASCII MINUTES RETURNED |
| 002A 2A0000 | E | 35 | LHLD | HOUR | ;GET THE HOUR DATA TO UPDATE |
| 002D EB |  | 36 | XCHG |  |  |
| 002E CD0000 | E | 37 | CALL | PACKD | ;GO PACK IT IN THE D,E REG |
| 0031 7B |  | 38 | MOV | A,E | ;GET THE HOURS 0 TO 23 |
| 0032 80 |  | 39 | ADD | B | ;ADD ANY ELAPSED HOUR |
| 0033 FE18 |  | 40 | CPI | 24 | ;CHECK FOR A DAY OVERFLOW |
| 0035 0600 |  | 41 | MVI | B,0 | ;FORCE THE DAY OVERFLOW TO 0 |
| 0037 DA3D00 | C | 42 | JC | HOUROK | ;IF < 24 HOURS IT'S OK |
| 003A 04 |  | 43 | INR | B | ;B = OVERFLOW DAY, CAN ONLY BE = 1 |
| 003B D618 |  | 44 | SUI | 24 | ;SUBTRACT OFF 1 DAY |
| 003D CD9600 | C | 45 HOUROK | CALL | CONV | ;GO CONVERT THE UPDATED HOURS IN A REG TO BCD |
| 0040 220000 | E | 46 | SHLD | HOUR | ;UPDATE THE HOUR DATA, ASCII HOURS RETURNED |
| 0043 2A0000 | E | 47 | LHLD | DAY | ;GET THE DAY DATA TO UPDATE |
| 0046 EB |  | 48 | XCHG |  |  |
| 0047 CD0000 | E | 49 | CALL | PACKD | ;GO PACK IT IN THE D,E REG |
| 004A 7B |  | 50 | MOV | A,E | ;GET THE DAYS 1 TO 28, 29, 30, 31 |
| 004B 80 |  | 51 | ADD | B | ;ADD ANY OVERFLOW DAYS |
| 004C 4F |  | 52 | MOV | C,A | ;SAVE THIS UPDATED DAY |
| 004D 2A0000 | E | 53 | LHLD | MONTH | ;GET THE MONTH DATA |
| 0050 EB |  | 54 | XCHG |  |  |
| 0051 CD0000 | E | 55 | CALL | PACKD | ;GO PACK IT IN THE E REG |
| 0054 210000 | E | 56 | LXI | H,MONTBL | ;LET'S FIND OUT THE DAY LIMIT FOR THIS MONTH |
| 0057 19 |  | 57 | DAD | D | ;FORM THE TAB IN THE TABLE |
| 0058 2B |  | 58 | DCX | H |  |
| 0059 7E |  | 59 | MOV | A,M | ;GET THE DAY LIMIT |
| 005A FE1C |  | 60 | CPI | 28 | ;CHECK FOR FEBRUARY |
| 005C CC0000 | E | 61 | CZ | CKYEAR | ;IF = FEB, CHECK FOR LEAP YEARS |
| 005F B9 |  | 62 | CMP | C | ;NOW A REG = DAY LIMIT, C REG = UPDATED DAY |
| 0060 57 |  | 63 | MOV | D,A |  |
| 0061 0600 |  | 64 | MVI | B,0 | ;SET THE YEAR OVERFLOW TO 0 |
| 0063 79 |  | 65 | MOV | A,C | ;PUT THE UPDATED DAY IN THE A REG |
| 0064 CA6C00 | C | 66 | JZ | DAYOK | ;IF = TO THE LIMIT, IT'S OK |
| 0067 D26C00 | C | 67 | JNC | DAYOK | ;IF < THE LIMIT, IT'S OK |
| 006A 92 |  | 68 | SUB | D | ;DO UPDATED DAY - DAY LIMIT = GOOD DAY |
| 006B 04 |  | 69 | INR | B | ;SET MONTH OVERFLOW TO + 1 |
| 006C CD9600 | C | 70 DAYOK | CALL | CONV | ;GO CONVERT THE GOOD DAY IN A REG TO BCD |
| 006F 220000 | E | 71 | SHLD | DAY | ;UPDATE THE DAY DATA, ASCII DAYS RETURNED |
| 0072 2A0000 | E | 72 | LHLD | MONTH | ;GET THE MONTH TO UPDATE |
| 0075 EB |  | 73 | XCHG |  |  |
| 0076 CD0000 | E | 74 | CALL | PACKD | ;GO PACK IT IN THE D,E REG |
| 0079 7B |  | 75 | MOV | A,E | ;GET THE MONTH 1 TO 12 |

```
007A 80            76         ADD    B          ;ADD ANY MONTH OVERFLOW
007B FE0D          77         CPI    13         ;CHECK FOR A YEAR OVERFLOW, >12 MONTHS
007D 0600          78         MVI    B,0        ;SET THE YEAR OVERFLOW TO 0
007F DA8500   C    79         JC     MONO1      ;IF <13 MONTH IS OK
0082 3E01          80         MVI    A,1        ;SET THE MONTH TO JAN
0084 47            81         MOV    B,A        ;SET THE YEAR COUNT TO +1
0085 CD9B00   C    82 MONO1   CALL   CONV       ;GO CONVERT THE MONTH IN THE A REG TO BCD
0088 220000   E    83         SHLD   MONTH      ;UPDATE THE MONTH DATA
008B 2A0000   E    84         LHLD   YEAR       ;GET THE YEAR DATA TO UPDATE
008E EB            85         XCHG
008F CD0000   E    86         CALL   PACKD      ;GO PACK IT IN THE D,E REG
0092 7B            87         MOV    A,E        ;GET THE YEARS, 80 TO 99
0093 80            88         ADD    B          ;ADD ANY YEAR OVERFLOW
0094 CD9B00   C    89         CALL   CONV       ;GO CONVERT THE YEAR IN THE A REG TO BCD
0097 220000   E    90         SHLD   YEAR       ;UPDATE THE YEAR DATA
009A C9            91         RET               ;FINALLY DONE WITH THE UPDATES
009B C5            92 CONV    PUSH   B          ;SAVE THE B,C VALUES
009C 210800   E    93         LXI    H,DBUF+8   ;POINT TO THE DATA BUFFER
009F 77            94         MOV    M,A        ;WANT TO CONVERT THE VALUE IN REG A TO BCD
00A0 2B            95         DCX    H
00A1 AF            96         XRA    A
00A2 77            97         MOV    M,A
00A3 2B            98         DCX    H
00A4 77            99         MOV    M,A
00A5 2B            100        DCX    H
00A6 77            101        MOV    M,A
00A7 CD0000   E    102        CALL   BINBCD     ;GO DO THE CONVERSION
00AA 210400   E    103        LXI    H,DBUF+4   ;POINT TO THE RESULT
00AD 4E            104        MOV    C,M        ;PUT THE RESULT IN REG C
00AE 79            105        MOV    A,C        ;PUT THE RESULT IN REG A ALSO
00AF CD0000   E    106        CALL   UNPAK      ;GO UNPACK THIS RESULT
00B2 6F            107        MOV    L,A
00B3 79            108        MOV    A,C
00B4 E60F          109        ANI    0FH
00B6 C630          110        ADI    30H
00B8 67            111        MOV    H,A        ;PUT THE ASCII RESULT IN H,L
00B9 C1            112        POP    B          ;RESTORE THE B,C VALUES ON ENTRY
00BA C9            113        RET
0000         C     114        END    UDATE

PUBLIC SYMBOLS
UDATE  C 0000

EXTERNAL SYMBOLS
BINBCD E 0000   CHYEAR E 0000   DAY    E 0000   DBUF   E 0000   HOUR   E 0000   MINCTR E 0000
MINUTE E 0000   MONTBL E 0000   MONTH  E 0000   PACKD  E 0000   UNPAK  E 0000   YEAR   E 0000

USER SYMBOLS
BINBCD E 0000   CHYEAR E 0000   CONV   C 009B   DAY    E 0000   DAYO1  C 0060   DBUF   E 0000
HOUR   E 0000   HOURO1 C 003D   MINCTR E 0000   MINO1  C 0024   MINUTE E 0000   MONO1  C 0085
MONTBL E 0000   MONTH  E 0000   PACKD  E 0000   UDATE  C 0000   UNPAK  E 0000   YEAR   E 0000

ASSEMBLY COMPLETE, NO ERRORS
ISIS-II 8080/8085 MACRO ASSEMBLER V3.0
INSERT AND TRANSMIT ROUTINE

LOC  OBJ           SEQ        SOURCE STATEMENT

1  ;        TITLE: INSERT AND TRANSMIT ROUTINE - PAGE#11(A-10) DEBUG
                  2  ;               WRITTEN 09/04/79
                  3  ;               UPDATED 11/17/81
                  4  ;        THIS ROUTINE PUTS KEYBOARD ENTERED CHARACTERS
                  5  ;        INTO THE APPROPRIATE POSITION IN THE INSERT BUFFER
                  6  ;        THE ENTIRE INSERT BUFFER IS OUTPUTTED TO THE
                  7  ;        DISPLAY BY THE "MIT" ROM
                  8           PUBLIC INSERT,MIT
                  9           EXTRN  SPARE,IBUF
```

```
7004                    10  KB      EQU     7004H       ;KEYBOARD TYPE AS BUFFER
                        11          CSEG
0000 56                 12  TPLATE  DB      56H         ;INSERT BUFFER TEMPLATE
0001 2D                 13          DB      2DH         ;# OF CHARACTERS TO SHIFT WHERE TO START SHIFTING
0002 2D                 14          DB      2DH
0003 2D                 15          DB      2DH
0004 2D                 16          DB      2DH
0005 2D                 17          DB      2DH
0006 2D                 18          DB      2DH
0007 1E                 19          DB      1EH
0008 47                 20  INSERT  MOV     B,A         ;SAVE THE CHARACTER PASSED IN THE A REG
0009 3A0000    E        21          LDA     SPARC       ;GET THE SYSTEM PARAMETER COUNTER
000C FE04               22          CPI     4           ;ARE WE DOING EXPECTED LOSS
000E CA4C00    C        23          JZ      SPEC        ;IF YES DO A SPECIAL INSERT
0011 FE06               24          CPI     6           ;ARE WE DOING END AT D P
0013 CA4C00    C        25          JZ      SPEC        ;IF YES DO A SPECIAL INSERT
0016 5F                 26          MOV     E,A         ;SET UP D,E PAIR TO ADD TO H,L
0017 AF                 27          XRA     A
0018 57                 28          MOV     D,A
0019 210000    C        29          LXI     H,TPLATE    ;POINT TO THE TOP OF THE TEMPLATE TABLE
001C 19                 30          DAD     D           ;POINT TO THE TEMPLATE VALUE
001D 7E                 31          MOV     A,M         ;GET THE TEMPLATE VALUE
001E E60F               32          ANI     0FH         ;MASK IN THE STARTING POINT OF THE SHIFT
0020 5F                 33          MOV     E,A         ;SET UP D,E FOR IBUF DISPLACEMENT
0021 7E                 34          MOV     A,M         ;GET THE TEMPLATE VALUE AGAIN
0022 1F                 35          RAR
0023 1F                 36          RAR
0024 1F                 37          RAR
0025 1F                 38          RAR
0026 E60F               39          ANI     0FH         ;MASK IN THE NUMBER OF CHARACTERS TO SHIFT
0028 4F                 40          MOV     C,A         ;SAVE THE CHARACTER COUNT
0029 210000    E        41          LXI     H,IBUF      ;POINT TO THE INSERT BUFFER
002C 19                 42          DAD     D           ;POINT TO WHERE TO START SHIFTING
002D 7E                 43  LOOP    MOV     A,M         ;GET A CHARACTER TO SHIFT LEFT
002E 2B                 44          DCX     H           ;MOVE IT ONE POSITION LEFT
002F 77                 45          MOV     M,A         ;STORE IT
0030 23                 46          INX     H           ;POINT TO THE NEXT CHARACTER TO SHIFT
0031 23                 47          INX     H
0032 0D                 48          DCR     C           ;BUMP THE CHARACTER COUNTER
0033 C22D00    C        49          JNZ     LOOP        ;WHEN ZERO DONE SHIFTING
0036 2B                 50          DCX     H           ;POINT TO THE POSITION TO INSERT THE NEW DIG
0037 70                 51          MOV     M,B         ;PUT IT IN THE BUFFER
0038 210000             52  XMIT    LXI     H,KB+1      ;POINT TO THE DCTL COMMAND REG
003B 3E90               53          MVI     A,90H       ;GET WRITE DISPLAY RAM AUTO INCREMENT START 0
003D 77                 54          MOV     M,A         ;OUTPUT IT
003E 2B                 55          DCX     H           ;POINT TO THE DATA PORT
003F 0610               56          MVI     B,16        ;LOAD THE DIGIT COUNTER
0041 110000    E        57          LXI     D,IBUF      ;POINT TO THE INSERT BUFFER
0044 1A                 58  AGAIN   LDAX    D           ;GET A CHARACTER
0045 77                 59          MOV     M,A         ;OUTPUT IT TO THE DISPLAY
0046 05                 60          DCR     B           ;BUMP THE CHARACTER COUNTER
0047 C8                 61          RZ                  ;RETURN WHEN ALL 16 CHARACTERS DONE
0048 13                 62          INX     D           ;POINT TO THE NEXT CHARACTER
0049 C34400    C        63          JMP     AGAIN       ;GO OUTPUT IT
004C 210F00    E        64  SPEC    LXI     H,IBUF+14
004F 4E                 65          MOV     C,M
0050 70                 66          MOV     M,B
0051 2B                 67          DCX     H
0052 2B                 68          DCX     H
0053 71                 69          MOV     M,C
0054 C33800    C        70          JMP     XMIT
0008           C        71          END     INSERT
```

```
PUBLIC SYMBOLS
INSERT C 0008    XMIT  C 0038

EXTERNAL SYMBOLS
IBUF  E 0000    SPARC E 0000

USER SYMBOLS
AGAIN C 0044    IBUF  E 0000    INSERT C 0008    KD   A 7004   LOOP  C 0031   SPARC E 0000
SPEC  C 004C    TPLATE C 0000   XMIT   C 0038

ASSEMBLY COMPLETE, NO ERRORS

ISIS-II 8080/8085 MACRO ASSEMBLER, V2.0
EDITOR ROUTINE

LOC   OBJ            SEQ         SOURCE STATEMENT

1  $       TITLE('EDITOR ROUTINE') PAGEWIDTH(105) DEBUG
                      2                          ;WRITTEN 09/21/79
                      3                          ;UPDATED 02/25/82
                      4                          ;THIS ROUTINE ALLOWS FOR DISPLAYING AND/OR
                      5                          ;PROGRAMMING OF SYSTEM PARAMETERS
                      6           NAME    EDITOR
                      7           PUBLIC  EDITOR
                      8           EXTRN   DISPLY,IBUF,KEYIN,EATT,EATREC,EATOP,START,XMIT,INSERT
                      9           EXTRN   SPART,SPARD,SPARC,TRDR,FILLSW,DIAG,PHASE,UDATE
                     10           EXTRN   TXDT,RS232C
0013                 11  KCHS    EQU     19
0014                 12  KRESET  EQU     20
0015                 13  KSTART  EQU     21
0016                 14  KENTER  EQU     22
                     15          CSEG
0000 79              16  IBPT    DB      79H         ;INSERT BUFFER POINTER TABLE
0001 3C              17          DB      3CH         ;# OF CHARACTERS,WHERE TO START IN INSERT BUFFER
0002 3C              18          DB      3CH
0003 4B              19          DB      4BH
0004 3C              20          DB      3CH
0005 4C              21          DB      4CH
0006 4C              22          DB      4CH
0007 3D              23          DB      3DH
0008 3A0000   E      24  EDITOR  LDA     PHASE       ;WANT TO TURN OFF THE MOTOR PHASES
000B E6F0            25          ANI     0F0H
000D 320A70          26          STA     700AH       ;DO THIS TO SAVE POWER
0010 3A0100   E      27          LDA     TXDT+1      ;GET THE TOP ENTRY OF THE TRANSMIT DATA TABLE
0013 FE03            28          CPI     3           ;CHECK FOR AN END OF TEXT (ETX)
0015 C40000   E      29          CNZ     RS232C      ;IF NOT ETX, GO TO THE RS232C ROUTINE
0018 211770          30          LXI     H,7017H     ;POINT TO THE CLOCK CONTROL PORT
001B 36B0            31          MVI     M,0B0H      ;SET COUNTER 2 TO MODE 0
001D 2B              32          DCX     H           ;POINT TO COUNTER 2 DATA PORT
001E 36FF            33          MVI     M,0FFH      ;LOAD THE COUNTER TO MAX COUNT
0020 36FF            34          MVI     M,0FFH
0022 AF              35          XRA     A
0023 320B70          36          STA     700BH       ;FORCE THE RECORDER PEN UP
0026 110100          37          LXI     D,1         ;WAIT FOR 30 MS FOR THE PEN TO LIFT UP
0029 21C7F0          38          LXI     H,61639     ;3896 X 7.7 US = 30 MS
002C 19              39  WAIT    DAD     D
002D D22C00   C      40          JNC     WAIT
0030 210000          41          LXI     H,0
0033 221870          42          SHLD    7018H       ;SET RECORDER X-AXIS TO ZERO
0036 221A70          43          SHLD    701AH       ;SET RECORDER Y-AXIS TO ZERO
0039 AF              44  EDIT    XRA     A
003A 320000   E      45          STA     FILLSW      ;SET THE FILL SWITCH ON
003D 320000   E      46  NEXT    STA     SPARC       ;UPDATE THE SYSTEM PARAMETER COUNTER
0040 CD0000   E      47          CALL    DISPLY      ;OUTPUT A MESSAGE
0043 3A0000   E      48          LDA     TRDR        ;GET SETTING OF TEMP RANGE & DIST RATE
0046 320170          49          STA     7001H       ;OUTPUT IT
```

```
0049 CD0000   E   50 INKEY   CALL    UDATE       ;GO UPDATE THE TIME DATA (MINUTE, HOUR, ETC)
004C CD2B02   C   51         CALL    CKTOUT      ;GO CHECK FOR TIME OUT TO TURN AIR SOLENOID OFF
004F CD0000   E   52         CALL    KEYIN       ;GET A KEYBOARD INPUT
0052 17           53         RAL                 ;CHECK FOR ANY CHARACTERS, LOOK AT BIT 8
0053 DA4900   C   54         JC      INKEY       ;IF NONE, WAIT FOR SOME
0056 1F           55         RAR                 ;GET THE CHARACTER
0057 FE0A         56         CPI     10          ;IS THE CHARACTER 0 TO 9
0059 DA9600   C   57         JC      PDIGIT      ;IF YES, PROCESS IT
005C FE12         58         CPI     18          ;IS THE CHARACTER 10 TO 17
005E DAA700   C   59         JC      ELED        ;IF YES, ECHO THE L.E.D. SELECTED
0061 FE14         60         CPI     KRESET      ;IS IT THE RESET KEY
0063 CA8001   C   61         JZ      PRESET      ;IF YES, CHECK FOR FORCING "NO" SYSTEM PARAMETERS
0066 FE15         62         CPI     KSTART      ;IS IT THE START KEY
0068 CA0000   E   63         JZ      START       ;IF YES, RUN THE SYSTEM
006B FE16         64         CPI     KENTER      ;IS IT THE ENTER KEY
006D CAD000   C   65         JZ      PENT        ;IF YES, PROCESS THE PARAMETER
0070 FE13         66         CPI     KCHS        ;IS IT THE CHANGE SIGN KEY
0072 CA7800   C   67         JZ      CKSPC       ;IF YES, CHECK IF SYSTEM PARAMETER 3 IS SELECTED
0075 C34900   C   68         JMP     INKEY       ;THIS CHARACTER IS NOT ALLOWED
0078 3A0000   E   69 CKSPC   LDA     SPARC       ;GET THE SYSTEM PARAMETER COUNTER
007B FE03         70         CPI     3           ;ARE WE DOING "INCREASE FINAL HEAT"
007D C24900   C   71         JNZ     INKEY       ;IF NOT, DO NOT ALLOW THE CHARACTER
0080 210B00   E   72         LXI     H,IBUF+11   ;IF YES, CHANGE THE SIGN
0083 7E           73         MOV     A,M         ;GET THE SIGN FROM THE INSERT BUFFER
0084 FE2D         74         CPI     '-'         ;IS IT AN ASCII MINUS
0086 CA9100   C   75         JZ      FBLK        ;IF YES, FORCE IT TO AN ASCII BLANK
0089 362D         76         MVI     M,'-'       ;PUT THE ASCII BLANK CODE IN THE INSERT BUFFER
008B CD0000   E   77 OUTIT   CALL    XMIT        ;ECHO IT
008E C34900   C   78         JMP     INKEY       ;GET ANOTHER CHARACTER
0091 3620         79 FBLK    MVI     M,' '       ;PUT THE ASCII BLANK CODE IN THE INSERT BUFFER
0093 C38B00   C   80         JMP     OUTIT       ;GO ECHO IT
0096 F5           81 PDIGIT  PUSH    PSW         ;SAVE THE CHARACTER
0097 3A0000   E   82         LDA     FILLSW      ;0 = FILL WITH ZEROS   1 = NO FILL
009A 1F           83         RAR                 ;CHECK FOR FILLING WITH ZEROS
009B D4B501   C   84         CNC     FILLZ       ;IF 0, FILL WITH ZEROS
009E F1           85         POP     PSW         ;GET THE CHARACTER BACK
009F C630         86         ADI     30H         ;CONVERT IT TO ASCII
00A1 CD0000   E   87         CALL    INSERT      ;ECHO THE NUMBER ON THE DISPLAY
00A4 C34900   C   88         JMP     INKEY       ;GET ANOTHER CHARACTER
00A7 D609         89 ELED    SUI     9           ;WANT TO LIGHT UP AN L.E.D.
00A9 47           90         MOV     B,A         ;SAVE THIS SHIFT COUNTER
00AA FE06         91         CPI     6           ;ARE WE DOING "DISTILLATION RATE"
00AC 3A0000   E   92         LDA     TRDR        ;GET THE PREVIOUS SETTING
00AF D2CB00   C   93         JNC     DRATE       ;IF YES, PUT THE NEW ONE IN
00B2 E6E0         94         ANI     0E0H        ;MASK OFF THE OLD TEMP RANGE
00B4 F5           95 FORM    PUSH    PSW         ;SAVE THE GOOD PART OF THIS WORD
00B5 3E01         96         MVI     A,1         ;LOAD THE LSB = 1
00B7 05           97 FLOOP   DCR     B           ;BUMP THE SHIFT COUNTER
00B8 CABF00   C   98         JZ      DONE        ;IF ZERO, THEN DONE SHIFTING
00BB 87           99         ADD     A           ;IF NOT ZERO, THEN SHIFT ONE PLACE
00BC C3B700   C   100        JMP     FLOOP       ;GO CHECK AGAIN
00BF 47           101 DONE   MOV     B,A         ;SAVE THIS PART OF THE CONTROL WORD
00C0 F1           102        POP     PSW         ;GET THE OLD GOOD BITS
00C1 80           103        ADD     B           ;FORM THE NEW CONTROL WORD
00C2 320170       104        STA     7001H       ;OUTPUT IT
00C5 320000   E   105        STA     TRDR        ;SAVE IT
00C8 C34900   C   106        JMP     INKEY       ;GET ANOTHER CHARACTER
00CB E61F         107 DRATE  ANI     1FH         ;MASK OFF THE OLD DISTILLATION RATE
00CD C3B400   C   108        JMP     FORM        ;GO FORM THE NEW CONTROL WORD
00D0 210900   E   109 PENT   LXI     H,IBUF+9    ;WANT TO CHECK IF DIAGNOSTICS ARE REQUESTED
00D3 0639         110        MVI     B,'9'       ;SAMPLE NUMBER = 9876543 REQUESTS DIAGNOSTICS
00D5 0E07         111        MVI     C,7         ;WANT TO CHECK ALL 7 DIGITS
00D7 7E           112 LOOP   MOV     A,M         ;GET AN ASCII DIGIT
00D8 B8           113        CMP     B
00D9 C2E500   C   114        JNZ     PENTC       ;IF NOT CORRECT CODE, CONTINUE
00DC 23           115        INX     H           ;POINT TO THE NEXT DIGIT
```

```
00DD 05              116         DCR    B
00DE 0D              117         DCR    C
00DF C2D700  C       118         JNZ    LOOP
00E2 C30000  E       119         JMP    DIAG       ;IF CODE IS CORRECT, GO TO DIAGNOSTIC ROUTINE
00E5 3A0000  E       120 PENTC   LDA    SPARC      ;GET THE SYSTEM PARAMETER COUNTER
00E8 5F              121         MOV    E,A        ;SET UP THE D,E TO ADD TO H,L
00E9 AF              122         XRA    A
00EA 57              123         MOV    D,A
00EB 320000  E       124         STA    FILLSW     ;SET THE FILL SWITCH ON
00EE 210000  C       125         LXI    H,IBPT     ;POINT TO INSERT BUFFER POINTER TABLE
00F1 19              126         DAD    D          ;POINT TO HASH KEY
00F2 7E              127         MOV    A,M        ;GET THE HASH KEY
00F3 E60F            128         ANI    0FH        ;MASK IN THE STARTING POINTER
00F5 4F              129         MOV    C,A        ;SAVE IT
00F6 7E              130         MOV    A,M        ;GET THE HASH KEY AGAIN
00F7 1F              131         RAR
00F8 1F              132         RAR
00F9 1F              133         RAR
00FA 1F              134         RAR
00FB E60F            135         ANI    0FH        ;GET THE NUMBER OF CHARACTERS TO STORE
00FD 47              136         MOV    B,A        ;SAVE IT
00FE 210000  E       137         LXI    H,SPARD    ;POINT TO THE SYSTEM PARAMETER DISPLACEMENT TABLE
0101 19              138         DAD    D          ;POINT TO THE PARAMETER
0102 5E              139         MOV    E,M        ;GET THE DISPLACEMENT
0103 210000  E       140         LXI    H,SPART    ;POINT TO THE SYSTEM PARAMETER TABLE
0106 19              141         DAD    D          ;POINT TO THE PARAMETER
0107 E5              142         PUSH   H          ;SAVE THIS POINTER
0108 210000  E       143         LXI    H,IBUF     ;POINT TO THE INSERT BUFFER
010B 59              144         MOV    E,C
010C 19              145         DAD    D          ;POINT TO THE PARAMETER IN THE INSERT BUFFER
010D EB              146         XCHG
010E E1              147         POP    H          ;RESTORE THE SYSTEM PARAMETER POINTER
010F 1A              148 UPDATE  LDAX   D          ;GET A DIGIT
0110 77              149         MOV    M,A        ;STORE IT IN THE SYSTEM PARAMETER TABLE
0111 23              150         INX    H          ;POINT TO THE NEXT DIGIT
0112 13              151         INX    D          ;POINT TO THE NEXT LOCATION TO STORE IT
0113 05              152         DCR    B          ;DECREMENT THE CHARACTER COUNTER
0114 C20F01  C       153         JNZ    UPDATE     ;GO GET ANOTHER DIGIT
0117 3A0000  E       154         LDA    SPARC      ;GET THE SYSTEM PARAMETER COUNTER
011A 3C              155         INR    A          ;BUMP IT
011B 47              156         MOV    B,A        ;SAVE THE SPARC
011C FE04            157         CPI    4          ;IS THE NEXT MESSAGE EXPECTED LOSS?
011E C22B01  C       158         JNZ    CONT       ;IF NOT, CONTINUE CHECKS
0121 3A0000  E       159         LDA    TRDR       ;IF YES, CHECK FOR TEMP RANGE 20 - 300
0124 E610            160         ANI    10H        ;MASK IN THE 20 - 300 BIT
0126 CA2A01  C       161         JZ     ITSOK      ;IF NOT 20 - 300 RANGE, ALLOW EXPECTED LOSS
0129 04              162         INR    B          ;IF = 20 - 300 RANGE, SUPPRESS EXPECTED LOSS
012A 78              163 ITSOK   MOV    A,B        ;RESTORE THE UPDATED SPARC
012B FE05            164 CONT    CPI    5          ;IS THE NEXT MESSAGE END AT TEMP?
012D CA4201  C       165         JZ     CK1        ;IF YES, CHECK END AT DP & % RECOVERED
0130 FE06            166         CPI    6          ;IS THE NEXT MESSAGE END AT DP?
0132 CA6001  C       167         JZ     CK2        ;IF YES, CHECK END AT TEMP FOR 'NO'
0135 FE07            168         CPI    7          ;IS THE NEXT MESSAGE END AT % RECOVERED?
0137 CA6C01  C       169         JZ     CK3        ;IF YES, CHECK END AT TEMP & END AT D P
013A FE08            170         CPI    8          ;IS THIS THE LAST ONE
013C CA3900  C       171         JZ     EDIT       ;IF YES, DO THE FIRST ONE
013F C33D00  C       172         JMP    NEXT       ;ELSE, DO THE NEXT ONE
0142 3A0300  E       173 CK1     LDA    EATDP+3    ;CHECK FOR 'NO' MESSAGE
0145 FE4F            174         CPI    'O'
0147 C25601  C       175         JNZ    SET6       ;IF NOT 'NO', SET SPARC = 6
014A 3A0200  E       176         LDA    EATREC+2   ;CHECK FOR 'NO' MESSAGE
014D FE4F            177         CPI    'O'
014F C25B01  C       178         JNZ    SET7       ;IF NOT 'NO', SET SPARC = 7
0152 78              179         MOV    A,B        ;ELSE, SET SPARC = 5
0153 C33D00  C       180         JMP    NEXT
0156 3E06            181 SET6    MVI    A,6
```

```
0158 C33D00   C   182          JMP    NEXT
015B 3E07         183  SET7    MVI    A,7
015D C33D00   C   184          JMP    NEXT
0160 3A0300   E   185  CK2:    LDA    EATT+3    ;CHECK FOR 'NO' MESSAGE
0163 FE4F         186          CPI    '0'
0165 C23900   C   187          JNZ    EDIT      ;IF NOT 'NO' MESSAGE, START FROM TOP OF ROUTINE
0168 78           188          MOV    A,B       ;ELSE, SET SPARC = 6
0169 C33D00   C   189          JMP    NEXT
016C 3A0300   E   190  CK3:    LDA    EATT+3    ;CHECK FOR 'NO' MESSAGE
016F FE4F         191          CPI    '0'
0171 C23900   C   192          JNZ    EDIT      ;IF NOT 'NO' MESSAGE, START FROM TOP OF ROUTINE
0174 3A0300   E   193          LDA    EATDP+3   ;CHECK FOR 'NO' MESSAGE
0177 FE4F         194          CPI    '0'
0179 C23900   C   195          JNZ    EDIT      ;IF NOT 'NO' MESSAGE, START FROM TOP OF ROUTINE
017C 78           196          MOV    A,B       ;ELSE, SET SPARC = 7
017D C33D00   C   197          JMP    NEXT
0180 3A0000   E   198  PRESET  LDA    SPARC     ;GET THE SYSTEM PARAMETER COUNTER
0183 FE05         199          CPI    5         ;ARE WE DOING "END AT TEMP"
0185 CA9501   C   200          JZ     FNO       ;IF YES, FORCE "NO" MESSAGE
0188 FE06         201          CPI    6         ;ARE WE DOING "END AT DP"
018A CA9501   C   202          JZ     FNO       ;IF YES, FORCE "NO" MESSAGE
018D FE07         203          CPI    7         ;ARE WE DOING "END AT % RECOVERED"
018F CA9501   C   204          JZ     FNO       ;IF YES, FORCE "NO" MESSAGE
0192 C33900   C   205          JMP    EDIT      ;ELSE, START EDITING OVER
0195 210000   E   206  FNO     LXI    H,EATT    ;POINT TO "END AT TEMP" PARAMETER
0198 0602         207          MVI    B,2       ;WANT TO FORCE 2 MESSAGES
019A 3620         208  AGAIN:  MVI    M,' '     ;STORE A BLANK
019C 23           209          INX    H         ;POINT TO THE NEXT POSITION
019D 3620         210          MVI    M,' '     ;STORE A BLANK
019F 23           211          INX    H         ;POINT TO THE NEXT POSITION
01A0 364E         212          MVI    M,'N'     ;STORE AN ASCII N
01A2 23           213          INX    H         ;POINT TO THE NEXT POSITION
01A3 364F         214          MVI    M,'O'     ;STORE AN ASCII O
01A5 23           215          INX    H         ;POINT TO THE NEXT POSITION
01A6 05           216          DCR    B         ;BUMP THE MESSAGE COUNTER
01A7 C29A01   C   217          JNZ    AGAIN     ;WHEN ZERO, DONE
01AA 3620         218          MVI    M,' '     ;STORE A BLANK
01AC 23           219          INX    H         ;POINT TO THE NEXT POSITION
01AD 364E         220          MVI    M,'N'     ;DO THE LAST "NO" MESSAGE
01AF 23           221          INX    H
01B0 364F         222          MVI    M,'O'
01B2 C33900   C   223          JMP    EDIT      ;START THE EDITING OVER
01B5 3A0000   E   224  FILLZ:  LDA    SPARC     ;GET THE SYSTEM PARAMETER COUNTER
01B8 F5           225          PUSH   PSW       ;SAVE IT
01B9 5F           226          MOV    E,A       ;WANT TO ZERO ANY DIGITS WHEN ENTERING A NEW VALUE
01BA AF           227          XRA    A         ;OF A SYSTEM PARAMETER
01BB 57           228          MOV    D,A
01BC 3C           229          INR    A
01BD 320000   E   230          STA    FILLSW    ;SET THE FILL SWITCH OFF AFTER THE FIRST DIGIT
01C0 210000   C   231          LXI    H,IBPT    ;POINT TO THE INSERT BUFFER POINTER TABLE
01C3 19           232          DAD    D         ;POINT TO THE HASH KEY
01C4 7E           233          MOV    A,M       ;GET THE HASH KEY FROM THE TABLE
01C5 E60F         234          ANI    0FH       ;MASK IN THE DISPLACEMENT IN THE IBUF BUFFER
01C7 FE0B         235          CPI    0BH       ;CHECK FOR AN 11 CODE
01C9 CC2702   C   236          CZ     BUMPU     ;IF 11, MAKE IT 12
01CC 5F           237          MOV    E,A       ;E=WHERE TO START IN INSERT BUFFER
01CD 7E           238          MOV    A,M       ;NOW GET # OF CHARACTERS TO ZERO
01CE 1F           239          RAR
01CF 1F           240          RAR
01D0 1F           241          RAR
01D1 1F           242          RAR
01D2 E60F         243          ANI    0FH
01D4 FE04         244          CPI    4         ;CHECK FOR A 4 CODE
01D6 CC2902   C   245          CZ     BUMPD     ;IF 4, MAKE IT 3
01D9 47           246          MOV    B,A       ;B = # OF CHARACTERS TO ZERO
01DA 210000   E   247          LXI    H,IBUF    ;POINT TO THE INSERT BUFFER
```

```
01DD 19                 248           DAD    D
01DE 3E30               249           MVI    A,'0'       ;GET THE ZERO CODE
01E0 77                 250  ZLOOP    MOV    M,A         ;LOAD A ZERO
01E1 23                 251           INX    H
01E2 05                 252           DCR    B           ;BUMP THE ZERO COUNTER
01E3 C2E001  C          253           JNZ    ZLOOP
01E6 F1                 254           POP    PSW         ;GET THE SPARC AGAIN
01E7 FE04               255           CPI    4           ;CHECK IF DOING EXPECTED LOSS
01E9 CAFC01  C          256           JZ     FEL         ;IF YES, FORCE A DECIMAL POINT
01EC FE05               257           CPI    5           ;CHECK IF DOING END AT TEMP
01EE CA0202  C          258           JZ     ETMP        ;IF YES, CHECK RANGE SELECTED
01F1 FE06               259           CPI    6           ;CHECK IF DOING END AT D.P.
01F3 CA1602  C          260           JZ     EDP         ;IF YES, FORCE A DECIMAL POINT &
01F6 FE07               261           CPI    7           ;CHECK IF DOING END AT % REC
01F8 CA2102  C          262           JZ     EREC        ;IF YES, FORCE A %
01FB C9                 263           RET
01FC 3E2E               264  FEL      MVI    A,'.'
01FE 320D00  E          265           STA    IBUF+13
0201 C9                 266           RET
0202 3A0000  E          267  ETMP     LDA    TRDR        ;GET THE RANGE SELECTED
0205 E60C               268           ANI    0CH
0207 CA1002  C          269           JZ     CENT        ;IF 0, MUST BE CENTIGRADE RANGE
020A 3E46               270           MVI    A,'F'       ;ELSE, MUST BE FAHRENHEIT RANGE
020C 320F00  E          271           STA    IBUF+15
020F C9                 272           RET
0210 3E43               273  CENT     MVI    A,'C'
0212 320F00  E          274           STA    IBUF+15
0215 C9                 275           RET
0216 3E53               276  EDP      MVI    A,'S'
0218 320F00  E          277           STA    IBUF+15
021B 3E2E               278           MVI    A,'.'
021D 320D00  E          279           STA    IBUF+13
0220 C9                 280           RET
0221 3E25               281  EREC     MVI    A,'%'
0223 320F00  E          282           STA    IBUF+15
0226 C9                 283           RET
0227 3C                 284  BUMPU    INR    A
0228 C9                 285           RET
0229 3D                 286  BUMPD    DCR    A
022A C9                 287           RET
022B 211770             288  CKTOUT   LXI    H,7017H     ;POINT TO THE CLOCK CONTROL PORT
022E 3680               289           MVI    M,80H       ;LATCH COUNTER 2
0230 2B                 290           DCX    H           ;POINT TO COUNTER 2 DATA PORT
0231 5E                 291           MOV    E,M         ;GET THE TIME LSB'S
0232 56                 292           MOV    D,M         ;GET THE TIME MSB'S
0233 215F73             293           LXI    H,29535     ;WANT TO CHECK FOR A 5MIN TIME OUT
0236 7D                 294           MOV    A,L         ;DO 5 MIN MARK - PRESENT COUNT
0237 93                 295           SUB    E           ;THAT IS, DO 29535 - PRESENT COUNT
0238 7C                 296           MOV    A,H
0239 9A                 297           SBB    D
023A D8                 298           RC                 ;IF PRESENT COUNT IS < 5 MIN MARK, RETURN
023B 3A0000  E          299           LDA    PHASE       ;ELSE, TURN OFF THE AIR SOLENOID
023E F610               300           ORI    10H
0240 320000  E          301           STA    PHASE       ;UPDATE THIS CONTROL BYTE
0243 E6F0               302           ANI    0F0H        ;DEENERGIZE THE MOTOR TO SAVE POWER
0245 320A70             303           STA    700AH       ;OUTPUT THIS CONTROL BYTE
0248 C9                 304           RET
0008         C          305           END    EDITOR
```

PUBLIC SYMBOLS
EDITOR  C 0008

EXTERNAL SYMBOLS
DIAG    E 0000    DISPLY E 0000    EATDP  E 0000    EATREC E 0000    EATT   E 0000    FILLSW E 0000
IBUF    E 0000    INSERT E 0000    KEYIN  E 0000    PHASE  E 0000    RS232C E 0000    SPARC  E 0000
SPARD   E 0000    SPART  E 0000    START  E 0000    TRDR   E 0000    TXDT   E 0000    UDATE  E 0000
XMIT    E 0000

```
USER SYMBOLS
AGAIN   C 019A   BUMPD  C 0229   BUMPU  C 0227   CENT   C 0210   CK1    C 0142   CK2    C 0160
CK3     C 016C   CKSPC  C 0078   CKTOUT C 022B   CONT   C 012B   DIAG   E 0000   DISPLY E 0000
DONE    C 00BF   DRATE  C 00CB   EATDP  E 0000   EATREC E 0000   EATT   E 0000   EDIT   C 0029
EDITOR  C 0008   EDP    C 0216   ELED   C 00A7   EREC   C 0221   ETMP   C 0202   FBLK   C 0091
FEL     C 01FC   FILLSW E 0000   FILLZ  C 01B5   FLOOP  C 00B7   FNO    C 0195   FORM   C 00B4
IBPT    C 0000   IBUF   E 0000   INKEY  C 0049   INSERT E 0000   ITSOK  C 012A   KCHS   A 0013
KENTER  A 0016   KEYIN  E 0000   KRESET A 0014   KSTART A 0015   LOOP   C 0007   NEXT   C 003D
OUTIT   C 008B   PDIGIT C 0096   PENT   C 00D0   PENTC  C 00E5   PHASE  E 0000   PRESET C 0180
RS232C  E 0000   SET6   C 0156   SET7   C 015B   SPARC  E 0000   SPARD  E 0000   SPART  E 0000
START   E 0000   TRDR   E 0000   TXDT   E 0000   UDATE  E 0000   UPDATE C 010F   WAIT   C 002C
XMIT    E 0000   ZLOOP  C 01E0
```

```
                    1 ;       TITLE: 18 SEGMENT L E D DISPLAY ROUTINE
                    2 ;              WRITTEN 09/10/79
                    3 ;              UPDATED 09/12/79
                    4 ;              THIS ROUTINE FORMATS THE SYSTEM PARAMETER MESSAGE
                    5 ;              TO BE DISPLAYED. THE FIXED PORTION OF THE MESSAGE
                    6 ;              IS STORED IN EPROM. THE VARIABLE PORTION IS STORED
                    7 ;              IN THE SYSTEM PARAMETER TABLE IN RAM.
                    8 ;              THIS DATA ARE STORED IN ASCII
                    9         NAME   DISPLY
                   10         PUBLIC DISPLY
                   11         EXTRN  MTAB,MTABDC,SPARC,SPART,SAMPNO,NIGHT,IBP,IBPT,ELDSP
                   12         EXTRN  EATT,EATDP,EATREC,CHARC,MESNO,IBUF,TRDR,XMIT
                   13         CSEG
0000 320000  E     14 DISPLY  STA    MESNO      ;SAVE THE MESSAGE NUMBER
0003 87            15         ADD    A          ;DOUBLE THIS VALUE
0004 4F            16         MOV    C,A        ;SAVE THIS VALUE
0005 210000  E     17         LXI    H,MTABDC   ;POINT TO THE MESSAGE DISPLACEMENT & COUNT TABLE
0008 AF            18         XRA    A
0009 47            19         MOV    B,A        ;SET UP B C REG PAIR FOR INDEXING
000A 09            20         DAD    B          ;POINT TO THE DISPLACEMENT
000B 4E            21         MOV    C,M        ;GET THE DISPLACEMENT
000C 23            22         INX    H          ;POINT TO THE COUNT
000D 5E            23         MOV    E,M        ;GET THE COUNT
000E 53            24         MOV    D,E        ;SAVE THE COUNT
000F 210000  E     25         LXI    H,MTAB     ;POINT TO THE MESSAGE TABLE
0012 09            26         DAD    B          ;POINT TO THE MESSAGE
0013 010000  E     27         LXI    B,IBUF     ;POINT TO THE INSERT BUFFER
0016 7E            28 LOOPI   MOV    A,M        ;GET A CHARACTER
0017 02            29         STAX   B          ;STORE IT IN THE INSERT BUFFER
0018 23            30         INX    H          ;POINT TO THE NEXT CHARACTER
0019 03            31         INX    B          ;BUMP THE INSERT BUFFER POINTER
001A 1D            32         DCR    E          ;DECREMENT THE CHARACTER COUNT
001B C21600  C     33         JNZ    LOOPI      ;IF NOT ZERO GET ANOTHER CHARACTER
001E 7A            34         MOV    A,D        ;GET THE CHARACTER COUNT
001F 320000  E     35         STA    CHARC      ;STORE THE CHARACTER COUNT
0022 FE10          36         CPI    16         ;CHECK IF 16 CHARACTERS IN MESSAGE
0024 DA2B00  C     37         JC     GETM       ;IF NOT GET SOME MORE FROM RAM
0027 CD0000  E     38 OUTIT   CALL   XMIT       ;IF YES TRANSMIT THE MESSAGE TO THE DISPLAY
002A C9            39         RET               ;RETURN TO THE CALLING PROGRAM
002B E5            40 GETM    PUSH   H          ;SAVE THE MESSAGE POINTER
002C C5            41         PUSH   B          ;SAVE THE INSERT BUFFER POINTER
002D 3A0000  E     42         LDA    MESNO      ;GET THE MESSAGE NUMBER
0030 210000  E     43         LXI    H,SPARC    ;POINT TO THE SYSTEM PARAMETER DISPLACEMENT TABLE
0033 4F            44         MOV    C,A        ;SET UP THE B C PAIR FOR ADD TO H L
0034 AF            45         XRA    A
0035 47            46         MOV    B,A
0036 09            47         DAD    B          ;POINT TO THE SYSTEM PARAMETER
0037 4E            48         MOV    C,M        ;GET THE DISPLACEMENT FOR THIS PARAMETER
0038 23            49         INX    H
0039 7E            50         MOV    A,M        ;GET THE DISPLACEMENT FOR THE NEXT PARAMETER
003A 91            51         SUB    C          ;CALCULATE THE NUMBER OF CHARACTERS
003B 57            52         MOV    D,A        ;SAVE THE CHARACTER COUNT
```

```
002C 5F              53        MOV    E,A
003D 210000   E      54        LXI    H,SPART   ;POINT TO THE TOP OF THE SYSTEM PARAMETER TABLE
0040 09              55        DAD    B         ;POINT TO THE SYSTEM PARAMETER
0041 C1              56        POP    B         ;RESTORE THE INSERT BUFFER POINTER
0042 7E              57 AGAIN  MOV    A,M       ;GET A SYSTEM PARAMETER DIGIT
0043 02              58        STAX   B         ;PUT THE CHARACTER IN THE INSERT BUFFER
0044 23              59        INX    H         ;POINT TO THE NEXT PARAMETER DIGIT
0045 03              60        INX    B         ;POINT TO THE NEXT POSITION IN THE INSERT BUFFER
0046 15              61        DCR    D         ;DECREMENT THE CHARACTER COUNT
0047 C24200   C      62        JNZ    AGAIN     ;IF NOT ZERO, GET THE NEXT PARAMETER DIGIT
004A E1              63        POP    H         ;RESTORE THE MESSAGE POINTER
004B 3A0000   E      64        LDA    CHARC     ;GET THE CHARACTER COUNTER
004E 83              65        ADD    E         ;SUM UP THE CHARACTERS
004F FE10            66        CPI    16        ;CHECK IF WE GOT ALL 16 CHARACTERS
0051 CA2700   C      67        JZ     OUTIT     ;IF YES, OUTPUT THE MESSAGE TO THE DISPLAY
0054 7E              68        MOV    A,M       ;IF NOT, GET THE LAST CHARACTER FROM EPROM
0055 02              69        STAX   B         ;PUT IT IN THE INSERT BUFFER
0056 C32700   C      70        JMP    OUTIT     ;GO TRANSMIT IT
0000            C    71        END    DISPLY
```

PUBLIC SYMBOLS
DISPLY C 0000

EXTERNAL SYMBOLS
CHARC  E 0000   EATDP E 0000   EATREC E 0000   EATT   E 0000   ELOSS  E 0000   IBP   E 0000
IBUF   E 0000   IFHT  E 0000   INITHT E 0000   MESNO  E 0000   MTAB   E 0000   MTABC E 0000
SAMPNO E 0000   SPARD E 0000   SPART  E 0000   TRDP   E 0000   XMIT   E 0000

USER SYMBOLS
AGAIN  C 0042   CHARC  E 0000   DISPLY C 0000   EATDP  E 0000   EATREC E 0000   EATT   E 0000
ELOSS  E 0000   GETM   C 002B   IBP    E 0000   IBUF   E 0000   IFHT   E 0000   INITHT E 0000
LOOP1  C 0016   MESNO  E 0000   MTAB   E 0000   MTABC  E 0000   OUTIT  C 0027   SAMPNO E 0000
SPARD  E 0000   SPART  E 0000   TRDP   E 0000   XMIT   E 0000

```
              1 $     TITLE: BCD TO BINARY CONVERSION ROUTINE
              2                ;WRITTEN 06/01/79
              3                ;UPDATED 06/01/79
              4                ;THIS ROUTINE CONVERTS A FIVE DECADE BCD CODED
              5                ;NUMBER TO ITS BINARY EQUIVALENT. THE H,L REG
              6                ;POINTS TO THE BCD MSD ON ENTRY. THE BINARY
              7                ;RESULT IS RETURNED IN THE B,C REG
              8        NAME    BCDBIN
              9        PUBLIC  BCDBIN
             10        CSEG
0000 AF      11 BCDBIN XRA    A
0001 1610    12         MVI    D,16         ;WANT TO CONVERT 5 BCD DIGITS
0003 C5      13 TOP     PUSH   B            ;SAVE THE BINARY RESULT
0004 0603    14         MVI    B,3          ;USE B REG AS LOOP COUNTER
0006 7E      15 LOOP    MOV    A,M
0007 1F      16         RAR
0008 77      17         MOV    M,A
0009 23      18         INX    H            ;POINT TO THE NEXT BCD DIGIT
000A 05      19         DCR    B            ;ARE WE DONE SHIFTING
000B C20600  20         JNZ    LOOP         ;IF NOT, DO IT AGAIN
000E C1      21         POP    B            ;RESTORE THE BINARY RESULT
000F 78      22         MOV    A,B          ;SHIFT THE BCD LSB INTO THE B,C PAIR
0010 1F      23         RAR
0011 47      24         MOV    B,A
0012 79      25         MOV    A,C
0013 1F      26         RAR
0014 4F      27         MOV    C,A
0015 15      28         DCR    D            ;ARE ALL 5 BCD DIGITS CONVERTED ?
0016 C8      29         RZ                  ;IF YES, RETURN TO CALLING PROGRAM
0017 2B      30         DCX    H
0018 CD2200  31         CALL   ADJDIG       ;IF NOT, ADJUST ALL DIGITS > 7 BY SUBTRACTING 3
001B 2B      32         DCX    H
001C CD2200  33         CALL   ADJDIG
```

```
001F 2B              34        DCX    H
0020 C30000  C       35        JMP    TOP        ;WHEN DONE ADJUSTING, DO MORE SHIFTING
0023 7E              36 ADJHIG MOV    A,M
0024 E60F            37        ANI    0FH        ;LOOK AT LEAST SIG. NIBBLE
0026 5F              38        MOV    E,A        ;SAVE IT IN E REG
0027 D608            39        SUI    8
0029 FA2F00  C       40        JM     TEST1      ;IF NIBBLE < 8 DO NOT ADJUST
002C C605            41        ADI    5
002E 5F              42        MOV    E,A
002F 7E              43 TEST1  MOV    A,M
0030 E6F0            44        ANI    0F0H       ;LOOK AT MOST SIG. NIBBLE
0032 D680            45        SUI    80H
0034 FA3C00  C       46        JM     TEST2      ;IF NIBBLE < 8 DO NOT ADJUST
0037 C650            47        ADI    50H
0039 83              48        ADD    E
003A 77              49        MOV    M,A
003B C9              50        RET
003C 7E              51 TEST2  MOV    A,M
003D E6F0            52        ANI    0F0H
003F 83              53        ADD    E
0040 77              54        MOV    M,A
0041 C9              55        RET
0000         C       56        END    BCDBIN
```

PUBLIC SYMBOLS
BCDBIN C 0000

EXTERNAL SYMBOLS

USER SYMBOLS
ADJHIG C 0023   BCDBIN C 0000   LOOP C 0006   TEST1 C 002F   TEST2 C 003C   TOP C 000A

```
LOC  OBJ            SEQ       SOURCE STATEMENT

1        TITLE(' 16 BIT BY 16 BIT MULTIPLY ROUTINE ')
                     2        ;WRITTEN 06/04/79
                     3        ;UPDATED 05/29/80
                     4        ;THIS ROUTINE MULTIPLIES TWO 16 BIT UNSIGNED NUMBERS
                     5        ;AND GIVES A 32 BIT RESULT. THE DATA BUFFER IS
                     6        ;USED AS FOLLOWS:
                     7        ;DBUF   =NOT USED
                     8        ;DBUF+1 =MULTIPLIER BITS 15-8
                     9        ;DBUF+2 =MULTIPLIER BITS  7-0
                    10        ;DBUF+3 =MULTIPLICAND BITS 15-8
                    11        ;DBUF+4 =MULTIPLICAND BITS  7-0
                    12        ;DBUF+5 =PRODUCT BITS 31-24
                    13        ;DBUF+6 =PRODUCT BITS 23-16
                    14        ;DBUF+7 =PRODUCT BITS 15-8
                    15        ;DBUF+8 =PRODUCT BITS  7-0
                    16        NAME   MULTPY
                    17        PUBLIC MULTPY
                    18        EXTRN  DBUF
                    19        CSEG
0000 AF             20 MULTPY XRA    A
0001 320500  E      21        STA    DBUF+5     ;ZERO THE PRODUCT BITS 31-16
0004 320600  E      22        STA    DBUF+6
0007 0E10           23        MVI    B,16       ;LOAD THE LOOP COUNTER
0009 AF             24 LOOP1  XRA    A          ;CLEAR ALL FLAGS
000A 210100  E      25        LXI    H,DBUF+1   ;POINT TO THE MULTIPLIER MSB
000D 7E             26        MOV    A,M        ;DO A DOUBLE RIGHT SHIFT TO EXAMINE THE LSB
000E 1F             27        RAR
000F 77             28        MOV    M,A
0010 23             29        INX    H
0011 7E             30        MOV    A,M
0012 1F             31        RAR
0013 77             32        MOV    M,A
```

```
0014 23            33           INX     H
0015 DC2A00  C     34           CC      MULADD    ;IS THE LSB = 1 ?
0018 210500  E     35           LXI     H,DBUF+5  ;IF NOT, SHIFT A 0 INTO THE PRODUCT
001B 0E04          36           MVI     C,4
001D 7E            37  LOOP2    MOV     A,M
001E 1F            38           RAR
001F 77            39           MOV     M,A
0020 23            40           INX     H
0021 0D            41           DCR     C
0022 C21D00  C     42           JNZ     LOOP2
0025 05            43           DCR     B         ;ARE WE DONE
0026 C20900  C     44           JNZ     LOOP1     ;IF NOT, GO BACK TO LOOP
0029 C9            45           RET               ;IF YES, RETURN CONTROL
002A 56            46  MULADD   MOV     D,M       ;PUT MULTIPLICAND IN THE D-A PAIR
002B 23            47           INX     H         ;WANT TO ADD MULTIPLICAND TO MSBYTE OF PRODUCT
002C 7E            48           MOV     A,M
002D 23            49           INX     H
002E 23            50           INX     H
002F 86            51           ADD     M
0030 77            52           MOV     M,A
0031 2B            53           DCX     H
0032 7A            54           MOV     A,D
0033 8E            55           ADC     M
0034 77            56           MOV     M,A
0035 C9            57           RET
0000         C     58           END     MULTPY

PUBLIC SYMBOLS
MULTPY C 0000

EXTERNAL SYMBOLS
DBUF   E 0000

USER SYMBOLS
DBUF   E 0000   LOOP1 C 0009   LOOP2 C 001D   MULADD C 002A   MULTPY C 0000

LOC OBJ           SEQ          SOURCE STATEMENT

1  $        TITLE: BINARY TO BINARY CODED DECIMAL CONVERTER
                   2           ;WRITTEN 01/26/79
                   3           ;UPDATED 05/29/80
                   4           ;THIS ROUTINE CONVERTS A 32 BIT BINARY
                   5           ;NUMBER TO BCD AND PUTS THE BCD NUMBER
                   6           ;IN THE DATA BUFFER AS FOLLOWS
                   7           ;DBUF   =BCD DIGITS 10,9
                   8           ;DBUF+1 =BCD DIGITS 8,7
                   9           ;DBUF+2 =BCD DIGITS 6,5
                  10           ;DBUF+3 =BCD DIGITS 4,3
                  11           ;DBUF+4 =BCD DIGITS 2,1
                  12           ;DBUF+5 =BINARY BITS 31-24
                  13           ;DBUF+6 =BINARY BITS 23-16
                  14           ;DBUF+7 =BINARY BITS 15-8
                  15           ;DBUF+8 =BINARY BITS 7-0
                  16           NAME    BINBCD
                  17           PUBLIC  BINBCD
                  18           EXTRN   DBUF
                  19           CSEG
0000 0620         20  BINBCD   MVI     B,32      ;LOAD LOOP COUNTER
0002 AF           21           XRA     A         ;MUST ZERO THE BCD DIGITS 10 THROUGH 1
0003 210400  E    22           LXI     H,DBUF+4
0006 77           23           MOV     M,A
0007 2B           24           DCX     H
0008 77           25           MOV     M,A
0009 2B           26           DCX     H
000A 77           27           MOV     M,A
000B 2B           28           DCX     H
000C 77           29           MOV     M,A
```

```
000D 2B           20           DCX     H
000E 77           21           MOV     M,A
000F AF           22 LOOP1     XRA     A          ;ZERO THE A REG & FLAGS
0010 210600   E   23           LXI     H,DBUF+6   ;LOAD HL WITH TOP OF DATA
0013 0E04         24           MVI     C,4        ;SHIFT THE BINARY NUMBER LEFT ONE
0015 7E           25 LOOP2     MOV     A,M
0016 8F           26           ADC     A
0017 77           27           MOV     M,A
0018 2B           28           DCX     H
0019 0D           29           DCR     C
001A C21500   C   40           JNZ     LOOP2
001D 0E05         41           MVI     C,5        ;SHIFT THE BCD NUMBER LEFT ONE
001F 7E           42 LOOP3     MOV     A,M
0020 8F           43           ADC     A
0021 27           44           DAA                ;MAKE DECIMAL DIGITS
0022 77           45           MOV     M,A
0023 2B           46           DCX     H
0024 0D           47           DCR     C
0025 C21F00   C   48           JNZ     LOOP3
0028 05           49           DCR     B          ;DECREMENT THE LOOP COUNTER
0029 C20F00   C   50           JNZ     LOOP1      ;ARE WE DONE?
002C C9           51           RET                ;YES
0000         C    52           END     BINBCD
BINBCD C 0000

EXTERNAL SYMBOLS
DBUF    E 0000

USER SYMBOLS
BINBCD C 0000   DBUF   E 0000   LOOP1 C 000F   LOOP2 C 0015   LOOP3 C 001F

ASSEMBLY COMPLETE, NO ERRORS

1 $          TITLE( MULTIBYTE DIVIDE ROUTINE )
                  2                                ;WRITTEN 01/18/79
                  3                                ;UPDATED 05/29/80
                  4                                ;THIS ROUTINE DIVIDES AN UNSIGNED 32 BIT NUMBER BY
                  5                                ;AN UNSIGNED 16 BIT NUMBER AND GIVES A 16 BIT RESULT
                  6                                ;THE DATA BUFFER IS USED AS FOLLOWS:
                  7                                ;DBUF   =QUOTIENT BITS 15-8
                  8                                ;DBUF+1=QUOTIENT BITS  7-0
                  9                                ;DBUF+2=DIVISOR  BITS 15-8
                 10                                ;DBUF+3=DIVISOR  BITS  7-0
                 11                                ;DBUF+4=DIVIDEND BITS 31-24
                 12                                ;DBUF+5=DIVIDEND BITS 23-16
                 13                                ;DBUF+6=DIVIDEND BITS 15-8
                 14                                ;DBUF+7=DIVIDEND BITS  7-0
                 15           NAME    DIVIDE
                 16           PUBLIC  DIVIDE
                 17           EXTRN   DBUF
                 18           CSEG
0000 0611        19 DIVIDE    MVI     B,17       ;LOAD LOOP COUNTER
0002 AF          20           XRA     A          ;CLEAR ALL FLAGS
0003 210200   E  21           LXI     H,DBUF+2   ;POINT TO DIVISOR MSB'S
0006 7E         22           MOV     A,M
0007 2F         23           CMA                ;TWO'S COMPLEMENT THE DIVISOR AND
0008 57         24           MOV     D,A        ;PUT IT IN THE D,E REG PAIR
0009 23         25           INX     H
000A 7E         26           MOV     A,M
000B 2F         27           CMA
000C 5F         28           MOV     E,A
000D 13         29           INX     D
000E 3A0400   E 30 LOOP1     LDA     DBUF+4     ;PUT THE DIVIDEND BITS 31-16 IN
0011 67         31           MOV     H,A        ;THE H,L REG PAIR
0012 3A0500   E 32           LDA     DBUF+5
0015 6F         33           MOV     L,A
0016 19         34           DAD     D          ;SUBTRACT THE DIVISOR
```

```
0017 D22200   C   35         JNC    SHIFT   ;WAS THERE A CARRY ?
001A 7C           36         MOV    A,H     ;YES, SUBTRACTION VALID, UPDATE
001B 320400   E   37         STA    DBUF+4  ;THE DIVIDEND BITS 31-16
001E 7D           38         MOV    A,L     ;AND SHIFT THE CARRY BIT INTO
001F 320500   E   39         STA    DBUF+5  ;THE QUOTIENT LSB
0022 210100   E   40 SHIFT   LXI    H,DBUF+1 NO, SHIFT THE CARRY BIT INTO THE QUOTIENT LSB
0025 7E           41         MOV    A,M
0026 17           42         RAL
0027 77           43         MOV    M,A
0028 2B           44         DCX    H
0029 7E           45         MOV    A,M
002A 17           46         RAL
002B 77           47         MOV    M,A
002C AF           48         XRA    A
002D 210700   E   49         LXI    H,DBUF+7
0030 0E04         50         MVI    C,4
0032 7E           51 LOOP2   MOV    A,M
0033 17           52         RAL
0034 77           53         MOV    M,A
0035 2B           54         DCX    H
0036 0D           55         DCR    C
0037 C23200   C   56         JNZ    LOOP2
003A 05           57         DCR    B
003B C8           58         RZ
003C C30E00   C   59         JMP    LOOP1   ;NO, GO BACK TO LOOP AT THE NEXT BIT
0000          C   60         END    DIVIDE

PUBLIC SYMBOLS
DIVIDE C 0000

EXTERNAL SYMBOLS
DBUF   E 0000

USER SYMBOLS
DBUF   E 0000    DIVIDE C 0000    LOOP1 C 000E    LOOP2 C 0032    SHIFT C 0022
```

```
              1 $         TITLE('START ROUTINE') PAGEWIDTH(105) DEBUG
              2                     ;WRITTEN 10/09/79
              3                     ;UPDATED 05/03/82
              4                     ;THIS ROUTINE IS CALLED WHEN THE 'START' KEY IS
              5                     ;HIT. THE TEST PARAMETERS ENTERED ARE OUTPUT TO
              6                     ;THE LINE PRINTER. THE INSERT BUFFER IS LOADED
              7                     ;WITH THE CORRECT DISPLAY. THE INITIAL AND FIVE
              8                     ;MINUTE HEAT SETTINGS ARE COMPUTED.
              9         NAME    START
             10         PUBLIC  START,CALC
             11         EXTRN   IPSL,IPSM,TIMEL,TIMEM,SETPTL,SETPTM,PINC,R75SW,R65SW,S5MIN
             12         EXTRN   R55SW,CORSW,BCDBIN,BINBCD,DBUF,INITHT,MULTPY,PFOR,LTL
             13         EXTRN   LTM,IBUF,TRDR,STARTC,IBP,VOL,STEPC,S12C,RMOTOR,READA
             14         EXTRN   READB,PRINTB,PRINT,BAROM,CHTMP,PLOOP,EDITOR,PLOT,PHASE
             15         EXTRN   H5L,H5M,BH5L,BH5M,DIR,DLYSW,DRLLS,DMES1
             16         EXTRN   PMES9,PMES10,PMES11,PMES12,PMES13,PMES14,PMES20,PMES25
             17         EXTRN   PMES26,PMES31,DMES5,DMES7,DMES8,DSPLY,LIQLEV,MESNO
             18         EXTRN   TXDT,TXDP,PMES33,BLANK,PMES36,PMES37,PSYNC
             19         CSEG
0000 32      20 PINCT   DB      50      ;60HZ 4.5 ML/MIN RATE TIME CONSTANT
0001 41      21         DB      65      ;60HZ 6.0 ML/MIN RATE TIME CONSTANT
0002 42      22         DB      66      ;60HZ 9.0 ML/MIN RATE TIME CONSTANT
0003 3A      23         DB      58      ;50HZ 4.5 ML/MIN RATE TIME CONSTANT
0004 4F      24         DB      79      ;50HZ 6.0 ML/MIN RATE TIME CONSTANT
0005 4F      25         DB      79      ;50HZ 9.0 ML/MIN RATE TIME CONSTANT
0006 210100  E   26 START LXI   H,TXDT+1 ;POINT TO THE TOP OF THE TRANSMIT DATA TABLE
0009 3603        27         MVI    M,3     ;INITIALIZE THE TABLE TO EMPTY VIA AN ETX
000B 220000  E   28         SHLD   TXDP    ;INITIALIZE THE TRANSMIT DATA POINTER
000E CD0000  E   29         CALL   PSYNC   ;RESYNCHRONIZE THE PRINTER
0011 CD4C02  C   30         CALL   CKGRAD  ;GO CHECK IF THE GRADUATE IS PRESENT
```

| Addr | Bytes | | Line | Label | Op | Operand | Comment |
|---|---|---|---|---|---|---|---|
| 0014 | 3A0A70 | | 31 | | LDA | 700AH | ;GET THE MENISCUS DETECTOR STATUS BYTE |
| 0017 | E610 | | 32 | | ANI | 10H | ;MASK IN THE MENISCUS DETECTOR BIT |
| 0019 | CA5E02 | C | 33 | | JZ | NOGRAD | ;IF LIGHT IS SEEN, NO GRADUATE PRESENT |
| 001C | 3A0000 | E | 34 | | LDA | PHASE | ;GET THIS CONTROL BYTE |
| 001F | F610 | | 35 | | ORI | 10H | ;WANT TO TURN OFF THE AIR SOLENOID |
| 0021 | 320000 | E | 36 | | STA | PHASE | ;UPDATE THIS CONTROL BYTE |
| 0024 | 320A70 | | 37 | | STA | 700AH | ;OUTPUT THIS CONTROL BYTE |
| 0027 | AF | | 38 | | XRA | A | |
| 0028 | 320000 | E | 39 | | STA | VOL | ;ZERO THE VOLUME COUNTER |
| 002B | 320000 | E | 40 | | STA | S12C | ;SET THE 12 STEP COUNTER TO ZERO |
| 002E | 320000 | E | 41 | | STA | LIQLEV | ;ZERO THE CONDENSER LEVEL AVERAGING BYTE |
| 0031 | 320000 | E | 42 | | STA | MESNO | ;MESNO USED HERE FOR SCALING CONDENSER TEMP |
| 0034 | 67 | | 43 | | MOV | H,A | |
| 0035 | 6F | | 44 | | MOV | L,A | |
| 0036 | 220000 | E | 45 | | SHLD | STEPC | ;ZERO THE STEP COUNTER |
| 0039 | 3E8A | | 46 | | MVI | A,8AH | ;SET MUX CONTROL FOR DISCHARGE, BAROMETER, AND |
| 003B | 320970 | | 47 | | STA | 7009H | ;RECEIVING CHAMBER TEMPERATURE |
| 003E | CD8C02 | C | 48 | | CALL | CKLEVL | ;GO CHECK ON THE LIQUID LEVEL THE 1'ST TIME |
| 0041 | CD0000 | E | 49 | | CALL | PLOT | ;PLOT THE ORIGIN |
| 0044 | CD8C02 | C | 50 | | CALL | CKLEVL | ;GO CHECK ON THE LIQUID LEVEL THE 2'ND TIME |
| 0047 | CD0000 | E | 51 | | CALL | RMOTOR | ;RESET THE MOTOR FOR THE START OF A TEST |
| 004A | CD8C02 | C | 52 | | CALL | CKLEVL | ;GO CHECK ON THE LIQUID LEVEL THE 3'RD TIME |
| 004D | 210000 | E | 53 | | LXI | H,DMES8 | ;POINT TO THE 'READ PARAMETERS' MESSAGE |
| 0050 | CD0000 | E | 54 | | CALL | DSPLY | ;GO DISPLAY IT |
| 0053 | CD0000 | E | 55 | | CALL | READA | ;GO READ THE BAROMETRIC PRESSURE & SAVE IT |
| 0056 | CD0000 | E | 56 | | CALL | READB | ;GO READ THE RECEIVING CHAMBER TEMPERATURE & SAVE IT |
| 0059 | 7B | | 57 | | MOV | A,E | ;THE OVER-RANGE & POLARITY BITS RETURNED IN REG E |
| 005A | E610 | | 58 | | ANI | 10H | ;MASK IN THE OVER-RANGE BIT |
| 005C | C29A02 | C | 59 | | JNZ | ITSOR | ;IF = 1, IT'S OVER-RANGE |
| 005F | 7B | | 60 | | MOV | A,E | ;CHECK FOR A NEGATIVE VALUE |
| 0060 | E620 | | 61 | | ANI | 20H | ;MASK IN THE POLARITY BIT |
| 0062 | CAA302 | C | 62 | | JZ | ITSPOL | ;IF = 0, IT'S NEGATIVE |
| 0065 | 3A0000 | E | 63 | CONT1: | LDA | TRDR | ;GET THE TEMP RANGE CONTROL BYTE |
| 0068 | E610 | | 64 | | ANI | 10H | ;CHECK IF 30 - 300 C RANGE IS SELECTED |
| 006A | F5 | | 65 | | PUSH | PSW | ;SAVE THE ZERO FLAG |
| 006B | C22E02 | C | 66 | | JNZ | SET3 | ;IF 30 - 300 C RANGE, GET THE MUX CONTROL BYTE |
| 006E | 3E24 | | 67 | | MVI | A,24H | ;ELSE, USE THIS MUX CONTROL BYTE |
| 0070 | 320970 | | 68 | MUXS1: | STA | 7009H | ;SET THE MUX CONTROL BYTE |
| 0073 | 210000 | E | 69 | | LXI | H,DMES5 | ;POINT TO 'PRINTING' MESSAGE |
| 0076 | CD0000 | E | 70 | | CALL | DSPLY | ;GO DISPLAY IT |
| 0079 | CD0000 | E | 71 | | CALL | PFOR | ;PRINT THE TESTING CONDITIONS |
| 007C | CD8C02 | C | 72 | | CALL | CKLEVL | ;GO CHECK ON THE LIQUID LEVEL THE 4'TH TIME |
| 007F | 110000 | E | 73 | | LXI | D,PMES10 | ;POINT TO THE CHAMBER TEMP MESSAGE |
| 0082 | 210000 | E | 74 | | LXI | H,PRINTB | ;POINT TO THE PRINT BUFFER |
| 0085 | 0614 | | 75 | | MVI | B,20 | ;LOAD THE LOOP COUNTER |
| 0087 | CD4302 | C | 76 | | CALL | LOAD | ;GO LOAD THE PRINT BUFFER |
| 008A | 210F00 | E | 77 | | LXI | H,PRINTB+15 | |
| 008D | 110000 | E | 78 | | LXI | D,CHTMP | ;PUT THE CHAMBER TEMP IN THE PRINT BUFFER |
| 0090 | 1A | | 79 | | LDAX | D | ;GET THE CHAMBER TEMP DIGITS & PUT IN BUFFER |
| 0091 | 77 | | 80 | | MOV | M,A | |
| 0092 | 23 | | 81 | | INX | H | |
| 0093 | 13 | | 82 | | INX | D | |
| 0094 | 1A | | 83 | | LDAX | D | |
| 0095 | 77 | | 84 | | MOV | M,A | |
| 0096 | 23 | | 85 | | INX | H | |
| 0097 | 23 | | 86 | | INX | H | |
| 0098 | 13 | | 87 | | INX | D | |
| 0099 | 1A | | 88 | | LDAX | D | |
| 009A | 77 | | 89 | | MOV | M,A | |
| 009B | CD0000 | E | 90 | | CALL | PRINT | ;GO PRINT THE BUFFER |
| 009E | CD0000 | E | 91 | | CALL | READB | ;GO READ THE CONDENSER TEMPERATURE |
| 00A1 | 110000 | E | 92 | | LXI | D,PMES11 | ;POINT TO THE CONDENSER MESSAGE |
| 00A4 | 210000 | E | 93 | | LXI | H,PRINTB | ;POINT TO THE PRINT BUFFER |
| 00A7 | 0609 | | 94 | | MVI | B,9 | ;LOAD THE LOOP COUNTER |
| 00A9 | CD4302 | C | 95 | | CALL | LOAD | ;GO LOAD PMES11 |
| 00AC | 110000 | E | 96 | | LXI | D,CHTMP | ;POINT TO THE CONDENSER TEMP |
| 00AF | 210F00 | E | 97 | | LXI | H,PRINTB+15 | |

```
00B2  1A             98           LDAX   D        ;PUT THE CONDENSER TEMP IN THE PRINT BUFFER
00B3  77             99           MOV    M,A
00B4  23            100           INX    H
00B5  13            101           INX    D
00B6  1A            102           LDAX   D
00B7  77            103           MOV    M,A
00B8  23            104           INX    H
00B9  23            105           INX    H
00BA  13            106           INX    D
00BB  1A            107           LDAX   D
00BC  77            108           MOV    M,A
00BD  CD0000  E     109           CALL   PRINT    ;GO PRINT THE CONDENSER TEMP
00C0  110000  E     110           LXI    D,PMES9  ;POINT TO THE BAROMETER MESSAGE
00C3  210000  E     111           LXI    H,PRINTB ;POINT TO THE PRINT BUFFER
00C6  0614          112           MVI    B,20     ;LOAD THE LOOP COUNTER
00C8  CD4302  C     113           CALL   LOAD     ;GO LOAD THE PRINT BUFFER
00CB  110000  E     114           LXI    D,BAROM  ;POINT TO THE BAROMETER
00CE  210D00  E     115           LXI    H,PRINTB+13
00D1  0603          116           MVI    B,3
00D3  CD4302  C     117           CALL   LOAD
00D6  CD0000  E     118           CALL   PRINT    ;GO PRINT THE BAROMETRIC PRESSURE
00D9  F1            119           POP    PSW      ;GET THE ZERO FLAG BACK
00DA  F5            120           PUSH   PSW      ;SAVE IT AGAIN
00DB  C23302  C     121           JNZ    SET4     ;SET UP THE NEXT MUX CONTROL
00DE  3E21          122           MVI    A,21H    ;SET TO READ VAPOR TEMP & WATTS
00E0  320970        123 MUXS2:    STA    7009H    ;OUTPUT THE MUX CONTROL BYTE
00E3  F1            124           POP    PSW      ;GET THE ZERO FLAG BACK
00E4  C23802  C     125           JNZ    PNOT     ;IF 30 - 300 C RANGE, PRINT NOT CORRECTED MESSAGE
00E7  AF            126           XRA    A
00E8  320000  E     127           STA    CORSW    ;SET THE CORECTION SWITCH ON
00EB  210000  E     128           LXI    H,PMES12 ;POINT TO THE TEMPERATURES ARE MESSAGE
00EE  CD0000  E     129 PNEXT:    CALL   PLOOP    ;GO PRINT IT OUT
00F1  210000  E     130           LXI    H,PMES14 ;POINT TO THE CORRECTED TO 760MMHG MESSAGE
00F4  CD0000  E     131           CALL   PLOOP    ;GO PRINT IT OUT
00F7  110000  E     132           LXI    D,PMES25 ;POINT TO THE IBP TIME LIMIT MESSAGE
00FA  210000  E     133           LXI    H,PRINTB ;POINT TO THE PRINT BUFFER
00FD  0614          134           MVI    B,20     ;LOAD THE LOOP COUNTER TO 20
00FF  CD4302  C     135           CALL   LOAD     ;GO LOAD THE PRINT BUFFER
0102  3A0000  E     136           LDA    TRDR     ;GET THE TEMP RANGE SETTING
0105  1F            137           RAR             ;CHECK FOR THE 0 - 300C RANGE
0106  DA7E02  C     138           JC     P10MIN   ;IF = 1, PRINT THE 10 MIN RANGE
0109  1F            139           RAR             ;CHECK FOR THE 0 - 400C RANGE
010A  DA8402  C     140           JC     P15MIN   ;IF = 1, PRINT THE 15 MIN RANGE
010D  1F            141           RAR             ;CHECK FOR THE 32 - 572F RANGE
010E  DA7E02  C     142           JC     P10MIN   ;IF = 1, PRINT THE 10 MIN RANGE
0111  1F            143           RAR             ;CHECK FOR THE 32 - 752F RANGE
0112  DA8402  C     144           JC     P15MIN   ;IF = 1, PRINT THE 15 MIN RANGE
0115  CD8C02  C     145 CONT2:    CALL   CKLEVL   ;GO CHECK ON THE LIQUID LEVEL THE 5'TH TIME
0118  3A0000  E     146           LDA    LIQLEV   ;WANT TO CHECK IF CONDENSER LIQUID LEVEL IS LOW
011B  FE03          147           CPI    3        ;CHECK FOR LIQLEV < 3
011D  DA2601  C     148           JC     CONT3    ;IF NOT LOW (LIQLEV < 3), IT'S NOT LOW
0120  210000  E     149           LXI    H,PMES31 ;IF LOW, PRINT OUT LEVEL LOW MESSAGE
0123  CD0000  E     150           CALL   PLOOP    ;GO LOAD IT & PRINT IT
0126  210000  E     151 CONT3:    LXI    H,BLANK  ;WANT TO INSERT A LINE OF BLANKS HERE
0129  CD0000  E     152           CALL   PLOOP    ;GO LOAD & PRINT IT
012C  210000  E     153           LXI    H,PMES33 ;POINT TO THE DISTILLATION RESULTS MESSAGE
012F  CD0000  E     154           CALL   PLOOP    ;GO LOAD & PRINT IT
0132  210000  E     155           LXI    H,IBUF   ;POINT TO THE INSERT BUFFER
0135  060A          156           MVI    B,10     ;LOAD THE LOOP COUNTER TO 10
0137  110000  E     157           LXI    D,DMES1  ;POINT TO THE IBP MESSAGE
013A  CD4302  C     158           CALL   LOAD     ;GO LOAD THE MESSAGE
013D  3A0000  E     159           LDA    TRDR     ;GET THE TEMP RANGE SETTING
0140  47            160           MOV    B,A      ;SAVE THIS RATE & RANGE BYTE
0141  E60C          161           ANI    0CH      ;MASK IN THE RANGES
0143  CA2202  C     162           JZ     CENT     ;IF ZERO, MUST BE CENTIGRADE RANGE
```

| | | | | | | |
|---|---|---|---|---|---|---|
| 0146 3646 | | 163 | | MVI | M,'F' | ;ELSE, MUST BE FAHRENHEIT RANGE |
| 0148 23 | | 164 CONT: | | INX | H | ;POINT TO THE NEXT INSERT BUFFER POSITION |
| 0149 78 | | 165 | | MOV | A,B | ;GET THE RATE & RANGE BYTE |
| 014A 07 | | 166 | | RLC | | |
| 014B 07 | | 167 | | RLC | | |
| 014C 07 | | 168 | | RLC | | ;MOVE THE 3 RATE BITS INTO THE LSB'S |
| 014D E607 | | 169 | | ANI | 7 | ;MASK IN THE RATES |
| 014F 3D | | 170 | | DCR | A | ;ADJUST THIS NUMBER |
| 0150 FE03 | | 171 | | CPI | 3 | ;LOOK FOR THE 9.0 ML/MIN RATE |
| 0152 CC2C02 | C | 172 | | CZ | BUMP | ;IF 9.0 ML/MIN, DO ANOTHER ADJUSTMENT |
| 0155 E5 | | 173 | | PUSH | H | ;SAVE THE CURRENT POINTER |
| 0156 D5 | | 174 | | PUSH | D | ;SAVE THIS CURRENT POINTER |
| 0157 210000 | C | 175 | | LXI | H,PINCT | ;POINT TO THE PHASE INCREASING TABLE |
| 015A 5F | | 176 | | MOV | E,A | ;SET UP THE D,E PAIR FOR A DISPLACEMENT ADD |
| 015B AF | | 177 | | XRA | A | |
| 015C 57 | | 178 | | MOV | D,A | |
| 015D 3A0000 | E | 179 | | LDA | LTL | ;GET THIS CONSTANT SET UP IN CALIB |
| 0160 FE32 | | 180 | | CPI | 32H | ;CHECK WHICH LINE PERIOD CONSTANT LOADED |
| 0162 C42702 | C | 181 | | CNZ | HZ50 | ;IF NOT 32H, LINE FREQ IS 50 HZ |
| 0165 19 | | 182 | | DAD | D | ;POINT TO THE PINC CONSTANT IN THE TABLE |
| 0166 7E | | 183 | | MOV | A,M | ;GET THE CONSTANT |
| 0167 320000 | E | 184 | | STA | PINC | ;LOAD THE INCREASING CONSTANT |
| 016A D1 | | 185 | | POP | D | ;RESTORE THIS POINTER |
| 016B E1 | | 186 | | POP | H | ;RESTORE THIS POINTER |
| 016C 0605 | | 187 | | MVI | B,5 | ;LOAD THE LOOP COUNTER TO 5 |
| 016E CD4302 | C | 188 | | CALL | LOAD | ;GO LOAD THE MESSAGE |
| 0171 AF | | 189 | | XRA | A | |
| 0172 320000 | E | 190 | | STA | TIMEL | ;ZERO THE TIME COUNTER |
| 0175 320000 | E | 191 | | STA | TIMEM | |
| 0178 210200 | E | 192 | | LXI | H,IBP+2 | ;POINT TO THE ASCII 5 MINUTE HEAT SETTING |
| 017B CDC201 | C | 193 | | CALL | CALC | ;CALCULATE THE 5 MINUTE HEAT SETTING IN COUNTS |
| 017E 79 | | 194 | | MOV | A,C | |
| 017F 320000 | E | 195 | | STA | H5L | ;SAVE THE 5 MINUTE HEAT SETTING LSB'S |
| 0182 78 | | 196 | | MOV | A,B | |
| 0183 320000 | E | 197 | | STA | H5M | ;SAVE THE 5 MINUTE HEAT SETTING MSB'S |
| 0186 7B | | 198 | | MOV | A,E | |
| 0187 320000 | E | 199 | | STA | BH5L | ;SAVE THE BINARY 5 MINUTE HEAT |
| 018A 7A | | 200 | | MOV | A,D | |
| 018B 320000 | E | 201 | | STA | BH5M | |
| 018E 210200 | E | 202 | | LXI | H,INITHT+2 | ;POINT TO THE ASCII INITIAL HEAT SETTING |
| 0191 CDC201 | C | 203 | | CALL | CALC | ;CALCULATE THE INITIAL HEAT IN COUNTS |
| 0194 79 | | 204 | | MOV | A,C | |
| 0195 320000 | E | 205 | | STA | IPSL | ;SAVE THE INITIAL POWER SETTING LSB'S |
| 0198 78 | | 206 | | MOV | A,B | |
| 0199 320000 | E | 207 | | STA | IPSM | ;SAVE THE INITIAL POWER SETTING MSB'S |
| 019C 211370 | | 208 | | LXI | H,7013H | ;POINT TO THE PHASE CONTROL COUNTER PORT |
| 019F 3672 | | 209 | | MVI | M,72H | ;SET COUNTER 1 TO MODE 1 |
| 01A1 3614 | | 210 | | MVI | M,14H | ;SET COUNTER 0 TO MODE 2 |
| 01A3 2B | | 211 | | DCX | H | |
| 01A4 2B | | 212 | | DCX | H | ;POINT TO COUNTER 1 DATA PORT |
| 01A5 71 | | 213 | | MOV | M,C | ;OUTPUT THE LSB'S |
| 01A6 70 | | 214 | | MOV | M,B | ;OUTPUT THE MSB'S |
| 01A7 2B | | 215 | | DCX | H | ;POINT TO COUNTER 0 DATA PORT |
| 01A8 364F | | 216 | | MVI | M,79 | ;LOAD A 1 SECOND TIME OUT |
| 01AA 7B | | 217 | | MOV | A,E | |
| 01AB 320000 | E | 218 | | STA | SETPTL | ;SAVE THE BINARY LSB'S |
| 01AE 7A | | 219 | | MOV | A,D | |
| 01AF 320000 | E | 220 | | STA | SETPTM | ;SAVE THE BINARY MSB'S |
| 01B2 AF | | 221 | | XRA | A | |
| 01B3 320000 | E | 222 | | STA | R75SW | ;ZERO THE RST7.5 INTERRUPT SWITCH |
| 01B6 320000 | E | 223 | | STA | R65SW | ;ZERO THE RST6.5 INTERRUPT SWITCH |
| 01B9 320000 | E | 224 | | STA | R55SW | ;ZERO THE RST5.5 INTERRUPT SWITCH |
| 01BC 320000 | E | 225 | | STA | S5MIN | ;RESET THE 5 MINUTE SWITCH |
| 01BF C30000 | E | 226 | | JMP | STARTC | ;CONTINUE THE START ROUTINE |
| 01C2 110200 | E | 227 CALC: | | LXI | D,DBUF+2 | ;POINT TO THE DATA BUFFER |
| 01C5 7E | | 228 | | MOV | A,M | ;WANT TO CONVERT THE ASCII HEAT SETTING |
| 01C6 E60F | | 229 | | ANI | 0FH | ;TO BCD AND PACK THE DIGITS TWO TO A BYTE. |

| | | | | | |
|---|---|---|---|---|---|
| 01C8 47 | | 230 | MOV | B,A | ;SAVE THIS LSD |
| 01C9 2B | | 231 | DCX | H | ;POINT TO THE NEXT ASCII DIGIT |
| 01CA 7E | | 232 | MOV | A,M | ;GET THE DIGIT |
| 01CB 17 | | 233 | RAL | | |
| 01CC 17 | | 234 | RAL | | |
| 01CD 17 | | 235 | RAL | | |
| 01CE 17 | | 236 | RAL | | |
| 01CF E6F0 | | 237 | ANI | 0F0H | ;MASK IN THE SHIFTED DIGIT |
| 01D1 80 | | 238 | ADD | B | ;PACK THE TWO |
| 01D2 12 | | 239 | STAX | D | ;STORE IT IN THE DATA BUFFER |
| 01D3 1B | | 240 | DCX | D | ;POINT TO THE NEXT POSITION IN THE DATA BUFFER |
| 01D4 2B | | 241 | DCX | H | ;POINT TO THE NEXT ASCII DIGIT |
| 01D5 7E | | 242 | MOV | A,M | ;GET THE LAST DIGIT |
| 01D6 E60F | | 243 | ANI | 0FH | ;CONVERT IT TO BINARY |
| 01D8 12 | | 244 | STAX | D | ;STORE IT IN THE DATA BUFFER |
| 01D9 1B | | 245 | DCX | D | ;POINT TO THE NEXT POSITION IN THE DATA BUFFER |
| 01DA AF | | 246 | XRA | A | |
| 01DB 12 | | 247 | STAX | D | ;PUT A ZERO THERE |
| 01DC EB | | 248 | XCHG | | ;LOAD THE H,L POINTER TO THE BCD MSD |
| 01DD E5 | | 249 | PUSH | H | ;SAVE THIS POINTER |
| 01DE CD0000 | E | 250 | CALL | BCDBIN | ;CONVERT THE BCD HEAT TO BINARY |
| 01E1 E1 | | 251 | POP | H | ;RESTORE THE POINTER |
| 01E2 23 | | 252 | INX | H | ;SET UP FOR MULTIPLY |
| 01E3 70 | | 253 | MOV | M,B | ;THE BINARY RESULT IS RETURNED IN THE B,C PAIR |
| 01E4 23 | | 254 | INX | H | |
| 01E5 71 | | 255 | MOV | M,C | ;PUT THE BINARY RESULT IN THE DATA BUFFER |
| 01E6 C5 | | 256 | PUSH | B | ;SAVE THIS BINARY HEAT SETTING |
| 01E7 23 | | 257 | INX | H | ;DO (HEAT X 6) |
| 01E8 3600 | | 258 | MVI | M,0 | |
| 01EA 23 | | 259 | INX | H | |
| 01EB 3606 | | 260 | MVI | M,6 | |
| 01ED CD0000 | E | 261 | CALL | MULTPY | ;DO THE MULTIPLY |
| 01F0 210800 | E | 262 | LXI | H,DBUF+8 | ;NOW WANT TO DO 8000 - (HEAT X 6) |
| 01F3 3E40 | | 263 | MVI | A,40H | |
| 01F5 96 | | 264 | SUB | M | ;SUBTRACT THE LSB'S |
| 01F6 4F | | 265 | MOV | C,A | ;SAVE THIS RESULT |
| 01F7 2B | | 266 | DCX | H | ;POINT TO THE MSB'S |
| 01F8 3E1F | | 267 | MVI | A,1FH | |
| 01FA 9E | | 268 | SBB | M | ;SUBTRACT THE MSB'S |
| 01FB 47 | | 269 | MOV | B,A | ;SAVE THIS RESULT |
| 01FC 2B | | 270 | DCX | H | ;NOW WANT TO SET UP FOR ANOTHER MULTIPLY |
| 01FD 2B | | 271 | DCX | H | |
| 01FE 2B | | 272 | DCX | H | |
| 01FF 3A0000 | E | 273 | LDA | LTL | ;GET THE LINE PERIOD LSB'S |
| 0202 77 | | 274 | MOV | M,A | ;PUT IT IN THE DATA BUFFER |
| 0203 2B | | 275 | DCX | H | |
| 0204 3A0000 | E | 276 | LDA | LTM | ;GET THE LINE PERIOD MSB'S |
| 0207 77 | | 277 | MOV | M,A | ;PUT IT IN THE DATA BUFFER |
| 0208 2B | | 278 | DCX | H | |
| 0209 71 | | 279 | MOV | M,C | ;PUT THE RESULT OF 8000 -(HEAT X 6) IN BUFFER |
| 020A 2B | | 280 | DCX | H | |
| 020B 70 | | 281 | MOV | M,B | |
| 020C CD0000 | E | 282 | CALL | MULTPY | ;DO LP X (8000 - (HEAT X 6)) |
| 020F CD0000 | E | 283 | CALL | BINBCD | ;CONVERT THE RESULT TO BCD |
| 0212 210000 | E | 284 | LXI | H,DBUF | ;DIVIDE BY 10000 AND CONVERT BACK TO BINARY |
| 0215 CD0000 | E | 285 | CALL | BCDBIN | ;CONVERT IT BACK TO BINARY |
| 0218 D1 | | 286 | POP | D | ;GET THE BINARY HEAT SETTING |
| 0219 79 | | 287 | MOV | A,C | ;ADD 597 COUNTS FOR OFFSET OF THE |
| 021A C655 | | 288 | ADI | 55H | ;ZERO CROSSING SIGNAL |
| 021C 4F | | 289 | MOV | C,A | |
| 021D 78 | | 290 | MOV | A,B | |
| 021E CE02 | | 291 | ACI | 2 | |
| 0220 47 | | 292 | MOV | B,A | |
| 0221 C9 | | 293 | RET | | |
| 0222 3643 | | 294 CENT | MVI | M,'C' | |
| 0224 C34801 | C | 295 | JMP | CONT | |
| 0227 7B | | 296 HZ50 | MOV | A,E | |

```
0228 C603        297            ADI   3
022A 5F          298            MOV   E,A
022B C9          299            RET
022C 3D          300 BUMP:      DCR   A
022D C9          301            RET
022E 3E54        302 SET3:      MVI   A,54H       ;SET THE MUX CONTROL
0230 C37000  C   303            JMP   MUXS1
0233 3E51        304 SET4:      MVI   A,51H       ;SET THE MUX CONTROL
0235 C3E000  C   305            JMP   MUXS2
0238 210000  E   306 PNOT:      LXI   H,PMES13    ;POINT TO THE TEMPERATURES ARE NOT MESSAGE
023B 3E01        307            MVI   A,1
023D 320000  E   308            STA   CORSW       ;SET THE CORRECTION SWITCH OFF
0240 C3EE00  C   309            JMP   PNEXT
0243 1A          310 LOAD:      LDAX  D
0244 77          311            MOV   M,A
0245 23          312            INX   H
0246 13          313            INX   D
0247 05          314            DCR   B
0248 C24302  C   315            JNZ   LOAD
024B C9          316            RET
024C AF          317 CKGRAD:    XRA   A           ;WE CHECK FOR A GRADUATE PRESENT BY DRIVING THE
024D 3C          318            INR   A           ;MOTOR DOWN TO THE LLS AND LOOKING IF THE MENISCUS
024E 320000  E   319            STA   DIR         ;DETECTOR LIGHT IS BLOCKED BY THE BASE OF THE
0251 320000  E   320            STA   DLYSW       ;GRADUATE. SET MOTOR DELAY TO 24MS
0254 210000  E   321            LXI   H,DMES7     ;POINT TO THE RESET MOTOR MESSAGE
0257 CD0000  E   322            CALL  DSPLY       ;GO DISPLAY IT
025A CD0000  E   323            CALL  DRLLS       ;GO DRIVE TO THE LOWER LIMIT SWITCH
025D C9          324            RET
025E 210000  E   325 NOGRAD:    LXI   H,DMES5     ;POINT TO THE PRINTING MESSAGE
0261 CD0000  E   326            CALL  DSPLY       ;GO DISPLAY IT
0264 210000  E   327            LXI   H,PMES26    ;POINT TO THE TEST TERMINATED MESSAGE
0267 CD0000  E   328            CALL  PLOOP       ;GO LOAD IT AND PRINT IT
026A 210000  E   329            LXI   H,PMES20    ;POINT TO THE NO GRADUATE MESSAGE
026D CD0000  E   330            CALL  PLOOP       ;GO LOAD IT AND PRINT IT
0270 3A0000  E   331            LDA   PHASE       ;GET THIS CONTROL BYTE
0273 E6EF        332            ANI   0EFH        ;WANT TO TURN ON THE AIR SOLENOID
0275 320000  E   333            STA   PHASE       ;UPDATE THIS CONTROL BYTE
0278 320A70      334            STA   700AH       ;OUTPUT THIS CONTROL BYTE
027B C30000  E   335            JMP   EDITOR      ;GO WAIT FOR SOME KEY STROKES
027E CD0000  E   336 P10MIN:    CALL  PRINT
0281 C31501  C   337            JMP   CONT2
0284 3E35        338 P15MIN:    MVI   A,'5'
0286 321200  E   339            STA   PRINTB+18   ;FORCE THE 15 MIN LIMIT
0289 C37E02  C   340            JMP   P10MIN
028C 3A0B70      341 CKLEVL:    LDA   700BH       ;LOOK AT THE LIQUID LEVEL STATUS BYTE
028F 1F          342            RAR               ;THERE ARE 5 SAMPLES MADE OF THE LEVEL
0290 1F          343            RAR
0291 D0          344            RNC               ;IF THE LEVEL IS NOT LOW, RETURN
0292 3A0000  E   345            LDA   LIQLEV      ;ELSE, INCREMENT THE AVERAGING BYTE
0295 3C          346            INR   A
0296 320000  E   347            STA   LIQLEV
0299 C9          348            RET
029A 210000  E   349 ITSOR:     LXI   H,PMES36    ;POINT TO THE CHAMBER OVER-RANGE MESSAGE
029D CD0000  E   350 TERM:      CALL  PLOOP       ;GO PRINT IT OUT
02A0 C36500  C   351            JMP   CONT1       ;CONTINUE PROCESSING
02A3 210000  E   352 ITSPOL:    LXI   H,PMES37    ;POINT TO THE CHAMBER NEGATIVE MESSAGE
02A6 C39D02  C   353            JMP   TERM        ;GO FINISH HERE & TERMINATE THE TEST
0006         C   354            END   START
```

PUBLIC SYMBOLS
CALC  C 01C2    START  C 0006

EXTERNAL SYMBOLS
BAROM  E 0000    BCDBIN E 0000    BH5L   E 0000    BH5M   E 0000    BINBCD E 0000    BLANK  E 0000
CHTMP  E 0000    CORSW  E 0000    DBUF   E 0000    DIR    E 0000    DLYSW  E 0000    DMES1  E 0000
DMES5  E 0000    DMES7  E 0000    DMES8  E 0000    DRLLS  E 0000    DSPLY  E 0000    EDITOR E 0000
H5L    E 0000    H5M    E 0000    IBP    E 0000    IBUF   E 0000    INITHT E 0000    IPSL   E 0000

| | | | | | | |
|---|---|---|---|---|---|---|
| IPSM   E 0000 | LIQLEV E 0000 | LTL    E 0000 | LTM    E 0000 | MESNO  E 0000 | MULTPY E 0000 | |
| PFOR   E 0000 | PHASE  E 0000 | PINC   E 0000 | PLOOP  E 0000 | PLOT   E 0000 | PMES10 E 0000 | |
| PMES11 E 0000 | PMES12 E 0000 | PMES13 E 0000 | PMES14 E 0000 | PMES20 E 0000 | PMES25 E 0000 | |
| PMES26 E 0000 | PMES31 E 0000 | PMES33 E 0000 | PMES36 E 0000 | PMES37 E 0000 | PMES9  E 0000 | |
| PRINT  E 0000 | PRINTB E 0000 | PSYNC  E 0000 | R55SW  E 0000 | R65SW  E 0000 | R75SW  E 0000 | |
| READA  E 0000 | READB  E 0000 | RMOTOR E 0000 | S12C   E 0000 | S5MIN  E 0000 | SETPTL E 0000 | |
| SETPTM E 0000 | STARTC E 0000 | STEPC  E 0000 | TIMEL  E 0000 | TIMEM  E 0000 | TRDR   E 0000 | |
| TXDP   E 0000 | TXDT   E 0000 | VOL    E 0000 | | | | |

USER SYMBOLS

| | | | | | |
|---|---|---|---|---|---|
| BAROM  E 0000 | BCDBIN E 0000 | BH5L   E 0000 | BH5M   E 0000 | BINBCD E 0000 | BLANK  E 0000 |
| BUMP   C 022C | CALC   C 01C2 | CENT   C 0222 | CHTMP  E 0000 | CKGRAD C 024C | CKLEVL C 028C |
| CONT   C 0148 | CONT1  C 0065 | CONT2  C 0115 | CONT3  C 0126 | CORSW  E 0000 | DBUF   E 0000 |
| DIR    E 0000 | DLYSW  E 0000 | DMES1  E 0000 | DMES5  E 0000 | DMES7  E 0000 | DMES8  E 0000 |
| DRLLS  E 0000 | DSPLY  E 0000 | EDITOR E 0000 | H5L    E 0000 | H5M    E 0000 | HZ50   C 0227 |
| IBP    E 0000 | IBUF   E 0000 | INITHT E 0000 | IPSL   E 0000 | IPSM   E 0000 | ITSOR  C 029A |
| ITSPOL C 02A3 | LIQLEV E 0000 | LOAD   C 0243 | LTL    E 0000 | LTM    E 0000 | MESNO  E 0000 |
| MULTPY E 0000 | MUXS1  C 0070 | MUXS2  C 00E0 | NOGRAD C 025E | P10MIN C 027E | P15MIN C 0284 |
| PFOR   E 0000 | PHASE  E 0000 | PINC   E 0000 | PINCT  C 0000 | PLOOP  E 0000 | PLOT   E 0000 |
| PMES10 E 0000 | PMES11 E 0000 | PMES12 E 0000 | PMES13 E 0000 | PMES14 E 0000 | PMES20 E 0000 |
| PMES25 E 0000 | PMES26 E 0000 | PMES31 E 0000 | PMES33 E 0000 | PMES36 E 0000 | PMES37 E 0000 |
| PMES9  E 0000 | PNEXT  C 00EE | PNOT   C 0238 | PRINT  E 0000 | PRINTB E 0000 | PSYNC  E 0000 |
| R55SW  E 0000 | R65SW  E 0000 | R75SW  E 0000 | READA  E 0000 | READB  E 0000 | RMOTOR E 0000 |
| S12C   E 0000 | S5MIN  E 0000 | SET3   C 022E | SET4   C 0233 | SETPTL E 0000 | SETPTM E 0000 |
| START  C 0006 | STARTC E 0000 | STEPC  E 0000 | TERM   C 029D | TIMEL  E 0000 | TIMEM  E 0000 |
| TRDR   E 0000 | TXDP   E 0000 | TXDT   E 0000 | VOL    E 0000 | | |

```
                  1  $       TITLE('START ROUTINE CONTINUED') PAGEWIDTH(105) DEBUG
                  2                                ;WRITTEN 11/21/79
                  3                                ;UPDATED 04/02/82
                  4                                ;THIS ROUTINE IS A CONTINUATION OF THE START
                  5                                ;ROUTINE. THE CALCULATION OF THE FINAL HEAT MARK
                  6                                ;AND THE MODE OF ENDING THE TEST IS DONE HERE.
                  7           NAME    STARTC
                  8           PUBLIC  STARTC
                  9           EXTRN   EMODE,FHMARK,ETEMP,IFH,DPTIME,IFHC,RUNAY,TMTP
                 10           EXTRN   DBUF,EATT,EATDP,EATREC,ELOSS,BCDBIN,DIVIDE,IFHT,CNTL1
                 11           EXTRN   TRDR,SLOPEL,SLOPEM,MULTPY,BINBCD,LAGTBL
                 12           CSEG
0000 210300 E    13  STARTC  LXI     H,EATT+3 ;POINT TO END AT TEMP SYSTEM PARAMETER
0003 7E          14           MOV     A,M      ;GET THE LSBYTE
0004 064F        15           MVI     B,'O'
0006 B8          16           CMP     B        ;CHECK FOR THE "NO" MESSAGE
0007 C2A900 C    17           JNZ     FTEMP    ;FORCE END AT TEMP MODE IF NOT "NO" MESSAGE
000A 210300 E    18           LXI     H,EATDP+3 ;POINT TO END AT D.P. SYSTEM PARAMETER
000D 7E          19           MOV     A,M      ;GET THE LSBYTE
000E B8          20           CMP     B        ;CHECK FOR THE "NO" MESSAGE
000F C2B100 C    21           JNZ     FDP      ;FORCE END AT D.P. MODE IF NOT "NO" MESSAGE
0012 210200 E    22           LXI     H,EATREC+2 ;POINT TO END AT % RECOVERED SYSTEM PARAMETER
0015 7E          23           MOV     A,M      ;GET THE LSBYTE
0016 B8          24           CMP     B        ;CHECK FOR THE "NO" MESSAGE
0017 C2B900 C    25           JNZ     FREC     ;FORCE END AT % RECOVERED MODE IF NOT "NO" MESSAGE
001A AF          26           XRA     A        ;ELSE, FORCE END AT END POINT MODE
001B 320000 E    27           STA     EMODE    ;SET END MODE BYTE
001E AF          28  FHCAL    XRA     A
001F 320000 E    29           STA     RUNAY    ;ZERO THE RUN AWAY COUNT
0022 320000 E    30           STA     TMTP     ;ZERO THE TIME TRAP COUNT
0025 3A0000 E    31           LDA     TRDR     ;GET THE TEMP RANGE SELECTED
0028 E610        32           ANI     10H      ;CHECK FOR THE 30-300C RANGE
002A C22801 C    33           JNZ     SET95    ;IF THAT RANGE, SET FHMARK=95%
002D 210000 E    34           LXI     H,ELOSS  ;ELSE, CALCULATE THE FINAL HEAT MARK
0030 CD0D01 C    35           CALL    CAL2     ;CONVERT THE EXPECTED LOSS TO BINARY
0033 69          36           MOV     L,C      ;GET THE RESULT FROM THE B,C REG
0034 60          37           MOV     H,B
0035 29          38           DAD     H        ;DO EXPECTED LOSS X (8+4)
0036 29          39           DAD     H
0037 E5          40           PUSH    H
```

```
0038 29           41         DAD    H
0039 D1           42         POP    D
003A 19           43         DAD    D
003B 4D           44         MOV    C,L      ;PUT THE RESULT IN THE B,C PAIR
003C 44           45         MOV    B,H
003D 210700   E   46         LXI    H,DBUF+7,NOW WANT TO DIVIDE BY 10
0040 71           47         MOV    M,C      ;SET UP THE DATA BUFFER
0041 2B           48         DCX    H
0042 70           49         MOV    M,B
0043 2B           50         DCX    H
0044 AF           51         XRA    A
0045 77           52         MOV    M,A
0046 2B           53         DCX    H
0047 77           54         MOV    M,A
0048 2B           55         DCX    H
0049 360A         56         MVI    M,10
004B 2B           57         DCX    H
004C 77           58         MOV    M,A
004D CD0000   E   59         CALL   DIVIDE   ;DO THE DIVIDE
0050 210100   E   60         LXI    H,DBUF+1,POINT TO THE RESULT
0053 3E68         61         MVI    A,68H    ;DO 1128 (94%) - EXPECTED LOSS
0055 96           62         SUB    M
0056 5F           63         MOV    E,A      ;PUT RESULT IN E REG
0057 3E04         64         MVI    A,4
0059 2B           65         DCX    H
005A 9E           66         SBB    M
005B EB           67         XCHG
005C 67           68         MOV    H,A
005D 220000   E   69 FHSET:  SHLD   FHMARK   ;STORE THE FINAL HEAT MARK
0060 210300   E   70         LXI    H,IFHT+3,POINT TO THE INCREASE FINAL HEAT PARAMETER
0063 CDEC00   C   71         CALL   CAL1     ;CONVERT IT TO BINARY
0066 220000   E   72         SHLD   IFH      ;STORE THE INCREASE FINAL HEAT VALUE
0069 210100   E   73         LXI    H,DBUF+1,NOW WANT TO CONVERT THE BINARY IFH VALUE TO
006C 3A0000   E   74         LDA    SLOPEM   ;PHASE ANGLE COUNTS BY MULTIPLYING BY THE
006F 77           75         MOV    M,A      ;PHASE CONTROL LINE SLOPE.
0070 23           76         INX    H        ;THAT IS DO (IFH X SLOPE)/100
0071 3A0000   E   77         LDA    SLOPEL
0074 77           78         MOV    M,A
0075 23           79         INX    H
0076 70           80         MOV    M,B
0077 23           81         INX    H
0078 71           82         MOV    M,C
0079 CD0000   E   83         CALL   MULTPY   ;DO IFH X SLOPE
007C CD0000   E   84         CALL   BINBCD   ;CONVERT THE RESULT TO BCD
007F 210100   E   85         LXI    H,DBUF+1,DIVIDE BY 100
0082 CD0000   E   86         CALL   BCDBIN   ;CONVERT THE RESULT TO BINARY
0085 60           87         MOV    H,B      ;PUT THE BINARY RESULT IN THE H,L PAIR
0086 69           88         MOV    L,C
0087 220000   E   89         SHLD   IFHC     ;STORE THE INCREASE FINAL HEAT VALUE (COUNTS)
008A 210B70       90         LXI    H,700BH  ;WANT TO PRE-LOAD THE LAG TABLE
008D 7E           91 LOOP1:  MOV    A,M      ;WITH THE VAPOR TEMPERATURE
008E 1F           92         RAR             ;CHECK THE VAPOR A/D STATUS BYTE
008F DA8D00   C   93         JC     LOOP1    ;WAIT TILL STATUS IS GOOD
0092 23           94         INX    H        ;POINT TO THE TEMPERATURE LSB'S
0093 5E           95         MOV    E,M      ;GET THE LSB'S
0094 23           96         INX    H
0095 7E           97         MOV    A,M      ;GET THE TEMP MSB'S
0096 E60F         98         ANI    0FH      ;MASK IN THE 4 MSB'S
0098 57           99         MOV    D,A      ;D,E = VAPOR TEMP UNCORRECTED
0099 210000   E   100        LXI    H,LAGTBL,WANT TO LOAD THE LAG TABLE
009C 060D         101        MVI    B,13     ;LOAD ALL 13 TEMPERATURE LOCATIONS
009E 73           102 LOOP2: MOV    M,E
009F 23           103        INX    H
00A0 72           104        MOV    M,D
00A1 23           105        INX    H
00A2 05           106        DCR    B
00A3 C29E00   C   107        JNZ    LOOP2
```

```
00A6 C30000    E  108          JMP    CNTL1       ;GO DO THE CONTROL 1 ROUTINE
00A9 3E01         109 FTEMP:   MVI    A,1         ;FORCE END AT TEMP MODE
00AB 320000    E  110          STA    EMODE
00AE C3C100    C  111          JMP    TCON        ;CONVERT THE ASCII END TEMP TO BINARY
00B1 3E02         112 FDP:     MVI    A,2         ;FORCE END AT D.P. MODE
00B3 320000    E  113          STA    EMODE
00B6 C3DB00    C  114          JMP    DPCON       ;CONVERT THE ASCII D.P. TO BINARY
00B9 3E04         115 FREC:    MVI    A,4         ;FORCE END AT % RECOVERED MODE
00BB 320000    E  116          STA    EMODE
00BE C31E00    C  117          JMP    FHCAL       ;GO CALCULATE THE FINAL HEAT MARK
00C1 210200    E  118 TCON:    LXI    H,EATT+2    ;POINT TO END AT TEMP SYSTEM PARAMETER
00C4 CDEC00    C  119          CALL   CAL1        ;CONVERT IT TO BINARY
00C7 29           120          DAD    H           ;WANT TO MULTIPLY THIS VALUE BY 10 SO THAT
00C8 E5           121          PUSH   H           ;0 TO 400 = 0.0 TO 400.0 DEGREES
00C9 29           122          DAD    H
00CA 29           123          DAD    H
00CB D1           124          POP    D
00CC 19           125          DAD    D
00CD 3A0300    E  126          LDA    EATT+3      ;CHECK UNITS OF ENDING TEMPERATURE
00D0 FE46         127          CPI    'F'
00D2 CC2E01    C  128          CZ     CONVC       ;IF FAHRENHEIT, CONVERT TO CENTIGRADE
00D5 220000    E  129          SHLD   ETEMP       ;STORE END TEMP
00D8 C31E00    C  130          JMP    FHCAL       ;GO CALCULATE THE FINAL HEAT MARK
00DB 210000    E  131 DPCON:   LXI    H,EATDP     ;POINT TO END AT D.P. SYSTEM PARAMETER
00DE CD0D01    C  132          CALL   CAL2        ;CONVERT IT TO BINARY
00E1 69           133          MOV    L,C         ;PUT THE RESULT IN THE H,L PAIR
00E2 60           134          MOV    H,B
00E3 29           135          DAD    H           ;DO DROP TIME X 8 (REALLY X 80)COUNTS/SEC
00E4 29           136          DAD    H
00E5 29           137          DAD    H
00E6 220000    E  138          SHLD   DPTIME      ;STORE DROP TIME COUNTS
00E9 C31E00    C  139          JMP    FHCAL       ;GO CALCULATE THE FINAL HEAT
00EC 7E           140 CAL1:    MOV    A,M         ;GET THE ASCII LSDIGIT
00ED E60F         141          ANI    0FH         ;CONVERT IT TO BCD
00EF 47           142          MOV    B,A         ;SAVE IT
00F0 2B           143          DCX    H           ;POINT TO THE NEXT DIGIT
00F1 7E           144          MOV    A,M         ;GET THE NEXT DIGIT
00F2 17           145          RAL
00F3 17           146          RAL
00F4 17           147          RAL
00F5 17           148          RAL
00F6 E6F0         149          ANI    0F0H        ;MASK IN THIS SHIFTED DIGIT
00F8 80           150          ADD    B           ;PACK THE TWO DIGITS
00F9 47           151          MOV    B,A         ;SAVE IT
00FA 2B           152          DCX    H           ;POINT TO THE NEXT ASCII DIGIT
00FB 7E           153          MOV    A,M         ;GET THIS DIGIT
00FC E60F         154          ANI    0FH         ;CONVERT IT TO BCD
00FE 210200    E  155          LXI    H,DBUF+2    ;NOW WANT TO CONVERT IT TO BINARY
0101 70           156          MOV    M,B         ;SO SET UP THE DATA BUFFER
0102 2B           157          DCX    H
0103 77           158          MOV    M,A
0104 2B           159          DCX    H
0105 AF           160          XRA    A
0106 77           161          MOV    M,A
0107 CD0000    E  162          CALL   BCDBIN      ;DO THE CONVERSION
010A 69           163          MOV    L,C         ;PUT THE RESULT IN THE H,L PAIR
010B 60           164          MOV    H,B
010C C9           165          RET
010D 7E           166 CAL2:    MOV    A,M         ;GET THE UNITS ASCII DIGIT
010E 17           167          RAL
010F 17           168          RAL
0110 17           169          RAL
0111 17           170          RAL
0112 E6F0         171          ANI    0F0H        ;MASK IN THIS SHIFTED DIGIT
0114 47           172          MOV    B,A         ;SAVE IT
0115 23           173          INX    H
0116 23           174          INX    H           ;POINT TO THE TENTHS DIGIT
```

```
0117 7E              175          MOV   A,M       ;GET THE TENTHS DIGIT
0118 E60F            176          ANI   0FH       ;CONVERT IT TO BCD
011A 80              177          ADD   B         ;PACK THE TWO DIGITS
011B 210200   E      178          LXI   H,DBUF+2  ;NOW WANT TO CONVERT IT TO BINARY
011E 77              179          MOV   M,A       ;SET UP THE DATA BUFFER
011F 2B              180          DCX   H
0120 AF              181          XRA   A
0121 77              182          MOV   M,A
0122 2B              183          DCX   H
0123 77              184          MOV   M,A
0124 CD0000   E      185          CALL  BCDBIN    ;DO THE CONVERSION
0127 C9              186          RET
0128 217404          187 SET95:   LXI   H,1140    ;FORCE THE FINAL HEAT MARK =95% (STEPC=1140)
012B C35D00   C      188          JMP   FHSET
012E 114001          189 CONVC:   LXI   D,320     ;CONVERT THE FAHRENHEIT TEMP TO CENTIGRADE
0131 7D              190          MOV   A,L       ;DO (5/9)(F - 32)
0132 93              191          SUB   E         ;DO H,L - 320
0133 6F              192          MOV   L,A
0134 7C              193          MOV   A,H
0135 9A              194          SBB   D
0136 67              195          MOV   H,A       ;NOW, H,L = F - 320
0137 DA5B01   C      196          JC    F0        ;IF F < 33 , FORCE ETEMP =0
013A E5              197          PUSH  H         ;ELSE, DO 5 X (F - 320)
013B 29              198          DAD   H
013C 29              199          DAD   H
013D D1              200          POP   D
013E 19              201          DAD   D
013F EB              202          XCHG            ;NOW, D,E = 5 X (F - 320)
0140 210700   E      203          LXI   H,DBUF+7  ;DO (5 X (F - 320))/9
0143 73              204          MOV   M,E       ;SET UP THE DBUF FOR THE DIVIDE
0144 2B              205          DCX   H
0145 72              206          MOV   M,D
0146 2B              207          DCX   H
0147 AF              208          XRA   A
0148 77              209          MOV   M,A
0149 2B              210          DCX   H
014A 77              211          MOV   M,A
014B 2B              212          DCX   H
014C 3609            213          MVI   M,9
014E 2B              214          DCX   H
014F 77              215          MOV   M,A
0150 CD0000   E      216          CALL  DIVIDE
0153 210100   E      217          LXI   H,DBUF+1  ;POINT TO THE RESULT
0156 5E              218          MOV   E,M
0157 2B              219          DCX   H
0158 56              220          MOV   D,M
0159 EB              221          XCHG
015A C9              222          RET
015B 210000          223 F0:      LXI   H,0
015E C9              224          RET
0000          C      225          END   STARTC
```

PUBLIC SYMBOLS
STARTC C 0000

EXTERNAL SYMBOLS
| BCDBIN E 0000 | BINBCD E 0000 | CNTL1 E 0000 | DBUF  E 0000 | DIVIDE E 0000 | DPTIME E 0000 |
|---|---|---|---|---|---|
| EATDP  E 0000 | EATREC E 0000 | EATT  E 0000 | ELOSS E 0000 | EMODE  E 0000 | ETEMP  E 0000 |
| FHMARK E 0000 | IFH    E 0000 | IFHC  E 0000 | IFHT  E 0000 | LAGTBL E 0000 | MULTPY E 0000 |
| RUNAY  E 0000 | SLOPEL E 0000 | SLOPEM E 0000 | TMTP  E 0000 | TRDR   E 0000 | |

USER SYMBOLS
| BCDBIN E 0000 | BINBCD E 0000 | CAL1   C 00EC | CAL2   C 010D | CNTL1  E 0000 | CONVC  C 012E |
|---|---|---|---|---|---|
| DBUF   E 0000 | DIVIDE E 0000 | DPCON  C 00DB | DPTIME E 0000 | EATDP  E 0000 | EATREC E 0000 |
| EATT   E 0000 | ELOSS  E 0000 | EMODE  E 0000 | ETEMP  E 0000 | F0     C 015B | FDP    C 00B1 |
| FHCAL  C 001E | FHMARK E 0000 | FHSET  C 005D | FREC   C 00B9 | FTEMP  C 00A9 | IFH    E 0000 |
| IFHC   E 0000 | IFHT   E 0000 | LAGTBL E 0000 | LOOP1  C 008D | LOOP2  C 009E | MULTPY E 0000 |
| RUNAY  E 0000 | SET95  C 0128 | SLOPEL E 0000 | SLOPEM E 0000 | STARTC C 0000 | TCON   C 00C1 |
| TMTP   E 0000 | TRDR   E 0000 | | | | |

```
  1 $            TITLE('READ A/D ROUTINE') PAGEWIDTH(105) DEBUG
  2                            ;WRITTEN 03/04/80
  3                            ;UPDATED 03/22/82
  4                            ;THIS ROUTINE CONTAINS TWO SUBROUTINES TO READ THE
  5                            ;TWO A/D CONVERTERS. READA-- READS THE BAROMETRIC
  6                            ;PRESSURE AND SAVES IT (XXX MM). READB-- READS
  7                            ;THE RECEIVING CHAMBER TEMPERATURE, SAVES IT
  8                            ;(XX.X C) AND READS THE CONDENSER TEMPERATURE,
  9                            ;SCALES IT AND SAVES IT (XX.X C).
 10              NAME    RDPARM
 11              PUBLIC  READA,READB
 12              EXTRN   DBUF,BINBCD,UNPAK,CORRF,BAROM,CHTMP,SIGNC,MESNO
 13              CSEG
0000 210670    14 READA:  LXI   H,700BH    ;POINT TO THE BAROMETER A/D
0003 7E        15 LOOP1:  MOV   A,M        ;GET THE STATUS BYTE
0004 1F        16         RAR              ;CHECK IF CONVERSION DONE
0005 DA0300  C 17         JC    LOOP1      ;IF NOT DONE, WAIT TILL DONE
0008 23        18         INX   H          ;POINT TO THE LSBYTE
0009 4E        19         MOV   C,M        ;SAVE THE LSBYTE
000A 23        20         INX   H          ;POINT TO THE MSBYTE
000B 7E        21         MOV   A,M        ;GET THE MSBYTE
000C E60F      22         ANI   0FH        ;MASK IN THE 4 LSB'S
000E 47        23         MOV   B,A        ;SAVE THE BAROMETER MSB'S
000F 2B        24         DCX   H
0010 2B        25         DCX   H          ;POINT TO THE STATUS BYTE AGAIN
0011 7E        26         MOV   A,M        ;GET THE STATUS BYTE
0012 1F        27         RAR              ;MAKE SURE THE STATUS IS STILL GOOD
0013 DA0000  C 28         JC    READA      ;IF STATUS NOW NOT GOOD, GO DO ANOTHER SAMPLE
0016 C5        29         PUSH  B          ;SAVE THE BINARY BAROMETER VALUE
0017 210800  E 30         LXI   H,DBUF+8   ;WANT TO CONVERT IT TO BCD FOR PRINTING
001A 71        31         MOV   M,C        ;SET UP THE DATA BUFFER FOR THE BINBCD
001B 2B        32         DCX   H
001C 70        33         MOV   M,B
001D 2B        34         DCX   H
001E AF        35         XRA   A
001F 77        36         MOV   M,A
0020 2B        37         DCX   H
0021 77        38         MOV   M,A
0022 CD0000  E 39         CALL  BINBCD     ;DO THE CONVERSION
0025 210300  E 40         LXI   H,DBUF+3   ;POINT TO THE BCD BAROMETER VALUE
0028 7E        41         MOV   A,M        ;GET THE MSDIGIT
0029 23        42         INX   H
002A 46        43         MOV   B,M        ;GET THE LSDIGITS
002B 210000  E 44         LXI   H,BAROM    ;POINT TO THE BAROMETER SAVE LOCATIONS
002E E60F      45         ANI   0FH
0030 C630      46         ADI   30H        ;MAKE IT ASCII
0032 77        47         MOV   M,A
0033 23        48         INX   H
0034 78        49         MOV   A,B        ;GET THE LSDIGITS
0035 CD0000  E 50         CALL  UNPAK
0038 77        51         MOV   M,A
0039 23        52         INX   H
003A 78        53         MOV   A,B
003B E60F      54         ANI   0FH
003D C630      55         ADI   30H
003F 77        56         MOV   M,A
0040 C1        57         POP   B          ;GET THE BINARY BAROMETRIC PRESSURE
0041 AF        58         XRA   A
0042 320000  E 59         STA   SIGNC      ;SET THE SIGN TO POSITIVE
0045 3EF8      60         MVI   A,0F8H     ;DO (760 - P) WHERE P > 505 MM
0047 91        61         SUB   C
0048 6F        62         MOV   L,A
0049 3E02      63         MVI   A,2
004B 98        64         SBB   B
004C 67        65         MOV   H,A        ;H,L = 760 - P
004D DC6000  C 66         CC    COMP       ;IF RESULT WAS < 0, 2'S COMPLEMENT THE RESULT
0050 29        67         DAD   H          ;NOW DO 120 X RESULT
```

```
0051 29              68         DAD    H        ;THIS RESULT WILL BE USED TO CORRECT THE TEMP'S
0052 E5              69         PUSH   H
0053 29              70         DAD    H
0054 D1              71         POP    D
0055 19              72         DAD    D
0056 29              73         DAD    H
0057 E5              74         PUSH   H
0058 29              75         DAD    H
0059 29              76         DAD    H
005A D1              77         POP    D
005B 19              78         DAD    D
005C 220000   E      79         SHLD   CORRF    ;SAVE THIS CORRECTION VALUE
005F C9              80         RET
0060 7D              81  COMP:  MOV    A,L      ;2'S COMPLEMENT THE H,L PAIR
0061 2F              82         CMA
0062 6F              83         MOV    L,A
0063 7C              84         MOV    A,H
0064 2F              85         CMA
0065 67              86         MOV    H,A
0066 23              87         INX    H
0067 3E01            88         MVI    A,1
0069 320000   E      89         STA    SIGNC    ;SET THE SIGN TO NEGATIVE
006C C9              90         RET
006D 210A70          91  READB: LXI    H,700AH  ;POINT TO THE TEMP(CHAMBER & CONDENSER) A/D
0070 7E              92  LOOP2: MOV    A,M      ;GET THE STATUS BYTE
0071 17              93         RAL             ;CHECK THE CONVERSION DONE BIT
0072 DA7000   C      94         JC     LOOP2    ;IF NOT DONE, WAIT TILL DONE
0075 210F70          95         LXI    H,700FH  ;POINT TO THE MSBYTE
0078 7E              96         MOV    A,M      ;GET THE MSBYTE
0079 5F              97         MOV    E,A      ;SAVE THE OVER-RANGE & POLARITY BITS
007A E60F            98         ANI    0FH      ;MASK IN THE 4 LSB'S
007C 47              99         MOV    B,A      ;SAVE THE 4 TEMP MSB'S
007D 2B             100         DCX    H        ;POINT TO THE LSBYTE
007E 4E             101         MOV    C,M      ;GET THE LSBYTE (0 - 255)
007F 210A70         102         LXI    H,700AH  ;POINT TO THE STATUS BYTE AGAIN
0082 7E             103         MOV    A,M      ;GET THE STATUS BYTE
0083 17             104         RAL             ;MAKE SURE THE STATUS IS STILL GOOD
0084 DA6D00   C     105         JC     READB    ;IF NOT GOOD, GO DO ANOTHER SAMPLE
0087 3A0000   E     106         LDA    MESNO    ;CHECK IF READING CONDENSER TEMP
008A FE00           107         CPI    0        ;IF = 0, DO NOT SCALE BY 1/2
008C CA9500   C     108         JZ     NOSCAL
008F 78             109         MOV    A,B      ;ELSE, DIVIDE B,C BY 2
0090 1F             110         RAR
0091 47             111         MOV    B,A
0092 79             112         MOV    A,C
0093 1F             113         RAR
0094 4F             114         MOV    C,A
0095 210800   E     115  NOSCAL:LXI    H,DBUF+8 ;WANT TO CONVERT THE TEMP TO BCD
0098 71             116         MOV    M,C
0099 2B             117         DCX    H
009A 70             118         MOV    M,B
009B 2B             119         DCX    H
009C AF             120         XRA    A
009D 77             121         MOV    M,A
009E 2B             122         DCX    H
009F 77             123         MOV    M,A
00A0 CD0000   E     124         CALL   BINBCD   ;DO THE CONVERSION
00A3 210300   E     125         LXI    H,DBUF+3 ;POINT TO THE BCD RESULT
00A6 7E             126         MOV    A,M      ;GET THE TEMP BCD MSDIGIT
00A7 23             127         INX    H
00A8 4E             128         MOV    C,M      ;GET THE LSDIGITS
00A9 E60F           129         ANI    0FH
00AB C630           130         ADI    30H
00AD 210000   E     131         LXI    H,CHTMP  ;POINT TO THE TEMP SAVE LOCATIONS
00B0 77             132         MOV    M,A
00B1 23             133         INX    H
00B2 79             134         MOV    A,C
00B3 CD0000   E     135         CALL   UNPAK
```

```
00B6 77            136      MOV    M,A
00B7 23            137      INX    H
00B8 79            138      MOV    A,C
00B9 E60F          139      ANI    0FH
00BB C630          140      ADI    30H
00BD 77            141      MOV    M,A
00BE C9            142      RET
0000          C    143      END    READA
```

PUBLIC SYMBOLS
READA  C 0000    READB  C 006D

EXTERNAL SYMBOLS
BAROM  E 0000    BINBCD E 0000    CHTMP  E 0000    CORRF  E 0000    DBUF   E 0000    MESNO  E 0000
SIGNC  E 0000    UNPAK  E 0000

USER SYMBOLS
BAROM  E 0000    BINBCD E 0000    CHTMP  E 0000    COMP   C 0060    CORRF  E 0000    DBUF   E 0000
LOOP1  C 0003    LOOP2  C 0070    MESNO  E 0000    NOSCAL C 0095    READA  C 0000    READB  C 006D
SIGNC  E 0000    UNPAK  E 0000

```
                       1 $        TITLE('PRINTER FORMAT ROUTINE') PAGEWIDTH(105) DEBUG
                       2                    ;WRITTEN 10/16/79
                       3                    ;UPDATED 05/03/82
                       4                    ;THIS ROUTINE FORMATS THE TESTING CONDITIONS
                       5                    ;USED DURING A TEST. THE TEST CONDITIONS ARE
                       6                    ;PRINTED OUT WHEN THE START KEY IS HIT.
                       7           NAME     PFOR
                       8           PUBLIC   PFOR,PSYNC
                       9           EXTRN    UID,PMES,PINCT,PMDC,RAN1,RAN2,RAN3,RAN4,RAN5,DR1,DR2,DR3
                      10           EXTRN    CHARC,PRINTB,SPARD,SPART,TRDR,MESNO,PRINT,EATT,EATREC
                      11           EXTRN    EATDP,DDATE,PMES32,PLOOP,BLANK
                      12           CSEG
0000 CD4901      C    13  PFOR:   CALL     PSYNC     ;ISSUE A LINE FEED & CLEAR PRINTER BUFFER
0003 210000      E    14          LXI      H,PMES32  ;PRINT OUT THE OPERATOR:___ MESSAGE
0006 CD0000      E    15          CALL     PLOOP     ;GO LOAD & PRINT IT
0009 CD0000      E    16          CALL     DDATE     ;GO DISPLAY THE DATE & TIME
000C AF               17          XRA      A         ;ZERO THE MESSAGE NUMBER
000D 320000      E    18  NEXT    STA      MESNO     ;SAVE THE MESSAGE NUMBER
0010 210000      E    19          LXI      H,PMDC    ;POINT TO THE PRINTER DISPLACEMENT & COUNT TABLE
0013 87               20          ADD      A         ;DOUBLE THE PRINT MESSAGE NUMBER
0014 4F               21          MOV      C,A       ;SET UP B,C FOR INDEXING
0015 AF               22          XRA      A
0016 47               23          MOV      B,A
0017 09               24          DAD      B         ;POINT TO THE DISPLACEMENT
0018 4E               25          MOV      C,M       ;GET THE DISPLACEMENT
0019 23               26          INX      H         ;POINT TO THE COUNT
001A 5E               27          MOV      E,M       ;GET THE COUNT
001B 53               28          MOV      D,E       ;SAVE THE COUNT
001C 210000      E    29          LXI      H,PMES    ;POINT TO THE PRINTER MESSAGE TABLE
001F 09               30          DAD      B         ;POINT TO THE MESSAGE
0020 010000      E    31          LXI      B,PRINTB  ;POINT TO THE PRINTER BUFFER
0023 7E               32  LOOP1:  MOV      A,M       ;GET A CHARACTER
0024 02               33          STAX     B         ;PUT IT IN THE PRINTER BUFFER
0025 23               34          INX      H         ;POINT TO THE NEXT CHARACTER
0026 03               35          INX      B         ;BUMP THE PRINTER BUFFER POINTER
0027 1D               36          DCR      E         ;DECREMENT THE CHARACTER COUNT
0028 C22300      C    37          JNZ      LOOP1     ;IF NOT 0, GET ANOTHER CHARACTER
002B 7A               38          MOV      A,D       ;GET THE CHARACTER COUNT
002C 320000      E    39          STA      CHARC     ;SAVE THE COUNT
002F FE14            40          CPI      20        ;CHECK IF 20 CHARACTERS WERE LOADED
0031 DA5600      C    41          JC       GETM      ;IF NOT, GET SOME MORE FROM RAM
0034 CD0000      E    42  OUTIT:  CALL     PRINT     ;IF YES, PRINT THE BUFFER
0037 3A0000      E    43          LDA      MESNO     ;GET THE MESSAGE NUMBER
003A FE0A            44          CPI      10        ;CHECK IF ALL MESSAGES ARE DONE
003C D0               45          RNC                ;IF DONE, RETURN TO CALLING PROGRAM
003D 3C               46          INR      A         ;ELSE, DO THE NEXT MESSAGE
```

```
003E 47            47           MOV    B,A      ;SAVE THE MESNO
003F FE09          48           CPI    9        ;CHECK FOR EXPECTED LOSS MESSAGE
0041 C24E00   C    49           JNZ    CONTIN   ;IF NOT EXPECTED LOSS, CONTINUE CHECKS
0044 3A0000   E    50           LDA    TRDR     ;ELSE, CHECK IF RANGE = 30 - 300
0047 E610          51           ANI    10H      ;MASK IN THE 30 - 300 BIT
0049 CA4D00   C    52           JZ     ITSOK    ;IF NOT 30 - 300 RANGE, DO THIS MESSAGE
004C 04            53           INR    B        ;DON'T PRINT EXPECTED LOSS IF RANGE = 30 - 300
004D 78            54 ITSOK:    MOV    A,B      ;RESTORE THE UPDATED MESNO
004E FE0A          55 CONTIN:   CPI    10       ;CHECK FOR END MODE
0050 CA0B01   C    56           JZ     CKNO     ;WHEN DOING END MODE, CHECK FOR 'NO' MESSAGES
0053 C30D00   C    57           JMP    NEXT     ;DO THE NEXT MESSAGE
0056 E5            58 GETM:     PUSH   H        ;SAVE THE MESSAGE POINTER
0057 C5            59           PUSH   B        ;SAVE THE PRINT BUFFER POINTER
0058 3A0000   E    60           LDA    MESNO    ;GET THE MESSAGE NUMBER
005B FE02          61           CPI    2        ;ARE WE DOING MESSAGE 2
005D CAF800   C    62           JZ     GID      ;IF YES, GET THE UNIT ID NUMBER
0060 FE03          63           CPI    3        ;ARE WE DOING MESSAGE 3
0062 CA9500   C    64           JZ     RANGE    ;IF YES, CHECK THE TEMP RANGE SELECTED
0065 FE04          65           CPI    4        ;ARE WE DOING MESSAGE 4
0067 CAC900   C    66           JZ     RATE     ;IF YES, CHECK THE DIST. RATE SELECTED
006A 210000   E    67           LXI    H,SPARD  ;ELSE, POINT TO THE SYSTEM PARAMETER DISPLACEMENT
006D D605          68           SUI    5        ;ADJUST THE POINTER KEY
006F 4F            69           MOV    C,A      ;SET UP THE B,C PAIR FOR ADD TO H,L
0070 AF            70           XRA    A
0071 47            71           MOV    B,A
0072 09            72           DAD    B        ;POINT TO THE SYSTEM PARAMETER
0073 4E            73           MOV    C,M      ;GET THE DISPLACEMENT FOR THIS PARAMETER
0074 23            74           INX    H
0075 7E            75           MOV    A,M      ;GET THE DISPLACEMENT FOR THE NEXT PARAMETER
0076 91            76           SUB    C        ;CALCULATE THE NUMBER OF CHARACTERS
0077 57            77           MOV    D,A      ;SAVE THE CHARACTER COUNT
0078 5F            78           MOV    E,A
0079 210000   E    79           LXI    H,SPART  ;POINT TO THE TOP OF THE SYSTEM PARAMETER TABLE
007C 09            80           DAD    B        ;POINT TO THE SYSTEM PARAMETER
007D C1            81 CONT:     POP    B        ;RESTORE THE PRINTER BUFFER POINTER
007E 7E            82 LOOP2:    MOV    A,M      ;GET A CHARACTER
007F 02            83           STAX   B        ;PUT IT IN THE PRINTER BUFFER
0080 23            84           INX    H        ;POINT TO THE NEXT CHARACTER
0081 03            85           INX    B        ;POINT TO THE NEXT POSITION IN THE PRINTER BUFFER
0082 15            86           DCR    D        ;DECREMENT THE CHARACTER COUNT
0083 C27E00   C    87           JNZ    LOOP2    ;IF NOT 0, GET THE NEXT CHARACTER
0086 E1            88           POP    H        ;RESTORE THE MESSAGE POINTER
0087 3A0000   E    89           LDA    CHARC    ;GET THE CHARACTER COUNTER
008A 83            90           ADD    E        ;SUM UP THE CHARACTERS
008B FE14          91           CPI    20       ;CHECK IF WE GOT ALL 20 CHARACTERS
008D CA3400   C    92           JZ     OUTIT    ;IF YES, OUTPUT THE MESSAGE TO THE PRINTER
0090 7E            93           MOV    A,M      ;ELSE, GET THE LAST CHARACTER FROM EPROM
0091 02            94           STAX   B        ;PUT IT IN THE PRINTER BUFFER
0092 C33400   C    95           JMP    OUTIT    ;GO PRINT IT
0095 1607          96 RANGE:    MVI    D,7      ;SET THE CHARACTER COUNT TO 7
0097 5A            97           MOV    E,D      ;SAVE THE COUNT
0098 3A0000   E    98           LDA    TRDR     ;GET THE TEMP RANGE SELECTED
009B 1F            99           RAR             ;LOOK AT THE LSB
009C DAB100   C    100          JC     RANG1    ;IF = 1, RANGE IS 0 - 300C
009F 1F            101          RAR             ;ELSE, LOOK AT THE NEXT BIT
00A0 DAB700   C    102          JC     RANG2    ;IF = 1, RANGE IS 0 - 400C
00A3 1F            103          RAR             ;ELSE, LOOK AT THE NEXT BIT
00A4 DABD00   C    104          JC     RANG3    ;IF = 1, RANGE IS 32 - 572F
00A7 1F            105          RAR             ;ELSE, LOOK AT THE NEXT BIT
00A8 DAC300   C    106          JC     RANG4    ;IF = 1, RANGE IS 32 - 752F
00AB 210000   E    107          LXI    H,RAN5   ;ELSE, RANGE MUST BE 30 - 300C
00AE C37D00   C    108          JMP    CONT
00B1 210000   E    109 RANG1:   LXI    H,RAN1   ;POINT TO THIS RANGE MESSAGE
00B4 C37D00   C    110          JMP    CONT
00B7 210000   E    111 RANG2:   LXI    H,RAN2
00BA C37D00   C    112          JMP    CONT
00BD 210000   E    113 RANG3:   LXI    H,RAN3
```

```
00C0 C37D00   C    114           JMP    CONT
00C3 210000   E    115 RANG4:    LXI    H,RAN4
00C6 C37D00   C    116           JMP    CONT
00C9 1609          117 RATE:     MVI    D,9      ;LOAD THE CHARACTER COUNT TO 9
00CB 5A            118           MOV    E,D      ;SAVE THE COUNT
00CC 3A0000   E    119           LDA    TRDR     ;GET THE DIST RATE BYTE
00CF 17           120           RAL              ;LOOK AT THE MSB
00D0 DAE200   C    121           JC     RATE1    ;IF = 1, RATE IS 9.0
00D3 17           122           RAL              ;ELSE, LOOK AT THE NEXT BIT
00D4 DAED00   C    123           JC     RATE2    ;IF = 1, RATE IS 6.0
00D7 210000   E    124           LXI    H,DR3    ;ELSE, RATE MUST BE 4.5
00DA 3E5A          125           MVI    A,90     ;CORRESPONDS TO A 1.111 SEC/STEP RATE
00DC 320000   E    126           STA    PINCT    ;SET THE PHASE INCREASING VALUE
00DF C37D00   C    127           JMP    CONT
00E2 210000   E    128 RATE1:    LXI    H,DR1
00E5 3E2D          129           MVI    A,45     ;CORRESPONDS TO A 0.555 SEC/STEP RATE
00E7 320000   E    130           STA    PINCT    ;SET THE PHASE INCREASING VALUE
00EA C37D00   C    131           JMP    CONT
00ED 210000   E    132 RATE2:    LXI    H,DR2
00F0 3E43          133           MVI    A,67     ;CORRESPONDS TO A 0.833 SEC/STEP RATE
00F2 320000   E    134           STA    PINCT    ;SET THE PHASE INCREASING VALUE
00F5 C37D00   C    135           JMP    CONT
00F8 210000   E    136 GID:      LXI    H,UID    ;POINT TO THE UNIT ID LOCATION
00FB 1603          137           MVI    D,3      ;LOAD THE CHARACTER COUNT TO 3
00FD 5A            138           MOV    E,D      ;SAVE THE COUNT
00FE C37D00   C    139           JMP    CONT
0101 77            140 LOAD:     MOV    M,A
0102 23            141           INX    H
0103 05            142           DCR    B
0104 C20101   C    143           JNZ    LOAD
0107 CD0000   E    144           CALL   PRINT
010A C9            145           RET
010B 3A0300   E    146 CKNO:     LDA    EATT+3   ;CHECK END AT TEMP FOR 'NO' MESSAGE
010E FE4F          147           CPI    'O'
0110 C22801   C    148           JNZ    SET10    ;IF NOT 'NO', SET MESNO = 10
0113 3A0300   E    149           LDA    EATDP+3  ;CHECK END AT D.P. FOR 'NO' MESSAGE
0116 FE4F          150           CPI    'O'
0118 C23F01   C    151           JNZ    SET11    ;IF NOT 'NO', SET MESNO = 11
011B 3A0200   E    152           LDA    EATREC+2 ;CHECK END AT % REC FOR 'NO' MESSAGE
011E FE4F          153           CPI    'O'
0120 C24401   C    154           JNZ    SET12    ;IF NOT 'NO', SET MESNO = 12
0123 3E0D          155           MVI    A,13     ;ELSE, END AT END POINT
0125 C30D00   C    156           JMP    NEXT     ;SET MESNO = 13
0128 3A0000   E    157 SET10:    LDA    TRDR     ;CHECK THE RANGE SELECTED
012B E60C          158           ANI    0CH      ;MASK IN THE RANGES
012D CA3A01   C    159           JZ     CENT     ;IF 0, MUST BE CENTIGRADE RANGE
0130 3E46          160           MVI    A,'F'    ;ELSE, MUST BE FAHRENHEIT RANGE
0132 320300   E    161 UPEATT:   STA    EATT+3   ;UPDATE THE UNITS
0135 3E0A          162           MVI    A,10
0137 C30D00   C    163           JMP    NEXT
013A 3E43          164 CENT:     MVI    A,'C'
013C C33201   C    165           JMP    UPEATT
013F 3E0B          166 SET11:    MVI    A,11
0141 C30D00   C    167           JMP    NEXT
0144 3E0C          168 SET12:    MVI    A,12
0146 C30D00   C    169           JMP    NEXT
0149 210A70        170 PSYNC:    LXI    H,700AH  ;WANT TO ISSUE A LINE FEED &
014C 0602          171           MVI    B,2      ;CLEAR THE PRINTER BUFFER
014E 0E0A          172           MVI    C,0AH    ;THIS IS THE LINE FEED CODE
0150 7E            173 PLOOP1:   MOV    A,M      ;GET THE PRINTER STATUS BYTE
0151 E601          174           ANI    1        ;MASK IN THE BUSY FLAG
0153 C25001   C    175           JNZ    PLOOP1   ;WAIT TILL NOT BUSY
0156 79            176           MOV    A,C      ;GET THE CODE TO OUTPUT
0157 320870        177           STA    7008H    ;OUTPUT IT
015A 7E            178 PLOOP2:   MOV    A,M      ;GET THE STATUS BYTE
015B E601          179           ANI    1        ;MASK IN THE BUSY FLAG
015D CA5A01   C    180           JZ     PLOOP2   ;WAIT TILL BUSY
```

```
0160 3E80           181         MVI   A,80H    ;TAKE AWAY THE STROBE
0162 320870         182         STA   7008H    ;OUTPUT IT
0165 0E1B           183         MVI   C,1BH    ;THIS IS THE CLEAR BUFFER CODE
0167 05             184         DCR   B        ;ARE WE DONE
0168 C25001  C      185         JNZ   PLOOP1   ;GO OUTPUT THE CLEAR BUFFER CODE
016B C9             186         RET
0000         C      187         END   PFOR
```

PUBLIC SYMBOLS
PFOR   C 0000   PSYNC  C 0149

EXTERNAL SYMBOLS
BLANK  E 0000   CHARC  E 0000   DDATE  E 0000   DR1    E 0000   DR2    E 0000   DR3   E 0000
EATDP  E 0000   EATREC E 0000   EATT   E 0000   MESNO  E 0000   PINCT  E 0000   PLOOP E 0000
PMDC   E 0000   PMES   E 0000   PMES32 E 0000   PRINT  E 0000   PRINTB E 0000   RAN1  E 0000
RAN2   E 0000   RAN3   E 0000   RAN4   E 0000   RAN5   E 0000   SPARD  E 0000   SPART E 0000
TRDR   E 0000   UID    E 0000

USER SYMBOLS
BLANK  E 0000   CENT   C 013A   CHARC  E 0000   CKNO   C 010B   CONT   C 007D   CONTIN C 004E
DDATE  E 0000   DR1    E 0000   DR2    E 0000   DR3    E 0000   EATDP  E 0000   EATREC E 0000
EATT   E 0000   GETM   C 0056   GID    C 00F8   ITSOK  C 004D   LOAD   C 0101   LOOP1  C 0023
LOOP2  C 007E   MESNO  E 0000   NEXT   C 000D   OUTIT  C 0034   PFOR   C 0000   PINCT  E 0000
PLOOP  E 0000   PLOOP1 C 0150   PLOOP2 C 015A   PMDC   E 0000   PMES   E 0000   PMES32 E 0000
PRINT  E 0000   PRINTB E 0000   PSYNC  C 0149   RAN1   E 0000   RAN2   E 0000   RAN3   E 0000
RAN4   E 0000   RAN5   E 0000   RANG1  C 00B1   RANG2  C 00B7   RANG3  C 00BD   RANG4  C 00C3
RANGE  C 0095   RATE   C 00C9   RATE1  C 00E2   RATE2  C 00ED   SET10  C 0128   SET11  C 013F
SET12  C 0144   SPARD  E 0000   SPART  E 0000   TRDR   E 0000   UID    E 0000   UPEATT C 0132

```
                     1  $          TITLE('PRINTER DRIVER ROUTINE') PAGEWIDTH(105) DEBUG
                     2                          ;WRITTEN 10/11/79
                     3                          ;UPDATED 12/03/81
                     4                          ;THIS ROUTINE OUTPUTS A 20 CHARACTER PRINTER
                     5                          ;BUFFER TO THE PRINTER. ALSO THE TRAMSMIT DATA
                     6                          ;TABLE IS LOADED WITH ALL THE PRINTED DATA. THIS
                     7                          ;IS DONE FOR THE RS232C COMMUNICATION CHANNEL.
                     8          PUBLIC  PRINT
                     9          EXTRN   PRINTB,TXDP,TXDT
                    10          CSEG
0000 210000  E      11  PRINT:  LXI   H,PRINTB ;POINT TO THE PRINTER BUFFER
0003 110870         12          LXI   D,7008H  ;POINT TO THE PRINTER OUTPUT PORT
0006 0614           13          MVI   B,20     ;LOAD THE BUFFER COUNTER
0008 7E             14  LOOP1:  MOV   A,M      ;GET A CHARACTER
0009 E67F           15          ANI   7FH      ;ADD IN THE STROBE
000B 4F             16          MOV   C,A      ;SAVE THE CHARACTER
000C E5             17          PUSH  H        ;SAVE THE PRINTER BUFFER POINTER
000D 2A0000  E      18          LHLD  TXDP     ;GET THE TRANSMIT DATA TABLE POINTER
0010 71             19          MOV   M,C      ;PUT THIS CHARACTER IN THE TABLE
0011 23             20          INX   H        ;POINT TO THE NEXT POSITION
0012 3603           21          MVI   M,3      ;INSERT THE END OF TEXT (ETX)
0014 220000  E      22          SHLD  TXDP     ;UPDATE THE TRAMSMIT DATA TABLE POINTER
0017 210A70         23          LXI   H,700AH  ;POINT TO THE PRINTER STATUS PORT
001A 7E             24  LOOP2:  MOV   A,M      ;GET THE STATUS BYTE
001B E601           25          ANI   1        ;MASK IN THE PRINTER BUSY FLAG
001D C21A00  C      26          JNZ   LOOP2    ;WAIT TILL NOT BUSY
0020 79             27          MOV   A,C      ;GET THE CHARACTER
0021 12             28          STAX  D        ;OUTPUT IT
0022 7E             29  LOOP3:  MOV   A,M      ;GET THE STATUS BYTE
0023 E601           30          ANI   1        ;MASK IN THE PRINTER BUSY FLAG
0025 CA2200  C      31          JZ    LOOP3    ;WAIT TILL BUSY
0028 3E80           32          MVI   A,80H    ;TAKE THE STROBE AWAY
002A 12             33          STAX  D
002B E1             34          POP   H        ;RESTORE THE PRINTER BUFFER POINTER
002C 23             35          INX   H        ;POINT TO THE NEXT CHARACTER
002D 05             36          DCR   B        ;BUMP THE BUFFER COUNTER
002E C20800  C      37          JNZ   LOOP1    ;GO DO ANOTHER CHARACTER
0031 C9             38          RET
0000         C      39          END   PRINT
```

PUBLIC SYMBOLS
PRINT   C 0000

EXTERNAL SYMBOLS
PRINTB  E 0000      TXDP    E 0000      TXDT    E 0000

USER SYMBOLS
LOOP1   C 0008      LOOP2   C 001A      LOOP3   C 0022      PRINT   C 0000      PRINTB  E 0000      TXDP    E 0000
TXDT    E 0000

```
                        1 $      TITLE('INTERRUPT RST5.5 SERVICE ROUTINE') PAGEWIDTH(105) MOD85 DEBUG
                        2                ;WRITTEN 10/30/79
                        3                ;UPDATED 05/03/82
                        4                ;THIS ROUTINE IS EXECUTED BY THE DROP DETECTOR
                        5                ;CIRCUIT.
                        6        PUBLIC  RST55,RST55C
                        7        EXTRN   IBUF,PRINT,TEMPL,TV,TVP,EOT,SEPVOL,VOLCAL,PRINTB,H5L
                        8        EXTRN   H5M,IPSL,IPSM,CNTL2,PINCT,PHASE,R75SW,S5MIN,R55SW
                        9        EXTRN   R65SW,DPTIME,IMASK,EMODE,VOL,SATEMP,DBUF,MULTPY
                       10        EXTRN   BINBCD,UNPAK,PMES1,PMES16,PMES23,CONT,LAGTBL,TRDP
                       11        CSEG
0000 F5                12 RST55  PUSH    PSW       ;SAVE ALL REGISTERS AND FLAGS
0001 C5                13        PUSH    B
0002 D5                14        PUSH    D
0003 E5                15        PUSH    H
0004 110100            16        LXI     D,1
0007 2190FF            17        LXI     H,65424   ;2MS DELAY COUNT
000A 3A0A70            18 WLOOP  LDA     700AH     ;GET THE DROP DETECTOR STATUS BYTE
000D E620              19        ANI     20H       ;MASK IN THE DROP DETECTOR BIT
000F CA1C01  C         20        JZ      FDROP     ;DISREGARD IF IT IS A FALSE DROP
0012 19                21        DAD     D         ;WAIT FOR 2MS TO FILTER OUT FALSE DROP DETECTION
0013 D20A00  C         22        JNC     WLOOP
0016 3A0000  E         23        LDA     R55SW     ;GET THE RST5.5 INTERRUPT SWITCH
0019 1F                24        RAR               ;CHECK BIT 0
001A DA2601  C         25        JC      RST55B    ;IF = 1, DO THE NORMAL D.P. SERVICE ROUTINE
001D 1F                26        RAR               ;CHECK BIT 1
001E DA4101  C         27        JC      RST55C    ;IF = 1, DO THE MANUAL D.P. SERVICE ROUTINE
0021 3E01              28        MVI     A,1       ;GET PEN DOWN CONTROL BYTE
0023 320B70            29        STA     700BH     ;LOWER THE PEN
0026 3E04              30        MVI     A,4       ;USE THIS SERVICE ROUTINE TILL THE POWER IS RELEASED
0028 320000  E         31        STA     R65SW     ;USED FOR HOLDING THE POWER FOR 1"
002B 3E19              32        MVI     A,19H     ;AFTER DETECTING THE FIRST DROP, SET THE INTERRUPT
002D 320000  E         33        STA     IMASK     ;MASK TO ENABLE RST6.5 & RST7.5
0030 210000  E         34        LXI     H,PMES1   ;POINT TO THE IBP MESSAGE
0033 110000  E         35        LXI     D,PRINTB  ;POINT TO THE PRINTER BUFFER
0036 0605              36        MVI     B,5       ;LOAD THE LOOP COUNTER
0038 CD1301  C         37        CALL    LOOP      ;GET SOME CHARACTERS
003B 110A00  E         38        LXI     D,PRINTB+10
003E 3A0A00  E         39        LDA     IBUF+10   ;GET THE TEMP RANGE UNITS FROM THE INSERT BUFFER
0041 12                40        STAX    D
0042 13                41        INX     D
0043 7E                42        MOV     A,M       ;GET A BLANK FROM PMES1
0044 12                43        STAX    D         ;PUT IT IN THE PRINT BUFFER
0045 23                44        INX     H
0046 13                45        INX     D
0047 3A0000  E         46        LDA     IBUF      ;GET THE ASCII TIME DIGIT # 2
004A FE30              47        CPI     '0'       ;CHECK FOR AN ASCII 0
004C C25100  C         48        JNZ     SKIP      ;IF NOT 0, SKIP DOWN
004F 3E20              49        MVI     A,' '     ;IF 0, PUT A BLANK IN
0051 12                50 SKIP   STAX    D
0052 13                51        INX     D
0053 3A0100  E         52        LDA     IBUF+1
0056 12                53        STAX    D
0057 13                54        INX     D
0058 7E                55        MOV     A,M       ;GET THE ':' FROM EPROM
0059 12                56        STAX    D
005A 320800  E         57        STA     PRINTB+8
```

```
005D 23            58        INX      H
005E 13            59        INX      D
005F 3A0300   E    60        LDA      IBUF+2    ;GET THE LAST ASCII TIME DIGIT
0062 12            61        STAX     D
0063 13            62        INX      D
0064 0604          63        MVI      B,4       ;GET THE ASCII MIN FROM EPROM
0066 CD1301   C    64        CALL     LOOP
0069 211370        65        LXI      H,7013H   ;POINT TO THE TIMER CONTROL PORT
006C 3614          66        MVI      M,14H     ;SET TIMER 0 TO MODE 2
006E 211070        67        LXI      H,7010H   ;POINT TO TIMER 0 DATA PORT
0071 3A0000   E    68        LDA      PINCT     ;GET THE PHASE INCREASING TIME VALUE
0074 77            69        MOV      M,A       ;LOAD TIMER 0 WITH THIS VALUE
0075 211770        70        LXI      H,7017H   ;POINT TO THE CLOCK CONTROL PORT
0078 36B4          71        MVI      M,0B4H    ;SET COUNTER 2 TO MODE 2, USED FOR RATE CALCULATIONS
007A 2B            72        DCX      H         ;POINT TO COUNTER 2 DATA PORT
007B 3620          73        MVI      M,20H     ;LOAD TIMER 2 TO 64800 COUNTS
007D 36FD          74        MVI      M,0FDH    ;THESE COUNTS ARE WITH A 60 OR 50 HZ CLOCK
007F 3A0000   E    75        LDA      TRDR      ;WANT TO CHECK IF IN LAG MODE
0082 E6F0          76        ANI      0F0H      ;MASK OUT OTHER RANGES
0084 FE20          77        CPI      20H
0086 C29800   C    78        JNZ      NLAG      ;JUMP IF NOT LAG MODE
0089 210F00   E    79        LXI      H,LAGTBL+15;WANT TO PRINT THE TEMP 8 SEC AGO
008C 46            80        MOV      B,M       ;GET THE BINARY CENTIGRADE MSB'S 8 SEC AGO
008D 2B            81        DCX      H
008E 4E            82        MOV      C,M       ;GET THE BINARY CENTIGRADE LSB'S 8 SEC AGO
008F CD0000   E    83        CALL     CONT      ;USE THIS SUBROUTINE IN CNTL2 TO DO THE CONVERSION
0092 2A0E00   E    84        LHLD     LAGTBL+14;GET THE LAG TEMP 8 SEC AGO & PUT IN TV TABLE
0095 C39B00   C    85        JMP      TRAP1     ;IN LAG MODE, TV TABLE WILL HAVE ALL LAG TEMPS
0098 2A0000   E    86 NLAG   LHLD     TEMPL     ;GET THE ACTUAL TEMP
009B EB            87 TRAP1  XCHG               ;PUT THE TEMP IN THE D,E PAIR
009C 210000   E    88        LXI      H,TV      ;POINT TO THE TEMPERATURE VOLUME TABLE
009F 73            89        MOV      M,E       ;STORE THE LSB'S IN THE TABLE
00A0 23            90        INX      H
00A1 72            91        MOV      M,D       ;STORE THE TEMP MSB'S IN THE TABLE
00A2 23            92        INX      H
00A3 3A0000   E    93        LDA      VOL       ;GET THE VOLUME COUNT
00A6 FE01          94        CPI      1         ;IF DRAINAGE RESULTS IN SOME VOLUME, PUT THE IBP
00A8 CAB200   C    95        JZ       ST1ML     ;IN THE TV TABLE AT THE 1ML SLOTS
00AB DAB600   C    96        JC       SKIP4     ;IF < 1ML, DON'T PUT ANY MORE TEMPS IN TV TABLE
00AE 73            97        MOV      M,E       ;ELSE, AT 2ML MARK AND WANT TO PUT THE IBP IN THE
00AF 23            98        INX      H         ;1ML & 2ML SLOTS IN THE TV TABLE
00B0 72            99        MOV      M,D
00B1 23           100        INX      H
00B2 73           101 ST1ML  MOV      M,E
00B3 23           102        INX      H
00B4 72           103        MOV      M,D
00B5 23           104        INX      H
00B6 220000   E   105 SKIP4  SHLD     TVP       ;SAVE THE TEMP VOL TABLE POINTER
00B9 3A0000   E   106        LDA      S5MIN     ;CHECK IF THE 5 MIN HEAT IS DONE ALREADY
00BC 1F           107        RAR
00BD DAD100   C   108        JC       SKIP2     ;IF DONE ALREADY, DON'T SET IT
00C0 211170       109        LXI      H,7011H   ;NOW WANT TO LOWER THE HEAT
00C3 3A0000   E   110        LDA      H5L       ;GET THE 5 MINUTE HEAT SETTING LSB'S
00C6 320000   E   111        STA      IPSL      ;UPDATE THE POWER SETTING
00C9 77           112        MOV      M,A       ;LOAD THE COUNTER LSB'S
00CA 3A0000   E   113        LDA      H5M       ;GET THE 5 MINUTE HEAT SETTING MSB'S
00CD 320000   E   114        STA      IPSM
00D0 77           115        MOV      M,A
00D1 CD0000   E   116 SKIP2  CALL     PRINT     ;PRINT THE IBP MESSAGE
00D4 3A0000   E   117        LDA      EMODE     ;CHECK THE END MODE BYTE TO TILT THE GRADUATE
00D7 1F           118        RAR                ;OR NOT TO TILT IT
00D8 1F           119        RAR                ;IF END AT D.P. DON'T TILT
00D9 DAE700   C   120        JC       SKIP3
00DC 3A0000   E   121        LDA      PHASE     ;WANT TO TURN ON THE GRADUATE SOLENOID
00DF F620         122        ORI      20H       ;SET THE GRADUATE BIT ON
00E1 320000   E   123        STA      PHASE     ;UPDATE THE PHASE BYTE
00E4 320A70       124        STA      700AH     ;OUTPUT THE CONTROL BYTE
```

```
00E7 110100        125 SKIP3    LXI    D,1
00EA 2194FC        126          LXI    H,64660 ;WANT TO DELAY 7 MS FOR TIMER 0 TO LOAD
00ED 19            127 WAIT     DAD    D
00EE D2ED00   C    128          JNC    WAIT
00F1 3E4D          129          MVI    A,'M'   ;CORRECT THE INSERT BUFFER TO SHOW 'ML'
00F3 320200   E    130          STA    IBUF+2  ;CORRECT THE PRINT BUFFER TO SHOW 'ML'
00F6 320200   E    131          STA    PRINTB+2
00F9 3E4C          132          MVI    A,'L'
00FB 320300   E    133          STA    IBUF+3
00FE 320300   E    134          STA    PRINTB+3
0101 3E20          135          MVI    A,' '
0103 320400   E    136          STA    IBUF+4
0106 3A0000   E    137          LDA    IMASK   ;GET THE INTERRUPT MASK
0109 30            138          SIM            ;SET THE INTERRUPT MASK
010A E1            139          POP    H       ;RESTORE ALL REGISTERS AND FLAGS
010B D1            140          POP    D
010C C1            141          POP    B
010D F1            142          POP    PSW
010E F1            143          POP    PSW     ;POP THE RETURN ADDRESS OFF THE STACK
010F FB            144          EI             ;ENABLE INTERRUPTS
0110 C30000   E    145          JMP    CNTL2   ;NOW WANT TO DO THE RATE CONTROL
0113 7E            146 LOOP     MOV    A,M     ;GET A CHARTACTER FROM MESSAGE # 1
0114 12            147          STAX   D       ;PUT IT IN THE PRINT BUFFER
0115 23            148          INX    H       ;POINT TO THE NEXT CHARACTER
0116 13            149          INX    D       ;POINT TO THE NEXT PRINT BUFFER POSITION
0117 05            150          DCR    B       ;BUMP THE LOOP COUNTER
0118 C21301   C    151          JNZ    LOOP
011B C9            152          RET
011C 3A0000   E    153 FDROP    LDA    IMASK   ;GET THE INTERRUPT MASK
011F 30            154          SIM
0120 E1            155          POP    H       ;RESTORE ALL REGISTERS AND FLAGS
0121 D1            156          POP    D
0122 C1            157          POP    B
0123 F1            158          POP    PSW
0124 FB            159          EI             ;ENABLE INTERRUPTS
0125 C9            160          RET
0126 2A0000   E    161 RST55B   LHLD   DPTIME  ;WHEN ENDING AT D.F. WANT TO RELOAD TIMER 0
0129 EB            162          XCHG           ;WITH THE PROGRAMMED DROP TIME LIMIT
012A 211370        163          LXI    H,7013H ;POINT TO THE TIMER CONTROL PORT
012D 3634          164          MVI    M,34H   ;SET TIMER 0 TO MODE 2
012F 211070        165          LXI    H,7010H ;POINT TO TIMER 0 DATA PORT
0132 73            166          MOV    M,E     ;IF THIS TIMER TIMES OUT, THE DRY POINT IS DETECTED
0133 72            167          MOV    M,D
0134 110100        168          LXI    D,1
0137 2194FC        169          LXI    H,64660
013A 19            170 WAIT2    DAD    D       ;WAIT FOR TIMER 0 TO LOAD
013B D23A01   C    171          JNC    WAIT2
013E C31C01   C    172          JMP    FDROP   ;ENABLE AND RETURN
0141 211370        173 RST55C   LXI    H,7013H ;POINT TO THE TIMER CONTROL PORT
0144 3600          174          MVI    M,0     ;LATCH THE PRESENT TIME IN TIMER 0
0146 211070        175          LXI    H,7010H ;POINT TO TIMER 0 DATA PORT
0149 5E            176          MOV    E,M     ;GET TIMER 0 LSB'S
014A 56            177          MOV    D,M     ;GET TIMER 0 MSB'S
014B 2A0000   E    178          LHLD   DPTIME  ;GET THE PROGRAMMED DROP TIME
014E 7D            179          MOV    A,L     ;WANT TO FIND THE TIME BETWEEN THE LAST TWO DROPS
014F 93            180          SUB    E       ;DO PROGRAMMED DROP TIME - PRESENT TIME
0150 4F            181          MOV    C,A
0151 7C            182          MOV    A,H     ;RST55C IS EXECUTED FOR AUTO & MAN DRY POINTS
0152 9A            183          SBB    D
0153 47            184          MOV    B,A     ;B,C = TIME BETWEEN THE LAST TWO DROPS
0154 210100   E    185          LXI    H,DBUF+1;WANT TO CONVERT THIS TIME IN COUNTS TO SECONDS
0157 3605          186          MVI    M,5     ;BY MULTIPLYING BY 1280
0159 23            187          INX    H       ;SO SET UP THE DATA BUFFER FOR THE MULTIPLY
015A 3600          188          MVI    M,0
015C 23            189          INX    H
015D 70            190          MOV    M,B
015E 23            191          INX    H
```

```
015F 71           192         MOV    M,C
0160 CD0000  E    193         CALL   MULTPY   ;DO THE MULTIPLY
0163 CD0000  E    194         CALL   BINBCD   ;CONVERT THE RESULT TO BCD
0166 210000  E    195         LXI    H,PMES23;POINT TO THE DROP TIME MESSAGE
0169 110000  E    196         LXI    D,PRINTB;POINT TO THE PRINT BUFFER
016C 0614         197         MVI    B,20
016E CD1301  C    198         CALL   LOOP     ;GO LOAD THIS MESSAGE IN THE PRINT BUFFER
0171 210200  E    199         LXI    H,DBUF+2;POINT TO THE PACKED DROP TIME
0174 46           200         MOV    B,M      ;GET THE PACKED DROP TIME
0175 23           201         INX    H        ;WANT TO CHECK ON ROUND UP DIGIT
0176 7E           202         MOV    A,M
0177 E6F0         203         ANI    0F0H     ;MASK IN THE ROUND UP DIGIT
0179 FE40         204         CPI    40H
017B DABD01  C    205         JC     RUP      ;IF THIS DIGIT IS = OR > 5, ROUND UP
017E 78           206 DRUP    MOV    A,B
017F CD0000  E    207         CALL   UNPAK    ;UNPACK THE LEFT DIGIT
0182 210E00  E    208         LXI    H,PRINTB+14;PUT IT IN THE PRINT BUFFER
0185 77           209         MOV    M,A
0186 23           210         INX    H
0187 23           211         INX    H        ;POINT TO THE LOCATION FOR THE TENTHS DIGIT
0188 78           212         MOV    A,B      ;GET THE PACKED TIME AGAIN
0189 E60F         213         ANI    0FH      ;MASK IN THE TENTHS BCD DIGIT
018B C630         214         ADI    30H      ;MAKE IT ASCII
018D 77           215         MOV    M,A      ;PUT IT IN THE PRINT BUFFER
018E CD0000  E    216         CALL   PRINT    ;GO PRINT THE DROP TIME MESSAGE
0191 210400  E    217         LXI    H,IBUF+4;POINT TO THE PRESENT TEMP IN IBUF
0194 110600  E    218         LXI    D,PRINTB+6
0197 CDC501  C    219         CALL   SLOOP
019A CD0000  E    220         CALL   VOLCAL   ;GO CALCULATE THE PRESENT VOLUME
019D CD0000  E    221         CALL   SEPVOL   ;SAVE THE END POINT ASCII VOLUME
01A0 210000  E    222         LXI    H,PMES16;POINT TO THE DRY POINT MESSAGE
01A3 110D00  E    223         LXI    D,PRINTB+13
01A6 CDC501  C    224         CALL   SLOOP
01A9 CD0000  E    225         CALL   PRINT    ;GO PRINT THE DRY POINT
01AC 210400  E    226         LXI    H,IBUF+4;POINT TO THE PRESENT TEMP
01AF 110000  E    227         LXI    D,SATEMP;WANT TO SAVE THIS ASCII TEMP
01B2 CDC501  C    228         CALL   SLOOP    ;GO SAVE THIS ASCII TEMP
01B5 E1           229         POP    H
01B6 D1           230         POP    D
01B7 C1           231         POP    B
01B8 F1           232         POP    PSW
01B9 F1           233         POP    PSW      ;REMOVE THE RETURN ADDRESS OFF THE STACK
01BA C30000  E    234         JMP    EOT      ;GO DO THE END OF TEST ROUTINE
01BD 78           235 RUP     MOV    A,B      ;DO THE ROUND UP
01BE C601         236         ADI    1
01C0 27           237         DAA
01C1 47           238         MOV    B,A
01C2 C37E01  C    239         JMP    DRUP
01C5 0607         240 SLOOP   MVI    B,7
01C7 7E           241 LLOOP   MOV    A,M
01C8 12           242         STAX   D
01C9 23           243         INX    H
01CA 13           244         INX    D
01CB 05           245         DCR    B
01CC C2C701  C    246         JNZ    LLOOP
01CF C9           247         RET
0000         C    248         END    RST55
```

PUBLIC SYMBOLS
RST55  C 0000    RST55C C 0141

EXTERNAL SYMBOLS
BINBCD E 0000   CNTL2  E 0000   CONT   E 0000   DBUF   E 0000   DPTIME E 0000   EMODE  E 0000
EOT    E 0000   H5L    E 0000   H5M    E 0000   IBUF   E 0000   IMASK  E 0000   IPSL   E 0000
IPSM   E 0000   LAGTBL E 0000   MULTPY E 0000   PHASE  E 0000   PINCT  E 0000   PMES1  E 0000
PMES16 E 0000   PMES23 E 0000   PRINT  E 0000   PRINTB E 0000   R55SW  E 0000   R65SW  E 0000
R75SW  E 0000   S5MIN  E 0000   SATEMP E 0000   SEPVOL E 0000   TEMPL  E 0000   TRDR   E 0000
TV     E 0000   TVP    E 0000   UNPAK  E 0000   VOL    E 0000   VOLCAL E 0000

| USER SYMBOLS | | | | | | | | | | | |
|---|---|---|---|---|---|---|---|---|---|---|---|
| BINBCD | E 0000 | CNTL2 | E 0000 | CONT | E 0000 | DBUF | E 0000 | DPTIME | E 0000 | DRUP | C 017E |
| EMODE | E 0000 | EOT | E 0000 | FDROP | C 011C | H5L | E 0000 | H5M | E 0000 | IBUF | E 0000 |
| IMASK | E 0000 | IPSL | E 0000 | IPSM | E 0000 | LAGTBL | E 0000 | LLOOP | C 01C7 | LOOP | C 0113 |
| MULTPY | E 0000 | NLAG | C 0098 | PHASE | E 0000 | PINCT | E 0000 | PMES1 | E 0000 | PMES16 | E 0000 |
| PMES23 | E 0000 | PRINT | E 0000 | PRINTB | E 0000 | R55SW | E 0000 | R65SW | E 0000 | R75SW | E 0000 |
| RST55 | C 0000 | RST55B | C 0126 | RST55C | C 0141 | RUP | C 01BD | S5MIN | E 0000 | SATEMP | E 0000 |
| SEPVOL | E 0000 | SKIP | C 0051 | SKIP2 | C 00D1 | SKIP3 | C 00E7 | SKIP4 | C 00B6 | SLOOP | C 01C5 |
| ST1ML | C 00B2 | TEMPL | E 0000 | TRAP1 | C 009B | TRDR | E 0000 | TV | E 0000 | TVF | E 0000 |
| UNPAK | E 0000 | VOL | E 0000 | VOLCAL | E 0000 | WAIT | C 00ED | WAIT2 | C 013A | WLOOP | C 000A |

```
               1 *          TITLE/ INTERRUPT RST6.5 SERVICE ROUTINE  PAGEWIDTH-105  MODS  DEBUG
               2                      ;WRITTEN 10/21/79
               3                      ;UPDATED 12/07/81
               4                      ;THIS ROUTINE IS EXECUTED BY THE MENISCUS DETECTOR
               5         PUBLIC   RST65,DIVD1,DIVD2,MULC1,MULC2
               6         EXTRN    STEPC,S12C,RCSW,DIVP,TVF,EINBCD,DBUF,DIR,DIVIDE,IPSL,IPSM
               7         EXTRN    MAXL,MAXM,MINL,MINM,MULTPY,MOTOR,PINC,TEMPL,VOL,R75SW
               8         EXTRN    UNPAK,PUNAY,TMTF,PRINTB,SDBUF,RDBUF,PRINT,R65SW,IMASK
               9         EXTRN    PLOOP,EDITOR,IBUF,PHASE,PMES1,PMES23,PMES16
              10         EXTRN    TRDR,LAGTBL,MULP
              11         CSEG
0000 00       12 DIVD1   DB       0,60H,0D0H,0     ;DIVIDEND 7,200,000 FOR 10 ML @ 60HZ
0001 60
0002 D0
0003 00
0004 00       13 DIVD2   DB       0,5BH,8DH,80H    ;DIVIDEND 6,000,000 FOR 10 ML @ 50HZ
0005 5B
0006 8D
0007 80
0008 3D20     14 MULC1   DW       8000             ;MULTIPLY CONSTANT FOR TIME @ 60HZ
000A 1027     15 MULC2   DW       10000            ;MULTIPLY CONSTANT FOR TIME @ 50HZ
000C F5       16 RST65   PUSH     PSW              ;SAVE ALL REGISTERS AND FLAGS
000D C5       17         PUSH     B
000E D5       18         PUSH     D
000F E5       19         PUSH     H
0010 CD0000 E 20         CALL     SDBUF            ;SAVE THE DATA BUFFER
0013 3A0A70   21         LDA      700AH            ;GET THE LIMIT SWITCH STATUS BYTE
0016 E604     22         ANI      4                ;MASK IN THE UPPER LIMIT SWITCH
0018 CA5F02 C 23         JZ       ULSE             ;IF AT ULS, PRINT OUT ERROR
001B AF       24         XRA      A
001C 320000 E 25         STA      DIR              ;SET DIRECTION TO UP
001F 320000 E 26         STA      TMTF             ;ZERO THE TIME TRAP COUNT
0022 320000 E 27         STA      PUNAY            ;ZERO THE RUN AWAY TRAP COUNT
0025 CD0000 E 28         CALL     MOTOR            ;STEP THE MOTOR
0028 3A0000 E 29         LDA      R65SW            ;GET THE INTERRUPT RST6.5 SWITCH
002B 1F       30         RAR                       ;CHECK IF IT IS =1
002C DA1602 C 31         JC       RST65B           ;IF =1, DO ANOTHER SERVICE ROUTINE
002F 1F       32         RAR                       ;LOOK AT BIT 1
0030 DA4402 C 33         JC       RST65C           ;IF =1, DO NEXT SERVICE ROUTINE
0033 1F       34         RAR                       ;LOOK AT BIT 2
0034 DA6300 C 35         JC       RST65D           ;WANT TO MAINTAIN THE POWER DON'T RELEASE +5
0037 3E09     36         MVI      A,9              ;ENABLE RST6.5 & RST7.5
0039 320000 E 37         STA      IMASK            ;UPDATE THE INTERRUPT MASK
003C 3A0000 E 38         LDA      PINC             ;GET THE PHASE ANGLE INCREASING CONSTANT
003F 5F       39         MOV      E,A              ;SAVE IT
0040 3A0000 E 40         LDA      IPSL             ;GET THE PRESENT POWER SETTING
0043 83       41         ADD      E                ;ADD THE DECREASING CONSTANT
0044 5F       42         MOV      E,A              ;SAVE THE RESULT IN THE D,E PAIR
0045 3A0000 E 43         LDA      IPSM
0048 CE00     44         ACI      0                ;DO A DOUBLE PRECISION ADD
004A 57       45         MOV      D,A
004B 3A0000 E 46         LDA      MAXL             ;DO MAXIMUM COUNTS - CALCULATED COUNTS
004E 93       47         SUB      E
004F 3A0000 E 48         LDA      MAXM
0052 9A       49         SBB      D
0053 DA8601 C 50         JC       FMAX             ;IF CARRY =1, FORCE MAXIMUM COUNTS
0056 211170   51 UPDATE  LXI      H,7011H          ;ELSE CALCULATED COUNTS ARE #
```

| | | | | | | |
|---|---|---|---|---|---|---|
| 0059 7B | | 52 | | MOV | A,E | |
| 005A 72 | | 53 | | MOV | M,E | ;UPDATE THE PHASE CONTROL TIMER COUNTS |
| 005B 320000 | E | 54 | | STA | IPSL | |
| 005E 7A | | 55 | | MOV | A,D | |
| 005F 72 | | 56 | | MOV | M,D | |
| 0060 320000 | E | 57 | | STA | IPSM | |
| 0063 2A0000 | E | 58 | FST650 | LHLD | STEPC | ;GET THE STEP COUNTER |
| 0066 23 | | 59 | | INX | H | ;BUMP IT |
| 0067 220000 | E | 60 | | SHLD | STEPC | ;UPDATE IT |
| 006A 22 1A70 | | 61 | | SHLD | 701AH | ;OUTPUT TO THE Y-AXIS RECORDER |
| 006D 7D | | 62 | | MOV | A,L | ;HOLD THE RELEASE FOR 1% WHEN FIRST DROP DETECTED |
| 006E FE0C | | 63 | | CPI | 12 | ;CHECK FOR 12 STEPS = 1% |
| 0070 C28000 | C | 64 | | JNZ | TRAP1 | ;IF NOT = TO 12 STEPS, JUMP |
| 0073 7C | | 65 | | MOV | A,H | ;MUST CHECK BOTH BYTES |
| 0074 FE00 | | 66 | | CPI | 0 | |
| 0076 C28000 | C | 67 | | JNZ | TRAP1 | |
| 0079 320000 | E | 68 | | STA | P65SW | ;WHEN = 1% RELEASE THE PHASE ANGLE |
| 007C 3C | | 69 | | INR | A | |
| 007D 320000 | E | 70 | | STA | R75SW | ;THIS SERVICE ROUTINE RELEASES THE POWER |
| 0080 3A0000 | E | 71 | TRAP1 | LDA | TRDR | ;CHECK FOR 4 5ML/MIN AND NOT 30 - 3000 RANGE |
| 0083 E630 | | 72 | | ANI | 30H | ;MASK IN 4 5 & 30 - 300 BITS |
| 0085 FE20 | | 73 | | CPI | 20H | |
| 0087 C2A000 | C | 74 | | JNZ | TRAP2 | ;IF NOT THIS RANGE, DON'T BOOST THE POWER AT 80% |
| 008A 7D | | 75 | | MOV | A,L | ;WANT TO CHECK FOR THE 80% MARK |
| 008B FEC0 | | 76 | | CPI | 0C0H | ;AT 80% WANT TO INCREASE THE DISTILLATION RATE |
| 008D C2A000 | C | 77 | | JNZ | TRAP2 | ;IF NOT AT 80% JUMP |
| 0090 7C | | 78 | | MOV | A,H | |
| 0091 FE03 | | 79 | | CPI | 3 | |
| 0093 C2A000 | C | 80 | | JNZ | TRAP2 | |
| 0096 3E55 | | 81 | | MVI | A,55 | ;THIS BOOSTS THE POWER AT 80% |
| 0098 320000 | E | 82 | | STA | FINC | |
| 009B 211070 | | 83 | | LXI | H,7010H | ;RELOAD TIMER 0 FOR RATE CONTROL |
| 009E 3651 | | 84 | | MVI | M,81 | ;THIS CHANGES THE RATE OF POWER INCREASE |
| 00A0 3A0000 | F | 85 | TRAP2 | LDA | S12C | ;GET THE 12 STEP COUNTER |
| 00A3 3C | | 86 | | INR | A | ;BUMP THE COUNT |
| 00A4 320000 | E | 87 | | STA | S12C | ;UPDATE THE COUNT |
| 00A7 FE0C | | 88 | | CPI | 12 | ;CHECK IF STEPPED 12 (12 MOTOR STEPS) |
| 00A9 C27901 | C | 89 | | JNZ | ENA | ;IF NOT ENABLE AND RETURN |
| 00AC 3A0000 | E | 90 | | LDA | TRDR | ;CHECK IF IN LAG MODE |
| 00AF E6F0 | | 91 | | ANI | 0F0H | ;THIS TELLS WHICH TEMP TO PUT IN THE TV TABLE |
| 00B1 FE20 | | 92 | | CPI | 20H | |
| 00B3 C2B600 | C | 93 | | JNZ | NLAG | ;IF NOT LAG MODE GET ACTUAL TEMP |
| 00B6 2A1800 | E | 94 | | LHLD | LAGTBL+24 | |
| 00B9 C3BF00 | C | 95 | | JMP | TRAP3 | |
| 00BC 2A0000 | E | 96 | NLAG | LHLD | TEMPL | ;ELSE GET THE ACTUAL TEMP |
| 00BF EB | | 97 | TRAP3 | XCHG | | ;PUT THE TEMP IN THE D,E PAIR |
| 00C0 2A0000 | E | 98 | | LHLD | TVP | ;GET THE PRESENT TEMP VOLUME TABLE POINTER |
| 00C3 73 | | 99 | | MOV | M,E | |
| 00C4 23 | | 100 | | INX | H | |
| 00C5 72 | | 101 | | MOV | M,D | |
| 00C6 23 | | 102 | | INX | H | |
| 00C7 220000 | E | 103 | | SHLD | TVP | ;UPDATE THE POINTER |
| 00CA AF | | 104 | | XRA | A | |
| 00CB 320000 | E | 105 | | STA | S12C | ;ELSE, ZERO THE 12 STEP COUNTER |
| 00CE 3A0000 | E | 106 | | LDA | VOL | ;GET THE BCD VOLUME COUNTER |
| 00D1 3C | | 107 | | INR | A | ;BUMP IT |
| 00D2 27 | | 108 | | DAA | | ;MAKE IT A DECIMAL VALUE |
| 00D3 320000 | E | 109 | | STA | VOL | ;UPDATE IT |
| 00D6 FE05 | | 110 | | CPI | 5 | ;CHECK FOR THE 5 ML MARK |
| 00D8 CC9101 | C | 111 | | CZ | TRAP5 | ;AT 5 ML, CALCULATE THE TIME IN SEC TO 5ML |
| 00DB 3A0000 | E | 112 | | LDA | RCSW | ;GET THE RATE CALCULATE SWITCH |
| 00DE 3D | | 113 | | DCR | A | ;BUMP THIS SWITCH |
| 00DF 320000 | E | 114 | | STA | RCSW | ;UPDATE THIS SWITCH |
| 00E2 C27901 | C | 115 | | JNZ | ENA | ;IF NOT ZERO, ENABLE AND RETURN |
| 00E5 3A0000 | E | 116 | | LDA | VOL | ;GET THE VOLUME |
| 00E8 47 | | 117 | | MOV | B,A | ;SAVE IT |
| 00E9 CD0000 | E | 118 | | CALL | UNPAK | ;GO UNPACK THE TWO DIGITS |
| 00EC FE30 | | 119 | | CPI | '0' | ;CHECK FOR AN ASCII 0 |

```
00EE C2F100   C   120            JNZ    SKIP     ;IF NOT 0, SKIP DOWN
00F1 3E20         121            MVI    A,' '    ;IF =0, PUT A BLANK IN
00F3 320000   E   122  SKIP      STA    PRINTB   ;PUT THEM IN THE PRINT BUFFER
00F6 78           123            MOV    A,B
00F7 E60F         124            ANI    0FH
00F9 C630         125            ADI    30H
00FB 320100   E   126            STA    PRINTB+1
00FE 3E0A         127            MVI    A,10     ;DO THE CALCULATION OVER 10 ML
0100 320000   E   128            STA    PCSW     ;SET THE RATE SWITCH TO 10 ML
0103 211770       129            LXI    H,7017H  ;POINT TO THE CLOCK CONTROL PORT
0106 3680         130            MVI    M,80H    ;LATCH THE PRESENT TIME COUNT IN COUNTER 2
0108 2B           131            DCX    H        ;POINT TO COUNTER 2 DATA PORT
0109 5E           132            MOV    E,M      ;SAVE THE PRESENT TIME COUNT IN THE D,E PAIR
010A 56           133            MOV    D,M
010B 3E20         134            MVI    A,20H    ;GET THE LOAD TIME COUNT 64800
010D 93           135            SUB    E        ;DO LOAD COUNT - PRESENT COUNT = ELAPSED TIME
010E 5F           136            MOV    E,A
010F 3EFD         137            MVI    A,0FDH
0111 9A           138            SBB    D
0112 57           139            MOV    D,A      ;D,E = RESULT
0113 210200   E   140            LXI    H,DBUF+2 ;SET UP THE DBUF FOR A DIVIDE
0116 72           141            MOV    M,D      ;IN ORDER TO CALCULATE THE RATE
0117 23           142            INX    H
0118 73           143            MOV    M,E
0119 23           144            INX    H
011A E5           145            PUSH   H        ;SAVE THE DATA BUFFER POINTER
011B 2A0000   E   146            LHLD   DIVP     ;GET THE DIVIDEND POINTER
011E EB           147            XCHG            ;SET UP THE D,E POINTER
011F E1           148            POP    H        ;RESTORE THE DATA BUFFER POINTER
0120 0604         149            MVI    B,4      ;SET THE LOOP COUNTER TO 4
0122 1A           150  LOOP      LDAX   D        ;GET A DIVIDEND BYTE
0123 77           151            MOV    M,A      ;PUT IT IN THE DBUF
0124 23           152            INX    H
0125 13           153            INX    D
0126 05           154            DCR    B
0127 C22201   C   155            JNZ    LOOP     ;IF NOT ZERO, GET ANOTHER DIVIDEND BYTE
012A CD0000   E   156            CALL   DIVIDE   ;DO THE DIVIDE (CONSTANT TIME)
012D 210000   E   157            LXI    H,DBUF   ;POINT TO THE QUOTIENT
0130 46           158            MOV    B,M      ;WANT TO CONVERT THE QUOTIENT TO BCD
0131 23           159            INX    H
0132 4E           160            MOV    C,M
0133 210500   E   161            LXI    H,DBUF+5 ;SET UP THE BUFFER FOR THE BINBCD
0136 AF           162            XRA    A
0137 77           163            MOV    M,A
0138 23           164            INX    H
0139 77           165            MOV    M,A
013A 23           166            INX    H
013B 70           167            MOV    M,B
013C 23           168            INX    H
013D 71           169            MOV    M,C
013E CD0000   E   170            CALL   BINBCD   ;CONVERT THE DIST RATE TO BCD
0141 210300   E   171            LXI    H,DBUF+3 ;NOW WANT TO DO A ROUND OFF
0144 46           172            MOV    B,M      ;GET THE BCD RATE
0145 23           173            INX    H
0146 4E           174            MOV    C,M      ;PUT THE RATE IN THE B,C PAIR
0147 79           175            MOV    A,C
0148 E60F         176            ANI    0FH      ;MASK IN THE LSD
014A FE04         177            CPI    4        ;COMPARE IT TO 4
014C D40602   C   178            CNC    RUP      ;JUMP TO ROUND UP IF LSD > 4
014F 78           179            MOV    A,B      ;ELSE, PUT THE RATE IN THE PRINT BUFFER
0150 CD0000   E   180            CALL   UNPAK    ;GO UNPACK THE TWO DIGITS
0153 FE30         181            CPI    0        ;CHECK FOR AN ASCII 0
0155 C25A01   C   182            JNZ    SKIP2    ;IF NOT 0, PUT THE DIGIT IN
0158 3E20         183            MVI    A,' '    ;ELSE, PUT AN ASCII BLANK IN
015A 320000   E   184  SKIP2     STA    PRINTB+12
015D 78           185            MOV    A,B
015E E60F         186            ANI    0FH
```

```
0160 C630        187        ADI    30H       ;CONVERT THE MSD TO ASCII
0162 320D00   E  188        STA    PRINTB+13 ;PUT IT IN THE PRINT BUFFER
0165 79         189        MOV    A,C
0166 CD0000   E  190        CALL   UNPAK     ;GO UNPACK THE TWO DIGITS
0169 320F00   E  191        STA    PRINTB+15 ;PUT IT IN THE PRINT BUFFER
016C 211770      192        LXI    H,7017H   ;POINT TO THE CLOCK CONTROL PORT
016F 36B4        193        MVI    M,0B4H    ;WANT TO RESET TIMER 2
0171 2B          194        DCX    H         ;POINT TO TIMER 2 DATA PORT
0172 3620        195        MVI    M,20H     ;SET TIMER 2 TO 64800 COUNTS
0174 36FD        196        MVI    M,0FDH
0176 CD0000   E  197        CALL   PRINT     ;GO PRINT THE BUFFER
0179 3A0000   E  198 ENA    LDA    IMASK     ;GET THE INTERRUPT MASK
017C 30          199        SIM              ;SET THE INTERRUPT MASK
017D CD0000   E  200        CALL   RDBUF     ;RESTORE THE DATA BUFFER
0180 E1          201        POP    H         ;RESTORE ALL REGISTERS AND FLAGS
0181 D1          202        POP    D
0182 C1          203        POP    B
0183 F1          204        POP    PSW
0184 FB          205        EI               ;ENABLE INTERRUPTS
0185 C9          206        RET
0186 3A0000   E  207 FMAX   LDA    MAX
0189 5F          208        MOV    E,A
018A 3A0000   E  209        LDA    MAXM
018D 57          210        MOV    D,A
018E C25600   C  211        JMP    UPDATE
0191 210000   E  212 TRAPS  LXI    H,PRINTB
0194 3620        213        MVI    M,
0196 23          214        INX    H         ;PUT IT IN THE PRINT BUFFER
0197 3635        215        MVI    M,'5'
0199 211770      216        LXI    H,7017H   ;POINT TO THE CLOCK CONTROL PORT
019C 3680        217        MVI    M,80H     ;LATCH THE COUNT IN TIMER 2
019E 2B          218        DCX    H         ;POINT TO TIMER 2 DATA PORT
019F 4E          219        MOV    C,M       ;GET THE COUNT LSB
01A0 46          220        MOV    B,M       ;GET THE COUNT MSB
01A1 3E20        221        MVI    A,20H     ;WANT TO DO LOAD COUNT - READ COUNT
01A3 91          222        SUB    C         ;SUBTRACT THE LSB
01A4 4F          223        MOV    C,A       ;SAVE THE RESULT IN THE B/C PAIR
01A5 3EFD        224        MVI    A,0FDH
01A7 98          225        SBB    B
01A8 47          226        MOV    B,A
01A9 210100   E  227        LXI    H,DBUF+1  ;NOW WANT TO CONVERT THE COUNTS TO SECONDS
01AC 70          228        MOV    M,B       ;BY DOING B,C X MULTIPLY CONSTANT
01AD 23          229        INX    H         ;LOAD UP THE DATA BUFFER FOR THE MULTIPLY
01AE 71          230        MOV    M,C
01AF 23          231        INX    H
01B0 E5          232        PUSH   H         ;SAVE THIS POINTER
01B1 2A0000   E  233        LHLD   MULP      ;GET THE POINTER TO THE MULTIPLIER CONSTANT
01B4 5E          234        MOV    E,M       ;GET THE CONSTANT
01B5 23          235        INX    H
01B6 56          236        MOV    D,M
01B7 E1          237        POP    H         ;GET THE POINTER BACK
01B8 72          238        MOV    M,D       ;PUT THE 60 OR 50 HZ CONSTANT IN THE BUFFER
01B9 23          239        INX    H
01BA 73          240        MOV    M,E
01BB CD0000   E  241        CALL   MULTPY    ;DO THE MULTIPLY
01BE CD0000   E  242        CALL   BINBCD    ;CONVERT THE RESULT TO BCD
01C1 3E20        243        MVI    A,20H     ;GET AN ASCII BLANK
01C3 320C00   E  244        STA    PRINTB+12
01C6 210000   E  245        LXI    H,DBUF    ;POINT TO THE RESULT
01C9 7E          246        MOV    A,M       ;GET THE BCD MSD
01CA E60F        247        ANI    0FH
01CC C630        248        ADI    30H       ;CONVERT TO ASCII
01CE FE30        249        CPI    30H       ;CHECK FOR AN ASCII BLANK
01D0 C2D501   C  250        JNZ    SKIP1     ;IF NOT 0, SKIP DOWN
01D3 3E20        251        MVI    A,        ;IF = 0, PUT A BLANK IN
01D5 320D00   E  252 SKIP1  STA    PRINTB+13 ;PUT IN THE PRINT BUFFER
01D8 23          253        INX    H
01D9 7E          254        MOV    A,M       ;GET THE NEXT TWO BCD DIGITS
```

```
01DA CD0000   E   255           CALL    UNPAK      ;GO UNPACK THE TWO DIGITS
01DD 320E00   E   256           STA     PRINTB+14
01E0 7E           257           MOV     A,M
01E1 E60F         258           ANI     0FH
01E3 C630         259           ADI     30H        ;CONVERT THE LSD TO ASCII
01E5 210F00   E   260           LXI     H,PRINTB+15
01E8 77           261           MOV     M,A
01E9 23           262           INX     H
01EA 3620         263           MVI     M,' '      ;PUT A BLANK IN
01EC 23           264           INX     H
01ED 3652         265           MVI     M,'R'      ;LOAD UP THE 'REC' INTO THE PRINT BUFFER
01EF 23           266           INX     H
01F0 3645         267           MVI     M,'E'
01F2 23           268           INX     H
01F3 3643         269           MVI     M,'C'
01F5 CD0000   E   270           CALL    PRINT      ;PRINT THE BUFFER
01F8 210E00   E   271           LXI     H,PRINTB+14
01FB 362E         272           MVI     M,'.'      ;LOAD UP ';ML/M'
01FD 23           273           INX     H
01FE 23           274           INX     H
01FF 364D         275           MVI     M,'M'
0201 23           276           INX     H
0202 364C         277           MVI     M,'L'
0204 23           278           INX     H
0205 362F         279           MVI     M,'/'
0207 23           280           INX     H
0208 364D         281           MVI     M,'M'
020A C9           282           RET
020B 79           283   RUP     MOV     A,C
020C C610         284           ADI     10H
020E 27           285           DAA                ;MAKE IT BCD
020F 4F           286           MOV     C,A
0210 78           287           MOV     A,B
0211 CE00         288           ACI     0
0213 27           289           DAA                ;MAKE IT BCD
0214 47           290           MOV     B,A
0215 C9           291           RET
0216 CD6002   C   292   RST65E  CALL    STEPUP     ;IN THE FINAL HEAT MODE UPDATE THE STEP COUNTER
0219 2A0000   E   293           LHLD    STEPC      ;IN THIS MODE WANT TO PRINT OUT THE 95% MARK
021C 3E74         294           MVI     A,74H      ;SO CHECK IF STEP COUNTER IS = 95% = 1140 STEPS
021E 95           295           SUB     L
021F C27901   C   296           JNZ     ENA        ;IF LSB'S ARE NOT 0, ENABLE AND RETURN
0222 3E04         297           MVI     A,4        ;ELSE CHECK IF MSB'S ARE = 4
0224 9C           298           SBB     H
0225 C27901   C   299           JNZ     ENA        ;IF MSB'S ARE NOT = 0, ENABLE AND RETURN
0228 210000   E   300           LXI     H,PMES22   ;POINT TO THE 95% MESSAGE
022B 110000   E   301           LXI     D,PRINTB   ;POINT TO THE PRINT BUFFER
022E 0614         302           MVI     B,20
0230 CD6502   C   303           CALL    LOOP2      ;GO LOAD THE PRINT BUFFER
0233 210500   E   304           LXI     H,IBUF+5   ;POINT TO THE PRESENT TEMP IN THE INPUT BUFFER
0236 110700   E   305           LXI     D,PRINTB+7 ;PUT IT IN THE PRINT BUFFER
0239 060B         306           MVI     B,11       ;MAKE THIS A 6 TO ELIMINATE THE WATTS PRINT OUT
023B CD6502   C   307           CALL    LOOP2      ;GO LOAD THE TEMP
023E CD0000   E   308           CALL    PRINT      ;GO PRINT THE 95% MARK
0241 C27901   C   309           JMP     ENA
0244 CD6002   C   310   RST65C  CALL    STEPUP     ;DURING DRAINAGE, UPDATE THE STEP COUNTER AND
0247 211170         311           LXI     H,7011H    ;POINT TO THE TIMER CONTROL PORT
024A 3614         312           MVI     M,14H      ;SET TIMER 1
024C 211070         313           LXI     H,7010H    ;RESET TIMER 0 TO 1 MINUTE = 4815 COUNTS
024F 36E7         314           MVI     M,0E7H     ;LOAD THIS COUNT
0251 3612         315           MVI     M,12H      ;IF NO MENISCUS MOVEMENT DURING DRAINAGE THEN
0253 110100         316           LXI     D,1        ;WAIT FOR THIS COUNTER TO ZERO
0256 2194FC         317           LXI     H,0FC94H
0259 19           318   WAIT    DAD     D
025A C25902   C   319           JNC     WAIT
025D C27901   C   320           JMP     ENA        ;ENABLE RSTS 5 & RSTS 6
0260 CD0000   E   321   STEPUP  CALL    STEPC      ;UPDATE THE STEP COUNTER
```

```
0262 23         322         INX    H
0264 220000  E  323         SHLD   STEPC
0267 22IA70     324         SHLD   701AH    ;OUTPUT TO THE Y-AXIS (RECORDER)
026A 3A0000  E  325         LDA    S12C     ;UPDATE THE 12 STEP COUNTER
026D 3C         326         INR    A
026E 320000  E  327         STA    S12C     ;UPDATE THE COUNT
0271 FE0C       328         CPI    12       ;CHECK IF STEPPED 1% (12 MOTOR STEPS)
0273 C0         329         RNZ             ;IF NOT, ENABLE AND RETURN
0274 2A0000  E  330         LHLD   TEMPL    ;GET THE ACTUAL TEMP
0277 EB         331         XCHG            ;PUT THE TEMP IN THE D,E PAIR
0278 2A0000  E  332         LHLD   TVP      ;GET THE PRESENT TEMP VOLUME POINTER
027B 73         333         MOV    M,E
027C 23         334         INX    H
027D 72         335         MOV    M,D
027E 23         336         INX    H
027F 220000  E  337         SHLD   TVP      ;UPDATE THE TABLE POINTER
0282 AF         338         XRA    A        ;IF YES, ZERO THE 12 STEP COUNTER
0283 320000  E  339         STA    S12C
0286 3A0000  E  340         LDA    VOL      ;BUMP THE VOLUME COUNTER
0289 3C         341         INR    A
028A 27         342         DAA             ;MAKE IT A DECIMAL VALUE
028B 320000  E  343         STA    VOL      ;UPDATE IT
028E C9         344         RET
028F 210000  E  345 ULSE    LXI    H,PMES26 ;POINT TO "TEST TERMINATED" MESSAGE
0292 CD0000  E  346         CALL   PLOOP    ;GO PRINT IT OUT
0295 210000  E  347         LXI    H,PMES21 ;POINT TO "UPPER LIMIT SWITCH" MESSAGE
0298 CD0000  E  348         CALL   PLOOP    ;GO PRINT IT OUT
029B E1         349         POP    H
029C D1         350         POP    D
029D C1         351         POP    B
029E F1         352         POP    PSW
029F F1         353         POP    PSW      ;REMOVE THE RETURN ADDRESS OFF THE STACK
02A0 211170     354         LXI    H,7011H  ;POINT TO THE TIMER CONTROL PORT
02A3 3600       355         MVI    M,0      ;FORCE THE PHASE CONTROL TO A BIG NUMBER
02A5 3640       356         MVI    M,40H    ;WHICH WILL TURN OFF THE HEAT
02A7 3A0000  E  357         LDA    PHASE    ;WANT TO TURN OFF THE GRADUATE SOLENOID & ALARM
02AA E68F       358         ANI    8FH      ;AND TURN ON THE AIR SOLENOID
02AC 320000  E  359         STA    PHASE    ;UPDATE THE CONTROL BYTE
02AF 32AA70     360         STA    700AH    ;OUTPUT THE CONTROL BYTE
02B2 C30000  E  361         JMP    EDITOR   ;GO WAIT FOR SOME KEY STROKES
02B5 7E         362 LOOP2   MOV    A,M
02B6 12         363         STAX   D
02B7 23         364         INX    H
02B8 13         365         INX    D
02B9 05         366         DCR    B
02BA C2B502  C  367         JNZ    LOOP2
02BD C9         368         RET
0000        C   369         END    PST65
```

PUBLIC SYMBOLS
DIVD1   C 0000    DIVD2  C 0004    MULC1  C 0008    MULC2  C 000A    PST65  C 0000

EXTERNAL SYMBOLS
BINBCD E 0000   DBUF   E 0000   DIR    E 0000   DIVIDE E 0000   DIVP   E 0000   EDITOR E 0000
IBUF   E 0000   IMASK  E 0000   IPSL   E 0000   IPSM   E 0000   LAGTBL E 0000   MAXL   E 0000
MAXM   E 0000   MINL   E 0000   MINM   E 0000   MOTOR  E 0000   MULP   E 0000   MULTPY E 0000
PHASE  E 0000   PINC   E 0000   PLOOP  E 0000   PMES21 E 0000   PMES22 E 0000   PMES26 E 0000
PRINT  E 0000   PRINTB E 0000   R65SW  E 0000   R75SW  E 0000   PCSW   E 0000   PBUF   E 0000
PUNRY  E 0000   S12C   E 0000   SDBUF  E 0000   TEMP   E 0000   TEMPL  E 0000   TOTP   E 0000
TROP   E 0000   TVP    E 0000   UNPAK  E 0000   VOL    E 0000

USER SYMBOLS
BINBCD E 0000   DBUF   E 0000   DIR    E 0000   DIVD1  C 0000   DIVD2  C 0004   DIVIDE E 0000
DIVP   E 0000   EDITOR E 0000   ENA    C 0179   FMAX   C 0136   IBUF   E 0000   IMASK  E 0000
IPSL   E 0000   IPSM   E 0000   LAGTBL E 0000   LOOP   C 0122   LOOP2  C 02B5   MAXL   E 0000
MAXM   E 0000   MINL   E 0000   MINM   E 0000   MOTOR  E 0000   MULC1  C 0008   MULC2  C 000A
MULP   E 0000   MULTPY E 0000   NLAG   C 00BC   PHASE  E 0000   PINC   E 0000   PLOOP  E 0000

| | | | | | | | | | | | | |
|---|---|---|---|---|---|---|---|---|---|---|---|---|
| PMES21 | E 0000 | PMES22 | E 0000 | PMES26 | E 0000 | PRINT | E 0000 | PRINT6 | E 0000 | P65SW | E 0000 |
| P75SW | E 0000 | PCSW | E 0000 | PDBUF | E 0000 | RST65 | C 000C | RST65B | C 0216 | RST65C | C 0244 |
| RST65D | C 0063 | RUNAY | E 0000 | RUP | C 020B | S12C | E 0000 | SDBUF | E 0000 | SKIP | C 00FF |
| SKIP1 | C 0105 | SKIP2 | C 015A | STEPC | E 0000 | STEPUP | C 0260 | TEMPL | E 0000 | TMTF | E 0000 |
| TRAP1 | C 0080 | TRAP2 | C 00A0 | TRAP3 | C 00BF | TRAP5 | C 0191 | TRDP | E 0000 | TYP | E 0000 |
| ULSE | C 028F | UNPAK | E 0000 | UPDATE | C 0056 | VOL | E 0000 | WAIT | C 0259 | | |

```
              1 *       TITLE('INTERRUPT RST7.5 SERVICE ROUTINE') PAGEWIDTH(105) MOD85 DEBUG
              2                 ;WRITTEN 10/23/79
              3                 ;UPDATED 11/17/81
              4                 ;THIS ROUTINE IS EXECUTED BY THE ONE SECOND
              5                 ;TIMER INTERRUPT  THE PHASE CONTROL POWER SETTING
              6                 ;IS ADJUSTED AND CHECKS ARE MADE FOR THE 1 MINUTE
              7                 ;AND 5 MINUTE MARKS
              8         NAME    PST75
              9         PUBLIC  PST75,SDBUF,PDBUF
             10         EXTRN   BCDBIN,BINBCD,DBUF,MULTRY,SETPTL,SETPTM,SLOPEL,SLOPEM
             11         EXTRN   MAXL,MAXM,MINL,MINM,IPSL,IPSM,TIMEL,TIMEM,H5L,H5M
             12         EXTRN   WATTL,WATTM,BH5L,BH5M,IMASK,P75SW,PINC,S5MIN,RECRES
             13         EXTRN   RUNAY,TMTF,PMOTOR,PRESET,FLOOR,MLAG,DBUFS,PMES15,RST75C
             14         CSEG
0000 F5      15 RST75   PUSH    PSW     ;SAVE ALL REGISTERS AND FLAGS
0001 C5      16         PUSH    B
0002 D5      17         PUSH    D
0003 E5      18         PUSH    H
0004 CD0E01 C 19         CALL    SDBUF   ;SAVE THE DATA BUFFER
0007 3A0000 E 20         LDA     P75SW   ;GET THE PST7.5 INTERRUPT SWITCH
000A 1F      21         RAR             ;LOOK AT BIT 0
000B DA3001 C 22         JC      PST75B  ;IF =1, DO THE NEXT SERVICE ROUTINE
000E 1F      23         RAR             ;LOOK AT BIT 1
000F DA7C01 C 24         JC      RST75C  ;IF =1, DO THE NEXT SERVICE ROUTINE
0012 1F      25         RAR             ;LOOK AT BIT 2
0013 DA8401 C 26         JC      RST75D  ;IF =1, DO THE NEXT SERVICE ROUTINE
0016 3A0000 E 27         LDA     WATTL   ;GET THE WATT READING LSB'S
0019 4F      28         MOV     C,A     ;SAVE IT
001A 3A0000 E 29         LDA     WATTM   ;GET THE WATT READING MSB'S
001D 47      30         MOV     B,A     ;SAVE IT
001E 3A0000 E 31         LDA     SETPTL  ;GET THE SET POINT LSB'S
0021 91      32         SUB     C       ;DO SET POINT WATTAGE - ACTUAL WATTAGE
0022 4F      33         MOV     C,A     ;SAVE THE LSB'S
0023 3A0000 E 34         LDA     SETPTM  ;GET THE SET POINT MSB'S
0026 98      35         SBB     B
0027 47      36         MOV     B,A     ;SAVE THE MSB'S
0028 F5      37         PUSH    PSW     ;SAVE THE SIGN OF THE SUBTRACT
0029 DCAB00 C 38         CC      COMP    ;IF CY=1, TWO'S COMPLEMENT THE RESULT
002C 210100 E 39         LXI     H,DBUF+1 ;POINT TO THE DATA BUFFER
002F 70      40         MOV     M,B     ;SET UP TO DO DELTA W * SLOPE
0030 23      41         INX     H       ;LOAD UP DELTA W INTO MULTIPLIER
0031 71      42         MOV     M,C
0032 23      43         INX     H
0033 3A0000 E 44         LDA     SLOPEM  ;LOAD UP SLOPE INTO MULTIPLICAND
0036 77      45         MOV     M,A
0037 23      46         INX     H
0038 3A0000 E 47         LDA     SLOPEL
003B 77      48         MOV     M,A
003C CD0000 E 49         CALL    MULTRY  ;DO THE MULTIPLY
003F CD0000 E 50         CALL    BINBCD  ;CONVERT TO BCD
0042 210100 E 51         LXI     H,DBUF+1 ;DIVIDE BY 100 BY TRUNCATING THE 2 LSDIGITS
0045 CD0000 E 52         CALL    BCDBIN  ;CONVERT BACK TO BINARY
0048 F1      53         POP     PSW     ;GET THE SIGN BACK
0049 DAB100 C 54         JC      ADDIT   ;DO DECREASE WATTAGE CALCULATIONS
004C 3A0000 E 55         LDA     IPSL    ;DO COUNTS - CORRECTION (INCREASE WATTAGE)
004F 91      56         SUB     C
0050 4F      57         MOV     C,A     ;SAVE THE LSB'S
0051 3A0000 E 58         LDA     IPSM
0054 98      59         SBB     B
```

| Addr | Bytes | | Line | Label | Op | Operand | Comment |
|---|---|---|---|---|---|---|---|
| 0055 | 47 | | 60 | | MOV | B,A | ;SAVE THE MSB'S |
| 0056 | DACB00 | C | 61 | | JC | FMIN | ;IF CY=1, FORCE MINIMUM COUNTS |
| 0059 | 3A0000 | E | 62 | | LDA | MINL | ;ELSE, CHECK FOR MINIMUM COUNTS |
| 005C | 91 | | 63 | | SUB | C | |
| 005D | 3A0000 | E | 64 | | LDA | MINM | |
| 0060 | 98 | | 65 | | SBB | B | |
| 0061 | D2CB00 | C | 66 | | JNC | FMIN | ;IF MINIMUM COUNTS > CALCULATED COUNTS, FORCE MIN |
| 0064 | 211170 | | 67 | UPDATE | LXI | H,7011H | ;POINT TO THE PHASE CONTROL DATA PORT |
| 0067 | 79 | | 68 | | MOV | A,C | ;UPDATE THE POWER SETTING |
| 0068 | 320000 | E | 69 | | STA | IFSL | |
| 006B | 77 | | 70 | | MOV | M,A | |
| 006C | 78 | | 71 | | MOV | A,B | |
| 006D | 320000 | E | 72 | | STA | IPSM | |
| 0070 | 77 | | 73 | | MOV | M,A | |
| 0071 | CD0000 | E | 74 | | CALL | MLAG | ;GO PUSH THE LAG TEMPS ON THE LAG TABLE |
| 0074 | 3A0000 | E | 75 | | LDA | TIMEL | ;BUMP THE TIME COUNTER (1 SECOND INCREMENTS) |
| 0077 | C601 | | 76 | | ADI | 1 | |
| 0079 | 320000 | E | 77 | | STA | TIMEL | |
| 007C | 4F | | 78 | | MOV | C,A | |
| 007D | 3A0000 | E | 79 | | LDA | TIMEM | |
| 0080 | CE00 | | 80 | | ACI | 0 | ;DO A DOUBLE PRECISION ADD |
| 0082 | 320000 | E | 81 | | STA | TIMEM | |
| 0085 | 47 | | 82 | | MOV | B,A | |
| 0086 | 3E3C | | 83 | | MVI | A,60 | ;CHECK FOR 1 MINUTE MARK |
| 0088 | B9 | | 84 | | CMP | C | |
| 0089 | C29200 | C | 85 | | JNZ | CHK5 | ;IF LSB'S ARE NOT =, DO 5 MINUTE CHECK |
| 008C | 3E00 | | 86 | | MVI | A,0 | ;ELSE, CHECK MSB'S |
| 008E | B8 | | 87 | | CMP | B | |
| 008F | CAE100 | C | 88 | | JZ | EDROP | ;IF = 1 MIN, ENABLE THE DROP DETECT INTERRUPT |
| 0092 | 3E2C | | 89 | CHK5 | MVI | A,2CH | ;CHECK FOR 5 MINUTE MARK |
| 0094 | B9 | | 90 | | CMP | C | |
| 0095 | C29E00 | C | 91 | | JNZ | ENA | ;IF LSB'S ARE NOT =, ENABLE AND RETURN |
| 0098 | 3E01 | | 92 | | MVI | A,1 | ;ELSE, CHECK MSB'S |
| 009A | B8 | | 93 | | CMP | B | |
| 009B | CAE900 | C | 94 | | JZ | LHEAT | ;IF MSB'S ARE =, LOWER THE HEAT SETTING |
| 009E | 3A0000 | E | 95 | ENA | LDA | IMASK | ;GET THE INTERRUPT MASK CODE |
| 00A1 | 30 | | 96 | | SIM | | ;SET THE INTERRUPT MASK |
| 00A2 | CD1F01 | C | 97 | | CALL | RDBUF | ;RESTORE THE DATA BUFFER |
| 00A5 | E1 | | 98 | | POP | H | ;RESTORE ALL REGISTERS AND FLAGS |
| 00A6 | D1 | | 99 | | POP | D | |
| 00A7 | C1 | | 100 | | POP | B | |
| 00A8 | F1 | | 101 | | POP | PSW | |
| 00A9 | FB | | 102 | | EI | | ;ENABLE INTERRUPTS |
| 00AA | C9 | | 103 | | RET | | |
| 00AB | 79 | | 104 | CUMP | MOV | A,C | ;TWO'S COMPLEMENT THE B,C PAIR |
| 00AC | 2F | | 105 | | CMA | | |
| 00AD | 4F | | 106 | | MOV | C,A | |
| 00AE | 78 | | 107 | | MOV | A,B | |
| 00AF | 2F | | 108 | | CMA | | |
| 00B0 | 47 | | 109 | | MOV | B,A | |
| 00B1 | 03 | | 110 | | INX | B | |
| 00B2 | C9 | | 111 | | RET | | |
| 00B3 | 3A0000 | E | 112 | ADDIT | LDA | IFSL | ;DO COUNTS + CORRECTION (DECREASE WATTAGE) |
| 00B6 | 81 | | 113 | | ADD | C | |
| 00B7 | 4F | | 114 | | MOV | C,A | |
| 00B8 | 3A0000 | E | 115 | | LDA | IPSM | |
| 00BB | 88 | | 116 | | ADC | B | |
| 00BC | 47 | | 117 | | MOV | B,A | |
| 00BD | 3A0000 | E | 118 | | LDA | MAXL | ;CHECK FOR MAXIMUM COUNTS |
| 00C0 | 91 | | 119 | | SUB | C | ;DO MAXIMUM COUNTS - CALCULATED COUNTS |
| 00C1 | 3A0000 | E | 120 | | LDA | MAXM | |
| 00C4 | 98 | | 121 | | SBB | B | |
| 00C5 | DAD600 | C | 122 | | JC | FMAX | ;IF MAXIMUM COUNTS < CALCULATED COUNTS, FORCE MAX |
| 00C8 | C36400 | C | 123 | | JMP | UPDATE | ;ELSE, UPDATE THE POWER SETTING |
| 00CB | 3A0000 | E | 124 | FMIN | LDA | MINL | ;FORCE THE MINIMUM COUNTS |
| 00CE | 4F | | 125 | | MOV | C,A | |
| 00CF | 3A0000 | E | 126 | | LDA | MINM | |

```
00D2 47              127         MOV   B,A
00D3 C36400   C      128         JMP   UPDATE
00D6 3A0000   E      129 FMAX    LDA   MAXL    ;FORCE THE MAXIMUM COUNTS
00D9 4F              130         MOV   C,A
00DA 3A0000   E      131         LDA   MAXM
00DD 47              132         MOV   B,A
00DE C36400   C      133         JMP   UPDATE
00E1 3E1A            134 EDROP   MVI   A,1AH   ;ENABLE THE DROP INTERRUPT & THE TIMER
00E3 320000   E      135         STA   IMASK   ;UPDATE THE INTERRUPT MASK
00E6 C39E00   C      136         JMP   ENA
00E9 211170          137 LHEAT   LXI   H,7011H ;POINT TO THE PHASE CONTROL DATA PORT
00EC 3A0000   E      138         LDA   H5L     ;GET THE 5 MINUTE HEAT SETTING
00EF 320000   E      139         STA   IPSL    ;UPDATE THE POWER SETTING
00F2 77              140         MOV   M,A     ;OUTPUT THE POWER SETTING
00F3 3A0000   E      141         LDA   BH5L    ;GET THE BINARY 5 MINUTE HEAT LSB'S
00F6 320000   E      142         STA   SETPTL  ;UPDATE THE SET POINT LSB'S
00F9 3A0000   E      143         LDA   H5M     ;GET THE 5 MINUTE HEAT SETTING MSB'S
00FC 320000   E      144         STA   IPSM
00FF 77              145         MOV   M,A
0100 3A0000   E      146         LDA   BH5M    ;GET THE BINARY 5 MINUTE HEAT MSB'S
0103 320000   E      147         STA   SETPTM  ;UPDATE THE SET POINT MSB'S
0106 3E01            148         MVI   A,1     ;SET THE 5 MINUTE SWITCH = DONE
0108 320000   E      149         STA   S5MIN
010B C39E00   C      150         JMP   ENA
010E 210000   E      151 SDBUF   LXI   H,DBUF  ;WANT TO SAVE THE CONTENTS OF THE DATA BUFFER
0111 110000   E      152         LXI   D,DBUFS
0114 0609            153         MVI   B,9
0116 7E              154 SLOOP   MOV   A,M
0117 12              155         STAX  D
0118 23              156         INX   H
0119 13              157         INX   D
011A 05              158         DCR   B
011B C21601   C      159         JNZ   SLOOP
011E C9              160         RET
011F 210000   E      161 FDBUF   LXI   H,DBUF  ;WANT TO RESTORE THE CONTENTS OF THE DATA BUFFER
0122 110000   E      162         LXI   D,DBUFS
0125 0609            163         MVI   B,9
0127 1A              164 PLOOP   LDAX  D
0128 77              165         MOV   M,A
0129 23              166         INX   H
012A 13              167         INX   D
012B 05              168         DCR   B
012C C22701   C      169         JNZ   PLOOP
012F C9              170         RET
0130 CD0000   E      171 RST75B  CALL  MLAG    ;GO PUSH THE LAG TEMPS ON THE LAG TABLE
0133 3A0000   E      172         LDA   RUNAY   ;GET THE RUN AWAY COUNT
0136 3C              173         INR   A       ;BUMP IT
0137 FE1B            174         CPI   27      ;CHECK FOR A 30 SEC TIME OF NO MENISCUS MOVEMENT
0139 CA8701   C      175         JZ    TRAPP   ;JUMP IF AT THIS TIME LIMIT
013C 320000   E      176         STA   RUNAY   ;ELSE, UPDATE THIS COUNT
013F 3A0000   E      177         LDA   PINC    ;WANT TO INCREASE THE POWER
0142 47              178         MOV   B,A     ;SAVE THE PHASE ANGLE INCREASING VALUE
0143 3A0000   E      179         LDA   IPSL    ;DO POWER SETTING - PINC
0146 90              180         SUB   B
0147 5F              181         MOV   E,A     ;SAVE THE LSB'S
0148 3A0000   E      182         LDA   IPSM
014B DE00            183         SBI   0
014D 57              184         MOV   D,A     ;D,E = RESULT
014E DA7101   C      185         JC    FMINB   ;IF PINC > POWER SETTING, FORCE MINIMUM COUNTS
0151 3A0000   E      186         LDA   MINL    ;DO MINIMUM COUNTS - CALCULATED COUNTS
0154 93              187         SUB   E
0155 3A0000   E      188         LDA   MINM
0158 9A              189         SBB   D
0159 D27101   C      190         JNC   FMINB   ;IF SIGN OF RESULT > 0, FORCE MINIMUM COUNTS
015C 211170          191 UDATE   LXI   H,7011H ;ELSE, CALCULATED COUNTS ARE OK
015F 7B              192         MOV   A,E     ;UPDATE THE POWER SETTING
0160 73              193         MOV   M,E
```

```
0161 320000   E   194         STA    IPSL
0164 7A           195         MOV    A,D
0165 72           196         MOV    M,D
0166 320000   E   197         STA    IPSM
0169 3E19         198         MVI    A,19H    ;GET THE RST6.5 & RST7.5 ENABLE MASK
016B 320000   E   199         STA    IMASK    ;UPDATE THE INTERRUPT MASK
016E C29E00   C   200         JMP    ENA      ;GO ENABLE INTERRUPTS
0171 3A0000   E   201 FMINB   LDA    MINL     ;FORCE THE MINIMUM COUNTS
0174 5F           202         MOV    E,A
0175 3A0000   E   203         LDA    MINM
0178 57           204         MOV    D,A
0179 C25C01   C   205         JMP    UDATE
017C E1           206 RST75C  POP    H
017D D1           207         POP    D
017E C1           208         POP    B
017F F1           209         POP    PSW
0180 C1           210         POP    B        ;POP RETURN ADDRESS OFF THE STACK
0181 C20000   E   211         JMP    RECRES   ;GO DO THE RECOVERY RESIDUE ROUTINE
0184 C30000   E   212 RST75D  JMP    RST55C   ;GO END THE DRY POINT TEST
0187 3A0000   E   213 TRAPR   LDA    TMTF     ;GET THE TIME TRAP COUNT
018A 3C           214         INR    A        ;BUMP IT
018B FE36         215         CPI    54       ;CHECK IF NO MENISCUS MOVEMENT FOR THIS TIME
018D CA9601   C   216         JZ     TRAPT    ;IF AT THE TIME LIMIT, ABORT THE TEST
0190 320000   E   217         STA    TMTF     ;ELSE, SAVE THE TIME COUNT & DON T INCREASE POWER
0193 C39E00   C   218         JMP    ENA      ;ENABLE & RETURN
0196 210000   E   219 TRAPT   LXI    H,PMES15 ;POINT TO THE NO MENISCUS MOVEMENT MESSAGE
0199 CD0000   E   220         CALL   PLOOP    ;GO PRINT IT OUT
019C CD0000   E   221         CALL   RMOTOR   ;GO RESET THE MOTOR
019F AF           222         XRA    A
01A0 320000   E   223         STA    TIMEM    ;ZERO ANY TIME COUNT
01A3 E1           224         POP    H
01A4 D1           225         POP    D
01A5 C1           226         POP    B
01A6 F1           227         POP    PSW
01A7 F1           228         POP    PSW      ;POP THE RETURN ADDRESS OFF THE STACK
01A8 C30000   E   229         JMP    PRESET   ;GO PRINT TEST TERMINATED
0000              C   230         END    RST75
```

PUBLIC SYMBOLS
RDBUF  C 011F   RST75  C 0000   SDBUF  C 010E

EXTERNAL SYMBOLS
BCDBIN E 0000   BH5L   E 0000   BH5M   E 0000   BINBCD E 0000   DBUF   E 0000   DBUFS  E 0000
H5L    E 0000   H5M    E 0000   IMASK  E 0000   IPSL   E 0000   IPSM   E 0000   MAXL   E 0000
MAXM   E 0000   MINL   E 0000   MINM   E 0000   MLAG   E 0000   MULTPY E 0000   PINC   E 0000
PLOOP  E 0000   PMES15 E 0000   PRESET E 0000   R75SW  E 0000   RECRES E 0000   RMOTOR E 0000
RST55C E 0000   RUNAY  E 0000   S5MIN  E 0000   SETPTL E 0000   SETPTM E 0000   SLOPEL E 0000
SLOPEM E 0000   TIMEL  E 0000   TIMEM  E 0000   TMTF   E 0000   WATTL  E 0000   WATTM  E 0000

USER SYMBOLS
ADDIT  C 00B2   BCDBIN E 0000   BH5L   E 0000   BH5M   E 0000   BINBCD E 0000   CHKS   C 009A
COMP   C 00A6   DBUF   E 0000   DBUFS  E 0000   EDPOP  C 00E1   ENA    C 009E   FMAX   C 00D6
FMIN   C 00CB   FMINB  C 0171   H5L    E 0000   H5M    E 0000   IMASK  E 0000   IPSL   E 0000
IPSM   E 0000   LHEAT  C 00E9   MAXL   E 0000   MAXM   E 0000   MINL   E 0000   MINM   E 0000
MLAG   E 0000   MULTPY E 0000   PINC   E 0000   PLOOP  E 0000   PMES15 E 0000   PRESET E 0000
R75SW  E 0000   RDBUF  C 011F   RECRES E 0000   RLOOP  C 0127   RMOTOR E 0000   RST55C E 0000
RST75  C 0000   RST75B C 0130   RST75C C 017C   RST75D C 0184   RUNAY  E 0000   S5MIN  E 0000
SDBUF  C 010E   SETPTL E 0000   SETPTM E 0000   SLOOP  C 0116   SLOPEL E 0000   SLOPEM E 0000
TIMEL  E 0000   TIMEM  E 0000   TMTF   E 0000   TRAPR  C 0187   TRAPT  C 0196   UDATE  C 015C
UPDATE C 0064   WATTL  E 0000   WATTM  E 0000

| LOC  OBJ    |   | SEQ |        | SOURCE STATEMENT |                                                              |
|-------------|---|-----|--------|------------------|--------------------------------------------------------------|
|             |   | 1 $ |        | TITLE('CONTROL 1 ROUTINE') PAGEWIDTH(105) MOD85 DEBUG |                                         |
|             |   | 2   |        |                  | ;WRITTEN 10/22/79                                            |
|             |   | 3   |        |                  | ;UPDATED 02/10/82                                            |
|             |   | 4   |        |                  | ;THIS ROUTINE PERFORMS CONTROL OF THE HEAT DURING            |
|             |   | 5   |        |                  | ;THE FIRST 5 MINUTES OF A TEST                               |
|             |   | 6   | NAME   | CNTL1            |                                                              |
|             |   | 7   | PUBLIC | CNTL1, GETW, PRESET, PLOOP |                                                   |
|             |   | 8   | EXTRN  | KEYIN, TIMEL, TIMEM, DBUF, BINBCD, IBUF, XMIT, EDITOR |                              |
|             |   | 9   | EXTRN  | PRINT, PRINTB, RCSW, UNPAK, GTEMP, PHASE, STEPC, TRDR |                              |
|             |   | 10  | EXTRN  | WATTL, WATTM, IMASK, PMES26, PMES27, UDATE, DMES5, DSPLY |                           |
|             |   | 11  | CSEG   |                  |                                                              |
| 0000 3E1B   |   | 12 CNTL1: | MVI | A, 1BH        | ;GET THE RST7.5 INTERRUPT MASK (TIMER)                       |
| 0002 320000 | E | 13  | STA    | IMASK            | ;LOAD THE INTERRUPT MASK WITH THE RST7.5 CODE                |
| 0005 30     |   | 14  | SIM    |                  | ;SET THE MASK                                                |
| 0006 FB     |   | 15  | EI     |                  | ;ENABLE INTERRUPTS                                           |
| 0007 3E0A   |   | 16  | MVI    | A, 10            | ;SET UP FOR RATE CALCULATION OVER 10ML                       |
| 0009 320000 | E | 17  | STA    | RCSW             | ;SET THE RATE CALCULATE SWITCH                               |
| 000C 2A0000 | E | 18  | LHLD   | STEPC            | ;GET THE STEP COUNTER VALUE                                  |
| 000F 221A70 |   | 19  | SHLD   | 701AH            | ;OUTPUT ANY INITIAL VOLUME TO THE Y-AXIS(RECORDER)           |
| 0012 CD0000 | E | 20 INKEY: | CALL | UDATE          | ;GO UPDATE THE REAL TIME CLOCK                               |
| 0015 3A0000 | E | 21  | LDA    | TRDR             | ;CHECK WHICH RANGE IS SET                                    |
| 0018 E610   |   | 22  | ANI    | 10H              | ;LOOK AT THE 30 - 300 C BIT                                  |
| 001A C21701 | C | 23  | JNZ    | FNOLAG           | ;IF RANGE IS = 30 - 300 C, SET MUX FOR NO LAG                |
| 001D 3E21   |   | 24  | MVI    | A, 21H           | ;ELSE, FORCE THIS MUX CONTROL BYTE                           |
| 001F 320970 |   | 25 LOOK: | STA | 7009H           | ;OUTPUT THE MUX CONTROL                                      |
| 0022 CD0000 | E | 26  | CALL   | KEYIN            | ;GET A KEYBOARD INPUT                                        |
| 0025 17     |   | 27  | RAL    |                  | ;CHECK FOR ANY CHARACTERS, LOOK AT BIT 8                     |
| 0026 DA2F00 | C | 28  | JC     | DTIME            | ;IF NONE, GO DISPLAY THE TIME                                |
| 0029 1F     |   | 29  | RAR    |                  | ;GET THE CHARACTER                                           |
| 002A FE14   |   | 30  | CPI    | 20               | ;IS IT THE RESET KEY                                         |
| 002C CAD600 | C | 31  | JZ     | PRESET           | ;IF YES, PROCESS THE RESET KEY                               |
| 002F 0E09   |   | 32 DTIME | MVI | C, 9             | ;ELSE DISPLAY THE TIME                                       |
| 0031 3A0000 | E | 33  | LDA    | TIMEL            | ;DO SECONDS COUNTER / 6                                      |
| 0034 5F     |   | 34  | MOV    | E, A             | ;PUT THE TIME COUNT IN THE D,E PAIR                          |
| 0035 3A0000 | E | 35  | LDA    | TIMEM            |                                                              |
| 0038 57     |   | 36  | MOV    | D, A             |                                                              |
| 0039 7A     |   | 37 DLOOP | MOV | A, D            | ;GET THE DIVIDEND MSBYTE                                     |
| 003A D606   |   | 38  | SUI    | 6                |                                                              |
| 003C DA4000 | C | 39  | JC     | SHIFT            | ;IF CARRY =1, SUBTRACTION NOT VALID                          |
| 003F 57     |   | 40  | MOV    | D, A             | ;ELSE, SUBTRACTION VALID, UPDATE THE DIVIDEND                |
| 0040 3F     |   | 41 SHIFT: | CMC |                 | ;COMPLEMENT THE CARRY                                        |
| 0041 78     |   | 42  | MOV    | A, B             | ;THE B REG. = THE QUOTIENT                                   |
| 0042 17     |   | 43  | RAL    |                  |                                                              |
| 0043 47     |   | 44  | MOV    | B, A             | ;SHIFT THE CARRY INTO THE QUOTIENT                           |
| 0044 AF     |   | 45  | XRA    | A                |                                                              |
| 0045 7B     |   | 46  | MOV    | A, E             | ;SHIFT THE DIVIDEND                                          |
| 0046 17     |   | 47  | RAL    |                  |                                                              |
| 0047 5F     |   | 48  | MOV    | E, A             |                                                              |
| 0048 7A     |   | 49  | MOV    | A, D             |                                                              |
| 0049 17     |   | 50  | RAL    |                  |                                                              |
| 004A 57     |   | 51  | MOV    | D, A             |                                                              |
| 004B 0D     |   | 52  | DCR    | C                | ;DECREMENT THE DIVIDE LOOP COUNTER                           |
| 004C C23900 | C | 53  | JNZ    | DLOOP            |                                                              |
| 004F 210800 | E | 54  | LXI    | H, DBUF+8        | ;WHEN DONE, THE B REG HAS THE QUOTIENT                       |
| 0052 70     |   | 55  | MOV    | M, B             | ;SET UP THE DATA BUFFER FOR BINBCD                           |
| 0053 AF     |   | 56  | XRA    | A                |                                                              |
| 0054 2B     |   | 57  | DCX    | H                |                                                              |
| 0055 77     |   | 58  | MOV    | M, A             |                                                              |
| 0056 2B     |   | 59  | DCX    | H                |                                                              |
| 0057 77     |   | 60  | MOV    | M, A             |                                                              |
| 0058 2B     |   | 61  | DCX    | H                |                                                              |
| 0059 77     |   | 62  | MOV    | M, A             |                                                              |
| 005A CD0000 | E | 63  | CALL   | BINBCD           | ;CONVERT THE BINARY TIME TO BCD                              |
| 005D 210300 | E | 64  | LXI    | H, DBUF+3        | ;NOW WANT TO GET THE RESULT AND CONVERT                      |
| 0060 7E     |   | 65  | MOV    | A, M             | ;IT TO ASCII FOR DISPLAY                                     |

```
0061 C630           66          ADI     30H         ;CONVERT THE MSDIGIT TO ASCII
0063 320000    E    67          STA     IBUF        ;PUT IT IN THE INSERT BUFFER
0066 23             68          INX     H           ;POINT TO THE NEXT DIGITS
0067 7E             69          MOV     A,M         ;GET THE NEXT DIGITS
0068 CD0000    E    70          CALL    UNPAK       ;GO UNPACK THE TWO DIGITS
006B 320100    E    71          STA     IBUF+1      ;PUT IT IN THE INSERT BUFFER
006E 7E             72          MOV     A,M
006F E60F           73          ANI     0FH
0071 C630           74          ADI     30H
0073 320300    E    75 *        STA     IBUF+3      ;PUT THE LAST DIGIT IN THE INSERT BUFFER
0076 CD8A00    C    76          CALL    GETW        ;GET A WATTMETER READING
0079 CD0000    E    77          CALL    GTEMP       ;GET A TEMP READING
007C CD0000    E    78          CALL    XMIT        ;TRANSMIT THE INSERT BUFFER
007F 3A0000    E    79          LDA     TIMEM       ;GET THE TIME MSBYTE
0082 FE06           80          CPI     6           ;CHECK FOR 25.6 MIN ELAPSED
0084 CAD600    C    81          JZ      PRESET      ;ABORT THE TEST
0087 C31200    C    82          JMP     INKEY       ;GO LOOK FOR ANOTHER KEY
008A 210A70         83 GETW:    LXI     H,700AH     ;POINT TO THE WATTMETER STATUS BYTE
008D 7E             84 LOOP:    MOV     A,M         ;GET THE STATUS BYTE
008E 17             85          RAL                 ;MASK IN THE STATUS BIT
008F DA8D00    C    86          JC      LOOP        ;IF STATUS NOT GOOD, WAIT UNTIL GOOD
0092 210F70         87          LXI     H,700FH     ;POINT TO THE WATTMETER MSBYTE
0095 7E             88          MOV     A,M         ;GET THE MSBYTE
0096 E60F           89          ANI     0FH         ;MASK IN THE 4 DATA BITS
0098 47             90          MOV     B,A         ;SAVE THE WATTMETER MSB'S
0099 2B             91          DCX     H           ;POINT TO THE LSBYTE
009A 4E             92          MOV     C,M         ;SAVE THE WATTMETER LSB'S
009B 210A70         93          LXI     H,700AH     ;POINT TO THE STATUS BYTE AGAIN
009E 7E             94          MOV     A,M         ;GET THE STATUS BYTE
009F E680           95          ANI     80H         ;MASK IN THE STATUS BIT
00A1 C28A00    C    96          JNZ     GETW        ;IF STATUS NOW NOT GOOD, GO DO ANOTHER SAMPLE
00A4 78             97          MOV     A,B         ;1000 COUNTS = 1000 WATTS
00A5 320000    E    98          STA     WATTM       ;SAVE THE WATT READING MSB'S
00A8 79             99          MOV     A,C
00A9 320000    E    100         STA     WATTL       ;SAVE THE WATT READING LSB'S
00AC 210800    E    101         LXI     H,DBUF+8    ;SET UP THE DATA BUFFER FOR BINBCD
00AF 71             102         MOV     M,C         ;CONVERT TO BCD WATTS
00B0 2B             103         DCX     H
00B1 70             104         MOV     M,B
00B2 2B             105         DCX     H
00B3 AF             106         XRA     A
00B4 77             107         MOV     M,A
00B5 2B             108         DCX     H
00B6 77             109         MOV     M,A
00B7 CD0000    E    110         CALL    BINBCD      ;DO THE CONVERSION
00BA 210300    E    111         LXI     H,DBUF+3    ;NOW WANT TO GET THE RESULT AND CONVERT
00BD 7E             112         MOV     A,M         ;IT TO ASCII FOR DISPLAY
00BE E60F           113         ANI     0FH
00C0 C630           114         ADI     30H         ;CONVERT THE MSDIGIT TO ASCII
00C2 320C00    E    115         STA     IBUF+12     ;PUT IT IN THE INSERT BUFFER
00C5 23             116         INX     H           ;POINT TO THE NEXT DIGITS
00C6 7E             117         MOV     A,M         ;GET THE NEXT DIGITS
00C7 CD0000    E    118         CALL    UNPAK       ;GO UNPACK THE TWO DIGITS
00CA 320D00    E    119         STA     IBUF+13     ;PUT IT IN THE INSERT BUFFER
00CD 7E             120         MOV     A,M
00CE E60F           121         ANI     0FH         ;GET THE LAST DIGIT
00D0 C630           122         ADI     30H         ;CONVERT IT TO ASCII
00D2 320E00    E    123         STA     IBUF+14     ;PUT IT IN THE INSERT BUFFER
00D5 C9             124         RET
00D6 F3             125 PRESET: DI                  ;DISABLE THE INTERRUPTS
00D7 211170         126         LXI     H,7011H     ;POINT TO THE TIMER CONTROL PORT
00DA 3600           127         MVI     M,0         ;FORCE THE PHASE CONTROL TO A BIG NUMBER
00DC 3640           128         MVI     M,40H
00DE 3A0000    E    129         LDA     PHASE       ;WANT TO TURN OFF THE GRADUATE SOLENOID
00E1 E68F           130         ANI     8FH         ;RESET THE GRADUATE BIT & ALARM, TURN ON AIR
00E3 320000    E    131         STA     PHASE       ;UPDATE THE CONTROL BYTE
00E6 320A70         132         STA     700AH       ;OUTPUT THE CONTROL BYTE
```

```
00E9 210000   E   133          LXI    H,DMESS   ;POINT TO THE PRINTING MESSAGE
00EC CD0000   E   134          CALL   DSPLY     ;GO DISPLAY IT
00EF 210000   E   135          LXI    H,PMES26  ;POINT TO THE TEST TERMINATED MESSAGE
00F2 CD0601   C   136          CALL   PLOOP     ;GO PRINT IT
00F5 3A0000   E   137          LDA    TIMEM     ;CHECK IF WE GOT HERE BECAUSE 25.6 MIN ELAPSED
00F8 FE06         138          CPI    6
00FA C20000   E   139          JNZ    EDITOR    ;IF NOT, GO TO EDITOR
00FD 210000   E   140          LXI    H,PMES27  ;IF YES, PRINT NO DROP IN 25.6 MIN MESSAGE
0100 CD0601   C   141          CALL   PLOOP
0103 C30000   E   142          JMP    EDITOR
0106 010000   E   143 PLOOP:   LXI    B,PRINTB  ;POINT TO THE PRINT BUFFER
0109 1614         144          MVI    D,20      ;LOAD THE CHARACTER COUNTER
010B 7E           145 LLOOP:   MOV    A,M       ;GET A CHARACTER
010C 02           146          STAX   B         ;PUT IT IN THE PRINT BUFFER
010D 23           147          INX    H         ;POINT TO THE NEXT CHARACTER
010E 03           148          INX    B         ;POINT TO THE NEXT PRINT BUFFER LOCATION
010F 15           149          DCR    D         ;DECREMENT THE CHARACTER COUNT
0110 C20B01   C   150          JNZ    LLOOP     ;IF NOT ZERO, GET THE NEXT CHARACTER
0113 CD0000   E   151          CALL   PRINT     ;GO PRINT THE BUFFER
0116 C9           152          RET
0117 3E51         153 FNOLAG:  MVI    A,51H     ;FORCE NO LAG, ONLY FOR RANGE 30 - 200 C
0119 C31F00   C   154          JMP    LOOK      ;GO OUTPUT IT
0000          C   155          END    CNTL1
```

PUBLIC SYMBOLS
CNTL1  C 0000    GETW   C 008A    PLOOP  C 0106    PRESET C 00D6

EXTERNAL SYMBOLS
BINBCD E 0000    DBUF   E 0000    DMESS  E 0000    DSPLY  E 0000    EDITOR E 0000    GTEMP  E 0000
IBUF   E 0000    IMASK  E 0000    KEYIN  E 0000    PHASE  E 0000    PMES26 E 0000    PMES27 E 0000
PRINT  E 0000    PRINTB E 0000    RCSW   E 0000    STEPC  E 0000    TIMEL  E 0000    TIMEM  E 0000
TRDR   E 0000    UDATE  E 0000    UNPAK  E 0000    WATTL  E 0000    WATTM  E 0000    XMIT   E 0000

USER SYMBOLS
BINBCD E 0000    CNTL1  C 0000    DBUF   E 0000    DLOOP  C 0039    DMESS  E 0000    DSPLY  E 0000
DTIME  C 002F    EDITOR E 0000    FNOLAG C 0117    GETW   C 008A    GTEMP  E 0000    IBUF   E 0000
IMASK  E 0000    INKEY  C 0012    KEYIN  E 0000    LLOOP  C 010B    LOOK   C 001F    LOOP   C 008D
PHASE  E 0000    PLOOP  C 0106    PMES26 E 0000    PMES27 E 0000    PRESET C 00D6    PRINT  E 0000
PRINTB E 0000    RCSW   E 0000    SHIFT  C 0040    STEPC  E 0000    TIMEL  E 0000    TIMEM  E 0000
TRDR   E 0000    UDATE  E 0000    UNPAK  E 0000    WATTL  E 0000    WATTM  E 0000    XMIT   E 0000

```
                       1 $         TITLE('CONTROL 2 ROUTINE') PAGEWIDTH(105) DEBUG
                       2                              ;WRITTEN 10/30/79
                       3                              ;UPDATED 03/22/82
                       4                              ;THIS ROUTINE IS EXECUTED DURING THE RATE CONTROL
                       5                              ;OF HEAT, THAT IS, AFTER THE FIRST DROP
                       6            NAME   CNTL2
                       7            PUBLIC CNTL2,GTEMP,UNPAK,CONT
                       8            EXTRN  BINBCD,DBUF,IBUF,KEYIN,MULTPY,PRESET,DIVIDE,PRINTB
                       9            EXTRN  TRDR,ENDT,DISPUP,BCDBIN,CORSW,CORRF,SIGNC,LAG,LAGTBL
                      10            EXTRN  TEMPL,TEMPM,R55SW,DIAGSW,PLOOP,PMES34,PMES35
                      11            CSEG
0000 CD0000   E       12 CNTL2:    CALL   KEYIN     ;GO SAMPLE THE KEYBOARD
0003 17               13           RAL              ;CHECK FOR ANY CHARACTERS
0004 DA0D00   C       14           JC     GETT      ;IF NONE, GO GET A TEMP READING
0007 1F               15           RAR              ;GET THE CHARACTER
0008 FE14             16           CPI    20        ;IS IT THE RESET KEY
000A CA0000   E       17           JZ     PRESET    ;IF YES, PROCESS THE RESET KEY
000D CD0000   E       18 GETT:     CALL   DISPUP    ;GO UPDATE THE DISPLAY
0010 CD0000   E       19           CALL   ENDT      ;GO CHECK FOR THE END OF THE TEST
0013 C30000   C       20           JMP    CNTL2     ;DO THE CONTROL AGAIN
0016 210B70           21 GTEMP:    LXI    H,700BH   ;POINT TO THE TEMP STATUS BYTE
0019 7E               22 LOOP:     MOV    A,M       ;GET THE STATUS BYTE
001A 1F               23           RAR              ;LOOK AT THE STATUS BIT
001B DA1900   C       24           JC     LOOP      ;IF STATUS NOT GOOD, WAIT UNTIL GOOD
001E 23               25           INX    H         ;POINT TO THE TEMP LSBYTE
001F 4E               26           MOV    C,M       ;SAVE THE TEMP LSB'S
```

```
0020 23            27         INX    H         ;POINT TO THE TEMP MSBYTE
0021 7E            28         MOV    A,M       ;GET THE MSBYTE
0022 5F            29         MOV    E,A       ;SAVE IT FOR OR & POL CHECK
0023 E60F          30         ANI    0FH       ;MASK IN THE 4 MSB'S
0025 47            31         MOV    B,A       ;SAVE THE TEMP MSB'S
0026 2B            32         DCX    H
0027 2B            33         DCX    H         ;POINT TO THE STATUS BYTE AGAIN
0028 7E            34         MOV    A,M       ;GET THE STATUS BYTE AGAIN
0029 1F            35         RAR              ;MASK IN THE STATUS BIT
002A DA1600    C   36         JC     GTEMP     ;IF STATUS NOW NOT GOOD, GO DO ANOTHER SAMPLE
002D 3A0000    E   37         LDA    DIAGSW    ;GET THE DIAGNOSTIC SWITCH
0030 1F            38         RAR              ;CHECK IF IN DIAGNOSTICS
0031 DA4000    C   39         JC     NOCK      ;IF = 1, THEN IN DIAGNOSTICS & NO CHECK DONE
0034 7B            40         MOV    A,E       ;GET THE OVER-RANGE & POLARITY BYTE
0035 E610          41         ANI    10H       ;MASK IN THE OVER-RANGE BIT
0037 C2A401    C   42         JNZ    ITSOR     ;IF = 1, IT'S OVER-RANGE
003A 7B            43         MOV    A,E       ;ELSE, CHECK POLARITY FOR NEGATIVE VALUE
003B E620          44         ANI    20H       ;MASK IN THE POLARITY BIT
003D CAB001    C   45         JZ     ITSPOL    ;IF = 0, IT'S NEGATIVE
0040 CDE400    C   46 NOCK:   CALL   CORECT    ;GO CHECK ON TEMP CORRECTIONS
0043 79            47         MOV    A,C
0044 320000    E   48         STA    TEMPL     ;SAVE THE CENTIGRADE TEMP LSB'S
0047 320000    E   49         STA    LAGTBL    ;SAVE IN THE LAG TABLE
004A 78            50         MOV    A,B
004B 320000    E   51         STA    TEMPM     ;SAVE THE CENTIGRADE TEMP MSB'S
004E 320100    E   52         STA    LAGTBL+1  ;SAVE IN THE LAG TABLE
0051 3A0000    E   53         LDA    TRDR      ;LAG IF 4.5ML/MIN & NOT 30 - 300C RANGE
0054 E6F0          54         ANI    0F0H      ;MASK OUT OTHER RANGES
0056 FE20          55         CPI    20H       ;CHECK FOR LAG MODE
0058 CC0000    E   56         CZ     LAG       ;IF LAG MODE, WANT TO DISPLAY THE LAG TEMP
005B 3A0000    E   57         LDA    R55SW     ;CHECK FOR SUPPRESSION OF X-AXIS OUTPUT
005E 17            58         RAL              ;DURING DRAINAGE, DON'T OUTPUT
005F DA6F00    C   59         JC     CONT
0062 69            60         MOV    L,C
0063 60            61         MOV    H,B
0064 3A0000    E   62         LDA    TRDR      ;BEFORE OUTPUT IS DONE TO THE RECORDER, CHECK
0067 E60C          63         ANI    0CH       ;IF IN A FAHRENHEIT TEMP RANGE
0069 C46E01    C   64         CNZ    TSCALE    ;MUST SCALE THE TEMP WHEN IN FAHRENHEIT RANGE
006C 221870        65         SHLD   7018H     ;OUTPUT THE TEMP TO THE RECORDER X-AXIS
006F 3A0000    E   66 CONT:   LDA    TRDR      ;GET THE TEMP RANGE SETTING
0072 E60C          67         ANI    0CH       ;MASK IN THE RANGES
0074 CAC900    C   68         JZ     CENT      ;IF ZERO, MUST BE CENTIGRADE RANGE
0077 210100    E   69         LXI    H,DBUF+1  ;ELSE, CONVERT TEMP TO FAHRENHEIT
007A 3600          70         MVI    M,0       ;DO TEMP X 1.8 + 32
007C 23            71         INX    H         ;LOAD THE MULTIPLIER WITH 18
007D 3612          72         MVI    M,18
007F 23            73         INX    H
0080 70            74         MOV    M,B       ;LOAD THE MULTIPLICAND WITH THE TEMP
0081 23            75         INX    H
0082 71            76         MOV    M,C       ;B,C = CORRECTED FAHRENHEIT TEMP
0083 CD0000    E   77         CALL   MULTPY    ;DO THE MULTIPLY
0086 210800    E   78         LXI    H,DBUF+8  ;NOW ADD IN THE 32
0089 7E            79         MOV    A,M       ;GET THE RESULT LSB'S
008A C680          80         ADI    80H
008C 77            81         MOV    M,A       ;PUT THE RESULT IN THE DATA BUFFER
008D 2B            82         DCX    H
008E 7E            83         MOV    A,M       ;GET THE RESULT MSB'S
008F CE0C          84         ACI    0CH
0091 77            85         MOV    M,A       ;PUT THE RESULT IN THE DATA BUFFER
0092 2B            86         DCX    H
0093 7E            87         MOV    A,M
0094 CE00          88         ACI    0         ;DO A TRIPLE PRECISION ADD
0096 77            89         MOV    M,A
0097 CD0000    E   90 CENTC:  CALL   BINBCD    ;CONVERT THE BINARY TEMP TO BCD
009A 210200    E   91         LXI    H,DBUF+2  ;POINT TO THE BCD MSD
009D 110500    E   92         LXI    D,IBUF+5  ;POINT TO THE INSERT BUFFER
```

```
00A0 7E            93           MOV    A,M
00A1 E60F          94           ANI    0FH        ;GET THE MSDIGIT
00A3 C630          95           ADI    30H        ;CONVERT IT TO ASCII
00A5 12            96           STAX   D          ;PUT IT IN THE INSERT BUFFER
00A6 320500   E    97           STA    PRINTB+5   ;PUT IT IN THE PRINT BUFFER
00A9 23            98           INX    H          ;POINT TO THE NEXT TWO DIGITS
00AA 13            99           INX    D          ;POINT TO THE NEXT INSERT BUFFER POSITION
00AB 7E            100          MOV    A,M        ;GET THE NEXT TWO DIGITS
00AC CDDB00   C    101          CALL   UNPAK      ;UNPACK THE TWO DIGITS
00AF 12            102          STAX   D          ;PUT IT IN THE INSERT BUFFER
00B0 320600   E    103          STA    PRINTB+6   ;PUT IT IN THE PRINT BUFFER
00B3 13            104          INX    D
00B4 7E            105          MOV    A,M        ;GET THE NEXT DIGIT
00B5 E60F          106          ANI    0FH        ;MASK IT IN
00B7 C630          107          ADI    30H        ;CONVERT IT TO ASCII
00B9 12            108          STAX   D
00BA 320700   E    109          STA    PRINTB+7   ;PUT IT IN THE PRINT BUFFER
00BD 23            110          INX    H
00BE 13            111          INX    D
00BF 13            112          INX    D
00C0 7E            113          MOV    A,M        ;GET THE NEXT TWO DIGITS
00C1 CDDB00   C    114          CALL   UNPAK      ;UNPACK THE NEXT TWO DIGITS
00C4 12            115          STAX   D
00C5 320900   E    116          STA    PRINTB+9   ;PUT IT IN THE PRINT BUFFER
00C8 C9            117          RET
00C9 210100   E    118  CENT:   LXI    H,DBUF+1   ;WANT TO MULTIPLY BY 10 SO THAT WE CAN USE
00CC 3600          119          MVI    M,0        ;THE SAME CODE FOR THE FAHRENHEIT CASE
00CE 23            120          INX    H
00CF 360A          121          MVI    M,10
00D1 23            122          INX    H
00D2 70            123          MOV    M,B
00D3 23            124          INX    H
00D4 71            125          MOV    M,C
00D5 CD0000   E    126          CALL   MULTPY     ;DO THE CONVERSION
00D8 C39700   C    127          JMP    CENTC      ;FINISH THE CONVERSION AT CENTC
00DB 1F            128  UNPAK:  RAR
00DC 1F            129          RAR
00DD 1F            130          RAR
00DE 1F            131          RAR
00DF E60F          132          ANI    0FH
00E1 C630          133          ADI    30H
00E3 C9            134          RET
00E4 3A0000   E    135  CORECT: LDA    TRDR       ;GET THE TEMP RANGE & DIST RATE BYTE
00E7 57            136          MOV    D,A        ;SAVE THIS BYTE
00E8 E605          137          ANI    5          ;CHECK FOR 0 - 300C OR 32 - 572F TEMP RANGES
00EA C23C01   C    138          JNZ    CORX3      ;IF EITHER RANGE, DO TEMP X 1.003
00ED 7A            139          MOV    A,D        ;ELSE, GET THE RANGE BYTE BACK
00EE E60A          140          ANI    10         ;CHECK FOR 0 - 400C OR 32 - 752F TEMP RANGES
00F0 C26501   C    141          JNZ    CORX16     ;IF EITHER RANGE, DO TEMP X 1.016
00F3 3A0000   E    142  CORCNT: LDA    CORSW      ;GET THE CORRECTION SWITCH
00F6 1F            143          RAR               ;0=DO THE CORRECTION   1=SKIP THE CORRECTION
00F7 D8            144          RC                ;IF TEMP RANGE IS 30 - 300 C, SKIP CORRECTIONS
00F8 C5            145          PUSH   B          ;SAVE THE UNCORRECTED TEMP (CENTIGRADE)
00F9 3EAA          146          MVI    A,0AAH     ;DO CORRECTION = 0.00012(760 - P)(273 +T)
00FB 81            147          ADD    C          ;FIRST DO (2730 +T)
00FC 4F            148          MOV    C,A
00FD 3E0A          149          MVI    A,0AH
00FF 88            150          ADC    B
0100 47            151          MOV    B,A
0101 2A0000   E    152          LHLD   CORRF      ;GET THE CORRECTION FACTOR 120(760 - P)
0104 EB            153          XCHG              ;PUT IT IN THE D,E PAIR
0105 210100   E    154          LXI    H,DBUF+1   ;DO CORRF X (2730 +T)
0108 70            155          MOV    M,B        ;LOAD UP THE DATA BUFFER FOR THE MULTIPLY
0109 23            156          INX    H
010A 71            157          MOV    M,C
010B 23            158          INX    H
010C 72            159          MOV    M,D
010D 23            160          INX    H
```

| | | | | | |
|---|---|---|---|---|---|
| 010E 73 | | 161 | MOV | M,E | |
| 010F CD0000 | E | 162 | CALL | MULTPY | ;DO THE MULTIPLY |
| 0112 CD0000 | E | 163 | CALL | BINBCD | ;CONVERT THE RESULT TO BCD |
| 0115 210000 | E | 164 | LXI | H,DBUF | ;POINT TO THE RESULT |
| 0118 46 | | 165 | MOV | B,M | ;GET THE 3 MSDIGITS AND CONVERT TO BINARY |
| 0119 23 | | 166 | INX | H | |
| 011A 4E | | 167 | MOV | C,M | |
| 011B 23 | | 168 | INX | H | |
| 011C 71 | | 169 | MOV | M,C | |
| 011D 2B | | 170 | DCX | H | |
| 011E 70 | | 171 | MOV | M,B | |
| 011F 2B | | 172 | DCX | H | |
| 0120 AF | | 173 | XRA | A | |
| 0121 77 | | 174 | MOV | M,A | |
| 0122 CD0000 | E | 175 | CALL | BCDBIN | ;B,C = RESULT |
| 0125 D1 | | 176 | POP | D | ;D,E = UNCORRECTED TEMP |
| 0126 3A0000 | E | 177 | LDA | SIGNC | ;GET THE SIGN OF THE CORRECTION VALUE |
| 0129 1F | | 178 | RAR | | |
| 012A DC3401 | C | 179 | CC | COMP | ;IF NEGATIVE, 2'S COMPLEMENT THE B,C PAIR |
| 012D 7B | | 180 | MOV | A,E | ;NOW DO UNCORRECTED TEMP +/- CORRECTION VALUE |
| 012E 81 | | 181 | ADD | C | |
| 012F 4F | | 182 | MOV | C,A | |
| 0130 7A | | 183 | MOV | A,D | |
| 0131 88 | | 184 | ADC | B | |
| 0132 47 | | 185 | MOV | B,A | |
| 0133 C9 | | 186 | RET | | |
| 0134 79 | | 187 COMP: | MOV | A,C | ;2'S COMPLEMENT THE B,C PAIR |
| 0135 2F | | 188 | CMA | | |
| 0136 4F | | 189 | MOV | C,A | |
| 0137 78 | | 190 | MOV | A,B | |
| 0138 2F | | 191 | CMA | | |
| 0139 47 | | 192 | MOV | B,A | |
| 013A 03 | | 193 | INX | B | |
| 013B C9 | | 194 | RET | | |
| 013C 69 | | 195 CORX3: | MOV | L,C | ;WANT TO DO TEMP X 1.003 |
| 013D 60 | | 196 | MOV | H,B | ;FIRST DO TEMP X 3 |
| 013E 29 | | 197 | DAD | H | |
| 013F 09 | | 198 | DAD | B | ;NOW H,L = TEMP X 3 |
| 0140 C5 | | 199 CORX: | PUSH | B | ;SAVE THE UNCORRECTED TEMP |
| 0141 EB | | 200 | XCHG | | ;PUT TEMP X 3 IN D,E PAIR |
| 0142 210700 | E | 201 | LXI | H,DBUF+7 | ;SET UP THE DATA BUFFER FOR A DIVIDE BY 1000 |
| 0145 73 | | 202 | MOV | M,E | |
| 0146 2B | | 203 | DCX | H | |
| 0147 72 | | 204 | MOV | M,D | |
| 0148 2B | | 205 | DCX | H | |
| 0149 3600 | | 206 | MVI | M,0 | |
| 014B 2B | | 207 | DCX | H | |
| 014C 3600 | | 208 | MVI | M,0 | |
| 014E 2B | | 209 | DCX | H | |
| 014F 36E8 | | 210 | MVI | M,0E8H | |
| 0151 2B | | 211 | DCX | H | |
| 0152 3603 | | 212 | MVI | M,3 | |
| 0154 CD0000 | E | 213 | CALL | DIVIDE | ;DO THE DIVIDE BY 1000 |
| 0157 210100 | E | 214 | LXI | H,DBUF+1 | ;POINT TO THE RESULT |
| 015A 7E | | 215 | MOV | A,M | ;GET THE RESULT |
| 015B C1 | | 216 | POP | B | ;RESTORE THE UNCORRECTED TEMP |
| 015C 81 | | 217 | ADD | C | ;ADD THE (TEMP X 3 ) / 1000 |
| 015D 4F | | 218 | MOV | C,A | |
| 015E 78 | | 219 | MOV | A,B | |
| 015F CE00 | | 220 | ACI | 0 | |
| 0161 47 | | 221 | MOV | B,A | ;NOW THE B,C PAIR = TEMP X 1.003 OR 1.016 |
| 0162 C3F300 | C | 222 | JMP | CORCNT | ;JMP TO CORRECTION CONTINUED |
| 0165 69 | | 223 CORX16: | MOV | L,C | ;WANT TO DO TEMP X 1.016 |
| 0166 60 | | 224 | MOV | H,B | ;FIRST DO TEMP X 16 |
| 0167 29 | | 225 | DAD | H | |
| 0168 29 | | 226 | DAD | H | |
| 0169 29 | | 227 | DAD | H | |

```
016A 29          228          DAD     H        ;NOW H,L = TEMP X 16
016B C34001  C   229          JMP     CORX     ;GO DO THE REST OF THIS CORRECTION
016E C5          230 TSCALE:  PUSH    B        ;SAVE THE CENTIGRADE TEMP IN B,C
016F 210100  E   231          LXI     H,DBUF+1 ;WANT TO SCALE THE TEMP FOR THE RECORDER
0172 11E204      232          LXI     D,1250   ;WHEN IN THE FAHRENHEIT RANGE. THIS IS FOR
0175 72          233          MOV     M,D      ;CHART PAPER PURPOSES.
0176 23          234          INX     H        ;DO (((B,C) X 1250) / 1389) + 160
0177 73          235          MOV     M,E      ;FIRST SET UP FOR THE MULTIPLY
0178 23          236          INX     H
0179 70          237          MOV     M,B
017A 23          238          INX     H
017B 71          239          MOV     M,C
017C CD0000  E   240          CALL    MULTPY   ;DO B,C X 1250
017F 210800  E   241          LXI     H,DBUF+8 ;SET UP FOR THE DIVIDE
0182 7E          242          MOV     A,M
0183 2B          243          DCX     H
0184 46          244          MOV     B,M
0185 77          245          MOV     M,A
0186 2B          246          DCX     H
0187 7E          247          MOV     A,M
0188 70          248          MOV     M,B
0189 2B          249          DCX     H
018A 46          250          MOV     B,M
018B 77          251          MOV     M,A
018C 2B          252          DCX     H
018D 70          253          MOV     M,B
018E 2B          254          DCX     H
018F 116D05      255          LXI     D,1389
0192 73          256          MOV     M,E
0193 2B          257          DCX     H
0194 72          258          MOV     M,D
0195 CD0000  E   259          CALL    DIVIDE   ;DO (B,C X 1250) / 1389
0198 210000  E   260          LXI     H,DBUF   ;POINT TO THE RESULT
019B 56          261          MOV     D,M
019C 23          262          INX     H
019D 5E          263          MOV     E,M      ;D,E = RESULT
019E 21A000      264          LXI     H,160
01A1 19          265          DAD     D        ;NOW H,L = FINAL RESULT
01A2 C1          266          POP     B        ;RESTORE THE CENTIGRADE TEMP
01A3 C9          267          RET
01A4 210000  E   268 ITSOR:   LXI     H,PMES34 ;POINT TO THE VAPOR TEMP OR MESSAGE
01A7 CD0000  E   269 TERM:    CALL    PLOOP    ;GO PRINT IT OUT
01AA 31FF67      270          LXI     SP,67FFH ;RELOAD THE STACK POINTER
01AD C30000  E   271          JMP     PRESET   ;GO TERMINATE THE TEST
01B0 210000  E   272 ITSPOL:  LXI     H,PMES35 ;POINT TO THE VAPOR TEMP NEGATIVE MESSAGE
01B3 C3A701  C   273          JMP     TERM     ;GO FINISH THE TERMINATION HERE
0000         C   274          END     CNTL2
```

PUBLIC SYMBOLS
CNTL2  C 0000    CONT   C 006F    GTEMP  C 0016    UNPAK  C 00DB

EXTERNAL SYMBOLS
BCDBIN E 0000    BINBCD E 0000    CORRF  E 0000    CORSW  E 0000    DBUF   E 0000    DIAGSW E 0000
DISPUP E 0000    DIVIDE E 0000    ENDT   E 0000    IBUF   E 0000    KEYIN  E 0000    LAG    E 0000
LAGTBL E 0000    MULTPY E 0000    PLOOP  E 0000    PMES34 E 0000    PMES35 E 0000    PRESET E 0000
PRINTB E 0000    R55SW  E 0000    SIGNC  E 0000    TEMPL  E 0000    TEMPM  E 0000    TRDR   E 0000

USER SYMBOLS
BCDBIN E 0000    BINBCD E 0000    CENT   C 00C9    CENTC  C 0097    CNTL2  C 0000    COMP   C 0134
CONT   C 006F    CORCNT C 00F3    CORECT C 00E4    CORRF  E 0000    CORSW  E 0000    CORX   C 0140
CORX16 C 0165    CORX2  C 013C    DBUF   E 0000    DIAGSW E 0000    DISPUP E 0000    DIVIDE E 0000
ENDT   E 0000    GETT   C 0000    GTEMP  C 0016    IBUF   E 0000    ITSOR  C 01A4    ITSPOL C 01B0
KEYIN  E 0000    LAG    E 0000    LAGTBL E 0000    LOOP   C 0019    MULTPY E 0000    NOCK   C 0040
PLOOP  E 0000    PMES34 E 0000    PMES35 E 0000    PRESET E 0000    PRINTB E 0000    R55SW  E 0000
SIGNC  E 0000    TEMPL  E 0000    TEMPM  E 0000    TERM   C 01A7    TRDR   E 0000    TSCALE C 016E
UNPAK  C 00DB

| LOC | OBJ | | SEQ | | | SOURCE STATEMENT | |
|---|---|---|---|---|---|---|---|
| | | | 1 $ | | | TITLE( MOTOR DRIVER ROUTINE ) PAGEWIDTH(105) DEBUG | |
| | | | 2 | | | ;WRITTEN 10/12/79 | |
| | | | 3 | | | ;UPDATED 11/17/81 | |
| | | | 4 | | | ;THIS ROUTINE GENERATES THE CORRECT PHASE SEQUENCING | |
| | | | 5 | | | ;FOR DRIVING THE MOTOR IN EITHER DIRECTION | |
| | | | 6 | | NAME | MOTOR | |
| | | | 7 | | PUBLIC | MOTOR | |
| | | | 8 | | EXTRN | DIR, PHASE, DLYSW | |
| | | | 9 | | CSEG | | |
| 0000 | 3A0000 | E | 10 MOTOR | LDA | DIR | ;GET THE DIRECTION BYTE | |
| 0003 | E601 | | 11 | ANI | 1 | ;0=UP  1=DOWN | |
| 0005 | CA3800 | C | 12 | JZ | UP | ;IF =0, DO UP ROUTINE | |
| 0008 | 210A70 | | 13 DOWN | LXI | H,700AH | ;POINT TO THE LIMIT SWITCH STATUS BYTE | |
| 000B | 7E | | 14 | MOV | A,M | ;GET THE STATUS BYTE | |
| 000C | E602 | | 15 | ANI | 2 | ;MASK IN THE LLS | |
| 000E | CA1100 | C | 16 | JZ | $+3 | ;IF AT LLS, DO NOT STEP THE MOTOR | |
| 0011 | 3A0000 | E | 17 | LDA | PHASE | ;GET THE PHASE SETTING | |
| 0014 | 4F | | 18 | MOV | C,A | ;SAVE THIS VALUE | |
| 0015 | E60F | | 19 | ANI | 0FH | ;GET THE PRESENT PHASE SET UP | |
| 0017 | 17 | | 20 | RAL | | ;FORM THE NEXT PHASE SETTING | |
| 0018 | 57 | | 21 | MOV | D,A | ;SAVE THIS NEW SETTING | |
| 0019 | E610 | | 22 | ANI | 10H | ;CHECK BIT 4 | |
| 001B | CA2600 | C | 23 | JZ | FORM | ;IF =0, THE NEW SETTING IS OK | |
| 001E | 7A | | 24 | MOV | A,D | ;IF NOT 0, MUST FIX UP THE PHASE VALUE | |
| 001F | E608 | | 25 | ANI | 8 | ;CHECK BIT 3 | |
| 0021 | CA3300 | C | 26 | JZ | F3 | ;IF =0, FORCE THE PHASE VALUE = 3 | |
| 0024 | 1609 | | 27 F9 | MVI | D,9 | ;ELSE, FORCE THE PHASE VALUE = 9 | |
| 0026 | 79 | | 28 FORM | MOV | A,C | ;NOW FORM THE NEW CONTROL WORD TO OUTPUT | |
| 0027 | E6F0 | | 29 | ANI | 0F0H | ;MASK OUT THE PREVIOUS PHASE SETTING | |
| 0029 | 82 | | 30 | ADD | D | ;ADD IN THE NEW PHASE SETTING | |
| 002A | 320000 | E | 31 | STA | PHASE | ;SAVE THIS NEW CONTROL WORD | |
| 002D | 320A70 | | 32 | STA | 700AH | ;OUTPUT IT TO THE CONTROL PORT | |
| 0030 | C35900 | C | 33 | JMP | WAIT | ;WAIT FOR 3 MSEC FOR THE MOTOR TO RESPOND | |
| 0033 | 1603 | | 34 F3 | MVI | D,3 | ;FORCE THE PHASE VALUE = 3 | |
| 0035 | C32600 | C | 35 | JMP | FORM | ;GO FORM THE NEW CONTROL WORD | |
| 0038 | 210A70 | | 36 UP | LXI | H,700AH | ;POINT TO THE LIMIT SWITCH STATUS BYTE | |
| 003B | 7E | | 37 | MOV | A,M | ;GET THE STATUS BYTE | |
| 003C | E604 | | 38 | ANI | 4 | ;MASK IN THE ULS | |
| 003E | CA4100 | C | 39 | JZ | $+3 | ;IF AT ULS, DO NOT STEP THE MOTOR | |
| 0041 | 3A0000 | E | 40 | LDA | PHASE | ;GET THE PRESENT CONTROL WORD | |
| 0044 | 4F | | 41 | MOV | C,A | ;SAVE IT | |
| 0045 | E60F | | 42 | ANI | 0FH | ;MASK IN THE PRESENT PHASE SETTING | |
| 0047 | 1F | | 43 | RAR | | ;FORM THE NEXT PHASE SEQUENCE | |
| 0048 | 57 | | 44 | MOV | D,A | ;SAVE IT | |
| 0049 | D22600 | C | 45 | JNC | FORM | ;IF CARRY = 1, THIS PHASE VALUE IS OK | |
| 004C | E601 | | 46 | ANI | 1 | ;ELSE, CHECK BIT 0 | |
| 004E | CA5400 | C | 47 | JZ | F12 | ;IF =0, FORCE THE PHASE VALUE = 12 | |
| 0051 | C32400 | C | 48 | JMP | F9 | ;ELSE FORCE THE PHASE VALUE = 9 | |
| 0054 | 160C | | 49 F12 | MVI | D,12 | ;FORCE 12 | |
| 0056 | C32600 | C | 50 | JMP | FORM | ;GO FORM THE NEW CONTROL WORD | |
| 0059 | 110100 | | 51 WAIT | LXI | D,1 | ;DELAY LOOP | |
| 005C | 3A0000 | E | 52 | LDA | DLYSW | ;GET THE DELAY SWITCH BYTE | |
| 005F | 1F | | 53 | RAR | | ;LOOK AT THE LSB | |
| 0060 | DA6B00 | C | 54 | JC | FAST | ;IF = 1, DELAY 24 MS | |
| 0063 | 2100F4 | | 55 | LXI | H,62464 | ;ELSE, DELAY 90 MS | |
| 0066 | 19 | | 56 WLOOP | DAD | D | | |
| 0067 | D26600 | C | 57 | JNC | WLOOP | | |
| 006A | C9 | | 58 | RET | | | |
| 006B | 2110FD | | 59 FAST | LXI | H,64784 | ;LOAD 24 MS DELAY | |
| 006E | C36600 | C | 60 | JMP | WLOOP | | |
| 0000 | | C | 61 | END | MOTOR | | |

PUBLIC SYMBOLS
MOTOR  C 0000

EXTERNAL SYMBOLS
DIR     E 0000    DLYSW  E 0000    PHASE  E 0000

USER SYMBOLS
DIR     E 0000    DLYSW  E 0000    DOWN   C 0008    F12    C 0054    F3     C 0023    F9     C 0024
FAST    C 006B    FORM   C 0026    MOTOR  C 0000    PHASE  E 0000    UP     C 0038    WAIT   C 0059
WLOOP   C 0066

```
                        1  $      TITLE('RESET MOTOR ROUTINE') PAGEWIDTH(105) DEBUG
                        2                   ;WRITTEN 01/10/80
                        3                   ;UPDATED 11/17/81
                        4                   ;THIS ROUTINE DRIVES THE MOTOR DOWN TO THE LLS AND
                        5                   ;DETERMINES IF ANY OFFSET DUE TO DRAINAGE IS PRESENT
                        6                   ;THE STARTING POSITION FOR THE TEST IS THEN FOUND
                        7          NAME     RMOTOR
                        8          PUBLIC   RMOTOR,DRLLS
                        9          EXTRN    DIR,MOTOR,STEPC,VOL,S12C,KEYIN,PRESET,DLYSW
                       10          CSEG
0000 AF                11 RMOTOR   XRA      A
0001 3C                12          INR      A
0002 320000  E         13          STA      DIR              ;SET THE DIRECTION TO DOWN
0005 320000  E         14          STA      DLYSW            ;SET THE DELAY SWITCH FOR FAST RATE (25.5 MS STEP)
0008 CD5A00  C         15          CALL     DRLLS            ;DRIVE TO THE LOWER LIMIT SWITCH
000B AF                16          XRA      A
000C 320000  E         17          STA      DIR              ;SET THE DIRECTION TO UP
000F 320000  E         18          STA      DLYSW            ;RESET THE DELAY SWITCH FOR SLOW RATE(45MS/STEP)
0012 CD6900  C         19          CALL     DRTL             ;DRIVE UP TILL LIGHT IS SEEN
0015 0618              20          MVI      B,24             ;NOW WANT TO DRIVE UP FOR 2CC TO FIND
0017 1E01              21          MVI      E,1              ;ANY MENISCUS
0019 D5                22 LOOP1    PUSH     D                ;SAVE THE E REG VALUE
001A CD0000  E         23          CALL     MOTOR            ;STEP THE MOTOR
001D 3A0A70            24          LDA      700AH            ;GET THE MENISCUS DETECTOR STATUS BYTE
0020 E610              25          ANI      10H              ;MASK IN THE MENISCUS DETECTOR BIT
0022 C23A00  C         26          JNZ      NEW0             ;JUMP IF MENISCUS FOUND
0025 D1                27          POP      D                ;GET THE E REG VALUE
0026 1C                28          INR      E                ;KEEP TRACK OF THE NUMBER OF MOTOR STEPS
0027 05                29          DCR      B                ;BUMP THE 2 CC COUNTER
0028 C21900  C         30          JNZ      LOOP1            ;JUMP IF 2 CC HAVE NOT BEEN CHECKED
002B 3C                31          INR      A                ;NO MENISCUS FOUND IN 2 CC, GO BACK TO ZERO
002C 320000  E         32          STA      DIR              ;SET DIRECTION TO DOWN
002F CD5A00  C         33          CALL     DRLLS            ;DRIVE TO THE LOWER LIMIT SWITCH
0032 AF                34          XRA      A
0033 320000  E         35          STA      DIR              ;SET DIRECTION TO UP
0036 CD6900  C         36          CALL     DRTL             ;DRIVE UP TO LIGHT
0039 C9                37          RET
003A D1                38 NEW0     POP      D                ;GET THE E REG VALUE
003B 7B                39          MOV      A,E              ;NOW WE HAVE A NEW MENISCUS
003C 320000  E         40          STA      STEPC            ;SAVE THE NUMBER OF STEPS MOVED (.25)
003F FE0C              41          CPI      12               ;CHECK FOR 1 CC MOVED
0041 CA7800  C         42          JZ       VOL1             ;JUMP IF AT 1 CC MARK
0044 DA8100  C         43          JC       VOL2             ;JUMP IF < 1 CC MARK
0047 D60C              44          SUI      12               ;ELSE > 1 CC MARK
0049 FE0C              45          CPI      12               ;CHECK FOR 2 CC MARK
004B CA8800  C         46          JZ       VOL3             ;JUMP IF AT 2 CC MARK
004E 320000  E         47          STA      S12C             ;ELSE > 1 CC BUT < 2 CC
0051 3E01              48          MVI      A,1
0053 320000  E         49          STA      VOL              ;UPDATE THE VOLUME COUNTER
0056 CD6900  C         50          CALL     DRTL             ;DRIVE UP TO LIGHT
0059 C9                51          RET
005A 3A0A70            52 DRLLS    LDA      700AH            ;GET THE LIMIT SWITCH STATUS BYTE
005D E602              53          ANI      2                ;GET THE LLS BIT
005F C8                54          RZ                        ;RETURN WHEN AT LLS
0060 CD0000  E         55          CALL     MOTOR            ;GO STEP THE MOTOR
0063 CD9100  C         56          CALL     CKIN             ;CHECK FOR THE RESET KEY
0066 C35A00  C         57          JMP      DRLLS            ;CHECK AGAIN
0069 3A0A70            58 DRTL     LDA      700AH            ;GET THE MENISCUS DETECTOR STATUS BYTE
006C E610              59          ANI      10H              ;MASK IN THE MENISCUS DETECTOR BIT
```

```
006E C8              60         RZ                   ;RETURN WHEN WE SEE LIGHT (0 = LIGHT)
006F CD0000    E     61         CALL    MOTOR        ;GO STEP THE MOTOR
0072 CD9100    C     62         CALL    CKIN         ;CHECK FOR THE RESET KEY
0075 C36900    C     63         JMP     DRTL         ;CHECK AGAIN
0078 3E01            64 VOL1    MVI     A,1
007A 320000    E     65         STA     VOL          ;SET VOLUME COUNTER TO 1 CC
007D CD6900    C     66         CALL    DRTL         ;GO UP TO LIGHT DETECTED
0080 C9              67         RET
0081 320000    E     68 VOL2    STA     S12C         ;SAVE THE STEP COUNT
0084 CD6900    C     69         CALL    DRTL         ;GO DRIVE TO LIGHT
0087 C9              70         RET
0088 3E02            71 VOL3    MVI     A,2
008A 320000    E     72         STA     VOL          ;SET VOLUME COUNT TO 2 CC
008D CD6900    C     73         CALL    DRTL         ;GO DRIVE TO LIGHT
0090 C9              74         RET
0091 CD0000    E     75 CKIN    CALL    KEYIN        ;GO SAMPLE THE KEYBOARD
0094 17              76         RAL                  ;CHECK FOR ANY CHARACTERS, LOOK AT BIT 8
0095 D8              77         RC                   ;IF NONE, RETURN
0096 1F              78         RAR                  ;GET THE CHARACTER
0097 FE14            79         CPI     20           ;IS IT THE RESET KEY
0099 CA9D00    C     80         JZ      CLEAN        ;IF YES, CLEAN UP THE STACK POINTER
009C C9              81         RET                  ;ELSE, RETURN
009D F1              82 CLEAN   POP     PSW          ;ADJUST THE STACK POINTER
009E F1              83         POP     PSW
009F F1              84         POP     PSW
00A0 C30000    E     85         JMP     PRESET       ;GO PROCESS THE RESET KEY
0000            C    86         END     RMOTOR
```

PUBLIC SYMBOLS
DRLLS  C 005A    RMOTOR C 0000

EXTERNAL SYMBOLS
DIR    E 0000    DLYSW  E 0000    KEYIN  E 0000    MOTOR  E 0000    PRESET E 0000    S12C   E 0000
STEPC  E 0000    VOL    E 0000

USER SYMBOLS
CKIN   C 0091    CLEAN  C 009D    DIR    E 0000    DLYSW  E 0000    DRLLS  C 005A    DRTL   C 0069
KEYIN  E 0000    LOOP1  C 0019    MOTOR  E 0000    NEW0   C 003A    PRESET E 0000    RMOTOR C 0000
S12C   E 0000    STEPC  E 0000    VOL    E 0000    VOL1   C 0078    VOL2   C 0081    VOL3   C 0088

```
                    1  $        TITLE('CHECK FOR END OF TEST ROUTINE') PAGEWIDTH(105) DEBUG
                    2                                  ;WRITTEN 01/31/80
                    3                                  ;UPDATED 05/04/82
                    4                                  ;THIS ROUTINE CHECKS WHICH END MODE HAS BEEN
                    5                                  ;PROGRAMMED AND EXECUTES THE FINAL HEAT SETTING
                    6                                  ;THE END MODES ARE: END AT TEMPERATURE, END AT
                    7                                  ;DRY POINT, END AT % RECOVERED, AND END AT END POINT
                    8          NAME    ENDT
                    9          PUBLIC  ENDT,VOLCAL,MOVE
                   10          EXTRN   EMODE,STEPC,FHMARK,IFH,IFHT,IPSL,IPSM,VOL,EATREC
                   11          EXTRN   EPCNTL,DPCNTL,ENDIT,MINL,MINM,MAXL,MAXM,TIMEL,CKENDT
                   12          EXTRN   SETPTL,SETPTM,IFHC,RCNTL,PRINT,PRINTB,UNPAK,DIVIDE
                   13          EXTRN   BINBCD,DBUF,PTEMP,PHASE,ETCNTL,WATTL,WATTM,IBUF
                   14          CSEG
0000 3A0000    E    15 ENDT    LDA     EMODE        ;GET THE END MODE BYTE
0003 1F              16         RAR                  ;CHECK THE END AT TEMP BIT
0004 DA1A00    C     17         JC      ETMP         ;IF = 1, DO THE END AT TEMPERATURE CHECK
0007 1F              18         RAR                  ;ELSE, LOOK AT THE END AT DRY POINT BIT
0008 DA2100    C     19         JC      EDP          ;IF = 1, DO THE END AT DRY POINT CHECK
000B 1F              20         RAR                  ;ELSE, LOOK AT THE END AT % RECOVERED BIT
000C DA3C00    C     21         JC      EREC         ;IF = 1, DO THE END AT % RECOVERED CHECK
000F CD6200    C     22         CALL    CKFHM        ;ELSE, MUST BE END AT END POINT
0012 D8              23         RC                   ;IF NOT AT FINAL HEAT MARK, RETURN
0013 CD6E00    C     24         CALL    FHSET        ;ELSE, SET THE FINAL HEAT
0016 F1              25         POP     PSW          ;REMOVE THE RETURN ADDRESS OFF THE STACK
0017 C30000    E     26         JMP     EPCNTL       ;GO DO THE END POINT CONTROL
```

| | | | | | | |
|---|---|---|---|---|---|---|
| 001A CD6200 | C | 27 ETMP: | CALL | CKFHM | ;CHECK IF AT FINAL HEAT MARK |
| 001D DA2700 | C | 28 | JC | CKT | ;IF NOT AT FINAL HEAT MARK, CHECK FOR END TEMP |
| 0020 CD6E00 | C | 29 | CALL | FHSET | ;ELSE, SET THE FINAL HEAT |
| 0023 F1 | | 30 | POP | PSW | ;REMOVE THE RETURN ADDRESS OFF THE STACK |
| 0024 C30000 | E | 31 | JMP | ETCNTL | ;GO DO THE END AT TEMPERATURE CONTROL |
| 0027 CD0000 | E | 32 CKT: | CALL | CKENDT | ;CHECK FOR THE END TEMPERATURE |
| 002A CA0000 | E | 33 | JZ | ENDIT | ;IF AT END TEMP, GO TO ENDIT ROUTINE |
| 002D D20000 | E | 34 | JNC | ENDIT | ;GO TO END OF TEST IF PAST END TEMP |
| 0030 C9 | | 35 | RET | | ;ELSE, RETURN |
| 0031 CD6200 | C | 36 EDP: | CALL | CKFHM | ;CHECK IF AT FINAL HEAT MARK |
| 0034 D8 | | 37 | RC | | ;IF NOT AT FINAL HEAT MARK, RETURN |
| 0035 CD6E00 | C | 38 | CALL | FHSET | ;ELSE, SET THE FINAL HEAT |
| 0038 F1 | | 39 | POP | PSW | ;REMOVE THE RETURN ADDRESS OFF THE STACK |
| 0039 C30000 | E | 40 | JMP | DPCNTL | ;GO DO THE DRY POINT CONTROL |
| 003C 3A0000 | E | 41 EREC: | LDA | VOL | ;GET THE PRESENT VOLUME |
| 003F 47 | | 42 | MOV | B,A | ;SAVE IT |
| 0040 210000 | E | 43 | LXI | H,EATREC | ;POINT TO THE END AT % RECOVERED SYSTEM PARAMETER |
| 0043 7E | | 44 | MOV | A,M | ;GET THE ASCII MSBYTE |
| 0044 17 | | 45 | RAL | | ;CONVERT THE ASCII END VOLUME TO PACKED BCD |
| 0045 17 | | 46 | RAL | | |
| 0046 17 | | 47 | RAL | | |
| 0047 17 | | 48 | RAL | | |
| 0048 E6F0 | | 49 | ANI | 0F0H | |
| 004A 4F | | 50 | MOV | C,A | ;SAVE THIS MS DIGIT |
| 004B 23 | | 51 | INX | H | ;POINT TO THE LSBYTE |
| 004C 7E | | 52 | MOV | A,M | ;GET THE ASCII LSBYTE |
| 004D E60F | | 53 | ANI | 0FH | |
| 004F 81 | | 54 | ADD | C | |
| 0050 90 | | 55 | SUB | B | ;DO END VOLUME - PRESENT VOLUME |
| 0051 CA0000 | E | 56 | JZ | ENDIT | ;IF EQUAL, GO TO THE END OF THE TEST |
| 0054 DA0000 | E | 57 | JC | ENDIT | ;IF PAST END VOLUME, GO TO ENDIT ROUTINE |
| 0057 CD6200 | C | 58 | CALL | CKFHM | ;CHECK IF AT FINAL HEAT MARK |
| 005A D8 | | 59 | RC | | ;IF NOT AT FINAL HEAT MARK, RETURN |
| 005B CD6E00 | C | 60 | CALL | FHSET | ;ELSE, SET THE FINAL HEAT MARK |
| 005E F1 | | 61 | POP | PSW | ;REMOVE THE RETURN ADDRESS OFF THE STACK |
| 005F C30000 | E | 62 | JMP | RCNTL | ;GO DO THE RATE CONTROL |
| 0062 2A0000 | E | 63 CKFHM: | LHLD | STEPC | ;GET THE STEP COUNTER |
| 0065 EB | | 64 | XCHG | | ;PUT IT IN THE D,E PAIR |
| 0066 2A0000 | E | 65 | LHLD | FHMARK | ;GET THE FINAL HEAT MARK |
| 0069 7B | | 66 | MOV | A,E | ;DO STEPC - FHMARK |
| 006A 95 | | 67 | SUB | L | |
| 006B 7A | | 68 | MOV | A,D | |
| 006C 9C | | 69 | SBB | H | |
| 006D C9 | | 70 | RET | | |
| 006E F3 | | 71 FHSET: | DI | | ;DISABLE INTERRUPTS |
| 006F 2A0000 | E | 72 | LHLD | IFHC | ;GET THE INCREASE FINAL HEAT VALUE (COUNTS) |
| 0072 3A0000 | E | 73 | LDA | IFHT | ;GET THE SIGN OF THE INCREASE FINAL HEAT VALUE |
| 0075 FE2D | | 74 | CPI | '-' | ;CHECK FOR A NEGATIVE VALUE |
| 0077 CA1E01 | C | 75 | JZ | CAL2 | ;IF NEGATIVE, DECREASE THE POWER |
| 007A 3A0000 | E | 76 | LDA | IPSL | ;GET THE PRESENT WATTAGE SETTING LSB'S |
| 007D 95 | | 77 | SUB | L | ;COMPUTE THE FINAL HEAT SETTING, INCREASE POWER |
| 007E 4F | | 78 | MOV | C,A | ;DO IPSL - IFHC |
| 007F 3A0000 | E | 79 | LDA | IPSM | ;GET THE PRESENT WATTAGE SETTING MSB'S |
| 0082 9C | | 80 | SBB | H | |
| 0083 47 | | 81 | MOV | B,A | ;B,C PAIR = NEW PHASE ANGLE COUNTS |
| 0084 DC0C01 | C | 82 | CC | FMIN | ;IF UNDERFLOW, FORCE MAXIMUM POWER |
| 0087 CDF500 | C | 83 | CALL | LIMCK | ;CHECK FOR MIN & MAX LIMITS |
| 008A 2A0000 | E | 84 | LHLD | IFH | ;GET THE INCREASE FINAL HEAT BINARY SETTING |
| 008D 3A0000 | E | 85 | LDA | WATTL | ;CALCULATE THE NEW SET POINT BY DOING |
| 0090 85 | | 86 | ADD | L | ;WATTL & WATTM + IFH |
| 0091 320000 | E | 87 | STA | SETPTL | ;UPDATE THE SET POINT |
| 0094 3A0000 | E | 88 | LDA | WATTM | |
| 0097 8C | | 89 | ADC | H | |
| 0098 320000 | E | 90 | STA | SETPTM | |
| 009B 211770 | | 91 UPDATE | LXI | H,7017H | ;POINT TO THE CLOCK CONTROL PORT |
| 009E 36B4 | | 92 | MVI | M,0B4H | ;SET COUNTER 2 TO MODE 2 |
| 00A0 2B | | 93 | DCX | H | ;POINT TO COUNTER 2 DATA PORT |

```
00A1 36FF          94        MVI    M,0FFH    ;LOAD THE FULL COUNT
00A3 36FF          95        MVI    M,0FFH    ;THIS WILL BE CHECKED IN DPCNTL & TMPTM
00A5 211170        96        LXI    H,7011H   ;POINT TO THE PHASE CONTROL DATA PORT
00A8 79            97        MOV    A,C       ;UPDATE THE POWER SETTING
00A9 71            98        MOV    M,C
00AA 320000   E    99        STA    IPSL
00AD 78           100        MOV    A,B
00AE 70           101        MOV    M,B
00AF 320000   E   102        STA    IPSM
00B2 AF           103        XRA    A
00B3 320000   E   104        STA    TIMEL     ;RESET THIS TIMER TO ZERO
00B6 210000       105        LXI    H,0
00B9 220000   E   106        SHLD   PTEMP     ;ZERO THE PREVIOUS TEMP LOCATIONS
00BC 3A0000   E   107        LDA    PHASE     ;WANT TO TURN ON THE ALARM
00BF F640         108        ORI    40H
00C1 320000   E   109        STA    PHASE     ;UPDATE THE PHASE CONTROL BYTE
00C4 320A70       110        STA    700AH     ;OUTPUT THE CONTROL BYTE
00C7 210A00   E   111        LXI    H,IBUF+10
00CA 110C00   E   112        LXI    D,PRINTB+12
00CD 0606         113        MVI    B,6       ;MOVE THE TEMPERATURE OVER 2 PLACES IN THE BUFFER
00CF CDA001   C   114        CALL   MOVE
00D2 CD4A01   C   115        CALL   VOLCAL    ;GO CALCULATE THE PRESENT VOLUME (XX.XML)
00D5 3E20         116        MVI    A,' '     ;LOAD UP ASCII BLANKS
00D7 0605         117        MVI    B,5
00D9 210D00   E   118        LXI    H,PRINTB+13
00DC 77           119 LOOP:  MOV    M,A
00DD 23           120        INX    H
00DE 05           121        DCR    B
00DF C2DC00   C   122        JNZ    LOOP
00E2 3646         123        MVI    M,'F'     ;PUT THE FINAL HEAT POINT MESSAGE (FH) IN
00E4 23           124        INX    H
00E5 3648         125        MVI    M,'H'
00E7 CD0000   E   126        CALL   PRINT     ;PRINT THE BUFFER
00EA 110100       127        LXI    D,1
00ED 2194FC       128        LXI    H,64660   ;WANT TO DELAY 7 MS FOR COUNTER 2 TO LOAD
00F0 19           129 WAIT:  DAD    D
00F1 D2F000   C   130        JNC    WAIT
00F4 C9           131        RET
00F5 3A0000   E   132 LIMCK: LDA    MINL      ;CHECK FOR MIN & MAX POWER LIMITS
00F8 91           133        SUB    C
00F9 3A0000   E   134        LDA    MINM
00FC 98           135        SBB    B
00FD D20C01   C   136        JNC    FMIN      ;IF NO CARRY, FORCE MINIMUM COUNTS
0100 3A0000   E   137        LDA    MAXL      ;DO MAXIMUM COUNTS - CALCULATED COUNTS
0103 91           138        SUB    C
0104 3A0000   E   139        LDA    MAXM
0107 98           140        SBB    B
0108 DA1501   C   141        JC     FMAX      ;IF CARRY =1, FORCE MAXIMUM COUNTS
010B C9           142        RET
010C 3A0000   E   143 FMIN:  LDA    MINL      ;FORCE MINIMUM COUNTS, MAXIMUM POWER
010F 4F           144        MOV    C,A
0110 3A0000   E   145        LDA    MINM
0113 47           146        MOV    B,A
0114 C9           147        RET
0115 3A0000   E   148 FMAX:  LDA    MAXL      ;FORCE MAXIMUM COUNTS, MINIMUM POWER
0118 4F           149        MOV    C,A
0119 3A0000   E   150        LDA    MAXM
011C 47           151        MOV    B,A
011D C9           152        RET
011E 3A0000   E   153 CAL2:  LDA    IPSL
0121 85           154        ADD    L
0122 4F           155        MOV    C,A
0123 3A0000   E   156        LDA    IPSM
0126 8C           157        ADC    H
0127 47           158        MOV    B,A
0128 CDF500   C   159        CALL   LIMCK     ;CHECK FOR MIN & MAX LIMITS
012B 2A0000   E   160        LHLD   IFH       ;CALCULATE THE NEW SET POINT
```

| | | | | | | |
|---|---|---|---|---|---|---|
| 012E 2A0000 | E | 161 | | LDA | WATTL | ;DO WATTL & WATTM - IFH |
| 0131 95 | | 162 | | SUB | L | |
| 0132 6F | | 163 | | MOV | L,A | |
| 0133 3A0000 | E | 164 | | LDA | WATTM | |
| 0136 9C | | 165 | | SBB | H | |
| 0137 67 | | 166 | | MOV | H,A | |
| 0138 DC4601 | C | 167 | | CC | F10 | ;IF UNDERFLOW, FORCE SET POINT = 10 WATTS |
| 013B 7D | | 168 | | MOV | A,L | ;UPDATE THE SET POINT |
| 013C 320000 | E | 169 | | STA | SETPTL | |
| 013F 7C | | 170 | | MOV | A,H | |
| 0140 320000 | E | 171 | | STA | SETPTM | |
| 0143 C39B00 | C | 172 | | JMP | UPDATE | |
| 0146 210A00 | | 173 | F10: | LXI | H,10 | ;FORCE SET POINT OF 10 WATTS |
| 0149 C9 | | 174 | | RET | | |
| 014A 2A0000 | E | 175 | VOLCAL: | LHLD | STEPC | ;GET THE STEP COUNTER |
| 014D 29 | | 176 | | DAD | H | ;WANT TO DO STEPC X 10 |
| 014E E5 | | 177 | | PUSH | H | |
| 014F 29 | | 178 | | DAD | H | |
| 0150 29 | | 179 | | DAD | H | |
| 0151 D1 | | 180 | | POP | D | |
| 0152 19 | | 181 | | DAD | D | |
| 0153 EB | | 182 | | XCHG | | ;NOW WANT TO DO (STEPC X 10) / 12 |
| 0154 210700 | E | 183 | | LXI | H,DBUF+7 | ;THIS WILL GIVE THE PRESENT VOLUME IN 0.1% |
| 0157 AF | | 184 | | XRA | A | |
| 0158 73 | | 185 | | MOV | M,E | ;SET UP THE DATA BUFFER FOR A DIVIDE |
| 0159 2B | | 186 | | DCX | H | |
| 015A 72 | | 187 | | MOV | M,D | |
| 015B 2B | | 188 | | DCX | H | |
| 015C 77 | | 189 | | MOV | M,A | |
| 015D 2B | | 190 | | DCX | H | |
| 015E 77 | | 191 | | MOV | M,A | |
| 015F 2B | | 192 | | DCX | H | |
| 0160 360C | | 193 | | MVI | M,12 | |
| 0162 2B | | 194 | | DCX | H | |
| 0163 77 | | 195 | | MOV | M,A | |
| 0164 CD0000 | E | 196 | | CALL | DIVIDE | ;DO THE DIVIDE |
| 0167 210000 | E | 197 | | LXI | H,DBUF | ;POINT TO THE RESULT |
| 016A 46 | | 198 | | MOV | B,M | |
| 016B 23 | | 199 | | INX | H | |
| 016C 4E | | 200 | | MOV | C,M | ;NOW SET UP THE DATA BUFFER FOR A BINBCD |
| 016D C5 | | 201 | | PUSH | B | ;SAVE THIS BINARY RESULT |
| 016E 210800 | E | 202 | | LXI | H,DBUF+8 | |
| 0171 71 | | 203 | | MOV | M,C | |
| 0172 2B | | 204 | | DCX | H | |
| 0173 70 | | 205 | | MOV | M,B | |
| 0174 AF | | 206 | | XRA | A | |
| 0175 2B | | 207 | | DCX | H | |
| 0176 77 | | 208 | | MOV | M,A | |
| 0177 2B | | 209 | | DCX | H | |
| 0178 77 | | 210 | | MOV | M,A | |
| 0179 CD0000 | E | 211 | | CALL | BINBCD | ;DO THE CONVERSION |
| 017C 210400 | E | 212 | | LXI | H,DBUF+4 | ;POINT TO THE RESULT |
| 017F 4E | | 213 | | MOV | C,M | |
| 0180 2B | | 214 | | DCX | H | |
| 0181 7E | | 215 | | MOV | A,M | |
| 0182 C630 | | 216 | | ADI | 30H | ;CONVERT THE MSDIGIT TO ASCII |
| 0184 210000 | E | 217 | | LXI | H,PRINTB | ;POINT TO THE PRINT BUFFER |
| 0187 77 | | 218 | | MOV | M,A | ;LOAD UP THE PRINT BUFFER WITH THE VOLUME |
| 0188 23 | | 219 | | INX | H | |
| 0189 79 | | 220 | | MOV | A,C | |
| 018A CD0000 | E | 221 | | CALL | UNPAK | ;GO UNPACK THE NEXT TWO DIGITS |
| 018D 77 | | 222 | | MOV | M,A | |
| 018E 23 | | 223 | | INX | H | |
| 018F 362E | | 224 | | MVI | M,'.' | |
| 0191 23 | | 225 | | INX | H | |
| 0192 79 | | 226 | | MOV | A,C | |
| 0193 E60F | | 227 | | ANI | 0FH | ;GET THE LSDIGIT |

```
0195 C630         228            ADI      30H       ;CONVERT IT TO ASCII
0197 77           229            MOV      M,A
0198 23           230            INX      H
0199 364D         231            MVI      M,'M'
019B 23           232            INX      H
019C 364C         233            MVI      M,'L'
019E C1           234            POP      B         ;GET THE BINARY STEP VALUE BACK
019F C9           235            RET
01A0 7E           236 MOVE:      MOV      A,M
01A1 12           237            STAX     D
01A2 2B           238            DCX      H
01A3 1B           239            DCX      D
01A4 05           240            DCR      B
01A5 C2A001    C  241            JNZ      MOVE
01A8 3E20         242            MVI      A,' '
01AA 12           243            STAX     D         ;PUT A BLANK HERE
01AB C9           244            RET
0000           C  245            END      ENDT
```

PUBLIC SYMBOLS
ENDT   C 0000   MOVE   C 01A0   VOLCAL C 014A

EXTERNAL SYMBOLS
BINBCD E 0000   CKENDT E 0000   DBUF   E 0000   DIVIDE E 0000   DPCNTL E 0000   EATREC E 0000
EMODE  E 0000   ENDIT  E 0000   EPCNTL E 0000   ETCNTL E 0000   FHMARK E 0000   IBUF   E 0000
IFH    E 0000   IFHC   E 0000   IFHT   E 0000   IPSL   E 0000   IPSM   E 0000   MAXL   E 0000
MAXM   E 0000   MINL   E 0000   MINM   E 0000   PHASE  E 0000   PPINT  E 0000   PPINTB E 0000
PTEMP  E 0000   RCNTL  E 0000   SETPTL E 0000   SETPTM E 0000   STEPC  E 0000   TIMEL  E 0000
UNPAK  E 0000   VOL    E 0000   WATTL  E 0000   WATTM  E 0000

USER SYMBOLS
BINBCD E 0000   CAL2   C 011E   CKENDT E 0000   CKFHM  C 0062   CKT    C 0027   DBUF   E 0000
DIVIDE E 0000   DPCNTL E 0000   EATREC E 0000   EDP    C 0031   EMODE  E 0000   ENDIT  E 0000
ENDT   C 0000   EPCNTL E 0000   EREC   C 003C   ETCNTL E 0000   ETMP   C 001A   F10    C 0146
FHMARK E 0000   FHSET  C 006E   FMAX   C 0115   FMIN   C 010C   IBUF   E 0000   IFH    E 0000
IFHC   E 0000   IFHT   E 0000   IPSL   E 0000   IPSM   E 0000   LIMCK  C 00F5   LOOP   C 00DC
MAXL   E 0000   MAXM   E 0000   MINL   E 0000   MINM   E 0000   MOVE   C 01A0   PHASE  E 0000
PRINT  E 0000   PRINTB E 0000   PTEMP  E 0000   RCNTL  E 0000   SETPTL E 0000   SETPTM E 0000
STEPC  E 0000   TIMEL  E 0000   UNPAK  E 0000   UPDATE C 009B   VOL    E 0000   VOLCAL C 014A
WAIT   C 00F0   WATTL  E 0000   WATTM  E 0000

```
                     1 $        TITLE('END AT TEMPERATURE CONTROL ROUTINE')
                     2 $        PAGEWIDTH(105) MOD85 DEBUG
                     3                    ;WRITTEN 11/17/80
                     4                    ;UPDATED 05/04/82
                     5                    ;THIS ROUTINE CHECKS FOR ENDING A TEST BY REACHING
                     6                    ;THE PROGRAMMED END TEMPERATURE, BY DETECTING A
                     7                    ;DECREASE IN TEMPERATURE > 0.5 DEGREES C, OR BY
                     8                    ;REACHING THE 5 MINUTE TIME LIMIT.
                     9        NAME   ETCNTL
                    10        PUBLIC ETCNTL,STOPA,CKENDT
                    11        EXTRN  KEYIN,PRESET,ETEMP,TEMPL,TEMPM,TMPTM,PHASE,R75SW,ENDIT
                    12        EXTRN  IMASK,DISPUP,R65SW,TIMEL,TRDR,LAGTBL
                    13        CSEG
0000 AF             14 ETCNTL: XRA    A
0001 320000    E    15         STA    R75SW      ;RESET THE INTERRUPT RST7.5 SWITCH
0004 3C             16         INR    A
0005 320000    E    17         STA    R65SW      ;SET THE INTERRUPT RST6.5 SWITCH
0008 3E19           18         MVI    A,19H      ;ENABLE RST7.5 & RST6.5
000A 320000    E    19         STA    IMASK      ;SET THE INTERRUPT MASK
000D 30             20         SIM
000E FB             21         EI
000F CD0000    E    22 INKEY:  CALL   DISPUP     ;GO UPDATE THE DISPLAY
0012 CD0000    E    23         CALL   TMPTM      ;GO CHECK FOR TEMP & TIME LIMITS
0015 CD0000    E    24         CALL   KEYIN      ;GO CHECK FOR ANY KEYBOARD CHARACTERS
0018 17             25         RAL               ;CHECK FOR ANY CHARACTERS, LOOK AT BIT 8
0019 DA2700    C    26         JC     FINAL      ;IF NONE, GO CHECK IF AT FINAL TEMP
```

```
001C 1F              27         RAR                  ;GET THE CHARACTER
001D FE14            28         CPI    20            ;IS IT THE RESET KEY
001F CA0000   E      29         JZ     PRESET        ;IF YES, GO PROCESS THE RESET KEY
0022 FE18            30         CPI    24            ;IS IT THE STOP ALARM KEY
0024 CC3700   C      31         CZ     STOPA         ;IF YES, GO TURN OFF THE ALARM
0027 CD4300   C      32 FINAL   CALL   CKENDT        ;GO CHECK IF AT THE END TEMPERATURE
002A CA0000   E      33         JZ     ENDIT         ;IF AT END TEMP, GO DO ENDIT ROUTINE
002D D20000   E      34         JNC    ENDIT         ;IF END TEMP < PRESENT TEMP, END THE TEST
0030 AF              35         XRA    A
0031 320000   E      36         STA    TIMEL         ;ZERO THE TIME COUNTER
0034 C30F00   C      37         JMP    INKEY         ;GO BACK AND WAIT FOR THE END
0037 3A0000   E      38 STOPA   LDA    PHASE         ;WANT TO TURN OFF THE ALARM
003A E6BF            39         ANI    0BFH          ;ZERO THE ALARM BIT
003C 320000   E      40         STA    PHASE         ;SAVE THE CONTROL BYTE
003F 320A70          41         STA    700AH         ;OUTPUT THE CONTROL BYTE
0042 C9              42         RET
0043 2A0000   E      43 CKENDT  LHLD   ETEMP         ;CHECK IF AT FINAL TEMP
0046 EB              44         XCHG                 ;D,E = END TEMP
0047 3A0000   E      45         LDA    TRDR          ;WANT TO CHECK FOR LAG MODES
004A E6F0            46         ANI    0F0H          ;MASK OUT THE OTHER RANGES
004C FE20            47         CPI    20H           ;LOOK FOR THE LAG RANGES
004E C25700   C      48         JNZ    NOLAG         ;IF NOT A LAG RANGE, LOOK AT ACTUAL TEMPS
0051 2A1800   E      49         LHLD   LAGTBL+24     ;GET THE LAG TEMP
0054 C35F00   C      50         JMP    CKTEMP        ;GO CHECK THE TEMPERATURE
0057 3A0000   E      51 NOLAG   LDA    TEMPL         ;DO PRESENT TEMP - END TEMP
005A 6F              52         MOV    L,A
005B 3A0000   E      53         LDA    TEMPM
005E 67              54         MOV    H,A           ;H,L = ACTUAL TEMP
005F 7D              55 CKTEMP  MOV    A,L           ;DO TEMP - END TEMP
0060 93              56         SUB    E
0061 7C              57         MOV    A,H
0062 9A              58         SBB    D
0063 C9              59         RET
0000          C      60         END    ETCNTL
```

PUBLIC SYMBOLS
CKENDT C 0043    ETCNTL C 0000    STOPA C 0037

EXTERNAL SYMBOLS
DISPUP E 0000    ENDIT E 0000    ETEMP  E 0000    IMASK E 0000    KEYIN E 0000    LAGTBL E 0000
PHASE  E 0000    PRESET E 0000   R65SW  E 0000    R75SW E 0000    TEMPL E 0000    TEMPM  E 0000
TIMEL  E 0000    TMPTM  E 0000   TRDR   E 0000

USER SYMBOLS
CKENDT C 0043    CKTEMP C 005F   DISPUP E 0000    ENDIT E 0000    ETCNTL C 0000   ETEMP  E 0000
FINAL  C 0027    IMASK  E 0000   INKEY  C 000F    KEYIN E 0000    LAGTBL E 0000   NOLAG  C 0057
PHASE  E 0000    PRESET E 0000   R65SW  E 0000    R75SW E 0000    STOPA  C 0037   TEMPL  E 0000
TEMPM  E 0000    TIMEL  E 0000   TMPTM  E 0000    TRDR  E 0000

```
                 1 $           TITLE('END AT % RECOVERED ROUTINE') PAGEWIDTH(105) MOD85 (E&OO)
                 2                                 ;WRITTEN 02/05/80
                 3                                 ;UPDATED 05/14/81
                 4                                 ;THIS ROUTINE CHECKS FOR ENDING A TEST BY REACHING
                 5                                 ;THE PROGRAMMED VOLUME, DETECTING A DECREASE IN
                 6                                 ;TEMPERATURE > 0.5 DEGREES, OR REACHING THE 5 MINUTE
                 7                                 ;TIME LIMIT
                 8              NAME    RCNTL
                 9              PUBLIC  RCNTL
                10              EXTRN   R75SW,KEYIN,PRESET,STOPA,EATREC,VOL,ENDIT,TMPTM
                11              EXTRN   IMASK,DISPUP,R65SW,TIMEL
                12              CSEG
0000 AF         13 RCNTL        XRA     A
0001 320000 E   14              STA     R75SW         ;RESET THE INTERRUPT RST7.5 SWITCH
0004 3C         15              INR     A
0005 320000 E   16              STA     R65SW         ;SET THE INTERRUPT RST6.5 SWITCH
0008 3E19       17              MVI     A,19H         ;ENABLE RST7.5 & RST6.5
```

```
000A 320000    E   18           STA      IMASK      ;SET THE INTERRUPT MASK
000D 30            19           SIM
000E FB            20           EI
000F CD0000    E   21  INKEY    CALL     DISPUP     ;GO UPDATE THE DISPLAY
0012 CD0000    E   22           CALL     TMPTM      ;GO CHECK FOR TEMP & TIME LIMITS
0015 CD0000    E   23           CALL     KEYIN      ;GO CHECK FOR ANY KEYBOARD CHARACTERS
0018 17            24           RAL                 ;CHECK FOR ANY CHARACTERS, LOOK AT BIT 6
0019 DA2700    C   25           JC       VOLCK      ;IF NONE, GO CHECK THE VOLUME LIMIT
001C 1F            26           RAR                 ;GET THE CHARACTER
001D FE14          27           CPI      20         ;IS IT THE RESET KEY?
001F CA0000    E   28           JZ       PRESET     ;IF YES, GO PROCESS THE RESET KEY
0022 FE18          29           CPI      24         ;IS IT THE STOP ALARM KEY?
0024 CC0000    E   30           CZ       STOPA      ;IF YES, GO TURN OFF THE ALARM
0027 210000    E   31  VOLCK    LXI      H,EATREC   ;POINT TO THE END VOLUME SYSTEM PARAMETER
002A 46            32           MOV      B,M        ;GET THE TEN'S DIGIT
002B 23            33           INX      H          ;POINT TO THE UNITS DIGIT
002C 7E            34           MOV      A,M        ;GET THE UNITS DIGIT
002D E60F          35           ANI      0FH        ;CONVERT FROM ASCII TO BCD
002F 4F            36           MOV      C,A        ;SAVE IT
0030 78            37           MOV      A,B        ;GET THE UNITS DIGIT
0031 17            38           RAL                 ;WANT TO PACK THE TWO DIGITS
0032 17            39           RAL
0033 17            40           RAL
0034 17            41           RAL
0035 E6F0          42           ANI      0F0H
0037 81            43           ADD      C
0038 47            44           MOV      B,A        ;SAVE THE PACKED VOLUME
0039 2A0000    E   45           LDA      VOL        ;GET THE PRESENT VOLUME
003C 90            46           SUB      B          ;DO PRESENT VOLUME - FINAL VOLUME
003D CA0000    E   47           JZ       ENDIT      ;END THE TEST IF EQUAL
0040 D20000    E   48           JNC      ENDIT      ;END THE TEST IF PAST FINAL VOLUME
0043 AF            49           XRA      A
0044 320000    E   50           STA      TIMEL      ;ZERO THE TIME COUNTER
0047 C30F00    C   51           JMP      INKEY      ;GO BACK AND WAIT FOR THE END
0000               52           END      PCNTL

EXTERNAL SYMBOLS
DISPUP E 0000    EATREC E 0000    ENDIT  E 0000    IMASK  E 0000    KEYIN  E 0000    PRESET E 0000
R65SW  E 0000    R75SW  E 0000    STOPA  E 0000    TIMEL  E 0000    TMPTM  E 0000    VOL    E 0000

USER SYMBOLS
DISPUP E 0000    EATREC E 0000    ENDIT  E 0000    IMASK  E 0000    INKEY  C 000F    KEYIN  E 0000
PRESET E 0000    R65SW  E 0000    R75SW  E 0000    PCNTL  C 0000    STOPA  E 0000    TIMEL  E 0000
TMPTM  E 0000    VOL    E 0000    VOLCK  C 0027

1  $         TITLE('END AT END POINT ROUTINE') PAGEWIDTH(105) MOD85 DEBUG
                    2                                 ;WRITTEN 02/05/80
                    3                                 ;UPDATED 05/14/81
                    4                                 ;THIS ROUTINE CHECKS FOR ENDING A TEST BY DETECTING
                    5                                 ;A DECREASE IN TEMPERATURE > 0.5 DEGREES OR REACHING
                    6                                 ;THE 5 MINUTE TIME LIMIT
                    7           NAME     EPCNTL
                    8           PUBLIC   EPCNTL
                    9           EXTRN    R75SW, KEYIN, PRESET, STOPA, TMPTM, IMASK, DISPUP
                   10           EXTRN    R65SW, TIMEL, EOT
                   11           CSEG
0000 AF            12  EPCNTL   XRA      A
0001 320000    E   13           STA      R75SW      ;RESET THE INTERRUPT RST7.5 SWITCH
0004 3C            14           INR      A
0005 320000    E   15           STA      R65SW      ;SET THE INTERRUPT RST6.5 SWITCH
0008 3E19          16           MVI      A,19H      ;ENABLE RST7.5 & RST6.5
000A 320000    E   17           STA      IMASK      ;SET THE INTERRUPT MASK
000D 30            18           SIM
000E FB            19           EI
000F CD0000    E   20  INKEY    CALL     KEYIN      ;GO CHECK FOR ANY KEYBOARD CHARACTERS
0012 17            21           RAL                 ;CHECK FOR ANY CHARACTERS, LOOK AT BIT 6
0013 DA2600    C   22           JC       CKT        ;IF NONE, GO CHECK FOR TEMP & TIME LIMITS
```

```
0016 1F              22      RAR                  ;GET THE CHARACTER
0017 FE14            23      CPI    20            ;IS IT THE RESET KEY?
0019 CA0000   E      25      JZ     PRESET        ;IF YES, GO PROCESS THE RESET KEY
001C FE17            26      CPI    23            ;IS IT THE D.P. KEY
001E CA0000   E      27      JZ     EOT           ;IF YES, GO END THE TEST
0021 FE18            28      CPI    24            ;IS IT THE STOP ALARM KEY?
0023 CC0000   E      29      CZ     STOPA         ;IF YES, GO TURN OFF THE ALARM
0026 CD0000   E      30 CKT  CALL   DISPUP        ;GO UPDATE THE DISPLAY
0029 CD0000   E      31      CALL   TMPTM         ;GO CHECK FOR TEMP & TIME LIMITS
002C AF              32      XRA    A
002D 320000   E      33      STA    TIMEL         ;ZERO THE TIME COUNTER
0030 C30F00   C      34      JMP    INKEY         ;GO BACK AND WAIT FOR THE END
0000                 C      35      END    EPCNTL
```

PUBLIC SYMBOLS
EPCNTL  C 0000

EXTERNAL SYMBOLS
DISPUP E 0000   EOT    E 0000   IMASK  E 0000   KEYIN  E 0000   PRESET E 0000   R6SSW  E 0000
R7SSW  E 0000   STOPA  E 0000   TIMEL  E 0000   TMPTM  E 0000

USER SYMBOLS
CKT    C 0026   DISPUP E 0000   EOT    E 0000   EPCNTL C 0000   IMASK  E 0000   INKEY  C 000F
KEYIN  E 0000   PRESET E 0000   R6SSW  E 0000   R7SSW  E 0000   STOPA  E 0000   TIMEL  E 0000
TMPTM  E 0000

```
                     1  $    TITLE('END AT DRY POINT ROUTINE') PAGEWIDTH(105) MOD85 DEBUG
                     2            ;WRITTEN 02/05/80
                     3            ;UPDATED 11/17/81
                     4            ;THIS ROUTINE CHECKS FOR ENDING A TEST BY CHECKING
                     5            ;THE PROGRAMMED DROP TIME INTERVAL (1.2 SEC),
                     6            ;REACHING THE 5 MINUTE TIME LIMIT, HITTING
                     7            ;THE D.P. KEY FOR A MANUAL DRY POINT, OR BY
                     8            ;DETECTING A DROP IN TEMP > 0.5 DEGREES
                     9      NAME   DPCNTL
                    10      PUBLIC DPCNTL
                    11      EXTRN  R5SSW,R6SSW,R7SSW,IMASK,TIMEL,KEYIN,DISPUP,DPTIME,TMPTM
                    12      EXTRN  PRESET,STOPA
                    13      CSEG
0000 AF             14 DPCNTL XRA   A
0001 320000   E     15      STA    R7SSW         ;SET THE INTERRUPT RST7.5 SWITCH = 0
0004 3C             16      INR    A
0005 320000   E     17      STA    R6SSW         ;SET THE INTERRUPT RST6.5 SWITCH = 1
0008 3E19           18      MVI    A,19H         ;ENABLE RST7.5 & RST6.5
000A 320000   E     19      STA    IMASK         ;UPDATE THE INTERRUPT MASK
000D 30             20      SIM
000E FB             21      EI
000F AF             22 INKEY XRA   A
0010 320000   E     23      STA    TIMEL         ;ZERO THE TIME COUNTER
0013 CD6400   C     24      CALL   INKEY         ;GO CHECK THE KEYBOARD FOR ENTRIES
0016 CD0000   E     25      CALL   DISPUP        ;GO UPDATE THE DISPLAY
0019 211770         26      LXI    H,7917H       ;POINT TO THE CLOCK CONTROL PORT
001C 3680           27      MVI    M,80H         ;LATCH THE PRESENT TIME IN COUNTER 2
001E 2B             28      DCX    H             ;POINT TO TIMER 2 DATA PORT
001F 7E             29      MOV    A,M
0020 56             30      MOV    D,M           ;GET THE PRESENT TIME
0021 D6A7           31      SUI    0A7H          ;CHECK FOR A 5 SEC TIME OUT. THIS IS FOR CORRECTING
0023 7A             32      MOV    A,D           ;THE POWER FOR 5 SEC AFTER FINAL HEAT IS SET
0024 DEFD           33      SBI    0FDH          ;DO LOAD TIME (FFFFH) - 5 SEC MARK (FDA7H)
0026 D20F00   C     34      JNC    INKEY         ;IF NOT TIMED OUT, WAIT
0029 F3             35      DI                   ;IF TIMED OUT, CHANGE THE RST7.5 SERVICE ROUTINE
002A 3E01           36      MVI    A,1
002C 320000   E     37      STA    R5SSW         ;SET THE INTERRUPT RST5.5 SWITCH = 1
002F 07             38      RLC
0030 07             39      RLC
0031 320000   E     40      STA    R7SSW         ;SET THE INTERRUPT RST7.5 SWITCH = 4
0034 2A0000   E     41      LHLD   DPTIME        ;GET THE DROP TIME (COUNTS)
```

```
0037 EB              42          XCHG
0038 211370          43          LXI     H,7013H   ;POINT TO THE TIMER CONTROL PORT
003B 3634            44          MVI     M,34H     ;SET TIMER 0 TO MODE 2
003D 211070          45          LXI     H,7010H   ;POINT TO TIMER 0 DATA PORT
0040 73              46          MOV     M,E       ;LOAD UP THE DROP TIME
0041 72              47          MOV     M,D
0042 110100          48          LXI     D,1
0045 2194FC          49          LXI     H,64660
0048 19          50  WAIT        DAD     D         ;WAIT FOR TIMER 0 TO LOAD
0049 C24800      C   51          JNC     WAIT
004C 3E18            52          MVI     A,18H     ;ENABLE RST5.5, RST6.5, & RST7.5
004E 320000      E   53          STA     IMASK
0051 30              54          SIM
0052 FB              55          EI
0053 CD6400      C   56  IKEY    CALL    INKEY     ;GO CHECK FOR KEYBOARD ENTRIES
0056 FE17            57          CPI     23        ;TRAP ON THE D.F. KEY (MANUAL DRY POINT)
0058 CA7900      C   58          JZ      MANDP     ;IF = 23, MANUAL DRY POINT REQUESTED
005B CD0000      E   59          CALL    DISPUP    ;GO UPDATE THE DISPLAY
005E CD0000      E   60          CALL    TMPTM     ;GO CHECK FOR TEMP & TIME LIMITS
0061 C35300      C   61          JMP     IKEY
0064 CD0000      E   62  INKEY   CALL    KEYIN     ;GO SAMPLE THE KEYBOARD
0067 17              63          RAL               ;CHECK FOR ANY CHARACTERS, LOOK AT BIT 8
0068 D8              64          RC                ;RETURN IF NONE FOUND
0069 1F              65          RAR               ;GET THE CHARACTER
006A FE14            66          CPI     20        ;IS IT THE RESET KEY?
006C CA7500      C   67          JZ      RESET     ;IF YES, GO DO IT
006F FE18            68          CPI     24        ;IS IT THE STOP ALARM KEY?
0071 CC0000      E   69          CZ      STOPA     ;IF YES, GO TURN OFF THE ALARM
0074 C9              70          RET               ;IGNORE ANY OTHER KEY
0075 F1              71  RESET   POP     PSW       ;POP THE RETURN ADDRESS OFF THE STACK
0076 C30000      E   72          JMP     PRESET    ;GO PROCESS THE RESET KEY
0079 F3              73  MANDP   DI                ;DISABLE INTERRUPTS SO THAT THE SERVICE ROUTINE
007A 3E02            74          MVI     A,2       ;FOR RST5.5 CAN BE CHANGED. WE WANT TO MEASURE THE
007C 320000      E   75          STA     R55SW     ;DROP TIME BETWEEN THE LAST DROP & THE NEXT DROP
007F 3E18            76          MVI     A,18H     ;ENABLE RST5.5, RST6.5, & RST7.5
0081 30              77          SIM
0082 FB              78          EI
0083 C35300      C   79          JMP     IKEY      ;GO WAIT FOR INTERRUPTS
0000                C   80          END     DPCNTL
```

PUBLIC SYMBOLS
DPCNTL C 0000

EXTERNAL SYMBOLS
DISPUP E 0000  DPTIME E 0000  IMASK E 0000  KEYIN E 0000  PRESET E 0000  R55SW E 0000
R65SW E 0000   R75SW E 0000   STOPA E 0000  TIMEL E 0000  TMPTM E 0000

USER SYMBOLS
DISPUP E 0000  DPCNTL C 0000  DPTIME E 0000  IKEY C 0053  IMASK E 0000  INKEY C 0064
INPKEY C 000F  KEYIN E 0000   MANDP C 0079   PRESET E 0000  R55SW E 0000  R65SW E 0000
R75SW E 0000   RESET C 0075   STOPA E 0000   TIMEL E 0000   TMPTM E 0000  WAIT C 0048

```
                    1 $      TITLE('TEMPERATURE DECREASE AND TIME LIMIT ROUTINE')
                    2 $      PAGEWIDTH(105) DEBUG
                    3                   ;WRITTEN 11/17/80
                    4                   ;UPDATED 07/28/81
                    5                   ;THIS ROUTINE CHECKS FOR TWO CONDITIONS WHICH WILL
                    6                   ;END THE TEST 1) A DECREASE IN TEMPERATURE > 0.5
                    7                   ;DEGREES  2) THE TIME FROM THE FINAL HEAT ADJUSTMENT
                    8                   ;POINT > 5 MINUTES
                    9           NAME    TMPTM
                   10           PUBLIC  TMPTM, CK5MIN, SERVOL
                   11           EXTRN   TEMPL, TEMPM, EOT, PHASE, PRINT, PRINTB, DRAIN, VOLCAL, IBUF, EPVOL
                   12           EXTRN   TDRP, LAGTBL, TVP, EPT, PLOOP, PTEMP, SATEMP, PMES3, PMES4
                   13           CSEG
0000 2A0000    E   14  TMPTM    LHLD    PTEMP     ;GET THE PREVIOUS 'HIGHEST' TEMP
```

```
0003 EB            15           XCHG              ;PUT IT IN THE D,E PAIR
0004 3A0000  E     16           LDA   TRDR        ;WANT TO CHECK FOR LAG MODES
0007 E6F0          17           ANI   0F0H        ;MASK OUT THE OTHER RANGES
0009 FE20          18           CPI   20H         ;LOOK FOR THE LAG RANGES
000B C21400  C     19           JNZ   NOLAG       ;IF NOT A LAG RANGE, LOOK AT ACTUAL TEMPS
000E 2A1800  E     20           LHLD  LAGTBL+24   ;GET THE LAG TEMP
0011 C31700  C     21           JMP   TMPCK       ;DO THE TEMP CHECK
0014 2A0000  E     22  NOLAG    LHLD  TEMPL       ;GET THE ACTUAL (NO LAG) TEMP
0017 7D            23  TMPCK    MOV   A,L         ;DO PRESENT TEMP - PREVIOUS (HIGHEST) TEMP
0018 93            24           SUB   E
0019 5F            25           MOV   E,A         ;SAVE THIS RESULT (COULD BE < 0)
001A 7C            26           MOV   A,H         ;SAVE THE PRESENT TEMP IN THE B,C PAIR
001B 9A            27           SBB   D
001C D25A00  C     28           JNC   UPDATE      ;JUMP IF PRESENT TEMP > PREVIOUS TEMP
001F 7B            29           MOV   A,E         ;ELSE, CHECK IF RESULT IS > 1.0 DEGREES
0020 C609          30           ADI   9
0022 D25300  C     31           JNC   REST        ;IF YES, END THE TEST
0025 211770        32  CK5MIN   LXI   H,7017H     ;POINT TO THE CLOCK CONTROL PORT
0028 3680          33           MVI   M,80H       ;LATCH IN THE PRESENT TIME COUNT
002A 2B            34           DCX   H           ;POINT TO TIMER 2 DATA PORT
002B 7E            35           MOV   A,M         ;GET THE TIME LSB'S
002C 56            36           MOV   D,M         ;GET THE TIME MSB'S
002D D65F          37           SUI   5FH         ;CHECK FOR A 5 MINUTE TIME OUT
002F 7A            38           MOV   A,D         ;DO LOAD TIME (FFFFH) - 5 MIN MARK (??5FH)
0030 DE73          39           SBI   73H
0032 D0            40           RNC               ;RETURN IF NO TIME OUT
0033 F3            41           DI                ;ELSE, TURN OFF THE POWER, ALARM, AND
0034 211170        42           LXI   H,7011H     ;TURN OFF THE POWER
0037 3600          43           MVI   M,0
0039 3640          44           MVI   M,40H       ;FORCE THE PHASE CONTROL TO A BIG NUMBER
003B 3A0000  E     45           LDA   PHASE       ;GET THE PHASE CONTROL BYTE
003E E6BF          46           ANI   0BFH        ;TURN OFF ALARM
0040 320000  E     47           STA   PHASE       ;UPDATE THE CONTROL BYTE
0043 320A70        48           STA   700AH       ;OUTPUT THE CONTROL BYTE
0046 CD9900  C     49           CALL  ENDPT       ;GO PRINT OUT THE END PT MESSAGE
0049 210000  E     50           LXI   H,FMESS     ;POINT TO THE END > 5.0 MIN MESSAGE
004C CD0000  E     51           CALL  FLOOP       ;PRINT OUT THE MESSAGE
004F F1            52           POP   PSW         ;CORRECT THE STACK POINTER
0050 C30000  E     53           JMP   DRAIN       ;GO TO THE DRAIN ROUTINE
0053 F1            54  REST     POP   PSW         ;CORRECT THE STACK POINTER
0054 CD9900  C     55           CALL  ENDPT       ;GO PRINT OUT THE END PT MESSAGE
0057 C30000  E     56           JMP   EOT         ;END THE TEST
005A 220000  E     57  UPDATE   SHLD  PTEMP       ;UPDATE THE PTEMP LOCATION
005D 210400  E     58           LXI   H,IBUF+4    ;GET THE ASCII TEMP FROM THE INSERT BUFFER
0060 110000  E     59           LXI   D,SATEMP    ;WANT TO SAVE THIS HIGHER ASCII TEMP
0063 0607          60           MVI   B,7
0065 CD6B00  C     61           CALL  LOOP        ;DO THE SAVE LOOP
0068 C32500  C     62           JMP   CK5MIN      ;GO CHECK FOR A TIME OUT
006B 7E            63  LOOP     MOV   A,M         ;GET A PRINT CHARACTER
006C 12            64           STAX  D           ;PUT IT IN THE PRINT BUFFER
006D 23            65           INX   H           ;POINT TO THE NEXT CHARACTER
006E 13            66           INX   D           ;POINT TO THE NEXT PRINT BUFFER LOCATION
006F 05            67           DCR   B           ;BUMP THE LOOP COUNTER
0070 C26B00  C     68           JNZ   LOOP        ;IF NOT DONE, GET ANOTHER CHARACTER
0073 C9            69           RET
0074 210000  E     70  SEPVOL   LXI   H,EPVOL     ;POINT TO THE END POINT VOLUME SAVE LOCATIONS
0077 110000  E     71           LXI   D,PRINTB    ;POINT TO THE ASCII END POINT
007A 1A            72           LDAX  D
007B 77            73           MOV   M,A
007C 23            74           INX   H
007D 13            75           INX   D
007E 1A            76           LDAX  D
007F 77            77           MOV   M,A
0080 23            78           INX   H
0081 13            79           INX   D
0082 13            80           INX   D
0083 1A            81           LDAX  D
```

```
0084 77              82         MOV    M,A
0085 2A0000    E     83         LHLD   TVP     ;GET THE TEMP VOLUME POINTER
0088 220000    E     84         SHLD   EPT     ;SAVE THE POINTER TO THE END POINT TEMP
008B 3A0000    E     85         LDA    TEMPL   ;GET THE END POINT TEMP
008E 77              86         MOV    M,A     ;PUT IT IN THE TABLE
008F 23              87         INX    H
0090 3A0000    E     88         LDA    TEMPM
0093 77              89         MOV    M,A
0094 23              90         INX    H
0095 220000    E     91         SHLD   TVP     ;UPDATE THE TABLE POINTER
0098 C9              92         RET
0099 210000    E     93 ENDPT   LXI    H,SATEMP
009C 110600    E     94         LXI    D,PRINTB+6
009F 0607            95         MVI    B,7
00A1 CD6B00    C     96         CALL   LOOP    ;MOVE THE HIGHEST TEMP IN THE BUFFER
00A4 CD0000    E     97         CALL   VOLCAL  ;GO CALCULATE THE PRESENT VOLUME
00A7 CD7400    C     98         CALL   SEPVOL  ;SAVE THE END POINT VOLUME
00AA 210000    E     99         LXI    H,PMES4 ;POINT TO THE END PT MESSAGE
00AD 110D00    E     100        LXI    D,PRINTB+13 ;POINT TO THE PRINT BUFFER
00B0 0607            101        MVI    B,7     ;LOAD THE LOOP COUNTER
00B2 CD6B00    C     102        CALL   LOOP    ;LOAD UP THE BUFFER
00B5 CD0000    E     103        CALL   PRINT   ;PRINT THE MESSAGE
00B8 C9              104        RET
0000           C     105        END    TMPTM
```

EXTERNAL SYMBOLS

| DRAIN | E 0000 | EOT | E 0000 | EPT | E 0000 | EPVOL | E 0000 | IBUF | E 0000 | LAGTBL | E 0000 |
| PHASE | E 0000 | PLOOP | E 0000 | PMES3 | E 0000 | PMES4 | E 0000 | PRINT | E 0000 | PRINTB | E 0000 |
| PTEMP | E 0000 | SATEMP | E 0000 | TEMPL | E 0000 | TEMPM | E 0000 | TRDR | E 0000 | TVP | E 0000 |
| VOLCAL | E 0000 |

USER SYMBOLS

| CK5MIN | C 0025 | DRAIN | E 0000 | ENDPT | C 0099 | EOT | E 0000 | EFT | E 0000 | EPVOL | E 0000 |
| IBUF | E 0000 | LAGTBL | E 0000 | LOOP | C 006B | NOLAG | C 0014 | PHASE | E 0000 | PLOOP | E 0000 |
| PMES3 | E 0000 | PMES4 | E 0000 | PRINT | E 0000 | PRINTB | E 0000 | PTEMP | E 0000 | REST | C 0053 |
| SATEMP | E 0000 | SEPVOL | C 0074 | TEMPL | E 0000 | TEMPM | E 0000 | TMPCK | C 0017 | TMPTM | C 0000 |
| TRDR | E 0000 | TVP | E 0000 | UPDATE | C 005A | VOLCAL | E 0000 |

HDM60  F1 EOT SRC

ISIS-II 8080/8085 MACRO ASSEMBLER, V2.0          EOT
END OF TEST ROUTINE

```
LOC    OBJ          SEQ          SOURCE STATEMENT

1 +        TITLE 'END OF TEST ROUTINE' PAGEWIDTH(100) PEROL
                      2                        ;WRITTEN 02/05/80
                      3                        ;UPDATED 11/17/81
                      4                        ;THIS ROUTINE IS EXECUTED WHEN THE END OF A TEST
                      5                        ;IS DETECTED IN 15 MINUTES
                      6          NAME   EOT
                      7          PUBLIC EOT
                      8          EXTRN  IBUF,MULTPY,BINBCD,PHASE,UNPAK,PRINT,PRINTB,DRAIN
                      9          EXTRN  EMODE,PMES3
                     10          CSEG
0000 F3              11 EOT      DI             ;DISABLE INTERRUPTS
0001 211770          12          LXI    H,7017H ;POINT TO THE CLOCK CONTROL PORT
0004 3680            13          MVI    M,80H   ;LATCH THE COUNT IN TIMER 2
0006 2B              14          DCX    H       ;POINT TO TIMER 2 DATA PORT
0007 5E              15          MOV    E,M     ;GET THE TIME COUNT
0008 56              16          MOV    D,M
0009 211170          17          LXI    H,7011H ;POINT TO THE PHASE CONTROL TIMER
000C 3600            18          MVI    M,0     ;FORCE THE PHASE CONTROL TO A BIG NUMBER
000E 3640            19          MVI    M,40H   ;THIS WILL TURN OFF THE HEAT
0010 3A0000    E     20          LDA    PHASE   ;GET THE PHASE CONTROL BYTE
```

```
0013 E6BF         21        ANI   06FH       ;TURN OFF THE ALARM
0015 320000   E   22        STA   PHASE      ;UPDATE THE CONTROL BYTE
0018 320A70       23        STA   700AH      ;OUTPUT THE CONTROL BYTE
001B 3EFF         24        MVI   A,0FFH     ;WANT TO CALCULATE THE TIME FROM THE FINAL
001D 93           25        SUB   E          ;HEAT MARK TO THE END POINT
001E 5F           26        MOV   E,A        ;DO LOAD TIME (FFFFH) - PRESENT TIME
001F 3EFF         27        MVI   A,0FFH
0021 9A           28        SBB   D
0022 57           29        MOV   D,A        ;SAVE THE ELAPSED TIME IN THE D,E PAIR
0023 210100   E   30        LXI   H,DBUF+1   ;(ELAPSED TIME * 1353) / 1,000,000
0026 3605         31        MVI   M,5        ;THIS WILL GIVE THE TIME IN X.X MINUTES
0028 23           32        INX   H
0029 366D         33        MVI   M,6DH
002B 23           34        INX   H
002C 72           35        MOV   M,D
002D 23           36        INX   H
002E 73           37        MOV   M,E
002F CD0000   E   38        CALL  MULTPY     ;DO THE MULTIPLY
0032 CD0000   E   39        CALL  BINBCD     ;DO THE CONVERT TO BCD
0035 210100   E   40        LXI   H,DBUF+1   ;POINT TO THE RESULT TRUNCATING 6 PLACES
0038 7E           41        MOV   A,M        ;GET THE BCD RESULT
0039 47           42        MOV   B,A        ;SAVE IT
003A CD0000   E   43        CALL  UNPAK      ;GO UNPACK THE PACKED DIGITS
003D 210000   E   44        LXI   H,PRINTB   ;POINT TO THE PRINT BUFFER
0040 77           45        MOV   M,A        ;PUT THE UNITS ASCII DIGIT IN THE BUFFER
0041 23           46        INX   H
0042 362E         47        MVI   M,'.'
0044 23           48        INX   H
0045 78           49        MOV   A,B
0046 E60F         50        ANI   0FH        ;GET THE TENTHS DIGIT
0048 C630         51        ADI   30H        ;CONVERT IT TO ASCII
004A 77           52        MOV   M,A
004B 23           53        INX   H
004C EB           54        XCHG
004D 210000   E   55        LXI   H,FMES2    ;POINT TO THE MIN FROM FH TO EP MESSAGE
0050 0611         56        MVI   B,17       ;LOAD THE LOOP COUNTER
0052 7E           57 LOOP:  MOV   A,M        ;GET A MESSAGE CHARACTER
0053 12           58        STAX  D          ;PUT IT IN THE PRINT BUFFER
0054 23           59        INX   H          ;POINT TO THE NEXT MESSAGE CHARACTER
0055 13           60        INX   D          ;POINT TO THE NEXT POSITION IN THE PRINT BUFFER
0056 05           61        DCR   B          ;BUMP THE CHARACTER COUNTER
0057 C25200   C   62        JNZ   LOOP       ;IF NOT DONE, GET ANOTHER CHARACTER
005A 3A0000   E   63        LDA   EMODE      ;CHECK FOR D,P END MODE
005D 1F           64        RAR
005E 1F           65        RAR
005F DC6800   C   66        CC    LOADD      ;IF D,P MODE, CHANGE THE PRINT MESSAGE
0062 CD0000   E   67        CALL  PRINT      ;GO PRINT THE BUFFER
0065 C30000   E   68        JMP   DRAIN      ;GO WAIT FOR DRAINAGE
0068 211200   E   69 LOADD: LXI   H,PRINTB+18
006B 3644         70        MVI   M,D
006D C9           71        RET
0000         C   72        END   EOT
```

PUBLIC SYMBOLS
EOT     C 0000

EXTERNAL SYMBOLS
BINBCD E 0000    DBUF   E 0000    DRAIN  E 0000    EMODE  E 0000    MULTPY E 0000    PHASE  E 0000
FMES2  E 0000    PRINT  E 0000    PRINTB E 0000    UNPAK  E 0000

USER SYMBOLS
BINBCD E 0000    DBUF   E 0000    DRAIN  E 0000    EMODE  E 0000    EOT    C 0000    LOADD  C 0068
LOOP   C 0052    MULTPY E 0000    PHASE  E 0000    FMES2  E 0000    PRINT  E 0000    PRINTB E 0000
UNPAK  E 0000

ASSEMBLY COMPLETE,  NO ERRORS

ISIS-II 8080/8085 MACRO ASSEMBLER, V2.0    ENDIT
END OF TEST BEFORE FINAL HEAT MARK

```
LOC  OBJ         SEQ       SOURCE STATEMENT

1  $    TITLE('END OF TEST BEFORE FINAL HEAT MARK') PAGEWIDTH(105) DEBUG
                  2            ;WRITTEN 03/14/80
                  3            ;UPDATED 11/17/81
                  4            ;THIS ROUTINE IS EXECUTED WHEN THE END OF TEST
                  5            ;IS DETECTED BEFORE OR AFTER REACHING THE FINAL
                  6            ;HEAT MARK. THIS APPLIES ONLY WHEN END MODE IS
                  7            ;END AT TEMP OR % RECOVERED. IN THESE MODES NO
                  8            ;DRAINAGE OR RECOVERY IS PERFORMED
                  9       NAME    ENDIT
                 10       PUBLIC  ENDIT
                 11       EXTRN   EDITOR,IBUF,PHASE,PRINT,PRINTB,VOLCAL,RMOTOR,PLOOP,DISPUP
                 12       EXTRN   PMES28,TEMPL
                 13       CSEG
0000 F3          14 ENDIT  DI              ;DISABLE INTERRUPTS
0001 CD0000  E   15        CALL  DISPUP    ;GO UPDATE THE DISPLAY TEMP & WATTS
0004 2A0000  E   16        LHLD  TEMPL     ;WANT TO FORCE THE X-AXIS DOWN TO PLOT A LINE
0007 25          17        DCR   H         ;SUBTRACT OFF 256 COUNTS
0008 221870      18        SHLD  7018H     ;OUTPUT THIS TO THE X-AXIS
000B 211170      19        LXI   H,7011H   ;POINT TO THE PHASE CONTROL TIMER
000E 3600        20        MVI   M,0       ;FORCE THE PHASE CONTROL TO A BIG NUMBER
0010 3640        21        MVI   M,40H     ;THIS WILL TURN OFF THE HEAT
0012 3A0000  E   22        LDA   PHASE     ;WANT TO TURN OFF THE GRADUATE SOLENOID
0015 E68F        23        ANI   8FH       ;RESET THE GRADUATE BIT & ALARM, TURN AIR ON
0017 320000  E   24        STA   PHASE     ;UPDATE THE CONTROL BYTE
001A 320A70      25        STA   700AH     ;OUTPUT THE CONTROL BYTE
001D 210000  E   26        LXI   H,PMES28  ;POINT TO THE 'END OF TEST AT------' MESSAGE
0020 CD0000  E   27        CALL  PLOOP     ;GO PRINT THE MESSAGE
0023 CD0000  E   28        CALL  VOLCAL    ;GO CALCULATE THE ENDING VOLUME
0026 AF          29        XRA   A
0027 320B70      30        STA   700BH     ;LIFT THE PEN FROM THE X-Y RECORDER
002A 210600  E   31        LXI   H,PRINTB+6
002D 3E20        32        MVI   A,' '     ;BLANK OUT THE REST OF THE BUFFER
002F 060E        33        MVI   B,14
0031 77          34 LOADB  MOV   M,A
0032 23          35        INX   H
0033 05          36        DCR   B
0034 C23100  C   37        JNZ   LOADB
0037 210500  E   38        LXI   H,IBUF+5  ;POINT TO THE ENDING TEMP
003A 110A00  E   39        LXI   D,PRINTB+10
003D 0606        40        MVI   B,6       ;PUT THE ENDING TEMP IN THE PRINT BUFFER
003F CD4B00  C   41        CALL  LOAD
0042 CD0000  E   42        CALL  PRINT     ;GO PRINT THE ENDING VOLUME & TEMPERATURE
0045 CD0000  E   43        CALL  RMOTOR    ;GO RESET THE MENISCUS DETECTOR DOWN
0048 C30000  E   44        JMP   EDITOR    ;GO WAIT FOR ANOTHER TEST
004B 7E          45 LOAD   MOV   A,M
004C 12          46        STAX  D
004D 23          47        INX   H
004E 13          48        INX   D
004F 05          49        DCR   B
0050 C24B00  C   50        JNZ   LOAD
0053 C9          51        RET
0000         C   52        END   ENDIT
```

PUBLIC SYMBOLS
ENDIT  C 0000

EXTERNAL SYMBOLS
DISPUP E 0000    EDITOR E 0000    IBUF   E 0000    PHASE  E 0000    PLOOP  E 0000    PMES28 E 0000
PRINT  E 0000    PRINTB E 0000    RMOTOR E 0000    TEMPL  E 0000    VOLCAL E 0000

USER SYMBOLS

| | | | | | |
|---|---|---|---|---|---|
| DISPUP E 0000 | EDITOR E 0000 | ENDIT C 0000 | IBUF E 0000 | LOAD C 004E | LOADB C 0001 |
| PHASE E 0000 | PLOOP E 0000 | PMES28 E 0000 | PRINT E 0000 | PRINTB E 0000 | PMOTOR E 0000 |
| TEMPL E 0000 | VOLCAL E 0000 | | | | |

ASSEMBLY COMPLETE. NO ERRORS

ISIS-II 8080/8085 MACRO ASSEMBLER V3.0    DRAIN
DRAINAGE ROUTINE

| LOC | OBJ | | SEQ | | SOURCE STATEMENT | | |
|---|---|---|---|---|---|---|---|
| 0064 | C620 | | 53 | | ADI | 20H | MAKE THE LSD ASCII |
| 0066 | 320100 | E | 54 | | STA | IBUF+1 | |
| 0069 | CD0000 | E | 55 | | CALL | XMIT | ;GO UPDATE THE DISPLAY |
| 006C | C9 | | 56 | | RET | | |
| 006D | F3 | | 57 | EDRAIN | DI | | ;DISABLE INTERRUPTS |
| 006E | C30000 | E | 58 | | JMP | RECRES | ;GO DO RECOVERY + RESIDUE ROUTINE |
| 0000 | | C | 59 | | END | DRAIN | |

PUBLIC SYMBOLS
DISPUP C 004E    DRAIN C 0000

EXTERNAL SYMBOLS

| | | | | | |
|---|---|---|---|---|---|
| GETN E 0000 | GTEMP E 0000 | IBUF E 0000 | IMASK E 0000 | KEYIN E 0000 | MLAG E 0000 |
| PHASE E 0000 | R555H E 0000 | R655H E 0000 | R755H E 0000 | RECRES E 0000 | STOPA E 0000 |
| UDATE E 0000 | UNPAK E 0000 | VOL E 0000 | XMIT E 0000 | | |

USER SYMBOLS

| | | | | | |
|---|---|---|---|---|---|
| DISPUP C 004E | DRAIN C 0000 | EDRAIN C 006D | GETN E 0000 | GTEMP E 0000 | IBUF E 0000 |
| IMASK E 0000 | INKEY C 0028 | KEYIN E 0000 | MLAG E 0000 | PHASE E 0000 | R555H E 0000 |
| R655H E 0000 | R755H E 0000 | RECRES E 0000 | STOPA E 0000 | UDATE E 0000 | UNPAK E 0000 |
| VOL E 0000 | WAIT C 002D | XMIT E 0000 | | | |

ASSEMBLY COMPLETE. NO ERRORS

ISIS-II 8080/8085 MACRO ASSEMBLER V3.0    DRAIN
DRAINAGE ROUTINE

| LOC | OBJ | | SEQ | | SOURCE STATEMENT | | |
|---|---|---|---|---|---|---|---|
| | | | 1 | $ | TITLE('DRAINAGE ROUTINE - PHOSMIDTH 107 MODEL 1500') | | |
| | | | 2 | | ;WRITTEN 02/10/80 | | |
| | | | 3 | | ;UPDATED 11/19/81 | | |
| | | | 4 | | ;THIS ROUTINE IS EXECUTED WHEN WAITING FOR DRAINAGE | | |
| | | | 5 | | ;TO COMPLETE DURING END AT ANY POINT CYCLE POINT | | |
| | | | 6 | | ;MODES | | |
| | | | 7 | | NAME | DRAIN | |
| | | | 8 | | PUBLIC | DRAIN,DISPUP | |
| | | | 9 | | EXTRN | R555H,R655H,R755H,STOPA,KEYIN,RECRES,GTEMP,GETN,VOL | |
| | | | 10 | | EXTRN | UNPAK,IBUF,XMIT,IMASK,UDATE,PHASE,MLAG | |
| | | | 11 | | CSEG | | |
| 0000 | 3E02 | | 12 | DRAIN | MVI | A,2 | |
| 0002 | 320000 | E | 13 | | STA | R655H | ;SET THE INTERRUPT BYTE 5 SWITCH = 2 |
| 0005 | 320000 | E | 14 | | STA | R755H | ;SET THE INTERRUPT BYTE 7 SWITCH = 2 |
| 0008 | CD0000 | E | 15 | | CALL | STOPA | ;GO TURN OFF THE ALARM |
| 000B | 3A0000 | E | 16 | | LDA | PHASE | ;GET THE CONTROL BYTE |
| 000E | E6EF | | 17 | | ANI | 0EFH | ;TURN ON THE AIR SOLENOID |
| 0010 | 320000 | E | 18 | | STA | PHASE | ;UPDATE THE CONTROL BYTE |
| 0013 | 320079 | | 19 | | STA | 7900H | ;OUTPUT THIS CONTROL BYTE |
| 0016 | 211D79 | | 20 | | LXI | H,7D1DH | ;POINT TO THE TIMER CONTROL PORT |
| 0019 | 3624 | | 21 | | MVI | M,24H | ;SET TIMER 0 TO MODE 2 |
| 001B | 211979 | | 22 | | LXI | H,7D19H | ;POINT TO TIMER 0 DATA PORT |
| 001E | 363A | | 23 | | MVI | M,3AH | ;LOAD A 30 SECOND TIME OUT (LSD FIRST) |
| 0020 | 3610 | | 24 | | MVI | M,10H | ;THIS IS THE DRAIN TIME |
| 0022 | 3E30 | | 25 | | MVI | A,30H | ;WANT TO SUPPRESS LAST UPDATED DURING DRAINAGE |

```
0024 3200000   E   26           STA    RCSJW    ;WE USE THIS SWITCH IN THE DRAIN ROUTINE
0027 110100        27           LXI    D,1      ;WAIT FOR TIMER 0 TO LOAD
002A 2194F0        28           LXI    H,F094H
002D 19            29  WAIT     DAD    D
002E 022F00        30           JNC    WAIT
0031 1E1B          31           MVI    A,1BH    ;ENABLE RST5.5 & RST7.5
0033 320000   E    32           STA    IMASK
0036 30            33           SIM
0037 FB            34           EI
0038 CD0000   E    35  INKEY    CALL   MLAG     ;FOR LAG TESTS, WANT TO STILL MOVE THE TEMP.
003B CD4E00   C    36           CALL   DISPUP   ;UPDATE THE DISPLAY
003E CD0000   E    37           CALL   KEYIN    ;CHECK FOR ANY KEYBOARD CHARACTERS
0041 17            38           RAL             ;CHECK FOR ANY CHARACTERS, LOOK AT BIT 7
0042 DAC500   C    39           JC     INKEY    ;IF NONE, GO BACK
0045 1F            40           RAR             ;GET THE CHARACTER
0046 FE14          41           CPI    20       ;IS IT THE RESET KEY, OPERATOR DOESN'T WANT TO WAIT
0048 CA0000   C    42           JZ     EDRAIN   ;IF YES, END DRAIN ROUTINE
004B C33800   C    43           JMP    INKEY    ;IGNORE ALL OTHER KEYS
004E CD0000   E    44  DISPUP   CALL   GTEMP    ;GO GET A TEMPERATURE READING
0051 CD0000   E    45           CALL   GETH     ;GO GET A HATIMETER READING
0054 CD0000   E    46           CALL   UDATE    ;GO UPDATE THE REAL TIME CLOCK
0057 3A0000   E    47           LDA    VOL      ;GET THE BCD VOLUME
005A 47            48           MOV    B,A      ;SAVE IT
005B CD0000   E    49           CALL   UNPAK    ;UNPACK THE TWO DIGITS
005E 220000   E    50           STA    IBUF     ;PUT THE VOLUME MSD IN THE INSERT BUFFER
0061 78            51           MOV    A,B
0062 E60F          52           ANI    0FH
```

ISIS-II 8080/8085 MACRO ASSEMBLER, V2.0          RECRES  
RECOVERY, RESIDUE AND LOSS ROUTINE

LOC  OBJ         SEQ          SOURCE STATEMENT

```
                 1 $          TITLE('RECOVERY, RESIDUE AND LOSS ROUTINE') PAGEWIDTH(105) DEBUG
                 2            ;WRITTEN 02/20/80
                 3            ;UPDATED 02/10/82
                 4            ;THIS ROUTINE IS EXECUTED AFTER DRAINAGE IS OVER.
                 5            ;THE VOLUME RECOVERED IS PRINTED, THE RESIDUE INPUT
                 6            ;IS REQUESTED, THE TOTAL RECOVERY AND LOSS ARE
                 7            ;CALCULATED AND PRINTED
                 8            NAME    RECRES
                 9            PUBLIC  RECRES
                10            EXTRN   VOLCAL,PRINT,PRINTB,IBUF,KEYIN,XMIT,DBUF,PLOOP,DSPLY,BCDBIN
                11            EXTRN   BINBCD,UNPAK,EVAP,RMOTOR,PHASE,LOSS,LOSSB,EDITOR,PMES5
                12            EXTRN   PMES6,PMES7,PMES8,PMES26,PMES29,DMES2,UDATE,TEMPL,BLANK
                13            CSEG
0000 2A0000   E  14  RECRES   LHLD   TEMPL    ;WANT TO PLOT OUT THIS TEMP AFTER DRAIN IS DONE
0003 221870      15           SHLD   7018H    ;OUTPUT IT TO THE X-AXIS
0006 CD0000   E  16           CALL   VOLCAL   ;CALCULATE THE VOLUME FROM THE STEPC
0009 C5          17           PUSH   B        ;SAVE THE BINARY VOLUME RECOVERED
000A 210000   E  18           LXI    H,PRINTB ;WANT TO MOVE THE VOLUME CALCULATED OVER IN THE
000D 46          19           MOV    B,M      ;PRINT BUFFER.
000E 3620        20           MVI    M,' '
0010 23          21           INX    H
0011 4E          22           MOV    C,M
0012 70          23           MOV    M,B
0013 23          24           INX    H
0014 71          25           MOV    M,C
0015 23          26           INX    H
0016 46          27           MOV    B,M
0017 362E        28           MVI    M,'.'
0019 23          29           INX    H
001A 70          30           MOV    M,B
001B 23          31           INX    H
001C EB          32           XCHG            ;DONE MOVING, NOW PRINT MESSAGE 5
001D 210000   E  33           LXI    H,PMES5  ;GET THE ML RECOVERED MESSAGE
```

```
0020 060F          34           MVI    B,15        ;LOAD THE LOOP COUNTER
0022 CD4801    C   35           CALL   PLOP        ;GO LOAD THE MESSAGE AND PRINT IT
0025 3A0000    E   36           LDA    PHASE       ;TURN OFF THE GRADUATE BIT
0028 E6DF          37           ANI    0DFH
002A 320000    E   38           STA    PHASE       ;UPDATE THE CONTROL BYTE
002D 320A70        39           STA    700AH       ;OUTPUT THE CONTROL BYTE
0030 AF            40           XRA    A
0031 320B70        41           STA    700BH       ;NOW LIFT THE RECORDER PEN
0034 CD0000    E   42           CALL   RMOTOR      ;GO RESET THE MOTOR
0037 210000    E   43           LXI    H,DMES2     ;NOW, REQUEST THE OPERATOR TO ENTER THE RESIDUE
003A CD0000    E   44           CALL   DSPLY       ;GO LOAD THE MESSAGE AND DISPLAY IT
003D CD0000    E   45   INKEY:  CALL   UDATE       ;GO UPDATE THE REAL TIME CLOCK
0040 CD0000    E   46           CALL   KEYIN       ;GO CHECK FOR ANY KEYBOARD CHARACTERS
0043 17            47           RAL                ;CHECK FOR ANY CHARACTERS, LOOK AT BIT 8
0044 DA3D00    C   48           JC     INKEY       ;IF NONE, WAIT FOR SOME
0047 1F            49           RAR                ;GET THE CHARACTER
0048 FE0A          50           CPI    10          ;IS THE CHARACTER 0 - 9
004A DA5A00    C   51           JC     PDIGIT      ;IF YES, GO PROCESS THE DIGIT
004D FE16          52           CPI    22          ;IS IT THE ENTER KEY
004F CA6A00    C   53           JZ     PENT        ;IF YES, GO PROCESS THE ENTER KEY
0052 FE14          54           CPI    20          ;IS IT THE RESET KEY
0054 CA6A00    C   55           JZ     PENT        ;IF YES, TREAT IT AS THE ENTER KEY
0057 C33D00    C   56           JMP    INKEY       ;ELSE, DO NOT ALLOW THIS CHARACTER
005A C630          57   PDIGIT: ADI    30H         ;CONVERT IT TO ASCII
005C 210D00    E   58           LXI    H,IBUF+13   ;WANT TO ECHO THE DIGIT
005F 46            59           MOV    B,M         ;FIRST, SHIFT THE PREVIOUS ENTRY OVER
0060 77            60           MOV    M,A         ;THEN INSERT THIS DIGIT
0061 2B            61           DCX    H
0062 2B            62           DCX    H
0063 70            63           MOV    M,B         ;PUT THIS DIGIT IN THE BUFFER
0064 CD0000    E   64           CALL   XMIT        ;OUTPUT THE BUFFER TO THE DISPLAY
0067 C33D00    C   65           JMP    INKEY       ;GO LOOK FOR MORE ENTRIES
006A 210100    E   66   PENT    LXI    H,PRINTB+1  ;PROCESS THE ENTERED RESIDUE
006D 3620          67           MVI    M,' '       ;WANT TO PRINT OUT THE RESIDUE ENTERED
006F 23            68           INX    H
0070 EB            69           XCHG
0071 210B00    E   70           LXI    H,IBUF+11   ;GET THE RESIDUE FROM THE INSERT BUFFER
0074 7E            71           MOV    A,M
0075 12            72           STAX   D           ;PUT IT IN THE PRINT BUFFER
0076 E60F          73           ANI    0FH         ;MAKE IT A BCD DIGIT
0078 47            74           MOV    B,A         ;SAVE IT
0079 23            75           INX    H
007A 23            76           INX    H           ;POINT TO THE TENTHS RESIDUE DIGIT
007B 13            77           INX    D
007C 13            78           INX    D
007D 7E            79           MOV    A,M         ;GET THE TENTHS ASCII DIGIT
007E 12            80           STAX   D           ;PUT IT IN THE PRINT BUFFER
007F E60F          81           ANI    0FH         ;MAKE IT A BCD DIGIT
0081 4F            82           MOV    C,A         ;B,C = BCD RESIDUE UNPAKED
0082 C5            83           PUSH   B           ;SAVE THE BCD RESIDUE (X,X)
0083 210000    E   84           LXI    H,PMES6     ;WANT TO PRINT OUT THE RESIDUE MESSAGE
0086 110B00    E   85           LXI    D,PRINTB+11
0089 0609          86           MVI    B,9         ;LOAD THE LOOP COUNTER
008B CD4801    C   87           CALL   PLOP        ;GO LOAD THE MESSAGE AND PRINT IT
008E C1            88           POP    B           ;GET THE RESIDUE BACK
008F 78            89           MOV    A,B         ;WANT TO PACK THE TWO BCD DIGITS
0090 17            90           RAL                ;THEN CALCULATE THE TOTAL RECOVERY
0091 17            91           RAL                ;BY DOING VOLUME RECOVERED + RESIDUE
0092 17            92           RAL                ;THIS WILL BE DONE IN BINARY
0093 17            93           RAL                ;SO WANT TO CONVERT THE RESIDUE TO BINARY
0094 E6F0          94           ANI    0F0H
0096 81            95           ADD    C           ;THE DIGITS ARE PACKED
0097 210300    E   96           LXI    H,DBUF+3    ;LOAD UP THE DATA BUFFER FOR BCDBIN
009A 77            97           MOV    M,A
009B 2B            98           DCX    H
009C AF            99           XRA    A
```

```
0090 77           100           MOV    M,A
009E 2B           101           DCX    H
009F 77           102           MOV    M,A
00A0 CD0000  E    103           CALL   BCDBIN   ;DO THE CONVERSION FOR THE RESIDUE
00A3 79           104           MOV    A,C      ;RESULT RETURNED IN B,C PAIR (<100)
00A4 C1           105           POP    B        ;GET THE BINARY VOLUME RECOVERED BACK
00A5 81           106           ADD    C        ;DO RESIDUE + VOLUME RECOVERED
00A6 4F           107           MOV    C,A
00A7 78           108           MOV    A,B
00A8 CE00         109           ACI    0
00AA 47           110           MOV    B,A      ;SAVE RESULT IN B,C PAIR
00AB C5           111           PUSH   B        ;SAVE TOTAL RECOVERY (BINARY)
00AC 210800  E    112           LXI    H,DBUF+8 ;WANT TO CONVERT TO BCD FOR PRINT OUT
00AF 71           113           MOV    M,C      ;LOAD UP THE DATA BUFFER FOR THE CONVERSION
00B0 2B           114           DCX    H
00B1 70           115           MOV    M,B
00B2 2B           116           DCX    H
00B3 AF           117           XRA    A
00B4 77           118           MOV    M,A
00B5 2B           119           DCX    H
00B6 77           120           MOV    M,A
00B7 CD0000  E    121           CALL   BINBCD   ;DO THE CONVERSION
00BA 210300  E    122           LXI    H,DBUF+3 ;POINT TO THE RESULT
00BD 46           123           MOV    B,M
00BE 23           124           INX    H
00BF 4E           125           MOV    C,M      ;B,C PAIR = BCD TOTAL RECOVERY
00C0 210000  E    126           LXI    H,PRINTB ;LOAD UP THE PRINT BUFFER TO PRINT TOTAL RECOVERY
00C3 78           127           MOV    A,B
00C4 CD0000  E    128           CALL   UNPAK
00C7 FE30         129           CPI    30H      ;CHECK FOR AN ASCII 0
00C9 CACD00  C    130           JZ     SKIP     ;IF 0, DON'T PRINT IT
00CC 77           131           MOV    M,A      ;ELSE, PRINT IT
00CD 23           132  SKIP     INX    H
00CE 78           133           MOV    A,B
00CF E60F         134           ANI    0FH
00D1 C630         135           ADI    30H      ;MAKE IT ASCII
00D3 77           136           MOV    M,A      ;PUT IT IN THE BUFFER
00D4 23           137           INX    H
00D5 79           138           MOV    A,C
00D6 CD0000  E    139           CALL   UNPAK
00D9 77           140           MOV    M,A      ;LOAD THE NEXT DIGIT IN THE PRINT BUFFER
00DA 23           141           INX    H
00DB 23           142           INX    H
00DC 79           143           MOV    A,C
00DD E60F         144           ANI    0FH
00DF C630         145           ADI    30H      ;MAKE THIS DIGIT ASCII
00E1 77           146           MOV    M,A
00E2 210000  E    147           LXI    H,PMES7  ;WANT TO PRINT OUT THE TOTAL RECOVERY MESSAGE
00E5 110800  E    148           LXI    D,PRINTB+8
00E8 060C         149           MVI    B,12
00EA CD4801  C    150           CALL   PLOP     ;GO LOAD IT AND PRINT IT
00ED C1           151           POP    B        ;GET THE TOTAL RECOVERY BACK
00EE 3EE8         152           MVI    A,0E8H   ;CALCULATE LOSS = 100.0 - TOTAL RECOVERY
00F0 91           153           SUB    C
00F1 4F           154           MOV    C,A
00F2 320000  E    155           STA    LOSSB    ;SAVE THE BINARY LOSS FOR THE CLOSS ROUTINE
00F5 3E03         156           MVI    A,3
00F7 98           157           SBB    B
00F8 47           158           MOV    B,A      ;B,C = LOSS (BINARY) (<25.5)
00F9 DA5401  C    159           JC     NEGLOS   ;WANT TO TRAP NEGATIVE LOSS VALUES
00FC 210800  E    160           LXI    H,DBUF+8 ;WANT TO CONVERT IT TO BCD
00FF 71           161           MOV    M,C
0100 2B           162           DCX    H
0101 70           163           MOV    M,B
0102 2B           164           DCX    H
0103 AF           165           XRA    A
```

```
0104 77              166         MOV     M,A
0105 2B              167         DCX     H
0106 77              168         MOV     M,A
0107 CD0000   E      169         CALL    BINBCD   ;DO THE CONVERSION
010A 210300   E      170         LXI     H,DBUF+2 ;POINT TO THE RESULT
010D 46              171         MOV     B,M
010E 23              172         INX     H
010F 4E              173         MOV     C,M      ;B,C = BCD LOSS (PACKED)
0110 210000   E      174         LXI     H,PRINTB ;WANT TO PRINT IT OUT
0113 3620            175         MVI     M,' '
0115 23              176         INX     H
0116 78              177         MOV     A,B
0117 E60F            178         ANI     0FH
0119 C630            179         ADI     30H      ;MAKE IT ASCII (LOSS < 10.0)
011B FE30            180         CPI     '0'      ;CHECK FOR AN ASCII ZERO
011D C22201   C      181         JNZ     SKIP2    ;IF NOT '0', PRINT IT
0120 3E30            182         MVI     A,' '    ;ELSE, PUT IN AN ASCII 0
0122 77              183 SKIP2   MOV     M,A
0123 23              184         INX     H
0124 79              185         MOV     A,C
0125 320000   E      186         STA     LOSS     ;SAVE THE CALCULATED LOSS (X 10)
0128 CD0000   E      187         CALL    UNPAK    ;GO UNPACK THE NEXT TWO DIGITS
012B 77              188         MOV     M,A
012C 23              189         INX     H
012D 23              190         INX     H
012E 79              191         MOV     A,C
012F E60F            192         ANI     0FH
0131 C630            193         ADI     30H
0133 77              194         MOV     M,A
0134 210000   E      195         LXI     H,PMES8  ;WANT TO PRINT OUT THE LOSS
0137 110800   E      196         LXI     D,PRINTB+8
013A 060C            197         MVI     B,12
013C CD4801   C      198         CALL    PLOP
013F 210000   E      199         LXI     H,BLANK  ;WANT TO PRINT OUT A LINE OF BLANKS
0142 CD0000   E      200         CALL    PLOOP    ;GO LOAD & PRINT IT
0145 C30000   E      201         JMP     EVAP     ;GO TO THE EVAPORATED SAMPLE ROUTINE
0148 7E              202 PLOP    MOV     A,M      ;GET A CHARACTER
0149 12              203         STAX    D        ;PUT IT IN THE BUFFER
014A 23              204         INX     H        ;POINT TO THE NEXT CHARACTER
014B 13              205         INX     D        ;POINT TO THE NEXT BUFFER LOCATION
014C 05              206         DCR     B        ;BUMP THE LOOP COUNTER
014D C24801   C      207         JNZ     PLOP
0150 CD0000   E      208         CALL    PRINT    ;WHEN DONE LOADING, GO PRINT THE BUFFER
0153 C9              209         RET
0154 210000   E      210 NEGLOS  LXI     H,PMES29 ;POINT TO THE NEGATIVE LOSS MESSAGE
0157 CD0000   E      211         CALL    PLOOP    ;GO LOAD IT & PRINT IT
015A 210000   E      212         LXI     H,PMES26 ;POINT TO THE TEST TERMINATED MESSAGE
015D CD0000   E      213         CALL    PLOOP    ;GO LOAD IT & PRINT IT
0160 C30000   E      214         JMP     EDITOR   ;GO WAIT FOR SOME KEY STROKES
0000          C      215         END     RECPES
```

EXTERNAL SYMBOLS

| | | | | | |
|---|---|---|---|---|---|
| BCDBIN E 0000 | BINBCD E 0000 | BLANK  E 0000 | DBUF   E 0000 | DMES2  E 0000 | DSPLY  E 0000 |
| EDITOR E 0000 | EVAP   E 0000 | IBUF   E 0000 | KEYIN  E 0000 | LOSS   E 0000 | LOSSB  E 0000 |
| PHASE  E 0000 | PLOOP  E 0000 | PMES26 E 0000 | PMES29 E 0000 | PMES5  E 0000 | PMES6  E 0000 |
| PMES7  E 0000 | PMES8  E 0000 | PPINT  E 0000 | PRINTB E 0000 | RMOTOR E 0000 | TEMPL  E 0000 |
| UDATE  E 0000 | UNPAK  E 0000 | VOLCAL E 0000 | XMIT   E 0000 | | |

USER SYMBOLS

| | | | | | |
|---|---|---|---|---|---|
| BCDBIN E 0000 | BINBCD E 0000 | BLANK  E 0000 | DBUF   E 0000 | DMES2  E 0000 | DSPLY  E 0000 |
| EDITOR E 0000 | EVAP   E 0000 | IBUF   E 0000 | INKEY  C 0000 | KEYIN  E 0000 | LOSS   E 0000 |
| LOSSB  E 0000 | NEGLOS C 0154 | PDIGIT C 005A | PENT   C 006A | PHASE  E 0000 | PLOOP  E 0000 |
| PLOP   C 0148 | PMES26 E 0000 | PMES29 E 0000 | PMES5  E 0000 | PMES6  E 0000 | PMES7  E 0000 |
| PMES8  E 0000 | PPINT  E 0000 | PRINTB E 0000 | RECPES C 0000 | RMOTOR E 0000 | SKIP  C 0000 |
| SKIP2  C 0122 | TEMPL  E 0000 | UDATE  E 0000 | UNPAK  E 0000 | VOLCAL E 0000 | XMIT   E 0000 |

ASSEMBLY COMPLETE, NO ERRORS

ISIS-II 8080/8085 MACRO ASSEMBLER V2.0          EVAP
EVAPORATED TEMPERATURE CORRECTION ROUTINE

LOC   OBJ           SEQ        SOURCE STATEMENT

```
                     1  $      TITLE('EVAPORATED TEMPERATURE CORRECTION ROUTINE') PAGEWIDTH(105)
                     2                 ;WRITTEN 03/21/80
                     3                 ;UPDATED 02/12/82
                     4                 ;THIS ROUTINE PRINTS OUT A FINAL REPORT OF TEMPS
                     5                 ;CORRECTED ON AN EVAPORATED BASIS. THIS IS ONLY
                     6                 ;DONE FOR END POINT OR DRY POINT MODES AND IF THE
                     7                 ;TEMP RANGE IS EITHER 0 - 300C OR 32 - 572F
                     8          NAME   EVAP
                     9          PUBLIC EVAP
                    10          EXTRN  BINBCD,DBUF,DIVIDE,EDITOR,EMODE,MULTPY,PRINT,PRINTB,TRDR
                    11          EXTRN  TV,UNPAK,PLOOP,CLOSS,SATEMP,EVAPT,EVAPV,EPVOL,EPT,LOSS
                    12          EXTRN  EVAPB,EVAPVT,EVAPVB,PMES17,PMES18,PMES19,BLANK
                    13          CSEG
0000 3A0000  E      14  EVAP    LDA    TRDR       ;GET THE TEMP RANGE & DISTILLATION RATE BYTE
0003 E605           15          ANI    5          ;MASK IN THE 0-300C & 32-572F RANGE BITS
0005 CA1500  C      16          JZ     LINE       ;IF NOT IN EITHER RANGE, SKIP FINAL REPORT
0008 3A0000  E      17          LDA    EMODE      ;GET THE END MODE BYTE
000B E60F           18          ANI    0FH        ;MASK IN THE EP & DP END MODE BITS
000D CA1E00  C      19          JZ     OK         ;IF = 0, IN END POINT MODE
0010 E602           20          ANI    2          ;LOOK FOR DP MODE
0012 C21E00  C      21          JNZ    OK         ;IF IN DP MODE, DO FINAL REPORT
0015 210000  E      22  LINE    LXI    H,BLANK    ;WANT TO PRINT OUT A LINE OF BLANKS
0018 CD0000  E      23          CALL   PLOOP      ;GO LOAD & PRINT IT
001B C20000  E      24          JMP    EDITOR
001E 210000  E      25  OK      LXI    H,PMES17   ;ELSE, PRINT OUT THE 'TEMPERATURES VS' MESSAGE
0021 CD0000  E      26          CALL   PLOOP      ;GO PRINT THE MESSAGE
0024 210000  E      27          LXI    H,PMES18   ;POINT TO THE 'EVAPORATED SAMPLE' MESSAGE
0027 CD0000  E      28          CALL   PLOOP      ;GO PRINT THE MESSAGE
002A 210000  E      29          LXI    H,EVAPVB   ;POINT TO THE FIRST VOLUME (BINARY)
002D 220000  E      30          SHLD   EVAPB      ;INITIALIZE THIS TABLE POINTER
0030 210000  E      31          LXI    H,EVAPVT   ;POINT TO THE FIRST VOLUME (BCD) TO PRINT
0033 220000  E      32  NEXT    SHLD   EVAPT      ;INITIALIZE THIS TABLE POINTER
0036 7E             33          MOV    A,M        ;GET AN EVAPORATED VOLUME FROM THE TABLE
0037 FE00           34          CPI    0          ;CHECK FOR IBP
0039 CA8400  C      35          JZ     PIBP       ;IF 0, GO PRINT IBP TEMPERATURE
003C 47             36          MOV    B,A        ;SAVE THIS VOLUME
003D 210000  E      37          LXI    H,EPVOL    ;POINT TO THE END POINT VOLUME
0040 7E             38          MOV    A,M        ;GET THE ASCII MSD
0041 D630           39          SUI    30H        ;MAKE IT BCD
0043 17             40          RAL               ;WANT TO PACK THE TWO MSD'S
0044 17             41          RAL
0045 17             42          RAL
0046 17             43          RAL
0047 4F             44          MOV    C,A        ;SAVE THIS MSD
0048 23             45          INX    H
0049 7E             46          MOV    A,M        ;GET THE NEXT ASCII DIGIT
004A D630           47          SUI    30H
004C 81             48          ADD    C
004D 4F             49          MOV    C,A        ;SAVE THIS PACKED EPVOL
004E 23             50          INX    H          ;POINT TO THE TENTHS END POINT VOLUME
004F 7E             51          MOV    A,M
0050 D630           52          SUI    30H
0052 57             53          MOV    D,A        ;SAVE THIS TENTHS DIGIT
0053 79             54          MOV    A,C
0054 90             55          SUB    B          ;DO EPVOL - TABLE VALUE (XX.X - XX.0)
0055 CA5E00  C      56          JZ     CKTH       ;IF 0, CHECK TENTHS DIGIT FOR ZERO
0058 DA8500  C      57          JC     PEP        ;IF EPVOL < TABLE VALUE, PRINT END POINT VALUE
005B C3E700  C      58          JMP    INTPOL     ;ELSE, DO THE INTERPOLATION ROUTINE
005E AF             59  CKTH    XRA    A
005F BA             60          CMP    D          ;CHECK IF TENTHS DIGIT IS ZERO
0060 CA8500  C      61          JZ     PEP        ;IF EPVOL = TABLE VALUE, AT END POINT
```

| | | | | | | |
|---|---|---|---|---|---|---|
| 0063 C3E700 | C | 62 | | JMP | INTPOL | ;ELSE, DO THE INTERPOLATION ROUTINE |
| 0066 3A0000 | E | 63 ITSOK: | | LDA | TRDR | ;CHECK IF TEST WAS IN CENTIGRADE RANGE |
| 0069 1F | | 64 | | RAR | | |
| 006A D47801 | C | 65 | | CNC | CONVF | ;IF CY=0, CONVERT TEMP TO FAHRENHEIT |
| 006D CDAA01 | C | 66 | | CALL | CBCD | ;NOW CONVERT THE TEMP TO BCD & PUT IN PRINTB |
| 0070 CDEE01 | C | 67 | | CALL | INVOL | ;PUT THE PRESENT VOLUME IN THE PRINTB |
| 0073 CD0000 | E | 68 | | CALL | PRINT | ;GO PRINT THE BUFFER |
| 0076 2A0000 | E | 69 BUMP: | | LHLD | EVAPB | ;GET THIS TABLE POINTER |
| 0079 23 | | 70 | | INX | H | |
| 007A 220000 | E | 71 | | SHLD | EVAPB | ;POINT TO THE NEXT ENTRY |
| 007D 2A0000 | E | 72 | | LHLD | EVAPT | ;GET THE EVAPORATED TABLE POINTER |
| 0080 23 | | 73 | | INX | H | ;POINT TO THE NEXT ENTRY |
| 0081 C33300 | C | 74 | | JMP | NEXT | ;GO DO THE NEXT POINT |
| 0084 210000 | E | 75 PIBP: | | LXI | H,PMES19 | ;POINT TO THE 'IPB' MESSAGE |
| 0087 110000 | E | 76 | | LXI | D,PRINTB | ;POINT TO THE PRINT BUFFER |
| 008A 0611 | | 77 | | MVI | B,17 | |
| 008C CD0D02 | C | 78 | | CALL | LOAD | ;GO LOAD THE BUFFER |
| 008F 210000 | E | 79 | | LXI | H,TV | ;POINT TO THE TOP OF THE TEMP VOLUME TABLE |
| 0092 4E | | 80 | | MOV | C,M | ;GET THE IBP TEMP LSB'S |
| 0093 23 | | 81 | | INX | H | |
| 0094 46 | | 82 | | MOV | B,M | ;GET THE IBP TEMP MSB'S |
| 0095 3A0000 | E | 83 | | LDA | TRDR | ;CHECK IF TEST WAS IN CENTIGRADE RANGE |
| 0098 1F | | 84 | | RAR | | |
| 0099 D47801 | C | 85 | | CNC | CONVF | ;IF CY=0, CONVERT TO FAHRENHEIT |
| 009C CDAA01 | C | 86 | | CALL | CBCD | ;CONVERT THE TEMP TO BCD & PUT IN THE PRINTB |
| 009F CD0000 | E | 87 | | CALL | PRINT | ;GO PRINT THE IBP |
| 00A2 C37600 | C | 88 | | JMP | BUMP | ;DO THE NEXT ENTRY |
| 00A5 210000 | E | 89 PEP: | | LXI | H,EPVOL | ;POINT TO THE ASCII END POINT VOLUME |
| 00A8 110100 | E | 90 | | LXI | D,PRINTB+1 | |
| 00AB 7E | | 91 | | MOV | A,M | ;WANT TO PRINT OUT THE END POINT VALUES |
| 00AC 12 | | 92 | | STAX | D | |
| 00AD 23 | | 93 | | INX | H | |
| 00AE 13 | | 94 | | INX | D | |
| 00AF 7E | | 95 | | MOV | A,M | |
| 00B0 12 | | 96 | | STAX | D | |
| 00B1 13 | | 97 | | INX | D | |
| 00B2 3E2E | | 98 | | MVI | A,'.' | |
| 00B4 12 | | 99 | | STAX | D | |
| 00B5 23 | | 100 | | INX | H | |
| 00B6 13 | | 101 | | INX | D | |
| 00B7 7E | | 102 | | MOV | A,M | |
| 00B8 12 | | 103 | | STAX | D | |
| 00B9 13 | | 104 | | INX | D | |
| 00BA 3E4D | | 105 | | MVI | A,'M' | |
| 00BC 12 | | 106 | | STAX | D | |
| 00BD 13 | | 107 | | INX | D | |
| 00BE 3E4C | | 108 | | MVI | A,'L' | |
| 00C0 12 | | 109 | | STAX | D | ;NOW HAVE XX.XML IN THE PRINT BUFFER |
| 00C1 210100 | E | 110 | | LXI | H,SATEMP+1 | ;POINT TO THE ASCII END POINT TEMP |
| 00C4 110A00 | E | 111 | | LXI | D,PRINTB+10 | ;POINT TO THE PRINT BUFFER |
| 00C7 0606 | | 112 | | MVI | B,6 | ;WANT TO PRINT OUT THE HIGHEST TEMP |
| 00C9 CD0D02 | C | 113 | | CALL | LOAD | ;GO LOAD IT IN THE BUFFER |
| 00CC EB | | 114 | | XCHG | | |
| 00CD 23 | | 115 | | INX | H | |
| 00CE 23 | | 116 | | INX | H | ;WANT TO PRINT OUT THE END MODE, EP OR DP |
| 00CF 3A0000 | E | 117 | | LDA | EMODE | ;GET THE END MODE BYTE |
| 00D2 FE00 | | 118 | | CPI | 0 | ;CHECK IF END AT END POINT MODE |
| 00D4 CAE200 | C | 119 | | JZ | LDE | ;IF = 0, LOAD 'E' |
| 00D7 3644 | | 120 | | MVI | M,'D' | ;ELSE, LOAD 'D' |
| 00D9 23 | | 121 LEM: | | INX | H | |
| 00DA 3650 | | 122 | | MVI | M,'P' | |
| 00DC CD0000 | E | 123 | | CALL | PRINT | ;GO PRINT THE END POINT VALUES |
| 00DF C30000 | E | 124 | | JMP | CLOSS | ;GO DO THE CORRECTED LOSS ROUTINE |
| 00E2 3645 | | 125 LDE: | | MVI | M,'E' | |
| 00E4 CD900 | C | 126 | | JMP | LEM | ;GO LOAD THE END MODE |

| Addr | Bytes | | Line | Label | Op | Operand | Comment |
|---|---|---|---|---|---|---|---|
| 00E7 | 78 | | 127 | INTPOL | MOV | A,B | ;B REG = EVAPORATED TABLE VALUE |
| 00E8 | FE05 | | 128 | | CPI | 5 | ;CHECK FOR 5ML ENTRY |
| 00EA | C2F800 | C | 129 | | JNZ | SKIP1 | ;IF NOT 5ML, SKIP THE FOLLOWING CHECK |
| 00ED | 3A0000 | E | 130 | | LDA | LOSS | ;GET THE CALCULATED LOSS VALUE (0 - 9.9%) |
| 00F0 | D651 | | 131 | | SUI | 51H | ;DO LOSS - 51 (X.X% - 5.1%) |
| 00F2 | CA7600 | C | 132 | | JZ | BUMP | ;IF RESULT = 5.1%, SKIP PRINTING THE 5ML MARK |
| 00F5 | D27600 | C | 133 | | JNC | BUMP | ;IF RESULT > 5.1%, SKIP PRINTING THE 5ML MARK |
| 00F8 | 3A0000 | E | 134 | SKIP1 | LDA | LOSS | ;GET THE LOSS VALUE (PACKED BCD) |
| 00FB | 1F | | 135 | | RAR | | ;USE THE UNITS DIGIT AS THE HASH KEY TO FIND |
| 00FC | 1F | | 136 | | RAR | | ;THE TEMP IN THE TV TABLE |
| 00FD | 1F | | 137 | | RAR | | |
| 00FE | 1F | | 138 | | RAR | | |
| 00FF | E60F | | 139 | | ANI | 0FH | |
| 0101 | 4F | | 140 | | MOV | C,A | ;SAVE THIS LOSS UNITS DIGIT |
| 0102 | 2A0000 | E | 141 | | LHLD | EVAPB | ;GET THE POINTER TO THE BINARY EVAP VOLUME |
| 0105 | 7E | | 142 | | MOV | A,M | ;GET THE EVAP VOLUME |
| 0106 | 91 | | 143 | | SUB | C | ;DO EVAP VOLUME - LOSS UNITS VALUE |
| 0107 | 07 | | 144 | | RLC | | ;MULTIPLY BY 2 |
| 0108 | 210000 | E | 145 | | LXI | H,TV | ;POINT TO THE TOP OF THE TV TABLE |
| 010B | 85 | | 146 | | ADD | L | ;CALCULATE THE DISPLACEMENT |
| 010C | 6F | | 147 | | MOV | L,A | |
| 010D | 7C | | 148 | | MOV | A,H | |
| 010E | CE00 | | 149 | | ACI | 0 | |
| 0110 | 67 | | 150 | | MOV | H,A | ;H,L POINTS TO THE TEMP ENTRY FOR THIS VOLUME |
| 0111 | 2B | | 151 | | DCX | H | |
| 0112 | 2B | | 152 | | DCX | H | ;POINT TO THE LOWER VOLUME TEMP |
| 0113 | 5E | | 153 | | MOV | E,M | |
| 0114 | 23 | | 154 | | INX | H | |
| 0115 | 56 | | 155 | | MOV | D,M | ;D,E = LOWER VOLUME TEMP |
| 0116 | 23 | | 156 | | INX | H | |
| 0117 | 4E | | 157 | | MOV | C,M | |
| 0118 | 23 | | 158 | | INX | H | |
| 0119 | 46 | | 159 | | MOV | B,M | ;B,C = UPPER VOLUME TEMP |
| 011A | 3A0000 | E | 160 | | LDA | LOSS | ;GET THE LOSS VALUE |
| 011D | E60F | | 161 | | ANI | 0FH | ;MASK IN THE TENTHS DIGIT |
| 011F | CA6600 | C | 162 | | JZ | ITSOK | ;IF LOSS = X.0%, NO INTERPOLATION REQUIRED |
| 0122 | 79 | | 163 | | MOV | A,C | ;ELSE, DO UPPER VOLUME TEMP - LOWER VOLUME TEMP |
| 0123 | 93 | | 164 | | SUB | E | |
| 0124 | 4F | | 165 | | MOV | C,A | |
| 0125 | 78 | | 166 | | MOV | A,B | |
| 0126 | 9A | | 167 | | SBB | D | |
| 0127 | 47 | | 168 | | MOV | B,A | ;B,C = RESULT |
| 0128 | F5 | | 169 | | PUSH | PSW | ;SAVE THE CARRY FLAG |
| 0129 | DC7001 | C | 170 | | CC | COMP | ;IF RESULT < 0, 2'S COMPLEMENT RESULT |
| 012C | D5 | | 171 | | PUSH | D | ;SAVE THE LOWER VOLUME TEMP |
| 012D | 3A0000 | E | 172 | | LDA | LOSS | ;GET THE LOSS VALUE |
| 0130 | E60F | | 173 | | ANI | 0FH | ;MASK IN THE TENTHS DIGIT |
| 0132 | 57 | | 174 | | MOV | D,A | ;SAVE THIS TENTHS DIGIT |
| 0133 | 3E0A | | 175 | | MVI | A,10 | |
| 0135 | 92 | | 176 | | SUB | D | ;DO 10 - LOSS TENTH DIGIT |
| 0136 | 210400 | E | 177 | | LXI | H,DBUF+4 | ;WANT TO DO DELTA TEMP X 0.X% LOSS |
| 0139 | 71 | | 178 | | MOV | M,C | ;SET UP THE DATA BUFFER FOR THE MULTIPLY |
| 013A | 2B | | 179 | | DCX | H | |
| 013B | 70 | | 180 | | MOV | M,B | |
| 013C | 2B | | 181 | | DCX | H | |
| 013D | 77 | | 182 | | MOV | M,A | |
| 013E | 2B | | 183 | | DCX | H | |
| 013F | 3600 | | 184 | | MVI | M,0 | |
| 0141 | CD0000 | E | 185 | | CALL | MULTPY | ;DO THE MULTIPLY |
| 0144 | 210800 | E | 186 | | LXI | H,DBUF+8 | ;POINT TO THE RESULT |
| 0147 | 46 | | 187 | | MOV | B,M | ;MOVE THE RESULT IN THE DBUF FOR A DIVIDE |
| 0148 | 2B | | 188 | | DCX | H | |
| 0149 | 4E | | 189 | | MOV | C,M | |
| 014A | 70 | | 190 | | MOV | M,B | |
| 014B | 2B | | 191 | | DCX | H | |
| 014C | 46 | | 192 | | MOV | B,M | |

```
014D 71         193        MOV    M,C
014E 2B         194        DCX    H
014F 4E         195        MOV    C,M
0150 70         196        MOV    M,B
0151 2B         197        DCX    H
0152 71         198        MOV    M,C
0153 2B         199        DCX    H
0154 360A       200        MVI    M,10
0156 2B         201        DCX    H
0157 3600       202        MVI    M,0
0159 CD0000  E  203        CALL   DIVIDE  ;DO THE DIVIDE BY 10
015C 210100  E  204        LXI    H,DBUF+1 ;POINT TO THE RESULT
015F 4E         205        MOV    C,M
0160 2B         206        DCX    H
0161 46         207        MOV    B,M     ;B,C = CORRECTION TEMP
0162 D1         208        POP    D       ;GET THE LOWER VOLUME TEMP BACK
0163 F1         209        POP    PSW     ;GET THE SIGN BACK
0164 DC7001  C  210        CC     COMP    ;IF SIGN WAS -, 2'S COMPLEMENT THE CORRECTION
0167 7B         211        MOV    A,E     ;DO LOWER VOLUME TEMP + CORRECTION (B,C)
0168 81         212        ADD    C
0169 4F         213        MOV    C,A
016A 7A         214        MOV    A,D
016B 88         215        ADC    B
016C 47         216        MOV    B,A     ;B,C = INTERPOLATED TEMPERATURE
016D C36600  C  217        JMP    ITSOK   ;GO PRINT IT
0170 79         218 COMP:  MOV    A,C     ;2'S COMPLEMENT THE B,C PAIR
0171 2F         219        CMA
0172 4F         220        MOV    C,A
0173 78         221        MOV    A,B
0174 2F         222        CMA
0175 47         223        MOV    B,A
0176 03         224        INX    B
0177 C9         225        RET
0178 210100  E  226 CONVF: LXI    H,DBUF+1 ;WANT TO CONVERT THE TEMP TO FAHRENHEIT
017B 3600       227        MVI    M,0      ;DO TEMP X 1.8 + 32
017D 23         228        INX    H
017E 3612       229        MVI    M,18
0180 23         230        INX    H
0181 70         231        MOV    M,B
0182 23         232        INX    H
0183 71         233        MOV    M,C
0184 CD0000  E  234        CALL   MULTPY   ;DO THE MULTIPLY
0187 210800  E  235        LXI    H,DBUF+8 ;POINT TO THE RESULT
018A 7E         236        MOV    A,M
018B C680       237        ADI    80H      ;ADD THE 32
018D 4F         238        MOV    C,A
018E 2B         239        DCX    H
018F 7E         240        MOV    A,M
0190 CE0C       241        ACI    0CH
0192 47         242        MOV    B,A      ;B,C = FAHRENHEIT TEMP
0193 71         243        MOV    M,C      ;NOW, WANT TO DIVIDE BY 10 BECAUSE WE MULTIPLIED
0194 2B         244        DCX    H        ;BY 18 IN THE FAHRENHEIT CONVERSION
0195 70         245        MOV    M,B
0196 2B         246        DCX    H
0197 AF         247        XRA    A
0198 77         248        MOV    M,A
0199 2B         249        DCX    H
019A 77         250        MOV    M,A
019B 2B         251        DCX    H
019C 360A       252        MVI    M,10
019E 2B         253        DCX    H
019F 77         254        MOV    M,A
01A0 CD0000  E  255        CALL   DIVIDE   ;DO THE DIVIDE
01A3 210000  E  256        LXI    H,DBUF   ;POINT TO THE RESULT
01A6 46         257        MOV    B,M      ;PUT THE RESULT IN THE B,C PAIR
01A7 23         258        INX    H
```

```
01A8 4E              259         MOV    C,M
01A9 C9              260         RET
01AA 210800   E      261  CBCD   LXI    H,DBUF+8 ;WANT TO CONVERT THE BINARY TEMP TO ASCII &
01AD 71              262         MOV    M,C      ;PUT IT IN THE PRINT BUFFER
01AE 2B              263         DCX    H
01AF 70              264         MOV    M,B
01B0 2B              265         DCX    H
01B1 3600            266         MVI    M,0
01B3 2B              267         DCX    H
01B4 3600            268         MVI    M,0
01B6 CD0000   E      269         CALL   BINBCD   ;DO THE CONVERSION
01B9 210300   E      270         LXI    H,DBUF+3 ;POINT TO THE RESULT
01BC 110A00   E      271         LXI    D,PRINTB+10 ;POINT TO THE PRINT BUFFER
01BF 7E              272         MOV    A,M
01C0 CD0000   E      273         CALL   UNPAK
01C3 12              274         STAX   D
01C4 13              275         INX    D
01C5 7E              276         MOV    A,M
01C6 E60F            277         ANI    0FH
01C8 C630            278         ADI    30H
01CA 12              279         STAX   D
01CB 23              280         INX    H
01CC 13              281         INX    D
01CD 7E              282         MOV    A,M
01CE CD0000   E      283         CALL   UNPAK
01D1 12              284         STAX   D
01D2 13              285         INX    D
01D3 3E2E            286         MVI    A,'.'
01D5 12              287         STAX   D
01D6 13              288         INX    D
01D7 7E              289         MOV    A,M
01D8 E60F            290         ANI    0FH
01DA C630            291         ADI    30H
01DC 12              292         STAX   D
01DD 13              293         INX    D
01DE 3A0000   E      294         LDA    TRDR     ;WANT TO PUT THE TEMP UNITS IN THE PRINT BUFFER
01E1 E60C            295         ANI    0CH      ;CHECK IF THE RANGE IS CENTIGRADE
01E3 CAEA01   C      296         JZ     CENT     ;IF 0, GO PUT AN 'C' IN THE BUFFER
01E6 3E46            297         MVI    A,'F'    ;ELSE, PUT IN AN 'F'
01E8 12              298         STAX   D
01E9 C9              299         RET
01EA 3E43            300  CENT   MVI    A,'C'
01EC 12              301         STAX   D
01ED C9              302         RET
01EE 110000   E      303  INVOL  LXI    D,PRINTB ;WANT TO INSERT THE VOLUME IN THE PRINTB
01F1 3E20            304         MVI    A,' '
01F3 12              305         STAX   D
01F4 13              306         INX    D
01F5 2A0000   E      307         LHLD   EVAPT    ;GET THE PRESENT EVAPORATED TABLE POINTER
01F8 7E              308         MOV    A,M      ;GET THE PRESENT VOLUME
01F9 CD0000   E      309         CALL   UNPAK
01FC 12              310         STAX   D
01FD 13              311         INX    D
01FE 7E              312         MOV    A,M
01FF E60F            313         ANI    0FH
0201 C630            314         ADI    30H
0203 12              315         STAX   D
0204 13              316         INX    D
0205 3E4D            317         MVI    A,'M'
0207 12              318         STAX   D
0208 13              319         INX    D
0209 3E4C            320         MVI    A,'L'
020B 12              321         STAX   D
020C C9              322         RET
020D 7E              323  LOAD   MOV    A,M
020E 12              324         STAX   D
```

```
020F 23             325         INX     H
0210 13             326         INX     D
0211 05             327         DCR     B
0212 C20D02  C      328         JNZ     LOAD
0215 C9             329         RET
0000         C      330         END     EVAP
```

PUBLIC SYMBOLS
EVAP    C 0000

EXTERNAL SYMBOLS
| BINBCD E 0000 | BLANK  E 0000 | CLOSS  E 0000 | DBUF   E 0000 | DIVIDE E 0000 | EDITOR E 0000 |
|---|---|---|---|---|---|
| EMODE  E 0000 | EPT    E 0000 | EPVOL  E 0000 | EVAPB  E 0000 | EVAPT  E 0000 | EVAPV  E 0000 |
| EVAPVB E 0000 | EVAPVT E 0000 | LOSS   E 0000 | MULTPY E 0000 | PLOOP  E 0000 | PMES17 E 0000 |
| PMES18 E 0000 | PMES19 E 0000 | PRINT  E 0000 | PRINTB E 0000 | SATEMP E 0000 | TRDR   E 0000 |
| TV     E 0000 | UNPAK  E 0000 | | | | |

USER SYMBOLS
| BINBCD E 0000 | BLANK  E 0000 | BUMP   C 0076 | CBCD   C 01AA | CENT   C 01EA | CKTH   C 005E |
|---|---|---|---|---|---|
| CLOSS  E 0000 | COMP   C 0170 | CONVF  C 0178 | DBUF   E 0000 | DIVIDE E 0000 | EDITOR E 0000 |
| EMODE  E 0000 | EPT    E 0000 | EPVOL  E 0000 | EVAP   C 0000 | EVAPB  E 0000 | EVAPT  E 0000 |
| EVAPV  E 0000 | EVAPVB E 0000 | EVAPVT E 0000 | INTPOL C 00E7 | INVOL  C 01EE | ITSOK  C 0066 |
| LDE    C 00E2 | LEM    C 00D9 | LINE   C 0015 | LOAD   C 020D | LOSS   E 0000 | MULTPY E 0000 |
| NEXT   C 0033 | OK     C 001E | PEP    C 00A5 | PIBP   C 0084 | PLOOP  E 0000 | PMES17 E 0000 |
| PMES18 E 0000 | PMES19 E 0000 | PRINT  E 0000 | PRINTB E 0000 | SATEMP E 0000 | SKIP1  C 00F9 |
| TRDR   E 0000 | TV     E 0000 | UNPAK  E 0000 | | | |

ASSEMBLY COMPLETE, NO ERRORS

ISIS-II 8080/8085 MACRO ASSEMBLER, V2.0          CLOSS    PAGE    1
CORRECTED LOSS & TOTAL RECOVERY ROUTINE

LOC  OBJ         SEQ         SOURCE STATEMENT

```
                  1  $        TITLE('CORRECTED LOSS & TOTAL RECOVERY ROUTINE') PAGEWIDTH(105)
                  2                     ;WRITTEN 06/02/80
                  3                     ;UPDATED 02/12/82
                  4                     ;THIS ROUTINE CALCULATES THE CORRECTED LOSS BY
                  5                     ; INTERPOLATING THE DATA GIVEN IN ASTM D 86-77
                  6                     ; STANDARD METHOD FOR DISTILLATION OF PETROLEUM
                  7                     ;PRODUCTS. THE FORMULA FOR CALCULATING THE CORRECTED
                  8                     ;LOSS IS C.L. = LOSS X A + B WHERE THE A & B VALUES
                  9                     ; ARE GIVEN FOR 560MM TO 760MM IN 10MM STEPS. LINEAR
                 10                     ; INTERPOLATION IS USED BETWEEN EACH 10MM STEP.
                 11                     ; THE CORRECTED TOTAL RECOVERY = 100 - CORRECTED LOSS
                 12          NAME       CLOSS
                 13          PUBLIC     CLOSS
                 14          EXTRN      BAROM,DBUF,BCDBIN,MULTPY,BINBCD,PRINTB,PRINT,EDITOR,LOSS
                 15          EXTRN      UNPAK,LOSSB,CLTBL,PMES24,PMES30,PLOOP,BLANK
                 16          CSEG
0000 210000  E   17 CLOSS    LXI        H,BAROM ;POINT TO THE ASCII BAROMETER VALUE
0003 110200  E   18          LXI        D,DBUF+2 ;WANT TO CONVERT IT TO BINARY
0006 7E          19          MOV        A,M     ;GET THE MSDIGIT
0007 17          20          RAL
0008 17          21          RAL
0009 17          22          RAL
000A 17          23          RAL
000B E6F0        24          ANI        0F0H    ;WANT TO PACK THE HUNDREDS AND TENS DIGITS
000D 47          25          MOV        B,A
000E 23          26          INX        H
000F 7E          27          MOV        A,M
0010 E60F        28          ANI        0FH
0012 80          29          ADD        B       ;NOW, HAVE PACKED THE TWO DIGITS
0013 12          30          STAX       D       ;LOAD UP THE DATA BUFFER FOR THE BCDBIN ROUTINE
0014 1B          31          DCX        D
0015 AF          32          XRA        A
```

```
0016 12            33      STAX    D
0017 1B            34      DCX     D
0018 12            35      STAX    D
0019 EB            36      XCHG
001A CD0000  E     37      CALL    BCDBIN   ;DO THE CONVERSION
001D 3E4C          38      MVI     A,76     ;DO 76 - THE RESULT
001F 91            39      SUB     C
0020 CA4801  C     40      JZ      NOCOR    ;IF BAROMETER IS 760MM TO 769MM, NO CORRECTION
0023 DA4801  C     41      JC      NOCOR    ;IF BAROMETER IS > 770MM, NO CORRECTION
0026 3D            42      DCR     A
0027 87            43      ADD     A        ;CALCULATE THE TAB IN THE TABLE
0028 47            44      MOV     B,A      ;DO A REG X 6
0029 87            45      ADD     A
002A 80            46      ADD     B
002B 210000  E     47      LXI     H,CLTBL  ;POINT TO THE TOP OF THE CORRECTED LOSS TABLE
002E 85            48      ADD     L        ;ADD IN THE TABLE TAB
002F 6F            49      MOV     L,A
0030 7C            50      MOV     A,H
0031 CE00          51      ACI     0
0033 67            52      MOV     H,A      ;H,L NOW POINTS TO THE RIGHT ENTRY VALUES
0034 110400  E     53      LXI     D,DBUF+4 ;WANT TO SET UP THE DATA BUFFER FOR A MULTIPLY
0037 7E            54      MOV     A,M      ;GET THE DELTA A VALUE
0038 12            55      STAX    D
0039 1B            56      DCX     D
003A AF            57      XRA     A
003B 12            58      STAX    D
003C 1B            59      DCX     D
003D 3A0200  E     60      LDA     BAROM+2  ;GET THE BAROMETER UNITS ASCII DIGIT
0040 E60F          61      ANI     0FH
0042 12            62      STAX    D
0043 AF            63      XRA     A
0044 1B            64      DCX     D
0045 12            65      STAX    D
0046 E5            66      PUSH    H        ;SAVE THE TABLE POINTER
0047 CD0000  E     67      CALL    MULTPY   ;DO THE MULTIPLY
004A E1            68      POP     H        ;RESTORE THE TABLE POINTER
004B 23            69      INX     H        ;POINT TO THE 'A' VALUE IN THE TABLE
004C 110800  E     70      LXI     D,DBUF+8 ;POINT TO THE MULTIPLY'S RESULT
004F 1A            71      LDAX    D        ;NOW ADD IN THE 'A' VALUE
0050 86            72      ADD     M
0051 4F            73      MOV     C,A
0052 1B            74      DCX     D
0053 23            75      INX     H
0054 1A            76      LDAX    D
0055 8E            77      ADC     M
0056 47            78      MOV     B,A      ;NOW, B,C = INTERPOLATED 'A' VALUE
0057 E5            79      PUSH    H        ;SAVE THE TABLE POINTER
0058 3A0000  E     80      LDA     LOSSB    ;GET THE UNCORRECTED BINARY LOSS VALUE
005B 210400  E     81      LXI     H,DBUF+4 ;SET UP THE DATA BUFFER FOR ANOTHER MULTIPLY
005E 77            82      MOV     M,A      ;DO UNCORRECTED LOSS X 'A' VALUE
005F 2B            83      DCX     H
0060 3600          84      MVI     M,0
0062 2B            85      DCX     H
0063 71            86      MOV     M,C
0064 2B            87      DCX     H
0065 70            88      MOV     M,B
0066 CD0000  E     89      CALL    MULTPY   ;DO THE MULTIPLY
0069 210800  E     90      LXI     H,DBUF+8 ;POINT TO THE RESULT
006C 4E            91      MOV     C,M      ;WANT TO SAVE THE RESULT ON THE STACK
006D 2B            92      DCX     H
006E 46            93      MOV     B,M
006F 2B            94      DCX     H
0070 5E            95      MOV     E,M
0071 2B            96      DCX     H
0072 56            97      MOV     D,M
0073 E1            98      POP     H        ;GET THE TABLE POINTER
```

```
0074 C5              99       PUSH   B         ;SAVE THE LOSS X 'A' BITS 15-0
0075 D5             100       PUSH   D         ;SAVE THE LOSS X 'A' BITS 31-16
0076 23             101       INX    H         ;POINT TO THE 'B' DELTA VALUE
0077 7E             102       MOV    A,M
0078 E5             103       PUSH   H         ;SAVE THE TABLE POINTER
0079 210400    E    104       LXI    H,DBUF+4;SET UP THE DATA BUFFER FOR ANOTHER MULTIPLY
007C 77             105       MOV    M,A       ;DO 'B' DELTA VALUE X BAROMETER VALUE X 10
007D 2B             106       DCX    H
007E AF             107       XRA    A
007F 77             108       MOV    M,A
0080 2B             109       DCX    H
0081 3A0200    E    110       LDA    BAROM+2 ;GET THE BAROMETER UNITS ASCII DIGIT
0084 E60F           111       ANI    0FH
0086 87             112       ADD    A         ;DO UNITS DIGIT X 10
0087 47             113       MOV    B,A
0088 87             114       ADD    A
0089 87             115       ADD    A
008A 80             116       ADD    B
008B 77             117       MOV    M,A
008C 2B             118       DCX    H
008D AF             119       XRA    A
008E 77             120       MOV    M,A
008F CD0000    E    121       CALL   MULTPY ;DO THE MULTIPLY
0092 E1             122       POP    H         ;GET THE TABLE POINTER
0093 23             123       INX    H
0094 110800    E    124       LXI    D,DBUF+8;POINT TO THE RESULT
0097 EB             125       XCHG
0098 1A             126       LDAX   D         ;SUB THE 'B' DELTA FROM THE 'B' VALUE
0099 96             127       SUB    M
009A 77             128       MOV    M,A
009B 2B             129       DCX    H
009C 13             130       INX    D
009D 1A             131       LDAX   D
009E 9E             132       SBB    M
009F 77             133       MOV    M,A
00A0 D1             134       POP    D         ;GET THE FIRST HALF RESULT OF THE CORRECTED FORMULA
00A1 C1             135       POP    B         ;GET THE BITS 15-0
00A2 23             136       INX    H
00A3 79             137       MOV    A,C       ;WANT TO ADD IT ALL UP
00A4 86             138       ADD    M
00A5 77             139       MOV    M,A
00A6 2B             140       DCX    H
00A7 78             141       MOV    A,B
00A8 8E             142       ADC    M
00A9 77             143       MOV    M,A
00AA 2B             144       DCX    H
00AB 7B             145       MOV    A,E
00AC 8E             146       ADC    M
00AD 77             147       MOV    M,A
00AE 2B             148       DCX    H
00AF 7A             149       MOV    A,D
00B0 8E             150       ADC    M
00B1 77             151       MOV    M,A
00B2 CD0000    E    152       CALL   BINBCD ;CONVERT THIS FINAL CORRECTED LOSS TO BCD
00B5 210200    E    153       LXI    H,DBUF+2;POINT TO THE RESULT
00B8 4E             154       MOV    C,M       ;GET THE BCD UNITS & TENTHS DIGITS
00B9 23             155       INX    H
00BA 7E             156       MOV    A,M       ;GET THE HUNDREDTHS DIGIT FOR ROUND UP CHECK
00BB E6F0           157       ANI    0F0H
00BD FE50           158       CPI    50H
00BF CA4001    C    159       JZ     RUP       ;IF THIS DIGIT IS = 5, ROUND UP
00C2 D24001    C    160       JNC    RUP       ;IF THIS DIGIT IS > 5, ROUND UP
00C5 C5             161 DRUP  PUSH   B         ;SAVE THE CORRECTED BCD LOSS IN THE C REG
00C6 210000    E    162       LXI    H,PMES30;LOAD UP THE CORRECTED LOSS MESSAGE
00C9 010000    E    163       LXI    B,PRINTB;POINT TO THE PRINT BUFFER
00CC 1614           164       MVI    D,20
```

| Addr | Code | | Line | | Op | Operand | Comment |
|---|---|---|---|---|---|---|---|
| 00CE | CD4F01 | C | 165 | | CALL | LOAD | ;GO LOAD THE BUFFER |
| 00D1 | C1 | | 166 | | POP | B | ;GET THE CORRECTED BCD LOSS BACK |
| 00D2 | C5 | | 167 | | PUSH | B | ;SAVE IT FOR LATER |
| 00D3 | 79 | | 168 | | MOV | A,C | ;WANT TO UNPACK IT |
| 00D4 | E60F | | 169 | | ANI | 0FH | |
| 00D6 | C630 | | 170 | | ADI | 30H | ;CONVERT IT TO ASCII |
| 00D8 | 320200 | E | 171 | | STA | PRINTB+2 | ;PUT THE TENTHS DIGIT IN THE PRINT BUFFER |
| 00DB | 79 | | 172 | | MOV | A,C | |
| 00DC | CD0000 | E | 173 | | CALL | UNPAK | ;GO UNPACK THE TWO DIGITS |
| 00DF | 320000 | E | 174 | | STA | PRINTB | ;PUT THE UNITS DIGIT IN THE PRINT BUFFER |
| 00E2 | CD0000 | E | 175 | | CALL | PRINT | ;GO PRINT THE CORRECTED LOSS VALUE |
| 00E5 | C1 | | 176 | | POP | B | ;GET THE BCD CORRECTED LOSS AGAIN |
| 00E6 | 210200 | E | 177 | | LXI | H,DBUF+2 | ;WANT TO CONVERT IT TO BINARY |
| 00E9 | 71 | | 178 | | MOV | M,C | |
| 00EA | 2B | | 179 | | DCX | H | |
| 00EB | AF | | 180 | | XRA | A | |
| 00EC | 77 | | 181 | | MOV | M,A | |
| 00ED | 2B | | 182 | | DCX | H | |
| 00EE | 77 | | 183 | | MOV | M,A | |
| 00EF | CD0000 | E | 184 | | CALL | BCDBIN | ;DO THE CONVERSION |
| 00F2 | 3EE8 | | 185 | | MVI | A,0E8H | ;WANT TO CALCULATE THE CORRECTED TOTAL RECOVERY |
| 00F4 | 91 | | 186 | | SUB | C | ;DO 100.0 - CORRECTED LOSS |
| 00F5 | 4F | | 187 | | MOV | C,A | ;SAVE THE RESULT |
| 00F6 | 3E03 | | 188 | | MVI | A,3 | |
| 00F8 | 98 | | 189 | | SBB | B | |
| 00F9 | 47 | | 190 | | MOV | B,A | ;B,C = BINARY CORR TOTAL RECOVERY |
| 00FA | 210800 | E | 191 | | LXI | H,DBUF+8 | ;NOW, CONVERT IT TO BCD |
| 00FD | 71 | | 192 | | MOV | M,C | ;SO LOAD UP THE DATA BUFFER FOR THE CONVERSION |
| 00FE | 2B | | 193 | | DCX | H | |
| 00FF | 70 | | 194 | | MOV | M,B | |
| 0100 | 2B | | 195 | | DCX | H | |
| 0101 | AF | | 196 | | XRA | A | |
| 0102 | 77 | | 197 | | MOV | M,A | |
| 0103 | 2B | | 198 | | DCX | H | |
| 0104 | 77 | | 199 | | MOV | M,A | |
| 0105 | CD0000 | E | 200 | | CALL | BINBCD | ;DO THE CONVERSION |
| 0108 | 210000 | E | 201 | | LXI | H,PMES24 | ;POINT TO THE CORR TOT REC MESSAGE |
| 010B | 010000 | E | 202 | | LXI | B,PRINTB | ;POINT TO THE PRINT BUFFER |
| 010E | 1614 | | 203 | | MVI | D,20 | |
| 0110 | CD4F01 | C | 204 | | CALL | LOAD | ;GO LOAD THE MESSAGE |
| 0113 | 210300 | E | 205 | | LXI | H,DBUF+3 | ;POINT TO THE BCD CORR TOT REC |
| 0116 | 7E | | 206 | | MOV | A,M | ;GET THE MSD |
| 0117 | E60F | | 207 | | ANI | 0FH | |
| 0119 | C630 | | 208 | | ADI | 30H | ;MAKE IT ASCII |
| 011B | 110000 | E | 209 | | LXI | D,PRINTB | ;POINT TO THE PRINT BUFFER |
| 011E | 12 | | 210 | | STAX | D | |
| 011F | 23 | | 211 | | INX | H | |
| 0120 | 13 | | 212 | | INX | D | |
| 0121 | 7E | | 213 | | MOV | A,M | |
| 0122 | CD0000 | E | 214 | | CALL | UNPAK | |
| 0125 | 12 | | 215 | | STAX | D | |
| 0126 | 13 | | 216 | | INX | D | |
| 0127 | 13 | | 217 | | INX | D | |
| 0128 | 7E | | 218 | | MOV | A,M | |
| 0129 | E60F | | 219 | | ANI | 0FH | |
| 012B | C630 | | 220 | | ADI | 30H | |
| 012D | 12 | | 221 | | STAX | D | |
| 012E | CD0000 | E | 222 | | CALL | PRINT | ;GO PRINT THE CORR TOT REC |
| 0131 | 210000 | E | 223 | | LXI | H,BLANK | ;WANT TO PRINT OUT A LINE OF BLANKS |
| 0134 | CD0000 | E | 224 | | CALL | PLOOP | ;GO LOAD & PRINT IT |
| 0137 | 210000 | E | 225 | | LXI | H,BLANK | ;WANT TO PRINT OUT A LINE OF BLANKS |
| 013A | CD0000 | E | 226 | | CALL | PLOOP | ;GO LOAD & PRINT IT |
| 013D | C30000 | E | 227 | | JMP | EDITOR | ;GO WAIT FOR THE NEXT KEY STROKE |
| 0140 | 79 | | 228 | RUP: | MOV | A,C | |
| 0141 | C601 | | 229 | | ADI | 1 | |
| 0143 | 27 | | 230 | | DAA | | |

```
0144 4F              231          MOV    C,A
0145 C3C500    C     232          JMP    DRUP
0148 3A0000    E     233 NOCOR:   LDA    LOSS       ;GET THE BCD UNCORRECTED LOSS
014B 4F              234          MOV    C,A
014C C3C500    C     235          JMP    DRUP       ;NO CORRECTION NEEDED WHEN BAROMETER = OR > 760MM
014F 7E              236 LOAD:    MOV    A,M
0150 02              237          STAX   B
0151 23              238          INX    H
0152 03              239          INX    B
0153 15              240          DCR    D
0154 C24F01    C     241          JNZ    LOAD
0157 C9             242          RET
0000           C     243          END    CLOSS
```

PUBLIC SYMBOLS
CLOSS  C 0000

EXTERNAL SYMBOLS
| BAROM  E 0000 | BCDBIN E 0000 | BINBCD E 0000 | BLANK  E 0000 | CLTBL  E 0000 | DBUF   E 0000 |
| EDITOR E 0000 | LOSS   E 0000 | LOSSB  E 0000 | MULTPY E 0000 | PLOOP  E 0000 | PMES24 E 0000 |
| PMES30 E 0000 | PRINT  E 0000 | PRINTB E 0000 | UNPAK  E 0000 | | |

USER SYMBOLS
| BAROM  E 0000 | BCDBIN E 0000 | BINBCD E 0000 | BLANK  E 0000 | CLOSS  C 0000 | CLTBL  E 0000 |
| DBUF   E 0000 | DRUP   C 00C5 | EDITOR E 0000 | LOAD   C 014F | LOSS   E 0000 | LOSSB  E 0000 |
| MULTPY E 0000 | NOCOR  C 0148 | PLOOP  E 0000 | PMES24 E 0000 | PMES30 E 0000 | PPRINT E 0000 |
| PRINTB E 0000 | RUP    C 0140 | UNPAK  E 0000 | | | |

ASSEMBLY COMPLETE, NO ERRORS

ISIS-II 8080/8085 MACRO ASSEMBLER, V2.0          PLOT
X-Y RECORDER ORIGIN

```
    LOC  OBJ        SEQ        SOURCE STATEMENT

1  $        TITLE ( X-Y RECORDER ORIGIN ) PAGEWIDTH(105) DEBUG
                    2                            ;WRITTEN 08/04/80
                    3                            ;UPDATED 11/17/81
                    4                            ;PLOT OUT AN ORIGIN ON THE X-Y RECORDER
                    5              NAME    PLOT
                    6              PUBLIC  PLOT
                    7              CSEG
0000 3E01           8  PLOT       MVI     A,1
0002 320B70         9             STA     700BH      ;LOWER THE PEN
0005 110100        10             LXI     D,1
0008 21C7F0        11             LXI     H,61639    ;WAIT 30 MS (3896)
000B 19            12  WAIT1      DAD     D
000C D20B00   C    13             JNC     WAIT1
000F 21B200        14             LXI     H,178
0012 221870        15             SHLD    7018H      ;PLOT THE X AXIS ORIGIN
0015 213E86        16             LXI     H,34366    ;WAIT 240 MS (31169)
0018 19            17  WAIT2      DAD     D
0019 D21800   C    18             JNC     WAIT2
001C AF            19             XRA     A
001D 320B70        20             STA     700BH      ;RAISE THE PEN
0020 21C7F0        21             LXI     H,61639    ;WAIT 30 MS
0023 19            22  WAIT3      DAD     D
0024 D22300   C    23             JNC     WAIT3
0027 210000        24             LXI     H,0
002A 221870        25             SHLD    7018H      ;RUN TO (0,0) ORIGIN
002D 213E86        26             LXI     H,34366    ;WAIT 240 MS
0030 19            27  WAIT4      DAD     D
0031 D23000   C    28             JNC     WAIT4
0034 3E01         29             MVI     A,1
0036 320B70        30             STA     700BH      ;LOWER THE PEN
0039 21C7F0        31             LXI     H,61639    ;WAIT 30 MS
```

```
0030 19              32 WAIT5    DAD    D
003D D23D00    C    33          JNC    WAIT5
0040 215D00         34          LXI    H,63
0043 221A70         35          SHLD   701AH      ;PLOT THE Y AXIS ORIGIN
0046 21DE86         36          LXI    H,34566    ;WAIT 240 MS
0049 19             37 WAIT6    DAD    D
004A D24900    C    38          JNC    WAIT6
004D AF             39          XRA    A
004E 220B70         40          STA    700BH      ;RAISE THE PEN
0051 C9             41          RET
0000           C    42          END    FLOT
```

PUBLIC SYMBOLS
FLOT  C 0000

EXTERNAL SYMBOLS

USER SYMBOLS
FLOT  C 0000   WAIT1 C 0006   WAIT2 C 0018   WAIT3 C 0023   WAIT4 C 0030   WAIT5 C 003C
WAIT6 C 0049

ASSEMBLY COMPLETE, NO ERRORS

ISIS-II 8080/8085 MACRO ASSEMBLER, V2.0        LAG        PAGE    1
TEMPERATURE LAG GENERATOR ROUTINE

LOC  OBJ           SEQ         SOURCE STATEMENT

```
                    1  $       TITLE('TEMPERATURE LAG GENERATOR ROUTINE')
                    2                             ;WRITTEN 10/30/80
                    3                             ;UPDATED 11/07/80
                    4                             ;THIS ROUTINE PUTS TEMPERATURES IN A LAG TABLE
                    5                             ;AND PROVIDES A WAY TO PUSH DOWN THESE VALUES
                    6                             ;WHEN REQUESTED ON A TIME BASES  LAG IS USED
                    7                             ;ONLY WHEN RATE = 4 5ML/MIN & RANGE IS NOT
                    8                             ;10 - 2000
                    9          NAME    LAG
                   10          PUBLIC  LAG,MLAG
                   11          EXTRN   LAGTBL
                   12          CSEG
0000 2A1800    E   13 LAG      LHLD    LAGTBL+24  ;GET THE BINARY TEMP 12 332 SEC AGO
0003 4D            14          MOV     C,L
0004 44            15          MOV     B,H
0005 C9            16          RET
0006 211700    E   17 MLAG     LXI    H,LAGTBL+23
0009 111900    E   18          LXI    D,LAGTBL+25
000C 0618          19          MVI    B,24
000E 7E            20 LOOP     MOV    A,M       ;MLAG DOES A PUSH OF THE STACK
000F 12            21          STAX   D
0010 2B            22          DCX    H
0011 1B            23          DCX    D
0012 05            24          DCR    B
0013 C20E00   C    25          JNZ    LOOP
0016 C9            26          RET
0000          C    27          END    LAG
```

PUBLIC SYMBOLS
LAG   C 0000   MLAG  C 0006

EXTERNAL SYMBOLS
LAGTBL E 0000

USER SYMBOLS
LAG   C 0000   LAGTBL E 0000   LOOP  C 000E   MLAG  C 0006

ASSEMBLY COMPLETE, NO ERRORS

ISIS-II 8080/8085 MACRO ASSEMBLER, V2.0        RS232C
RS232C COMMUNICATION CHANNEL DRIVER

```
LOC    OBJ          SEQ         SOURCE STATEMENT

1  $    TITLE('RS232C COMMUNICATION CHANNEL DRIVER' PAGEWIDTH(105) DEBUG
                     2                 ;WRITTEN 12/03/81
                     3                 ;UPDATED 01/20/82
                     4                 ;THIS ROUTINE CHECKS IF THE COMMUNICATION I/O
                     5                 ;BOARD IS INSTALLED AND THE DATA TERMINAL IS
                     6                 ;READY. THE TRANSMIT DATA TABLE (TXDT) IS THEN
                     7                 ;OUTPUT VIA THE RS232C PORT. THE OPERATOR MAY
                     8                 ;TERMINATE TRANSMISSION VIA KEYBOARD INPUT
                     9                 ;RESET KEY - FATAL TERMINATION
                    10                 ;ALL OTHER KEYS - OUTPUT ESC & ETX
                    11         NAME    RS232C
                    12         PUBLIC  RS232C
                    13         EXTRN   DMES12,DSPLY,TXDT,UDATE,KEYIN
                    14         CSEG
0000 210370         15  RS232C LXI     H,7003H    ;POINT TO THE 8251 COMMAND PORT, WANT TO REINITIZE
0003 3650           16         MVI     M,50H      ;ISSUE AN INTERNAL RESET
0005 367B           17         MVI     M,7BH      ;MODE = 1 STOP, EVEN PARITY, 7 DATA, 64 X
0007 3623           18         MVI     M,23H      ;ISSUE A RTS, DTR, & TXEN
0009 3A0370         19         LDA     7003H      ;GET THE RS232C STATUS BYTE
000C FE85           20         CPI     85H        ;CHECK IF I/O BOARD INSTALLED & DTR FROM USER
000E C0             21         RNZ                ;RETURN IF HARDWARE LINK NOT ESTABLISHED
000F 210000    E    22         LXI     H,DMES12   ;IF HARDWARE IS OK, DISPLAY TRANSMITTING MESSAGE
0012 CD0000    E    23         CALL    DSPLY      ;GO DISPLAY THIS MESSAGE
0015 210000    E    24         LXI     H,TXDT     ;POINT TO THE TOP OF THE TRANSMIT DATA TABLE
0018 3A0370         25  TXSTAT LDA     7003H      ;GET THE 8251 STATUS BYTE
001B 1F             26         RAR                ;CHECK TXRDY, TRANSMITTER READY
001C DA3A00    C    27         JC      TXOUT      ;IF READY, GO OUTPUT THE CHARACTER
001F E5             28         PUSH    H          ;SAVE THE TXDT POINTER
0020 CD0000    E    29         CALL    UDATE      ;GO UPDATE THE TIME DATA (MINUTE, HOUR, ETC)
0023 CD0000    E    30         CALL    KEYIN      ;GO CHECK FOR ANY KEYBOARD INPUT
0026 E1             31         POP     H          ;GET THE DATA POINTER BACK
0027 17             32         RAL                ;CHECK FOR ANY CHARACTERS, LOOK AT BIT 6
0028 DA1800    C    33         JC      TXSTAT     ;IF NONE, GO TO THE 8251 STATUS CHECK
002B 1F             34         RAR                ;GET THE CHARACTER
002C FE14           35         CPI     20         ;CHECK FOR THE RESET KEY
002E CA4700    C    36         JZ      CLEAR      ;IF = RESET KEY, TERMINATE TRANSMISSION NOW
0031 361B           37         MVI     M,1BH      ;INSERT AN ESC, OPERATOR IS TERMINATING TRANSMISSION
0033 23             38         INX     H          ;WHEN ANY OTHER KEY IS HIT
0034 3603           39         MVI     M,3        ;INSERT AN ETX
0036 2B             40         DCX     H
0037 C21800    C    41         JMP     TXSTAT     ;GO CHECK THE TRANSMITTER STATUS
003A 7E             42  TXOUT  MOV     A,M        ;GET THE ASCII CHARACTER IN THE TABLE
003B 23             43         INX     H          ;POINT TO THE NEXT CHARACTER
003C 320270         44         STA     7002H      ;OUTPUT THE CHARACTER
003F CD4000    C    45         CALL    DELAY      ;MUST DELAY
0042 FE03           46         CPI     3          ;CHECK FOR AN ETX, END OF TEXT
0044 C21800    C    47         JNZ     TXSTAT     ;IF NOT ETX, REPEAT THE LOOP
0047 3E02           48  CLEAR  MVI     A,2        ;REMOVE THE RTS & TXEN, KEEP THE DTR
0049 320370         49         STA     7003H      ;OUTPUT IT
004C C9             50         RET                ;RETURN WHEN DONE TRANSMITTING
004D E5             51  DELAY  PUSH    H
004E 21E8FD         52         LXI     H,65000
0051 110100         53         LXI     D,1
0054 19             54  DELAYL DAD     D
0055 D25400    C    55         JNC     DELAYL
0058 E1             56         POP     H
0059 C9             57         RET
0000           C    58         END     RS232C
```

PUBLIC SYMBOLS
RS232C C 0000

EXTERNAL SYMBOLS
DMES12 E 0000    DSPLY  E 0000    KEYIN  E 0000    TXDT  E 0000    UDATE  E 0000

USER SYMBOLS
CLEAR  C 0047    DELAY  C 004D    DELAYL C 0054    DMES12 E 0000    DSPLY  E 0000    KEYIN  E 0000
RS232C C 0000    TXDT   E 0000    TXOUT  C 003A    TXSTAT C 0018    UDATE  E 0000

ASSEMBLY COMPLETE, NO ERRORS

ISIS-II 8080/8085 MACRO ASSEMBLER, V2.0        DIAG
ADAIII DIAGNOSTIC ROUTINE

```
LOC  OBJ       SEQ        SOURCE STATEMENT

1  $      TITLE('ADAIII DIAGNOSTIC ROUTINE') PAGEWIDTH(105) DEBUG
                2                     ;WRITTEN 05/11/81
                3                     ;UPDATED 04/02/82
                4                     ;THIS ROUTINE ALLOWS THE SELECTION OF THE RESIDENT
                5                     ;TEST ROUTINES FOR ADAIII.
                6                     ;0 - SELECTS THE RAM TEST
                7                     ;1 - SELECTS THE MOTOR TEST
                8                     ;2 - SELECTS THE BAROMETER TEST
                9                     ;3 - SELECTS THE VAPOR TEMPERATURE TEST
               10                     ;4 - SELECTS THE X-Y RECORDER TEST
               11                     ;5 - SELECTS THE CHAMBER TEMP TEST
               12                     ;6 - SELECTS THE CONDENSER TEMP TEST
               13                     ;7 - SELECTS THE CONDENSER LEVEL TEST
               14                     ;8 - SELECTS THE WATTMETER HEATER TEST
               15                     ;9 - SELECTS THE RS232C COMMUNICATION TEST
               16          NAME   DIAG
               17          PUBLIC DIAG
               18          EXTRN  RTEST,MTEST,BTEST,TTEST,XYTEST,CHTEST,CONTST,LTEST,WTEST
               19          EXTRN  XTEST,DMES9,DSPLY,KEYIN,INIT,PHASE,DIAGSW
               20          CSEG
0000 3A0000 E  21  DIAG:   LDA    PHASE      ;GET THIS CONTROL BYTE
0003 F610      22          ORI    10H        ;WANT TO TURN OFF THE AIR WHEN IN DIAGNOSTICS
0005 320000 E  23          STA    PHASE      ;SAVE THIS CONTROL BYTE
0008 E61F      24          ANI    1FH        ;TURN OFF THE MOTOR PHASES
000A 32A070    25          STA    700AH      ;OUTPUT THIS CONTROL BYTE
000D 3E01      26          MVI    A,1
000F 320000 E  27          STA    DIAGSW     ;SET DIAGNOSTIC SWITCH = 1
0012 210000 E  28          LXI    H,DMES9    ;POINT TO THE SELECT TEST MESSAGE
0015 CD0000 E  29          CALL   DSPLY      ;GO DISPLAY IT
0018 CD0000 E  30  INKEY:  CALL   KEYIN      ;GO SAMPLE THE KEYBOARD
001B 17        31          RAL               ;CHECK FOR ANY CHARACTERS, LOOK AT BIT 8
001C DA1800 C  32          JC     INKEY      ;IF NONE, WAIT FOR SOME
001F 1F        33          RAR               ;GET THE CHARACTER
0020 FE00      34          CPI    0          ;CHECK FOR THE RAM TEST
0022 CA0000 E  35          JZ     RTEST
0025 FE01      36          CPI    1          ;CHECK FOR THE MOTOR TEST
0027 CA0000 E  37          JZ     MTEST
002A FE02      38          CPI    2          ;CHECK FOR THE BAROMETER TEST
002C CA0000 E  39          JZ     BTEST
002F FE03      40          CPI    3          ;CHECK FOR THE VAPOR TEMPERATURE TEST
0031 CA0000 E  41          JZ     TTEST
0034 FE04      42          CPI    4          ;CHECK FOR THE X-Y RECORDER TEST
0036 CA0000 E  43          JZ     XYTEST
0039 FE05      44          CPI    5          ;CHECK FOR THE CHAMBER TEMPERATURE TEST
003B CA0000 E  45          JZ     CHTEST
003E FE06      46          CPI    6          ;CHECK FOR THE CONDENSER TEMPERATURE TEST
0040 CA0000 E  47          JZ     CONTST
0043 FE07      48          CPI    7          ;CHECK FOR THE CONDENSER LIQUID LEVEL TEST
0045 CA0000 E  49          JZ     LTEST
0048 FE08      50          CPI    8          ;CHECK FOR THE WATTMETER HEATER TEST
004A CA0000 E  51          JZ     WTEST
004D FE09      52          CPI    9          ;CHECK FOR THE RS232C COMMUNICATION TEST
```

```
004F CA0000   E    53         JZ      XTEST
0052 FE14          54         CPI     20       ;CHECK FOR THE RESET KEY
0054 CA0000   E    55         JZ      INIT
0057 C31800   C    56         JMP     INKEY    ;IGNORE ALL OTHER KEYS
0000          C    57         END     DIAG
```

PUBLIC SYMBOLS
DIAG   C 0000

EXTERNAL SYMBOLS

| BTEST | E 0000 | CHTEST | E 0000 | CONTST | E 0000 | DIAGSW | E 0000 | DMES9 | E 0000 | DSPLY | E 0000 |
|---|---|---|---|---|---|---|---|---|---|---|---|
| INIT  | E 0000 | KEYIN  | E 0000 | LTEST  | E 0000 | MTEST  | E 0000 | PHASE | E 0000 | RTEST | E 0000 |
| TTEST | E 0000 | WTEST  | E 0000 | XTEST  | E 0000 | XYTEST | E 0000 |        |        |       |        |

USER SYMBOLS

| BTEST | E 0000 | CHTEST | E 0000 | CONTST | E 0000 | DIAG  | C 0000 | DIAGSW | E 0000 | DMES9 | E 0000 |
|---|---|---|---|---|---|---|---|---|---|---|---|
| DSPLY | E 0000 | INIT   | E 0000 | INKEY  | C 0018 | KEYIN | E 0000 | LTEST  | E 0000 | MTEST | E 0000 |
| PHASE | E 0000 | RTEST  | E 0000 | TTEST  | E 0000 | WTEST | E 0000 | XTEST  | E 0000 | XYTEST| E 0000 |

ASSEMBLY COMPLETE, NO ERRORS

ISIS-II 8080/8085 MACRO ASSEMBLER, V2.0          RTEST
RAM TEST ROUTINE

```
LOC  OBJ         SEQ        SOURCE STATEMENT

1  $        TITLE('RAM TEST ROUTINE') PAGEWIDTH(105) DEBUG
                 2                             ;WRITTEN 05/06/81
                 3                             ;UPDATED 11/17/81
                 4                             ;THIS ROUTINE PERFORMS A BASIC RAM TEST BY WRITING
                 5                             ;SOME TEST PATTERNS AND VERIFYING THEM. RAM
                 6                             ;LOCATIONS 6010H TO 67FFH ARE TESTED. LOCATIONS
                 7                             ;6000H TO 6010H CANNOT BE OVERWRITTEN
                 8             NAME    RTEST
                 9             PUBLIC  RTEST
                10             EXTRN   DIAG,DSPLY,DMES10,DMES11,KEYIN,IBUF,XMIT
                11             CSEG
0000 04         12  PCNT   DB      4           ;NUMBER OF PATTERNS TO TEST
0001 00         13  PAT1   DB      0           ;00000000        RAM TEST PATTERN TABLE
0002 FF         14  PAT2   DB      255         ;11111111
0003 55         15  PAT3   DB      85          ;01010101
0004 AA         16  PAT4   DB      170         ;10101010
0005 210900  E  17  RTEST  LXI     H,IBUF+9    ;POINT TO THE INSERT BUFFER
0008 3E20       18         MVI     A,' '       ;WANT TO BLANK OUT THE PASSED MESSAGE
000A 0606       19         MVI     B,6
000C 77         20  BLOOP  MOV     M,A
000D 23         21         INX     H
000E 05         22         DCR     B
000F C20C00  C  23         JNZ     BLOOP
0012 CD0000  E  24         CALL    XMIT        ;OUTPUT THIS MESSAGE
0015 3A0000  C  25         LDA     PCNT        ;GET THE NUMBER OF PATTERNS TO TEST
0018 47         26         MOV     B,A         ;SAVE THIS COUNT
0019 110068     27         LXI     D,6800H     ;POINT TO THE HIGHEST RAM LOCATION + 1
001C 3A0400  C  28         LDA     PAT4        ;GET THE FIRST PATTERN TO TEST
001F 4F         29  PAT5T  MOV     C,A         ;SAVE THIS PATTERN
0020 211060     30         LXI     H,6010H     ;POINT TO THE LOWEST RAM LOCATION
0023 71         31  LOOP1  MOV     M,C
0024 23         32         INX     H
0025 7D         33         MOV     A,L
0026 93         34         SUB     E           ;DO H,L - D,E
0027 7C         35         MOV     A,H
0028 9A         36         SBB     D
0029 DA2300  C  37         JC      LOOP1
002C 211060     38         LXI     H,6010H     ;NOW WANT TO VERIFY THIS PATTERN WAS LOADED OK
002F 7E         39  LOOP2  MOV     A,M
0030 B9         40         CMP     C
```

```
0001 C27300   C   41              JNZ    ERROR
0004 23           42              INX    H
0005 7D           43              MOV    A,L
0006 93           44              SUB    E        ;DO H,L - D,E
0007 7C           45              MOV    A,H
0008 9A           46              SBB    D
0009 DA2F00   C   47              JC     LOOP2
000C 210000   C   48              LXI    H,PCNT   ;POINT TO THE PCNT VALUE
000F 05           49              DCR    B        ;DECREMENT THE PATTERN COUNTER
0040 CA4E00   C   50              JZ     TEST2
0043 7D           51              MOV    A,L
0044 80           52              ADD    B
0045 6F           53              MOV    L,A
0046 7C           54              MOV    A,H
0047 CE00         55              ACI    0
0049 67           56              MOV    H,A
004A 7E           57              MOV    A,M      ;GET THE NEXT PATTERN TO TEST
004B C31F00   C   58              JMP    PATST    ;GO TEST THE NEXT PATTERN
004E 211060       59 TEST2:       LXI    H,6010H
0051 75           60 LOOP3:       MOV    M,L      ;WANT TO WRITE AN INCREMENTING VALUE TO THE RAM
0052 23           61              INX    H
0053 7D           62              MOV    A,L
0054 93           63              SUB    E        ;DO H,L - D,E
0055 7C           64              MOV    A,H
0056 9A           65              SBB    D
0057 DA5100   C   66              JC     LOOP3
005A 211060       67              LXI    H,6010H
005D 0E10         68              MVI    C,10H    ;START WITH THIS PATTERN
005F 7E           69 LOOP4:       MOV    A,M      ;NOW WANT TO VERIFY THE PATTERN WRITTEN
0060 B9           70              CMP    C
0061 C27300   C   71              JNZ    ERROR    ;IF NOT EQUAL, THEN IT'S AN ERROR
0064 23           72              INX    H
0065 0C           73              INR    C
0066 7D           74              MOV    A,L
0067 93           75              SUB    E        ;DO H,L - D,E
0068 7C           76              MOV    A,H
0069 9A           77              SBB    D
006A DA5F00   C   78              JC     LOOP4
006D 210000   E   79              LXI    H,DMES10 ;POINT TO THE RAM TEST PASSED MESSAGE
0070 C37600   C   80              JMP    CONT     ;GO WAIT FOR A KEYBOARD INPUT
0073 210000   E   81 ERROR:       LXI    H,DMES11 ;POINT TO THE RAM TEST FAILED MESSAGE
0076 CD0000   E   82 CONT:        CALL   DSPLY
0079 CD0000   E   83 INKEY:       CALL   KEYIN    ;GO SAMPLE THE KEYBOARD
007C 17           84              RAL             ;CHECK FOR ANY ENTRIES, LOOK AT BIT 8
007D DA7900   C   85              JC     INKEY    ;IF NONE, WAIT FOR SOME
0080 1F           86              RAR             ;GET THE CHARACTER
0081 FE14         87              CPI    20       ;CHECK FOR THE RESET KEY
0083 CA0000   E   88              JZ     DIAG     ;THE RESET KEY SENDS US TO THE DIAG ROUTINE
0086 C30500   C   89              JMP    RTEST    ;ALL OTHER KEYS REPEAT THE RAM TEST
0005          C   90              END    RTEST

PUBLIC SYMBOLS
RTEST  C 0005

EXTERNAL SYMBOLS
DIAG   E 0000   DMES10 E 0000   DMES11 E 0000   DSPLY  E 0000   IBUF   E 0000   KEYIN  E 0000
XMIT   E 0000

USER SYMBOLS
BLOOP  C 000C   CONT   C 0076   DIAG   E 0000   DMES10 E 0000   DMES11 E 0000   DSPLY  E 0000
ERROR  C 0073   IBUF   E 0000   INKEY  C 0079   KEYIN  E 0000   LOOP1  C 0023   LOOP2  C 002F
LOOP3  C 0051   LOOP4  C 005F   PAT1   C 0001   PAT2   C 0002   PAT3   C 0003   PAT4   C 0004
PATST  C 001F   PCNT   C 0000   RTEST  C 0005   TEST2  C 004E   XMIT   E 0000

ASSEMBLY COMPLETE, NO ERRORS
```

ISIS-II 8080/8085 MACRO ASSEMBLER, V2.0    MTEST
MOTOR TEST ROUTINE

```
LOC   OBJ         SEQ           SOURCE STATEMENT

1  $    TITLE('MOTOR TEST ROUTINE') PAGEWIDTH(105) DEBUG
                   2                          ;WRITTEN 02/17/81
                   3                          ;UPDATED 04/01/82
                   4                          ;THIS MOTOR TEST ROUTINE ALLOWS ELEVEN KEYBOARD
                   5                          ;CONTROL KEYS. START, RESET, & 0 - 8.
                   6                          ;START KEY--DRIVE THE MOTOR TO THE LOWER LIMIT SWITCH
                   7                          ;           THEN DRIVE UP TILL MENISCUS IS DETECTED
                   8                          ;           OR UPPER LIMIT SWITCH DETECTED
                   9                          ;RESET KEY--STOP ANY MOTOR MOVEMENT, & WAIT
                  10                          ;           OR RETURN TO DIAG ROUTINE
                  11                          ;1 KEY    --TURN ALARM ON
                  12                          ;4 KEY    --TURN ALARM OFF
                  13                          ;2 KEY    --TURN GRADUATE TILT SOLENOID ON
                  14                          ;5 KEY    --TURN GRADUATE TILT SOLENOID OFF
                  15                          ;3 KEY    --TURN AIR SOLENOID ON
                  16                          ;6 KEY    --TURN AIR SOLENOID OFF
                  17                          ;7 KEY    --DRIVE DOWN TILL LLS IS DETECTED
                  18                          ;8 KEY    --JOG UP. STEP THE MOTOR 1 STEP UP
                  19                          ;0 KEY    --JOG DOWN. STEP THE MOTOR 1 STEP DOWN
                  20                          ;STEP COUNT IS DISPLAYED. 1200 = 100ML.
                  21                          ;LIMIT SWITCHS ARE DISPLAYED ON LED'S
                  22         NAME    MTEST
                  23         PUBLIC  MTEST
                  24         EXTRN   DIAG,DSPLY,DBUF,STEPC,KEYIN,MOTOR,DIR,DLYSW
                  25         EXTRN   BINBCD,XMIT,IBUF,DMES13,UNPAK,PHASE
7004              26  KD     EQU     7004H       ;ADDRESS OF KEYBOARD/DISPLAY
                  27         CSEG
0000 210000    E  28  MTEST: LXI     H,DMES13    ;POINT TO THE MOTOR TEST MESSAGE
0003 CD0000    E  29         CALL    DSPLY       ;GO DISPLAY IT
0006 210000       30         LXI     H,0
0009 220000    E  31         SHLD    STEPC       ;ZERO THE STEP COUNTER
000C 3A0000    E  32         LDA     PHASE       ;GET THE MOTOR PHASE BYTE
000F E60F         33         ANI     0FH         ;ZERO THE ALARM, & GRADUATE BITS
0011 F610         34         ORI     10H         ;TURN OFF THE AIR SOLENOID
0013 320000    E  35         STA     PHASE
0016 CD8A00    C  36  INKEY: CALL    CKLSW       ;GO CHECK FOR THE LIMIT SWITCHES
0019 CD0000    E  37         CALL    KEYIN       ;CHECK FOR THE START OF TEST
001C 17           38         RAL                 ;CHECK FOR ANY CHARACTERS, LOOK AT BIT 8
001D DA1600    C  39         JC      INKEY       ;IF NONE, WAIT FOR SOME
0020 1F           40         RAR                 ;GET THE CHARACTER
0021 FE01         41         CPI     1           ;CHECK FOR ALARM ON KEY
0023 CA7101    C  42         JZ      ALAON
0026 FE04         43         CPI     4           ;CHECK FOR ALARM OFF KEY
0028 CA7F01    C  44         JZ      ALAOFF
002B FE02         45         CPI     2           ;CHECK FOR GRADUATE TILT ON KEY
002D CA8701    C  46         JZ      GRAON
0030 FE05         47         CPI     5           ;CHECK FOR GRADUATE TILT OFF KEY
0032 CA8F01    C  48         JZ      GRAOFF
0035 FE03         49         CPI     3           ;CHECK FOR AIR ON KEY
0037 CA9F01    C  50         JZ      AIRON
003A FE06         51         CPI     6           ;CHECK FOR AIR OFF KEY
003C CA9701    C  52         JZ      AIROFF
003F FE14         53         CPI     20          ;CHECK FOR THE RESET KEY
0041 CAA701    C  54         JZ      OFF         ;IF =, GO TURN OFF THE ALARM, GRADUATE, AIR
0044 FE15         55         CPI     21          ;START KEY
0046 CA5B00    C  56         JZ      START
0049 FE08         57         CPI     8           ;JOG UP 1 STEP KEY
004B CAB900    C  58         JZ      JOGU
004E FE07         59         CPI     7           ;DRIVE DOWN TILL DARK DETECTED
0050 CA9400    C  60         JZ      DDARK
0053 FE00         61         CPI     0           ;JOG DOWN 1 STEP KEY
```

```
0055 CAC600  C    62           JZ      JOGD
0058 C31600  C    63           JMP     INKEY    ;ELSE, WAIT FOR ANOTHER KEY
005B CD2901  C    64  START:   CALL    RMOTOR   ;GO RESET THE MOTOR
005E 210000       65           LXI     H,0
0061 220000  E    66           SHLD    STEPC    ;ZERO THE STEP COUNTER
0064 CD0000  E    67  LOOP1:   CALL    MOTOR    ;STEP THE MOTOR
0067 CDD400  C    68           CALL    DUP
006A 3A0A70       69  LOOP4:   LDA     700AH    ;CHECK FOR UPPER LIMIT SWITCH
006D E604         70           ANI     4
006F CA1600  C    71           JZ      INKEY
0072 CD0000  E    72           CALL    KEYIN
0075 17           73           RAL
0076 DA7F00  C    74           JC      LOOP3
0079 1F           75           RAR
007A FE14         76           CPI     20       ;CHECK FOR THE RESET KEY
007C CA1600  C    77           JZ      INKEY
007F 3A0A70       78  LOOP3:   LDA     700AH    ;GET THE MENISCUS DETECTOR STATUS BYTE
0082 E610         79           ANI     10H      ;MASK IN THE MENISCUS DETECTOR BIT
0084 C26A00  C    80           JNZ     LOOP4    ;JUMP IF MENISCUS FOUND (LIGHT BLOCKED)
0087 C36400  C    81           JMP     LOOP1
008A 3A0A70       82  CKLSW:   LDA     700AH    ;GET THE LIMIT SWITCH STATUS BYTE
008D 2F           83           CMA
008E E606         84           ANI     6        ;MASK IN BOTH UPPER & LOWER LIMIT SWITCHES
0090 320170       85           STA     7001H    ;OUTPUT TO THE FRONT PANEL LED'S
0093 C9           86           RET
0094 210100       87  DDARK:   LXI     H,1
0097 220000  E    88           SHLD    STEPC    ;SET THE STEP COUNTER
009A 3E01         89           MVI     A,1
009C 320000  E    90           STA     DIR      ;SET FOR DOWN
009F 320000  E    91           STA     DLYSW    ;SET FOR FAST RATE
00A2 3A0A70       92  DDARKL:  LDA     700AH    ;GET THE LOWER LIMIT SWITCH STATUS BYTE
00A5 E602         93           ANI     2        ;MASK IN THE LLS BIT
00A7 CAB300  C    94           JZ      DPOS     ;IF AT LLS, WE ARE DONE
00AA CD0000  E    95           CALL    MOTOR    ;STEP THE MOTOR
00AD CD6101  C    96           CALL    CKIN     ;CHECK FOR THE RESET KEY
00B0 C3A200  C    97           JMP     DDARKL   ;GO DRIVE SOME MORE
00B3 CD2201  C    98  DPOS:    CALL    DDN      ;GO DISPLAY THIS POSITION
00B6 C31600  C    99           JMP     INKEY    ;THEN WE ARE DONE
00B9 AF           100 JOGU:    XRA     A
00BA 320000  E    101          STA     DIR      ;SET DIRECTION TO UP
00BD CD0000  E    102          CALL    MOTOR    ;STEP THE MOTOR ONCE
00C0 CDD400  C    103          CALL    DUP
00C3 C31600  C    104          JMP     INKEY
00C6 3E01         105 JOGD:    MVI     A,1
00C8 320000  E    106          STA     DIR
00CB CD0000  E    107          CALL    MOTOR
00CE CD2201  C    108          CALL    DDN
00D1 C31600  C    109          JMP     INKEY    ;GO STEP THE MOTOR DOWN ONCE
00D4 CD8A00  C    110 DUP:     CALL    CKLSW    ;GO CHECK ON THE LIMIT SWITCHES
00D7 2A0000  E    111          LHLD    STEPC    ;DO A DISPLAY UPDATE
00DA 23           112          INX     H
00DB 220000  E    113 SAVEIT:  SHLD    STEPC
00DE 7C           114          MOV     A,H      ;WANT TO TRAP < 0 VALUES
00DF 17           115          RAL
00E0 DA1601  C    116          JC      NEGATE   ;IF < 0, COMPLEMENT THE STEP COUNT
00E3 3E20         117          MVI     A,' '    ;ELSE, GET AN ASCII BLANK
00E5 320B00  E    118 SIGN:    STA     IBUF+11  ;PUT THE SIGN IN THE INSERT BUFFER
00E8 EB           119          XCHG
00E9 210800  E    120          LXI     H,DBUF+8 ;WANT TO CONVERT TO BCD & DISPLAY IT
00EC 73           121          MOV     M,E
00ED 2B           122          DCX     H
00EE 72           123          MOV     M,D
00EF 2B           124          DCX     H
00F0 AF           125          XRA     A
00F1 77           126          MOV     M,A
00F2 2B           127          DCX     H
```

```
00F3 77            128        MOV    M,A
00F4 CD0000   E    129        CALL   BINBCD
00F7 210400   E    130        LXI    H,DBUF+4 ;POINT TO THE RESULT
00FA 110F00   E    131        LXI    D,IBUF+15
00FD 0602         132        MVI    B,2
00FF 7E           133 LOOP2: MOV    A,M
0100 4F           134        MOV    C,A
0101 E60F         135        ANI    0FH
0103 C630         136        ADI    30H
0105 12           137        STAX   D
0106 1B           138        DCX    D
0107 79           139        MOV    A,C
0108 CD0000   E    140        CALL   UNPAK
010B 12           141        STAX   D
010C 2B           142        DCX    H
010D 1B           143        DCX    D
010E 05           144        DCR    B
010F C2FF00   C    145        JNZ    LOOP2
0112 CD0000   E    146        CALL   XMIT
0115 C9           147        RET
0116 7C           148 NEGATE MOV    A,H      ;2'S COMPLEMENT THE STEP COUNT
0117 2F           149        CMA
0118 67           150        MOV    H,A
0119 7D           151        MOV    A,L
011A 2F           152        CMA
011B 6F           153        MOV    L,A
011C 23           154        INX    H
011D 3E2D         155        MVI    A,'-'    ;GET AN ASCII MINUS
011F C3E500   C    156        JMP    SIGN
0122 2A0000   E    157 DDN:  LHLD   STEPC
0125 2B           158        DCX    H
0126 C3DB00   C    159        JMP    SAVEIT
0129 AF           160 RMOTOR XRA    A
012A 3C           161        INR    A
012B 320000   E    162        STA    DIR      ;SET THE DIRECTION TO DOWN
012E 320000   E    163        STA    DLYSW    ;SET THE DELAY SWITCH FOR FAST RATE (23.5 MS/STEP)
0131 3A0A70       164 DRLLS: LDA    700AH    ;DRIVE TO THE LOWER LIMIT SWITCH
0134 E602         165        ANI    2        ;GET THE LLS BIT
0136 CA4201   C    166        JZ     ATLLS    ;WHEN AT LLS, STOP DRIVING
0139 CD0000   E    167        CALL   MOTOR    ;GO STEP THE MOTOR
013C CD6101   C    168        CALL   CKIN     ;CHECK FOR THE RESET KEY
013F C33101   C    169        JMP    DRLLS    ;CHECK AGAIN
0142 AF           170 ATLLS: XRA    A
0143 320000   E    171        STA    DIR      ;SET THE DIRECTION TO UP
0146 320000   E    172        STA    DLYSW    ;RESET THE DELAY SWITCH FOR SLOW RATE(45MS/STEP)
0149 CD5201   C    173        CALL   DRTL     ;DRIVE UP TILL LIGHT IS SEEN
014C 3E01         174        MVI    A,1
014E 320000   E    175        STA    DLYSW    ;SET TO FAST RATE
0151 C9           176        RET
0152 3A0A70       177 DRTL:  LDA    700AH    ;GET THE MENISCUS DETECTOR STATUS BYTE
0155 E610         178        ANI    10H      ;MASK IN THE MENISCUS DETECTOR BIT
0157 C8           179        RZ              ;RETURN WHEN WE SEE LIGHT (0 = LIGHT)
0158 CD0000   E    180        CALL   MOTOR    ;GO STEP THE MOTOR
015B CD6101   C    181        CALL   CKIN     ;CHECK FOR THE RESET KEY
015E C35201   C    182        JMP    DRTL     ;CHECK AGAIN
0161 CD8A00   C    183 CKIN:  CALL   CKLSW    ;GO CHECK ON THE LIMIT SWITCHES
0164 CD0000   E    184        CALL   KEYIN    ;GO SAMPLE THE KEYBOARD
0167 17           185        RAL             ;CHECK FOR ANY CHARACTERS, LOOK AT BIT 8
0168 D8           186        RC              ;IF NONE, RETURN
0169 1F           187        RAR             ;GET THE CHARACTER
016A FE14         188        CPI    20       ;IS IT THE RESET KEY
016C C0           189        RNZ             ;RETURN IF NOT RESET KEY
016D F1           190 CLEAN: POP    PSW      ;ADJUST THE STACK POINTER
016E C31600   C    191        JMP    INKEY    ;GO PROCESS THE RESET KEY
0171 3A0000   E    192 ALAON  LDA    PHASE
0174 F640         193        ORI    40H      ;TURN ALARM ON
```

```
0176 320000   E    194 UPDATE  STA     PHASE
0179 320A70        195         STA     700AH    ;OUTPUT THE CONTROL BYTE
017C C31600   C    196         JMP     INKEY
017F 3A0000   E    197 ALAOFF  LDA     PHASE
0182 E6BF          198         ANI     0BFH     ;TURN ALARM OFF
0184 C37601   C    199         JMP     UPDATE
0187 3A0000   E    200 GRAON   LDA     PHASE
018A F620          201         ORI     20H      ;TURN GRADUATE TILT ON
018C C37601   C    202         JMP     UPDATE
018F 3A0000   E    203 GRAOFF  LDA     PHASE
0192 E6DF          204         ANI     0DFH     ;TURN GRADUATE TILT OFF
0194 C37601   C    205         JMP     UPDATE
0197 3A0000   E    206 AIROFF  LDA     PHASE
019A F610          207         ORI     10H      ;TURN AIR ON
019C C37601   C    208         JMP     UPDATE
019F 3A0000   E    209 AIRON   LDA     PHASE
01A2 E6EF          210         ANI     0EFH     ;TURN AIR OFF
01A4 C37601   C    211         JMP     UPDATE
01A7 3A0000   E    212 OFF     LDA     PHASE
01AA E60F          213         ANI     0FH      ;TURN OFF ALARM, & GRADUATE
01AC F610          214         ORI     10H      ;TURN OFF THE AIR SOLENOID
01AE 320000   E    215         STA     PHASE
01B1 320A70        216         STA     700AH    ;OUTPUT THE CONTROL BYTE
01B4 C30000   E    217         JMP     DIAG     ;GO TO THE DIAG ROUTINE
0000          C    218         END     MTEST
```

PUBLIC SYMBOLS
MTEST  C 0000

EXTERNAL SYMBOLS
BINBCD E 0000   DBUF  E 0000   DIAG  E 0000   DIR   E 0000   DLYSW E 0000   DMES13 E 0000
DSPLY  E 0000   IBUF  E 0000   KEYIN E 0000   MOTOR E 0000   PHASE E 0000   STEPC  E 0000
UNPAK  E 0000   XMIT  E 0000

USER SYMBOLS
AIROFF C 0197   AIRON  C 019F   ALAOFF C 017F   ALAON  C 0171   ATLLS  C 0142   BINBCD E 0000
CKIN   C 0161   CKLSW  C 008A   CLEAN  C 016D   DBUF   E 0000   DDARK  C 0094   DDARKL C 00A2
DDN    C 0122   DIAG   E 0000   DIR    E 0000   DLYSW  E 0000   DMES13 E 0000   DPOS   C 00B3
DRLLS  C 0131   DRTL   C 0152   DSPLY  E 0000   DUP    C 00D4   GRAOFF C 018F   GRAON  C 0187
IBUF   E 0000   INKEY  C 0016   JOGD   C 00C6   JOGU   C 00B9   KD     A 7004   KEYIN  E 0000
LOOP1  C 0064   LOOP2  C 00FF   LOOP3  C 007F   LOOP4  C 006A   MOTOR  E 0000   MTEST  C 0000
NEGATE C 0116   OFF    C 01A7   PHASE  E 0000   RMOTOR C 0129   SAVEIT C 00DB   SIGN   C 00E5
START  C 005B   STEPC  E 0000   UNPAK  E 0000   UPDATE C 0176   XMIT   E 0000

ASSEMBLY COMPLETE, NO ERRORS

ISIS-II 8080/8085 MACRO ASSEMBLER, V2.0             BTEST
BAROMETER TEST ROUTINE

LOC   OBJ        SEQ           SOURCE STATEMENT

```
                  1 $     TITLE('BAROMETER TEST ROUTINE') PAGEWIDTH(105) DEBUG
                  2                       ;WRITTEN 06/02/81
                  3                       ;UPDATED 12/01/81
                  4                       ;THIS ROUTINE ALLOWS THE OPERATOR TO ADJUST THE
                  5                       ;BAROMETER A/D CIRCUIT WHILE THE A/D VALUE IS
                  6                       ;DISPLAYED
                  7             NAME      BTEST
                  8             PUBLIC    BTEST
                  9             EXTRN     PMES9, READA, DSPLY, XMIT, BAROM, IBUF, KEYIN, DIAG
                 10             CSEG
0000 3E8A        11 BTEST  MVI     A,8AH
0002 320970      12         STA     7009H     ;SET THE MUX FOR READING THE BAROMETER
0005 210000  E   13         LXI     H,PMES9   ;POINT TO THE BAROMETER MESSAGE
0008 CD0000  E   14         CALL    DSPLY     ;GO DISPLAY PART OF THIS MESSAGE USED HERE
000B 3A0B70      15 BLOOP  LDA     700BH     ;GET THE BAROMETER A/D STATUS BYTE
000E 1F          16         RAR               ;CHECK IF THE CONVERSION IS IN PROGRESS
```

```
000F D20B00  C  17        JNC   BLOOP    ;DO NOT WANT TO PROCESS THE SAME DATA TWICE
0012 CD0000  E  18        CALL  READA    ;GO READ THE BAROMETER A/D
0015 3A0D70     19        LDA   700DH    ;GET THE BAROMETER SIGN BYTE
0018 E620       20        ANI   20H      ;MASK IN THE POLARITY BIT
001A C24500  C  21        JNZ   BLANK    ;IF > 0, GET A BLANK
001D 3E2D       22        MVI   A,'-'    ;ELSE, GET AN ASCII MINUS
001F 320C00  E  23 SIGN:  STA   IBUF+12  ;PUT THE SIGN IN THE INSERT BUFFER
0022 210000  E  24        LXI   H,BAROM  ;POINT TO THE ASCII BAROMETER VALUE SAVED
0025 110D00  E  25        LXI   D,IBUF+13;WANT TO PUT IT IN THE INSERT BUFFER
0028 0603       26        MVI   B,3
002A 7E         27 LOOP:  MOV   A,M
002B 12         28        STAX  D
002C 23         29        INX   H
002D 13         30        INX   D
002E 05         31        DCR   B
002F C22A00  C  32        JNZ   LOOP
0032 CD0000  E  33        CALL  XMIT     ;GO TRANSMIT THE INSERT BUFFER
0035 CD0000  E  34        CALL  KEYIN    ;GO CHECK FOR KEYBOARD INPUT
0038 17         35        RAL            ;CHECK FOR ANY CHARACTERS, LOOK AT BIT 8
0039 DA0B00  C  36        JC    BLOOP    ;IF NONE, GO GET ANOTHER READING
003C 1F         37        RAR            ;GET THE CHARACTER
003D FE14       38        CPI   20       ;CHECK FOR THE RESET KEY
003F CA0000  E  39        JZ    DIAG     ;THE RESET KEY SENDS US TO THE DIAG ROUTINE
0042 C30B00  C  40        JMP   BLOOP    ;ELSE, IGNORE ALL OTHER KEYS
0045 3E20       41 BLANK: MVI   A,' '    ;GET AN ASCII BLANK
0047 C31F00  C  42        JMP   SIGN
0000         C  43        END   BTEST
```

PUBLIC SYMBOLS
BTEST  C 0000

EXTERNAL SYMBOLS
BAROM  E 0000   DIAG   E 0000   DSPLY  E 0000   IBUF   E 0000   KEYIN  E 0000   PMES9  E 0000
READA  E 0000   XMIT   E 0000

USER SYMBOLS
BAROM  E 0000   BLANK  C 0045   BLOOP  C 000B   BTEST  C 0000   DIAG   E 0000   DSPLY  E 0000
IBUF   E 0000   KEYIN  E 0000   LOOP   C 002A   PMES9  E 0000   READA  E 0000   SIGN   C 001F
XMIT   E 0000

ASSEMBLY COMPLETE, NO ERRORS

ISIS-II 8080/8085 MACRO ASSEMBLER, V2.0          TTEST
TEMPERATURE TEST ROUTINE

LOC  OBJ         SEQ         SOURCE STATEMENT

```
                  1 $        TITLE('TEMPERATURE TEST ROUTINE') PAGEWIDTH(105) DEBUG
                  2                     ;WRITTEN 06/03/81
                  3                     ;UPDATED 03/05/82
                  4                     ;THIS ROUTINE ALLOWS THE OPERATOR TO SELECT ONE
                  5                     ;OF THE 5 TEMPERATURE RANGES WHILE THE VAPOR
                  6                     ;TEMPERATURE A/D VALUE IS DISPLAYED. TEMPERATURE
                  7                     ;LAG IS FORCED OUT AS IS ANY BAROMETRIC CORRECTION
                  8         NAME  TTEST
                  9         PUBLIC TTEST
                 10         EXTRN TRDR,CORSW,GTEMP,XMIT,KEYIN,DIAG,DMES19,DSPLY,IBUF,R55SW
                 11         CSEG
0000 210000  E   12 TTEST: LXI   H,DMES19 ;POINT TO THE TEMP= MESSAGE
0003 CD0000  E   13        CALL  DSPLY    ;OUTPUT THIS MESSAGE
0006 AF          14        XRA   A
0007 320000  E   15        STA   R55SW    ;ZERO THIS BYTE TO FORCE X OUTPUT
000A 3A0000  E   16        LDA   TRDR     ;GET THE TEMP RANGE & DIST RATE CONTROL BYTE
000D E61F        17        ANI   1FH      ;WANT TO FORCE NO LAG, ZERO THE DISTILLATION RATE
000F 320000  E   18        STA   TRDR     ;SAVE THIS CONTROL BYTE
0012 320170      19        STA   7001H    ;OUTPUT THIS CONTROL BYTE
0015 CD8300  C   20        CALL  MUXSET   ;GO SET UP THE MUX CONTROL
```

```
0018 3E01           21         MVI   A,1
001A 320000  E      22         STA   CORSW     ;FORCE NO BAROMETRIC CORRECTIONS
001D 3A0B70         23 TEMPL:  LDA   700BH     ;GET THE VAPOR TEMP A/D STATUS BYTE
0020 1F             24         RAR             ;CHECK IF THE CONVERSION IS IN PROGRESS
0021 D21D00  C      25         JNC   TEMPL     ;DO NOT WANT TO PROCESS THE SAME DATA TWICE
0024 3A0000  E      26         LDA   TRDR      ;GET THIS CONTROL BYTE
0027 E60C           27         ANI   0CH       ;MASK IN THE FAHRENHEIT RANGES
0029 CA9300  C      28         JZ    CENT      ;IF = 0, MUST BE A CENTIGRADE RANGE
002C 3E46           29         MVI   A,'F'     ;ELSE, MUST BA A FAHRENHEIT RANGE
002E 320A00  E      30 SAVER:  STA   IBUF+10   ;PUT THE RANGE UNITS IN THE INSERT BUFFER
0031 CD0000  E      31         CALL  GTEMP     ;GO GET A TEMPERATURE READING
0034 0606           32         MVI   B,6
0036 210A00  E      33         LXI   H,IBUF+10 ;WANT TO MOVE THE TEMP DATA OVER ONE POSITION
0039 7E             34 MLOOP:  MOV   A,M       ;AND INSERT A NEGATIVE SIGN IF < 0
003A 23             35         INX   H
003B 77             36         MOV   M,A
003C 2B             37         DCX   H
003D 2B             38         DCX   H
003E 05             39         DCR   B
003F C23900  C      40         JNZ   MLOOP
0042 3E2E           41         MVI   A,'.'
0044 320900  E      42         STA   IBUF+9    ;PUT THE DECIMAL POINT BACK IN
0047 3A0D70         43         LDA   700DH     ;GET THE TEMP A/D STATUS BYTE
004A E620           44         ANI   20H       ;MASK IN THE POLARITY BIT
004C C29800  C      45         JNZ   BLANK
004F 3E2D           46         MVI   A,'-'     ;ELSE, GET AN ASCII MINUS
0051 320500  E      47 SIGN:   STA   IBUF+5    ;PUT THE SIGN INTO THE INSERT BUFFER
0054 CD0000  E      48         CALL  XMIT      ;OUTPUT IT TO THE DISPLAY
0057 CD0000  E      49         CALL  KEYIN     ;GO SAMPLE THE KEYBOARD
005A 17             50         RAL             ;CHECK FOR ANY CHARACTERS, LOOK AT BIT 8
005B DA1D00  C      51         JC    TEMPL     ;IF NONE, REPEAT THE TEST
005E 1F             52         RAR             ;ELSE, GET THE CHARACTER
005F FE14           53         CPI   20        ;CHECK FOR THE RESET KEY
0061 CA0000  E      54         JZ    DIAG      ;THE RESET KEY SENDS US BACK TO DIAG
0064 D60A           55         SUI   10        ;CHECK FOR A TEMP RANGE KEY
0066 DA1D00  C      56         JC    TEMPL     ;IGNORE OTHER KEYS
0069 FE05           57         CPI   5
006B D21D00  C      58         JNC   TEMPL     ;IGNORE OTHER KEYS
006E 3C             59         INR   A         ;ADJUST THIS ENTRY
006F 47             60         MOV   B,A       ;SAVE THIS TEMP RANGE 1 - 5
0070 AF             61         XRA   A
0071 37             62         STC             ;SET THE CARRY FLAG TO 1
0072 17             63 FORM:   RAL
0073 05             64         DCR   B
0074 C27200  C      65         JNZ   FORM
0077 320000  E      66         STA   TRDR      ;SAVE THIS CONTROL BYTE
007A 320170         67         STA   7001H     ;OUTPUT THIS CONTROL BYTE
007D CD8300  C      68         CALL  MUXSET    ;GO SET UP THE MUX CONTROL
0080 C31D00  C      69         JMP   TEMPL     ;GO REPEAT THIS TEST
0083 E610           70 MUXSET: ANI   10H       ;MASK IN THE 30 - 300C RANGE BIT
0085 C28E00  C      71         JNZ   SET3      ;IF = 30 - 300C RANGE, GET THE MUX CONTROL
0088 3E21           72         MVI   A,21H     ;ELSE, USE THIS MUX CONTROL
008A 320970         73 SMUX:   STA   7009H     ;OUTPUT THE MUX CONTROL BYTE
008D C9             74         RET
008E 3E51           75 SET3:   MVI   A,51H     ;USE THIS MUX CONTROL
0090 C28A00  C      76         JMP   SMUX
0093 3E43           77 CENT:   MVI   A,'C'
0095 C32E00  C      78         JMP   SAVER
0098 3E20           79 BLANK:  MVI   A,' '     ;GET AN ASCII BLANK
009A C35100  C      80         JMP   SIGN
0000         C      81         END   TTEST
PUBLIC SYMBOLS
TTEST  C 0000

EXTERNAL SYMBOLS
CORSW  E 0000    DIAG  E 0000    DMES19 E 0000    DSPLY E 0000    GTEMP E 0000    IBUF  E 0000
```

| KEYIN | E 0000 | R55SW | E 0000 | TRDR | E 0000 | XMIT | E 0000 | | |
|---|---|---|---|---|---|---|---|---|---|

USER SYMBOLS

| BLANK | C 0098 | CENT  | C 0093 | CORSW | E 0000 | DIAG  | E 0000 | DMES19 | E 0000 | DSPLY  | E 0000 |
|---|---|---|---|---|---|---|---|---|---|---|---|
| FORM  | C 0072 | GTEMP | E 0000 | IBUF  | E 0000 | KEYIN | E 0000 | MLOOP  | C 0039 | MUXSET | C 0083 |
| R55SW | E 0000 | SAVER | C 002E | SET3  | C 008E | SIGN  | C 0051 | SMUX   | C 008A | TEMPL  | C 001D |
| TRDR  | E 0000 | TTEST | C 0000 | XMIT  | E 0000 |       |        |        |        |        |        |

ASSEMBLY COMPLETE. NO ERRORS

ISIS-II 8080/8085 MACRO ASSEMBLER, V2.0        XYTEST
X-Y RECORDER TEST ROUTINE

```
LOC   OBJ           SEQ       SOURCE STATEMENT

1  $     TITLE('X-Y RECORDER TEST ROUTINE') PAGEWIDTH(105) DEBUG
                     2                ;WRITTEN 06/03/81
                     3                ;UPDATED 01/15/82
                     4                ;THIS ROUTINE ALLOWS THE OPERATOR TO FORCE THE
                     5                ;X-Y RECORDER TO 3 CALIBRATION POINTS;
                     6                ;0 - FORCES X = Y = 0
                     7                ;8 - FORCES X = Y = HALF SCALE
                     8                ;5 - FORCES X = Y = FULL SCALE
                     9                ;1 - FORCES THE PEN UP
                    10                ;4 - FORCES THE PEN DOWN
                    11         NAME   XYTEST
                    12         PUBLIC XYTEST
                    13         EXTRN  KEYIN,DMES20,DSPLY,DIAG
                    14         CSEG
0000 210000    E    15  XYTEST: LXI   H,DMES20 ;POINT TO THE X-Y TEST MESSAGE
0003 CD0000    E    16         CALL   DSPLY    ;GO DISPLAY IT
0006 AF             17         XRA    A
0007 320B70         18         STA    700BH    ;FORCE THE PEN UP
000A 210000         19         LXI    H,0      ;WANT TO START AT X = Y = 0
000D 110000         20         LXI    D,0
0010 221870         21  XYLP:  SHLD   7018H    ;SET THE X AXIS D/A
0013 EB             22         XCHG
0014 221A70         23         SHLD   701AH    ;SET THE Y AXIS D/A
0017 CD0000    E    24  XYL:   CALL   KEYIN    ;GO SAMPLE THE KEYBOARD
001A 17             25         RAL             ;CHECK FOR ANY CHARACTERS, LOOK AT BIT 8
001B DA1700    C    26         JC     XYL      ;IF NONE, GO WAIT FOR SOME
001E 1F             27         RAR             ;ELSE, GET THE CHARACTER
001F FE00           28         CPI    0        ;CHECK FOR FORCING ORIGIN
0021 CA4000    C    29         JZ     FZERO
0024 FE08           30         CPI    8        ;CHECK FOR FORCING HALF SCALE
0026 CA4900    C    31         JZ     FHALF
0029 FE05           32         CPI    5        ;CHECK FOR FORCING FULL SCALE
002B CA5200    C    33         JZ     FFULL
002E FE01           34         CPI    1        ;CHECK FOR FORCING PEN UP
0030 CA5B00    C    35         JZ     PENUP
0033 FE04           36         CPI    4        ;CHECK FOR FORCING PEN DOWN
0035 CA6200    C    37         JZ     PENDN
0038 FE14           38         CPI    20       ;CHECK FOR THE RESET KEY
003A CA0000    E    39         JZ     DIAG     ;THE RESET KEY SENDS US TO DIAG
003D C31700    C    40         JMP    XYL      ;IGNORE ALL OTHER KEYS
0040 210000         41  FZERO: LXI    H,0      ;FORCE X TO ZERO
0043 110000         42         LXI    D,0      ;FORCE Y TO ZERO
0046 C31000    C    43         JMP    XYLP
0049 215307         44  FHALF: LXI    H,1875   ;FORCE X TO HALF SCALE
004C 115802         45         LXI    D,600    ;FORCE Y TO HALF SCALE
004F C31000    C    46         JMP    XYLP
0052 21A60E         47  FFULL: LXI    H,3750   ;FORCE X TO FULL SCALE
0055 11B004         48         LXI    D,1200   ;FORCE Y TO FULL SCALE
0058 C31000    C    49         JMP    XYLP
005B AF             50  PENUP: XRA    A
005C 320B70         51  PEN:   STA    700BH
005F C31700    C    52         JMP    XYL
```

```
0062 3E01           53 PENDN:  MVI     A,1
0064 C35C00    C    54         JMP     PEN
0000           C    55         END     XYTEST
```

PUBLIC SYMBOLS
XYTEST C 0000

EXTERNAL SYMBOLS
DIAG   E 0000    DMES20 E 0000    DSPLY  E 0000    KEYIN  E 0000

USER SYMBOLS
DIAG   E 0000    DMES20 E 0000    DSPLY  E 0000    FFULL  C 0052    FHALF  C 0049    FZERO  C 0040
KEYIN  E 0000    PEN    C 0050    PENDN  C 0062    PENUP  C 005B    XYL    C 0017    XYLP   C 0010
XYTEST C 0000

ASSEMBLY COMPLETE, NO ERRORS

ISIS-II 8080/8085 MACRO ASSEMBLER, V2.0          CTEST
CHAMBER & CONDENSER TEMPERATURE TEST ROUTINE

LOC  OBJ          SEQ        SOURCE STATEMENT

1 $       TITLE('CHAMBER & CONDENSER TEMPERATURE TEST ROUTINE')
                   2 $       PAGEWIDTH(105) DEBUG
                   3                         ;WRITTEN 06/03/81
                   4                         ;UPDATED 11/30/81
                   5                         ;THIS ROUTINE ALLOWS THE OPERATOR TO VIEW THE
                   6                         ;RECEIVING CHAMBER OR CONDENSER TEMPERATURE
                   7         NAME    CTEST
                   8         PUBLIC  CHTEST,CONTST
                   9         EXTRN   DMES21,DMES22,DSPLY,XMIT,KEYIN,IBUF,DIAG,READB,CHTMP,MESNO
                  10         CSEG
0000 AF           11 CHTEST  XRA     A
0001 320000   E   12          STA     MESNO    ;DON'T WANT TO SCALE THE A/D CHAMBER TEMP
0004 3E8A        13          MVI     A,8AH    ;SET MUX FOR READING CHAMBER TEMPERATURE
0006 210000   E   14          LXI     H,DMES21 ;POINT TO THE CHAMBER TEST MESSAGE
0009 320970      15 CHLP     STA     7009H    ;OUTPUT THE MUX CONTROL
000C CD0000   E   16          CALL    DSPLY    ;GO DISPLAY IT
000F 3A0A70      17 CHL      LDA     700AH    ;GET THE TEMPERATURE A/D STATUS BYTE
0012 17          18          RAL              ;CHECK IF A CONVERSION IS IN PROGRESS
0013 D20F00   C   19          JNC     CHL      ;DO NOT WANT TO PROCESS THE SAME DATA TWICE
0016 CD0000   E   20          CALL    READB    ;GO GET A TEMPERATURE READING
0019 3A0F70      21          LDA     700FH    ;GET THE TEMP SIGN BYTE
001C E620        22          ANI     20H      ;MASK IN THE POLARITY BIT
001E C25500   C   23          JNZ     BLANK    ;IF = 1, GET A BLANK
0021 3E2D        24          MVI     A,'-'    ;ELSE, GET AN ASCII MINUS
0023 320500   E   25 SIGN    STA     IBUF+5   ;PUT IT IN THE INSERT BUFFER
0026 210000   E   26          LXI     H,CHTMP  ;POINT TO THE TEMP SAVE LOCATIONS
0029 110600   E   27          LXI     D,IBUF+6 ;POINT TO THE INSERT BUFFER
002C 7E          28          MOV     A,M      ;GET THE MSDIGIT (TEN'S)
002D 12          29          STAX    D
002E 23          30          INX     H
002F 13          31          INX     D
0030 7E          32          MOV     A,M      ;GET THIS DIGIT (UNIT'S)
0031 12          33          STAX    D
0032 23          34          INX     H
0033 13          35          INX     D
0034 13          36          INX     D
0035 7E          37          MOV     A,M      ;GET THE LSDIGIT (TENTH'S)
0036 12          38          STAX    D
0037 CD0000   E   39          CALL    XMIT     ;OUTPUT THE TEMP TO THE DISPLAY
003A CD0000   E   40          CALL    KEYIN    ;GO SAMPLE THE KEYBOARD
003D 17          41          RAL              ;CHECK FOR A CHARACTER, LOOK AT BIT 8
003E DA0F00   C   42          JC      CHL      ;IF NONE, GO WAIT FOR SOME
0041 1F          43          RAR              ;ELSE, GET THE CHARACTER
0042 FE14        44          CPI     20       ;CHECK FOR THE RESET KEY
0044 CA0000   E   45          JZ      DIAG     ;THE RESET KEY SENDS US TO DIAG
```

```
0047 C30F00  C   46       JMP   CHL      ;IGNORE ALL OTHER KEYS
004A 210000  E   47 CONTST LXI  H,DMES22 ;POINT TO THE CONDENSER TEST MESSAGE
004D 3ED4        48       MVI   A,004H   ;MUX CONTROL FOR CONDENSER TEMP
004F 320000  E   49       STA   MESNO    ;SET TO SCALE THE CONDENSER TEMP
0052 C20900  C   50       JMP   CHLP     ;CONTINUE AS FOR THE CHAMBER TEST
0055 3E20        51 BLANK MVI   A,' '    ;GET AN ASCII BLANK
0057 C32300  C   52       JMP   SIGN     ;GO SAVE THE SIGN
0000         C   53       END   CHTEST
```

PUBLIC SYMBOLS
CHTEST C 0000    CONTST C 004A

EXTERNAL SYMBOLS
CHTMP  E 0000    DIAG   E 0000    DMES21 E 0000    DMES22 E 0000    DSPLY  E 0000    IBUF   E 0000
KEYIN  E 0000    MESNO  E 0000    READB  E 0000    XMIT   E 0000

USER SYMBOLS
BLANK  C 0055    CHL    C 000F    CHLP   C 0009    CHTEST C 0000    CHTMP  E 0000    CONTST C 004A
DIAG   E 0000    DMES21 E 0000    DMES22 E 0000    DSPLY  E 0000    IBUF   E 0000    KEYIN  E 0000
MESNO  E 0000    READB  E 0000    SIGN   C 0023    XMIT   E 0000

ASSEMBLY COMPLETE, NO ERRORS

ISIS-II 8080/8085 MACRO ASSEMBLER, V3.0          LTEST
CONDENSER LIQUID LEVEL TEST ROUTINE

LOC  OBJ         SEQ       SOURCE STATEMENT

```
                  1 $       TITLE('CONDENSER LIQUID LEVEL TEST ROUTINE') PAGEWIDTH(105) DEBUG
                  2                    ;WRITTEN 06/12/81
                  3                    ;UPDATED 11/17/81
                  4                    ;THIS ROUTINE SAMPLES THE CONDENSER LEVEL AND
                  5                    ;DISPLAYS THE ACTUAL STATUS WITHOUT ANY SOFTWARE
                  6                    ;FILTERING.
                  7          NAME  LTEST
                  8          PUBLIC LTEST
                  9          EXTRN  DMES22,DSPLY,KEYIN,DIAG,XMIT,IBUF
                 10          CSEG
0000 210000  E   11 LTEST LXI   H,DMES22 ;POINT TO THE LIQUID LEVEL TEST MESSAGE
0003 CD0000  E   12       CALL  DSPLY    ;GO DISPLAY IT
0006 CD0000  E   13 LOOP  CALL  KEYIN    ;CHECK FOR ANY CHARACTERS
0009 17          14       RAL            ;LOOK AT BIT 8
000A DA1300  C   15       JC    LOOK     ;IF NONE, GO LOOK AT THE LEVEL STATUS
000D 1F          16       RAR            ;ELSE, GET THE CHARACTER
000E FE14        17       CPI   20       ;CHECK FOR THE RESET KEY
0010 CA0000  E   18       JZ    DIAG     ;THE RESET KEY SENDS US TO THE DIAG ROUTINE
0013 3A0B70      19 LOOK  LDA   700BH    ;GET THE LEVEL STATUS BYTE
0016 1F          20       RAR            ;LOOK AT BIT 1
0017 1F          21       RAR
0018 210D00  E   22       LXI   H,IBUF+13
001B D22C00  C   23       JNC   LEVOK    ;IF CY = 0, LEVEL IS OK
001E 364C        24       MVI   M,'L'    ;LOAD THE LOW MESSAGE
0020 23          25       INX   H
0021 364F        26       MVI   M,'O'
0023 23          27       INX   H
0024 3657        28       MVI   M,'W'
0026 CD0000  E   29 OUTIT CALL  XMIT     ;DISPLAY THE MESSAGE
0029 C30600  C   30       JMP   LOOP
002C 3620        31 LEVOK MVI   M,' '    ;LOAD THE OK MESSAGE
002E 23          32       INX   H
002F 364F        33       MVI   M,'O'
0031 23          34       INX   H
0032 364B        35       MVI   M,'K'
0034 C32600  C   36       JMP   OUTIT
0000         C   37       END   LTEST
```

PUBLIC SYMBOLS
LTEST  C 0000

EXTERNAL SYMBOLS
DIAG  E 0000   DMES22 E 0000   DSPLY E 0000   IBUF  E 0000   KEYIN E 0000   XMIT  E 0000

USER SYMBOLS
DIAG  E 0000   DMES22 E 0000   DSPLY E 0000   IBUF  E 0000   KEYIN E 0000   LEVOK C 0020
LOOK  C 0013   LOOP   C 000E   LTEST C 0000   OUTIT C 0026   XMIT  E 0000

ASSEMBLY COMPLETE, NO ERRORS

ISIS-II 8080/8085 MACRO ASSEMBLER, V2.0          WTEST
WATTMETER HEATER TEST

```
LOC  OBJ        SEQ         SOURCE STATEMENT

1  $          TITLE('WATTMETER HEATER TEST') PAGEWIDTH(105) MOD85 DEBUG
                 2                       ;WRITTEN 07/16/81
                 3                       ;UPDATED 12/01/81
                 4                       ;THIS ROUTINE ALLOWS THE OPERATOR TO ENTER WATT
                 5                       ;SETTINGS AND CHECK THE WATTMETER CALIBRATION
                 6             NAME      WTEST
                 7             PUBLIC    WTEST
                 8             EXTRN     DMES24,DSPLY,KEYIN,IBUF,CALC,IPSL,SETPTL,XMIT
                 9             EXTRN     R75SW,IMASK,DIAG,TIMEL,GETW
                10             CSEG
0000 210000   E 11  WTEST:     LXI       H,DMES24 ;POINT TO THE WATT TEST MESSAGE
0003 CD0000   E 12             CALL      DSPLY    ;GO DISPLAY THE INSERT BUFFER
0006 3E51       13             MVI       A,51H
0008 320970     14             STA       7009H    ;SET THE MUX CONTROL FOR 30 - 300C
000B C35500   C 15             JMP       PENTER   ;THE FIRST TIME FORCE AN ENTER
000E 3A0A70     16  LOOP:      LDA       700AH    ;GET THE WATTMETER STATUS BYTE
0011 17         17             RAL                ;CHECK IF A CONVERSION IS IN PROGRESS
0012 D20E00   C 18             JNC       LOOP     ;DO NOT WANT TO PROCESS THE SAME DATA TWICE
0015 CD0000   E 19             CALL      XMIT     ;GO DISPLAY THE INSERT BUFFER
0018 AF         20             XRA       A
0019 320000   E 21             STA       TIMEL    ;MUST ZERO THIS BYTE USED IN RST7.5
001C CD0000   E 22             CALL      GETW     ;GO GET A WATTMETER READING
001F 3A0F70     23             LDA       700FH    ;GET THE WATTMETER SIGN BYTE
0022 E620       24             ANI       20H      ;MASK IN THE POLARITY BIT
0024 C28D00   C 25             JNZ       BLANK    ;IF > 0, GET AN ASCII BLANK
0027 3E2D       26             MVI       A,'-'    ;ELSE, GET AN ASCII MINUS
0029 320B00   E 27  SIGN:      STA       IBUF+11  ;PUT THE SIGN IN THE INSERT BUFFER
002C CD0000   E 28             CALL      KEYIN    ;GO CHECK FOR ANY KEYBOARD INPUT
002F 17         29             RAL                ;CHECK FOR ANY CHARACTERS, LOOK AT BIT 8
0030 DA0E00   C 30             JC        LOOP     ;IF NONE, GO WAIT FOR SOME
0033 1F         31             RAR                ;ELSE, GET THE CHARACTER
0034 FE0A       32             CPI       10       ;CHECK FOR DIGITS 0 - 9
0036 DA4600   C 33             JC        PDIGIT   ;IF = 0 - 9, GO PROCESS THE DIGIT
0039 FE16       34             CPI       22       ;CHECK FOR THE ENTER KEY
003B CA5500   C 35             JZ        PENTER
003E FE14       36             CPI       20       ;CHECK FOR THE RESET KEY
0040 CA8200   C 37             JZ        PRESET
0043 C30E00   C 38             JMP       LOOP     ;IGNORE ALL OTHER KEYS
0046 210500   E 39  PDIGIT:    LXI       H,IBUF+5 ;WANT TO ECHO THE DIGIT ON THE DISPLAY
0049 46         40             MOV       B,M      ;MUST MOVE THE ENTRY INTO THE BUFFER
004A C630       41             ADI       30H      ;MAKE IT ASCII
004C 77         42             MOV       M,A      ;INSERT THE NEW CHARACTER INTO THE 1'ST POSITION
004D 2B         43             DCX       H
004E 7E         44             MOV       A,M
004F 70         45             MOV       M,B
0050 2B         46             DCX       H
0051 77         47             MOV       M,A
0052 C30E00   C 48             JMP       LOOP     ;GO WAIT FOR MORE KEYBOARD INPUT
0055 F3         49  PENTER:    DI
0056 210500   E 50             LXI       H,IBUF+5 ;NOW WANT TO SET THE POWER ENTERED
0059 CD0000   E 51             CALL      CALC     ;USE THE CALC FROM THE START ROUTINE
005C C5         52             PUSH      B        ;B,C = INITIAL POWER SETTING
```

```
0050 E1              53        POP    H
005E 220000    E     54        SHLD   IPSL     ;SET THE POWER
0061 211370          55        LXI    H,7013H  ;POINT TO THE PHASE CONTROL PORT
0064 3672            56        MVI    M,72H    ;SET COUNTER 1 TO MODE 1
0066 3614            57        MVI    M,14H    ;SET COUNTER 0 TO MODE 2
0068 2B              58        DCX    H
0069 2B              59        DCX    H        ;POINT TO COUNTER 1 DATA PORT
006A 71              60        MOV    M,C      ;OUTPUT THE POWER COUNT
006B 70              61        MOV    M,B
006C 2B              62        DCX    H
006D 364F            63        MVI    M,79     ;LOAD A 1 SECOND TIME OUT
006F D5              64        PUSH   D
0070 E1              65        POP    H
0071 220000    E     66        SHLD   SETPTL
0074 AF              67        XRA    A
0075 320000    E     68        STA    R75SW
0078 3E1B            69        MVI    A,1BH    ;ENABLE INTERRUPT RST7.5
007A 320000    E     70        STA    IMASK
007D 30              71        SIM
007E FB              72        EI
007F C30E00    C     73        JMP    LOOP     ;GO WAIT FOR SOME KEYBOARD ENTRIES
0082 F3              74 PRESET DI
0083 211170          75        LXI    H,7011H  ;WANT TO TURN OFF THE POWER
0086 3600            76        MVI    M,0
0088 3640            77        MVI    M,40H
008A C30000    E     78        JMP    DIAG
008D 3E20            79 BLANK  MVI    A,       ;GET AN ASCII BLANK
008F C32900    C     80        JMP    SIGN
0000           C     81        END    WTEST
```

PUBLIC SYMBOLS
WTEST  C 0000

EXTERNAL SYMBOLS
CALC   E 0000    DIAG   E 0000    DMES24 E 0000    DSPLY  E 0000    GETW   E 0000    IBUF   E 0000
IMASK  E 0000    IPSL   E 0000    KEYIN  E 0000    R75SW  E 0000    SETPTL E 0000    TIMEL  E 0000
XMIT   E 0000

USER SYMBOLS
BLANK  C 008D    CALC   E 0000    DIAG   E 0000    DMES24 E 0000    DSPLY  E 0000    GETW   E 0000
IBUF   E 0000    IMASK  E 0000    IPSL   E 0000    KEYIN  E 0000    LOOP   C 000E    PDIGIT C 0046
PENTER C 0055    PRESET C 0082    R75SW  E 0000    SETPTL E 0000    SIGN   C 0029    TIMEL  E 0000
WTEST  C 0000    XMIT   E 0000

ASSEMBLY COMPLETE, NO ERRORS

ISIS-II 8080/8085 MACRO ASSEMBLER, V2.0          XTEST
RS232C COMMUNICATION TEST

LOC  OBJ         SEQ       SOURCE STATEMENT

```
                    1  $      TITLE('RS232C COMMUNICATION TEST') PAGEWIDTH(105) DEBUG
                    2                         ;WRITTEN 12/14/81
                    3                         ;UPDATED 01/20/82
                    4                         ;THIS TEST ALLOWS THE OPERATOR TO OUTPUT
                    5                         ;A DIGIT 0 - 9 THROUGH THE RS232C INTERFACE
                    6                         ;THE RESET KEY TERMINATES THE TEST. THE START
                    7                         ;KEY FORCES AN INITILIZATION OF THE 8251
                    8                         ;ALL OTHER KEYS ARE IGNORED
                    9          NAME   XTEST
                   10          PUBLIC XTEST
                   11          EXTRN  DMES25,DSPLY,KEYIN,DIAG
                   12          CSEG
0000 210000    E   13 XTEST    LXI    H,DMES25 ;POINT TO THE RS232C TEST MESSAGE
0003 CD0000    E   14          CALL   DSPLY    ;GO DISPLAY IT
0006 C32B00    C   15          JMP    REINIT   ;DO AN INITIALIZATION
0009 CD0000    E   16 LOOP     CALL   KEYIN    ;GO SAMPLE THE KEYBOARD
```

```
0000 17              17            RAL                    ;CHECK FOR ANY CHARACTERS, LOOK AT BIT 3
000D DA0900   C      18            JC       LOOP          ;IF NONE, GO WAIT FOR SOME
0010 1F              19            RAR                    ;ELSE, GET THE CHARACTER
0011 FE0A            20            CPI      10            ;CHECK FOR DIGITS 0 - 9
0013 DA2200   C      21            JC       PDIGIT        ;IF 0 - 9, GO PROCESS THE DIGIT
0016 FE15            22            CPI      21            ;CHECK FOR A START KEY
0018 CA2B00   C      23            JZ       REINIT        ;IF = START KEY, REINITILIZE THE 8251
001B FE14            24            CPI      20            ;CHECK FOR THE RESET KEY
001D CA3700   C      25            JZ       CLEAR         ;IF = RESET KEY, GO CLEAR THE CHANNEL
0020 C30900   C      26            JMP      LOOP          ;IGNORE ALL OTHER KEYS
0023 C630            27  PDIGIT    ADI      30H           ;MAKE THE DIGIT ASCII
0025 320270          28            STA      7002H         ;OUTPUT THE ASCII DIGIT
0028 C30900   C      29            JMP      LOOP          ;GO CHECK FOR KEYBOARD INPUT
002B 210070          30  REINIT    LXI      H,7003H       ;WANT TO REINITILIZE THE 8251
002E 3650            31            MVI      M,50H         ;ISSUE AN INTERNAL & ERROR RESET
0030 367B            32            MVI      M,7BH         ;MODE = 1 STOP, EVEN PARITY, 7 DATA, 64 X
0032 3623            33            MVI      M,23H         ;ISSUE A DTR, RTS & TXEN
0034 C30900   C      34            JMP      LOOP          ;GO CHECK FOR KEYBOARD INPUT
0037 3E02            35  CLEAR     MVI      A,2
0039 320370          36            STA      7003H         ;REMOVE THE RTS & TXEN, KEEP THE DTR
003C C30000   E      37            JMP      DIAG          ;GO TO THE DIAG ROUTINE
0000          C      38            END      XTEST

PUBLIC SYMBOLS
XTEST   C 0000

EXTERNAL SYMBOLS
DIAG    E 0000   DMES25 E 0000   DSPLY E 0000   KEYIN E 0000

USER SYMBOLS
CLEAR   C 0037   DIAG   E 0000   DMES25 E 0000   DSPLY E 0000   KEYIN E 0000   LOOP  C 0009
PDIGIT  C 0022   REINIT C 002B   XTEST  C 0000

ASSEMBLY COMPLETE, NO ERRORS

ISIS-II 8080/8085 MACRO ASSEMBLER, V2.0         CKSUM
CHECK SUM ROUTINE

LOC   OBJ         SEQ           SOURCE STATEMENT

1 $           TITLE('CHECK SUM ROUTINE') PAGEWIDTH(105) DEBUG
                   2                             ;WRITTEN 08/22/80
                   3                             ;UPDATED 05/04/82
                   4                             ;THIS ROUTINE COMPUTES THE CHECK SUM FOR EACH EPROM
                   5                             ;USED IN ADAIII. IF AN ERROR IS DETECTED, A MESSAGE
                   6                             ;IS DISPLAYED IDENTIFYING THE SUSPECTED EPROM. THE
                   7                             ;SYSTEM IS THEN STOPPED.
                   8            NAME    CKSUM
                   9            PUBLIC  CKSUM,CKSUM0
                  10            EXTRN   IBUF,XMIT,PROM,ERRSW,DMES3
                  11            CSEG
0000 210000   E   12  CKSUM     LXI     H,DMES3   ;POINT TO THE EPROM ERROR MESSAGE
0003 110000   E   13            LXI     D,IBUF
0006 0610         14            MVI     B,16      ;LOAD THE LOOP COUNTER
0008 7E           15  ELOOP     MOV     A,M
0009 12           16            STAX    D
000A 23           17            INX     H
000B 13           18            INX     D
000C 05           19            DCR     B
000D C20800   C   20            JNZ     ELOOP
0010 AF           21            XRA     A         ;FIRST CHECK EPROM 0
0011 320000   E   22            STA     ERRSW     ;ZERO THE ERROR SWITCH
0014 110010       23            LXI     D,1000H   ;SUM UP 4096 BYTES
0017 210000       24            LXI     H,0       ;START AT LOCATION 0
001A CD3900   C   25            CALL    SUM       ;GO SUM THEM UP
001D 3E01         26            MVI     A,1       ;CHECK EPROM 1
001F 110010       27            LXI     D,1000H
```

```
0022 210010        28         LXI    H,1000H ;START AT LOCATION 1000H
0025 CD3900   C    29         CALL   SUM
0028 3E02          30         MVI    A,2     ;CHECK EPROM 2
002A 119DE0   C    31         LXI    D,CKSUM0-2000H ;LAST LOCATION TO SUM + 1
002D 210020        32         LXI    H,2000H ;START AT LOCATION 2000H
0030 CD3900   C    33         CALL   SUM
                   34 ;       MVI    A,3     ;CHECK EPROM 3
                   35 ;       LXI    D,1000H
                   36 ;       LXI    H,3000H ;START AT LOCATION 3000H
                   37 ;       CALL   SUM
                   38 ;       MVI    A,4     ;CHECK EPROM 4
                   39 ;       LXI    D,1800H
                   40 ;       LXI    H,4000H ;START AT LOCATION 4000H
                   41 ;       CALL   SUM
                   42 ;       MVI    A,5     ;CHECK EPROM 5
                   43 ;       LXI    D,5000H ;START AT LOCATION 5000H
                   44 ;       LXI    H,2800H ;START AT LOCATION 2800H
                   45 ;       CALL   SUM
0033 3A0000   E    46         LDA    ERRSW   ;GET THE CHECK SUM ERROR SWITCH
0036 1F            47         RAR            ;LOOK AT BIT 0
0037 D0            48         RNC            ;RETURN IF ALL CHECK SUMS PASSED
0038 76            49         HLT            ;ELSE, STOP THE SYSTEM
0039 320000   E    50 SUM:    STA    PROM    ;SAVE THE EPROM UNDER TEST
003C D5            51         PUSH   D       ;SAVE THE # OF BYTES TO SUM
003D 010000        52         LXI    B,0     ;ZERO THE SUM IN THE C,D,E REGISTERS
0040 110000        53         LXI    D,0
0043 7B            54 SUML:   MOV    A,E     ;COMPUTE THE CHECK SUM
0044 86            55         ADD    M       ;DO A TRIPLE PRECISION ADD
0045 5F            56         MOV    E,A
0046 7A            57         MOV    A,D
0047 CE00          58         ACI    0
0049 57            59         MOV    D,A
004A 79            60         MOV    A,C
004B CE00          61         ACI    0
004D 4F            62         MOV    C,A
004E EB            63         XCHG           ;EXCHANGE THE SUM WITH THE POINTER
004F E3            64         XTHL           ;EXCHANGE THE SUM WITH THE BYTE COUNT
0050 2B            65         DCX    H       ;DECREMENT THE BYTE COUNT
0051 7D            66         MOV    A,L     ;WANT TO CHECK FOR H,L = 0
0052 84            67         ADD    H
0053 DA5900   C    68         JC     SKIP    ;IF CY = 1, SUM NOT DONE
0056 CA5F00   C    69         JZ     DONE    ;WHEN H,L = 0, SUM IS OVER
0059 E3            70 SKIP:   XTHL           ;EXCHANGE THE BYTE COUNT WITH THE SUM
005A EB            71         XCHG           ;EXCHANGE THE POINTER WITH THE SUM
005B 23            72         INX    H       ;POINT TO THE NEXT BYTE
005C C34300   C    73         JMP    SUML    ;ADD IN THE NEXT BYTE
005F E3            74 DONE:   XTHL           ;EXCHANGE THE BYTE COUNT WITH THE SUM
0060 EB            75         XCHG           ;EXCHANGE THE POINTER WITH THE SUM
0061 E1            76         POP    H       ;REMOVE THE STACK ENTRY
0062 219D00   C    77         LXI    H,CKSUM0;POINT TO THE TOP OF THE CHECK SUM AREA
0065 3A0000   E    78         LDA    PROM    ;GET THE EPROM NUMBER
0068 47            79         MOV    B,A
0069 07            80         RLC            ;MULTIPLY EPROM # BY 3
006A 80            81         ADD    B
006B 85            82         ADD    L       ;DO A DISPLACEMENT ADD
006C 6F            83         MOV    L,A
006D 7C            84         MOV    A,H
006E CE00          85         ACI    0
0070 67            86         MOV    H,A
0071 7B            87         MOV    A,E
0072 BE            88         CMP    M       ;COMPARE THE LSB'S OF THE CHECK SUM
0073 C28300   C    89         JNZ    ERROR
0076 23            90         INX    H
0077 7A            91         MOV    A,D
0078 BE            92         CMP    M       ;DO A 3 BYTE COMPARE
0079 C28300   C    93         JNZ    ERROR
```

```
007C 23              94          INX     H
007D 79              95          MOV     A,C
007E BE              96          CMP     M
007F C28300  C       97          JNZ     ERROR
0082 C9              98          RET                 ;RETURN IF THIS CHECK SUM IS OK
0083 3A0000  E       99 ERROR    LDA     PROM
0086 47             100          MOV     B,A
0087 210A00  E      101          LXI     H,IBUF+10;PUT WHICH EPROM IS BAD IN THE DISPLAY
008A 85             102          ADD     L
008B 6F             103          MOV     L,A
008C 7C             104          MOV     A,H
008D CE00           105          ACI     0
008F 67             106          MOV     H,A
0090 78             107          MOV     A,B      ;GET THE EPROM NUMBER
0091 C630           108          ADI     30H      ;MAKE IT ASCII
0093 77             109          MOV     M,A      ;PUT IT IN THE DISPLAY
0094 CD0000  E      110          CALL    XMIT     ;DISPLAY THE ERROR MESSAGE
0097 3E01           111          MVI     A,1      ;SET UP THE ERROR SWITCH
0099 320000  E      112          STA     ERRSW    ;SET TO DENOTE A CHECK SUM ERROR
009C C9             113          RET              ;RETURN TO CHECK THE NEXT EPROM
009D E6             114 CKSUM0:  DB      0E6H,0D1H,4    ;CHECK SUM FOR EPROM 0 LSB'S FIRST
009E D1
009F 04
00A0 9B             115 CKSUM1:  DB      09BH,0E2H,5    ;CHECK SUM FOR EPROM 1
00A1 E2
00A2 05
00A3 D6             116 CKSUM2:  DB      0D6H,0DEH,5    ;CHECK SUM FOR EPROM 2
00A4 DE
00A5 05
                   117 ;CKSUM3:  DB      0,0,0          ;CHECK SUM FOR EPROM 3
                   118 ;CKSUM4:  DB      0,0,0          ;CHECK SUM FOR EPROM 4
                   119 ;CKSUM5:  DB      0,0,0          ;CHECK SUM FOR EPROM 5
0000         C     120          END      CKSUM

PUBLIC SYMBOLS
CKSUM  C 0000     CKSUM0 C 009D

EXTERNAL SYMBOLS
DMES3  E 0000     ERRSW  E 0000     IBUF  E 0000     PROM  E 0000     XMIT  E 0000

USER SYMBOLS
CKSUM  C 0000     CKSUM0 C 009D     CKSUM1 C 00A0    CKSUM2 C 00A3    DMES3 E 0000     DONE  C 005F
ELOOP  C 0008     ERROR  C 0083     ERRSW  E 0000    IBUF   E 0000    PROM  E 0000     SKIP  C 0059
SUM    C 0039     SUML   C 0043     XMIT   E 0000

ASSEMBLY COMPLETE, NO ERRORS
```

APPENDIX II

```
*BYTE 0 TO 2FFFH
0000H=C3H C6H 06H 00H 00H 00H 00H 00H 00H 00H 00H 00H 00H 00H 00H 00H
0010H=00H 00H 00H 00H 00H 00H 00H 00H 00H 00H 00H 00H 00H 00H 00H 00H
0020H=00H 00H 00H 00H 00H 00H 00H 00H 00H 00H 00H 00H C2H 47H 15H 00H
0030H=00H 00H 00H 00H C3H 23H 17H 00H C3H C6H 06H 01H C3H D5H 19H 00H
0040H=20H 20H 4EH 4FH 20H 20H 4EH 4FH 20H 4EH 4FH 53H 41H 4DH 50H 4CH
0050H=45H 20H 20H 20H 49H 4EH 49H 54H 49H 41H 4CH 20H 48H 54H 20H 20H
0060H=57H 35H 20H 4DH 49H 4EH 55H 54H 45H 20H 48H 54H 20H 57H 49H 4EH
0070H=42H 20H 46H 49H 4EH 20H 48H 54H 20H 57H 45H 58H 50H 45H 43H 54H
0080H=20H 4CH 4FH 53H 53H 20H 25H 45H 4EH 44H 20H 41H 54H 20H 54H 45H
0090H=4DH 50H 20H 45H 4EH 44H 20H 41H 54H 20H 44H 50H 20H 20H 20H 45H
00A0H=4EH 44H 20H 41H 54H 20H 25H 20H 52H 45H 43H 20H 00H 09H 09H 0CH
00B0H=16H 0CH 22H 06H 2FH 0CH 3CH 0CH 48H 0CH 54H 0CH 00H 07H 0AH 0DH
00C0H=11H 14H 18H 1CH 1FH 30H 30H 2EH 30H 4DH 30H 30H 30H 2EH 30H 20H
00D0H=30H 30H 30H 57H 52H 45H 53H 49H 44H 55H 45H 20H 20H 20H 20H 20H
00E0H=2EH 20H 4DH 4CH 42H 41H 44H 20H 45H 50H 52H 4FH 4DH 20H 20H 20H
00F0H=20H 20H 20H 20H 47H 43H 41H 20H 20H 41H 44H 41H 49H 49H 49H 20H
0100H=56H 30H 2EH 31H 20H 20H 2DH 2DH 50H 52H 49H 4EH 54H 49H 4EH 47H
```

```
0110H=20H 20H 20H 20H 20H 5AH 45H 52H 4FH 20H 20H 43H 52H 4FH 53H 53H
0120H=49H 4EH 47H 20H 20H 20H 52H 45H 53H 45H 54H 20H 20H 4DH 4FH 54H
0130H=4FH 52H 20H 20H 52H 45H 41H 44H 20H 20H 50H 41H 52H 41H 4DH 45H
0140H=54H 45H 52H 53H 53H 45H 4CH 45H 43H 54H 20H 54H 45H 53H 54H 20H
0150H=20H 20H 20H 20H 52H 41H 4DH 20H 54H 45H 53H 54H 20H 50H 41H 53H
0160H=53H 45H 44H 20H 52H 41H 4DH 20H 54H 45H 53H 54H 20H 46H 41H 49H
0170H=4CH 45H 44H 20H 2AH 2AH 54H 52H 41H 4EH 53H 4DH 49H 54H 54H 49H
0180H=4EH 47H 2AH 2AH 4DH 4FH 54H 4FH 52H 20H 54H 45H 53H 54H 20H 20H
0190H=20H 20H 20H 45H 4EH 54H 45H 52H 20H 59H 45H 41H 52H 20H 20H
01A0H=31H 39H 4DH 4FH 4EH 54H 48H 20H 20H 20H 44H 41H 59H 20H 20H 20H
01B0H=20H 20H 48H 4FH 55H 52H 20H 20H 20H 20H 4DH 49H 4EH 55H 54H 45H
01C0H=20H 20H 54H 45H 4DH 50H 3DH 58H 58H 58H 2EH 58H 3FH 20H 20H 56H
01D0H=41H 50H 58H 20H 59H 20H 54H 45H 53H 54H 20H 20H 20H 20H 20H 20H
01E0H=20H 20H 54H 45H 4DH 50H 3DH 20H 58H 58H 2EH 58H 43H 20H 20H 43H
01F0H=48H 41H 54H 45H 4DH 50H 3DH 20H 58H 58H 2EH 58H 43H 20H 20H 43H
0200H=4FH 4EH 43H 4FH 4EH 44H 20H 4CH 45H 56H 45H 4CH 20H 20H 20H 20H
0210H=20H 20H 52H 50H 3DH 30H 30H 30H 57H 20H 41H 43H 3DH 20H 30H 30H
0220H=30H 57H 52H 53H 2DH 32H 33H 32H 2DH 43H 20H 54H 45H 53H 54H 20H
0230H=20H 20H 4DH 41H 4EH 46H 45H 42H 4DH 41H 52H 41H 50H 52H 4DH 41H
0240H=59H 4AH 55H 4EH 4AH 55H 4CH 41H 55H 47H 53H 45H 50H 4FH 43H 54H
0250H=4EH 4FH 56H 44H 45H 43H 1FH 1CH 1FH 1EH 1FH 1EH 1FH 1FH 1EH 1FH
0260H=1EH 1FH 54H 45H 53H 54H 49H 4EH 47H 20H 20H 20H 43H 4FH 4EH 44H
0270H=49H 54H 49H 4FH 4EH 53H 20H 20H 20H 20H 20H 20H 20H 20H 20H 20H
0280H=20H 20H 20H 20H 20H 20H 20H 20H 20H 55H 4EH 49H 54H 20H 49H
0290H=44H 20H 4EH 55H 4DH 42H 45H 52H 20H 20H 20H 54H 45H 4DH 50H 20H
02A0H=52H 41H 4EH 47H 45H 20H 20H 20H 44H 49H 53H 54H 20H 52H 41H 54H
02B0H=45H 20H 20H 53H 41H 4DH 50H 4CH 45H 20H 20H 20H 20H 20H 20H 20H
02C0H=43H 4EH 49H 54H 49H 41H 4CH 20H 48H 45H 41H 54H 20H 20H 20H 20H
02D0H=57H 35H 20H 4DH 49H 4EH 55H 54H 45H 20H 48H 45H 41H 54H 20H 20H
02E0H=20H 57H 49H 4EH 43H 52H 20H 46H 49H 4EH 41H 4CH 20H 48H 54H 20H
02F0H=20H 57H 45H 58H 50H 45H 43H 54H 45H 44H 20H 4CH 4FH 53H 53H 20H
0300H=20H 20H 25H 45H 4EH 44H 20H 41H 54H 20H 54H 45H 4DH 50H 20H 20H
0310H=20H 20H 20H 45H 4EH 44H 20H 41H 54H 20H 44H 52H 59H 20H 50H 54H
0320H=20H 20H 20H 53H 45H 4EH 44H 20H 41H 54H 20H 25H 20H 52H 45H 43H
0330H=20H 20H 20H 20H 20H 25H 45H 4EH 44H 20H 41H 54H 20H 45H 4EH 44H
0340H=20H 50H 4FH 49H 4EH 54H 20H 20H 20H 20H 00H 14H 14H 14H 28H 11H
0350H=29H 0DH 46H 08H 51H 0DH 5EH 10H 6FH 10H 80H 0FH 90H 10H A1H 10H
0360H=B1H 10H C2H 11H D4H 14H 20H 30H 2DH 33H 30H 30H 43H 20H 30H 2DH
0370H=34H 30H 30H 43H 33H 32H 2DH 35H 37H 32H 46H 33H 32H 2DH 37H 35H
0380H=32H 46H 33H 30H 2DH 33H 30H 30H 43H 39H 2EH 30H 4DH 4CH 2FH 4DH
0390H=43H 4EH 36H 2EH 30H 4DH 4CH 2FH 4DH 49H 4EH 34H 2EH 35H 4DH 4CH
03A0H=2FH 4DH 49H 4EH 49H 42H 50H 20H 20H 20H 2EH 20H 4DH 49H 4EH 4DH
03B0H=43H 4EH 20H 46H 52H 4FH 4DH 20H 46H 48H 20H 54H 4FH 20H 45H 50H
03C0H=45H 4EH 44H 20H 50H 4FH 49H 4EH 54H 20H 3EH 20H 35H 2EH 30H 20H
03D0H=4DH 49H 4EH 20H 20H 45H 4EH 44H 20H 50H 54H 4DH 4CH 20H 20H 20H
03E0H=20H 20H 52H 45H 43H 4FH 56H 45H 52H 59H 20H 20H 52H 45H 53H 49H
03F0H=44H 55H 45H 54H 4FH 54H 20H 52H 45H 43H 4FH 56H 45H 52H 59H 20H
0400H=20H 20H 20H 20H 20H 20H 20H 4CH 4FH 53H 53H 42H 41H 52H 4FH 4DH
0410H=45H 54H 45H 52H 20H 20H 3DH 20H 30H 30H 30H 6DH 6DH 48H 67H 43H
0420H=43H 41H 4DH 42H 45H 52H 20H 20H 20H 54H 45H 4DH 50H 3DH 30H 30H
0430H=2EH 30H 43H 43H 4FH 4EH 44H 45H 4EH 53H 45H 52H 54H 45H 4DH 50H
0440H=45H 52H 41H 54H 55H 52H 45H 53H 20H 41H 52H 45H 20H 20H 20H 20H
0450H=54H 45H 4DH 50H 45H 52H 41H 54H 55H 52H 45H 53H 20H 41H 52H 45H
0460H=20H 4EH 4FH 54H 43H 4FH 52H 52H 45H 43H 54H 44H 20H 20H 54H 4FH
0470H=20H 17H 16H 10H 6DH 6DH 48H 67H 4EH 4FH 20H 4DH 45H 4EH 49H 53H
0480H=43H 55H 53H 20H 4DH 4FH 56H 45H 4DH 45H 4EH 54H 20H 44H 52H 59H
0490H=20H 50H 54H 54H 45H 4DH 50H 45H 52H 41H 54H 55H 52H 45H 53H 20H
04A0H=56H 53H 20H 20H 20H 20H 20H 45H 56H 41H 50H 4FH 52H 41H 54H 45H
04B0H=44H 20H 53H 41H 4DH 50H 4CH 45H 20H 20H 20H 49H 42H 50H 20H 20H
04C0H=20H 20H 20H 20H 20H 20H 20H 20H 20H 20H 20H 20H 47H 52H 41H 44H
04D0H=55H 41H 54H 45H 20H 4EH 4FH 54H 20H 50H 52H 45H 53H 45H 4EH 54H
04E0H=20H 55H 50H 50H 45H 52H 20H 4CH 49H 4DH 49H 54H 20H 53H 57H 49H
04F0H=54H 43H 43H 29H 35H 2EH 30H 4DH 4CH 20H 20H 20H 20H 20H 20H 20H
0500H=20H 20H 20H 20H 20H 20H 20H 44H 52H 4FH 50H 20H 54H 49H 4DH
0510H=45H 20H 57H 41H 53H 20H 58H 2EH 58H 52H 45H 43H 58H 58H 2EH 58H
0520H=4DH 4CH 20H 20H 20H 43H 4FH 52H 52H 20H 54H 4FH 54H 20H 52H 45H 43H
```

```
0520H=49H 42H 50H 20H 4CH 49H 4DH 49H 54H 53H 20H 35H 4DH 20H 54H 4FH
0540H=20H 31H 20H 4DH 54H 45H 53H 54H 20H 20H 20H 20H 20H 20H 54H 45H
0550H=52H 4DH 49H 4EH 41H 54H 45H 44H 4EH 4FH 20H 44H 52H 4FH 50H 20H
0560H=49H 4EH 20H 35H 2EH 36H 20H 4DH 49H 4EH 20H 45H 4EH 44H 20H
0570H=4FH 46H 20H 54H 45H 53H 54H 20H 41H 2DH 2DH 2DH 2DH 2DH 2DH
0580H=20H 20H 4CH 4FH 53H 53H 20H 49H 53H 20H 3CH 20H 30H 2EH 30H
0590H=4DH 4CH 20H 20H 20H 2EH 30H 4DH 4CH 20H 20H 20H 20H 20H 43H
05A0H=4FH 52H 52H 20H 4FH 53H 53H 43H 4FH 4EH 44H 45H 4EH 53H 45H
05B0H=52H 20H 4CH 45H 56H 45H 4CH 20H 4CH 4FH 57H 20H 4FH 50H 45H 52H
05C0H=41H 54H 4FH 52H 3AH 5FH 5FH 5FH 5FH 5FH 5FH 5FH 5FH 5FH 5FH 5FH
05D0H=44H 49H 53H 54H 49H 4CH 4CH 41H 54H 49H 4FH 4EH 20H 52H 45H 53H
05E0H=55H 4CH 54H 53H 56H 41H 50H 4FH 52H 20H 20H 20H 43H 4BH 54H 20H
05F0H=20H 20H 20H 20H 4FH 50H 45H 4EH 56H 41H 50H 4FH 52H 20H 20H 20H
0600H=43H 4BH 54H 20H 20H 53H 48H 4FH 52H 54H 45H 44H 43H 48H 41H 4DH
0610H=42H 45H 52H 20H 43H 4BH 54H 20H 20H 20H 20H 20H 4FH 50H 45H 4EH
0620H=43H 48H 41H 4DH 42H 45H 52H 20H 43H 4BH 54H 20H 20H 53H 48H 4FH
0630H=52H 54H 45H 44H 00H 05H 10H 20H 30H 40H 50H 60H 70H 80H 90H 95H
0640H=9AH 00H 05H 0AH 14H 1EH 28H 32H 3CH 46H 50H 5AH 5FH 65H 8FH 7AH
0650H=21H 47H BCH 1BH 6BH 4CH 1DH 36H D4H 30H 53H 0EH 1AH 29H D8H 40H
0660H=43H 70H 17H 22H 20H 4EH 37H 4AH 15H 1BH ACH 58H 2DH 88H 13H 17H
0670H=A8H 61H 27H 02H 12H 13H 14H 69H 21H B8H 10H 11H B8H 6FH 1CH A0H
0680H=0FH 0EH 30H 75H 19H A6H 0EH 0CH E0H 79H 16H CAH 0DH 0BH 2CH 7EH
0690H=14H 02H 0DH 0AH 14H 82H 11H 58H 0CH 09H 98H 85H 10H B8H 0BH 08H
06A0H=B8H 88H 0EH 2CH 0BH 07H 74H 8BH 0DH AAH 0AH 06H CCH 8DH 0CH 32H
06B0H=0AH 06H 24H 90H 0BH C4H 09H 06H 7CH 92H 0AH 60H 09H 05H 70H 94H
06C0H=09H 06H 09H 04H 00H 96H 31H FFH 67H AFH 32H 00H 60H 32H 0BH 70H
06D0H=32H A1H 60H 3DH 32H 16H 60H 3EH 80H 32H 08H 70H 3EH 13H 32H 01H
06E0H=60H E6H F0H 32H 0AH 70H 3EH 24H 32H 0BH 60H 32H 01H 70H 21H 03H
06F0H=70H AFH 77H 77H 36H 50H 36H FBH 36H 02H 21H 9DH 61H 36H 02H
0700H=23H 36H 03H 21H 13H 70H 36H 72H 2BH 2BH 36H 00H 36H 40H 21H 05H
0710H=70H 36H 08H 36H 2DH 36H E0H 36H A0H 36H C2H CDH 43H 2FH 21H F4H
0720H=00H CDH 9DH 07H 21H 00H 00H 22H 18H 70H 22H 1AH 70H 11H 01H 00H
0730H=E5H E1H 13H D2H 2DH 07H 21H 29H 60H 3EH 1FH 36H 30H 22H 3DH C2H
0740H=2BH 07H 21H 36H 60H 36H 20H 3EH 2EH 32H 3BH 60H 21H 3DH 60H 11H
0750H=40H 00H 06H 0BH 1AH 77H 22H 13H 05H C2H 54H 07H 21H 14H 01H CDH
0760H=9DH 07H CDH AEH 07H 21H 52H 60H 3AH 00H 70H E6H 1FH 77H AFH 2BH
0770H=77H 2BH 77H 2BH 77H CDH 76H 0EH 21H 4EH 60H 01H 6FH 60H 3EH 20H
0780H=02H 03H 7EH CDH 77H 1DH 02H 03H 7EH E6H 0FH C6H 30H 02H 21H 0CH
0790H=60H 06H 0AH 36H 20H 23H 05H C2H 93H 07H C3H 63H 08H 11H 17H 60H
07A0H=06H 10H 7EH 12H 23H 13H 05H C2H A2H 07H CDH 3DH 0BH C9H CDH 4EH
07B0H=03H 17H DAH BEH 07H 1FH FEH 14H CAH E2H 07H 21H 0AH 70H AFH 47H
07C0H=7EH E6H 40H CAH C0H 07H 7EH E6H 40H C2H C6H 07H 7EH E6H 40H C2H
07D0H=CCH 07H 04H 0EH 0CH 0DH C2H D5H 07H C3H CCH 07H 3EH 75H B8H DAH
07E0H=07H 08H 21H 32H 2AH 22H 03H 60H 21H 94H 02H 22H 05H 60H 21H BCH
07F0H=02H 22H 07H 60H 21H 00H 2AH 22H 09H 60H 21H 17H 17H 22H 9AH 60H
0800H=21H 1FH 17H 22H 9CH 60H C9H 21H A2H 32H 22H 03H 60H 21H 18H 03H
0810H=22H 05H 60H 21H BCH 02H 22H 07H 60H 21H 70H 32H 22H 09H 60H 21H
0820H=1BH 17H 22H 9AH 60H 21H 21H 17H 22H 9CH 60H C9H 17H 0DH 16H 18H
0830H=1DH 14H 80H 80H 15H 0CH 16H 09H 06H 02H 80H 80H 11H 0EH 00H 06H
0840H=05H 02H 80H 80H 10H 0EH 12H 07H 04H 01H 80H 80H 0FH 0AH 21H 05H
0850H=70H 7EH E6H 0FH C2H 5AH 08H 3EH 80H C9H 36H 50H 2BH 7EH E6H 3FH
0860H=16H 00H 5FH 21H 2DH 08H 19H 7EH C9H 21H 94H 01H 06H 0EH CDH 9DH
0870H=07H 2AH 0DH 60H 22H 25H 60H CDH 3DH 0BH 0EH FFH 0CH CDH 4EH 08H
0880H=17H DAH 7DH 08H 1FH FEH 0AH DAH 97H 08H FEH 16H CAH A6H 08H FEH
0890H=14H CAH 73H 08H C2H 7DH 08H C6H 30H 21H 26H 60H 46H 77H 2BH 70H
08A0H=CDH 3DH 0BH C3H 7DH 08H 2AH 25H 60H EBH CDH 6FH 09H 79H FEH 00H
08B0H=CAH E2H 09H FEH 01H CAH F8H 08H FEH 02H CAH 12H 09H FEH 03H CAH
08C0H=8CH 09H 7EH FEH 2CH D2H 7DH 08H 2AH 25H 60H 3EH 20H BDH C2H D9H
08D0H=08H 2EH 20H BCH C2H D9H 08H 26H 30H 22H 14H 60H CDH C0H 09H C3H
08E0H=64H 08H 7EH FEH 50H DAH 7DH 08H 2AH 25H 60H 22H 0CH 60H 2AH 0EH
08F0H=60H EBH 21H A2H 01H CDH A7H 09H 7BH FEH 00H CAH 7DH 08H FEH 0DH
0900H=C2H 7DH 08H 2AH 25H 60H 22H 0EH 60H 2AH 10H 60H EBH 21H AAH 01H
0910H=CDH A7H 09H 7BH FEH 00H CAH 7DH 08H FEH 20H D2H 7DH 08H D5H 2AH
0920H=0EH 60H EEH CDH 6FH 09H 21H 56H 02H 19H 2BH 7EH D1H FEH 1CH CCH
0930H=46H 09H BEH DAH 7DH 08H 2AH 25H 60H 22H 10H 60H 2AH 12H 60H EBH
0940H=21H B2H 01H CDH A7H 09H 47H 2AH 0CH 60H 7DH 1FH 7CH DAH 62H 09H
```

```
0950H=FEH 30H CAH 5FH 09H FEH 34H CAH 5FH 09H FEH 38H C2H 60H 09H 04H
0960H=78H C9H FEH 32H CAH 5FH 09H FEH 36H CAH 5FH 09H C3H 60H 09H C5H
0970H=21H 4CH 60H 7AH E6H 0FH 57H 7BH 17H 17H 17H 17H E6H F0H 82H 77H
0980H=AFH 2BH 77H 2BH 77H CDH FEH 0DH 59H 50H C1H C9H 7BH FEH 00H CAH
0990H=7DH 08H FEH 18H D2H 7DH 08H 2AH 25H 60H 22H 12H 60H 2AH 14H 60H
09A0H=EBH 21H BAH 01H C3H A7H 09H D5H 11H 1DH 60H 06H 08H 7EH 12H 23H
09B0H=13H 05H C2H ADH 09H E1H EBH 73H 23H 72H CDH 3DH 0BH C3H 7CH 08H
09C0H=21H 17H 70H 36H 30H 36H 54H 2BH 2BH 36H FFH 23H 23H 36H 34H 36H
09D0H=30H 36H 34H 21H 14H 70H 3AH 03H 60H 17H DAH E3H 09H 11H 20H 1CH
09E0H=73H 72H C9H 11H 70H 17H C3H E0H 09H 2AH 0EH 60H EBH CDH 6FH 09H
09F0H=21H 32H 02H 1BH 19H 19H 19H 11H 73H 60H 7EH 12H 23H 13H 7EH 12H
0A00H=23H 13H 7EH 12H 13H EBH 36H 20H 23H EBH 2AH 10H 60H E5H C1H EBH
0A10H=71H 23H 70H 23H 36H 20H 23H 36H 31H 23H 36H 39H 23H EBH 2AH 0CH
0A20H=60H EBH 73H 23H 72H 23H 36H 20H 23H EBH 2AH 12H 60H EBH 73H 23H
0A30H=72H 23H 36H 3AH 23H EBH 2AH 14H 60H EBH 73H 23H 72H 23H 36H 20H
0A40H=23H 36H 20H 23H 36H 20H CDH 15H 15H C9H 21H 17H 70H 36H 40H 2BH
0A50H=3BH 46H 3AH 16H 60H B8H C8H 78H 32H 16H 60H 2AH 14H 60H EBH CDH
0A60H=6FH 09H 7BH 3CH FEH 3CH 06H 00H DAH 6EH 0AH 04H D6H 3CH CDH E5H
0A70H=0AH 22H 14H 60H 2AH 12H 60H EBH CDH 6FH 09H 7BH 80H FEH 18H 06H
0A80H=00H DAH 87H 0AH 04H D6H 18H CDH E5H 0AH 22H 12H 60H 2AH 10H 60H
0A90H=EBH CDH 6FH 09H 7BH 80H 4FH 2AH 0EH 60H EBH CDH 6FH 09H 21H 56H
0AA0H=02H 19H 2BH 7EH FEH 1CH CCH 46H 09H B9H 57H 06H 00H 79H CAH B6H
0AB0H=0AH D2H B6H 0AH 92H 04H CDH E5H 0AH 22H 10H 60H 2AH 0EH 60H EBH
0AC0H=CDH 6FH 09H 7BH 80H FEH 0DH 06H 00H DAH CFH 0AH 3EH 01H 47H CDH
0AD0H=E5H 0AH 22H 0EH 60H 2AH 0CH 60H EBH CDH 6FH 09H 7BH 80H CDH E5H
0AE0H=0AH 22H 0CH 60H C9H C5H 21H 52H 60H 77H 2BH AFH 77H 2BH 77H 2BH
0AF0H=77H CDH 76H 0EH 21H 4EH 60H 4EH 79H CDH 77H 1DH 6FH 79H E6H 0FH
0B00H=C6H 30H 67H C1H C9H 6AH 2DH 2DH 2DH 2DH 2DH 1EH 47H 3AH 27H
0B10H=60H FEH 04H CAH 51H 0BH FEH 06H CAH 51H 0BH 5FH AFH 57H 21H 05H
0B20H=0EH 19H 7EH E6H 0FH 5FH 7EH 1FH 1FH 1FH 1FH E6H 0FH 4FH 21H 17H
0B30H=60H 19H 7EH 2BH 77H 23H 23H 0DH C2H 32H 0BH 2BH 70H 21H 05H 70H
0B40H=3EH 90H 77H 2BH 06H 10H 11H 17H 60H 1AH 77H 05H C8H 13H C3H 49H
0B50H=0BH 21H 25H 60H 4EH 70H 2BH 2BH 71H C3H 3DH 0BH 79H 3CH 3CH 4BH
0B60H=3CH 4CH 4CH 3DH 3AH 01H 60H E6H F0H 32H 0AH 70H 3AH 9EH 61H FEH
0B70H=03H C4H 9FH 29H 21H 17H 70H 36H B0H 2BH 36H FFH 36H FFH AFH 32H
0B80H=0BH 70H 11H 01H 00H 21H C7H F0H 19H D2H 88H 0BH 21H 00H 00H 22H
0B90H=18H 70H 22H 1AH 70H AFH 32H 28H 60H 32H 27H 60H CDH A5H 0DH 3AH
0BA0H=06H 60H 32H 01H 70H CDH 4AH 0AH CDH 87H 0DH CDH 4EH 08H 17H DAH
0BB0H=A5H 06H 1FH FEH 0AH DAH F2H 0BH FEH 12H DAH 03H 0CH FEH 14H CAH
0BC0H=DCH 0CH FEH 15H CAH E8H 0EH FEH 16H CAH 2CH 0CH FEH 13H CAH D4H
0BD0H=0EH C3H A5H 0BH 3AH 27H 60H FEH 03H C2H A5H 0BH 21H 22H 60H 7EH
0BE0H=FEH 2DH CAH EDH 0BH 36H 2DH CDH 3DH 0BH C3H A5H 0BH 36H 20H C3H
0BF0H=E7H 0BH F5H 3AH 28H 60H 1FH D4H 11H 0DH F1H C6H 30H CDH 0DH 0BH
0C00H=C3H A5H 0BH D6H 09H 47H FEH 06H 3AH 0BH 60H D2H 27H 0CH E6H E0H
0C10H=F5H 3EH 01H 05H CAH 1BH 0CH 87H C3H 13H 0CH 47H F1H 80H 32H 01H
0C20H=70H 32H 0BH 60H C3H A5H 0BH E6H 1FH C3H 10H 0CH 21H 20H 60H 06H
0C30H=39H 0EH 07H 7EH B8H C2H 41H 0CH 23H 05H 0DH C2H 33H 0CH C3H F9H
0C40H=29H 3AH 27H 60H 5FH AFH 57H 32H 28H 60H 21H 5CH 0BH 19H 7EH E6H
0C50H=0FH 4FH 7EH 1FH 1FH 1FH 1FH E6H 0FH 47H 21H BCH 00H 19H 5EH 21H
0C60H=29H 60H 19H E5H 21H 17H 60H 59H 19H EBH E1H 1AH 77H 23H 13H 05H
0C70H=C2H 6BH 0CH 3AH 27H 60H 3CH 47H FEH 04H C2H 87H 0CH 3AH 06H 60H
0C80H=E6H 10H CAH 96H 0CH 04H 78H FEH 05H CAH 9EH 0CH FEH 06H CAH BCH
0C90H=0CH FEH 07H CAH C8H 0CH FEH 08H CAH 95H 0BH C3H 99H 0BH 3AH 44H
0CA0H=60H FEH 4FH C2H B2H 0CH 3AH 47H 60H FEH 4FH C2H B7H 0CH 78H C3H
0CB0H=99H 0BH 3EH 06H C3H 99H 0BH 3EH 07H C3H 99H 0BH 3AH 40H 60H FEH
0CC0H=4FH C2H 95H 0BH 78H C3H 99H 0BH 3AH 40H 60H FEH 4FH C2H 95H 0BH
0CD0H=3AH 44H 60H FEH 4FH C2H 95H 0BH 78H C3H 99H 0BH 3AH 27H 60H FEH
0CE0H=05H CAH F1H 0CH FEH 06H CAH F1H 0CH FEH 07H CAH F1H 0CH C3H 95H
0CF0H=0BH 21H 3DH 60H 06H 02H 36H 20H 23H 36H 20H 23H 36H 4EH 23H 36H
0D00H=4FH 23H 05H C2H F6H 0CH 36H 20H 23H 36H 4EH 23H 36H 4FH C3H 95H
0D10H=0BH 3AH 27H 60H F5H 5FH AFH 57H 3CH 32H 28H 60H 21H 5CH 0BH 19H
0D20H=7EH E6H 0FH FEH 06H CCH 83H 0DH 5FH 7EH 1FH 1FH 1FH E6H 0FH
0D30H=FEH 04H CCH 85H 0DH 47H 21H 17H 60H 3EH 30H 77H 23H 05H CAH
0D40H=3CH 0DH F1H FEH 04H CAH 58H 0DH FEH 05H CAH 5EH 0DH FEH 06H CAH
0D50H=72H 0DH FEH 07H CAH 7DH 0DH C9H 3EH 2EH 32H 24H 60H C9H 3AH 0BH
0D60H=60H E6H 0CH CAH 6CH 0DH 3EH 46H 32H 26H 60H C9H 3EH 43H 32H 26H
```

```
0D70H=60H C9H 3EH 53H 32H 26H 60H 3EH 2EH 32H 24H 60H C9H 3EH 25H 32H
0D80H=26H 60H C9H 3CH C9H 3DH C9H 21H 17H 70H 36H 80H 2BH 5EH 56H 21H
0D90H=5FH 73H 7CH 92H 7CH 9AH D8H 3AH 01H 60H F6H 10H 32H 01H 60H E6H
0DA0H=F0H 32H 0AH 70H C9H 32H 49H 60H 87H 4FH 21H ACH 00H AFH 47H 09H
0DB0H=4EH 23H 5EH 53H 21H 4BH 00H 09H 01H 17H 60H 7EH 02H 23H 03H 1DH
0DC0H=C2H BBH 0DH 7AH 32H 48H 60H FEH 10H DAH D0H 0DH CDH 3DH 0BH C9H
0DD0H=E5H C5H 3AH 49H 60H 21H BCH 00H 4FH AFH 47H 09H 4EH 23H 7EH 91H
0DE0H=57H 5FH 21H 29H 60H 09H C1H 7EH 02H 23H 03H 15H C2H E7H 0DH E1H
0DF0H=3AH 48H 60H 83H FEH 10H CAH CCH 0DH 7EH 02H C3H CCH 0DH AFH 16H
0E00H=10H C5H 06H 03H 7EH 1FH 77H 23H 05H C2H 04H 0EH C1H 78H 1FH 47H
0E10H=79H 1FH 4FH 15H C8H 2BH CDH 21H 0EH 2BH CDH 21H 0EH 2BH C3H 01H
0E20H=0EH 7EH E6H 0FH 5FH D6H 08H FAH 2DH 0EH C6H 05H 5FH 7EH E6H F0H
0E30H=D6H 80H FAH 3AH 0EH C6H 50H 83H 77H C9H 7EH E6H F0H 83H 77H C9H
0E40H=AFH 32H 4FH 60H 32H 50H 60H 06H 10H AFH 21H 4BH 60H 7EH 1FH 77H
0E50H=23H 7EH 1FH 77H 23H DCH 6AH 0EH 21H 4FH 60H 0EH 04H 7EH 1FH 77H
0E60H=23H 0DH C2H 5DH 0EH 05H C2H 49H 0EH C9H 56H 23H 7EH 23H 23H 86H
0E70H=77H 2BH 7AH 8EH 77H C9H 06H 20H AFH 21H 4EH 60H 77H 2BH 77H 2BH
0E80H=77H 2BH 77H 2BH AFH 21H 52H 60H 0EH 04H 7EH 8FH 77H 2BH 0DH
0E90H=C2H 8BH 0EH 0EH 05H 7EH 8FH 27H 77H 2BH 0DH C2H 95H 0EH 05H C2H
0EA0H=85H 0EH C9H 06H 11H AFH 21H 4CH 60H 7EH 2FH 57H 23H 7EH 2FH 5FH
0EB0H=13H 3AH 4EH 60H 67H 3AH 4FH 60H 6FH 19H D2H C5H 0EH 7CH 32H 4EH
0EC0H=60H 7DH 32H 4FH 60H 21H 4BH 60H 7EH 17H 77H 2BH 7EH 17H 77H AFH
0ED0H=21H 51H 60H 0EH 04H 7EH 17H 77H 2BH 0DH C2H D5H 0EH 05H C8H C3H
0EE0H=E1H 0EH 32H 41H 42H 3AH 4FH 4FH 21H 9EH 61H 36H 03H 22H 9BH 61H
0EF0H=CDH F2H 14H CDH 2EH 11H 3AH 0AH 70H E6H 10H CAH 40H 11H 3AH 01H
0F00H=60H F6H 10H 32H 01H 60H 32H 0AH 70H AFH 32H 95H 60H 32H 98H 60H
0F10H=32H 5BH 61H 32H 49H 60H 67H 6FH 22H 96H 60H 3EH 8AH 32H 09H 70H
0F20H=CDH 6EH 11H CDH 36H 29H CDH 6EH 11H CDH C3H 1EH CDH 6EH 11H 21H
0F30H=34H 01H CDH 9DH 07H CDH EAH 12H CDH 57H 13H 7BH E6H 10H C2H 7CH
0F40H=11H 7BH E6H 20H CAH 85H 11H 3AH 0BH 60H E6H 10H F5H C2H 10H 11H
0F50H=3EH 24H 32H 09H 70H 21H 04H 01H CDH 9DH 07H CDH A9H 13H CDH 6EH
0F60H=11H 11H 1FH 04H 21H 73H 60H 06H 14H CDH 25H 11H 21H 82H 60H 11H
0F70H=5BH 61H 1AH 77H 23H 13H 1AH 77H 23H 23H 12H 1AH 77H CDH 15H 15H
0F80H=CDH 57H 13H 11H 33H 04H 21H 73H 60H 06H 09H CDH 25H 11H 11H 5BH
0F90H=61H 21H 82H 60H 1AH 77H 23H 13H 1AH 77H 23H 23H 13H 1AH 77H CDH
0FA0H=15H 15H 11H 0BH 04H 21H 73H 60H 06H 14H CDH 25H 11H 11H 9EH 60H
0FB0H=21H 80H 60H 06H 03H CDH 25H 11H CDH 15H 15H F1H F5H C2H 15H 11H
0FC0H=3EH 21H 32H 09H 70H F1H C2H 1AH 11H AFH 32H 5EH 60H 21H 3CH 04H
0FD0H=CDH 86H 1CH 21H 64H 04H CDH 86H 1CH 11H 30H 05H 21H 73H 60H 06H
0FE0H=14H CDH 25H 11H 3AH 0BH 60H 1FH DAH 60H 11H 1FH DAH 66H 11H 1FH
0FF0H=DAH 60H 11H 1FH DAH 66H 11H CDH 6EH 11H 3AH 58H 61H FEH 03H DAH
1000H=03H 10H 21H A5H 05H CDH 86H 1CH 21H 76H 02H CDH 86H 1CH 21H D0H
1010H=05H CDH 86H 1CH 21H 17H 60H 06H 0AH 11H C5H 00H CDH 25H 11H 3AH
1020H=0BH 60H 47H E6H 0CH CAH 04H 11H 36H 46H 23H 78H 07H 07H 07H E6H
1030H=07H 3DH FEH 03H CCH 0EH 11H E5H D5H 21H E2H 0EH 5FH AFH 57H 3AH
1040H=03H 60H FEH 32H C4H 09H 11H 19H 7EH 32H 59H 60H D1H E1H 06H 05H
1050H=CDH 25H 11H AFH 32H 55H 60H 32H 56H 60H 21H 35H 60H CDH A4H 10H
1060H=79H 32H 5EH 61H 78H 32H 5FH 61H 7BH 32H 60H 61H 7AH 32H 61H 61H
1070H=21H 32H 60H CDH A4H 10H 79H 32H 53H 60H 78H 32H 54H 60H 21H 13H
1080H=70H 36H 72H 36H 14H 2BH 2BH 71H 70H 2BH 36H 4FH 7BH 32H 57H 60H
1090H=7AH 32H 58H 60H AFH 32H 5AH 60H 32H 5BH 60H 32H 5CH 60H 32H 5DH
10A0H=60H C3H 8BH 11H 11H 4CH 60H 7EH E6H 0FH 47H 2BH 7EH 17H 17H 17H
10B0H=17H E6H F0H 80H 12H 1BH 2BH 7EH E6H 0FH 12H 1BH AFH 12H EBH E5H
10C0H=CDH FEH 0DH E1H 23H 70H 23H 71H C5H 23H 36H 00H 23H 36H 06H CDH
10D0H=40H 0EH 21H 52H 60H 3EH 40H 96H 4FH 2BH 3EH 1FH 9EH 47H 2BH 2BH
10E0H=2BH 3AH 03H 60H 77H 2BH 3AH 04H 60H 77H 2BH 71H 2BH 70H CDH 40H
10F0H=0EH CDH 76H 0EH 21H 4AH 60H CDH FEH 0DH D1H 79H C6H 55H 4FH 78H
1100H=CEH 02H 47H C9H 36H 43H C3H 2AH 10H 7BH C6H 03H 5FH C9H 3DH C9H
1110H=3EH 54H C3H 52H 0FH 3EH 51H C3H C2H 0FH 21H 50H 04H 3EH 01H 32H
1120H=5EH 60H C3H D0H 0FH 1AH 77H 23H 13H 05H C2H 25H 11H C9H AFH 3CH
1130H=32H 00H 60H 32H 02H 60H 21H 24H 01H CDH 9DH 07H CDH 1DH 1FH C9H
1140H=21H 04H 01H CDH 9DH 07H 21H 44H 05H CDH 86H 1CH 21H CCH 04H CDH
1150H=86H 1CH 3AH 01H 60H E6H EFH 32H 01H 60H 32H 0AH 70H C3H 64H 0BH
1160H=CDH 15H 15H C3H F7H 0FH 3EH 35H 32H 85H 60H C3H 60H 11H 3AH 0BH
1170H=70H 1FH 1FH D0H 3AH 58H 61H 3CH 32H 58H 61H C9H 21H 0CH 06H CDH
1180H=86H 1CH C3H 47H 0FH 21H 20H 06H C3H 7FH 11H 21H 40H 60H 7EH 06H
```

```
1190H=4FH B8H C2H 34H 12H 21H 44H 60H 7EH B8H C2H 3CH 12H 21H 47H 60H
11A0H=7EH B8H C2H 44H 12H AFH 32H 61H 60H AFH 32H 6CH 60H 32H 6DH 60H
11B0H=3AH 06H 60H E6H 10H C2H B3H 12H 21H 3AH 60H CDH 98H 12H 69H 60H
11C0H=29H 29H E5H 29H D1H 19H 4DH 44H 21H 51H 60H 71H 2BH 70H 2BH AFH
11D0H=77H 2BH 77H 2BH 36H 0AH 2BH 77H CDH A3H 0EH 21H 4BH 60H 3EH 68H
11E0H=96H 5FH 3EH 04H 2BH 9EH EBH 67H 22H 62H 60H 21H 39H 60H CDH 77H
11F0H=12H 22H 66H 60H 21H 4BH 60H 3AH 06H 60H 77H 23H 3AH 05H 60H 77H
1200H=23H 70H 23H 71H CDH 40H 0EH CDH 76H 0EH 21H 4BH 60H CDH FEH 0DH
1210H=60H 69H 22H 68H 60H 21H 0BH 70H 7EH 1FH DAH 18H 12H 23H 5EH 23H
1220H=7EH E6H 0FH 57H 21H 81H 61H 06H 0DH 73H 23H 72H 23H 05H C2H 29H
1230H=12H C3H 80H 1BH 3EH 01H 32H 61H 60H C3H 4CH 12H 3EH 02H 32H 61H
1240H=60H C3H 66H 12H 3EH 04H 32H 61H 60H C3H A9H 11H 21H 3FH 60H CDH
1250H=77H 12H 29H E5H 29H 29H D1H 19H 3AH 40H 60H FEH 46H CCH B9H 12H
1260H=22H 64H 60H C3H A9H 11H 21H 41H 60H CDH 98H 12H 69H 60H 29H 29H
1270H=29H 22H 6AH 60H C3H A9H 11H 7EH E6H 0FH 47H 2BH 7EH 17H 17H 17H
1280H=17H E6H F0H 80H 47H 2BH 7EH E6H 0FH 21H 4CH 60H 70H 2BH 77H 2BH
1290H=AFH 77H CDH FEH 0DH 69H 60H C9H 7EH 17H 17H 17H 17H E6H F0H 47H
12A0H=23H 23H 7EH E6H 0FH 80H 21H 4CH 60H 77H 2BH AFH 77H 2BH 77H CDH
12B0H=FEH 0DH C9H 21H 74H 04H C3H E8H 11H 11H 40H 01H 7DH 93H 6FH 7CH
12C0H=9AH 67H DAH E6H 12H E5H 29H 29H D1H 19H EBH 21H 51H 60H 73H 2BH
12D0H=72H 2BH AFH 77H 2BH 77H 2BH 36H 09H 2BH 77H CDH A3H 0EH 21H 4BH
12E0H=60H 5EH 2BH 56H EBH C9H 21H 00H 00H C9H 21H 0BH 70H 7EH 1FH DAH
12F0H=EDH 12H 23H 4EH 23H 7EH E6H 0FH 47H 2BH 2BH 7EH 1FH DAH EAH 12H
1300H=C5H 21H 52H 60H 71H 2BH 70H 2BH AFH 77H 2BH 77H CDH 76H 0EH 21H
1310H=4DH 60H 7EH 23H 46H 21H 9EH 60H E6H 0FH C6H 30H 77H 23H 78H CDH
1320H=77H 1DH 77H 23H 78H E6H 0FH C6H 30H 77H C1H AFH 32H 6EH 60H 3EH
1330H=F8H 91H 6FH 3EH 02H 98H 67H DCH 4AH 13H 29H 29H E5H 29H D1H 19H
1340H=23H E5H 29H 29H D1H 19H 22H 5FH 60H C9H 7DH 2FH 6FH 7CH 2FH 67H
1350H=23H 3EH 01H 32H 6EH 60H C9H 21H 0AH 70H 7EH 17H DAH 5AH 13H 21H
1360H=0FH 70H 7EH 5FH E6H 0FH 47H 2BH 4EH 21H 0AH 70H 7EH 17H DAH 57H
1370H=13H 3AH 49H 60H FEH 00H CAH 7FH 13H 3EH 1FH 47H 79H 1FH 4FH 21H
1380H=52H 60H 71H 2BH 70H 2BH AFH 77H 2BH 77H CDH 76H 0EH 21H 4DH 60H
1390H=7EH 23H 4EH E6H 0FH C6H 30H 21H 5BH 61H 77H 23H 79H CDH 77H 1DH
13A0H=77H 23H 79H E6H 0FH C6H 30H 77H C9H CDH F2H 14H 21H BCH 05H CDH
13B0H=86H 1DH CDH E9H 09H AFH 32H 49H 60H 21H 4AH 03H 87H 4FH AFH 47H
13C0H=09H 4EH 23H 5EH 53H 21H 62H 02H 09H 01H 73H 60H 7EH 02H 23H 03H
13D0H=1DH C2H CCH 13H 7AH 32H 48H 60H FEH 14H DAH FFH 13H CDH 15H 15H
13E0H=3AH 49H 60H FEH 0AH D0H 3CH 47H FEH 09H C2H F7H 13H 3AH 0BH 60H
13F0H=E6H 10H CAH F6H 13H 04H 78H FEH 0AH CAH B4H 14H C3H B6H 13H E5H
1400H=C5H 3AH 49H 60H FEH 02H CAH A1H 14H FEH 03H CAH 3EH 14H FEH 04H
1410H=CAH 72H 14H 21H BCH 00H D6H 05H 4FH AFH 47H 09H 4EH 23H 7EH 91H
1420H=57H 5FH 21H 29H 60H 09H C1H 7EH 02H 23H 03H 15H C2H 27H 14H E1H
1430H=3AH 48H 60H 83H FEH 14H CAH DDH 13H 7EH 02H C3H DDH 13H 16H 07H
1440H=5AH 3AH 06H 60H 1FH DAH 5AH 14H 1FH DAH 60H 14H 1FH DAH 66H 14H
1450H=1FH DAH 6CH 14H 21H 82H 03H C3H 26H 14H 21H 66H 03H C3H 26H 14H
1460H=21H 6DH 03H C3H 26H 14H 21H 74H 03H C3H 26H 14H 21H 7BH 03H C3H
1470H=26H 14H 16H 09H 5AH 3AH 0BH 60H 17H DAH 8BH 14H 17H DAH 96H 14H
1480H=21H 9BH 03H 3EH 5AH 32H 72H 60H C3H 26H 14H 21H 89H 03H 3EH 2DH
1490H=32H 72H 60H C3H 26H 14H 21H 92H 03H 3EH 43H 32H 72H 60H C3H 26H
14A0H=14H 21H 6FH 60H 16H 03H 5AH C3H 26H 14H 77H 23H 05H C2H AAH 14H
14B0H=CDH 15H 15H C9H 3AH 40H 60H FEH 4FH C2H D1H 14H 3AH 44H 60H FEH
14C0H=4FH C2H E8H 14H 3AH 47H 60H FEH 4FH C2H EDH 14H 3EH 0DH C3H B6H
14D0H=13H 3AH 0BH 60H E6H 0CH CAH E3H 14H 3EH 46H 32H 40H 60H 3EH 0AH
14E0H=C3H B6H 13H 3EH 43H C3H DBH 14H 3EH 0BH C3H B6H 13H 3EH 0CH C3H
14F0H=B6H 13H 21H 0AH 70H 06H 02H 0EH 0AH 7EH E6H 01H C2H F9H 14H 79H
1500H=32H 08H 70H 7EH E6H 01H CAH 03H 15H 3EH 80H 32H 08H 70H 0EH 1BH
1510H=05H C2H F9H 14H C9H 21H 73H 60H 11H 06H 70H 06H 14H 7EH E6H 7FH
1520H=4FH E5H 2AH 9BH 61H 71H 23H 36H 03H 22H 9BH 61H 21H 0AH 70H 7EH
1530H=E6H 01H C2H 2FH 15H 79H 12H 7EH E6H 01H CAH 37H 15H 3EH 80H 12H
1540H=E1H 23H 05H C2H 1DH 15H C9H F5H C5H D5H E5H 11H 01H 00H 21H 90H
1550H=FFH 3AH 0AH 70H E6H 20H CAH 63H 16H 19H D2H 51H 15H 3AH 5CH 60H
1560H=1FH DAH 6DH 16H 1FH DAH 86H 16H 3EH 01H 32H 0BH 70H 3EH 04H 32H
1570H=5BH 60H 3EH 19H 32H 89H 60H 21H A4H 03H 11H 73H 60H 06H 05H CDH
1580H=5AH 16H 11H 7DH 60H 3AH 21H 60H 12H 13H 7EH 12H 23H 13H 3AH 17H
1590H=60H FEH 30H C2H 98H 15H 3EH 20H 12H 13H 3AH 18H 60H 12H 13H 7EH
15A0H=12H 32H 7EH 60H 23H 13H 3AH 1AH 60H 12H 13H 06H 04H CDH 5AH 16H
```

| | | | | | | | | | | | | | |
|---|---|---|---|---|---|---|---|---|---|---|---|---|---|
| 15B0H= | 21H | 13H | 70H | 36H | 14H | 21H | 10H | 70H | 3AH | 72H | 60H | 77H | 21H | 17H | 70H | 36H |
| 15C0H= | E4H | 2BH | 36H | 20H | 36H | FDH | 3AH | 0BH | 60H | E6H | F0H | FEH | 20H | C2H | DFH | 15H |
| 15D0H= | 21H | 90H | 61H | 46H | 2BH | 4EH | CDH | 0BH | 1DH | 2AH | 8FH | 61H | C3H | E2H | 15H | 2AH |
| 15E0H= | 93H | 60H | EBH | 21H | A4H | 60H | 73H | 23H | 72H | 23H | 3AH | 95H | 60H | FEH | 01H | CAH |
| 15F0H= | F3H | 15H | DAH | FDH | 15H | 73H | 23H | 72H | 23H | 73H | 23H | 72H | 23H | 22H | A2H | 60H |
| 1600H= | 2AH | 5DH | 60H | 1FH | DAH | 18H | 16H | 21H | 11H | 70H | 3AH | 5EH | 61H | 32H | 53H | 60H |
| 1610H= | 77H | 3AH | 5FH | 61H | 32H | 54H | 60H | 77H | CDH | 15H | 15H | 3AH | 61H | 60H | 1FH | 1FH |
| 1620H= | DAH | 2EH | 16H | 3AH | 01H | 60H | F6H | 20H | 32H | 01H | 60H | 32H | 0AH | 70H | 11H | 01H |
| 1630H= | 00H | 21H | 94H | FCH | 19H | D2H | 34H | 16H | 3EH | 4DH | 32H | 19H | 60H | 32H | 75H | 60H |
| 1640H= | 3EH | 4CH | 32H | 1AH | 60H | 32H | 76H | 60H | 3EH | 20H | 32H | 1BH | 60H | 3AH | 89H | 60H |
| 1650H= | 30H | E1H | D1H | C1H | F1H | F1H | FBH | C3H | 9CH | 1CH | 7EH | 12H | 23H | 13H | 05H | C2H |
| 1660H= | 5AH | 16H | C9H | 3AH | 89H | 60H | 30H | E1H | D1H | C1H | F1H | FBH | C9H | 2AH | 6AH | 60H |
| 1670H= | EBH | 21H | 13H | 70H | 36H | 34H | 21H | 10H | 70H | 73H | 72H | 11H | 01H | 00H | 21H | 94H |
| 1680H= | FCH | 19H | D2H | 81H | 16H | C3H | 63H | 16H | 21H | 13H | 70H | 36H | 00H | 21H | 10H | 70H |
| 1690H= | 5EH | 56H | 2AH | 6AH | 60H | 7DH | 93H | 4FH | 7CH | 9AH | 47H | 21H | 4BH | 60H | 36H | 05H |
| 16A0H= | 23H | 36H | 00H | 23H | 70H | 23H | 71H | CDH | 40H | 0EH | CDH | 76H | 0EH | 21H | 08H | 05H |
| 16B0H= | 11H | 73H | 60H | 06H | 14H | CDH | 5AH | 16H | 21H | 4CH | 60H | 46H | 23H | 7EH | E6H | F0H |
| 16C0H= | FEH | 40H | DAH | 04H | 17H | 78H | CDH | 77H | 1DH | 21H | 81H | 60H | 77H | 23H | 23H | 78H |
| 16D0H= | E6H | 0FH | C6H | 30H | 77H | CDH | 15H | 15H | 21H | 1BH | 60H | 11H | 79H | 60H | CDH | 0CH |
| 16E0H= | 17H | CDH | B0H | 20H | CDH | EDH | 22H | 21H | 8CH | 04H | 11H | 80H | 60H | CDH | 0CH | 17H |
| 16F0H= | CDH | 15H | 15H | 21H | 1BH | 60H | 11H | 6EH | 61H | CDH | 0CH | 17H | E1H | D1H | C1H | F1H |
| 1700H= | F1H | C3H | 32H | 23H | 78H | C6H | 01H | 27H | 47H | C3H | C5H | 16H | 06H | 07H | 7EH | 12H |
| 1710H= | 23H | 13H | 05H | C2H | 0EH | 17H | C9H | 00H | 6DH | DDH | 00H | 00H | 5BH | 8DH | 80H | 8DH |
| 1720H= | 20H | 10H | 27H | F5H | C5H | D5H | E5H | CDH | E3H | 1AH | 3AH | 0AH | 70H | E6H | 04H | CAH |
| 1730H= | A6H | 19H | AFH | 32H | 00H | 60H | 32H | 6DH | 60H | 32H | 6CH | 60H | CDH | 52H | 1EH | 3AH |
| 1740H= | 5BH | 60H | 1FH | DAH | 2DH | 19H | 1FH | DAH | 5BH | 19H | 1FH | DAH | 7AH | 17H | 3EH | 09H |
| 1750H= | 32H | 89H | 60H | 3AH | 59H | 60H | 5FH | 3AH | 53H | 60H | 83H | 5FH | 3AH | 54H | 60H | CEH |
| 1760H= | 00H | 57H | 3AH | 09H | 60H | 93H | 3AH | 0AH | 60H | 9AH | DAH | 9DH | 18H | 21H | 11H | 70H |
| 1770H= | 7BH | 73H | 32H | 53H | 60H | 7AH | 72H | 32H | 54H | 60H | 2AH | 96H | 60H | 23H | 22H | 96H |
| 1780H= | 60H | 22H | 1AH | 70H | 7DH | FEH | 0CH | C2H | 97H | 17H | 7CH | FEH | 00H | C2H | 97H | 17H |
| 1790H= | 32H | 5BH | 60H | 3CH | 32H | 5AH | 60H | 3AH | 0BH | 60H | E6H | 30H | FEH | 20H | C2H | B7H |
| 17A0H= | 17H | 7DH | FEH | C0H | C2H | B7H | 17H | 7CH | FEH | 03H | C2H | B7H | 17H | 3EH | 37H | 32H |
| 17B0H= | 59H | 60H | 21H | 10H | 70H | 36H | 51H | 3AH | 98H | 60H | 3CH | 32H | 98H | 60H | FEH | 0CH |
| 17C0H= | C2H | 90H | 18H | 3AH | 0BH | 60H | E6H | F0H | FEH | 20H | C2H | D3H | 17H | 2AH | 99H | 61H |
| 17D0H= | C3H | D6H | 17H | 2AH | 93H | 60H | EBH | 2AH | A2H | 60H | 73H | 23H | 72H | 23H | 22H | A2H |
| 17E0H= | 60H | AFH | 32H | 98H | 60H | 3AH | 95H | 60H | 3CH | 27H | 32H | 95H | 60H | FEH | 05H | CCH |
| 17F0H= | A8H | 18H | 3AH | 99H | 60H | 3DH | 32H | 99H | 60H | C2H | 90H | 18H | 3AH | 95H | 60H | 47H |
| 1800H= | CDH | 77H | 1DH | FEH | 30H | C2H | 0AH | 18H | 3EH | 20H | 32H | 73H | 60H | 78H | E6H | 0FH |
| 1810H= | C6H | 30H | 32H | 74H | 60H | 3EH | 0AH | 32H | 99H | 60H | 21H | 17H | 70H | 36H | 80H | 2BH |
| 1820H= | 5EH | 56H | 3EH | 20H | 93H | 5FH | 3EH | FDH | 9AH | 57H | 21H | 4CH | 60H | 72H | 23H | 73H |
| 1830H= | 23H | E5H | 2AH | 9AH | 60H | EBH | E1H | 06H | 04H | 1AH | 77H | 23H | 13H | 05H | C2H | 39H |
| 1840H= | 18H | CDH | A3H | 0EH | 21H | 4AH | 60H | 46H | 23H | 4EH | 21H | 4FH | 60H | AFH | 77H | 23H |
| 1850H= | 77H | 23H | 70H | 23H | 71H | CDH | 76H | 0EH | 21H | 4DH | 60H | 46H | 23H | 4EH | 79H | E6H |
| 1860H= | 0FH | FEH | 04H | D4H | 22H | 19H | 78H | CDH | 77H | 1DH | FEH | 30H | C2H | 71H | 18H | 3EH |
| 1870H= | 20H | 32H | 7FH | 60H | 78H | E6H | 0FH | C6H | 30H | 32H | 80H | 60H | 79H | CDH | 77H | 1DH |
| 1880H= | 32H | 82H | 60H | 21H | 17H | 70H | 36H | B4H | 2BH | 36H | 20H | 36H | FDH | CDH | 15H | 15H |
| 1890H= | 3AH | 89H | 60H | 30H | CDH | F4H | 1AH | E1H | D1H | C1H | F1H | FBH | C9H | 3AH | 09H | 60H |
| 18A0H= | 5FH | 3AH | 0AH | 60H | 57H | C3H | 6DH | 17H | 21H | 73H | 60H | 36H | 20H | 23H | 36H | 35H |
| 18B0H= | 21H | 17H | 70H | 36H | 80H | 2BH | 4EH | 46H | 3EH | 20H | 91H | 4FH | 3EH | FDH | 98H | 47H |
| 18C0H= | 21H | 4BH | 60H | 70H | 23H | 71H | 23H | E5H | 2AH | 9CH | 60H | 5EH | 23H | 56H | E1H | 72H |
| 18D0H= | 23H | 73H | CDH | 40H | 0EH | CDH | 76H | 0EH | 3EH | 20H | 32H | 7FH | 60H | 21H | 4AH | 60H |
| 18E0H= | 7EH | E6H | 0FH | C6H | 30H | FEH | 30H | C2H | ECH | 18H | 3EH | 20H | 32H | 80H | 60H | 23H |
| 18F0H= | 7EH | CDH | 77H | 1DH | 32H | 81H | 60H | 7EH | E6H | 0FH | C6H | 30H | 21H | 82H | 60H | 77H |
| 1900H= | 23H | 36H | 20H | 23H | 36H | 53H | 23H | 36H | 45H | 23H | 36H | 43H | CDH | 15H | 15H | 21H |
| 1910H= | 81H | 60H | 36H | 2EH | 23H | 23H | 36H | 4DH | 23H | 36H | 4CH | 23H | 36H | 2FH | 23H | 36H |
| 1920H= | 4DH | C9H | 79H | C6H | 10H | 27H | 4FH | 78H | CEH | 00H | 27H | 47H | C9H | CDH | 77H | 19H |
| 1930H= | 2AH | 96H | 60H | 3EH | 74H | 95H | C2H | 90H | 18H | 3EH | 04H | 9CH | C2H | 90H | 18H | 21H |
| 1940H= | F4H | 04H | 11H | 73H | 60H | 06H | 14H | CDH | CCH | 19H | 21H | 1CH | 60H | 11H | 7AH | 60H |
| 1950H= | 06H | 0BH | CDH | CCH | 19H | CDH | 15H | 15H | C3H | 90H | 18H | CDH | 77H | 19H | 21H | 13H |
| 1960H= | 70H | 36H | 34H | 21H | 10H | 70H | 36H | E7H | 36H | 12H | 11H | 01H | 00H | 21H | 94H | FCH |
| 1970H= | 19H | D2H | 70H | 19H | C3H | 90H | 18H | 2AH | 96H | 60H | 23H | 22H | 96H | 60H | 22H | 1AH |
| 1980H= | 70H | 3AH | 98H | 60H | 3CH | 32H | 98H | 60H | FEH | 0CH | C0H | 2AH | 93H | 60H | EBH | 2AH |
| 1990H= | A2H | 60H | 73H | 23H | 72H | 23H | 22H | A2H | 60H | AFH | 32H | 98H | 60H | 3AH | 95H | 60H |
| 19A0H= | 3CH | 27H | 32H | 95H | 60H | C9H | 21H | 44H | 05H | CDH | 86H | 1CH | 21H | E0H | 04H | CDH |
| 19B0H= | 86H | 1CH | E1H | D1H | C1H | F1H | F1H | 21H | 11H | 70H | 36H | 00H | 36H | 40H | 3AH | 01H |
| 19C0H= | 60H | E6H | 8FH | 32H | 01H | 60H | 32H | 0AH | 70H | C3H | 64H | 0BH | 7EH | 12H | 23H | 13H |

```
19D0H=05H C2H CCH 19H C9H F5H C5H D5H E5H CDH E3H 1AH 3AH 5AH 60H 1FH
19E0H=DAH 05H 1BH 1FH DAH 51H 1BH 1FH DAH 59H 1BH 3AH 87H 60H 4FH 3AH
19F0H=88H 60H 47H 3AH 57H 60H 91H 4FH 3AH 58H 60H 98H 47H F5H DCH 80H
1A00H=1AH 21H 4BH 60H 70H 23H 71H 23H 3AH 06H 60H 77H 23H 3AH 05H 60H
1A10H=77H CDH 40H 0EH CDH 76H 0EH 21H 4BH 60H CDH FEH 0DH F1H DAH 88H
1A20H=1AH 3AH 52H 60H 91H 4FH 3AH 54H 60H 98H 47H DAH A0H 1AH 3AH 07H
1A30H=60H 91H 3AH 08H 60H 98H D2H A0H 1AH 21H 11H 70H 79H 32H 53H 60H
1A40H=77H 78H 32H 54H 60H 77H CDH 8EH 29H 3AH 55H 60H C6H 01H 32H 55H
1A50H=60H 4FH 3AH 56H 60H CEH 00H 32H 56H 60H 47H 3EH 3CH B9H C2H 67H
1A60H=1AH 3EH 00H B8H CAH B6H 1AH 3EH 2CH B9H C2H 73H 1AH 3EH 01H B8H
1A70H=CAH BEH 1AH 3AH 89H 60H 30H CDH F4H 1AH E1H D1H C1H F1H FBH C9H
1A80H=79H 2FH 4FH 78H 2FH 47H 03H C9H 3AH 53H 60H 81H 4FH 3AH 54H 60H
1A90H=88H 47H 3AH 09H 60H 91H 3AH 0AH 60H 98H DAH ABH 1AH C3H 39H 1AH
1AA0H=3AH 07H 60H 4FH 3AH 08H 60H 47H C3H 39H 1AH 3AH 09H 60H 4FH 3AH
1AB0H=0AH 60H 47H C3H 39H 1AH 3EH 1AH 32H 89H 60H C3H 73H 1AH 21H 11H
1AC0H=70H 3AH 5EH 61H 32H 53H 60H 77H 3AH 60H 61H 32H 57H 60H 3AH 5FH
1AD0H=61H 32H 54H 60H 77H 3AH 61H 61H 32H 58H 60H 3EH 01H 32H 5DH 60H
1AE0H=C3H 73H 1AH 21H 4AH 60H 11H 8AH 60H 06H 09H 7EH 12H 23H 13H 05H
1AF0H=C2H E8H 1AH C9H 21H 4AH 60H 11H 8AH 60H 06H 09H 1AH 77H 23H 13H
1B00H=05H C2H FCH 1AH C9H CDH 8EH 29H 3AH 6CH 60H 3CH FEH 1BH CAH 5CH
1B10H=1BH 32H 6CH 60H 3AH 59H 60H 47H 3AH 53H 60H 90H 5FH 3AH 54H 60H
1B20H=0EH 00H 57H DAH 46H 1BH 3AH 07H 60H 93H 3AH 08H 60H 9AH D2H 46H
1B30H=1BH 21H 11H 70H 7BH 73H 32H 53H 60H 7AH 72H 32H 54H 60H 3EH 19H
1B40H=32H 89H 60H C3H 73H 1AH 3AH 07H 60H 5FH 3AH 08H 60H 57H C3H 31H
1B50H=1BH E1H D1H C1H F1H C1H C3H 65H 24H C3H 88H 16H 3AH 6DH 60H 3CH
1B60H=FEH 36H CAH 68H 1BH 32H 6DH 60H C3H 73H 1AH 21H 78H 04H CDH 86H
1B70H=1CH CDH C3H 1EH AFH 32H 56H 60H E1H D1H C1H F1H F1H C3H 56H 1CH
1B80H=3EH 1BH 32H 89H 60H 30H FBH 3EH 0AH 32H 99H 60H 2AH 96H 60H 22H
1B90H=1AH 70H CDH 4AH 0AH 3AH 0BH 60H E6H 10H C2H 97H 1CH 3EH 21H 32H
1BA0H=09H 70H CDH 4EH 08H 17H DAH AFH 1BH 1FH FEH 14H CAH 56H 1CH 0EH
1BB0H=03H 3AH 55H 60H 5FH 3AH 56H 60H 57H 7AH D6H 06H DAH C0H 1BH 57H
1BC0H=3FH 78H 17H 47H AFH 7BH 17H 5FH 7AH 17H 57H 0DH C2H B9H 1BH 21H
1BD0H=52H 60H 70H AFH 2BH 77H 2BH 77H CDH 76H 0EH 21H 4DH 60H
1BE0H=7EH C6H 30H 32H 17H 60H 23H 7EH CDH 1DH 32H 18H 60H 7EH E6H
1BF0H=0FH C6H 30H 32H 1AH 60H CDH 0AH 1CH CDH B2H 1CH CDH 3DH 0BH 3AH
1C00H=56H 60H FEH 06H CAH 56H 1CH C3H 92H 1BH 21H 0AH 70H 7EH 17H DAH
1C10H=0DH 1CH 21H 0FH 70H 7EH E6H 0FH 47H 2BH 4EH 21H 0AH 70H 7EH E6H
1C20H=80H C2H 0AH 1CH 78H 32H 88H 60H 79H 32H 87H 60H 21H 52H 60H 71H
1C30H=2BH 70H 2BH AFH 77H 2BH 77H CDH 76H 0EH 21H 4DH 60H 7EH E6H 0FH
1C40H=C6H 30H 32H 23H 60H 23H 7EH CDH 77H 1DH 32H 24H 60H 7EH E6H 0FH
1C50H=C6H 30H 32H 25H 60H C9H F3H 21H 11H 70H 36H 00H 36H 40H 3AH 01H
1C60H=60H E6H 8FH 32H 01H 60H 32H 0AH 70H 21H 04H 01H CDH 9DH 07H 21H
1C70H=44H 05H CDH 86H 1CH 3AH 56H 60H FEH 06H C2H 64H 0BH 21H 58H 05H
1C80H=CDH 86H 1CH C3H 64H 0BH 01H 73H 60H 16H 14H 7EH 02H 23H 03H 15H
1C90H=C2H 8BH 1CH CDH 15H 15H C9H 3EH 51H C3H 9FH 1BH CDH 4EH 08H 17H
1CA0H=DAH A9H 1CH 1FH FEH 14H CAH 56H 1CH CDH 42H 24H CDH 66H 1FH C3H
1CB0H=9CH 1CH 21H 0BH 70H 7EH 1FH DAH B5H 1CH 23H 4EH 23H 7EH 5FH E6H
1CC0H=0FH 47H 2BH 2BH 7EH 1FH DAH B2H 1CH 3AH A1H 60H 1FH DAH DCH 1CH
1CD0H=7BH E6H 10H C2H 40H 1EH 7BH E6H 20H CAH 4CH 1EH CDH 80H 1DH 79H
1CE0H=32H 93H 60H 32H 81H 61H 78H 32H 94H 60H 32H 82H 61H 3AH 0BH 60H
1CF0H=E6H F0H FEH 20H CCH 88H 29H 3AH 5CH 60H 17H DAH 0BH 1DH 69H 60H
1D00H=3AH 0BH 60H E6H 0CH C4H 0AH 1EH 22H 18H 70H 3AH 0BH 60H E6H 0CH
1D10H=CAH 65H 1DH 21H 4BH 60H 36H 00H 23H 36H 12H 23H 70H 23H 71H CDH
1D20H=40H 0EH 21H 52H 60H 7EH C6H 80H 77H 2BH 7EH CEH 0CH 77H 2BH 7EH
1D30H=CEH 00H 77H CDH 76H 0EH 21H 4CH 60H 11H 1CH 60H 7EH E6H 0FH C6H
1D40H=30H 12H 32H 78H 60H 23H 13H 7EH CDH 77H 1DH 12H 32H 79H 60H 13H
1D50H=7EH E6H 0FH C6H 30H 12H 32H 7AH 60H 23H 13H 13H 7EH CDH 77H 1DH
1D60H=12H 32H 7CH 60H C9H 21H 4EH 60H 36H 00H 23H 36H 0AH 23H 70H 23H
1D70H=71H CDH 40H 0EH C3H 33H 1DH 1FH 1FH 1FH 1FH E6H 0FH C6H 30H C9H
1D80H=3AH 0BH 60H 57H E6H 05H C2H D5H 1DH 7AH E6H 0AH C2H 01H 1EH 3AH
1D90H=5EH 60H 1FH D8H C5H 3EH AAH 81H 4FH 3EH 0AH 88H 47H 2AH 5FH 60H
1DA0H=EBH 21H 4BH 60H 70H 23H 71H 23H 72H 23H 73H CDH 40H 0EH CDH 76H
1DB0H=0EH 21H 4AH 60H 46H 22H 4EH 23H 71H 2BH 70H 2BH AFH 77H CDH FEH
1DC0H=0DH D1H 3AH 6EH 60H 1FH DCH D0H 1DH 7BH 81H 4FH 7AH 88H 47H C9H
1DD0H=79H 2FH 4FH 78H 2FH 47H 03H C9H 69H 60H 29H 09H C5H EBH 21H 51H
1DE0H=60H 73H 2BH 72H 2BH 36H 00H 2BH 36H 00H 2BH 36H E8H 2BH 36H 03H
```

```
1DF0H=CDH A3H 0EH 21H 4BH 60H 7EH C1H 81H 4FH 78H CEH 00H 47H C3H 8FH
1E00H=1DH 69H 60H 29H 29H 29H 29H C3H DCH 1DH C5H 21H 4BH 60H 11H E2H
1E10H=04H 72H 23H 73H 23H 70H 23H 71H CDH 40H 0EH 21H 52H 60H 7EH 2BH
1E20H=46H 77H 2BH 7EH 70H 2BH 46H 77H 2BH 70H 2BH 11H 6DH 05H 73H 2BH
1E30H=72H CDH A3H 0EH 21H 4AH 60H 56H 23H 5EH 21H A0H 00H 19H C1H C9H
1E40H=21H E4H 05H CDH 86H 1CH 31H FFH 23H 56H 1CH 21H F8H 05H
1E50H=43H 1EH 3AH 00H 60H 6EH 01H CAH 8AH 1EH 21H 0AH 70H 7EH E6H 02H
1E60H=CAH 63H 1EH 3AH 01H 60H 4FH E6H 0FH 17H 57H E6H 10H CAH 78H 1EH
1E70H=7AH E6H 08H CAH 85H 1EH 16H 09H 79H E6H F0H 82H 32H 01H 60H 32H
1E80H=0AH 70H C3H ABH 1EH 16H 03H C3H 78H 1EH 21H 0AH 70H 7EH E6H 04H
1E90H=CAH 93H 1EH 3AH 01H 60H 4FH E6H 0FH 1FH 57H D2H 78H 1EH E6H 01H
1EA0H=CAH A6H 1EH C3H 76H 1EH 16H 0CH C3H 78H 1EH 11H 01H 00H 3AH 02H
1EB0H=60H 1FH DAH BDH 1EH 21H 00H F4H 19H D2H B8H 1EH C9H 21H 10H FDH
1EC0H=C3H E8H 1EH AFH 3CH 32H 00H 60H 32H 02H 60H CDH 1DH 1FH AFH 32H
1ED0H=00H 60H 32H 02H 60H CDH 2CH 1FH 06H 18H 1EH 01H D5H CDH 52H 1EH
1EE0H=3AH 0AH 70H E6H 10H C2H FDH 1EH D1H 1CH 05H C2H DCH 1EH 3CH 32H
1EF0H=00H 60H CDH 1DH 1FH AFH 32H 00H 60H CDH 2CH 1FH C9H D1H 7BH 32H
1F00H=96H 60H FEH 0CH CAH 3BH 1FH DAH 44H 1FH D6H 0CH FEH 0CH CAH 4BH
1F10H=1FH 32H 98H 60H 3EH 01H 32H 95H 60H CDH 2CH 1FH C9H 3AH 0AH 70H
1F20H=E6H 02H C8H CDH 52H 1EH CDH 54H 1FH C3H 1DH 1FH 3AH 0AH 70H E6H
1F30H=10H C8H CDH 52H 1EH CDH 54H 1FH C3H 2CH 1FH 3EH 01H 32H 95H 60H
1F40H=CDH 2CH 1FH C9H 32H 98H 60H CDH 2CH 1FH C9H 3EH 02H 32H 95H 60H
1F50H=CDH 2CH 1FH C9H CDH 4EH 08H 17H D8H 1FH FEH 14H CAH 60H 1FH C9H
1F60H=F1H F1H F1H C3H 56H 1CH 3AH 61H 60H 1FH DAH 80H 1FH 1FH DAH 97H
1F70H=1FH 1FH DAH A2H 1FH CDH C8H 1FH D8H CDH D4H 1FH F1H C3H C0H 21H
1F80H=CDH C8H 1FH DAH 8DH 1FH CDH D4H 1FH F1H C3H 12H 21H CDH 55H 21H
1F90H=CAH A0H 23H D2H A0H 23H C9H CDH C8H 1FH D8H CDH D4H 1FH F1H C3H
1FA0H=F3H 21H 3AH 95H 60H 47H 21H 45H 60H 7EH 17H 17H 17H E6H F0H
1FB0H=4FH 23H 7EH E6H 0FH 81H 90H CAH A0H 23H DAH A0H 23H CDH C8H 1FH
1FC0H=D8H CDH D4H 1FH F1H C3H 76H 21H 2AH 96H 60H EBH 2AH 62H 60H 7BH
1FD0H=95H 7AH 9CH C9H F3H 2AH 68H 60H 3AH 36H 60H FEH 2DH CAH 84H 20H
1FE0H=3AH 53H 60H 95H 4FH 3AH 54H 60H 9CH 47H DCH 72H 20H CDH 5BH 20H
1FF0H=2AH 66H 60H 3AH 87H 60H 85H 32H 57H 60H 3AH 88H 60H 8CH 32H 58H
2000H=60H 21H 17H 70H 36H B4H 2BH 36H FFH 36H FFH 21H 11H 70H 79H 71H
2010H=32H 53H 60H 78H 70H 32H 54H 60H AFH 32H 55H 60H 21H 00H 00H 22H
2020H=6CH 61H 3AH 01H 60H F6H 40H 32H 01H 60H 32H 0AH 70H 21H 21H 60H
2030H=11H 7FH 60H 06H 06H CDH 06H 21H CDH B0H 20H 3EH 20H 06H 05H 21H
2040H=80H 60H 77H 23H 05H C2H 42H 20H 36H 46H 23H 36H 48H CDH 15H 15H
2050H=11H 01H 00H 21H 94H FCH 19H D2H 56H 20H C9H 3AH 07H 60H 91H 3AH
2060H=08H 60H 98H D2H 72H 20H 3AH 09H 60H 91H 3AH 0AH 60H 98H DAH 7BH
2070H=20H C9H 3AH 07H 60H 4FH 3AH 08H 60H 47H C9H 3AH 09H 60H 4FH 3AH
2080H=0AH 60H 47H C9H 3AH 53H 60H 85H 4FH 3AH 54H 60H 8CH 47H CDH 5BH
2090H=20H 2AH 66H 60H 3AH 87H 60H 95H 6FH 3AH 88H 60H 9CH 67H DCH ACH
20A0H=20H 7DH 32H 57H 60H 7CH 32H 58H 60H C3H 01H 20H 21H 0AH 00H C9H
20B0H=2AH 96H 60H 29H E5H 29H 29H D1H 19H EBH 21H 51H 60H AFH 73H 2BH
20C0H=72H 2BH 77H 2BH 77H 2BH 36H 0CH 2BH 77H CDH A3H 0EH 21H 4AH 60H
20D0H=4EH 23H 4EH C5H 21H 52H 60H 71H 2BH 70H AFH 2BH 77H 2BH 77H CDH
20E0H=76H 0EH 21H 4EH 60H 4EH 2BH 7EH C6H 30H 21H 73H 60H 77H 23H 79H
20F0H=CDH 77H 10H 77H 23H 36H 2EH 23H 79H E6H 0FH C6H 30H 77H 23H 36H
2100H=4DH 23H 36H 4CH C1H C9H 7EH 12H 2BH 1BH 05H C2H 06H 21H 3EH 20H
2110H=12H C9H AFH 32H 5AH 60H 3CH 32H 5BH 60H 3EH 19H 32H 89H 60H 30H
2120H=FBH CDH 42H 24H CDH 79H 22H CDH 4EH 08H 17H DAH 39H 21H 1FH FEH
2130H=14H CAH 56H 1CH FEH 18H CCH 49H 21H CDH 55H 21H CAH A0H 23H D2H
2140H=A0H 23H AFH 32H 55H 60H C3H 21H 21H 3AH 01H 60H E6H BFH 32H 01H
2150H=60H 32H 0AH 70H C9H 2AH 64H 60H EBH 3AH 0BH 60H E6H F0H FEH 20H
2160H=C2H 69H 21H 2AH 99H 61H C3H 71H 21H 3AH 93H 60H 6FH 3AH 94H 60H
2170H=67H 7DH 93H 7CH 9AH C9H AFH 32H 5AH 60H 3CH 32H 5BH 60H 3EH 19H
2180H=32H 89H 60H 30H FBH CDH 42H 24H CDH 79H 22H CDH 4EH 08H 17H DAH
2190H=90H 21H 1FH FEH 14H CAH 56H 1CH FEH 18H CCH 49H 21H 21H 45H 60H
21A0H=46H 23H 7EH E6H 0FH 4FH 78H 17H 17H 17H 17H E6H F0H 81H 47H 3AH
21B0H=95H 60H 90H CAH A0H 23H D2H A0H 23H AFH 32H 55H 60H C3H 85H 21H
21C0H=AFH 32H 5AH 60H 3CH 32H 5BH 60H 3EH 19H 32H 89H 60H 30H FBH CDH
21D0H=4EH 08H 17H DAH E6H 21H 1FH FEH 14H CAH 56H 1CH FEH 17H CAH 32H
21E0H=23H FEH 19H CCH 49H 21H CDH 42H 24H CDH 79H 22H AFH 32H 55H 60H
21F0H=C3H CFH 21H AFH 32H 5AH 60H 3CH 32H 5BH 60H 3EH 19H 32H 89H 60H
2200H=30H FBH AFH 32H 55H 60H CDH 57H 22H CDH 42H 24H 21H 17H 70H 36H
2210H=80H 2BH 7EH 56H D6H A7H 7AH DEH FDH D2H 02H 22H F3H 3EH 01H 32H
```

```
2220H= 5CH 60H 07H 07H 32H 5AH 60H 2AH 6AH 60H EBH 21H 13H 70H 36H 34H
2230H= 21H 10H 70H 73H 72H 11H 01H 00H 21H 94H FCH 19H D2H 3BH 22H 3EH
2240H= 18H 32H 89H 60H 30H FBH CDH 57H 22H FEH 17H CAH 6CH 22H CDH 42H
2250H= 24H CDH 79H 22H C3H 46H 22H CDH 4EH 08H 17H D8H 1FH FEH 14H CAH
2260H= 68H 22H FEH 18H CCH 49H 21H C9H F1H C3H 56H 1CH F3H 3EH 02H 32H
2270H= 5CH 60H 3EH 18H 30H FBH C3H 46H 22H 2AH 6CH 61H EBH 3AH 0BH 60H
2280H= E6H F0H FEH 20H C2H 8DH 22H 2AH 99H 61H C3H 90H 22H 2AH 93H 60H
2290H= 7DH 93H 5FH 7CH 9AH D2H D3H 22H 7BH C6H 09H D2H CCH 22H 21H 17H
22A0H= 70H 36H 80H 2BH 7EH 56H D6H 5FH 7AH DEH 73H D0H F3H 21H 11H 70H
22B0H= 36H 00H 36H 40H 3AH 01H 60H E6H BFH 32H 01H 60H 32H 0AH 70H CDH
22C0H= 12H 23H 21H C0H 03H CDH 86H 1CH F1H C3H F4H 23H F1H CDH 12H 23H
22D0H= C3H 32H 23H 22H 6CH 61H 21H 1BH 60H 11H 6EH 61H 06H 07H CDH E4H
22E0H= 22H C3H 9EH 22H 7EH 12H 23H 13H 05H C2H E4H 22H C9H 21H 78H 61H
22F0H= 11H 73H 60H 1AH 77H 23H 13H 1AH 77H 23H 13H 13H 1AH 77H 2AH A2H
2300H= 60H 22H 7BH 61H 3AH 93H 60H 77H 23H 3AH 94H 60H 77H 23H 22H A2H
2310H= 60H C9H 21H 6EH 61H 11H 79H 60H 06H 07H CDH E4H 22H CDH B0H 20H
2320H= CDH EDH 22H 21H D4H 03H 11H 80H 60H 06H 07H CDH E4H 22H CDH 15H
2330H= 15H C9H F3H 21H 17H 70H 36H 80H 2BH 5EH 56H 21H 11H 70H 36H 00H
2340H= 36H 40H 3AH 01H 60H E6H BFH 32H 01H 60H 32H 0AH 70H 3EH FFH 93H
2350H= 5FH 3EH FFH 9AH 57H 21H 4BH 60H 36H 05H 23H 36H 6DH 23H 72H 23H
2360H= 73H CDH 40H 0EH CDH 76H 0EH 21H 4BH 60H 7EH 47H CDH 77H 1DH 21H
2370H= 73H 60H 77H 23H 36H 2EH 23H 78H E6H 0FH C6H 30H 77H 23H EBH 21H
2380H= AFH 03H 06H 11H 7EH 12H 23H 13H 05H C2H 84H 23H 3AH 61H 60H 1FH
2390H= 1FH DCH 9AH 23H CDH 15H 15H C3H F4H 23H 21H 85H 60H 36H 44H C9H
23A0H= F3H CDH 42H 24H 2AH 93H 60H 25H 22H 18H 70H 21H 11H 70H 36H 00H
23B0H= 36H 40H 3AH 01H 60H E6H 8FH 32H 01H 60H 32H 0AH 70H 21H 6CH 05H
23C0H= CDH 86H 1CH CDH B0H 20H AFH 32H 0BH 70H 21H 79H 60H 3EH 20H 06H
23D0H= 0EH 77H 23H 05H C2H D1H 23H 21H 1CH 60H 11H 7DH 60H 06H 06H CDH
23E0H= EBH 23H CDH 15H 15H CDH C3H 1EH C3H 64H 0BH 7EH 12H 23H 13H 05H
23F0H= C2H EBH 23H C9H 3EH 02H 32H 5BH 60H 32H 5AH 60H CDH 49H 21H 3AH
2400H= 01H 60H E6H EFH 32H 01H 60H 32H 0AH 70H 21H 13H 70H 36H 34H 21H
2410H= 10H 70H 36H 5AH 36H 1CH 3EH 80H 32H 5CH 60H 11H 01H 00H 21H 94H
2420H= FCH 19H D2H 21H 24H 3EH 19H 22H 89H 60H 30H FBH CDH 8EH 29H CDH
2430H= 42H 24H CDH 4EH 08H 17H DAH 2CH 24H 1FH FEH 14H CAH 61H 24H C3H
2440H= 2CH 24H CDH B2H 1CH CDH 0AH 1CH CDH 4AH 0AH 3AH 95H 60H 47H CDH
2450H= 77H 1DH 32H 17H 60H 78H E6H 0FH C6H 30H 32H 18H 60H CDH 3DH 0BH
2460H= C9H F3H C3H 65H 24H 2AH 93H 60H 22H 18H 70H CDH B0H 20H C5H 21H
2470H= 73H 60H 46H 36H 20H 23H 4EH 70H 23H 71H 23H 46H 36H 2EH 23H 70H
2480H= 23H EBH 21H D8H 03H 06H 0FH CDH ADH 25H 3AH 01H 60H E6H DFH 32H
2490H= 01H 60H 32H 0AH 70H AFH 32H 0BH 70H CDH C3H 1EH 21H D4H 00H CDH
24A0H= 3DH 07H CDH 4AH 0AH CDH 4EH 08H 17H DAH A2H 24H 1FH FEH 0AH DAH
24B0H= BFH 24H FEH 16H CAH CFH 24H FEH 14H CAH CFH 24H C3H A2H 24H C6H
24C0H= 30H 21H 24H 60H 46H 77H 2BH 2BH 70H CDH 3DH 0BH C3H A2H 24H 21H
24D0H= 74H 60H 36H 20H 23H EBH 21H 22H 60H 7EH 12H E6H 0FH 47H 23H 23H
24E0H= 13H 13H 7EH 12H E6H 0FH 4FH C5H 21H EAH 03H 11H 7EH 60H 06H 09H
24F0H= CDH ADH 25H C1H 78H 17H 17H 17H 17H E6H F0H 81H 21H 4DH 60H 77H
2500H= 2BH AFH 77H 2BH 77H CDH FEH 0DH 79H C1H 81H 4FH 78H CEH 00H 47H
2510H= C5H 21H 52H 60H 71H 2BH 70H 2BH AFH 77H 2BH 77H CDH 76H 0EH 21H
2520H= 4DH 60H 46H 23H 4EH 21H 73H 60H 78H CDH 77H 1DH FEH 30H CAH 32H
2530H= 25H 77H 23H 78H E6H 0FH C6H 30H 77H 23H 79H CDH 77H 1DH 77H 23H
2540H= 23H 79H E6H 0FH C6H 30H 77H 21H F3H 03H 11H 7BH 60H 06H 0CH CDH
2550H= ADH 25H C1H 3EH E8H 91H 4FH 32H 80H 61H 3EH 03H 98H 47H DAH B9H
2560H= 25H 21H 52H 60H 71H 2BH 70H 2BH AFH 77H 2BH 77H CDH 76H 0EH 21H
2570H= 4DH 60H 46H 23H 4EH 21H 73H 60H 36H 20H 23H 78H E6H 0FH C6H 30H
2580H= FEH 30H C2H 87H 25H 3EH 30H 77H 23H 79H 32H 7DH 61H CDH 77H 1DH
2590H= 77H 23H 23H 79H E6H 0FH C6H 30H 77H 21H FFH 03H 11H 7BH 60H 06H
25A0H= 0CH CDH ADH 25H 21H 76H 02H CDH 86H 1CH C3H C8H 25H 7EH 12H 23H
25B0H= 13H 05H C2H ADH 25H CDH 15H 15H C9H 21H 80H 05H CDH 86H 1CH 21H
25C0H= 44H 05H CDH 86H 1CH C3H 64H 0BH 3AH 0BH 60H E6H 05H CAH DDH 25H
25D0H= 3AH 61H 60H E6H 0FH CAH E6H 25H E6H 02H C2H E6H 25H 21H 76H 02H
25E0H= CDH 86H 1CH C3H 64H 0BH 21H 93H 04H CDH 86H 1CH 21H A7H 04H CDH
25F0H= 86H 1CH 21H 41H 06H 22H 7EH 61H 21H 34H 06H 22H 75H 61H 7EH FEH
2600H= 00H CAH 4CH 26H 47H 21H 78H 61H 7EH D6H 30H 17H 17H 17H 17H 4FH
2610H= 23H 7EH D6H 30H 81H 4FH 23H 7EH D6H 30H 57H 79H 90H CAH 26H 26H
2620H= DAH 6DH 26H C3H AFH 26H AFH BAH CAH 6DH 26H C3H AFH 26H 3AH 0BH
2630H= 60H 1FH D4H 40H 27H CDH 72H 27H CDH B6H 27H CDH 15H 15H 2AH 7EH
2640H= 61H 22H 22H 7EH 61H 2AH 75H 61H 23H C3H FBH 25H 21H B6H 04H 11H
```

```
2650H=73H 60H 06H 11H CDH D5H 27H 21H A4H 60H 4EH 23H 46H 3AH 0BH 60H
2660H=1FH D4H 40H 27H CDH 72H 27H CDH 15H 15H C3H 3EH 26H 21H 78H 61H
2670H=11H 74H 60H 7EH 12H 23H 13H 7EH 12H 13H 3EH 2EH 12H 23H 13H 7EH
2680H=12H 13H 3EH 4DH 12H 13H 3EH 4CH 12H 21H 6FH 61H 11H 7DH 60H 06H
2690H=06H CDH D5H 27H EBH 23H 23H 3AH 61H 60H FEH 00H CAH AAH 26H 36H
26A0H=44H 23H 36H 50H CDH 15H 15H C3H DEH 27H 36H 45H C3H A1H 26H 78H
26B0H=FEH 05H C2H C0H 26H 3AH 7DH 61H D6H 51H CAH 3EH 26H D2H 3EH 26H
26C0H=3AH 7DH 61H 1FH 1FH 1FH 1FH E6H 0FH 4FH 2AH 7EH 61H 7EH 91H 07H
26D0H=21H A4H 60H 85H 6FH 7CH CEH 00H 67H 2BH 2BH 5EH 23H 56H 23H 4EH
26E0H=23H 46H 3AH 7DH 61H E6H 0FH CAH 2EH 26H 79H 93H 4FH 78H 9AH 47H
26F0H=F5H DCH 38H 27H D5H 3AH 7DH 61H E6H 0FH 57H 3EH 0AH 92H 21H 4EH
2700H=60H 71H 2BH 70H 2BH 77H 2BH 36H 00H CDH 40H 0EH 21H 52H 60H 46H
2710H=2BH 4EH 70H 2BH 46H 71H 2BH 4EH 70H 2BH 71H 2BH 36H 0AH 2BH 36H
2720H=00H CDH A3H 0EH 21H 4BH 60H 4EH 2BH 46H D1H F1H DCH 38H 27H 7BH
2730H=81H 4FH 7AH 88H 47H C3H 2EH 26H 79H 2FH 4FH 78H 2FH 47H 03H C9H
2740H=21H 4BH 60H 36H 00H 23H 36H 12H 23H 70H 23H 71H CDH 40H 0EH 21H
2750H=52H 60H 7EH C6H 80H 4FH 2BH 7EH CEH 0CH 47H 71H 2BH 70H 2BH AFH
2760H=77H 2BH 77H 2BH 36H 0AH 2BH 77H CDH A3H 0EH 21H 4AH 60H 46H 23H
2770H=4EH C9H 21H 52H 60H 71H 2BH 70H 2BH 36H 00H 2BH 36H 00H CDH 76H
2780H=0EH 21H 4DH 60H 11H 7DH 60H 7EH CDH 77H 1DH 12H 13H 7EH E6H 0FH
2790H=C6H 30H 12H 23H 13H 7EH CDH 77H 1DH 12H 13H 3EH 2EH 12H 13H 7EH
27A0H=C6H 0FH C6H 30H 12H 13H 3AH 0BH 60H E6H 0CH CAH B2H 27H 3EH 46H
27B0H=12H C9H 3EH 43H 12H C9H 11H 73H 60H 3EH 20H 12H 13H 2AH 75H 61H
27C0H=7EH CDH 77H 1DH 12H 13H 7EH E6H 0FH C6H 30H 12H 13H 3EH 4DH 12H
27D0H=13H 3EH 4CH 12H C9H 7EH 12H 23H 13H 05H C2H D5H 27H C9H 21H 9EH
27E0H=60H 11H 4CH 60H 7EH 17H 17H 17H 17H E6H F0H 47H 23H 7EH E6H 0FH
27F0H=80H 12H 1BH AFH 12H 1BH 12H EBH CDH FEH 0DH 3EH 4CH 91H CAH 26H
2800H=29H DAH 26H 29H 3DH 87H 47H 87H 80H 21H 4EH 06H 85H 6FH 7CH CEH
2810H=00H 67H 11H 4EH 60H 7EH 12H 1BH AFH 12H 1BH 3AH A0H 60H E6H 0FH
2820H=12H AFH 1BH 12H E5H CDH 40H 0EH E1H 23H 11H 52H 60H 1AH 86H 4FH
2830H=1BH 23H 1AH 8EH 47H E5H 3AH 80H 61H 21H 4EH 60H 77H 2BH 36H 00H
2840H=2BH 71H 2BH 70H CDH 40H 0EH 21H 52H 60H 4EH 2BH 46H 2BH 5EH 2BH
2850H=56H E1H C5H D5H 23H 7EH E5H 21H 4EH 60H 77H 2BH AFH 77H 2BH 3AH
2860H=A0H 60H E6H 0FH 87H 47H 87H 87H 80H 77H 2BH AFH 77H CDH 40H 0EH
2870H=E1H 23H 11H 52H 60H EBH 1AH 96H 77H 2BH 13H 1AH 9EH 77H D1H C1H
2880H=23H 79H 86H 77H 2BH 78H 8EH 77H 2BH 7BH 8EH 77H 2BH 7AH 8EH 77H
2890H=CDH 76H 0EH 21H 4CH 60H 4EH 23H 7EH E6H F0H FEH 50H CAH 1EH 29H
28A0H=D2H 1EH 29H C5H 21H 94H 05H 01H 73H 60H 16H 14H CDH 2DH 29H C1H
28B0H=C5H 79H E6H 0FH C6H 30H 32H 75H 60H 79H CDH 77H 1DH 32H 73H 60H
28C0H=CDH 15H 15H C1H 21H 4CH 60H 71H 2BH AFH 77H 2BH 77H CDH FEH 0DH
28D0H=3EH E8H 91H 4FH 3EH 03H 98H 47H 21H 52H 60H 71H 2BH 70H 2BH AFH
28E0H=77H 2BH 77H CDH 76H 0EH 21H 1CH 05H 01H 73H 60H 16H 14H CDH 2DH
28F0H=29H 21H 4DH 60H 7EH E6H 0FH C6H 30H 11H 73H 60H 12H 23H 13H 7EH
2900H=CDH 77H 1DH 12H 13H 13H 7EH E6H 0FH C6H 30H 12H CDH 15H 15H 21H
2910H=76H 02H CDH 86H 1CH 21H 76H 02H CDH 86H 1CH C3H 64H 0BH 79H C6H
2920H=01H 27H 4FH C3H A3H 28H 3AH 7DH 61H 4FH C3H A3H 28H 7EH 02H 23H
2930H=03H 15H C2H 2DH 29H C9H 3EH 01H 32H 0BH 70H 11H 01H 00H 21H C7H
2940H=F0H 19H D2H 41H 29H 21H B2H 00H 22H 18H 70H 21H 3EH 86H 19H D2H
2950H=4EH 29H AFH 32H 0BH 70H 21H C7H F0H 19H D2H 59H 29H 21H 00H 00H
2960H=22H 18H 70H 21H 3EH 86H 19H D2H 66H 29H 3EH 01H 32H 0BH 70H 21H
2970H=C7H F0H 19H D2H 72H 29H 21H 53H 00H 22H 1AH 70H 21H 3EH 86H 19H
2980H=D2H 7FH 29H AFH 32H 0BH 70H C9H 2AH 99H 61H 4DH 44H C9H 21H 98H
2990H=61H 11H 9AH 61H 06H 18H 7EH 12H 2BH 1BH 05H C2H 96H 29H C9H 21H
29A0H=03H 70H 36H 50H 36H 7BH 36H 23H 3AH 03H 70H FEH 85H C0H 21H 74H
29B0H=01H CDH 9DH 07H 21H 9DH 61H 3AH 03H 70H 1FH DAH D9H 29H E5H CDH
29C0H=4AH 0AH CDH 4EH 08H E1H 17H DAH B7H 29H 1FH FEH 14H CAH E6H 29H
29D0H=36H 1BH 23H 36H 03H 2BH C3H B7H 29H 7EH 23H 32H 02H 70H CDH ECH
29E0H=29H FEH 03H C2H B7H 29H 3EH 02H 32H 03H 70H C9H E5H 21H E8H FDH
29F0H=11H 01H 00H 19H D2H F3H 29H E1H C9H 3AH 01H 60H F6H 10H 32H 01H
2A00H=60H E6H 1FH 32H 0AH 70H 3EH 01H 32H A1H 60H 21H 44H 01H CDH 9DH
2A10H=07H CDH 4EH 08H 17H DAH 11H 2AH 1FH FEH 00H CAH 58H 2AH FEH 01H
2A20H=CAH DCH 2AH FEH 02H CAH 93H 2CH FEH 03H CAH DDH 2CH FEH 04H CAH
2A30H=7AH 2DH FEH 05H CAH E1H 2DH FEH 06H CAH 2BH 2EH FEH 07H CAH 3BH
2A40H=2EH FEH 08H CAH 72H 2EH FEH 09H CAH 04H 2FH FEH 14H CAH C6H 06H
2A50H=C3H 11H 2AH 04H 00H FFH 55H AAH 21H 20H 60H 3EH 20H 06H 06H 77H
2A60H=23H 05H C2H 5FH 2AH CDH 3DH 0BH 3AH 53H 2AH 47H 11H 00H 68H 3AH
2A70H=57H 2AH 4FH 21H 10H 60H 71H 23H 7DH 93H 7CH 9AH DAH 76H 2AH 21H
```

```
2A80H= 10H 60H 7EH B9H C2H C6H 2AH 23H 7DH 93H 7CH 9AH DAH 82H 2AH 21H
2A90H= 53H 2AH 05H CAH A1H 2AH 7DH 80H 6FH 7CH CEH 00H 67H 7EH C3H 72H
2AA0H= 2AH 21H 10H 60H 75H 23H 7DH 93H 7CH 9AH DAH A4H 2AH 21H 10H 60H
2AB0H= 0EH 10H 7EH B9H C2H C6H 2AH 23H 0CH 7DH 93H 7CH 9AH DAH B2H 2AH
2AC0H= 21H 54H 01H C3H C9H 2AH 21H 64H 01H CDH 9DH 07H CDH 4EH 08H 17H
2AD0H= DAH CCH 2AH 1FH FEH 14H CAH F9H 29H C3H 58H 2AH 21H 84H 01H CDH
2AE0H= 9DH 07H 21H 00H 00H 22H 96H 60H 3AH 01H 60H E6H 0FH F6H 10H 32H
2AF0H= 01H 60H CDH 66H 2BH CDH 4EH 08H 17H DAH F2H 2AH 1FH FEH 01H CAH
2B00H= 4DH 2CH FEH 04H CAH 5BH 2CH FEH 02H CAH 63H 2CH FEH 05H CAH 6BH
2B10H= 2CH FEH 03H CAH 7BH 2CH FEH 06H CAH 73H 2CH FEH 14H CAH 83H 2CH
2B20H= FEH 15H CAH 37H 2BH FEH 08H CAH 95H 2BH FEH 07H CAH 70H 2BH FEH
2B30H= 00H CAH A2H 2BH C3H F2H 2AH CDH 05H 2CH 21H 00H 00H 22H 96H 60H
2B40H= CDH 52H 1EH CDH B0H 2BH 3AH 0AH 70H E6H 04H CAH F2H 2AH CDH 4EH
2B50H= 08H 17H DAH 5BH 2BH 1FH FEH 14H CAH F2H 2AH 3AH 0AH 70H E6H 10H
2B60H= C2H 46H 2BH C3H 40H 2BH 3AH 0AH 70H 2FH E6H 06H 32H 01H 70H C9H
2B70H= 21H 01H 00H 22H 96H 60H 3EH 01H 32H 00H 60H 32H 02H 60H 3AH 0AH
2B80H= 70H E6H 02H CAH 8FH 2BH CDH 52H 1EH CDH 3DH 2CH C3H 7EH 2BH CDH
2B90H= FEH 2BH C3H F2H 2AH AFH 32H 00H 60H CDH 52H 1EH CDH B0H 2BH C3H
2BA0H= F2H 2AH 3EH 01H 32H 00H 60H CDH 52H 1EH CDH FEH 2BH C3H F2H 2AH
2BB0H= CDH 66H 2BH 2AH 96H 60H 23H 22H 96H 60H 7CH 17H DAH F2H 2BH 3EH
2BC0H= 20H 32H 22H 60H EBH 21H 52H 60H 73H 2BH 72H 2BH AFH 77H 2BH 77H
2BD0H= CDH 76H 0EH 21H 4EH 60H 11H 26H 60H 06H 02H 7EH 4FH E6H 0FH C6H
2BE0H= 30H 12H 1BH 79H CDH 77H 1DH 12H 2BH 1BH 05H C2H DBH 2BH CDH 3DH
2BF0H= 0BH C9H 7CH 2FH 67H 7DH 2FH 6FH 23H 3EH 2DH C3H C1H 2BH 2AH 96H
2C00H= 60H 2BH C3H B7H 2BH AFH 3CH 32H 00H 60H 32H 02H 60H 3AH 0AH 70H
2C10H= E6H 02H CAH 1EH 2CH CDH 52H 1EH CDH 3DH 2CH C3H 0DH 2CH AFH 32H
2C20H= 00H 60H 32H 02H 60H CDH 2EH 2CH 3EH 01H 32H 02H 60H C9H 3AH 0AH
2C30H= 70H E6H 10H C8H CDH 52H 1EH CDH 3DH 2CH C3H 2EH 2CH CDH 66H 2BH
2C40H= CDH 4EH 08H 17H D8H 1FH FEH 14H C0H F1H C3H F2H 2AH 3AH 01H 60H
2C50H= F6H 40H 32H 01H 60H 32H 0AH 70H C3H F2H 2AH 3AH 01H 60H E6H BFH
2C60H= C3H 52H 2CH 3AH 01H 60H F6H 20H C3H 52H 2CH 3AH 01H 60H E6H DFH
2C70H= C3H 52H 2CH 3AH 01H 60H F6H 10H C3H 52H 2CH 3AH 01H 60H E6H EFH
2C80H= C3H 52H 2CH 3AH 01H 60H E6H 0FH F6H 10H 32H 01H 60H 32H 0AH 70H
2C90H= C3H F9H 29H 3EH 8AH 32H 09H 70H 21H 0BH 04H CDH 9DH 07H 3AH 0BH
2CA0H= 70H 1FH D2H 9EH 2CH CDH EAH 12H 3AH 0DH 70H E6H 20H C2H D8H 2CH
2CB0H= 3EH 2DH 32H 23H 60H 21H 9EH 60H 11H 24H 60H 06H 03H 7EH 12H 23H
2CC0H= 13H 05H C2H BDH 2CH CDH 3DH 0BH CDH 4EH 08H 17H DAH 9EH 2CH 1FH
2CD0H= FEH 14H CAH F9H 29H C3H 9EH 2CH 3EH 20H C3H B2H 2CH 21H C2H 01H
2CE0H= CDH 9DH 07H AFH 32H 5CH 60H 3AH 0BH 60H E6H 1FH 32H 0BH 60H 32H
2CF0H= 01H 70H CDH 60H 2DH 3EH 01H 32H 5EH 60H 3AH 0BH 70H 1FH D2H FAH
2D00H= 2CH 3AH 0BH 60H E6H 0CH CAH 70H 2DH 3EH 46H 32H 21H 60H CDH B2H
2D10H= 1CH 06H 06H 21H 21H 60H 7EH 23H 77H 2BH 2BH 05H C2H 16H 2DH 3EH
2D20H= 2EH 32H 20H 60H 3AH 0DH 70H E6H 20H C2H 75H 2DH 3EH 2DH 32H 1CH
2D30H= 60H CDH 3DH 0BH CDH 4EH 08H 17H DAH FAH 2CH 1FH FEH 14H CAH F9H
2D40H= 29H D6H 0AH DAH FAH 2CH FEH 05H D2H FAH 2CH 3CH 47H AFH 37H 17H
2D50H= 05H C2H 4FH 2DH 32H 06H 60H 32H 01H 70H CDH 60H 2DH C3H FAH 2CH
2D60H= E6H 10H C2H 6BH 2DH 3EH 21H 32H 09H 70H C9H 3EH 51H C3H 67H 2DH
2D70H= 3EH 43H C3H 0BH 2DH 3EH 20H C3H 2EH 2DH 21H D2H 01H CDH 9DH 07H
2D80H= AFH 32H 0BH 70H 21H 00H 00H 11H 20H 70H 21H 1AH
2D90H= 70H CDH 4EH 08H 17H DAH 91H 2DH 1FH FEH 00H CAH BAH 2DH FEH 03H
2DA0H= CAH C3H 2DH FEH 05H CAH CCH 2DH FEH 01H CAH D5H 2DH FEH 04H CAH
2DB0H= DCH 2DH FEH 14H CAH F9H 29H C3H 91H 2DH 21H 00H 00H 11H 00H 00H
2DC0H= C3H 8AH 2DH 21H 53H 07H 11H 58H 02H C3H 8AH 2DH 21H A6H 0EH 11H
2DD0H= B0H 04H C3H 8AH 2DH AFH 32H 0BH 70H C3H 91H 2DH 3EH 01H C3H D6H
2DE0H= 2DH AFH 32H 49H 60H 3EH 8AH 21H E2H 01H 32H 09H 70H CDH 9DH 07H
2DF0H= 3AH 0AH 70H 17H D2H F0H 2DH CDH 57H 13H 3AH 0FH 70H E6H 20H C2H
2E00H= 36H 2EH 3EH 2DH 32H 1CH 60H 21H 5BH 61H 11H 1DH 60H 7EH 12H 23H
2E10H= 13H 7EH 12H 23H 13H 13H 7EH 12H CDH 3DH 0BH CDH 4EH 08H 17H DAH
2E20H= F0H 2DH 1FH FEH 14H CAH F9H 29H C3H F0H 2DH 21H F2H 01H 3EH D4H
2E30H= 32H 49H 60H C3H EAH 2DH 3EH 20H C3H 04H 2EH 21H 02H 02H CDH 9DH
2E40H= 07H CDH 4EH 08H 17H DAH 4EH 2EH 1FH FEH 14H CAH F9H 29H 3AH 0BH
2E50H= 70H 1FH 1FH 21H 24H 60H D2H 67H 2EH 36H 4CH 23H 36H 4FH 23H 36H
2E60H= 57H CDH 3DH 0BH C3H 41H 2EH 36H 20H 23H 36H 4FH 23H 36H 4BH C3H
2E70H= 61H 2EH 21H 12H 02H CDH 9DH 07H 3EH 51H 32H 09H 70H C3H C7H 2EH
2E80H= 3AH 0AH 70H 17H D2H 80H 2EH CDH 3DH 0BH AFH 32H 55H 60H CDH 0AH
2E90H= 1CH 3AH 0FH 70H E6H 20H C2H FFH 2EH 3EH 2DH 32H 22H 60H CDH 4EH
```

```
2EA0H=09H 17H DAH 80H 2EH 1FH FEH 0AH DAH B8H 2EH FEH 16H CAH C7H 2EH
2EB0H=FEH 14H CAH F4H 2EH C3H 80H 2EH 21H 1CH 60H 46H C6H 30H 77H 2BH
2EC0H=7EH 70H 2BH 77H C3H 80H 2EH F3H 21H 1CH 60H CDH A4H 10H C5H E1H
2ED0H=22H 52H 60H 21H 13H 70H 36H 72H 36H 14H 2BH 2BH 71H 70H 2BH 36H
2EE0H=4FH D5H E1H 22H 57H 60H AFH 32H 5AH 60H 3EH 1BH 32H 89H 60H 30H
2EF0H=FBH C3H 80H 2EH F3H 21H 11H 70H 36H 00H 36H 40H C3H F9H 29H 3EH
2F00H=20H C3H 9EH 2EH 21H 22H 02H CDH 9DH 07H C3H 2FH 2FH CDH 4EH 08H
2F10H=17H DAH 0DH 2FH 1FH FEH 0AH DAH 27H 2FH FEH 15H CAH 2FH 2FH FEH
2F20H=14H CAH 3BH 2FH C3H 0DH 2FH C6H 30H 32H 02H 70H C3H 0DH 2FH 21H
2F30H=03H 70H 36H 50H 36H 7BH 36H 23H C3H 0DH 2FH 3EH 02H 32H 03H 70H
2F40H=C3H F9H 29H 21H E4H 00H 11H 17H 60H 06H 10H 7EH 12H 23H 13H 05H
2F50H=C2H 4EH 2FH AFH 32H 5AH 61H 11H 00H 10H 21H 00H 00H CDH 7CH 2FH
2F60H=3EH 01H 11H 00H 10H 21H 00H 10H CDH 7CH 2FH 3EH 02H 11H E0H 0FH
2F70H=21H 00H 20H CDH 7CH 2FH 3AH 5AH 61H 1FH D0H 76H 32H 59H 61H D5H
2F80H=01H 00H 00H 11H 00H 00H 7BH 86H 5FH 7AH CEH 00H 57H 79H CEH 00H
2F90H=4FH EBH E3H 2BH 7DH 84H DAH 9CH 2FH CAH A2H 2FH E3H EBH 23H C3H
2FA0H=86H 2FH E3H EBH E1H 21H E0H 2FH 3AH 59H 61H 47H 07H 80H 85H 6FH
2FB0H=7CH CEH 00H 67H 7BH BEH C2H C6H 2FH 23H 7AH BEH C2H C6H 2FH 23H
2FC0H=79H BEH C2H C6H 2FH C9H 3AH 59H 61H 47H 21H 21H 60H 85H 6FH 7CH
2FD0H=CEH 00H 67H 78H C6H 30H 77H CDH 3DH 0BH 3EH 01H 32H 5AH 61H C9H
2FE0H=E6H D1H 04H 9BH E2H 05H D6H DEH 05H 00H 00H 00H 00H 00H 00H 00H
2FF0H=00H 00H 00H 00H 00H 00H 00H 00H 00H 00H 00H 00H 00H 00H 00H 00H
```

What is claimed is:

1. Automatic distillation apparatus of the type having a sample heater, means for condensing the sample vapor and vessel means for receiving the distillate as the vapor is condensed, wherein the improvement comprises
   means for receiving and storing operator commands,
   means responsive to said commands for establishing first and second heater time intervals,
   first servo control means responsive to said commands for supplying power to said heater at a first predetermined level during said first interval and at a different second predetermined level during said second interval,
   means for detecting the initial boiling point of the sample for producing an IBP signal indicative thereof,
   means responsive to said IBP signal for disabling said first servo control means, and
   means responsive to the timing of said IBP signal in relation to said first and second intervals for issuing a control signal indicative of the occurrence of the IBP signal before or during said second time interval.

2. The apparatus of claim 1, wherein the improvement further comprises
   means for disabling said first servo mechanism and removing all power from said heater in the event that no IBP signal occurs before said second interval has elapsed.

3. Automatic distillation apparatus of the type having a sample heater, means for condensing the sample vapor and vessel means for receiving the distillate as the vapor is condensed, wherein the improvement comprises
   means for receiving and storing operator commands,
   means responsive to said commands for establishing first and second heater time intervals,
   first servo control means responsive to said commands for supplying power to said heater at a first predetermined level during said first interval and at a different second predetermined level during said second interval,
   means for detecting the initial boiling point of the sample for producing an IBP signal indicative thereof,
   means responsive to said IBP signal for disabling said first servo control means,
   means responsive to the increasing volume of distillate during distillation for producing an output signal related to the distillation rate, and
   second servo control means responsive to said operator commands for controlling the supply of power to said heater to minimize the difference between an operator prescribed distillation rate and the distillation rate implied by said distillation rate signal.

4. The apparatus of claim 3, wherein the improvement further comprises:
   means responsive to the volume of distillate for producing a final heat signal at a precalculated volume,
   said control means being responsive to said final heat signal for disabling said second servo control means, and
   said first servo control means being responsive to said final heat signal as well as to said stored commands for incrementing the power supplied to said heater by a predetermined amount and maintaining the new power level attained thereby.

5. The apparatus of claim 1 wherein the improvement further comprises:
   means responsive to said distillation rate signal for issuing an endpoint signal to indicate the absence of further distillate within a prescribed time interval,
   said control means being responsive to said endpoint signal for disabling said first servo control means.

6. The apparatus of claim 5, wherein the improvement further comprises:
   memory,
   means responsive to the volume of distillate for producing a signal indicative thereof,
   said control means being responsive to said volume signal and said vapor temperature signal for storing said volume and temperature signals both at a series of prescribed points during distillation.

7. The apparatus of claim 6, further comprising means for entering into said memory operator supplied data indicative of the volume of residue remaining after said endpoint signal, and said control means being responsive to the entry of said residue data for determining vapor temperatures at a plurality of prescribed percentages of evaporated sample.

8. Automatic distillation apparatus of the type comprising a sample heater, means for condensing the sample vapor and vessel means for receiving the distillate, wherein the improvement comprises means responsive to the level of distillate in said vessel means for producing an output indicative of the volume o of distillate during distillation, control means responsive to said volume output for controlling the power supplied to said heater to maintain a prescribed distillation rate, means for gaging the vapor temperature and producing a vapor temperature output signal, means for storing during distillation the volume output and vapor temperature at each of a series of predetermined volumes, means for storing operator supplied data following distillation indicative of the volume of residue, and computer means responsive to the storage of said residue data for determining and storing derived vapor temperature values at a predetermined series of volumes of evaporated sample.

9. The apparatus of claim 8, further comprising means responsive to the cessation of distillate for disabling said means supplying power to said heater and producing an endpoint signal, means responsive to said endpoint signal for signalling the operator to measure the residue, and means responsive to barometric pressure for computing a figure indicative of sample loss corrected for barometric pressure and residue.

10. Automatic distillation apparatus of the type consisting of a sample heater, means for condensing the sample vapor and vessel means for receiving the distillate, wherein the improvement comprises digital memory, entry means for receiving operator supplied data indicative of a plurality of test parameters including whether a given distillation test is to terminate upon recovery of a prescribed volume of distillate, attainment of a specffied vapor temperature or cessation of distillate, stored program means for automatically preselecting termination upon cessation of distillate unless operator entered data is inconsistent therewith, and control means for terminating said distillation test upon recovery of a prescribed volume, attainment of a specified vapor temperature or cessation of distillate in accordance with said termination data.

11. Automatic distillation apparatus of the type having a sample heater, a sample flask positioned on said heater, means for condensing the sample vapor and vessel means for receiving the distillate, wherein the improvement comprises a vapor temperature sensor having an elongated body portion with a resistive element disposed at the distal end thereof and a sensor lead extending proximally from the proximal end of said body and electrically connected to said resistive element, apertured stopper means for sealably holding said sensor body at a predetermined level in said flask, sensor circuit means operatively connected to said sensor lead for converting the resistance of said resistive element to a proportional analog electrical temperature signal, and stored program means responsive to said analog temperature signal for storing data indicative of the value of said analog temperature signal at a precise time interval ago, said time interval being determined such that said stored temperature data is indicative of what the current temperature would measure on a standard glass laboratory thermometer, whereby inherent thermometer lag is simulated in software.

12. Automatic distillation apparatus of the type having a sample heater, means for condensing the sample vapor and vessel means for receiving the distillate, wherein the improvement comprises a meniscus detector including radiant energy beam means arranged alongside said vessel for aiming a beam through said vessel parallel to the level of distillate therein, vertical translation means for moving said beam means up and down between upper and lower excursion limits, control means for issuing a control signal to drive said beam means to the lower limit and back up to a predetermined level before distillation commences, means for issuing a detection signal indicative of whether said beam is interrupted by distillate in said vessel means in order to locate the meniscus, and means responsive to a predetermined condition of said detection signal for halting said beam means in the course of its travel back up to said predetermined limit such that said beam means position corresponds to the initial level of liquid in said vessel, whereby a variable zero level starting position is established for the incoming distillate.

13. The apparatus of claim 12, wherein said translation means includes a vertical screw drive rotatably mounted alongside said vessel means, said beam means being drivingly connected to said screw drive and an electrical stepper motor drivingly coupled to said screw drive.

14. The apparatus of claim 13, further comprising stored program means for issuing digital output commands to said stepper motor in accordance with stored instructions.

15. The apparatus of claim 14, further comprising means responsive to said digital motor commands for energizing said stepper motor in a direction to move said beam means at either fast or slow step intervals according to said stored instructions.

16. Automatic distillation apparatus of the type having a sample heater, means for condensing the sample vapor and vessel means for receiving the distillate, wherein the improvement comprises means defining an enclosed receiving chamber for housing said receiving vessel means, thermostatically controlled means for maintaining the air temperature in said receiving chamber at a prescribed subambient level, a temperature probe adapted to sense said vapor temperature, and a temperature sensor cooling port in said chamber through which said temperature probe can be inserted, and an apertured temperature well means located in said chamber below said port for removably receiving and positioning the distal portion of said temperature probe inside said chamber, whereby said temperature probe is pre-cooled to the same subambient temperature as said receiving chamber and vessel means.

17. Automatic distillation apparatus of the type having a sample heater, means for condensing the sample vapor and vessel means for receiving the distillate as the vapor is condensed, wherein the improvement comprises a microcomputer having a stored program, digital data entry means for entering a plurality of desired wattages indicative of corresponding heater power levels, stored program means for selecting a desired wattage in response to a corresponding condition, SCR circuit means for powering said heater in response to an input conduction angle, watt meter means for producing an output indicative of the actual power input to said heater from said SCR heater circuit means, said stored program including means for computing a corresponding conduction angle from the desired wattage and generating a conduction angle signal to said heater circuit, analog to digital converter means for converting the output of said watt meter to a digital signal, and means responsive to the output of said analog to digital converter and to said desired wattage for adjusting said conduction angle signal so as to null the difference between the watt meter output and the desired wattage.

18. The apparatus of claim 17, wherein the improvement further comprises stored program means responsive to zero crossings of line voltage for automatically correcting the conduction angle signal in accordance with the line voltage frequency.

19. Automatic distillation apparatus of the type having a sample heater, means for condensing the sample vapor, a vapor temperature sensor, and vessel means for receiving the distillate, wherein the improvement comprises a microcomputer having a stored program, data entry means for entering a plurality of different preset parameters, said stored program including means for conducting a prescribed distillation test according to said preset parameters including software means for controlling the power to the heater to sustain a constant distillation rate while sampling and storing the vapor temperature at a series of prescribed volume percentages, and stored program means for printing out in alphanumeric characters all of said preset parameters and a table showing the vapor temperature at each of said prescribed volume percentages.

20. The apparatus of claim 19, wherein the improvement further comprises means for producing a digital indication of actual barometric pressure, and stored program means responsive to the indicated barometric pressure for computing and printing out corrected vapor temperatures for said prescribed volume percentages.

21. The apparatus of claim 20, wherein the improvement further comprises stored program means for computing a lost sample volume corrected to a standard barometric pressure by taking said indicated barometric pressure into account.

22. The apparatus of claim 20, wherein the improvement further comprises said stored program means further including means for computing and printing the elapsed time from the initial boiling point of the sample up to the collection of a predetermined volume percentage of distillate.

23. Automatic distillation apparatus of the type having a sample heater, means for condensing the sample vapor, a vapor temperature sensor, and vessel means for receiving the distillate, wherein the improvement comprises a microcomputer with stored program means containing instructions, said stored program means containing instructions for carrying out a barometric correction of vapor temperatures at prescribed volume percentages of distillate, said stored program means further including instruction means for implementing a selected one of a plurality of time limits for achieving the initial boiling point of the sample, data entry means for entering test parameters including means for selecting among a plurality of temperature ranges corresponding to standard tests, and means responsive to the selection of a particular temperature range corresponding to a particular test for automatically enabling said barometric correction instructions and selecting a corresponding set of time limits for said initial boiling point.

* * * * *